(12) United States Patent
Komuro

(10) Patent No.: US 11,535,724 B2
(45) Date of Patent: Dec. 27, 2022

(54) ETHYLENE-VINYL ALCOHOL COPOLYMER RESIN COMPOSITION, MULTILAYER STRUCTURE AND PACKAGE

(71) Applicant: Mitsubishi Chemical Corporation, Tokyo (JP)

(72) Inventor: Ryohei Komuro, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 17/355,728

(22) Filed: Jun. 23, 2021

(65) Prior Publication Data

US 2021/0317286 A1 Oct. 14, 2021

Related U.S. Application Data

(63) Continuation of application No. PCT/JP2019/050807, filed on Dec. 25, 2019.

(30) Foreign Application Priority Data

| Dec. 26, 2018 | (JP) | JP2018-243825 |
| Dec. 26, 2018 | (JP) | JP2018-243826 |
| Dec. 26, 2018 | (JP) | JP2018-243827 |
| Dec. 26, 2018 | (JP) | JP2018-243828 |
| Feb. 21, 2019 | (JP) | JP2019-029783 |
| Mar. 12, 2019 | (JP) | JP2019-044536 |

(51) Int. Cl.

| C08K 5/098 | (2006.01) |
| B32B 7/12 | (2006.01) |
| B32B 27/08 | (2006.01) |
| B32B 27/30 | (2006.01) |
| B32B 27/34 | (2006.01) |
| B65D 65/40 | (2006.01) |
| C08L 29/04 | (2006.01) |

(52) U.S. Cl.
CPC ............ C08K 5/098 (2013.01); B32B 7/12 (2013.01); B32B 27/08 (2013.01); B32B 27/306 (2013.01); B32B 27/34 (2013.01); B65D 65/40 (2013.01); C08L 29/04 (2013.01); *B32B 2553/00* (2013.01); *C08K 2201/014* (2013.01)

(58) Field of Classification Search
CPC ........ B32B 27/306; C08K 5/09; C08K 5/092; C08K 5/098; C08L 29/04
See application file for complete search history.

(56) References Cited

U.S. PATENT DOCUMENTS

| 5,034,281 A | 7/1991 | Kawasaki et al. |
| 5,082,743 A | 1/1992 | Itamura et al. |
| 5,895,797 A | 4/1999 | Hayashihara et al. |
| 6,323,387 B1 | 11/2001 | Soga et al. |
| 2015/0159005 A1* | 6/2015 | Nakazawa ............. B32B 27/32 428/36.7 |
| 2018/0291177 A1* | 10/2018 | Komuro ................. B32B 27/08 |
| 2019/0367718 A1* | 12/2019 | Hirose ................... B32B 27/34 |
| 2020/0172712 A1 | 6/2020 | Komuro |

FOREIGN PATENT DOCUMENTS

| CN | 104350102 | 2/2015 |
| CN | 108473743 | 8/2018 |
| EP | 3702407 | 9/2020 |
| JP | S51-132259 A | 11/1976 |
| JP | S61-220839 A | 10/1986 |
| JP | S62-152847 A | 7/1987 |
| JP | S63-230757 A | 9/1988 |
| JP | S63-304043 A | 12/1988 |
| JP | H01-279949 A | 11/1989 |
| JP | H03-192140 A | 8/1991 |
| JP | H07-080954 A | 3/1995 |
| JP | H07-173348 A | 7/1995 |
| JP | H08-259757 A | 10/1996 |
| JP | H08-311276 A | 11/1996 |
| JP | H10-087923 A | 4/1998 |
| JP | H11-290378 A | 10/1999 |
| JP | 2002-060496 A | 2/2002 |
| JP | 2002-060497 A | 2/2002 |

(Continued)

OTHER PUBLICATIONS

European Search report issued with respect to European application No. 19905981.7, dated Jan. 25, 2022.

(Continued)

*Primary Examiner* — Zachary M Davis

(74) *Attorney, Agent, or Firm* — Greenblum & Bernstein, P.L.C.

(57) ABSTRACT

An ethylene-vinyl alcohol copolymer resin composition, including: an ethylene-vinyl alcohol copolymer (A); acetic acid and/or a salt thereof (B); an aliphatic carboxylic acid (C) other than acetic acid; and an aliphatic carboxylic acid metal salt (D), wherein a metal species of the salt (D) is at least one selected from long Periodic Table 4th-period d-block elements, and wherein respective contents of the acetic acid and/or the salt thereof (B), the acid (C), and the salt (D) satisfy the following formulae (1) and (2) on a weight basis is provided. The resin composition is excellent in impact resistance and adhesive strength even without being blended with any other resin:

$$0.001 \leq (\text{content of } (D) \text{ in terms of metal ion/content of } (B) \text{ in terms of acetic acid ion}) \leq 1.30 \quad (1)$$

$$0.11 \leq (\text{content of } (D) \text{ in terms of metal ion/content of } (C) \text{ in terms of carboxylic acid ion}) \leq 100 \quad (2).$$

20 Claims, No Drawings

(56) References Cited

FOREIGN PATENT DOCUMENTS

| JP | 2002-069259 A | 3/2002 |
|---|---|---|
| WO | 2019/083000 A1 | 5/2019 |

OTHER PUBLICATIONS

ISR issued in WIPO Patent Application No. PCT/JP2019/050807, dated Mar. 3, 2020, English translation.
IPRP issued in WIPO Patent Application No. PCT/JP2019/050807, dated Jun. 16, 2021, English translation.
Singaporean Office Action issued with respect to Singaporean application No. 11202106870S, dated Jul. 25, 2022, with English translation.
Chinese Office Action issued with respect to Chinese application No. 201980085949.7, dated Oct. 9, 2022, with English translation.

* cited by examiner

ETHYLENE-VINYL ALCOHOL COPOLYMER RESIN COMPOSITION, MULTILAYER STRUCTURE AND PACKAGE

RELATED APPLICATION

This application is a continuation of International Application No. PCT/JP2019/050807, filed on Dec. 25, 2019, which claims priority to Japanese Patent Application Nos. 2018-243827, 2018-243828, 2018-243825, and 2018-243826, filed on Dec. 26, 2018, 2019-029783, filed on Feb. 21, 2019, and 2019-044536, filed on Mar. 12, 2019, the entire contents of each of which being hereby incorporated by reference.

TECHNICAL FIELD

The present disclosure relates to an ethylene-vinyl alcohol copolymer (hereinafter sometimes referred to as "EVOH") resin composition, and more specifically, to an EVOH resin composition, which is excellent in impact resistance and is also excellent in adhesive strength.

BACKGROUND ART

An EVOH shows excellent gas barrier properties including an oxygen barrier property because hydroxy groups abundantly present in a molecular chain of the EVOH are strongly hydrogen-bonded to form a crystal portion, and the crystal portion prevents the penetration of oxygen from the outside. The EVOH is generally used in the intermediate layer of a laminate obtained by laminating resins, and has been used as various packages.

While the EVOH is excellent in gas barrier properties as described above, the EVOH has an ample amount of hydroxy groups in the molecular chain, and hence has a high crystallinity. Accordingly, the EVOH tends to be brittle, and hence an EVOH layer in a package may be cracked, or a pinhole may be caused in the layer, by impact or the like to break the package.

Accordingly, for the purpose of improving the impact resistance of the EVOH, in each of, for example, PTLs 1 and 2, there is a disclosure of a laminated package including a resin composition layer formed of the EVOH and an ethylene-vinyl acetate copolymer. In addition, in each of PTLs 3 and 4, there is a disclosure of a laminate including a resin composition layer formed of the EVOH and a partially saponified product of an ethylene-vinyl acetate copolymer.

RELATED ART DOCUMENT

Patent Document

PTL 1: JP-A-SHO61 (1986)-220839
PTL 2: JP-A-SHO62 (1987)-152847
PTL 3: JP-A-HEI1 (1989)-279949
PTL 4: JP-A-HEI3 (1991)-192140

SUMMARY

In each of PTLs 1 to 4 described above, however, part of the EVOH is replaced with a resin other than the EVOH before its blending into the resin composition. Accordingly, there is a tendency that the ratio of the EVOH in the resin composition reduces, and hence a gas barrier property derived from the EVOH reduces.

In addition, in recent years, along with, for example, widespread use of Internet shopping and economic development of developing countries, physical distribution has been rapidly becoming borderless, and hence the time period for which food, drugs, and the like are transported tends to lengthen. Accordingly, a multilayer structure (packaging material) formed of an EVOH resin composition having both of high impact resistance against falling or collision at the time of long-term transportation or during handling, and a more excellent gas barrier property has been required.

In addition, along with the diversification of market needs in recent years, further high-functionalization (diversification of the layer number and layered configuration) of the multilayer structure formed of the EVOH resin composition has been required, and such a problem as described below has started to occur depending on the layered configuration. The impact resistance and adhesive strength of the multilayer structure to be obtained are insufficient.

In view of the foregoing, in the present disclosure, under such background, there is provided an EVOH resin composition, which is excellent in impact resistance and is also excellent in adhesive strength even without being blended with any resin other than an EVOH.

Thus, the inventors have made extensive investigations in view of such circumstances, and as a result, have found that an EVOH resin composition, which is excellent in impact resistance and adhesive strength when formed into a film, and is also excellent in color tone stability, is obtained by using an EVOH in combination with acetic acid and/or a salt thereof, an aliphatic carboxylic acid other than acetic acid, and a metal salt of the aliphatic carboxylic acid including at least one kind of metal species selected from long Periodic Table 4th-period d-block elements.

That is, it has been generally known that a fatty acid metal salt accelerates the thermal decomposition of the EVOH to reduce the impact resistance and color tone of an EVOH resin composition to be obtained. Accordingly, when a person skilled in the art aims to improve the mechanical property (impact resistance) and color tone of the EVOH, the person avoids the blending of the EVOH with the fatty acid metal salt. However, the inventors have used the EVOH in combination with the acetic acid and/or the salt thereof, and the aliphatic carboxylic acid other than acetic acid and a specific metal salt thereof so that a specific relationship may be satisfied, and as a result, have found that the mechanical property (impact resistance) and color tone of the EVOH are improved contrary to customary expectations.

Thus, according to a first aspect of the present disclosure, there is provided an EVOH resin composition, including: an EVOH (A); acetic acid and/or a salt thereof (B); an aliphatic carboxylic acid (C) other than acetic acid; and an aliphatic carboxylic acid metal salt (D) that is a metal salt of the aliphatic carboxylic acid (C), wherein a metal species of the aliphatic carboxylic acid metal salt (D) is at least one kind selected from long Periodic Table 4th-period d-block elements, and wherein respective contents of the acetic acid and/or the salt thereof (B), the aliphatic carboxylic acid (C), and the aliphatic carboxylic acid metal salt (D) satisfy the following formulae (1) and (2) on a weight basis.

$$0.001 \leq \text{(content of } (D) \text{ in terms of metal ion/content of } (B) \text{ in terms of acetic acid ion)} \leq 1.30 \quad (1)$$

$$0.11 \leq \text{(content of } (D) \text{ in terms of metal ion/content of } (C) \text{ in terms of carboxylic acid ion)} \leq 100 \quad (2)$$

In addition, according to a second aspect of the present disclosure, there is provided a multilayer structure, including a layer formed of the EVOH resin composition of the first aspect, and according to a third aspect of the present disclosure, there is provided a package, including the multilayer structure of the second aspect.

The EVOH resin composition of the present disclosure is a resin composition, including: the ethylene-vinyl alcohol copolymer, that is, EVOH (A); the acetic acid and/or the salt thereof (B); the aliphatic carboxylic acid (C) other than acetic acid; and the aliphatic carboxylic acid metal salt (D) that is the metal salt of the aliphatic carboxylic acid (C), wherein the metal species of the aliphatic carboxylic acid metal salt (D) is at least one kind selected from the long Periodic Table 4th-period d-block elements, and wherein the respective contents of the acetic acid and/or the salt thereof (B), the aliphatic carboxylic acid (C), and the aliphatic carboxylic acid metal salt (D) satisfy the following formulae (1) and (2) on a weight basis. Accordingly, the composition is excellent in impact resistance and adhesive strength when formed into a film, and is also excellent in color tone stability.

$$0.001 \le (\text{content of } (D) \text{ in terms of metal ion/content of } (B) \text{ in terms of acetic acid ion}) \le 1.30 \quad (1)$$

$$0.11 \le (\text{content of } (D) \text{ in terms of metal ion/content of } (C) \text{ in terms of carboxylic acid ion}) \le 100 \quad (2)$$

In addition, when the content of the aliphatic carboxylic acid metal salt (D) in terms of metal ion is from 1 ppm to 500 ppm with respect to the total sum of the contents of the ethylene-vinyl alcohol copolymer (A), the acetic acid and/or the salt thereof (B), the aliphatic carboxylic acid (C), and the aliphatic carboxylic acid metal salt (D), the EVOH resin composition is more excellent in impact resistance and adhesive strength when formed into a film.

In addition, when the content of the aliphatic carboxylic acid (C) in terms of carboxylic acid ion is from 0.001 ppm to 450 ppm with respect to the total sum of the contents of the ethylene-vinyl alcohol copolymer (A), the acetic acid and/or the salt thereof (B), the aliphatic carboxylic acid (C), and the aliphatic carboxylic acid metal salt (D), the EVOH resin composition is more excellent in impact resistance when formed into a film, and is also excellent in color tone stability.

In addition, when the content of the acetic acid and/or the salt thereof (B) in terms of acetic acid ion is from 10 ppm to 2,000 ppm with respect to the total sum of the contents of the ethylene-vinyl alcohol copolymer (A), the acetic acid and/or the salt thereof (B), the aliphatic carboxylic acid (C), and the aliphatic carboxylic acid metal salt (D), the EVOH resin composition is more excellent in impact resistance and adhesive strength when formed into a film, and is also excellent in color tone stability.

In addition, when the ratio (content of acetic acid and/or salt thereof (B) in terms of acetic acid ion/content of aliphatic carboxylic acid (C) in terms of carboxylic acid ion) of the content of the acetic acid and/or the salt thereof (B) in terms of acetic acid ion to the content of the aliphatic carboxylic acid (C) in terms of carboxylic acid ion is from 0.0001 to 10,000 on a weight basis, the EVOH resin composition is more excellent in impact resistance when formed into a film, and is also excellent in color tone stability.

In addition, when the elongation viscosity of the ethylene-vinyl alcohol copolymer resin composition at 210° C.; and $100 \text{ s}^{-1}$ satisfies the following formula (3), the composition is more excellent in impact resistance when formed into a film.

$$500 \le \text{elongation viscosity [Pa·s]} \le 48{,}000 \quad (3)$$

In addition, when the ethylene-vinyl alcohol copolymer resin composition further includes phosphoric acid and/or a salt thereof (E), and the content of the phosphoric acid and/or the salt thereof (E) in terms of phosphorus is 900 ppm or less with respect to the total sum of the contents of the ethylene-vinyl alcohol copolymer (A), the acetic acid and/or the salt thereof (B), the aliphatic carboxylic acid (C), the aliphatic carboxylic acid metal salt (D), and the phosphoric acid and/or the salt thereof (E), the composition is more excellent in impact resistance when formed into a film, and is also excellent in color tone stability.

When the ethylene-vinyl alcohol copolymer resin composition further includes boric acid and/or a salt thereof (F), and satisfies the following formula (4) on a weight basis, the composition is excellent in impact resistance and adhesive strength when formed into a film, and is also excellent in flow stability and color tone stability.

$$0.11 \le (\text{content of } (D) \text{ in terms of metal ion/content of } (F) \text{ in terms of boron}) \le 100 \quad (4)$$

When the ethylene-vinyl alcohol copolymer (A) is two or more kinds of ethylene-vinyl alcohol copolymers having different ethylene structural unit contents, the EVOH resin composition is excellent in impact resistance and adhesive strength when formed into a film, and is also excellent in color tone stability and secondary formability.

When the ethylene-vinyl alcohol copolymer having the highest ethylene structural unit content and the ethylene-vinyl alcohol copolymer having the lowest ethylene structural unit content in the two or more kinds of ethylene-vinyl alcohol copolymers (A) having different ethylene structural unit contents differ from each other in ethylene structural unit content by 3 mol % or more, the EVOH resin composition is more excellent in secondary formability.

When the ethylene-vinyl alcohol copolymer (A) is an ethylene-vinyl alcohol copolymer containing a structural unit (i) having a primary hydroxy group in a side chain thereof, the EVOH resin composition is excellent in impact resistance and adhesive strength when formed into a film, and is also excellent in color tone stability and stretchability.

When the structural unit (i) is a structural unit represented by the following general formula (i-1), the EVOH resin composition is more excellent in stretchability and gas barrier property:

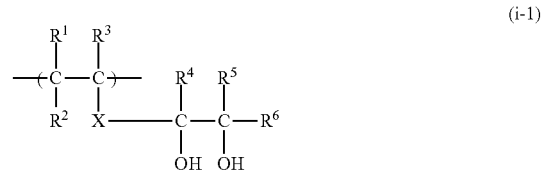

(i-1)

where $R^1$, $R^2$, and $R^3$ each independently represent a hydrogen atom or an organic group, X represents a single bond or a bonding chain, and $R^4$, $R^5$, and $R^6$ each independently represent a hydrogen atom or an organic group.

When the ethylene-vinyl alcohol copolymer resin composition further includes cinnamic acid and/or a salt thereof (G), and satisfies the following formula (5) on a weight basis, the composition is excellent in impact resistance and adhesive strength when formed into a film, and is also excellent in color tone stability and light fastness.

$$0.015 \le (\text{content of } (D) \text{ in terms of metal ion/content of } (G) \text{ in terms of cinnamic acid ion}) \le 50 \quad (5)$$

When the ethylene-vinyl alcohol copolymer resin composition further includes a styrene thermoplastic elastomer (H) free of any polar group and a styrene thermoplastic elastomer (I) containing a polar group, and satisfies the following formula (6) on a weight basis, the composition is excellent in impact resistance and bending resistance when formed into a film, and is also excellent in color tone stability.

$$30 \leq (\text{content of } (I)/\text{content of } (D) \text{ in terms of metal ion}) \leq 2{,}900 \quad (6)$$

When the styrene thermoplastic elastomer (H) free of any polar group is a block copolymer having a polymer block (h1) formed of an aromatic vinyl monomer unit, and a polymer block obtained by polymerizing an unsaturated hydrocarbon compound and/or a hydrogenated block thereof (h2), and the styrene thermoplastic elastomer (I) containing the polar group is a modified block copolymer, which has a polymer block (i1) formed of an aromatic vinyl monomer unit, and a polymer block obtained by polymerizing an unsaturated hydrocarbon compound and/or a hydrogenated block thereof (i2), and contains the polar group, the EVOH resin composition is more excellent in bending resistance.

In addition, the multilayer structure, which is obtained by using the EVOH resin composition, is such an excellent multilayer structure that a reduction in mechanical property (impact resistance) occurring in a multilayer structure having the configuration "EVOH resin composition layer/adhesive resin layer" and/or the configuration "EVOH resin composition layer/polyamide layer" is suppressed, and a reduction in color tone stability of the structure at the time of its melt forming and a reduction in adhesive strength thereof are alleviated.

For example, when the multilayer structure comprises at least one resin composition layer (α) formed of the EVOH resin composition, at least one adhesive resin layer (β), and at least one thermoplastic resin layer (δ) formed of a thermoplastic resin other than the resin composition laminated on at least one surface of the resin composition layer (α) with the adhesive resin layer (β) interposed between the resin composition layer (α) and the thermoplastic resin layer (δ), a reduction in mechanical property (impact resistance) of the structure is suppressed, and a reduction in color tone stability thereof at the time of its melt forming and a reduction in adhesive strength thereof are alleviated.

In addition, when a ratio (α)/(β) of from 10/90 to 99/1 and a ratio "(α)/(δ)" of from 1/99 to 50/50 are satisfied, where $\alpha_L$ represents the thickness of the resin composition layer (α) or the thickness of a resin composition layer having the largest thickness among the resin composition layers (α), $\beta_L$ represents the thickness of the adhesive resin layer (β) or the thickness of an adhesive resin layer having the largest thickness among the adhesive resin layers (β), and $\delta_L$ represents the thickness of the thermoplastic resin layer (δ) or the thickness of a thermoplastic resin layer having the largest thickness among the thermoplastic resin layers (δ), a reduction in mechanical property (impact resistance) of the multilayer structure is further suppressed, and a reduction in color tone stability thereof at the time of its melt forming and a reduction in adhesive strength thereof are alleviated.

In addition, when the multilayer structure comprises at least one resin composition layer (α) formed of the EVOH resin composition and at least one polyamide layer (γ) laminated on at least one surface of the EVOH resin composition layer (α), a reduction in mechanical property (impact resistance) of the structure is further suppressed, and a reduction in color tone stability thereof at the time of its melt forming and a reduction in adhesive strength thereof are alleviated.

In addition, when a ratio "(α)/(γ)" of from 10/90 to 99/1 is satisfied, where $\alpha_L$ represents the thickness of the resin composition layer (α) or the thickness of a resin composition layer having the largest thickness among the resin composition layers (α), and $\gamma_L$ represents the thickness of the polyamide layer (γ) or the thickness of a polyamide layer having the largest thickness among the polyamide layers (γ), a reduction in mechanical property (impact resistance) of the multilayer structure is further suppressed, and a reduction in color tone stability thereof at the time of its melt forming and a reduction in adhesive strength thereof are alleviated.

In addition, the multilayer structure, which is obtained by using the EVOH resin composition, is a multilayer structure, which is suppressed in reduction in mechanical property (impact resistance) even when layers outside and inside its EVOH resin composition layer are arranged at asymmetric positions, and is excellent in gas barrier property.

Further, the package of the present disclosure includes the multilayer structure, and hence, similarly, the package to be obtained is excellent in impact resistance and adhesive strength, and is also excellent in color tone stability.

DESCRIPTION OF EMBODIMENTS

The present disclosure is described in detail below. However, the following description describes an example of a desired embodiment of the present disclosure.

An EVOH resin composition of the present disclosure includes an EVOH (A) as a main component, and includes acetic acid and/or a salt thereof (B), an aliphatic carboxylic acid (C) other than acetic acid, and an aliphatic carboxylic acid metal salt (D) that is a metal salt of the aliphatic carboxylic acid (C). The base resin of the EVOH resin composition of the present disclosure is the EVOH (A), and the content of the EVOH (A) in the EVOH resin composition is typically 60 wt. % or more, preferably 70 wt. % or more, more preferably 80 wt. % or more, particularly preferably 90 wt. % or more.

The features of the EVOH resin composition of the present disclosure lie not only in the above-mentioned first mode but also in: a "second mode" in which the composition further includes boric acid and/or a salt thereof (F), and satisfies the formula (4); a "third mode" in which the component (A) is two or more kinds of EVOHs having different ethylene structural unit contents; a "fourth mode" in which the composition further includes cinnamic acid and/or a salt thereof (G), and satisfies the formula (5); a "fifth mode" in which the composition further includes a styrene thermoplastic elastomer (H) free of any polar group and a styrene thermoplastic elastomer (I) containing a polar group, and satisfies the formula (6); and a "sixth mode" in which the component (A) is an EVOH containing a structural unit (i) having a primary hydroxy group in a side chain thereof.

The respective constituent components are described below.

The term "and/or" as used herein means at least one of those described on the left and right sides of the term, and in, for example, the case of the term "X and/or Y", the term has the following three meanings: X alone, Y alone, and X and Y.

<EVOH (A)>

In ordinary cases, the EVOH (A) to be used in the present disclosure is a resin obtained by copolymerizing ethylene and a vinyl ester monomer, and then saponifying the copolymer, and is a water-insoluble thermoplastic resin known as an ethylene-vinyl alcohol copolymer or an ethylene-vinyl acetate copolymer saponified product. An arbitrary known polymerization method, such as solution polymerization, suspension polymerization, or emulsion polymerization, may be used as a polymerization method. In general, however, solution polymerization involving using methanol as a solvent is used. The saponification of the resultant ethylene-vinyl ester copolymer may also be performed by a known method.

That is, the EVOH (A) to be used in the present disclosure contains an ethylene structural unit and a vinyl alcohol structural unit as main components, and contains a certain amount of a vinyl ester structural unit, which remains without being saponified. In general, the EVOH is also referred to as "ethylene-vinyl ester copolymer saponified product."

Vinyl acetate is typically used as the vinyl ester monomer because vinyl acetate is easily available from the market, and impurities can be treated with satisfactory efficiency at the time of its production. Other examples of the vinyl ester monomer include aliphatic vinyl esters, such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters, such as vinyl benzoate. Of those, the vinyl ester monomer is an aliphatic vinyl ester having preferably 3 to 20 carbon atoms, more preferably 4 to 10 carbon atoms, particularly preferably 4 to 7 carbon atoms. Those vinyl ester monomers are typically used alone, but may be used in combination thereof as required.

The content of the ethylene structural unit in the EVOH (A) is a value measured on the basis of ISO 14663, and is typically from 20 mol % to 60 mol %, preferably from 21 mol % to 55 mol %, more preferably from 22 mol % to 50 mol %, particularly preferably from 23 mol % to 45 mol %. When such content is excessively small, the gas barrier property of the resin composition at the time of high humidity or the melt formability thereof tends to reduce. In contrast, when the content is excessively large, the gas barrier property thereof tends to reduce.

The saponification degree of a vinyl ester component in the EVOH (A) is a value measured on the basis of JIS K6726 (provided that the EVOH is turned into a solution by being uniformly dissolved in a mixed solvent of water and methanol), and is typically from 90 mol % to 100 mol %, preferably from 95 mol % to 100 mol %, particularly preferably from 99 mol % to 100 mol %. When such saponification degree is excessively low, the gas barrier property, thermal stability, moisture resistance, or the like of the resin composition tends to reduce.

In addition, the melt flow rate (MFR) (210° C., load: 2,160 g) of the EVOH (A) is typically from 0.5 g/10 min to 100 g/10 min, preferably from 1 g/10 min to 50 g/10 min, particularly preferably from 3 g/10 min to 35 g/10 min. When such MFR is excessively high, the film formability of the resin composition tends to reduce. In addition, when the MFR is excessively low, it tends to be difficult to perform the melt extrusion of the resin composition.

The EVOH (A) to be used in the present disclosure may further contain a structural unit derived from any one of the following comonomers in addition to the ethylene structural unit and the vinyl alcohol structural unit (including an unsaponified vinyl ester structural unit). Examples of the comonomer include: α-olefins, such as propylene, isobutene, α-octene, α-dodecene, and α-octadecene; hydroxy group-containing α-olefins, such as 3-buten-1-ol, 4-penten-1-ol, and 3-butene-1,2-diol, and hydroxy group-containing α-olefin derivatives, such as esterified products or acylated products of the α-olefins; hydroxymethylvinylidene diacetates, such as 1,3-diacetoxy-2-methylenepropane, 1,3-dipropionyloxy-2-methylenepropane, and 1,3-dibutyronyloxy-2-methylenepropane; an unsaturated carboxylic acid or a salt, partial alkyl ester, full alkyl ester, nitrile, amide, or anhydride thereof; an unsaturated sulfonic acid or a salt thereof; a vinylsilane compound; vinyl chloride; and styrene.

Further, an EVOH subjected to "post-modification", such as urethanation, acetalation, cyanoethylation, or oxyalkylenation, may be used as the EVOH (A).

In addition, out of such modified EVOHs (A) as described above, the EVOH (A) having a primary hydroxy group introduced into a side chain thereof by copolymerization is preferred because the secondary formability of the EVOH resin composition at the time of, for example, its stretching treatment or vacuum-pressure forming becomes satisfactory, and in particular, the EVOH (A) having a 1,2-diol structure in a side chain thereof is preferred.

In addition, the EVOH (A) to be used in the present disclosure may be a mixture with any other different EVOH. Examples of such other EVOH may include: an EVOH different from the EVOH (A) in ethylene structural unit content; an EVOH different therefrom in saponification degree; an EVOH different therefrom in melt flow rate (MFR) (210° C., load: 2,160 g); an EVOH having a copolymerizable component other than ethylene and the vinyl ester monomer different from that of the EVOH (A); and an EVOH different therefrom in modification amount (e.g., an EVOH different therefrom in content of a structural unit containing a primary hydroxy group in a side chain thereof).

<Acetic Acid and/or Salt Thereof (B)>

The EVOH resin composition of the present disclosure includes the acetic acid and/or the salt thereof (B). That is, the EVOH resin composition of the present disclosure includes at least one kind selected from the group consisting of acetic acid and acetic acid salts.

Specific examples of the acetic acid and/or the salt thereof (B) may include acetic acid, sodium acetate, potassium acetate, calcium acetate, magnesium acetate, manganese acetate, copper acetate, cobalt acetate, and zinc acetate. Those compounds may be used alone or in combination thereof. Of those, acetic acid, sodium acetate, potassium acetate, calcium acetate, and magnesium acetate are preferred, acetic acid, sodium acetate, and potassium acetate are more preferred, acetic acid and sodium acetate are particularly preferred, and sodium acetate is further particularly preferred.

The content of the acetic acid and/or the salt thereof (B) in terms of acetic acid ion is typically from 10 ppm to 2,000 ppm, preferably from 15 ppm to 1,500 ppm, particularly preferably from 20 ppm to 1,000 ppm, further particularly preferably from 25 ppm to 650 ppm with respect to the total sum of the contents of the EVOH (A), the acetic acid and/or the salt thereof (B), the aliphatic carboxylic acid (C), and the aliphatic carboxylic acid metal salt (D).

When such content is excessively small, there is a tendency that the adhesive strength of the EVOH resin composition is reduced by the thermally decomposed product of the aliphatic carboxylic acid metal salt (D), or the effects of the present disclosure are not sufficiently obtained. When the content is excessively large, there is a tendency that the color tone stability thereof at the time of its melt forming is liable to reduce, or the effects of the present disclosure are not sufficiently obtained.

The content of the acetic acid and/or the salt thereof (B) in terms of acetic acid ion may be measured by a known analysis method. For example, the content may be measured by using liquid chromatography-mass spectrometry (LC/MS) or gas chromatography-mass spectrometry (GC/MS).

<Aliphatic Carboxylic Acid (C) Other than Acetic Acid>

The EVOH resin composition of the present disclosure includes the aliphatic carboxylic acid (C) other than acetic acid. The number of carbon atoms of the aliphatic carboxylic acid (C) is typically from 3 to 30, preferably from 4 to 22, more preferably from 4 to 20, particularly preferably from 5 to 14. When the number of carbon atoms of the aliphatic carboxylic acid (C) falls within the ranges, the effects of the present disclosure tend to be more effectively obtained.

Specific examples of the aliphatic carboxylic acid (C) include an aliphatic monocarboxylic acid, an aliphatic dicarboxylic acid, and an aliphatic tricarboxylic acid. More specific examples thereof include: saturated aliphatic monocarboxylic acids, such as butyric acid, valeric acid, caproic acid, enanthic acid, caprylic acid, pelargonic acid, capric acid, lauric acid, myristic acid, pentadecylic acid, palmitic acid, margaric acid, stearic acid, arachidic acid, heneicosylic acid, behenic acid, lignoceric acid, montanoic acid, melissic acid, tartronic acid, glyceric acid, hydroxybutyric acid, malic acid, tartaric acid, gluconic acid, mevalonic acid, and pantoic acid; unsaturated aliphatic monocarboxylic acids, such as linoleic acid, linolenic acid, pinolenic acid, eleostearic acid, isostearic acid, isononanoic acid, 2-ethylhexanoic acid, 2-heptylundecanoic acid, 2-octyldodecanoic acid, palmitoleic acid, sapienic acid, oleic acid, elaidic acid, vaccenic acid, gadoleic acid, eicosenoic acid, erucic acid, nervonic acid, and ricinoleic acid; saturated aliphatic dicarboxylic acids, such as succinic acid, adipic acid, pimelic acid, suberic acid, azelaic acid, and sebacic acid; unsaturated aliphatic dicarboxylic acids, such as eicosadienoic acid and docosadienoic acid; and saturated aliphatic tricarboxylic acids, such as citric acid, isocitric acid, and aconitic acid. Those aliphatic carboxylic acids (C) may be used alone or in combination thereof. Of those, an aliphatic monocarboxylic acid containing one carboxy group is preferred, a saturated aliphatic monocarboxylic acid is more preferred, a saturated aliphatic monocarboxylic acid having 6 to 22 carbon atoms is still more preferred, stearic acid, caproic acid, caprylic acid, lauric acid, and behenic acid are particularly preferred, and caproic acid, caprylic acid, and lauric acid are further particularly preferred from the viewpoint of thermal stability (prevention of viscosity increase and fish eye generation at the time of melt forming).

The content of the aliphatic carboxylic acid (C) in terms of carboxylic acid ion is typically from 0.001 ppm to 950 ppm, preferably from 0.001 ppm to 450 ppm, more preferably from 0.01 ppm to 350 ppm, particularly preferably from 0.1 ppm to 250 ppm, further particularly preferably from 0.5 ppm to 200 ppm with respect to the total sum of the contents of the EVOH (A), the acetic acid and/or the salt thereof (B), the aliphatic carboxylic acid (C), and the aliphatic carboxylic acid metal salt (D).

When such content is excessively small, there is a tendency that the thermal stability of the aliphatic carboxylic acid metal salt (D) becomes insufficient, and as a result, the effects of the present disclosure are not sufficiently obtained. When the content is excessively large, there is a tendency that the color tone stability of the EVOH resin composition at the time of its melt forming is liable to reduce, or the aliphatic carboxylic acid (C) itself acts as a plasticizer to make it impossible to sufficiently obtain the effects of the present disclosure.

The ratio (content of acetic acid and/or salt thereof (B) in terms of acetic acid ion/content of aliphatic carboxylic acid (C) in terms of carboxylic acid ion) of the content of the acetic acid and/or the salt thereof (B) in terms of acetic acid ion to the content of the aliphatic carboxylic acid (C) in terms of carboxylic acid ion is typically from 0.0001 to 10,000, preferably from 0.001 to 5,000, more preferably from 0.1 to 1,000, particularly preferably from 1 to 650, further particularly preferably from 1 to 600 on a weight basis.

When such content ratio falls within the above-mentioned ranges, the effects of the present disclosure tend to be more significantly obtained. When the ratio falls short of the ranges, there is a tendency that the color tone stability of the EVOH resin composition at the time of its melt forming is insufficient, or the adhesive strength thereof becomes insufficient. When the ratio exceeds the ranges, there is a tendency that the effects of the present disclosure are not sufficiently obtained.

<Aliphatic Carboxylic Acid Metal Salt (D)>

The EVOH resin composition of the present disclosure includes the aliphatic carboxylic acid metal salt (D) that is the metal salt of the aliphatic carboxylic acid (C) other than acetic acid.

The metal species of the aliphatic carboxylic acid metal salt (D) needs to be an element belonging to the d-block of the 4th period in the long Periodic Table. Of such elements, chromium, cobalt, nickel, copper, or zinc is preferred, and zinc is particularly preferred because zinc provides a particularly excellent effect, and is easily available at low cost.

Although the reason why the use of the aliphatic carboxylic acid metal salt (D) provides an excellent effect is unclear, the following assumption is made. When the metal species of the aliphatic carboxylic acid metal salt (D) is at least one kind selected from the long Periodic Table 4th-period d-block elements, excessive thermal decomposition of the salt causing a reduction in mechanical property (impact resistance) of the EVOH resin composition is moderately suppressed, and a higher-order structure, such as molecular orientation or a crystal structure, to be formed at the time of the multilayer coextrusion of the EVOH resin composition is uniformized to a high degree. Accordingly, as a result, the mechanical property (impact resistance) is improved.

Although the anion species given as examples of the aliphatic carboxylic acid (C) other than acetic acid may each be used as the anion species of the aliphatic carboxylic acid metal salt (D), in the present disclosure, it is important that the anion species of the aliphatic carboxylic acid metal salt (D) and the aliphatic carboxylic acid (C) be of the same species. When the anion species of the aliphatic carboxylic acid metal salt (D) and the aliphatic carboxylic acid (C) are of the same species, an EVOH resin composition, which is excellent in impact resistance and shows higher color tone stability even at the time of its melt forming, can be obtained.

When the EVOH resin composition of the present disclosure includes the plurality of aliphatic carboxylic acids (C) or the plurality of aliphatic carboxylic acid metal salts (D), at least one kind of the aliphatic carboxylic acids (C) and the anion species of at least one kind of the aliphatic carboxylic acid metal salts (D) only need to be of the same species.

Although the reason why an excellent effect is obtained when the aliphatic carboxylic acid (C) and the anion species of the aliphatic carboxylic acid metal salt (D) are of the same species is unclear, it is assumed that when specific amounts of the aliphatic carboxylic acid (C) and the aliphatic carboxylic acid metal salt (D) are used in combination, the dispersibility of the aliphatic carboxylic acid metal salt (D) is significantly improved, and hence more excellent effects of the present disclosure are obtained. In addition, the following assumption is made. The aliphatic carboxylic acid (C) may interact with the metal species of the aliphatic carboxylic acid metal salt (D) to exist under a state like a metal complex. When the anion species of such aliphatic carboxylic acid metal salt (D) is of the same species as the aliphatic carboxylic acid (C), the metal complex can exist under a state that is more stable in terms of energy, and hence the metal complex is excellent in thermal stability even at the time of its melt forming. As a result, the mechanical property (impact resistance) of the EVOH resin composition is improved.

In addition, when the number of carbon atoms of each of the aliphatic carboxylic acid (C) and the aliphatic carboxylic acid metal salt (D) is typically from 3 to 30, preferably from 4 to 22, more preferably from 4 to 20, particularly preferably from 5 to 14, the mechanical property (impact resistance) tends to be more significantly improved. Although the reason for the foregoing is unclear, the following assumption is made. When the number of carbon atoms of each of the aliphatic carboxylic acid (C) and the aliphatic carboxylic acid metal salt (D) falls within the ranges, the aliphatic carboxylic acid (C) and the aliphatic carboxylic acid metal salt (D) are easily dispersed in the EVOH resin composition in a more uniform manner. Accordingly, as a result, the mechanical property (impact resistance) of the EVOH resin composition is more significantly improved.

In addition, when the aliphatic carboxylic acid metal salt (D) is used alone, the adhesive strength of the EVOH resin composition tends to reduce, though the impact resistance thereof is improved. Although the reason for the foregoing is unclear, it is assumed that when the aliphatic carboxylic acid metal salt (D) is used alone, the thermal stability of the salt itself is insufficient, and hence the adhesive strength is reduced by the thermally decomposed product of the aliphatic carboxylic acid metal salt (D) produced at the time of its melt forming. In contrast, in the present disclosure, the aliphatic carboxylic acid metal salt (D) and the acetic acid and/or the salt thereof (B) are used in combination. Accordingly, it is assumed that the thermally decomposed product of the aliphatic carboxylic acid metal salt (D) is dispersed in the composition while being captured by the acetic acid and/or the salt thereof (B), and hence a reduction in adhesive strength is suppressed.

The content of the aliphatic carboxylic acid metal salt (D) in terms of metal ion is typically from 1 ppm to 500 ppm, preferably from 5 ppm to 300 ppm, more preferably from 10 ppm to 250 ppm, particularly preferably from 10 ppm to 200 ppm, further particularly preferably from 30 ppm to 150 ppm with respect to the total sum of the contents of the EVOH (A), the acetic acid and/or the salt thereof (B), the aliphatic carboxylic acid (C), and the aliphatic carboxylic acid metal salt (D). When the content of the aliphatic carboxylic acid metal salt (D) is excessively small, there is a tendency that the effects of the present disclosure are not sufficiently obtained. When the content is excessively large, there is a tendency that the adhesive strength of the EVOH resin composition reduces, or the color tone stability thereof at the time of its melt forming is liable to reduce.

The content of the aliphatic carboxylic acid (C) in terms of carboxylic acid ion and the content of the aliphatic carboxylic acid metal salt (D) in terms of metal ion may each be measured by a known analysis method. For example, the contents may be determined by using such methods as described below alone or in combination thereof.

(i) Content of aliphatic carboxylic acid metal salt (D) in terms of metal ion: A dry sample is precisely weighed, and is loaded into a platinum evaporating dish whose weight has been made constant, followed by carbonization with an electric heater. Next, the carbonized product is heated with a gas burner, and is baked until no smoke occurs. Further, the platinum evaporating dish is loaded into an electric furnace, and a temperature in the furnace is increased to completely ash the baked product. The ashed product is cooled, and then hydrochloric acid and pure water are added thereto, followed by heating with an electric heater to dissolve the ashed product in the mixture. The solution is poured into a measuring flask, and its volume is made constant with pure water. Thus, a sample for atomic absorption analysis is obtained. The amount of a metal in the sample for atomic absorption analysis is subjected to quantitative analysis by atomic absorption spectrophotometry. Thus, the content of the aliphatic carboxylic acid metal salt (D) in terms of metal ion can be determined.

(ii) Content of aliphatic carboxylic acid (C) in terms of carboxylic acid ion: First, the total sum (Cx) of the contents of the aliphatic carboxylic acid (C) and the metal salt (D) thereof in the EVOH resin composition in terms of carboxylic acid ion is determined by using, for example, liquid chromatography-mass spectrometry (LC/MS) or gas chromatography-mass spectrometry (GC/MS). After that, the content (Cy) of the aliphatic carboxylic acid metal salt (D) in terms of carboxylic acid ion is calculated from the content of the aliphatic carboxylic acid metal salt (D) in terms of metal ion described in the foregoing. Then, the content of the aliphatic carboxylic acid (C) in terms of carboxylic acid ion can be determined from a difference ((Cx)−(Cy)) between the total sum (Cx) of the contents of the aliphatic carboxylic acid (C) and the metal salt (D) thereof in terms of carboxylic acid ion, and the content (Cy) of the aliphatic carboxylic acid metal salt (D) in terms of carboxylic acid ion.

In the EVOH resin composition of the present disclosure, the ratio ((D)/(B)) of the content of the aliphatic carboxylic acid metal salt (D) in terms of metal ion to the content of the acetic acid and/or the salt thereof (B) in terms of acetic acid ion satisfies the following formula (1) on a weight basis.

$$0.001 \leq (\text{content of } (D) \text{ in terms of metal ion/content of } (B) \text{ in terms of acetic acid ion}) \leq 1.30 \quad (1)$$

The ratio satisfies a relationship of preferably $0.005 \leq ((D)/(B)) \leq 1.1$, more preferably $0.005 \leq ((D)/(B)) \leq 1.0$, still more preferably $0.01 \leq ((D)/(B)) \leq 0.8$, particularly preferably $0.04 \leq ((D)/(B)) \leq 0.48$, further particularly preferably $0.05 \leq ((D)/(B)) \leq 0.45$. When such value falls within the ranges, the effects of the present disclosure tend to be more significantly obtained. When the value falls short of the ranges, there is a tendency that the effects of the present disclosure are not sufficiently obtained. When the value exceeds the ranges, there is a tendency that the color tone stability of the composition at the time of its melt forming is insufficient, or the adhesive strength thereof becomes insufficient.

In the EVOH resin composition of the present disclosure, the ratio ((D)/(C)) of the content of the aliphatic carboxylic acid metal salt (D) in terms of metal ion to the content of the aliphatic carboxylic acid (C) in terms of carboxylic acid ion satisfies the following formula (2) on a weight basis.

$$0.11 \leq (\text{content of } (D) \text{ in terms of metal ion/content of } (C) \text{ in terms of carboxylic acid ion}) \leq 100 \quad (2)$$

The ratio satisfies a relationship of preferably $0.13 \leq ((D)/(C)) \leq 90$, particularly preferably $0.15 \leq ((D)/(C)) \leq 80$, further particularly preferably $0.2 \leq ((D)/(C)) \leq 70$. When such value falls within the ranges, the effects of the present disclosure tend to be more significantly obtained. When the value falls short of the ranges, there is a tendency that the color tone stability of the composition at the time of its melt forming is insufficient, or the effects of the present disclosure are not sufficiently obtained. When the value exceeds the ranges, there is a tendency that the color tone stability of the composition at the time of its melt forming is insufficient, or the formability thereof becomes insufficient.

Although the reason why an excellent effect is obtained when the contents of the acetic acid and/or the salt thereof (B), the aliphatic carboxylic acid (C), and the aliphatic carboxylic acid metal salt (D) satisfy the formulae (1) and (2) on a weight basis is unclear, the following assumption is made. While a specific amount of the aliphatic carboxylic acid (C) whose anion species is of the same species as the aliphatic carboxylic acid metal salt (D) has improving effects on the dispersibility and thermal stability of the aliphatic carboxylic acid metal salt (D), when the content of the aliphatic carboxylic acid (C) is excessively large, the aliphatic carboxylic acid (C) itself acts as a plasticizer, and hence the effect (impact resistance-improving effect) of the present disclosure is not sufficiently obtained. In addition, the following assumption is made. While a specific amount of the acetic acid and/or the salt thereof (B) captures the thermally decomposed product of the aliphatic carboxylic acid metal salt (D) to exhibit a suppressing effect on a reduction in adhesive strength of the EVOH resin composition, when the content of the acetic acid and/or the salt thereof (B) is excessively large, the thermal stability of the EVOH (A) is significantly reduced, and hence the color tone stability of the composition is liable to reduce, or the effect (impact resistance-improving effect) of the present disclosure is not sufficiently obtained.

In addition, the elongation viscosity of the EVOH resin composition of the present disclosure at 210° C.; and 100 s$^{-1}$ preferably satisfies the following formula (3) from the viewpoint of its impact resistance.

$$500 \leq \text{elongation viscosity [Pa·s]} \leq 48{,}000 \quad (3)$$

The elongation viscosity satisfies a relationship of more preferably $700 \leq \text{elongation viscosity [Pa·s]} \leq 30{,}000$, particularly preferably $800 \leq \text{elongation viscosity [Pa·s]} \leq 20{,}000$, further particularly preferably $850 \text{ elongation viscosity [Pa·s]} \leq 20{,}000$. When such value falls within the ranges, the effects of the present disclosure tend to be more significantly obtained. When the value falls short of the ranges, there is a tendency that the effects of the present disclosure are not sufficiently obtained. When the value exceeds the ranges, the formability of the composition at the time of its melt forming tends to be insufficient.

Although the reason why an excellent effect is obtained when the elongation viscosity of the EVOH resin composition of the present disclosure at 210° C.; and 100 s$^{-1}$ satisfies the formula (3) is unclear, it is assumed that when the elongation viscosity of the EVOH resin composition of the present disclosure at 210° C.; and 100 s$^{-1}$ satisfies the formula (3), the entangled structure of EVOH molecular chains moderately formed in the EVOH resin composition more significantly accelerates the formation of the higher-order structure of the EVOH resin composition, such as molecular orientation or a crystal structure, at the time of the multilayer coextrusion of the EVOH resin composition, and hence, as a result, the mechanical property (impact resistance) of the composition is significantly improved.

<Method of Evaluating Elongation Viscosity (Pa·s) of EVOH Resin Composition>

The elongation viscosity (Pa·s) of the EVOH resin composition of the present disclosure at 210° C.; and 100 s$^{-1}$ may be determined by performing measurement with a capillary-type rheometer on the basis of Cogswell's equations [Polymer Engineering Science, vol. 12, pp. 64 to 73 (1972)] under the following conditions.

That is, an elongation viscosity (Ie) and an elongation strain rate (dε/dt) can be calculated by using the following equations (I4) to (I6) proposed by Cogswell (Polymer Engineering Science, vol. 12, pp. 64 to 73 (1972)):

$$\eta_e = [9(n+1)^2 P_0^2]/[32\eta_s(d\gamma/dt)^2] \quad \text{Equation (14)}$$

$$d\varepsilon/dt = 4\sigma_s(d\gamma/dt)/[3(n+1)P_0] \quad \text{Equation (15)}$$

$$\sigma_s = k(d\gamma/dt)^n \quad \text{Equation (16)}$$

where rye represents an elongation viscosity, $\eta_s$ represents a shear viscosity, $d\gamma/dt$ represents a shear strain rate, $d\varepsilon/dt$ represents an elongation strain rate, $\alpha_s$ represents a shear stress, "k" represents a constant, an exponent "n" is determined by performing fitting with a quadratic function on the assumption that a shear stress and a shear strain rate in a shear rate region ($100 \leq d\gamma/dt \leq 1{,}000$) where melt fracture or stick slipping does not occur follow a power law, and $P_0$ represents a pressure loss occurring in a die having a capillary length of 0, and is determined by the Bagley correction of measurement results obtained by using two or more capillaries having different lengths.

Measuring apparatus: RHEOGRAPH 20 manufactured by Gottfert Werkstoff-Prufmaschinen GmbH Measurement temperature: 210° C.

Long die: die having a length of 10 mm, a diameter of 1 mm, and an inlet angle of 180°

Short die: die having a length of 0.2 mm, a diameter of 1 mm, and an inlet angle of 180°

<Phosphoric Acid and/or Salt Thereof (E)>

The EVOH resin composition of the present disclosure preferably further includes phosphoric acid and/or a salt thereof (E) from the viewpoints of its impact resistance and color tone stability. That is, the EVOH resin composition of the present disclosure preferably includes at least one kind selected from the group consisting of phosphoric acid and phosphoric acid salts.

Specific examples of the phosphoric acid and/or the salt thereof (E) may include phosphoric acid, sodium dihydrogen phosphate, disodium hydrogen phosphate, potassium dihydrogen phosphate, dipotassium hydrogen phosphate, tripotassium phosphate, calcium monohydrogen phosphate, calcium dihydrogen phosphate, tricalcium phosphate, magnesium phosphate, magnesium hydrogen phosphate, magnesium dihydrogen phosphate, zinc hydrogen phosphate, barium hydrogen phosphate, and manganese hydrogen phosphate. Those compounds may be used alone or in combination thereof. Of those, phosphoric acid, sodium dihydrogen phosphate, potassium dihydrogen phosphate, calcium dihydrogen phosphate, magnesium dihydrogen phosphate, and zinc hydrogen phosphate are preferred, phosphoric acid, sodium dihydrogen phosphate, calcium dihydrogen phosphate, and magnesium dihydrogen phosphate are particularly preferred, and phosphoric acid is further particularly preferred.

The content of the phosphoric acid and/or the salt thereof (E) in terms of phosphorus is preferably 900 ppm or less, more preferably from 0.01 ppm to 700 ppm, still more preferably from 0.1 ppm to 500 ppm, particularly preferably from 1 ppm to 300 ppm with respect to the total sum of the contents of the EVOH (A), the acetic acid and/or the salt thereof (B), the aliphatic carboxylic acid (C), the aliphatic carboxylic acid metal salt (D), and the phosphoric acid and/or the salt thereof (E).

When such content is excessively large, there is a tendency that a fish eye frequently occurs in the EVOH resin composition at the time of its multilayer film formation to make it impossible to sufficiently obtain the effect (impact resistance-improving effect) of the present disclosure.

In addition, although the reason why the use of a specific amount of the phosphoric acid and/or the salt thereof (E) provides an excellent effect is unclear, it is assumed that the phosphoric acid and/or the salt thereof (E) captures the thermally decomposed product of the aliphatic carboxylic acid metal salt (D) and the thermally decomposed product of the EVOH (A), which have not been completely captured by the acetic acid and/or the salt thereof (B), to significantly suppress reductions in impact resistance, adhesive strength, and color tone of the EVOH resin composition.

The content of the phosphoric acid and/or the salt thereof (E) in terms of phosphorus may be measured by a known analysis method. For example, the content may be determined by using such methods as described below alone or in combination thereof.

(i) Phosphoric acid: The EVOH resin composition is extracted with hot dilute sulfuric acid, and then the amount of its phosphoric acid radical is determined by absorption spectrophotometry (molybdenum blue).

(ii) Phosphoric acid salt: A dry sample is precisely weighed, and is loaded into a platinum evaporating dish whose weight has been made constant, followed by carbonization with an electric heater. Next, the carbonized product is heated with a gas burner, and is baked until no smoke occurs. Further, the platinum evaporating dish is loaded into an electric furnace, and a temperature in the furnace is increased to completely ash the baked product. The ashed product is cooled, and then hydrochloric acid and pure water are added thereto, followed by heating with an electric heater to dissolve the ashed product in the mixture. The solution is poured into a measuring flask, and its volume is made constant with pure water. Thus, a sample for atomic absorption analysis is obtained. The amount of a metal in the sample for atomic absorption analysis is subjected to quantitative analysis by atomic absorption spectrophotometry. Thus, the amount of a phosphoric acid salt is determined.

<Other Thermoplastic Resin>

The EVOH resin composition of the present disclosure may contain any other thermoplastic resin as a resin component in addition to the EVOH (A) at a content typically in the range of 30 wt. % or less with respect to the EVOH (A).

Examples of the other thermoplastic resin include: linear low-density polyethylene, low-density polyethylene, medium-density polyethylene, high-density polyethylene, an ionomer, a homopolymer or copolymer of an olefin, such as an ethylene-propylene copolymer, polypropylene, polybutene, or polypentene, a polycyclic olefin, or a polyolefin resin in a broad sense, such as a polyolefin resin obtained by graft-modifying such homopolymer or copolymer of an olefin with an unsaturated carboxylic acid or an ester thereof, a polystyrene resin, polyester, a polyamide resin, a copolymerized polyamide resin, polyvinyl chloride, polyvinylidene chloride, an acrylic resin, a vinyl ester resin, chlorinated polyethylene, and chlorinated polypropylene.

The α-olefin of the polyolefin resin may be a plant-derived α-olefin derived from bioethanol, or may be a non-plant-derived, that is, petroleum-derived α-olefin, or these α-olefins may be used in combination thereof. A wide variety of α-olefins are each available as the petroleum-derived α-olefin, and hence the production of the polyolefin resin through use of any such α-olefin enables easy adjustment of the physical properties and the like of the resin. The use of the plant-derived α-olefin can further improve the biomass content of the final product, and hence can reduce an environmental load.

With regard to methods of producing plant-derived ethylene and the plant-derived α-olefin, the plant-derived ethylene and the plant-derived α-olefin (e.g., 1-butene or 1-hexene) may each be obtained as follows: a sugar solution or starch obtained from a plant such as sugarcane, corn, or a sweet potato is fermented with a microorganism such as yeast in accordance with a conventionally used method to produce bioethanol, and the bioethanol is heated in the presence of a catalyst to cause an intramolecular dehydration reaction or the like, thereby providing the ethylene or the α-olefin. Next, a plant-derived polyethylene resin may be produced by using the plant-derived ethylene and the plant-derived α-olefin thus obtained in the same manner as in the production of a petroleum-derived polyethylene resin.

Methods of producing the plant-derived ethylene, the plant-derived α-olefin, and the plant-derived polyethylene resin are described in detail in, for example, JP-A-2011-506628. The plant-derived polyethylene resin to be suitably used in the present disclosure is, for example, GREEN PE manufactured by Braskem S.A.

In particular, when a multilayer structure obtained by using the EVOH resin composition of the present disclosure is produced, and is used as a food packaging material, a polyamide resin is preferably blended for the purpose of preventing the elution of an EVOH layer in an end portion of the packaging material after the hot water treatment of the packaging material. An amide bond of the polyamide resin can form a network structure through an interaction with at least one of a OH group and an ester group of the EVOH, and hence the resin can prevent the elution of the EVOH layer at the time of the hot water treatment. Accordingly, when the EVOH resin composition of the present disclosure is used as a packaging material for retort food or boiled food, the polyamide resin is preferably blended.

A known polyamide resin may be used as the polyamide resin.

Specific examples thereof include homopolymers such as polycapramide (nylon 6), poly-ω-aminoheptanoic acid (nylon 7), poly-ca-aminononanoic acid (nylon 9), polyundecanamide (nylon 11), and polylauryllactam (nylon 12). Of those, polycapramide (nylon 6) is preferred. In addition, examples of the copolymerized polyamide resin include: aliphatic polyamides, such as polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), a caprolactam/lauryllactam copolymer (nylon 6/12), a caprolactam/ω-aminononanoic acid copolymer (nylon 6/9), a caprolactam/hexamethylene diammonium adipate copolymer (nylon 6/66), a lauryllactam/hexamethylene diammonium adipate copolymer (nylon 12/66), an ethylenediamine adipamide/hexamethylene diammonium adipate copolymer (nylon 26/66), a caprolactam/hexamethylene diammonium adipate/hexamethylene diammonium sebacate copolymer (nylon 66/610), and an ethylene ammonium adipate/hexamethylene diammonium adipate/hexamethylene diammoniumsebacate copolymer (nylon 6/66/610); aromatic polyamides, such as polyhexamethylene isophthalamide, polyhexamethylene terephthalamide, poly-m-xylylene adipamide, a hexamethylene isophthalamide/terephthalamide copolymer, poly-p-phenylene terephthalamide, and poly-p-phenylene-3,4'-diphenyl ether terephthalamide; amorphous polyamide; polyamide resins obtained by modifying those polyamide resins with an aromatic amine, such as methylenebenzylamine or m-xylenediamine; and m-xylylene diammonium adipate. Alternatively, terminal-modified polyamide resins thereof may be used. Of those, a terminal-modified polyamide resin is preferred.

<Other Additive>

The EVOH resin composition of the present disclosure may include an additive to be generally blended into an EVOH resin composition, for example, a known additive, such as heat stabilizer, an antioxidant, an antistatic agent, a colorant, a UV absorber, a lubricant (e.g., a saturated aliphatic amide (e.g., stearamide), an unsaturated fatty acid amide (e.g., oleamide), a bisfatty acid amide (e.g., ethylenebisstearamide), or a low-molecular weight polyolefin (e.g., low-molecular weight polyethylene or low-molecular weight polypropylene having a molecular weight of from about 500 to about 10,000)), a plasticizer (e.g., an aliphatic polyhydric alcohol, such as ethylene glycol, glycerin, or hexanediol), a light stabilizer, a surfactant, an antimicrobial, a desiccant, an insoluble inorganic salt (e.g., hydrotalcite), a filler (e.g., an inorganic filler), an antiblocking agent, a flame retardant, a crosslinking agent, a foaming agent, a crystal nucleating agent, an antifogging agent, an additive for biodegradation, a silane coupling agent, an oxygen absorber, boric acid and/or a salt thereof, cinnamic acid and/or a salt thereof, a conjugated polyene compound, an enediol group-containing substance (e.g., a phenol such as propyl gallate), or an aldehyde compound (e.g., an unsaturated aldehyde, such as crotonaldehyde), to the extent that the effects of the present disclosure are not inhibited (e.g., at a content of typically 10 wt. % or less, preferably 5 wt. % or less of the EVOH resin composition). Those additives may be used alone or in combination thereof.

Specific examples of the boric acid and/or the salt thereof include boric acid, metal salts of boric acid, calcium borate, cobalt borate, zinc borate (e.g., zinc tetraborate or zinc metaborate), aluminum potassium borate, ammonium borate (e.g., ammonium metaborate, ammonium tetraborate, ammonium pentaborate, or ammonium octaborate), cadmium borate (e.g., cadmium orthoborate or cadmium tetraborate), potassium borate (e.g., potassium metaborate, potassium tetraborate, potassium pentaborate, potassium hexaborate, or potassium octaborate), silver borate (e.g., silver metaborate or silver tetraborate), copper borate (e.g., cupric borate, copper metaborate, or copper tetraborate), sodium borate (e.g., sodium metaborate, sodium diborate, sodium tetraborate, sodium pentaborate, sodium hexaborate, or sodium octaborate), lead borate (e.g., lead metaborate or lead hexaborate), nickel borate (e.g., nickel orthoborate, nickel diborate, nickel tetraborate, or nickel octaborate), barium borate (e.g., barium orthoborate, barium metaborate, barium diborate, or barium tetraborate), bismuth borate, magnesium borate (e.g., magnesium orthoborate, magnesium diborate, magnesium metaborate, trimagnesium tetraborate, or pentamagnesium tetraborate), manganese borate (e.g., manganous borate, manganese metaborate, or manganese tetraborate), lithium borate (e.g., lithium metaborate, lithium tetraborate, or lithium pentaborate), and borate minerals, such as borax, kernite, inyoite, ketoite, suanite, and szaibelyite. Of those, borax, boric acid, sodium borate, potassium borate, zinc borate, calcium borate, and magnesium borate are preferred.

The content of the boric acid and/or the salt thereof in terms of boron is typically from 0.001 ppm to 1,000 ppm, preferably from 0.001 ppm to 600 ppm, more preferably from 0.001 ppm to 500 ppm, still more preferably from 0.01 ppm to 400 ppm, particularly preferably from 0.05 ppm to 330 ppm, more particularly preferably from 0.1 ppm to 250 ppm, further particularly preferably from 1 ppm to 120 ppm with respect to the total sum of the contents of the EVOH (A), the acetic acid and/or the salt thereof (B), the aliphatic carboxylic acid (C), the aliphatic carboxylic acid metal salt (D), and the boric acid and/or the salt thereof.

Specific examples of the cinnamic acid and/or the salt thereof may include cis-cinnamic acid and trans-cinnamic acid, and trans-cinnamic acid is suitably used from the viewpoints of its stability and price. In addition, examples of the cinnamic acid salt include: cinnamic acid alkali metal salts, such as lithium cinnamate, sodium cinnamate, and potassium cinnamate; and cinnamic acid alkaline earth metal salts, such as magnesium cinnamate, calcium cinnamate, and barium cinnamate. Those cinnamic acids and/or salts thereof may be used alone or in combination thereof. Of those, trans-cinnamic acid is preferably used alone.

The content of the cinnamic acid and/or the salt thereof in terms of cinnamic acid ion is typically from 1 ppm to 1,200 ppm, preferably from 1 ppm to 1,000 ppm, more preferably from 10 ppm to 800 ppm, still more preferably from 15 ppm to 500 ppm with respect to the total sum of the contents of the EVOH (A), the acetic acid and/or the salt thereof (B), the aliphatic carboxylic acid (C), the aliphatic carboxylic acid metal salt (D), and the cinnamic acid and/or the salt thereof.

The conjugated polyene compound is a compound having a so-called conjugated double bond, which is of a structure obtained by alternately connecting a carbon-carbon double bond and a carbon-carbon single bond, and has two or more carbon-carbon double bonds. The conjugated polyene compound may be a conjugated diene, which is of a structure obtained by alternately connecting two carbon-carbon double bonds and one carbon-carbon single bond, may be a conjugated triene, which is of a structure obtained by alternately connecting three carbon-carbon double bonds and two carbon-carbon single bonds, or may be a conjugated polyene compound, which is of a structure obtained by alternately connecting four or more carbon-carbon double bonds and three or more carbon-carbon single bonds. However, when the number of carbon-carbon double bonds to be conjugated is eight or more, concern is raised about the coloring of a formed product of the EVOH resin composition by the color of the conjugated polyene compound itself. Accordingly, a polyene having seven or less carbon-carbon double bonds to be conjugated is preferred. In addition, the plurality of conjugated double bonds each formed of two or more carbon-carbon double bonds may be present in a molecule of the compound without being conjugated with each other. For example, a compound having three conjugated trienes in one and the same molecule thereof, such as tung oil, is also included in the category of the conjugated polyene compound.

Specific examples of the conjugated polyene compound include: conjugated diene compounds each having two carbon-carbon double bonds, such as isoprene, myrcene, farnesene, cembrene, sorbic acid, a sorbic acid ester, a sorbic acid salt, and abietic acid; conjugated triene compounds each having three carbon-carbon double bonds, such as 1,3,5-hexatriene, 2,4,6-octatriene-1-carboxylic acid, eleostearic acid, tung oil, and cholecalciferol; and conjugated polyene compounds each having four or more carbon-carbon double bonds, such as cyclooctatetraene, 2,4,6,8-decatetraene-1-carboxylic acid, retinol, and retinoic acid. Those conjugated polyene compounds may be used alone or in combination thereof.

The content of the conjugated polyene compound is typically from 0.01 ppm to 10,000 ppm, preferably from 0.1 ppm to 1,000 ppm, particularly preferably from 0.5 ppm to 500 ppm with respect to the total sum of the contents of the EVOH (A), the acetic acid and/or the salt thereof (B), the aliphatic carboxylic acid (C), the aliphatic carboxylic acid metal salt (D), and the conjugated polyene compound.

The heat stabilizer is, for example, an organic acid, such as propionic acid, butyric acid, lauric acid, stearic acid, oleic acid, or behenic acid (provided that when the organic acid is used as the aliphatic carboxylic acid (C), the acid is not included in the category of the heat stabilizer), or an alkali metal salt (e.g., sodium salt or potassium salt) or an alkaline earth metal salt (e.g., calcium salt or magnesium salt) of the organic acid for the purpose of improving various physical properties of the EVOH resin composition at the time of its melt forming, such as thermal stability. Those stabilizers may be used alone or in combination thereof.

<Method of Producing EVOH Resin Composition>

Although a method of producing the EVOH resin composition of the present disclosure is not particularly limited, examples thereof include the following methods (I) to (IV):
(I) a method including blending a pellet of the EVOH (A) with at least one kind selected from the group consisting of the acetic acid and/or the salt thereof (B), the aliphatic carboxylic acid (C), the aliphatic carboxylic acid metal salt (D), and the phosphoric acid and/or the salt thereof (E) at a predetermined ratio, and dry-blending the materials (dry blending method);
(II) a method including immersing the pellet of the EVOH (A) in a solution containing at least one kind selected from the group consisting of the acetic acid and/or the salt thereof (B), the aliphatic carboxylic acid (C), the aliphatic carboxylic acid metal salt (D), and the phosphoric acid and/or the salt thereof (E), and then drying the pellet (immersion method);
(III) a method including blending the EVOH (A) with at least one kind selected from the group consisting of the acetic acid and/or the salt thereof (B), the aliphatic carboxylic acid (C), the aliphatic carboxylic acid metal salt (D), and the phosphoric acid and/or the salt thereof (E) at the time of the melt kneading of the EVOH, and then producing a pellet (melt kneading method); and
(IV) a method including adding, to a solution containing the EVOH (A), at least one kind selected from the group consisting of the acetic acid and/or the salt thereof (B), the aliphatic carboxylic acid (C), the aliphatic carboxylic acid metal salt (D), and the phosphoric acid and/or the salt thereof (E), mixing the materials, and then removing a solvent in the solution (solution mixing method).

Of those, the method (I) including blending the pellet of the EVOH (A) with at least one kind selected from the group consisting of the acetic acid and/or the salt thereof (B), the aliphatic carboxylic acid (C), the aliphatic carboxylic acid metal salt (D), and the phosphoric acid and/or the salt thereof (E) at a predetermined ratio, and dry-blending the materials (dry blending method) is industrially preferred because the method is practical in terms of productivity and economical efficiency. The above-mentioned methods may be used in combination thereof. In addition, even when the above-mentioned other additive is blended, an EVOH resin composition including the other additive is obtained in conformity with any one of the methods (I) to (IV).

A known mixing apparatus, such as a rocking mixer, a ribbon blender, or a line mixer, may be used as means for the dry blending in the method (I).

At the time of the dry blending in the method (I), in order to improve the adhesive property of at least one kind of component selected from the group consisting of the acetic acid and/or the salt thereof (B), the aliphatic carboxylic acid (C), the aliphatic carboxylic acid metal salt (D), and the phosphoric acid and/or the salt thereof (E), the water content of such pellet of the EVOH (A) is preferably adjusted to from 0.1 wt. % to 5 wt. % (more preferably from 0.5 wt. % to 4 wt. %, particularly preferably from 1 wt. % to 3 wt. %). When such water content is excessively small, there is a tendency that at least one kind selected from the group consisting of the acetic acid and/or the salt thereof (B), the aliphatic carboxylic acid (C), the aliphatic carboxylic acid metal salt (D), and the phosphoric acid and/or the salt thereof (E) is liable to fall, and hence its adhesion distribution is liable to be nonuniform. In contrast, when the water content is excessively large, at least one kind selected from the group consisting of the acetic acid and/or the salt thereof (B), the aliphatic carboxylic acid (C), the aliphatic carboxylic acid metal salt (D), and the phosphoric acid and/or the salt thereof (E) tends to agglomerate to make its adhesion distribution nonuniform.

The water content of the pellet of the EVOH (A) as used herein is measured and calculated by the following method.

[Method of Measuring Water Content]

The pellet of the EVOH (A) is weighed (W1: unit: g) in an electronic balance. After that, the pellet is loaded into a hot-air oven-type dryer maintained at 150° C.; and dried for 5 hours. Then, the pellet is further left to cool in a desiccator for 30 minutes. Its weight after the cooling is similarly weighed (W2: unit: g), and the water content is calculated from the following equation.

$$\text{Water content (\%)} = \{(W1-W2)/W1\} \times 100 \quad \text{[Equation]}$$

In addition, the methods (I) and (II) each provide such a pellet that at least one kind of component selected from the group consisting of the acetic acid and/or the salt thereof (B), the aliphatic carboxylic acid (C), the aliphatic carboxylic acid metal salt (D), and the phosphoric acid and/or the salt thereof (E) adheres to the outside of the pellet of the EVOH (A).

With regard to means for the melt kneading in the method (III), the melt kneading may be performed by using a known melt kneading apparatus, such as a kneader, a ruder, an extruder, a mixing roll, a Banbury mixer, or a plastomill. In ordinary cases, the melt kneading is preferably performed at from 150° C.; to 300° C. (more preferably from 180° C.; to 280° C.) for from about 1 minute to about 20 minutes. In particular, the use of a single-screw or twin-screw extruder is industrially advantageous because a pellet is easily obtained. In addition, a vent suction apparatus, a gear pump apparatus, a screen apparatus, or the like is preferably arranged as required. In particular, an EVOH resin composition alleviated in thermal coloration and thermal deterioration, and excellent in quality can be obtained by arranging one or more vent holes in an extruder to perform suction under reduced pressure for removing moisture and a by-product (e.g., a thermally decomposed low-molecular weight product) or by continuously supplying an inert gas, such as nitrogen, into a hopper for preventing the inclusion of oxygen into the extruder.

In addition, a method of supplying the materials including the EVOH (A) to the melt kneading apparatus, such as an extruder, is not particularly limited, and examples thereof may include: (1) a method including dry-blending the EVOH (A), and at least one kind selected from the group consisting of the acetic acid and/or the salt thereof (B), the aliphatic carboxylic acid (C), the aliphatic carboxylic acid metal salt (D), and the phosphoric acid and/or the salt thereof (E), and collectively supplying the blend to the extruder; (2) a method including supplying the EVOH (A) to the extruder, melting the EVOH, and supplying at least one kind selected from the group consisting of the acetic acid and/or the salt thereof (B), the aliphatic carboxylic acid (C), the aliphatic carboxylic acid metal salt (D), and the phosphoric acid and/or the salt thereof (E), which is in a solid state, to the molten EVOH (solid side-feed method); and (3) a method including supplying the EVOH (A) to the extruder, melting the EVOH, and supplying at least one kind selected from the group consisting of the acetic acid and/or the salt thereof (B), the aliphatic carboxylic acid (C), the aliphatic carboxylic acid metal salt (D), and the phosphoric acid and/or the salt thereof (E), which is in a molten state, to the molten EVOH (melt side-feed method). Of those, the method (1) is practical in terms of, for example, simplicity of the apparatus and cost for the blend.

In addition, a known approach may be used as the method of producing the pellet after the melt kneading, and examples thereof include a strand cutting method and a hot cutting method (e.g., an in-air cutting method or an underwater cutting method). The strand cutting method is preferred in terms of industrial productivity.

A known good solvent for the EVOH only needs to be used as the solvent to be used in the solution mixing method serving as the method (IV). A mixed solvent of water and an aliphatic alcohol having 1 to 4 carbon atoms is typically used, and a mixed solvent of water and methanol is preferred. At the time of the dissolution of the EVOH (A) in the solvent, heating or pressurization may be arbitrarily performed, and the concentration of the solution is also arbitrary. The solution or paste having dissolved therein the EVOH (A) only needs to be blended with at least one kind selected from the group consisting of the acetic acid and/or the salt thereof (B), the aliphatic carboxylic acid (C), the aliphatic carboxylic acid metal salt (D), and the phosphoric acid and/or the salt thereof (E). At this time, at least one kind selected from the group consisting of the acetic acid and/or the salt thereof (B), the aliphatic carboxylic acid (C), the aliphatic carboxylic acid metal salt (D), and the phosphoric acid and/or the salt thereof (E) may be blended under the state of, for example, a solid, a solution, or a dispersion liquid.

After the blending, an EVOH resin composition solution or paste that has been uniformly stirred is pelletized by the above-mentioned known approach. The underwater cutting method is preferred in terms of industrial productivity. The resultant pellet is dried by a known approach.

As the shape of the pellet, for example, an arbitrary shape, such as a spherical shape, an oval shape, a columnar shape, a cubic shape, or a rectangular parallelepiped shape, may be adopted. The pellet is typically of an oval shape or a columnar shape, and its size is as follows from the viewpoint of convenience when the pellet is used later as a forming material: when the pellet is of an oval shape, its shorter diameter is typically from 1 mm to 6 mm, preferably from 2 mm to 5 mm, and its longer diameter is typically from 1 mm to 6 mm, preferably from 2 mm to 5 mm. When the pellet is of a columnar shape, the diameter of its bottom surface is typically from 1 mm to 6 mm, preferably from 2 mm to 5 mm, and its length is typically from 1 mm to 6 mm, preferably from 2 mm to 5 mm.

Thus, the EVOH resin composition of the present disclosure can be obtained.

<Multilayer Structure>

A multilayer structure of the present disclosure includes at least one layer formed of the above-mentioned EVOH resin composition of the present disclosure. When the layer formed of the EVOH resin composition of the present disclosure (hereinafter simply referred to as "EVOH resin composition layer") is laminated on any other substrate, the layer can further improve the strength of the substrate or impart any other function to the substrate.

A layer formed of an adhesive resin (hereinafter simply referred to as "adhesive resin layer"), a layer formed of a polyamide resin (hereinafter simply referred to as "polyamide layer"), or a layer formed of a thermoplastic resin other than the EVOH (hereinafter simply referred to as "thermoplastic resin layer") is preferably used as the other substrate.

When the EVOH resin composition layer of the present disclosure is represented by $\alpha$ ($\alpha 1, \alpha 2, \ldots$), the adhesive resin layer thereof is represented by $\beta$ ($\beta 1, \beta 2, \ldots$), the polyamide layer thereof is represented by $\gamma$ ($\gamma 1, \gamma 2, \ldots$), and the other thermoplastic resin layer thereof is represented by $\delta$ ($\delta 1, \delta 2, \ldots$), for example, the following arbitrary combinations may each be adopted as the layered configuration of a multilayer structure: $\alpha/\beta/\delta$; $\alpha 1/\beta/\alpha 2$; $\alpha 1/\alpha 2/\alpha 3$; $\delta 1/\beta/\alpha/\delta 2$; $\delta/\alpha 1/\beta/\alpha 2$; $\delta 1/\beta 1/\alpha/\beta 2/\delta 2$; $\delta 1/\beta 1/\alpha 1/\alpha 2/\alpha 3/\beta 2/\delta 2$; $\delta 1/\alpha 1/\beta/\alpha 2/\delta 2$; $\delta 1/\beta 1/\alpha 1/\beta 2/\alpha 2/\beta 3/\delta 2$; $\gamma 1/\alpha/\gamma 2$; $\gamma/\alpha/\beta$; $\gamma/\alpha/\beta/\delta$; $\alpha 1/\beta/\alpha 2/\gamma$; $\delta 1/\beta/\alpha/\gamma/\delta 2$; $5/\alpha 1/\beta/\alpha 2/\gamma$; $\delta 1/\beta 1/\alpha/\gamma/\beta 2/\delta 2$; $\delta 1/\beta 1/\gamma 1/\alpha/\gamma 2/\beta 2/\delta 2$; $\delta 1/\alpha 1/\beta/\alpha 2/\gamma/\delta 2$; and $\delta 1/\beta 1/\alpha 1/\gamma 1/\beta 2/\alpha 2/\gamma 2/\beta 3/\delta 2$. In addition, the configuration of a layer to be laminated in one lamination direction with respect to the arbitrary EVOH resin composition layer ($\alpha$) and the configuration of a layer to be laminated in the other direction with respect thereto may be identical (symmetrical) to each other, or may be different from (asymmetrical to) each other. Further, the thickness of the layer to be laminated in one lamination direction with respect to the arbitrary EVOH resin composition layer ($\alpha$) and the thickness of the layer to be laminated in the other direction with respect thereto may be identical (symmetrical) to each other, or may be different from (asymmetrical to) each other. In addition, when a recycled layer containing a mixture of the EVOH resin composition, adhesive resin, polyamide resin, and thermoplastic resin of the present disclosure, the layer being obtained by recovering an end portion, a defective product, and the like produced in a process for the production of the multilayer structure, and melting and forming the recovered materials again, is represented by R (R1, R2, ...), for example, the following combinations may each be adopted: $\delta/R/\beta/\alpha$; $\alpha 1/R/\alpha 2/\alpha 3$; $\delta/R/\alpha 1/\beta/\alpha 2$; $\delta 1/R/\alpha/\beta/\delta 2$; $R1/\alpha 1/\beta/\alpha 2/R2$; $R1/\alpha 1/\alpha 2/\alpha 3/R2$; $\delta 1/R1/\beta 1/\alpha/\beta 2/R2/\delta 2$; $\delta 1/R1/\beta 1/\alpha 1/\alpha 2/\alpha 3/\beta 2/R2/\delta 2$; $\delta 1/R1/\alpha 1/\beta/\alpha 2/R2/\delta 2$; $\delta/R/\beta/\alpha/\gamma$; $\delta/R/\gamma/\alpha 1/\beta/\alpha 2$; $\delta 1/R/\gamma/\alpha/\beta/\delta 2$; $R1/\gamma/\alpha 1/\beta/\alpha 2/R2$; $\delta 1/R1/\beta 1/\gamma/\alpha/\beta 2/R2/\delta 2$; and $\delta 1/R1/\gamma 1/\alpha 1/\beta/\alpha 2/\gamma 2/R2/\delta 2$.

A known polyamide resin may be used as the polyamide resin. Specific examples thereof include homopolymers such as polycapramide (nylon 6), poly-ca-aminoheptanoic acid (nylon 7), poly-ca-aminononanoic acid (nylon 9), polyundecanamide (nylon 11), and polylauryllactam (nylon 12). Of those, polycapramide (nylon 6) is preferred. In addition, examples of the copolymerized polyamide resins include: aliphatic polyamides, such as polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), a caprolactam/lauryllactam copolymer (nylon 6/12), a caprolactam/ω-aminononanoic acid copolymer (nylon 6/9), a caprolactam/hexamethylene diammonium adipate copolymer (nylon 6/66), a lauryllactam/hexamethylene diammonium adipate copolymer (nylon 12/66), an ethylenediamine adipamide/hexamethylene diammonium adipate copolymer (nylon 26/66), a caprolactam/hexamethylene diammonium adipate/hexamethylene diammonium sebacate copolymer (nylon 66/610), and an ethylene ammonium adipate/hexamethylene diammonium adipate/hexamethylene diammonium sebacate copolymer (nylon 6/66/610); aromatic polyamides, such as polyhexamethylene isophthalamide, polyhexamethylene terephthalamide, poly-m-xylylene adipamide, a hexamethylene isophthalamide/terephthalamide copolymer, poly-p-phenylene terephthalamide, and poly-p-phenylene-3,4'-diphenyl ether terephthalamide; amorphous polyamide; polyamide resins obtained by modifying those polyamide resins with an aromatic amine, such as methylenebenzylamine or m-xylenediamine; and m-xylylene diammonium adipate. Alternatively, terminal-modified polyamide resins thereof may be used. Of those, a terminal-modified polyamide resin is preferred.

Examples of the thermoplastic resin not comprised of the EVOH include: (unmodified) polyolefin resins, such as polyethylene resins, for example, linear low-density polyethylene, low-density polyethylene, ultralow-density polyethylene, medium-density polyethylene, high-density polyethylene, ethylene-propylene (block and random) copolymers, and an ethylene-α-olefin (α-olefin having 4 to 20 carbon atoms) copolymer, polypropylene resins, for example, polypropylene and a propylene-α-olefin (α-olefin having 4 to 20 carbon atoms) copolymer, polybutene, polypentene, and a polycyclic olefin resin (a polymer having a cyclic olefin structure in a main chain and/or side chain thereof); polyolefin resins in a broad sense including modified olefin resins, such as unsaturated carboxylic acid-modified polyolefin resins obtained by graft-modifying those polyolefins with an unsaturated carboxylic acid or an ester thereof; an ionomer; an ethylene-vinyl acetate copolymer; an ethylene-acrylic acid copolymer; an ethylene-acrylic acid ester copolymer; a polyester resin; polyvinyl chloride; polyvinylidene chloride; an acrylic resin; a polystyrene resin; a vinyl ester resin; a polyester elastomer; a polyurethane elastomer; halogenated polyolefins, such as chlorinated polyethylene and chlorinated polypropylene; and aromatic or aliphatic polyketones. Those thermoplastic resins may be used alone or in combination thereof.

Of those, in consideration of hydrophobicity, a polyolefin resin, a polyester resin, and a polystyrene resin each serving as a hydrophobic resin are preferred, polyolefin resins, such as a polyethylene resin, a polypropylene resin, and a polycyclic olefin resin, and unsaturated carboxylic acid-modified polyolefin resins thereof are more preferred, and a polycyclic olefin resin is particularly preferably used as the hydrophobic resin.

The α-olefin of the polyolefin resin may be a plant-derived α-olefin derived from bioethanol, or may be a non-plant-derived, that is, petroleum-derived α-olefin, or these α-olefins may be used in combination thereof. A wide variety of α-olefins are each available as the petroleum-derived α-olefin, and hence the production of the polyolefin resin through use of any such α-olefin enables easy adjustment of the physical properties and the like of the resin. The use of the plant-derived α-olefin can further improve the biomass content of the final product, and hence can reduce an environmental load.

With regard to methods of producing plant-derived ethylene and the plant-derived α-olefin, the plant-derived ethylene and the plant-derived α-olefin (e.g., 1-butene or 1-hexene) may each be obtained as follows: a sugar solution or starch obtained from a plant such as sugarcane, corn, or a sweet potato is fermented with a microorganism such as yeast in accordance with a conventionally used method to produce bioethanol, and the bioethanol is heated in the presence of a catalyst to cause an intramolecular dehydration reaction or the like, thereby providing the ethylene or the α-olefin. Next, a plant-derived polyethylene resin may be produced by using the plant-derived ethylene and the plant-derived α-olefin thus obtained in the same manner as in the production of a petroleum-derived polyethylene resin.

Methods of producing the plant-derived ethylene, the plant-derived α-olefin, and the plant-derived polyethylene resin are described in detail in, for example, JP-A-2011-506628. The plant-derived polyethylene resin to be suitably used in the present disclosure is, for example, GREEN PE manufactured by Braskem S.A.

In addition, a known resin may be used as the adhesive resin serving as a forming material for the adhesive resin layer, and only needs to be appropriately selected in accordance with the kind of the thermoplastic resin to be used for the other thermoplastic resin layer serving as the substrate. A typical example thereof may be a modified polyolefin polymer containing a carboxy group obtained by chemically bonding an unsaturated carboxylic acid or an anhydride thereof to a polyolefin resin through an addition reaction, a graft reaction, or the like. Examples thereof include maleic anhydride-graft-modified polyethylene, maleic anhydride-graft-modified polypropylene, maleic anhydride-graft-modified ethylene-propylene (block and random) copolymers, a maleic anhydride-graft-modified ethylene-ethyl acrylate copolymer, a maleic anhydride-graft-modified ethylene-vinyl acetate copolymer, a maleic anhydride-modified polycyclic olefin resin, and a maleic anhydride-graft-modified polyolefin resin. Those polymers may be used alone or in combination thereof.

At this time, the content of the unsaturated carboxylic acid or the anhydride thereof is typically from 0.001 wt. % to 3 wt. %, preferably from 0.01 wt. % to 1 wt. %, particularly preferably from 0.03 wt. % to 0.5 wt. % with respect to the total amount of the adhesive resin. When a modification amount in a modified product is small, the adhesion property of the resin tends to be insufficient. In contrast, when the modification amount is large, a crosslinking reaction tends to occur to deteriorate the formability thereof.

Any such adhesive resin may be blended with, for example, the EVOH (A), any other EVOH, a rubber-elastomer component, such as polyisobutylene or an ethylene-propylene rubber, and the resin of a polyolefin resin layer. In particular, the adhesive resin may be blended with a polyolefin resin different from the polyolefin resin serving as a base for the adhesive resin.

The adhesive resin layer, the polyamide layer, or the thermoplastic resin layer may contain a conventionally known plasticizer (e.g., ethylene glycol, glycerin, or hexanediol), filler, clay (e.g., montmorillonite), colorant, antioxidant, antistatic agent, lubricant (e.g., an alkali metal salt or an alkaline earth metal salt of a higher fatty acid having 8 to 30 carbon atoms, a higher fatty acid ester (e.g., a methyl ester, an isopropyl ester, a butyl ester, or an octyl ester of a higher fatty acid), a higher fatty acid amide (e.g., a saturated aliphatic amide, such as stearamide or behenamide, an unsaturated fatty acid amide, such as oleamide or erucamide, or a bisfatty acid amide, such as ethylenebisstearamide, ethylenebisoleamide, ethylenebiserucamide, or ethylenebislauramide), or a low-molecular weight polyolefin (e.g., low-molecular weight polyethylene or low-molecular weight polypropylene having a molecular weight of from about 500 to about 10,000)), ethylene fluoride resin, nucleating agent, antiblocking agent, UV absorber, wax, or the like in addition to the acetic acid and/or the salt thereof (B), the aliphatic carboxylic acid (C) other than acetic acid, the aliphatic carboxylic acid metal salt (D) that is the metal salt of the aliphatic carboxylic acid (C), and the phosphoric acid and/or the salt thereof (E) to be used in the present disclosure to the extent that the spirit of the present disclosure is not inhibited (e.g., at a content of 30 wt. % or less, preferably 10 wt. % or less). Those materials may be used alone or in combination thereof.

In addition, the resin to be used in the adhesive resin layer and/or the polyamide layer is preferably blended with at least one kind selected from the group consisting of the acetic acid and/or the salt thereof (B), the aliphatic carboxylic acid (C) other than acetic acid, the aliphatic carboxylic acid metal salt (D) that is the metal salt of the aliphatic carboxylic acid (C), and the phosphoric acid and/or the salt thereof (E) in the present disclosure. In particular, when the adhesive resin layer and/or the polyamide layer adjacent to the EVOH resin composition layer of the present disclosure contains at least one kind selected from the group consisting of the acetic acid and/or the salt thereof (B), the aliphatic carboxylic acid (C) other than acetic acid, the aliphatic carboxylic acid metal salt (D) that is the metal salt of the aliphatic carboxylic acid (C), and the phosphoric acid and/or the salt thereof (E), a multilayer structure more excellent in impact resistance is obtained.

Lamination in the case where the multilayer structure is produced by laminating the EVOH resin composition layer of the present disclosure together with the other substrate may be performed by a known method. Examples thereof include: a method involving melting and extruding the other substrate, and laminating the resultant on a film, sheet, or the like of the EVOH resin composition of the present disclosure; a method involving, in contrast to the foregoing, melting and extruding the EVOH resin composition of the present disclosure, and laminating the resultant on the other substrate; a method involving subjecting the EVOH resin composition of the present disclosure and the other substrate to coextrusion; a method involving producing each of a film (layer) formed of the EVOH resin composition of the present disclosure and the other substrate (layer), and subjecting the products to dry lamination with a known adhesive, such as an organotitanium compound, an isocyanate compound, a polyester compound, or a polyurethane compound; and a method involving applying a solution of the EVOH resin composition of the present disclosure onto the other substrate, and then removing a solvent. Of those, the method involving the coextrusion is preferred in consideration of cost and environmental viewpoints.

Next, the multilayer structure is subjected to a (heat) stretching treatment as required. The stretching treatment may be any one of uniaxial stretching and biaxial stretching. In the case of the biaxial stretching, any one of simultaneous stretching and sequential stretching is permitted. In addition, a method providing a high stretching ratio out of, for example, a roll stretching method, a tenter stretching method, a tubular stretching method, a stretching blow method, and a vacuum-pressure forming method may be adopted as a stretching method. A stretching temperature is selected from the range of typically from 40° C.; to 170° C., preferably from about 60° C.; to about 160° C. When the stretching temperature is excessively low, the stretchability of the multilayer structure becomes unsatisfactory, and when the stretching temperature is excessively high, it becomes difficult for the multilayer structure to maintain a stable stretched state.

Next, thermal fixing may be performed for the purpose of imparting dimensional stability to the multilayer structure after the stretching. The thermal fixing may be performed by well-known means and for example, the stretched multilayer structure (stretched film) is subjected to a heat treatment at typically from 80° C.; to 180° C., preferably from 100° C.; to 165° C.; for typically from about 2 seconds to about 600 seconds while its tense state is kept.

In addition, when a multilayer stretched film obtained by using the EVOH resin composition of the present disclosure is used as a shrinking film, in order that heat shrinkability may be imparted thereto, a treatment involving, for example, applying cold air to the film after the stretching to cool and fix the film is desirably performed without the performance of the thermal fixing.

Further, in some cases, a multilayer container of a cup or tray shape may be obtained from the multilayer structure of the present disclosure. A drawing method is typically adopted as method of producing the multilayer container, and specific examples thereof include a vacuum forming method, a pressure forming method, a vacuum-pressure forming method, and a plug-assisted vacuum-pressure forming method. Further, when a multilayer container of a tube or bottle shape is obtained from a multilayer parison (preliminarily molded product of a hollow tube shape before blowing), a blow molding method is adopted, and specific examples thereof include an extrusion blow molding method (of, for example, a twin-head type, a mold-transfer type, a parison shift type, a rotary type, an accumulator type, or a horizontal parison type), a cold parison-type blow molding method, an injection blow molding method, and a biaxial stretching blow molding method (e.g., an extrusion-type cold parison biaxial stretching blow molding method, an injection-type cold parison biaxial stretching blow molding method, or an injection molding in-line-type biaxial stretching blow molding method). The multilayer structure of the present disclosure may be subjected to, for example, a heat treatment, a cooling treatment, a rolling treatment, a printing treatment, a dry lamination treatment, a solution or melt coating treatment, bag-making processing, deep drawing processing, box processing, tube processing, or split processing as required.

The thickness of the multilayer structure (including a stretched multilayer structure) of the present disclosure, and the thicknesses of the EVOH resin composition layer, the polyamide resin layer, the adhesive resin layer, and the other thermoplastic resin layer forming the multilayer structure are appropriately set in accordance with, for example, the layered configuration of the multilayer structure, the kind of the thermoplastic resin, the kind of the polyamide resin, the kind of the adhesive resin, the applications and packaging form of the multilayer structure, and physical properties that the multilayer structure is required to have.

The total thickness of the multilayer structure (including the stretched multilayer structure) of the present disclosure is typically from 10 μm to 5,000 μm, preferably from 30 μm to 3,000 μm, particularly preferably from 50 μm to 2,000 μm. When the total thickness of the multilayer structure is excessively small, its gas barrier property may reduce. In addition, when the total thickness of the multilayer structure is excessively large, economical efficiency tends to below because the gas barrier property becomes excess performance and hence an unnecessary raw material is used. In addition, the thickness of the EVOH resin composition layer (α) is typically from 1 μm to 500 μm, preferably from 3 μm to 300 μm, particularly preferably from 5 μm to 200 μm, the thickness of the thermoplastic resin layer (δ) is typically from 5 μm to 3,000 μm, preferably from 10 μm to 2,000 μm, particularly preferably from 20 μm to 1,000 μm, and the thickness of the adhesive resin layer (β) is typically from 0.5 μm to 250 μm, preferably from 1 μm to 150 μm, particularly preferably from 3 μm to 100 μm. When two or more layers of at least one kind selected from the group consisting of the EVOH resin composition layer (α), the adhesive resin layer (β), and the thermoplastic resin layer (δ) are present, the above-mentioned numerical values are each a value obtained by totaling the thicknesses of the layers of the same kind.

Further, the thickness ratio (EVOH resin composition layer (α)/other thermoplastic resin layer (δ)) of the EVOH resin composition layer (α) in the multilayer structure to the other thermoplastic resin layer (δ) therein is typically from 1/99 to 50/50, preferably from 2/98 to 45/55, particularly preferably from 5/95 to 40/60, further particularly preferably from 10/90 to 35/65, in terms of a ratio between the layers each having the largest thickness among the layers of the same kind in a case where two or more layers of the same kind are present. When such value falls within the ranges, the effects of the present disclosure tend to be more significantly obtained. When the value falls short of the ranges, the gas barrier property and impact resistance of the multilayer structure tend to be insufficient. When the value exceeds the ranges, the multilayer structure tends to be liable to crack.

In addition, the thickness ratio (EVOH resin composition layer (α)/polyamide layer (γ)) of the EVOH resin composition layer (α) in the multilayer structure to the polyamide layer (γ) therein is typically from 10/90 to 99/1, preferably from 20/80 to 80/20, particularly preferably from 40/60 to 60/40, in terms of a ratio between the layers each having the largest thickness among the layers of the same kind in a case where two or more layers of the same kind are present. When such value falls within the ranges, the effects of the present disclosure tend to be more significantly obtained. When the value falls short of the ranges, the gas barrier property of the multilayer structure tends to be insufficient. When the value exceeds the ranges, the impact resistance of the multilayer structure tends to be insufficient.

In addition, the thickness ratio (EVOH resin composition layer (α)/adhesive resin layer (β)) of the EVOH resin composition layer (α) in the multilayer structure to the adhesive resin layer (β) therein is typically from 10/90 to 99/1, preferably from 20/80 to 95/5, particularly preferably from 50/50 to 90/10, in terms of a ratio between the layers each having the largest thickness among the layers of the same kind in a case where two or more layers of the same kind are present. When such value falls within the ranges, the effects of the present disclosure tend to be more significantly obtained. When the value falls short of the ranges, the gas barrier property of the multilayer structure tends to be insufficient. When the value exceeds the ranges, the adhesive strength of the multilayer structure tends to be insufficient.

<<Second Mode in which EVOH Resin Composition Further Includes Boric Acid and/or Salt Thereof (F), and Satisfies the Formula (4)>>

In addition, the EVOH is a resin that is liable to thermally deteriorate as compared to any other thermoplastic resin. Accordingly, at the time of the forming of a film, a sheet, a container, or the like out of the EVOH, an appearance failure derived from a thermal deterioration agglomerate, such as a fish eye or gel, has occurred, or long-run formability has been insufficient in some cases.

Accordingly, for the purpose of improving the fish eye-preventing effect and long-run formability of the EVOH, in, for example, PTL 5, there is a proposal of a method of producing a resin composition formed of the EVOH and a boron compound. In addition, in PTL 5, there is a description that an EVOH resin composition containing a predetermined amount of the boron compound was excellent in fish eye-preventing effect and long-run formability.

[PTL 5] JP-A-HEI11(1999)-290378

In each of PTLs 1 to 4 described above, however, part of the EVOH is replaced with a resin other than the EVOH before its blending into the resin composition. Accordingly, there is a tendency that the ratio of the EVOH in the resin composition reduces, and hence a gas barrier property derived from the EVOH reduces. In PTL 5 described above, the impact resistance and flow stability of the resin composition tend to be insufficient, though the composition is excellent in preventing effect on an appearance failure derived from a thermal deterioration agglomerate (fish eye) and long-run formability.

In addition, in recent years, along with, for example, widespread use of Internet shopping and economic development of developing countries, physical distribution has been rapidly becoming borderless, and hence the time period for which food, drugs, and the like are transported tends to lengthen. Accordingly, a multilayer structure (packaging material) formed of an EVOH resin composition having all of high impact resistance against falling or collision at the time of long-term transportation or during handling, a more excellent gas barrier property, and excellent flow stability has been required.

In view of the foregoing, in the present disclosure, under such background, there is provided an EVOH resin composition, which is excellent in impact resistance and adhesive strength and is also excellent in flow stability even without being blended with any resin other than an EVOH.

Thus, the inventors have made extensive investigations in view of such circumstances, and as a result, have found that an EVOH resin composition, which is excellent in impact resistance and adhesive strength when formed into a film, and is also excellent in flow stability and color tone stability, is obtained by using an EVOH in combination with acetic acid and/or a salt thereof, an aliphatic carboxylic acid other than acetic acid, a metal salt of the aliphatic carboxylic acid including at least one kind of metal species selected from long Periodic Table 4th-period d-block elements, and boric acid and/or a salt thereof.

That is, it has been generally known that a fatty acid metal salt accelerates the thermal decomposition of the EVOH to reduce the impact resistance and color tone of an EVOH resin composition to be obtained. Accordingly, when a person skilled in the art aims to improve the mechanical property (impact resistance) and color tone of the EVOH, the person avoids the blending of the EVOH with the fatty acid metal salt. However, the inventors have used the EVOH in combination with the acetic acid and/or the salt thereof, the aliphatic carboxylic acid other than acetic acid and a specific metal salt thereof, and the boric acid and/or the salt thereof so that a specific relationship may be satisfied, and as a result, have found that the mechanical property (impact resistance), flow stability, and color tone of the EVOH are improved contrary to customary expectations.

As described above, the present disclosure provides the following items <II-1> to <II-10>.

<II-1> An ethylene-vinyl alcohol copolymer resin composition, including: an ethylene-vinyl alcohol copolymer (A); acetic acid and/or a salt thereof (B); an aliphatic carboxylic acid (C) other than acetic acid; an aliphatic carboxylic acid metal salt (D) that is a metal salt of the aliphatic carboxylic acid (C); and boric acid and/or a salt thereof (F), wherein a metal species of the aliphatic carboxylic acid metal salt (D) is at least one kind selected from long Periodic Table 4th-period d-block elements, and wherein respective contents of the acetic acid and/or the salt thereof (B), the aliphatic carboxylic acid (C), the aliphatic carboxylic acid metal salt (D), and the boric acid and/or the salt thereof (F) satisfy the following formulae (1), (2), and (4) on a weight basis.

$$0.001 \leq (\text{content of } (D) \text{ in terms of metal ion/content of } (B) \text{ in terms of acetic acid ion}) \leq 1.30 \quad (1)$$

$$0.11 \leq (\text{content of } (D) \text{ in terms of metal ion/content of } (C) \text{ in terms of carboxylic acid ion}) \leq 100 \quad (2)$$

$$0.11 \leq (\text{content of } (D) \text{ in terms of metal ion/content of } (F) \text{ in terms of boron}) \leq 100 \quad (4)$$

<II-2> The ethylene-vinyl alcohol copolymer resin composition according to the item <II-1>, wherein an elongation viscosity of the ethylene-vinyl alcohol copolymer resin composition at 210° C. and 100 s$^{-1}$ satisfies the following formula (II4).

$$850 \leq \text{elongation viscosity [Pa·s]} \leq 48,000 \quad (II4)$$

<II-3> The ethylene-vinyl alcohol copolymer resin composition according to the item <II-1> or <II-2>, wherein the content of the aliphatic carboxylic acid metal salt (D) in terms of metal ion is from 1 ppm to 500 ppm with respect to a total sum of contents of the ethylene-vinyl alcohol copolymer (A), the acetic acid and/or the salt thereof (B), the aliphatic carboxylic acid (C), the aliphatic carboxylic acid metal salt (D), and the boric acid and/or the salt thereof (F).

<II-4> The ethylene-vinyl alcohol copolymer resin composition according to any one of the items <II-1> to <II-3>, wherein the content of the aliphatic carboxylic acid (C) in terms of carboxylic acid ion is from 0.001 ppm to 450 ppm with respect to a total sum of contents of the ethylene-vinyl alcohol copolymer (A), the acetic acid and/or the salt thereof (B), the aliphatic carboxylic acid (C), the aliphatic carboxylic acid metal salt (D), and the boric acid and/or the salt thereof (F).

<II-5> The ethylene-vinyl alcohol copolymer resin composition according to any one of the items <II-1> to <II-4>, wherein the content of the acetic acid and/or the salt thereof (B) in terms of acetic acid ion is from 10 ppm to 2,000 ppm with respect to a total sum of contents of the ethylene-vinyl alcohol copolymer (A), the acetic acid and/or the salt thereof (B), the aliphatic carboxylic acid (C), the aliphatic carboxylic acid metal salt (D), and the boric acid and/or the salt thereof (F).

<II-6> The ethylene-vinyl alcohol copolymer resin composition according to any one of the items <II-1> to <II-5>, wherein the content of the boric acid and/or the salt thereof (F) in terms of boron is from 0.001 ppm to 500 ppm with respect to a total sum of contents of the ethylene-vinyl alcohol copolymer (A), the acetic acid and/or the salt thereof (B), the aliphatic carboxylic acid (C), the aliphatic carboxylic acid metal salt (D), and the boric acid and/or the salt thereof (F).

<II-7> The ethylene-vinyl alcohol copolymer resin composition according to any one of the items <II-1> to <II-6>, wherein a ratio (content of acetic acid and/or salt thereof (B) in terms of acetic acid ion/content of aliphatic carboxylic acid (C) in terms of carboxylic acid ion) of the content of the acetic acid and/or the salt thereof (B) in terms of acetic acid ion to the content of the aliphatic carboxylic acid (C) in terms of carboxylic acid ion is from 0.0001 to 10,000 on a weight basis.

<II-8> The ethylene-vinyl alcohol copolymer resin composition according to any one of the items <II-1> to <II-7>, wherein a ratio (content of boric acid and/or salt thereof (F) in terms of boron/content of aliphatic carboxylic acid (C) in terms of carboxylic acid ion) of the content of the boric acid and/or the salt thereof (F) in terms of boron to the content of the aliphatic carboxylic acid (C) in terms of carboxylic acid ion is from 0.0001 to 10,000 on a weight basis.

<II-9> A multilayer structure, including a layer formed of the ethylene-vinyl alcohol copolymer resin composition of any one of the items <II-1> to <II-8>.

<II-10> A package, including the multilayer structure of the item <II-9>.

The EVOH resin composition of the present disclosure is a resin composition, including: the ethylene-vinyl alcohol copolymer, that is, EVOH (A); the acetic acid and/or the salt thereof (B); the aliphatic carboxylic acid (C) other than acetic acid; the aliphatic carboxylic acid metal salt (D) that is the metal salt of the aliphatic carboxylic acid (C); and the boric acid and/or the salt thereof (F), wherein the metal species of the aliphatic carboxylic acid metal salt (D) is at least one kind selected from the long Periodic Table 4th-period d-block elements, and wherein the respective contents of the acetic acid and/or the salt thereof (B), the aliphatic carboxylic acid (C), and the aliphatic carboxylic acid metal salt (D) satisfy the following formulae (1), (2), and (4) on a weight basis. Accordingly, the composition is excellent in impact resistance and adhesive strength when formed into a film, and is also excellent in flow stability and color tone stability even without being blended with any resin other than the EVOH.

$$0.001 \leq (\text{content of } (D) \text{ in terms of metal ion/content of } (B) \text{ in terms of acetic acid ion}) \leq 1.30 \quad (1)$$

$$0.11 \leq (\text{content of } (D) \text{ in terms of metal ion/content of } (C) \text{ in terms of carboxylic acid ion}) \leq 100 \quad (2)$$

$$0.11 \leq (\text{content of } (D) \text{ in terms of metal ion/content of } (F) \text{ in terms of boron}) \leq 100 \quad (4)$$

In addition, when the elongation viscosity of the ethylene-vinyl alcohol copolymer resin composition at 210° C.; and 100 s$^{-1}$ satisfies the following formula (II4), the composition is more excellent in impact resistance.

$$850 \leq \text{elongation viscosity [Pa·s]} \leq 48,000 \quad (II4)$$

In addition, when the content of the aliphatic carboxylic acid metal salt (D) in terms of metal ion is from 1 ppm to 500 ppm with respect to the total sum of the contents of the ethylene-vinyl alcohol copolymer (A), the acetic acid and/or the salt thereof (B), the aliphatic carboxylic acid (C), the aliphatic carboxylic acid metal salt (D), and the boric acid and/or the salt thereof (F), the EVOH resin composition is more excellent in impact resistance, flow stability, and adhesive strength when formed into a film.

In addition, when the content of the aliphatic carboxylic acid (C) in terms of carboxylic acid ion is from 0.001 ppm to 450 ppm with respect to the total sum of the contents of the ethylene-vinyl alcohol copolymer (A), the acetic acid and/or the salt thereof (B), the aliphatic carboxylic acid (C), the aliphatic carboxylic acid metal salt (D), and the boric acid and/or the salt thereof (F), the EVOH resin composition is more excellent in impact resistance, flow stability, and color tone stability.

In addition, when the content of the acetic acid and/or the salt thereof (B) in terms of acetic acid ion is from 10 ppm to 2,000 ppm with respect to the total sum of the contents of the ethylene-vinyl alcohol copolymer (A), the acetic acid and/or the salt thereof (B), the aliphatic carboxylic acid (C), the aliphatic carboxylic acid metal salt (D), and the boric acid and/or the salt thereof (F), the EVOH resin composition is more excellent in impact resistance and adhesive strength when formed into a film, and is also excellent in color tone stability.

In addition, when the content of the boric acid and/or the salt thereof (F) in terms of boron is from 0.001 ppm to 500 ppm with respect to the total sum of the contents of the ethylene-vinyl alcohol copolymer (A), the acetic acid and/or the salt thereof (B), the aliphatic carboxylic acid (C), the aliphatic carboxylic acid metal salt (D), and the boric acid and/or the salt thereof (F), the EVOH resin composition is more excellent in impact resistance when formed into a film, and is also excellent in color tone stability.

In addition, when the ratio (content of acetic acid and/or salt thereof (B) in terms of acetic acid ion/content of aliphatic carboxylic acid (C) in terms of carboxylic acid ion) of the content of the acetic acid and/or the salt thereof (B) in terms of acetic acid ion to the content of the aliphatic carboxylic acid (C) in terms of carboxylic acid ion is from 0.0001 to 10,000 on a weight basis, the EVOH resin composition is more excellent in impact resistance when formed into a film, and is also excellent in color tone stability.

In addition, when the ratio (content of boric acid and/or salt thereof (F) in terms of boron/content of aliphatic carboxylic acid (C) in terms of carboxylic acid ion) of the content of the boric acid and/or the salt thereof (F) in terms of boron to the content of the aliphatic carboxylic acid (C) in terms of carboxylic acid ion is from 0.0001 to 10,000 on a weight basis, the EVOH resin composition is more excellent in impact resistance when formed into a film, and is also excellent in color tone stability.

In addition, the multilayer structure, which is obtained by using the EVOH resin composition, is an excellent multilayer structure, which is excellent in mechanical property (impact resistance), and in which a reduction in color tone at the time of melt forming and a reduction in adhesive strength are alleviated.

Further, the package of the present disclosure includes the multilayer structure, and hence, similarly, the package to be obtained is excellent in impact resistance and adhesive strength, and is also excellent in color tone stability.

The present disclosure is described in detail below. However, the following description describes an example of a desired embodiment of the present disclosure.

An EVOH resin composition of the present disclosure includes an EVOH (A) as a main component, and includes acetic acid and/or a salt thereof (B), an aliphatic carboxylic acid (C) other than acetic acid, an aliphatic carboxylic acid metal salt (D) that is a metal salt of the aliphatic carboxylic acid (C), and boric acid and/or a salt thereof (F). The base resin of the EVOH resin composition of the present disclosure is the EVOH (A), and the content of the EVOH (A) in the EVOH resin composition is typically 60 wt. % or more, preferably 70 wt. % or more, more preferably 80 wt. % or more, particularly preferably 90 wt. %. The respective constituent components are described below.

The term "and/or" as used herein means at least one of those described on the left and right sides of the term, and in the case of the term "X and/or Y", the term has the following three meanings: X alone, Y alone, and X and Y.

<EVOH (A)>

In ordinary cases, the EVOH (A) to be used in the present disclosure is a resin obtained by copolymerizing ethylene and a vinyl ester monomer, and then saponifying the copolymer, and the same component as the component (A) described in the first mode may be used.

<Acetic Acid and/or Salt Thereof (B)>

The EVOH resin composition of the present disclosure includes the acetic acid and/or the salt thereof (B). That is, the EVOH resin composition of the present disclosure includes at least one kind selected from the group consisting of acetic acid and acetic acid salts.

The same component as the component (B) described in the first mode may be used as the acetic acid and/or the salt thereof (B). Of those, acetic acid, sodium acetate, potassium acetate, calcium acetate, and magnesium acetate are preferred, acetic acid, sodium acetate, and potassium acetate are more preferred, acetic acid and sodium acetate are particularly preferred, and sodium acetate is further particularly preferred.

The content of the acetic acid and/or the salt thereof (B) in terms of acetic acid ion is typically from 10 ppm to 2,000 ppm, preferably from 15 ppm to 1,500 ppm, particularly preferably from 20 ppm to 1,000 ppm, further particularly preferably from 25 ppm to 650 ppm with respect to the total sum of the contents of the EVOH (A), the acetic acid and/or the salt thereof (B), the aliphatic carboxylic acid (C), the aliphatic carboxylic acid metal salt (D), and the boric acid and/or the salt thereof (F).

When such content is excessively small, there is a tendency that the adhesive strength of the EVOH resin composition is reduced by the thermally decomposed product of the aliphatic carboxylic acid metal salt (D), or the effects of the present disclosure are not sufficiently obtained. When the content is excessively large, there is a tendency that the color tone stability thereof at the time of its melt forming is liable to reduce, or the effects of the present disclosure are not sufficiently obtained.

The content of the acetic acid and/or the salt thereof (B) in terms of acetic acid ion may be measured by a known analysis method. For example, the content may be measured by using liquid chromatography-mass spectrometry (LC/MS) or gas chromatography-mass spectrometry (GC/MS).

<Aliphatic Carboxylic Acid (C) Other than Acetic Acid>

The EVOH resin composition of the present disclosure includes the aliphatic carboxylic acid (C) other than acetic acid and the same component as the component (C) described in the first mode may be used as the aliphatic carboxylic acid (C). The number of carbon atoms of the aliphatic carboxylic acid (C) is typically from 3 to 30, preferably from 4 to 22, more preferably from 4 to 20, particularly preferably from 5 to 14. When the number of carbon atoms of the aliphatic carboxylic acid (C) falls within the ranges, the effects of the present disclosure tend to be more effectively obtained.

The content of the aliphatic carboxylic acid (C) in terms of carboxylic acid ion is typically from 0.001 ppm to 950 ppm, preferably from 0.001 ppm to 450 ppm, more preferably from 0.01 ppm to 350 ppm, particularly preferably from 0.1 ppm to 250 ppm, further particularly preferably from 0.5 ppm to 200 ppm with respect to the total sum of the contents of the EVOH (A), the acetic acid and/or the salt thereof (B), the aliphatic carboxylic acid (C), the aliphatic carboxylic acid metal salt (D), and the boric acid and/or the salt thereof (F).

When such content is excessively small, there is a tendency that the thermal stability of the aliphatic carboxylic acid metal salt (D) becomes insufficient, and as a result, the effects of the present disclosure are not sufficiently obtained. When the content is excessively large, there is a tendency that the color tone stability of the EVOH resin composition at the time of its melt forming is liable to reduce, or the aliphatic carboxylic acid (C) itself acts as a plasticizer to make it impossible to sufficiently obtain the effects of the present disclosure.

The ratio (content of acetic acid and/or salt thereof (B) in terms of acetic acid ion/content of aliphatic carboxylic acid (C) in terms of carboxylic acid ion) of the content of the acetic acid and/or the salt thereof (B) in terms of acetic acid ion to the content of the aliphatic carboxylic acid (C) in terms of carboxylic acid ion is typically from 0.0001 to 10,000, preferably from 0.001 to 5,000, more preferably from 0.1 to 1,000, particularly preferably from 1 to 650, further particularly preferably from 1 to 600 on a weight basis.

When such content ratio falls within the above-mentioned ranges, the effects of the present disclosure tend to be more significantly obtained. When the ratio falls short of the ranges, there is a tendency that the color tone stability of the EVOH resin composition at the time of its melt forming is insufficient, or the adhesive strength thereof becomes insufficient. When the ratio exceeds the ranges, there is a tendency that the effects of the present disclosure are not sufficiently obtained.

<Aliphatic Carboxylic Acid Metal Salt (D)>

The EVOH resin composition of the present disclosure includes the aliphatic carboxylic acid metal salt (D) that is the metal salt of the aliphatic carboxylic acid (C) other than acetic acid. The same component as the component (D) described in the first mode may be used as the aliphatic carboxylic acid metal salt (D).

Although the reason why an excellent effect is obtained when the aliphatic carboxylic acid (C) and the anion species of the aliphatic carboxylic acid metal salt (D) are of the same species is unclear, it is assumed that when specific amounts of the aliphatic carboxylic acid (C) and the aliphatic carboxylic acid metal salt (D) are used in combination, the dispersibility of the aliphatic carboxylic acid metal salt (D) is significantly improved, and hence more excellent effects of the present disclosure are obtained. In addition, the following assumption is made. The aliphatic carboxylic acid (C) may interact with the metal species of the aliphatic carboxylic acid metal salt (D) to exist under a state like a metal complex. When the anion species of such aliphatic carboxylic acid metal salt (D) is of the same species as the aliphatic carboxylic acid (C), the metal complex can exist under a state that is more stable in terms of energy, and hence the metal complex is excellent in thermal stability even at the time of its melt forming. As a result, the mechanical property (impact resistance) of the EVOH resin composition is improved.

In addition, when the number of carbon atoms of each of the aliphatic carboxylic acid (C) and the aliphatic carboxylic acid metal salt (D) is typically from 3 to 30, preferably from 4 to 22, more preferably from 4 to 20, particularly preferably from 5 to 14, the mechanical property (impact resistance) tends to be more significantly improved. Although the reason for the foregoing is unclear, the following assumption is made. When the number of carbon atoms of each of the aliphatic carboxylic acid (C) and the aliphatic carboxylic acid metal salt (D) falls within the ranges, the aliphatic carboxylic acid (C) and the aliphatic carboxylic acid metal salt (D) are easily dispersed in the EVOH resin composition in a more uniform manner. Accordingly, as a result, the mechanical property (impact resistance) of the EVOH resin composition is more significantly improved.

In addition, when the aliphatic carboxylic acid metal salt (D) is used alone, the adhesive strength of the EVOH resin composition tends to reduce, though the impact resistance thereof is improved. Although the reason for the foregoing is unclear, it is assumed that when the aliphatic carboxylic acid metal salt (D) is used alone, the thermal stability of the salt itself is insufficient, and hence the adhesive strength is reduced by the thermally decomposed product of the aliphatic carboxylic acid metal salt (D) produced at the time of its melt forming. In contrast, in the present disclosure, the aliphatic carboxylic acid metal salt (D) and the acetic acid and/or the salt thereof (B) are used in combination. Accordingly, it is assumed that the thermally decomposed product of the aliphatic carboxylic acid metal salt (D) is dispersed in the composition while being captured by the acetic acid and/or the salt thereof (B), and hence a reduction in adhesive strength is suppressed.

The content of the aliphatic carboxylic acid metal salt (D) in terms of metal ion is typically from 1 ppm to 500 ppm, preferably from 5 ppm to 300 ppm, more preferably from 10 ppm to 250 ppm, particularly preferably from 10 ppm to 200 ppm, further particularly preferably from 30 ppm to 150 ppm with respect to the total sum of the contents of the EVOH (A), the acetic acid and/or the salt thereof (B), the aliphatic carboxylic acid (C), the aliphatic carboxylic acid metal salt (D), and the boric acid and/or the salt thereof (F). When the content of the aliphatic carboxylic acid metal salt (D) is excessively small, there is a tendency that the effects of the present disclosure are not sufficiently obtained. When the content is excessively large, there is a tendency that the adhesive strength of the EVOH resin composition reduces, or the color tone stability thereof at the time of its melt forming is liable to reduce.

The content of the aliphatic carboxylic acid (C) in terms of carboxylic acid ion and the content of the aliphatic carboxylic acid metal salt (D) in terms of metal ion may each be measured by a known analysis method. For example, the contents may be determined by using such methods as described below alone or in combination thereof.

(i) Content of aliphatic carboxylic acid metal salt (D) in terms of metal ion: A dry sample is precisely weighed, and is loaded into a platinum evaporating dish whose weight has been made constant, followed by carbonization with an electric heater. Next, the carbonized product is heated with a gas burner, and is baked until no smoke occurs. Further, the platinum evaporating dish is loaded into an electric furnace, and temperature in the furnace is increased to completely ash the baked product. The ashed product is cooled, and then hydrochloric acid and pure water are added thereto, followed by heating with an electric heater to dissolve the ashed product in the mixture. The solution is poured into a measuring flask, and its volume is made constant with pure water. Thus, a sample for atomic absorption analysis is obtained. The amount of a metal in the sample for atomic absorption analysis is subjected to quantitative analysis by atomic absorption spectrophotometry. Thus, the content of the aliphatic carboxylic acid metal salt (D) in terms of metal ion can be determined.

(ii) Content of aliphatic carboxylic acid (C) in terms of carboxylic acid ion: First, the total sum (Cx) of the contents of the aliphatic carboxylic acid (C) and the metal salt (D) thereof in the EVOH resin composition in terms of carboxylic acid ion is determined by using, for example, liquid chromatography-mass spectrometry (LC/MS) or gas chromatography-mass spectrometry (GC/MS). After that, the content (Cy) of the aliphatic carboxylic acid metal salt (D) in terms of carboxylic acid ion is calculated from the content of the aliphatic carboxylic acid metal salt (D) in terms of metal ion described above. Then, the content of the aliphatic carboxylic acid (C) in terms of carboxylic acid ion can be determined from a difference ((Cx)−(Cy)) between the total sum (Cx) of the contents of the aliphatic carboxylic acid (C) and the metal salt (D) thereof in terms of carboxylic acid ion, and the content (Cy) of the aliphatic carboxylic acid metal salt (D) in terms of carboxylic acid ion.

<Boric Acid and/or Salt Thereof (F)>

The EVOH resin composition of the present disclosure includes the boric acid and/or the salt thereof (F). That is, the EVOH resin composition of the present disclosure includes at least one kind selected from the group consisting of boric acid and boric acid salts.

Typical examples of the boric acid and/or the salt thereof (F) include boric acid, metal salts of boric acid, such as calcium borate, cobalt borate, zinc borate (e.g., zinc tetraborate or zinc metaborate), aluminum potassium borate, ammonium borate (e.g., ammonium metaborate, ammonium tetraborate, ammonium pentaborate, or ammonium octaborate), cadmium borate (e.g., cadmium orthoborate or cadmium tetraborate), potassium borate (e.g., potassium metaborate, potassium tetraborate, potassium pentaborate, potassium hexaborate, or potassium octaborate), silver borate (e.g., silver metaborate or silver tetraborate), copper borate (e.g., cupric borate, copper metaborate, or copper tetraborate), sodium borate (e.g., sodium metaborate, sodium diborate, sodium tetraborate, sodium pentaborate, sodium hexaborate, or sodium octaborate), lead borate (e.g., lead metaborate or lead hexaborate), nickel borate (e.g., nickel orthoborate, nickel diborate, nickel tetraborate, or nickel octaborate), barium borate (e.g., barium orthoborate, barium metaborate, barium diborate, or barium tetraborate), bismuth borate, magnesium borate (e.g., magnesium orthoborate, magnesium diborate, magnesium metaborate, trimagnesium tetraborate, or pentamagnesium tetraborate), manganese borate (e.g., manganous borate, manganese metaborate, or manganese tetraborate), lithium borate (e.g., lithium metaborate, lithium tetraborate, or lithium pentaborate), and borate minerals, such as borax, kernite, inyoite, ketoite, suanite, and szaibelyite. Of those, borax, boric acid, sodium borate, potassium borate, zinc borate, calcium borate, and magnesium borate are preferred, boric acid, sodium borate, and zinc borate are particularly preferred, and boric acid is further particularly preferred.

The content of the boric acid and/or the salt thereof (F) in terms of boron is typically from 0.001 ppm to 1,000 ppm, preferably from 0.001 ppm to 600 ppm, more preferably from 0.001 ppm to 500 ppm, still more preferably from 0.01 ppm to 400 ppm, particularly preferably from 0.05 ppm to 330 ppm, more particularly preferably from 0.1 ppm to 250 ppm, further particularly preferably from 1 ppm to 120 ppm with respect to the total sum of the contents of the EVOH (A), the acetic acid and/or the salt thereof (B), the aliphatic carboxylic acid (C), the aliphatic carboxylic acid metal salt (D), and the boric acid and/or the salt thereof (F).

When such content is excessively small, there is a tendency that the effects (impact resistance-improving effect and flow stability-improving effect) of the present disclosure are not sufficiently obtained. When the content is excessively large, there is a tendency that the color tone of the EVOH resin composition reduces, or a fish eye frequently occurs in the composition at the time of its multilayer film formation to make it impossible to sufficiently obtain the effects (impact resistance-improving effect and flow stability-improving effect) of the present disclosure.

In addition, although the reason why the use of a specific amount of the boric acid and/or the salt thereof (F) provides an excellent effect is unclear, the following assumption is made. The boric acid and/or the salt thereof (F) dispersed in the EVOH resin composition interacts with EVOH molecular chains to form a crosslinked structure between the EVOH molecular chains.

Accordingly, at the time of the multilayer coextrusion of the EVOH resin composition, the formation of the higher-order structure of the EVOH resin composition, such as molecular orientation or a crystal structure, is more significantly accelerated, and hence, as a result, the mechanical property (impact resistance) of the composition is significantly improved.

In addition, it is assumed that the boric acid and/or the salt thereof (F) captures the thermally decomposed product of the aliphatic carboxylic acid metal salt (D) and the thermally decomposed product of the EVOH (A), which have not been completely captured by the acetic acid and/or the salt thereof (B), to suppress a reduction in color tone of the composition.

The content of the boric acid and/or the salt thereof (F) in terms of boron may be measured by a known analysis method. For example, the following may be performed: after the EVOH resin composition has been subjected to wet decomposition, the volume of the decomposed product is made constant, and the boron amount of a test liquid thus obtained is determined by inductively coupled plasma-atomic emission spectroscopy (ICP-AES).

In the EVOH resin composition of the present disclosure, the ratio ((D)/(B)) of the content of the aliphatic carboxylic acid metal salt (D) in terms of metal ion to the content of the acetic acid and/or the salt thereof (B) in terms of acetic acid ion satisfies the following formula (1) on a weight basis.

$$0.001 \leq \text{(content of } (D) \text{ in terms of metal ion/content of } (B) \text{ in terms of acetic acid ion)} \leq 1.30 \quad (1)$$

The ratio satisfies a relationship of preferably $0.005 \leq ((D)/(B)) \leq 1.1$, more preferably $0.005 \leq ((D)/(B)) \leq 1.0$, still more preferably $0.01 \leq ((D)/(B)) \leq 0.8$, particularly preferably $0.04 \leq ((D)/(B)) \leq 0.48$, further particularly preferably $0.05 \leq ((D)/(B)) \leq 0.45$. When such value falls within the ranges, the effects of the present disclosure tend to be more significantly obtained. When the value falls short of the ranges, there is a tendency that the effects of the present disclosure are not sufficiently obtained. When the value exceeds the ranges, there is a tendency that the color tone stability of the composition at the time of its melt forming is insufficient, or the adhesive strength thereof becomes insufficient.

In the EVOH resin composition of the present disclosure, the ratio ((D)/(C)) of the content of the aliphatic carboxylic acid metal salt (D) in terms of metal ion to the content of the aliphatic carboxylic acid (C) in terms of carboxylic acid ion satisfies the following formula (2) on a weight basis.

$$0.11 \leq \text{(content of } (D) \text{ in terms of metal ion/content of } (C) \text{ in terms of carboxylic acid ion)} \leq 100 \quad (2)$$

The ratio satisfies a relationship of preferably $0.13 \leq ((D)/(C)) \leq 90$, more preferably $0.15 \leq ((D)/(C)) \leq 80$, particularly preferably $0.2 \leq ((D)/(C)) \leq 70$. When such value falls within the ranges, the effects of the present disclosure tend to be more significantly obtained. When the value falls short of the ranges, there is a tendency that the color tone stability of the composition at the time of its melt forming is insufficient, or the effects of the present disclosure are not sufficiently obtained. When the value exceeds the ranges, there is a tendency that the color tone stability of the composition at the time of its melt forming is insufficient, or the formability thereof becomes insufficient.

In the EVOH resin composition of the present disclosure, the ratio ((D)/(F)) of the content of the aliphatic carboxylic acid metal salt (D) in terms of metal ion to the content of the boric acid and/or the salt thereof (F) in terms of boron satisfies the following formula (4) on a weight basis.

$$0.11 \leq \text{(content of } (D) \text{ in terms of metal ion/content of } (F) \text{ in terms of boron)} \leq 100 \qquad (4)$$

The ratio satisfies a relationship of preferably $0.13 \leq ((D)/(F)) \leq 90$, particularly preferably $0.15 \leq ((D)/(F)) \leq 80$, further particularly preferably $0.2 \leq ((D)/(F)) \leq 70$. When such value falls within the ranges, the effects of the present disclosure tend to be more significantly obtained. When the value falls short of the ranges, there is a tendency that the color tone of the composition reduces, or a fish eye frequently occurs in the composition at the time of its multilayer film formation to make it impossible to sufficiently obtain the effect (impact resistance-improving effect) of the present disclosure. When the value exceeds the ranges, there is a tendency that the effect (impact resistance-improving effect) of the present disclosure is not sufficiently obtained.

Although the reason why an excellent effect is obtained when the contents of the acetic acid and/or the salt thereof (B), the aliphatic carboxylic acid (C), the aliphatic carboxylic acid metal salt (D), and the boric acid and/or the salt thereof (F) satisfy the formulae (1), (2), and (4) on a weight basis is unclear, the following assumption is made. While a specific amount of the aliphatic carboxylic acid (C) whose anion species is of the same species as the aliphatic carboxylic acid metal salt (D) has improving effects on the dispersibility and thermal stability of the aliphatic carboxylic acid metal salt (D), when the content of the aliphatic carboxylic acid (C) is excessively large, the aliphatic carboxylic acid (C) itself acts as a plasticizer, and hence the effect (impact resistance-improving effect) of the present disclosure is not sufficiently obtained. In addition, the following assumption is made. While a specific amount of the acetic acid and/or the salt thereof (B) captures the thermally decomposed product of the aliphatic carboxylic acid metal salt (D) to exhibit a suppressing effect on a reduction in adhesive strength of the EVOH resin composition, when the content of the acetic acid and/or the salt thereof (B) is excessively large, the thermal stability of the EVOH (A) is significantly reduced, and hence the color tone stability of the composition is liable to reduce, or the effect (impact resistance-improving effect) of the present disclosure is not sufficiently obtained. In addition, in the case where a specific amount of the boric acid and/or the salt thereof (F) is used, the following assumption is made. The boric acid and/or the salt thereof (F) dispersed in the EVOH resin composition interacts with EVOH molecular chains to form a crosslinked structure between the EVOH molecular chains. Accordingly, at the time of the multilayer coextrusion of the EVOH resin composition, the formation of the higher-order structure of the EVOH resin composition, such as molecular orientation or a crystal structure, is more significantly accelerated. Accordingly, as a result, as compared to the case where the aliphatic carboxylic acid metal salt (D) is used alone, the mechanical property (impact resistance) and fluidity of the composition are significantly improved. Further, the boric acid and/or the salt thereof (F) captures the thermally decomposed product of the aliphatic carboxylic acid metal salt (D) and the thermally decomposed product of the EVOH (A), which have not been completely captured by the acetic acid and/or the salt thereof (B), to exhibit a suppressing effect on a reduction in color tone of the composition. Meanwhile, when the content of the boric acid and/or the salt thereof (F) is excessively large, the following assumption is made. The crosslinked structure between the EVOH molecular chains is excessively formed, and hence a fish eye frequently occurs in the composition at the time of its multilayer film formation to make it impossible to sufficiently obtain the effects (impact resistance-improving effect and flow stability-improving effect) of the present disclosure. Alternatively, the color tone stability of the composition is liable to reduce owing to the thermal decomposition of the boric acid and/or the salt thereof (F) itself.

In addition, the elongation viscosity of the EVOH resin composition of the present disclosure at 210° C.; and 100 s$^{-1}$ preferably satisfies the following formula (II4) from the viewpoint of its impact resistance.

$$850 \leq \text{elongation viscosity [Pa·s]} \leq 48{,}000 \qquad (II4)$$

The elongation viscosity satisfies a relationship of more preferably $900 \leq \text{elongation viscosity [Pa·s]} \leq 30{,}000$, particularly preferably $950 \leq \text{elongation viscosity [Pa·s]} \leq 20{,}000$. When such value falls within the ranges, the effects of the present disclosure tend to be more significantly obtained. When the value falls short of the ranges, there is a tendency that the effects of the present disclosure are not sufficiently obtained. When the value exceeds the ranges, the formability of the composition at the time of its melt forming tends to be insufficient.

Although the reason why an excellent effect is obtained when the elongation viscosity of the EVOH resin composition of the present disclosure at 210° C.; and 100 s$^{-1}$ satisfies the formula (II4) is unclear, it is assumed that when the elongation viscosity of the EVOH resin composition of the present disclosure at 210° C.; and 100 s$^{-1}$ satisfies the formula (II4), the entangled structure of EVOH molecular chains moderately formed in the EVOH resin composition more significantly accelerates the formation of the higher-order structure of the EVOH resin composition, such as molecular orientation or a crystal structure, at the time of the multilayer coextrusion of the EVOH resin composition, and hence, as a result, the mechanical property (impact resistance) of the composition is significantly improved.

<Method of Evaluating Elongation Viscosity (Pa·s) of EVOH Resin Composition>

The same method as the elongation viscosity evaluation method described in the first mode may be used as a method of evaluating the elongation viscosity (Pa·s) of the EVOH resin composition of the present disclosure at 210° C.; and 100 s$^{-1}$.

<Other Thermoplastic Resin>

The EVOH resin composition of the present disclosure may contain any other thermoplastic resin as a resin component in addition to the EVOH (A) at a content typically in the range of 30 wt. % or less with respect to the EVOH (A).

The same resin as that described in the section <Other Thermoplastic Resin> described in the first mode may be used as the other thermoplastic resin.

<Other Additive>

The EVOH resin composition of the present disclosure may include an additive to be generally blended into an EVOH resin composition, for example, a known additive, such as heat stabilizer, an antioxidant, an antistatic agent, a colorant, a UV absorber, a lubricant (e.g., a saturated aliphatic amide (e.g., stearamide), an unsaturated fatty acid amide (e.g., oleamide), a bisfatty acid amide (e.g., ethylenebisstearamide), or a low-molecular weight polyolefin (e.g., low-molecular weight polyethylene or low-molecular weight polypropylene having a molecular weight of from about 500 to about 10,000)), a plasticizer (e.g., an aliphatic polyhydric alcohol, such as ethylene glycol, glycerin, or hexanediol), a light stabilizer, a surfactant, an antimicrobial, a desiccant, an insoluble inorganic salt (e.g., hydrotalcite), a filler (e.g., an inorganic filler), an antiblocking agent, a flame retardant, a crosslinking agent, a foaming agent, a crystal nucleating agent, an antifogging agent, an additive for biodegradation, a silane coupling agent, an oxygen absorber, phosphoric acid and/or a salt thereof, cinnamic acid and/or a salt thereof, a conjugated polyene compound, an enediol group-containing substance (e.g., a phenol such as propyl gallate), or an aldehyde compound (e.g., an unsaturated aldehyde, such as crotonaldehyde), to the extent that the effects of the present disclosure are not inhibited (e.g., at a content of typically 10 wt. % or less, preferably 5 wt. % or less of the EVOH resin composition). Those additives may be used alone or in combination thereof.

Specific examples of the phosphoric acid and/or the salt thereof may include phosphoric acid, sodium dihydrogen phosphate, disodium hydrogen phosphate, potassium dihydrogen phosphate, dipotassium hydrogen phosphate, tripotassium phosphate, calcium monohydrogen phosphate, calcium dihydrogen phosphate, tricalcium phosphate, magnesium phosphate, magnesium hydrogen phosphate, magnesium dihydrogen phosphate, zinc hydrogen phosphate, barium hydrogen phosphate, and manganese hydrogen phosphate. Those compounds may be used alone or in combination thereof. Of those, phosphoric acid, sodium dihydrogen phosphate, potassium dihydrogen phosphate, calcium dihydrogen phosphate, magnesium dihydrogen phosphate, and zinc hydrogen phosphate are preferred, phosphoric acid, sodium dihydrogen phosphate, calcium dihydrogen phosphate, and magnesium dihydrogen phosphate are particularly preferred, and phosphoric acid is further particularly preferred.

In ordinary cases, the content of the phosphoric acid and/or the salt thereof in terms of phosphorus is preferably 900 ppm or less, more preferably from 0.01 ppm to 700 ppm, still more preferably from 0.1 ppm to 500 ppm, particularly preferably from 1 ppm to 300 ppm with respect to the total sum of the contents of the EVOH (A), the acetic acid and/or the salt thereof (B), the aliphatic carboxylic acid (C), the aliphatic carboxylic acid metal salt (D), the boric acid and/or the salt thereof (F), and the phosphoric acid and/or the salt thereof.

Specific examples of the cinnamic acid and/or the salt thereof may include cis-cinnamic acid and trans-cinnamic acid, and trans-cinnamic acid is suitably used from the viewpoints of its stability and price. In addition, examples of the cinnamic acid salt include: cinnamic acid alkali metal salts, such as lithium cinnamate, sodium cinnamate, and potassium cinnamate; and cinnamic acid alkaline earth metal salts, such as magnesium cinnamate, calcium cinnamate, and barium cinnamate. Those cinnamic acids and/or salts thereof may be used alone or in combination thereof. Of those, trans-cinnamic acid is preferably used alone.

The content of the cinnamic acid and/or the salt thereof in terms of cinnamic acid ion is typically from 1 ppm to 1,200 ppm, preferably from 1 ppm to 1,000 ppm, more preferably from 10 ppm to 800 ppm, still more preferably from 15 ppm to 500 ppm with respect to the total sum of the contents of the EVOH (A), the acetic acid and/or the salt thereof (B), the aliphatic carboxylic acid (C), the aliphatic carboxylic acid metal salt (D), the boric acid and/or the salt thereof (F), and the cinnamic acid and/or the salt thereof.

The conjugated polyene compound is a compound having a so-called conjugated double bond, which is of a structure obtained by alternately connecting a carbon-carbon double bond and a carbon-carbon single bond, and has two or more carbon-carbon double bonds. The conjugated polyene compound may be a conjugated diene, which is of a structure obtained by alternately connecting two carbon-carbon double bonds and one carbon-carbon single bond, may be a conjugated triene, which is of a structure obtained by alternately connecting three carbon-carbon double bonds and two carbon-carbon single bonds, or may be a conjugated polyene compound, which is of a structure obtained by alternately connecting four or more carbon-carbon double bonds and three or more carbon-carbon single bonds. However, when the number of carbon-carbon double bonds to be conjugated is eight or more, concern is raised about the coloring of a formed product of the EVOH resin composition by the color of the conjugated polyene compound itself. Accordingly, a polyene having seven or less carbon-carbon double bonds to be conjugated is preferred. In addition, the plurality of conjugated double bonds each formed of two or more carbon-carbon double bonds may be present in a molecule of the compound without being conjugated with each other. For example, a compound having three conjugated trienes in one and the same molecule thereof, such as tung oil, is also included in the category of the conjugated polyene compound.

Specific examples of the conjugated polyene compound include: conjugated diene compounds each having two carbon-carbon double bonds, such as isoprene, myrcene, farnesene, cembrene, sorbic acid, a sorbic acid ester, a sorbic acid salt, and abietic acid; conjugated triene compounds each having three carbon-carbon double bonds, such as 1,3,5-hexatriene, 2,4,6-octatriene-1-carboxylic acid, eleostearic acid, tung oil, and cholecalciferol; and conjugated polyene compounds each having four or more carbon-carbon double bonds, such as cyclooctatetraene, 2,4,6,8-decatetraene-1-carboxylic acid, retinol, and retinoic acid. Those conjugated polyene compounds may be used alone or in combination thereof.

The content of the conjugated polyene compound is typically from 0.01 ppm to 10,000 ppm, preferably from 0.1 ppm to 1,000 ppm, particularly preferably from 0.5 ppm to 500 ppm with respect to the total sum of the contents of the EVOH (A), the acetic acid and/or the salt thereof (B), the aliphatic carboxylic acid (C), the aliphatic carboxylic acid metal salt (D), the boric acid and/or the salt thereof (F), and the conjugated polyene compound.

The heat stabilizer is, for example, an organic acid, such as propionic acid, butyric acid, lauric acid, stearic acid, oleic acid, or behenic acid (provided that when the organic acid is used as the aliphatic carboxylic acid (C), the acid is not included in the category of the heat stabilizer), or an alkali metal salt (e.g., sodium salt or potassium salt) or an alkaline earth metal salt (e.g., calcium salt or magnesium salt) of the organic acid for the purpose of improving various physical properties of the EVOH resin composition at the time of its melt forming, such as thermal stability. Those stabilizers may be used alone or in combination thereof.

<Method of Producing EVOH Resin Composition>

Although a method of producing the EVOH resin composition of the present disclosure is not particularly limited, examples thereof include the following methods (I) to (IV):

(I) a method including blending a pellet of the EVOH (A) with at least one kind selected from the group consisting of the acetic acid and/or the salt thereof (B), the aliphatic carboxylic acid (C), the aliphatic carboxylic acid metal salt (D), and the boric acid and/or the salt thereof (F) at a predetermined ratio, and dry-blending the materials (dry blending method);

(II) a method including immersing the pellet of the EVOH (A) in a solution containing at least one kind selected from the group consisting of the acetic acid and/or the salt thereof (B), the aliphatic carboxylic acid (C), the aliphatic carboxylic acid metal salt (D), and the boric acid and/or the salt thereof (F), and then drying the pellet (immersion method);

(III) a method including blending the EVOH (A) with at least one kind selected from the group consisting of the acetic acid and/or the salt thereof (B), the aliphatic carboxylic acid (C), the aliphatic carboxylic acid metal salt (D), and the boric acid and/or the salt thereof (F) at the time of the melt kneading of the EVOH, and then producing a pellet (melt kneading method); and (IV) a method including adding, to a solution containing the EVOH (A), at least one kind selected from the group consisting of the acetic acid and/or the salt thereof (B), the aliphatic carboxylic acid (C), the aliphatic carboxylic acid metal salt (D), and the boric acid and/or the salt thereof (F), mixing the materials, and then removing a solvent in the solution (solution mixing method).

Of those, the method (I) including blending the pellet of the EVOH (A) with at least one kind selected from the group consisting of the acetic acid and/or the salt thereof (B), the aliphatic carboxylic acid (C), the aliphatic carboxylic acid metal salt (D), and the boric acid and/or the salt thereof (F) at a predetermined ratio, and dry-blending the materials (dry blending method) is industrially preferred because the method is practical in terms of productivity and economical efficiency. The above-mentioned methods may be used in combination thereof. In addition, even when the above-mentioned other additive is blended, an EVOH resin composition including the other additive is obtained in conformity with any one of the methods (I) to (IV).

A known mixing apparatus, such as a rocking mixer, a ribbon blender, or a line mixer, may be used as means for the dry blending in the method (I).

At the time of the dry blending in the method (I), in order to improve the adhesive property of at least one kind of component selected from the group consisting of the acetic acid and/or the salt thereof (B), the aliphatic carboxylic acid (C), the aliphatic carboxylic acid metal salt (D), and the boric acid and/or the salt thereof (F), the water content of such pellet of the EVOH (A) is preferably adjusted to from 0.1 wt. % to 5 wt. % (more preferably from 0.5 wt. % to 4 wt. %, particularly preferably from 1 wt. % to 3 wt. %). When such water content is excessively small, there is a tendency that at least one kind selected from the group consisting of the acetic acid and/or the salt thereof (B), the aliphatic carboxylic acid (C), the aliphatic carboxylic acid metal salt (D), and the boric acid and/or the salt thereof (F) is liable to fall, and hence its adhesion distribution is liable to be nonuniform. In contrast, when the water content is excessively large, at least one kind selected from the group consisting of the acetic acid and/or the salt thereof (B), the aliphatic carboxylic acid (C), the aliphatic carboxylic acid metal salt (D), and the boric acid and/or the salt thereof (F) tends to agglomerate to make its adhesion distribution nonuniform.

The water content of the pellet of the EVOH (A) as used herein is measured and calculated by the following method.

[Method of Measuring Water Content]

The pellet of the EVOH (A) is weighed (W1: unit: g) in an electronic balance. After that, the pellet is loaded into a hot-air oven-type dryer maintained at 150° C.; and dried for 5 hours. Then, the pellet is further left to cool in a desiccator for 30 minutes. Its weight after the cooling is similarly weighed (W2: unit: g), and the water content is calculated from the following equation.

$$\text{Water content (\%)} = (W1 - W2)/W1 \times 100 \qquad \text{[Equation]}$$

In addition, the methods (I) and (II) each provide such a pellet that at least one kind of component selected from the group consisting of the acetic acid and/or the salt thereof (B), the aliphatic carboxylic acid (C), the aliphatic carboxylic acid metal salt (D), and the boric acid and/or the salt thereof (F) adheres to the outside of the pellet of the EVOH (A).

With regard to means for the melt kneading in the method (III), the melt kneading may be performed by using a known melt kneading apparatus, such as a kneader, a ruder, an extruder, a mixing roll, a Banbury mixer, or a plastomill. In ordinary cases, the melt kneading is preferably performed at from 150° C.; to 300° C. (more preferably from 180° C.; to 280° C.) for from about 1 minute to about 20 minutes. In particular, the use of a single-screw or twin-screw extruder is industrially advantageous because a pellet is easily obtained. In addition, a vent suction apparatus, a gear pump apparatus, a screen apparatus, or the like is preferably arranged as required. In particular, an EVOH resin composition alleviated in thermal coloration and thermal deterioration, and excellent in quality can be obtained by arranging one or more vent holes in an extruder to perform suction under reduced pressure for removing moisture and a by-product (e.g., a thermally decomposed low-molecular weight product) or by continuously supplying an inert gas, such as nitrogen, into a hopper for preventing the inclusion of oxygen into the extruder.

In addition, a method of supplying the materials including the EVOH (A) to the melt kneading apparatus, such as an extruder, is not particularly limited, and examples thereof may include: (1) a method including dry-blending the EVOH (A), and at least one kind selected from the group consisting of the acetic acid and/or the salt thereof (B), the aliphatic carboxylic acid (C), the aliphatic carboxylic acid metal salt (D), and the boric acid and/or the salt thereof (F), and collectively supplying the blend to the extruder; (2) a method including supplying the EVOH (A) to the extruder, melting the EVOH, and supplying at least one kind selected from the group consisting of the acetic acid and/or the salt thereof (B), the aliphatic carboxylic acid (C), the aliphatic carboxylic acid metal salt (D), and the boric acid and/or the salt thereof (F), which is in a solid state, to the molten EVOH (solid side-feed method); and (3) a method including supplying the EVOH (A) to the extruder, melting the EVOH, and supplying at least one kind selected from the group consisting of the acetic acid and/or the salt thereof (B), the aliphatic carboxylic acid (C), the aliphatic carboxylic acid metal salt (D), and the boric acid and/or the salt thereof (F), which is in a molten state, to the molten EVOH (melt side-feed method). Of those, the method (1) is practical in terms of, for example, simplicity of the apparatus and cost for the blend.

In addition, a known approach may be used as the method of producing the pellet after the melt kneading, and examples thereof include a strand cutting method and a hot cutting method (e.g., an in-air cutting method or an underwater cutting method). The strand cutting method is preferred in terms of industrial productivity.

A known good solvent for the EVOH only needs to be used as the solvent to be used in the solution mixing method serving as the method (IV). A mixed solvent of water and an aliphatic alcohol having 1 to 4 carbon atoms is typically used, and a mixed solvent of water and methanol is preferred. At the time of the dissolution of the EVOH (A) in the solvent, heating or pressurization may be arbitrarily performed, and the concentration of the solution is also arbitrary. The solution or paste having dissolved therein the EVOH (A) only needs to be blended with at least one kind selected from the group consisting of the acetic acid and/or the salt thereof (B), the aliphatic carboxylic acid (C), the aliphatic carboxylic acid metal salt (D), and the boric acid and/or the salt thereof (F). At this time, at least one kind selected from the group consisting of the acetic acid and/or the salt thereof (B), the aliphatic carboxylic acid (C), the aliphatic carboxylic acid metal salt (D), and the boric acid and/or the salt thereof (F) may be blended under the state of, for example, a solid, a solution, or a dispersion liquid.

After the blending, an EVOH resin composition solution or paste that has been uniformly stirred is pelletized by the above-mentioned known approach. The underwater cutting method is preferred in terms of industrial productivity. The resultant pellet is dried by a known approach.

As the shape of the pellet, for example, an arbitrary shape, such as a spherical shape, an oval shape, a columnar shape, a cubic shape, or a rectangular parallelepiped shape, may be adopted.

The pellet is typically of an oval shape or a columnar shape, and its size is as follows from the viewpoint of convenience when the pellet is used later as a forming material: when the pellet is of an oval shape, its shorter diameter is typically from 1 mm to 6 mm, preferably from 2 mm to 5 mm, and its longer diameter is typically from 1 mm to 6 mm, preferably from 2 mm to 5 mm. When the pellet is of a columnar shape, the diameter of its bottom surface is typically from 1 mm to 6 mm, preferably from 2 mm to 5 mm, and its length is typically from 1 mm to 6 mm, preferably from 2 mm to 5 mm.

Thus, the EVOH resin composition of the present disclosure can be obtained.

<Multilayer Structure>

A multilayer structure of the present disclosure includes at least one layer formed of the above-mentioned EVOH resin composition of the present disclosure. When the layer formed of the EVOH resin composition of the present disclosure (hereinafter simply referred to as "EVOH resin composition layer") is laminated on any other substrate, the layer can further improve the strength of the substrate or impart any other function to the substrate.

A thermoplastic resin other than the EVOH (hereinafter referred to as "other substrate resin") is preferably used as the substrate.

Examples of the other substrate resin include: (unmodified) polyolefin resins, such as polyethylene resins, for example, linear low-density polyethylene, low-density polyethylene, ultralow-density polyethylene, medium-density polyethylene, high-density polyethylene, ethylene-propylene (block and random) copolymers, and an ethylene-α-olefin (α-olefin having 4 to 20 carbon atoms) copolymer, polypropylene resins, for example, polypropylene and a propylene-α-olefin (α-olefin having 4 to 20 carbon atoms) copolymer, polybutene, polypentene, and a polycyclic olefin resin (a polymer having a cyclic olefin structure in at least one of a main chain and side chain thereof); polyolefin resins in a broad sense including modified olefin resins, such as unsaturated carboxylic acid-modified polyolefin resins obtained by graft-modifying those polyolefins with an unsaturated carboxylic acid or an ester thereof; an ionomer; an ethylene-vinyl acetate copolymer; an ethylene-acrylic acid copolymer; an ethylene-acrylic acid ester copolymer; a polyester resin; a polyamide resin (including a copolymerized polyamide); polyvinyl chloride; polyvinylidene chloride; an acrylic resin; a polystyrene resin; a vinyl ester resin; a polyester elastomer; a polyurethane elastomer; halogenated polyolefins, such as chlorinated polyethylene and chlorinated polypropylene; and aromatic or aliphatic polyketones. Those other substrate resins may be used alone or in combination thereof.

Of those, in consideration of hydrophobicity, a polyamide resin, a polyolefin resin, a polyester resin, and a polystyrene resin each serving as a hydrophobic resin are preferred, polyolefin resins, such as a polyethylene resin, a polypropylene resin, and a polycyclic olefin resin, and unsaturated carboxylic acid-modified polyolefin resins thereof are more preferred, and a polyolefin resin is particularly preferred.

The α-olefin of the polyolefin resin may be a plant-derived α-olefin derived from bioethanol, or may be a non-plant-derived, that is, petroleum-derived α-olefin, or these α-olefins may be used in combination thereof. A wide variety of α-olefins are each available as the petroleum-derived α-olefin, and hence the production of the polyolefin resin through use of any such α-olefin enables easy adjustment of the physical properties and the like of the resin. The use of the plant-derived α-olefin can further improve the biomass content of the final product, and hence can reduce an environmental load.

With regard to methods of producing plant-derived ethylene and the plant-derived α-olefin, the plant-derived ethylene and the plant-derived α-olefin (e.g., 1-butene or 1-hexene) may each be obtained as follows: a sugar solution or starch obtained from a plant such as sugarcane, corn, or a sweet potato is fermented with a microorganism such as yeast in accordance with a conventionally used method to produce bioethanol, and the bioethanol is heated in the presence of a catalyst to cause an intramolecular dehydration reaction or the like, thereby providing the ethylene or the α-olefin. Next, a plant-derived polyethylene resin may be produced by using the plant-derived ethylene and the plant-derived α-olefin thus obtained in the same manner as in the production of a petroleum-derived polyethylene resin.

Methods of producing the plant-derived ethylene, the plant-derived α-olefin, and the plant-derived polyethylene resin are described in detail in, for example, JP-A-2011-506628. The plant-derived polyethylene resin to be suitably used in the present disclosure is, for example, GREEN PE manufactured by Braskem S.A.

When the EVOH resin composition layer of the present disclosure is represented by "a" (a1, a2, . . . ), and the other substrate resin layer is represented by "b" (b1, b2, . . . ), for example, the following arbitrary combinations may each be adopted as the layered configuration of the multilayer structure of the present disclosure: a/b; b/a/b; a1/a2; a/b/a; a1/a2/b; a/b1/b2; a1/a2/a3; b2/b1/a/b1/b2; b1/b2/a1/a2/a3/b3/b4; and b2/b1/a1/b1/a1/b1/b2. In addition, the configuration of a layer to be laminated in one lamination direction with respect to the arbitrary EVOH resin composition layer (α) and the configuration of a layer to be laminated in the other direction with respect thereto may be identical (symmetrical) to each other, or may be different from (asymmetrical to) each other. Further, the thickness of the layer to be laminated in one lamination direction with respect to the arbitrary EVOH resin composition layer (α) and the thickness of the layer to be laminated in the other direction with respect thereto may be identical (symmetrical) to each other, or may be different from (asymmetrical to) each other.

In the layered configuration, an adhesive resin layer may be interposed between the respective layers as required. In the case of a multilayer structure including, on at least one surface of the EVOH resin composition layer of the present disclosure, the other substrate resin layer (i.e., the thermoplastic resin layer other than the EVOH) through intermediation of the adhesive resin layer, the effects of the present disclosure tend to be more effectively obtained.

In addition, when a recycled layer containing a mixture of the EVOH resin composition of the present disclosure and the other substrate resin, or of the other substrate resin and the adhesive resin, the layer being obtained by melting and forming an end portion, a defective product, and the like produced in a process for the production of the multilayer structure again, is represented by R, for example, the following combinations may each be adopted: b/R/a; a1/R/a2; b1/R/a/b2; b1/R1/a/R2/b2; b1/R1/b2/a1/a2/a3/b3/R2/b4; b1/a1/R/a2/b2; and b1/R1/a1/R2/a2/R3/b2. The layer number of the multilayer structure of the present disclosure is typically from 2 to 15, preferably from 3 to 10 in terms of total number.

With regard to the layered configuration of a multilayer structure in the multilayer structure of the present disclosure, a multilayer structure including at least a basic unit defined as follows as a constituent unit is preferred: the unit (b/a/b or b/adhesive resin layer/a/adhesive resin layer/b) of the multilayer structure, which includes the EVOH resin composition layer of the present disclosure as an intermediate layer and has the other substrate resin layers arranged as both outside layers of the intermediate layer, is defined as the basic unit.

A known resin may be used as the adhesive resin serving as a forming material for the adhesive resin layer, and only needs to be appropriately selected in accordance with the kind of the thermoplastic resin to be used for the other substrate resin layer. A typical example thereof may be a modified polyolefin polymer containing a carboxy group obtained by chemically bonding an unsaturated carboxylic acid or an anhydride thereof to a polyolefin resin through an addition reaction, a graft reaction, or the like. Examples thereof include maleic anhydride-graft-modified polyethylene, maleic anhydride-graft-modified polypropylene, maleic anhydride-graft-modified ethylene-propylene (block and random) copolymers, a maleic anhydride-graft-modified ethylene-ethyl acrylate copolymer, a maleic anhydride-graft-modified ethylene-vinyl acetate copolymer, a maleic anhydride-modified polycyclic olefin resin, and a maleic anhydride-graft-modified polyolefin resin. Those polymers may be used alone or in combination thereof.

At this time, the content of the unsaturated carboxylic acid or the anhydride thereof is typically from 0.001 wt. % to 3 wt. %, preferably from 0.01 wt. % to 1 wt. %, particularly preferably from 0.03 wt. % to 0.5 wt. % with respect to the total amount of the adhesive resin. When a modification amount in a modified product is small, the adhesion property of the resin tends to be insufficient. In contrast, when the modification amount is large, a crosslinking reaction tends to occur to deteriorate the formability thereof.

Any such adhesive resin may be blended with, for example, the EVOH (A), any other EVOH, a rubber-elastomer component, such as polyisobutylene or an ethylene-propylene rubber, and the resin of a polyolefin resin layer. In particular, the adhesive resin may be blended with a polyolefin resin different from the polyolefin resin serving as a base for the adhesive resin.

The other substrate resin and the adhesive resin layer may each contain, in addition to the acetic acid and/or the salt thereof (B), the aliphatic carboxylic acid (C), the aliphatic carboxylic acid metal salt (D), and the boric acid and/or the salt thereof (F) to be used in the present disclosure, a conventionally known additive, such as a plasticizer (e.g., ethylene glycol, glycerin, or hexanediol), a filler, a clay (e.g., montmorillonite), a colorant, an antioxidant, an antistatic agent, a lubricant (e.g., an alkali metal salt or alkaline earth metal salt of a higher fatty acid having 10 to 30 carbon atoms, a higher fatty acid ester (e.g., a methyl ester, isopropyl ester, butyl ester, or octyl ester of a higher fatty acid), a higher fatty acid amide (e.g., a saturated aliphatic amide, such as stearamide or behenamide, an unsaturated fatty acid amide, such as oleamide or erucamide, or a bisfatty acid amide, such as ethylenebisstearamide, ethylenebisoleamide, ethylenebiserucamide, or ethylenebislauramide), a low-molecular-weight polyolefin (e.g., a low-molecular-weight polyethylene or low-molecular-weight polypropylene having a molecular weight of from about 500 to about 10,000)), a fluoroethylene resin, a nucleating agent, a blocking inhibitor, a UV absorber, or a wax, to the extent that the gist of the present disclosure is not inhibited (e.g., 30 wt. % or less, preferably 10 wt. % or less). Those additives may be used alone or in combination thereof.

In addition, the resin to be used in the adhesive resin layer is preferably blended with at least one kind selected from the group consisting of the acetic acid and/or the salt thereof (B), the aliphatic carboxylic acid (C), the aliphatic carboxylic acid metal salt (D), and the boric acid and/or the salt thereof (F) in the present disclosure. In particular, when the adhesive resin layer adjacent to the resin composition layer of the present disclosure contains at least one kind selected from the group consisting of the aliphatic carboxylic acid (C) and the aliphatic carboxylic acid metal salt (D), a multilayer structure more excellent in impact resistance is obtained.

In cases where the multilayer structure is produced by laminating the EVOH resin composition of the present disclosure together with the other substrate resin (including the case where the adhesive resin layer is interposed), the lamination may be performed by a known method. Examples thereof include: a method involving melting and extruding the other substrate resin, and laminating the resultant on a film, sheet, or the like of the EVOH resin composition of the present disclosure; a method involving, in contrast to the foregoing, melting and extruding the EVOH resin composition of the present disclosure, and laminating the resultant on the other substrate resin; a method involving subjecting the EVOH resin composition of the present disclosure and the other substrate resin to coextrusion; a method involving producing each of a film (layer) formed of the EVOH resin composition of the present disclosure and the other substrate resin (layer), and subjecting the products to dry lamination with a known adhesive, such as an organotitanium compound, an isocyanate compound, a polyester compound, or a polyurethane compound; and a method involving applying a solution of the EVOH resin composition of the present disclosure onto the other substrate resin, and then removing a solvent. Of those, the method involving the coextrusion is preferred in consideration of cost and environmental viewpoints.

The multilayer structure, which may be used as it is in products of various shapes, is subjected to (heat) stretching treatment as required. The stretching treatment may be any one of uniaxial stretching and biaxial stretching. In the case of the biaxial stretching, any one of simultaneous stretching and sequential stretching is permitted. In addition, a method providing a high stretching ratio out of, for example, a roll stretching method, a tenter stretching method, a tubular stretching method, a stretching blow method, and a vacuum-pressure forming method may be adopted as a stretching method. A stretching temperature is selected from the range of typically from 40° C.; to 170° C., preferably from about 60° C.; to about 160° C. When the stretching temperature is excessively low, the stretchability of the multilayer structure tends to become unsatisfactory, and when the stretching temperature is excessively high, it tends to become difficult for the multilayer structure to maintain a stable stretched state.

Thermal fixing may be performed for the purpose of imparting dimensional stability to the multilayer structure after the stretching. The thermal fixing may be performed by well-known means and for example, the stretched multilayer structure (stretched film) is subjected to a heat treatment at typically from 80° C.; to 180° C., preferably from 100° C.; to 165° C.; for typically from about 2 seconds to about 600 seconds while its tense state is kept.

In addition, when a multilayer stretched film obtained by using the EVOH resin composition of the present disclosure is used as a shrinking film, in order that heat shrinkability may be imparted thereto, a treatment involving, for example, applying cold air to the film after the stretching to cool and fix the film is desirably performed without the performance of the thermal fixing.

Further, a multilayer container of a cup or tray shape may be obtained from the multilayer structure of the present disclosure. A drawing method is typically adopted as a method of producing the multilayer container, and specific examples thereof include a vacuum forming method, a pressure forming method, a vacuum-pressure forming method, and a plug-assisted vacuum-pressure forming method. Further, when a multilayer container of a tube or bottle shape is obtained from a multilayer parison (preliminarily molded product of a hollow tube shape before blowing), a blow molding method is adopted, and specific examples thereof include an extrusion blow molding method (of, for example, a twin-head type, a mold-transfer type, a parison shift type, a rotary type, an accumulator type, or a horizontal parison type), a cold parison-type blow molding method, an injection blow molding method, and a biaxial stretching blow molding method (e.g., an extrusion-type cold parison biaxial stretching blow molding method, an injection-type cold parison biaxial stretching blow molding method, or an injection molding in-line-type biaxial stretching blow molding method). The multilayer structure of the present disclosure may be subjected to, for example, a heat treatment, a cooling treatment, a rolling treatment, a printing treatment, a dry lamination treatment, a solution or melt coating treatment, bag-making processing, deep drawing processing, box processing, tube processing, or split processing as required.

The thickness of the multilayer structure (including a stretched multilayer structure) of the present disclosure, and the thicknesses of the resin composition layer, the other substrate resin layer, and the adhesive resin layer for forming the multilayer structure are appropriately set in accordance with, for example, the layered configuration of the structure, the kind of the substrate resin, the kind of the adhesive resin, the applications and packaging form of the structure, and physical properties that the structure is required to have.

The thickness of the multilayer structure (including the stretched multilayer structure) of the present disclosure is typically from 10 μm to 5,000 μm, preferably from 30 μm to 3,000 μm, particularly preferably from 50 μm to 2,000 μm. When the total thickness of the multilayer structure is excessively small, its gas barrier property tends to reduce. In addition, when the total thickness of the multilayer structure is excessively large, economical efficiency is unfavorable because the gas barrier property becomes excess performance and hence an unnecessary raw material is used. In addition, the thickness of the EVOH resin composition layer of the present disclosure in the multilayer structure is typically from 1 μm to 500 μm, preferably from 3 μm to 300 μm, particularly preferably from 5 μm to 200 μm, the thickness of the other substrate resin layer is typically from 5 μm to 3,000 μm, preferably from 10 μm to 2,000 μm, particularly preferably from 20 μm to 1,000 μm, and the thickness of the adhesive resin layer is typically from 0.5 μm to 250 μm, preferably from 1 μm to 150 μm, particularly preferably from 3 μm to 100 μm. When two or more layers of at least one kind selected from the group consisting of the EVOH resin composition layer, the adhesive resin layer, and the other substrate resin layer are present, the following numerical values are each a value obtained by totaling the thicknesses of the layers of the same kind.

Further, a ratio (EVOH resin composition layer/other substrate resin layer) between their thicknesses is typically from 1/99 to 50/50, preferably from 5/95 to 45/55, particularly preferably from 10/90 to 40/60, in terms of ratio between the thicknesses of the layers having the largest thicknesses in a case where two or more layers of the same kind are present. In addition, a ratio (EVOH resin composition layer/adhesive resin layer) between their thicknesses is typically from 10/90 to 99/1, preferably from 20/80 to 95/5, particularly preferably from 50/50 to 90/10, in terms of ratio between the thicknesses of the layers having the largest thicknesses in a case where two or more layers of the same kind are present.

<<Third Mode in which the Component (A) is Two or More Kinds of EVOHs Having Different Ethylene Structural Unit Contents>>

In addition, the EVOH is a resin that is hardly stretched as compared to any other thermoplastic resin. Accordingly, when the forming of a film, a sheet, a container, or the like out of the EVOH is accompanied by heat stretching treatment, there has been a problem in that an appearance failure occurs. Accordingly, the stretchability of the EVOH needs to be improved so that the EVOH can follow the elongation of the other thermoplastic resin.

In addition, in general, as the ethylene structural unit content (hereinafter sometimes simply referred to as "ethylene content") of the EVOH becomes higher, the stretchability thereof tends to be more excellent. Meanwhile, as the ethylene content becomes higher, the gas barrier property thereof reduces. To achieve both of the gas barrier property and the stretchability, combined use of an EVOH having a low ethylene content and an EVOH having a high ethylene content has been proposed.

In, for example, PTL 6, there is a proposal of a composition using EVOHs different from each other in ethylene content and saponification degree in combination. In PTL 6, there is a description that a formed article obtained by subjecting a laminate, which was obtained by laminating the EVOH resin composition in which a difference in ethylene content between the two kinds of EVOHs to be used in combination was 4 mol % or more, a difference in saponification degree therebetween was 3 mol % or more, and a difference in solubility parameter therebetween was a predetermined value or more as an intermediate layer together with a polystyrene layer, to vacuum-pressure forming was excellent in transparency and appearance, was free of a crack and thickness unevenness, and was also excellent in gas barrier property.

[PTL 6] JP-A-SHO63(1988)-230757

In each of PTLs 1 to 4 described above, however, part of the EVOH is replaced with a resin other than the EVOH before its blending into the resin composition. Accordingly, there is a tendency that the ratio of the EVOH in the resin composition reduces, and hence a gas barrier property derived from the EVOH reduces. In PTL 6 described above, the impact resistance of the composition tends to be insufficient, though the composition is excellent in stretchability (secondary formability).

In addition, in recent years, along with, for example, widespread use of Internet shopping and economic development of developing countries, physical distribution has been rapidly becoming borderless, and hence the time period for which food, drugs, and the like are transported tends to lengthen. Accordingly, a multilayer structure (packaging material) formed of an EVOH resin composition having all of high impact resistance against falling or collision at the time of long-term transportation or during handling, a more excellent gas barrier property, and excellent secondary formability has been required.

In view of the foregoing, in the present disclosure, under such background, there is provided an EVOH resin composition, which is excellent in impact resistance and is also excellent in adhesive strength and secondary formability even without being blended with any resin other than an EVOH.

Thus, the inventors have made extensive investigations in view of such circumstances, and as a result, have found that an EVOH resin composition, which is excellent in impact resistance and adhesive strength when formed into a film, and is also excellent in color tone stability and secondary formability, is obtained by using two or more kinds of EVOHs having different ethylene structural unit contents in combination with acetic acid and/or a salt thereof, an aliphatic carboxylic acid other than acetic acid, and a metal salt of the aliphatic carboxylic acid including at least one kind of metal species selected from long Periodic Table 4th-period d-block elements.

That is, it has been generally known that a fatty acid metal salt accelerates the thermal decomposition of the EVOH to reduce the impact resistance and color tone of an EVOH resin composition to be obtained. Accordingly, when a person skilled in the art aims to improve the mechanical property (impact resistance) and color tone of the EVOH, the person avoids the blending of the EVOH with the fatty acid metal salt. However, the inventors have used the EVOH in combination with the acetic acid and/or the salt thereof, and the aliphatic carboxylic acid other than acetic acid and a specific metal salt thereof so that a specific relationship may be satisfied, and as a result, have found that the mechanical property (impact resistance) and color tone of the EVOH are improved contrary to customary expectations.

As described above, the present disclosure provides the following items <III-1> to <III-13>.
<III-1> An ethylene-vinyl alcohol copolymer resin composition, including: two or more kinds of ethylene-vinyl alcohol copolymers (A) having different ethylene structural unit contents; acetic acid and/or a salt thereof (B); an aliphatic carboxylic acid (C) other than acetic acid; and an aliphatic carboxylic acid metal salt (D) that is a metal salt of the aliphatic carboxylic acid (C), wherein a metal species of the aliphatic carboxylic acid metal salt (D) is at least one kind selected from long Periodic Table 4th-period d-block elements, and wherein respective contents of the acetic acid and/or the salt thereof (B), the aliphatic carboxylic acid (C), and the aliphatic carboxylic acid metal salt (D) satisfy the following formulae (1) and (2) on a weight basis.

$$0.001 \leq (\text{content of } (D) \text{ in terms of metal ion/content of } (B) \text{ in terms of acetic acid ion}) \leq 1.30 \quad (1)$$

$$0.11 \leq (\text{content of } (D) \text{ in terms of metal ion/content of } (C) \text{ in terms of carboxylic acid ion}) \leq 100 \quad (2)$$

<III-2> The ethylene-vinyl alcohol copolymer resin composition according to the item <III-1>, wherein the ethylene-vinyl alcohol copolymer having a highest ethylene structural unit content and the ethylene-vinyl alcohol copolymer having a lowest ethylene structural unit content in the two or more kinds of ethylene-vinyl alcohol copolymers (A) having different ethylene structural unit contents differ from each other in ethylene structural unit content by 3 mol % or more.
<III-3> The ethylene-vinyl alcohol copolymer resin composition according to the item <III-1> or <III-2>, wherein the content of the aliphatic carboxylic acid metal salt (D) in terms of metal ion is from 1 ppm to 500 ppm with respect to a total sum of contents of the ethylene-vinyl alcohol copolymer (A), the acetic acid and/or the salt thereof (B), the aliphatic carboxylic acid (C), and the aliphatic carboxylic acid metal salt (D).
<III-4> The ethylene-vinyl alcohol copolymer resin composition according to any one of the items <III-1> to <III-3>, wherein the content of the aliphatic carboxylic acid (C) in terms of carboxylic acid ion is from 0.001 ppm to 450 ppm with respect to a total sum of contents of the ethylene-vinyl alcohol copolymer (A), the acetic acid and/or the salt thereof (B), the aliphatic carboxylic acid (C), and the aliphatic carboxylic acid metal salt (D).
<III-5> The ethylene-vinyl alcohol copolymer resin composition according to any one of the items <III-1> to <III-4>, wherein the content of the acetic acid and/or the salt thereof (B) in terms of acetic acid ion is from 10 ppm to 2,000 ppm with respect to a total sum of contents of the ethylene-vinyl alcohol copolymer (A), the acetic acid and/or the salt thereof (B), the aliphatic carboxylic acid (C), and the aliphatic carboxylic acid metal salt (D).
<III-6> The ethylene-vinyl alcohol copolymer resin composition according to any one of the items <III-1> to <III-5>, wherein a ratio (content of acetic acid and/or salt thereof (B) in terms of acetic acid ion/content of aliphatic carboxylic acid (C) in terms of carboxylic acid ion) of the content of the acetic acid and/or the salt thereof (B) in terms of acetic acid ion to the content of the aliphatic carboxylic acid (C) in terms of carboxylic acid ion is from 0.0001 to 10,000 on a weight basis.
<III-7> The ethylene-vinyl alcohol copolymer resin composition according to any one of the items <III-1> to <III-6>, wherein an elongation viscosity of the ethylene-vinyl alcohol copolymer resin composition at 210° C.; and 100 s$^{-1}$ satisfies the following formula (3).

$$500 \leq \text{elongation viscosity [Pa·s]} \leq 48,000 \quad (3)$$

<III-8> The ethylene-vinyl alcohol copolymer resin composition according to any one of the items <III-1> to <III-7>, further including boric acid and/or a salt thereof (F), wherein a content of the boric acid and/or the salt thereof (F) in terms of boron is from 0.001 ppm to 500 ppm with respect to a total sum of contents of the ethylene-vinyl alcohol copolymer (A), the acetic acid and/or the salt thereof (B), the aliphatic carboxylic acid (C), the aliphatic carboxylic acid metal salt (D), and the boric acid and/or the salt thereof (F).

<III-9> The ethylene-vinyl alcohol copolymer resin composition according to any one of the items <III-1> to <III-8>, wherein a ratio (content of aliphatic carboxylic acid metal salt (D) in terms of metal ion/content of boric acid and/or salt thereof (F) in terms of boron) of the content of the aliphatic carboxylic acid metal salt (D) in terms of metal ion to a content of the boric acid and/or the salt thereof (F) in terms of boron is from 0.11 to 100 on a weight basis.

<III-10> A multilayer structure, including a layer formed of the ethylene-vinyl alcohol copolymer resin composition of any one of the items <III-1> to <III-9>.

<III-11> A multilayer container, including the multilayer structure of the item <III-10>.

<III-12> A method of producing a multilayer container, including subjecting the multilayer structure of the item <III-10> to vacuum forming, pressure forming, or vacuum-pressure forming at from 100° C. to 160° C.

<III-13> The method of producing a multilayer container according to the item <III-12>, wherein the multilayer container is of a cup shape or a tray shape.

The EVOH resin composition of the present disclosure is a resin composition, including: the two or more kinds of ethylene-vinyl alcohol copolymers having different ethylene structural unit contents, that is, two or more kinds of EVOHs (A) having different ethylene structural unit contents; the acetic acid and/or the salt thereof (B); the aliphatic carboxylic acid (C) other than acetic acid; and the aliphatic carboxylic acid metal salt (D) that is the metal salt of the aliphatic carboxylic acid (C), wherein the metal species of the aliphatic carboxylic acid metal salt (D) is at least one kind selected from the long Periodic Table 4th-period d-block elements, and wherein the respective contents of the acetic acid and/or the salt thereof (B), the aliphatic carboxylic acid (C), and the aliphatic carboxylic acid metal salt (D) satisfy the following formulae (1) and (2) on a weight basis. Accordingly, the composition is excellent in impact resistance and adhesive strength when formed into a film, and is also excellent in color tone stability and secondary formability even without being blended with any resin other than the EVOH.

$$0.001 \leq (\text{content of } (D) \text{ in terms of metal ion/content of } (B) \text{ in terms of acetic acid ion}) \leq 1.30 \quad (1)$$

$$0.11 \leq (\text{content of } (D) \text{ in terms of metal ion/content of } (C) \text{ in terms of carboxylic acid ion}) \leq 100 \quad (2)$$

In addition, when the ethylene-vinyl alcohol copolymer having the highest ethylene structural unit content and the ethylene-vinyl alcohol copolymer having the lowest ethylene structural unit content in the two or more kinds of ethylene-vinyl alcohol copolymers (A) having different ethylene structural unit contents differ from each other in ethylene structural unit content by 3 mol % or more, the EVOH resin composition is more excellent in secondary formability.

In addition, when the content of the aliphatic carboxylic acid metal salt (D) in terms of metal ion is from 1 ppm to 500 ppm with respect to the total sum of the contents of the ethylene-vinyl alcohol copolymer (A), the acetic acid and/or the salt thereof (B), the aliphatic carboxylic acid (C), and the aliphatic carboxylic acid metal salt (D), the EVOH resin composition is more excellent in impact resistance and adhesive strength.

In addition, when the content of the aliphatic carboxylic acid (C) in terms of carboxylic acid ion is from 0.001 ppm to 450 ppm with respect to the total sum of the contents of the ethylene-vinyl alcohol copolymer (A), the acetic acid and/or the salt thereof (B), the aliphatic carboxylic acid (C), and the aliphatic carboxylic acid metal salt (D), the EVOH resin composition is more excellent in impact resistance and color tone stability.

In addition, when the content of the acetic acid and/or the salt thereof (B) in terms of acetic acid ion is from 10 ppm to 2,000 ppm with respect to the total sum of the contents of the ethylene-vinyl alcohol copolymer (A), the acetic acid and/or the salt thereof (B), the aliphatic carboxylic acid (C), and the aliphatic carboxylic acid metal salt (D), the EVOH resin composition is more excellent in impact resistance and adhesive strength when formed into a film, and is also excellent in color tone stability.

In addition, when the ratio (content of acetic acid and/or salt thereof (B) in terms of acetic acid ion/content of aliphatic carboxylic acid (C) in terms of carboxylic acid ion) of the content of the acetic acid and/or the salt thereof (B) in terms of acetic acid ion to the content of the aliphatic carboxylic acid (C) in terms of carboxylic acid ion is from 0.0001 to 10,000 on a weight basis, the EVOH resin composition is more excellent in impact resistance when formed into a film, and is also excellent in color tone stability.

In addition, when the elongation viscosity of the ethylene-vinyl alcohol copolymer resin composition at 210° C.; and 100 s$^{-1}$ satisfies the following formula (3), the composition is more excellent in impact resistance when formed into a film.

$$500 \leq \text{elongation viscosity [Pa·s]} \leq 48,000 \quad (3)$$

In addition, when the ethylene-vinyl alcohol copolymer resin composition further includes boric acid and/or a salt thereof (F), and the content of the boric acid and/or the salt thereof (F) in terms of boron is from 0.001 ppm to 500 ppm with respect to the total sum of the contents of the ethylene-vinyl alcohol copolymer (A), the acetic acid and/or the salt thereof (B), the aliphatic carboxylic acid (C), the aliphatic carboxylic acid metal salt (D), and the boric acid and/or the salt thereof (F), the composition is more excellent in impact resistance and adhesive strength when formed into a film, and is also excellent in color tone stability and adhesive strength.

In addition, when the ratio (content of aliphatic carboxylic acid metal salt (D) in terms of metal ion/content of boric acid and/or salt thereof (F) in terms of boron) of the content of the aliphatic carboxylic acid metal salt (D) in terms of metal ion to the content of the boric acid and/or the salt thereof (F) in terms of boron is from 0.11 to 100 on a weight basis, the EVOH resin composition is more excellent in impact resistance when formed into a film, and is also excellent in color tone stability.

In addition, the multilayer structure, which is obtained by using the EVOH resin composition, is an excellent multilayer structure, which is excellent in mechanical property (impact resistance), and in which a reduction in color tone at the time of melt forming and reductions in secondary formability and adhesive strength are alleviated.

In addition, the multilayer container of the present disclosure includes the multilayer structure, and hence, similarly, the multilayer container to be obtained is excellent in impact resistance and adhesive strength, and is also excellent in color tone stability.

In addition, the present disclosure provides the method of producing a multilayer container, including subjecting the multilayer structure to vacuum forming, pressure forming, or vacuum-pressure forming at from 100° C.; to 160° C., and the method of producing a multilayer container, in which the multilayer container is of a cup shape or a tray shape.

The present disclosure is described in detail below. However, the following description describes an example of a desired embodiment of the present disclosure.

An EVOH resin composition of the present disclosure includes two or more kinds of EVOHs (A) having different ethylene structural unit contents as a main component, and includes acetic acid and/or a salt thereof (B), an aliphatic carboxylic acid (C) other than acetic acid, and an aliphatic carboxylic acid metal salt (D) that is a metal salt of the aliphatic carboxylic acid (C). The base resin of the EVOH resin composition of the present disclosure is the two or more kinds of EVOHs (A) having different ethylene structural unit contents, and the content of the EVOHs (A) in the EVOH resin composition is typically 60 wt. % or more, preferably 70 wt. % or more, more preferably 80 wt. % or more, particularly preferably 90 wt. % or more. The respective constituent components are described below.

The term "and/or" as used herein means at least one of those described on the left and right sides of the term, and in, for example, the case of the term "X and/or Y", the term has the following three meanings: X alone, Y alone, and X and Y.

<Two or More Kinds of EVOHs Having Different Ethylene Structural Unit Contents>

In ordinary cases, the EVOH (A) to be used in the present disclosure is a resin obtained by copolymerizing ethylene and a vinyl ester monomer, and then saponifying the copolymer, and is a water-insoluble thermoplastic resin known as an ethylene-vinyl alcohol copolymer or an ethylene-vinyl acetate copolymer saponified product. An arbitrary known polymerization method, such as solution polymerization, suspension polymerization, or emulsion polymerization, may be used as a polymerization method. In general, however, solution polymerization involving using methanol as a solvent is used. The saponification of the resultant ethylene-vinyl ester copolymer may also be performed by a known method.

That is, the EVOH (A) to be used in the present disclosure contains an ethylene structural unit and a vinyl alcohol structural unit as main components, and contains a certain amount of a vinyl ester structural unit, which remains without being saponified. In general, the EVOH is also referred to as "ethylene-vinyl ester copolymer saponified product."

Vinyl acetate is typically used as the vinyl ester monomer because vinyl acetate is easily available from the market, and impurities can be treated with satisfactory efficiency at the time of its production. Examples of the vinyl ester monomer include aliphatic vinyl esters, such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters, such as vinyl benzoate. The vinyl ester-based monomer is an aliphatic vinyl ester having preferably 3 to 20 carbon atoms, more preferably 4 to 10 carbon atoms, particularly preferably 4 to 7 carbon atoms. Those vinyl ester monomers are typically used alone, but may be used in combination thereof as required.

The content of the ethylene structural unit in the EVOH (A) is a value measured on the basis of ISO 14663, and is typically from 20 mol % to 60 mol %, preferably from 21 mol % to 55 mol %, more preferably from 22 mol % to 50 mol %, particularly preferably from 23 mol % to 45 mol %. When such content is excessively small, the gas barrier property of the resin composition at the time of high humidity or the melt formability thereof tends to reduce. In contrast, when the content is excessively large, the gas barrier property thereof tends to reduce.

The saponification degree of a vinyl ester component in the EVOH (A) is a value measured on the basis of JIS K6726 (provided that the EVOH is turned into a solution by being uniformly dissolved in a mixed solvent of water and methanol), and is typically from 90 mol % to 100 mol %, preferably from 95 mol % to 100 mol %, particularly preferably from 99 mol % to 100 mol %. When such saponification degree is excessively low, the gas barrier property, thermal stability, moisture resistance, or the like of the resin composition tends to reduce.

In addition, the melt flow rate (MFR) (210° C., load: 2,160 g) of the EVOH (A) is typically from 0.5 g/10 min to 100 g/10 min, preferably from 1 g/10 min to 50 g/10 min, particularly preferably from 3 g/10 min to 35 g/10 min. When such MFR is excessively high, the film formability of the resin composition tends to reduce. In addition, when the MFR is excessively low, it tends to be difficult to perform the melt extrusion of the resin composition.

The EVOH (A) to be used in the present disclosure may further contain a structural unit derived from any one of the following comonomers in addition to the ethylene structural unit and the vinyl alcohol structural unit (including an unsaponified vinyl ester structural unit). Examples of the comonomer include: α-olefins, such as propylene, isobutene, α-octene, α-dodecene, and α-octadecene; hydroxy group-containing α-olefins, such as 3-buten-1-ol, 4-penten-1-ol, and 3-butene-1,2-diol, and hydroxy group-containing α-olefin derivatives, such as esterified products or acylated products of the α-olefins; hydroxymethylvinylidene diacetates, such as 1,3-diacetoxy-2-methylenepropane, 1,3-dipropionyloxy-2-methylenepropane, and 1,3-dibutyronyloxy-2-methylenepropane; an unsaturated carboxylic acid or a salt, partial alkyl ester, full alkyl ester, nitrile, amide, or anhydride thereof; an unsaturated sulfonic acid or a salt thereof; a vinylsilane compound; vinyl chloride; and styrene.

Further, an EVOH subjected to "post-modification", such as urethanation, acetalation, cyanoethylation, or oxyalkylenation, may be used as the EVOH (A).

In addition, out of such modified EVOHs (A) as described above, the EVOH (A) having a primary hydroxy group introduced into a side chain thereof by copolymerization is preferred because the secondary formability of the EVOH resin composition at the time of, for example, its stretching treatment or vacuum-pressure forming becomes satisfactory, and in particular, the EVOH (A) having a 1,2-diol structure in a side chain thereof is preferred.

In addition, the EVOH resin composition of the present disclosure may include, in addition to the two or more kinds of EVOHs (A) having different ethylene structural unit contents to be used in the present disclosure, any other EVOH different from these EVOHs. Examples of such other EVOH may include: an EVOH different from the EVOHs (A) in saponification degree; an EVOH different therefrom in melt flow rate (MFR) (210° C., load: 2,160 g); an EVOH having a copolymerizable component other than ethylene and the vinyl ester monomer different from those of the EVOHs (A); and an EVOH different therefrom in modification amount (e.g., an EVOH different therefrom in content of a structural unit containing a primary hydroxy group in a side chain thereof).

The two or more kinds of EVOHs (A) having different ethylene structural unit contents to be used in the present disclosure are a combination of EVOH resins selected from such EVOHs (A) as described above, and are such a combination of EVOHs that a difference in ethylene structural unit content (ΔEt) between the EVOH having the highest ethylene structural unit content and the EVOH having the lowest ethylene structural unit content is typically 3 mol % or more, preferably from 5 mol % to 30 mol %, particularly preferably from 10 mol % to 25 mol %. When the difference in ethylene structural unit content is excessively small, it tends to be difficult to maintain a balance between the secondary formability and gas barrier property of the EVOH resin composition. When the difference is excessively large, there is a tendency that compatibility between both the EVOHs reduces, and a stripe is liable to occur in the composition at the time of its secondary forming owing to a difference in stretchability therebetween, and as a result, the effect (impact resistance-improving effect) of the present disclosure is not sufficiently obtained.

Specifically, such a combination of an EVOH having a low ethylene structural unit content (low-ethylene EVOH (A1)) and an EVOH having a high ethylene content (high-ethylene EVOH (A2)) as described below is preferably used.

The ethylene structural unit content of the low-ethylene EVOH (A1) is from 20 mol % to 40 mol %, preferably from 22 mol % to 38 mol %, particularly preferably from 25 mol % to 33 mol %. When the ethylene content is excessively low, there is a tendency that the decomposition temperature and melting temperature of the EVOH are close to each other, and hence the melt forming of the EVOH resin composition becomes difficult. In contrast, when the ethylene content is excessively high, the gas barrier property of the composition tends to be insufficient.

In addition, the saponification degree of a vinyl ester component in the low-ethylene EVOH (A1) is typically 90 mol % or more, preferably from 95 mol % to 99.99 mol %, particularly preferably from 98 mol % to 99.99 mol %. When such saponification degree is excessively low, a gas barrier property-imparting effect exhibited by the low-ethylene EVOH tends to be insufficient.

Further, the melt flow rate (MFR) (210° C., load: 2,160 g) of the low-ethylene EVOH (A1) is typically from 1 g/10 min to 100 g/10 min, preferably from 3 g/10 min to 50 g/10 min, particularly preferably from 3 g/10 min to 10 g/10 min. When the MFR is excessively large, the mechanical strength of a formed product of the EVOH resin composition tends to reduce. When the MFR is excessively small, the extrudability of the composition tends to reduce.

Meanwhile, the ethylene content of the high-ethylene EVOH (A2) is typically from 40 mol % to 60 mol %, preferably from 42 mol % to 56 mol %, particularly preferably from 44 mol % to 53 mol %. When the ethylene content is excessively low, the secondary formability of the EVOH resin composition tends to be insufficient. In contrast, when the ethylene content is excessively high, the gas barrier property thereof tends to be insufficient.

In addition, the saponification degree of a vinyl ester component in the high-ethylene EVOH (A2) is typically 90 mol % or more, preferably from 93 mol % to 99.99 mol %, particularly preferably from 98 mol % to 99.99 mol %. When such saponification degree is excessively low, the gas barrier property of the high-ethylene EVOH resin tends to be insufficient.

Further, the melt flow rate (MFR) (210° C., load: 2,160 g) of the high-ethylene EVOH (A2) is typically from 1 g/10 min to 100 g/10 min, preferably from 3 g/10 min to 50 g/10 min, particularly preferably from 3 g/10 min to 30 g/10 min. When the MFR is excessively large, the mechanical strength of the formed product tends to reduce. When the MFR is excessively small, the extrudability tends to reduce.

For example, the blending ratio (A1/A2) (weight ratio) of the low-ethylene EVOH (A1) to the high-ethylene EVOH (A2) is typically from 90/10 to 60/40, preferably from 85/15 to 65/35, particularly preferably from 80/20 to 70/30. When the ratio of the low-ethylene EVOH (A1) is excessively small, the gas barrier property of the composition layer tends to be insufficient. When the ratio is excessively large, the secondary formability thereof tends to be insufficient.

<Acetic Acid and/or Salt Thereof (B)>

The EVOH resin composition of the present disclosure includes the acetic acid and/or the salt thereof (B). That is, the EVOH resin composition of the present disclosure includes at least one kind selected from the group consisting of acetic acid and acetic acid salts.

The same component as the component (B) described in the first mode may be used as the acetic acid and/or the salt thereof (B). Of those, acetic acid, sodium acetate, potassium acetate, calcium acetate, and magnesium acetate are preferred, acetic acid, sodium acetate, and potassium acetate are more preferred, acetic acid and sodium acetate are particularly preferred, and sodium acetate is further particularly preferred.

The content of the acetic acid and/or the salt thereof (B) in terms of acetic acid ion is typically from 10 ppm to 2,000 ppm, preferably from 15 ppm to 1,500 ppm, particularly preferably from 20 ppm to 1,000 ppm, further particularly preferably from 25 ppm to 650 ppm with respect to the total sum of the contents of the EVOHs (A), the acetic acid and/or the salt thereof (B), the aliphatic carboxylic acid (C), and the aliphatic carboxylic acid metal salt (D).

When such content is excessively small, there is a tendency that the adhesive strength of the EVOH resin composition is reduced by the thermally decomposed product of the aliphatic carboxylic acid metal salt (D), or the effects of the present disclosure are not sufficiently obtained. When the content is excessively large, there is a tendency that the color tone stability thereof at the time of its melt forming is liable to reduce, or the effects of the present disclosure are not sufficiently obtained.

The content of the acetic acid and/or the salt thereof (B) in terms of acetic acid ion may be measured by a known analysis method. For example, the content may be measured by using liquid chromatography-mass spectrometry (LC/MS) or gas chromatography-mass spectrometry (GC/MS).

<Aliphatic Carboxylic Acid (C) Other than Acetic Acid>

The EVOH resin composition of the present disclosure includes the aliphatic carboxylic acid (C) other than acetic acid and the same component as the component (C) described in the first mode may be used as the aliphatic carboxylic acid (C). The number of carbon atoms of the aliphatic carboxylic acid (C) is typically from 3 to 30, preferably from 4 to 22, more preferably from 4 to 20, particularly preferably from 5 to 14. When the number of carbon atoms of the aliphatic carboxylic acid (C) falls within the ranges, the effects of the present disclosure tend to be more effectively obtained.

The content of the aliphatic carboxylic acid (C) in terms of carboxylic acid ion is typically from 0.001 ppm to 950 ppm, preferably from 0.001 ppm to 450 ppm, more preferably from 0.01 ppm to 350 ppm, particularly preferably from 0.1 ppm to 250 ppm, further particularly preferably from 0.5 ppm to 200 ppm with respect to the total sum of the contents of the EVOHs (A), the acetic acid and/or the salt thereof (B), the aliphatic carboxylic acid (C), and the aliphatic carboxylic acid metal salt (D).

When such content is excessively small, there is a tendency that the thermal stability of the aliphatic carboxylic acid metal salt (D) becomes insufficient, and as a result, the effects of the present disclosure are not sufficiently obtained. When the content is excessively large, there is a tendency that the color tone stability of the EVOH resin composition at the time of its melt forming is liable to reduce, or the aliphatic carboxylic acid (C) itself acts as a plasticizer to make it impossible to sufficiently obtain the effects of the present disclosure.

The ratio (content of acetic acid and/or salt thereof (B) in terms of acetic acid ion/content of aliphatic carboxylic acid (C) in terms of carboxylic acid ion) of the content of the acetic acid and/or the salt thereof (B) in terms of acetic acid ion to the content of the aliphatic carboxylic acid (C) in terms of carboxylic acid ion is typically from 0.0001 to 10,000, preferably from 0.001 to 5,000, more preferably from 0.1 to 1,000, particularly preferably from 1 to 650, further particularly preferably from 1 to 600 on a weight basis.

When such content ratio falls within the above-mentioned ranges, the effects of the present disclosure tend to be more significantly obtained. When the ratio falls short of the ranges, there is a tendency that the color tone stability of the EVOH resin composition at the time of its melt forming is insufficient, or the adhesive strength thereof becomes insufficient. When the ratio exceeds the ranges, there is a tendency that the effects of the present disclosure are not sufficiently obtained.

<Aliphatic Carboxylic Acid Metal Salt (D)>

The EVOH resin composition of the present disclosure includes the aliphatic carboxylic acid metal salt (D) that is the metal salt of the aliphatic carboxylic acid (C) other than acetic acid. The same component as the component (D) described in the first mode may be used as the aliphatic carboxylic acid metal salt (D).

Although the reason why an excellent effect is obtained when the aliphatic carboxylic acid (C) and the anion species of the aliphatic carboxylic acid metal salt (D) are of the same species is unclear, it is assumed that when specific amounts of the aliphatic carboxylic acid (C) and the aliphatic carboxylic acid metal salt (D) are used in combination, the dispersibility of the aliphatic carboxylic acid metal salt (D) is significantly improved, and hence more excellent effects of the present disclosure are obtained. In addition, the following assumption is made. The aliphatic carboxylic acid (C) may interact with the metal species of the aliphatic carboxylic acid metal salt (D) to exist under a state like a metal complex. When the anion species of such aliphatic carboxylic acid metal salt (D) is of the same species as the aliphatic carboxylic acid (C), the metal complex can exist under a state that is more stable in terms of energy, and hence the metal complex is excellent in thermal stability even at the time of its melt forming. As a result, the mechanical property (impact resistance) of the EVOH resin composition is improved.

In addition, when the number of carbon atoms of each of the aliphatic carboxylic acid (C) and the aliphatic carboxylic acid metal salt (D) is typically from 3 to 30, preferably from 4 to 22, more preferably from 4 to 20, particularly preferably from 5 to 14, the mechanical property (impact resistance) tends to be more significantly improved. Although the reason for the foregoing is unclear, the following assumption is made. When the number of carbon atoms of each of the aliphatic carboxylic acid (C) and the aliphatic carboxylic acid metal salt (D) falls within the ranges, the aliphatic carboxylic acid (C) and the aliphatic carboxylic acid metal salt (D) are easily dispersed in the EVOH resin composition in a more uniform manner. Accordingly, as a result, the mechanical property (impact resistance) of the EVOH resin composition is more significantly improved.

In addition, when the aliphatic carboxylic acid metal salt (D) is used alone, the adhesive strength of the EVOH resin composition tends to reduce, though the impact resistance thereof is improved. Although the reason for the foregoing is unclear, it is assumed that when the aliphatic carboxylic acid metal salt (D) is used alone, the thermal stability of the salt itself is insufficient, and hence the adhesive strength is reduced by the thermally decomposed product of the aliphatic carboxylic acid metal salt (D) produced at the time of its melt forming. In contrast, in the present disclosure, the aliphatic carboxylic acid metal salt (D) and the acetic acid and/or the salt thereof (B) are used in combination. Accordingly, it is assumed that the thermally decomposed product of the aliphatic carboxylic acid metal salt (D) is dispersed in the composition while being captured by the acetic acid and/or the salt thereof (B), and hence a reduction in adhesive strength is suppressed.

The content of the aliphatic carboxylic acid metal salt (D) in terms of metal ion is typically from 1 ppm to 500 ppm, preferably from 5 ppm to 300 ppm, more preferably from 10 ppm to 250 ppm, particularly preferably from 10 ppm to 200 ppm, further particularly preferably from 30 ppm to 150 ppm with respect to the total sum of the contents of the EVOHs (A), the acetic acid and/or the salt thereof (B), the aliphatic carboxylic acid (C), and the aliphatic carboxylic acid metal salt (D). When the content of the aliphatic carboxylic acid metal salt (D) is excessively small, there is a tendency that the effects of the present disclosure are not sufficiently obtained. When the content is excessively large, there is a tendency that the adhesive strength of the EVOH resin composition reduces, or the color tone stability thereof at the time of its melt forming is liable to reduce.

The content of the aliphatic carboxylic acid (C) in terms of carboxylic acid ion and the content of the aliphatic carboxylic acid metal salt (D) in terms of metal ion may each be measured by a known analysis method. For example, the contents may be determined by using such methods as described below alone or in combination thereof.

(i) Content of aliphatic carboxylic acid metal salt (D) in terms of metal ion: A dry sample is precisely weighed, and is loaded into a platinum evaporating dish whose weight has been made constant, followed by carbonization with an electric heater. Next, the carbonized product is heated with a gas burner, and is baked until no smoke occurs. Further, the platinum evaporating dish is loaded into an electric furnace, and a temperature in the furnace is increased to completely ash the baked product. The ashed product is cooled, and then hydrochloric acid and pure water are added thereto, followed by heating with an electric heater to dissolve the ashed product in the mixture. The solution is poured into a measuring flask, and its volume is made constant with pure water. Thus, a sample for atomic absorption analysis is obtained. The amount of a metal in the sample for atomic absorption analysis is subjected to quantitative analysis by atomic absorption spectrophotometry. Thus, the content of the aliphatic carboxylic acid metal salt (D) in terms of metal ion can be determined.

(ii) Content of aliphatic carboxylic acid (C) in terms of carboxylic acid ion: First, the total sum (Cx) of the contents of the aliphatic carboxylic acid (C) and the metal salt (D) thereof in the EVOH resin composition in terms of carboxylic acid ion is determined by using, for example, liquid chromatography-mass spectrometry (LC/MS) or gas chromatography-mass spectrometry (GC/MS). After that, the content (Cy) of the aliphatic carboxylic acid metal salt (D) in terms of carboxylic acid ion is calculated from the content of the aliphatic carboxylic acid metal salt (D) in terms of metal ion described in the foregoing. Then, the content of the aliphatic carboxylic acid (C) in terms of carboxylic acid ion can be determined from a difference ((Cx)−(Cy)) between the total sum (Cx) of the contents of the aliphatic carboxylic acid (C) and the metal salt (D) thereof in terms of carboxylic acid ion, and the content (Cy) of the aliphatic carboxylic acid metal salt (D) in terms of carboxylic acid ion.

In the EVOH resin composition of the present disclosure, the ratio ((D)/(B)) of the content of the aliphatic carboxylic acid metal salt (D) in terms of metal ion to the content of the acetic acid and/or the salt thereof (B) in terms of acetic acid ion satisfies the following formula (1) on a weight basis.

$$0.001 \leq \text{(content of (D) in terms of metal ion/content of (B) in terms of acetic acid ion)} \leq 1.30 \quad (1)$$

The ratio satisfies a relationship of preferably $0.005 \leq ((D)/(B)) \leq 1.1$, more preferably $0.005 \leq ((D)/(B)) \leq 1.0$, still more preferably $0.01 \leq ((D)/(B)) \leq 0.8$, particularly preferably $0.04 \leq ((D)/(B)) \leq 0.48$, further particularly preferably $0.05 \leq ((D)/(B)) \leq 0.45$. When such value falls within the ranges, the effects of the present disclosure tend to be more significantly obtained. When the value falls short of the ranges, there is a tendency that the effects of the present disclosure are not sufficiently obtained. When the value exceeds the ranges, there is a tendency that the color tone stability of the composition at the time of its melt forming is insufficient, or the adhesive strength thereof becomes insufficient.

In the EVOH resin composition of the present disclosure, the ratio ((D)/(C)) of the content of the aliphatic carboxylic acid metal salt (D) in terms of metal ion to the content of the aliphatic carboxylic acid (C) in terms of carboxylic acid ion satisfies the following formula (2) on a weight basis.

$$0.11 \leq \text{(content of (D) in terms of metal ion/content of (C) in terms of carboxylic acid ion)} \leq 100 \quad (2)$$

The ratio satisfies a relationship of preferably $0.13 < ((D)/(C)) \leq 90$, more preferably $0.15 \leq ((D)/(C)) \leq 80$, particularly preferably $0.2 \leq ((D)/(C)) \leq 70$. When such value falls within the ranges, the effects of the present disclosure tend to be more significantly obtained. When the value falls short of the ranges, there is a tendency that the color tone stability of the composition at the time of its melt forming is insufficient, or the effects of the present disclosure are not sufficiently obtained. When the value exceeds the ranges, there is a tendency that the color tone stability of the composition at the time of its melt forming is insufficient, or the formability thereof becomes insufficient.

Although the reason why an excellent effect is obtained when the contents of the acetic acid and/or the salt thereof (B), the aliphatic carboxylic acid (C), and the aliphatic carboxylic acid metal salt (D) satisfy the formulae (1) and (2) on a weight basis is unclear, the following assumption is made. While a specific amount of the aliphatic carboxylic acid (C) whose anion species is of the same species as the aliphatic carboxylic acid metal salt (D) has improving effects on the dispersibility and thermal stability of the aliphatic carboxylic acid metal salt (D), when the content of the aliphatic carboxylic acid (C) is excessively large, the aliphatic carboxylic acid (C) itself acts as a plasticizer, and hence the effect (impact resistance-improving effect) of the present disclosure is not sufficiently obtained. In addition, the following assumption is made. While a specific amount of the acetic acid and/or the salt thereof (B) captures the thermally decomposed product of the aliphatic carboxylic acid metal salt (D) to exhibit a suppressing effect on a reduction in adhesive strength of the EVOH resin composition, when the content of the acetic acid and/or the salt thereof (B) is excessively large, the thermal stability of the EVOH (A) is significantly reduced, and hence the color tone stability of the composition is liable to reduce, or the effect (impact resistance-improving effect) of the present disclosure is not sufficiently obtained.

In addition, the elongation viscosity of the EVOH resin composition of the present disclosure at 210° C.; and 100 s$^{-1}$ preferably satisfies the following formula (3) from the viewpoint of its impact resistance.

$$500 \leq \text{elongation viscosity [Pa·s]} \leq 48{,}000 \quad (3)$$

The elongation viscosity satisfies a relationship of more preferably $700 \leq \text{elongation viscosity [Pa·s]} \leq 30{,}000$, particularly preferably $800 \leq \text{elongation viscosity [Pa·s]} \leq 20{,}000$, further particularly preferably $850 \leq \text{elongation viscosity [Pa·s]} \leq 20{,}000$. When such value falls within the ranges, the effects of the present disclosure tend to be more significantly obtained. When the value falls short of the ranges, there is a tendency that the effects of the present disclosure are not sufficiently obtained. When the value exceeds the ranges, the formability of the composition at the time of its melt forming tends to be insufficient.

Although the reason why an excellent effect is obtained when the elongation viscosity of the EVOH resin composition of the present disclosure at 210° C.; and 100 s$^{-1}$ satisfies the formula (3) is unclear, it is assumed that when the elongation viscosity of the EVOH resin composition of the present disclosure at 210° C. and 100 s$^{-1}$ satisfies the formula (3), the entangled structure of EVOH molecular chains moderately formed in the EVOH resin composition more significantly accelerates the formation of the higher-order structure of the EVOH resin composition, such as molecular orientation or a crystal structure, at the time of the multilayer coextrusion of the EVOH resin composition, and hence, as a result, the mechanical property (impact resistance) of the composition is significantly improved.

<Method of Evaluating Elongation Viscosity (Pa·s) of EVOH Resin Composition>

The same method as the elongation viscosity evaluation method described in the first mode may be used as a method of evaluating the elongation viscosity (Pa·s) of the EVOH resin composition of the present disclosure at 210° C.; and 100 s$^{-1}$.

<Boric Acid and/or Salt Thereof (F)>

The EVOH resin composition of the present disclosure preferably includes the boric acid and/or the salt thereof (F). That is, the EVOH resin composition of the present disclosure preferably includes at least one kind selected from the group consisting of boric acid and boric acid salts.

Typical examples of the boric acid and/or the salt thereof (F) include boric acid, metal salts of boric acid, such as calcium borate, cobalt borate, zinc borate (e.g., zinc tetraborate or zinc metaborate), aluminum potassium borate, ammonium borate (e.g., ammonium metaborate, ammonium tetraborate, ammonium pentaborate, or ammonium octaborate), cadmium borate (e.g., cadmium orthoborate or cadmium tetraborate), potassium borate (e.g., potassium metaborate, potassium tetraborate, potassium pentaborate, potassium hexaborate, or potassium octaborate), silver borate (e.g., silver metaborate or silver tetraborate), copper borate (e.g., cupric borate, copper metaborate, or copper tetraborate), sodium borate (e.g., sodium metaborate, sodium diborate, sodium tetraborate, sodium pentaborate, sodium hexaborate, or sodium octaborate), lead borate (e.g., lead metaborate or lead hexaborate), nickel borate (e.g., nickel orthoborate, nickel diborate, nickel tetraborate, or nickel octaborate), barium borate (e.g., barium orthoborate, barium metaborate, barium diborate, or barium tetraborate), bismuth borate, magnesium borate (e.g., magnesium orthoborate, magnesium diborate, magnesium metaborate, trimagnesium tetraborate, or pentamagnesium tetraborate), manganese borate (e.g., manganous borate, manganese metaborate, or manganese tetraborate), lithium borate (e.g., lithium metaborate, lithium tetraborate, or lithium pentaborate), and borate minerals, such as borax, kernite, inyoite, ketoite, suanite, and szaibelyite. Of those, borax, boric acid, sodium borate, potassium borate, zinc borate, calcium borate, and magnesium borate are preferred, boric acid, sodium borate, and zinc borate are particularly preferred, and boric acid is further particularly preferred.

The content of the boric acid and/or the salt thereof (F) in terms of boron is typically from 0.001 ppm to 1,000 ppm, preferably from 0.001 ppm to 600 ppm, more preferably from 0.001 ppm to 500 ppm, still more preferably from 0.01 ppm to 400 ppm, particularly preferably from 0.05 ppm to 330 ppm, more particularly preferably from 0.1 ppm to 250 ppm, further particularly preferably from 1 ppm to 120 ppm with respect to the total sum of the contents of the EVOHs (A), the acetic acid and/or the salt thereof (B), the aliphatic carboxylic acid (C), the aliphatic carboxylic acid metal salt (D), and the boric acid and/or the salt thereof (F).

When such content is excessively small, there is a tendency that the effect (impact resistance-improving effect) of the present disclosure is not sufficiently obtained. When the content is excessively large, there is a tendency that the color tone of the EVOH resin composition reduces, or a fish eye frequently occurs in the composition at the time of its multilayer film formation to make it impossible to sufficiently obtain the effect (impact resistance-improving effect) of the present disclosure.

In addition, although the reason why the use of a specific amount of the boric acid and/or the salt thereof (F) provides an excellent effect is unclear, the following assumption is made. The boric acid and/or the salt thereof (F) dispersed in the EVOH resin composition interacts with EVOH molecular chains to form a crosslinked structure between the EVOH molecular chains. Accordingly, at the time of the secondary forming of a multilayer structure including the EVOH resin composition layer, the formation of the higher-order structure of the EVOH resin composition, such as molecular orientation or a crystal structure, is more significantly accelerated, and hence, as a result, the mechanical property (impact resistance) of the structure is significantly improved.

In addition, it is assumed that the boric acid and/or the salt thereof (F) captures the thermally decomposed product of the aliphatic carboxylic acid metal salt (D) and the thermally decomposed products of the EVOHs (A), which have not been completely captured by the acetic acid and/or the salt thereof (B), to suppress a reduction in color tone of the EVOH resin composition.

The content of the boric acid and/or the salt thereof (F) in terms of boron may be measured by a known analysis method. For example, the following may be performed: after the EVOH resin composition has been subjected to wet decomposition, the volume of the decomposed product is made constant, and the boron amount of a test liquid thus obtained is determined by inductively coupled plasma-atomic emission spectroscopy (ICP-AES).

The ratio ((D)/(F)) of the content of the aliphatic carboxylic acid metal salt (D) in terms of metal ion to the content of the boric acid and/or the salt thereof (F) in terms of boron is preferably from 0.11 to 100, more preferably from 0.13 to 90, particularly preferably from 0.15 to 80, further particularly preferably from 0.2 to 70 on a weight basis. When such value falls within the ranges, the effects of the present disclosure tend to be more significantly obtained. When the value falls short of the ranges, there is a tendency that the color tone of the EVOH resin composition reduces, or a fish eye frequently occurs in the composition at the time of its multilayer film formation to make it impossible to sufficiently obtain the effect (impact resistance-improving effect) of the present disclosure. When the value exceeds the ranges, there is a tendency that the effect (impact resistance-improving effect) of the present disclosure is not sufficiently obtained.

Although the reason why an excellent effect is obtained when the contents of the acetic acid and/or the salt thereof (B), the aliphatic carboxylic acid (C), the aliphatic carboxylic acid metal salt (D), and the boric acid and/or the salt thereof (F) satisfy specific ratio ranges on a weight basis is unclear, the following assumption is made. While a specific amount of the aliphatic carboxylic acid (C) whose anion species is of the same species as the aliphatic carboxylic acid metal salt (D) has improving effects on the dispersibility and thermal stability of the aliphatic carboxylic acid metal salt (D), when the content of the aliphatic carboxylic acid (C) is excessively large, the aliphatic carboxylic acid (C) itself acts as a plasticizer, and hence the effect (impact resistance-improving effect) of the present disclosure is not sufficiently obtained. In addition, the following assumption is made. While a specific amount of the acetic acid and/or the salt thereof (B) captures the thermally decomposed product of the aliphatic carboxylic acid metal salt (D) to exhibit a suppressing effect on a reduction in adhesive strength of the EVOH resin composition, when the content of the acetic acid and/or the salt thereof (B) is excessively large, the thermal stability of each of the EVOHs (A) is significantly reduced, and hence the color tone stability of the composition is liable to reduce, or the effect (impact resistance-improving effect) of the present disclosure is not sufficiently obtained. In addition, in the case where a specific amount of the boric acid and/or the salt thereof (F) is used, the following assumption is made. The boric acid and/or the salt thereof (F) dispersed in the EVOH resin composition interacts with EVOH molecular chains to form a crosslinked structure between the EVOH molecular chains. Accordingly, at the time of the secondary forming of a multilayer structure including the EVOH resin composition layer, the formation of the higher-order structure of the EVOH resin composition, such as molecular orientation or a crystal structure, is more significantly accelerated. Accordingly, as a result, as compared to the case where the aliphatic carboxylic acid metal salt (D) is used alone, the mechanical property (impact resistance) and fluidity of the composition are significantly improved. Further, the boric acid and/or the salt thereof (F) captures the thermally decomposed product of the aliphatic carboxylic acid metal salt (D) and the thermally decomposed products of the EVOHs (A), which have not been completely captured by the acetic acid and/or the salt thereof (B), to exhibit a suppressing effect on a reduction in color tone of the composition. Meanwhile, when the content of the boric acid and/or the salt thereof (F) is excessively large, the following assumption is made. The crosslinked structure between the EVOH molecular chains is excessively formed, and hence a fish eye frequently occurs in the composition at the time of its multilayer film formation to make it impossible to sufficiently obtain the effects (impact resistance-improving effect and flow stability-improving effect) of the present disclosure. Alternatively, the color tone stability of the composition is liable to reduce owing to the thermal decomposition of the boric acid and/or the salt thereof (F) itself.

<Other Thermoplastic Resin>

The EVOH resin composition of the present disclosure may contain any other thermoplastic resin as a resin component in addition to the EVOHs (A) at a content typically in the range of 30 wt. % or less with respect to the EVOHs (A).

The same resin as that described in the section <Other Thermoplastic Resin> described in the first mode may be used as the other thermoplastic resin.

<Other Additive>

The EVOH resin composition of the present disclosure may include an additive to be generally blended into an EVOH resin composition, for example, a known additive, such as heat stabilizer, an antioxidant, an antistatic agent, a colorant, a UV absorber, a lubricant (e.g., a saturated aliphatic amide (e.g., stearamide), an unsaturated fatty acid amide (e.g., oleamide), a bisfatty acid amide (e.g., ethylenebisstearamide), or a low-molecular weight polyolefin (e.g., low-molecular weight polyethylene or low-molecular weight polypropylene having a molecular weight of from about 500 to about 10,000)), a plasticizer, a light stabilizer, a surfactant, an antimicrobial, a desiccant, an insoluble inorganic salt (e.g., hydrotalcite), a filler (e.g., an inorganic filler), an antiblocking agent, a flame retardant, a crosslinking agent, a foaming agent, a crystal nucleating agent, an antifogging agent, an additive for biodegradation, a silane coupling agent, an oxygen absorber, phosphoric acid and/or a salt thereof, cinnamic acid and/or a salt thereof, a conjugated polyene compound, an enediol group-containing substance (e.g., a phenol, such as propyl gallate), or an aldehyde compound (e.g., an unsaturated aldehyde, such as crotonaldehyde), to the extent that the effects of the present disclosure are not inhibited (e.g., at a content of typically 10 wt. % or less, preferably 5 wt. % or less of the EVOH resin composition). Those additives may be used alone or in combination thereof.

Specific examples of the phosphoric acid and/or the salt thereof may include phosphoric acid, sodium dihydrogen phosphate, disodium hydrogen phosphate, potassium dihydrogen phosphate, dipotassium hydrogen phosphate, tripotassium phosphate, calcium monohydrogen phosphate, calcium dihydrogen phosphate, tricalcium phosphate, magnesium phosphate, magnesium hydrogen phosphate, magnesium dihydrogen phosphate, zinc hydrogen phosphate, barium hydrogen phosphate, and manganese hydrogen phosphate. Those compounds may be used alone or in combination thereof. Of those, phosphoric acid, sodium dihydrogen phosphate, potassium dihydrogen phosphate, calcium dihydrogen phosphate, magnesium dihydrogen phosphate, and zinc hydrogen phosphate are preferred, phosphoric acid, sodium dihydrogen phosphate, calcium dihydrogen phosphate, and magnesium dihydrogen phosphate are particularly preferred, and phosphoric acid is further particularly preferred.

In ordinary cases, the content of the phosphoric acid and/or the salt thereof in terms of phosphorus is preferably 900 ppm or less, more preferably from 0.01 ppm to 700 ppm, still more preferably from 0.1 ppm to 500 ppm, particularly preferably from 1 ppm to 300 ppm with respect to the total sum of the contents of the EVOHs (A), the acetic acid and/or the salt thereof (B), the aliphatic carboxylic acid (C), the aliphatic carboxylic acid metal salt (D), and the phosphoric acid and/or the salt thereof.

Specific examples of the cinnamic acid and/or the salt thereof may include cis-cinnamic acid and trans-cinnamic acid, and trans-cinnamic acid is suitably used from the viewpoints of its stability and price. In addition, examples of the cinnamic acid salt include: cinnamic acid alkali metal salts, such as lithium cinnamate, sodium cinnamate, and potassium cinnamate; and cinnamic acid alkaline earth metal salts, such as magnesium cinnamate, calcium cinnamate, and barium cinnamate. Those cinnamic acids and/or salts thereof may be used alone or in combination thereof. Of those, trans-cinnamic acid is preferably used alone.

The content of the cinnamic acid and/or the salt thereof in terms of cinnamic acid ion is typically from 1 ppm to 1,200 ppm, preferably from 1 ppm to 1,000 ppm, more preferably from 10 ppm to 800 ppm, still more preferably from 15 ppm to 500 ppm with respect to the total sum of the contents of the EVOHs (A), the acetic acid and/or the salt thereof (B), the aliphatic carboxylic acid (C), the aliphatic carboxylic acid metal salt (D), and the cinnamic acid and/or the salt thereof.

The conjugated polyene compound is a compound having a so-called conjugated double bond, which is of a structure obtained by alternately connecting a carbon-carbon double bond and a carbon-carbon single bond, and has two or more carbon-carbon double bonds. The conjugated polyene compound may be a conjugated diene, which is of a structure obtained by alternately connecting two carbon-carbon double bonds and one carbon-carbon single bond, may be a conjugated triene, which is of a structure obtained by alternately connecting three carbon-carbon double bonds and two carbon-carbon single bonds, or may be a conjugated polyene compound, which is of a structure obtained by alternately connecting four or more carbon-carbon double bonds and three or more carbon-carbon single bonds. However, when the number of carbon-carbon double bonds to be conjugated is eight or more, concern is raised about the coloring of a formed product of the EVOH resin composition by the color of the conjugated polyene compound itself. Accordingly, a polyene having seven or less carbon-carbon double bonds to be conjugated is preferred. In addition, the plurality of conjugated double bonds each formed of two or more carbon-carbon double bonds may be present in a molecule of the compound without being conjugated with each other. For example, a compound having three conjugated trienes in one and the same molecule thereof, such as tung oil, is also included in the category of the conjugated polyene compound.

Specific examples of the conjugated polyene compound include: conjugated diene compounds each having two carbon-carbon double bonds, such as isoprene, myrcene, farnesene, cembrene, sorbic acid, a sorbic acid ester, a sorbic acid salt, and abietic acid; conjugated triene compounds each having three carbon-carbon double bonds, such as 1,3,5-hexatriene, 2,4,6-octatriene-1-carboxylic acid, eleostearic acid, tung oil, and cholecalciferol; and conjugated polyene compounds each having four or more carbon-carbon double bonds, such as cyclooctatetraene, 2,4,6,8-decatetraene-1-carboxylic acid, retinol, and retinoic acid. Those conjugated polyene compounds may be used alone or in combination thereof.

The content of the conjugated polyene compound is typically from 0.01 ppm to 10,000 ppm, preferably from 0.1 ppm to 1,000 ppm, particularly preferably from 0.5 ppm to 500 ppm with respect to the total sum of the contents of the EVOHs (A), the acetic acid and/or the salt thereof (B), the aliphatic carboxylic acid (C), the aliphatic carboxylic acid metal salt (D), and the conjugated polyene compound.

The heat stabilizer is, for example, an organic acid, such as propionic acid, butyric acid, lauric acid, stearic acid, oleic acid, or behenic acid (provided that when the organic acid is used as the aliphatic carboxylic acid (C), the acid is not included in the category of the heat stabilizer), or an alkali metal salt (e.g., sodium salt or potassium salt) or an alkaline earth metal salt (e.g., calcium salt or magnesium salt) of the organic acid for the purpose of improving various physical properties of the EVOH resin composition at the time of its melt forming, such as thermal stability. Those stabilizers may be used alone or in combination thereof.

<Method of Producing EVOH Resin Composition>

Although a method of producing the EVOH resin composition of the present disclosure is not particularly limited, examples thereof include the following methods (I) to (IV):
(I) a method including blending a pellet of the EVOHs (A) with at least one kind selected from the group consisting of the acetic acid and/or the salt thereof (B), the aliphatic carboxylic acid (C), and the aliphatic carboxylic acid metal salt (D) at a predetermined ratio, and dry-blending the materials (dry blending method);
(II) a method including immersing the pellet of the EVOHs (A) in a solution containing at least one kind selected from the group consisting of the acetic acid and/or the salt thereof (B), the aliphatic carboxylic acid (C), and the aliphatic carboxylic acid metal salt (D), and then drying the pellet (immersion method);
(III) a method including blending the EVOHs (A) with at least one kind selected from the group consisting of the acetic acid and/or the salt thereof (B), the aliphatic carboxylic acid (C), and the aliphatic carboxylic acid metal salt (D) at the time of the melt kneading of the EVOHs, and then producing a pellet (melt kneading method); and
(IV) a method including adding, to a solution containing the EVOHs (A), at least one kind selected from the group consisting of the acetic acid and/or the salt thereof (B), the aliphatic carboxylic acid (C), and the aliphatic carboxylic acid metal salt (D), mixing the materials, and then removing a solvent in the solution (solution mixing method).

Of those, the method (I) including blending the pellet of the EVOHs (A) with at least one kind selected from the group consisting of the acetic acid and/or the salt thereof (B), the aliphatic carboxylic acid (C), and the aliphatic carboxylic acid metal salt (D) at a predetermined ratio, and dry-blending the materials (dry blending method) is industrially preferred because the method is practical in terms of productivity and economical efficiency. The above-mentioned methods may be used in combination thereof. In addition, even when the boric acid and/or the salt thereof (F), the phosphoric acid and/or the salt thereof (E), and the other additive are blended, an EVOH resin composition including the other additive is obtained in conformity with any one of the methods (I) to (IV).

A known mixing apparatus, such as a rocking mixer, a ribbon blender, or a line mixer, may be used as means for the dry blending in the method (I).

At the time of the dry blending in the method (I), in order to improve the adhesive property of at least one kind of component selected from the group consisting of the acetic acid and/or the salt thereof (B), the aliphatic carboxylic acid (C), and the aliphatic carboxylic acid metal salt (D), the water content of such pellet of the EVOHs (A) is preferably adjusted to from 0.1 wt. % to 5 wt. % (more preferably from 0.5 wt. % to 4 wt. %, particularly preferably from 1 wt. % to 3 wt. %). When such water content is excessively small, there is a tendency that at least one kind selected from the group consisting of the acetic acid and/or the salt thereof (B), the aliphatic carboxylic acid (C), and the aliphatic carboxylic acid metal salt (D) is liable to fall, and hence its adhesion distribution is liable to be nonuniform. In contrast, when the water content is excessively large, at least one kind selected from the group consisting of the acetic acid and/or the salt thereof (B), the aliphatic carboxylic acid (C), and the aliphatic carboxylic acid metal salt (D) tends to agglomerate to make its adhesion distribution nonuniform.

The water content of the pellet of the EVOHs (A) as used herein is measured and calculated by the following method.

[Method of measuring Water Content]

The pellet of the EVOHs (A) is weighed (W1: unit: g) in an electronic balance. After that, the pellet is loaded into a hot-air oven-type dryer maintained at 150° C.; and dried for 5 hours. Then, the pellet is further left to cool in a desiccator for 30 minutes. Its weight after the cooling is similarly weighed (W2: unit: g), and the water content is calculated from the following equation.

$$\text{Water content }(\%)=(W1-W2)/W1\times 100 \qquad \text{[Equation]}$$

In addition, the methods (I) and (II) each provide such a pellet that at least one kind of component selected from the group consisting of the acetic acid and/or the salt thereof (B), the aliphatic carboxylic acid (C), and the aliphatic carboxylic acid metal salt (D) adheres to the outside of the pellet of the EVOHs (A).

With regard to means for the melt kneading in the method (III), the melt kneading may be performed by using a known melt kneading apparatus, such as a kneader, a ruder, an extruder, a mixing roll, a Banbury mixer, or a plastomill. In ordinary cases, the melt kneading is preferably performed at from 150° C.; to 300° C. (more preferably from 180° C.; to 280° C.) for from about 1 minute to about 20 minutes. In particular, the use of a single-screw or twin-screw extruder is industrially advantageous because a pellet is easily obtained. In addition, a vent suction apparatus, a gear pump apparatus, a screen apparatus, or the like is preferably arranged as required. In particular, an EVOH resin composition alleviated in thermal coloration and thermal deterioration, and excellent in quality can be obtained by arranging one or more vent holes in an extruder to perform suction under reduced pressure for removing moisture and a by-product (e.g., a thermally decomposed low-molecular weight product) or by continuously supplying an inert gas, such as nitrogen, into a hopper for preventing the inclusion of oxygen into the extruder.

In addition, a method of supplying the materials including the EVOHs (A) to the melt kneading apparatus, such as an extruder, is not particularly limited, and examples thereof may include: (1) a method including dry-blending the EVOHs (A), and at least one kind selected from the group consisting of the acetic acid and/or the salt thereof (B), the aliphatic carboxylic acid (C), and the aliphatic carboxylic acid metal salt (D), and collectively supplying the blend to the extruder; (2) a method including supplying the EVOHs (A) to the extruder, melting the EVOHs, and supplying at least one kind selected from the group consisting of the acetic acid and/or the salt thereof (B), the aliphatic carboxylic acid (C), and the aliphatic carboxylic acid metal salt (D), which is in a solid state, to the molten EVOHs (solid side-feed method); and (3) a method including supplying the EVOHs (A) to the extruder, melting the EVOHs, and supplying at least one kind selected from the group consisting of the acetic acid and/or the salt thereof (B), the aliphatic carboxylic acid (C), and the aliphatic carboxylic acid metal salt (D), which is in a molten state, to the molten EVOHs (melt side-feed method). Of those, the method (1) is practical in terms of, for example, simplicity of the apparatus and cost for the blend.

In addition, a known approach may be used as the method of producing the pellet after the melt kneading, and examples thereof include a strand cutting method and a hot cutting method (e.g., an in-air cutting method or an underwater cutting method). The strand cutting method is preferred in terms of industrial productivity.

A known good solvent for the EVOH only needs to be used as the solvent to be used in the solution mixing method serving as the method (IV). A mixed solvent of water and an aliphatic alcohol having 1 to 4 carbon atoms is typically used, and a mixed solvent of water and methanol is preferred. At the time of the dissolution of the EVOHs (A) in the solvent, heating or pressurization may be arbitrarily performed, and the concentration of the solution is also arbitrary. The solution or paste having dissolved therein the EVOHs (A) only needs to be blended with at least one kind selected from the group consisting of the acetic acid and/or the salt thereof (B), the aliphatic carboxylic acid (C), and the aliphatic carboxylic acid metal salt (D). At this time, at least one kind selected from the group consisting of the acetic acid and/or the salt thereof (B), the aliphatic carboxylic acid (C), and the aliphatic carboxylic acid metal salt (D) may be blended under the state of, for example, a solid, a solution, or a dispersion liquid.

After the blending, an EVOH resin composition solution or paste that has been uniformly stirred is pelletized by the above-mentioned known approach. The underwater cutting method is preferred in terms of industrial productivity. The resultant pellet is dried by a known approach.

As the shape of the pellet, for example, an arbitrary shape, such as a spherical shape, an oval shape, a columnar shape, a cubic shape, or a rectangular parallelepiped shape, may be adopted. The pellet is typically of an oval shape or a columnar shape, and its size is as follows from the viewpoint of convenience when the pellet is used later as a forming material: when the pellet is of an oval shape, its shorter diameter is typically from 1 mm to 6 mm, preferably from 2 mm to 5 mm, and its longer diameter is typically from 1 mm to 6 mm, preferably from 2 mm to 5 mm. When the pellet is of a columnar shape, the diameter of its bottom surface is typically from 1 mm to 6 mm, preferably from 2 mm to 5 mm, and its length is typically from 1 mm to 6 mm, preferably from 2 mm to 5 mm.

Thus, the EVOH resin composition of the present disclosure can be obtained.

<Multilayer Structure>

A multilayer structure of the present disclosure includes at least one layer formed of the above-mentioned EVOH resin composition of the present disclosure. When the layer formed of the EVOH resin composition of the present disclosure (hereinafter simply referred to as "EVOH resin composition layer") is laminated on any other substrate, the layer can further improve the strength of the substrate or impart any other function to the substrate.

A thermoplastic resin other than the EVOH (hereinafter referred to as "other substrate resin") is preferably used as the substrate.

Examples of the other substrate resin include: (unmodified) polyolefin resins, such as polyethylene resins, for example, linear low-density polyethylene, low-density polyethylene, ultralow-density polyethylene, medium-density polyethylene, high-density polyethylene, ethylene-propylene (block and random) copolymers, and an ethylene-α-olefin (α-olefin having 4 to 20 carbon atoms) copolymer, polypropylene resins, for example, polypropylene and a propylene-α-olefin (α-olefin having 4 to 20 carbon atoms) copolymer, polybutene, polypentene, and a polycyclic olefin resin (a polymer having a cyclic olefin structure in at least one of a main chain and side chain thereof); polyolefin resins in a broad sense including modified olefin resins, such as unsaturated carboxylic acid-modified polyolefin resins obtained by graft-modifying those polyolefins with an unsaturated carboxylic acid or an ester thereof; an ionomer; an ethylene-vinyl acetate copolymer; an ethylene-acrylic acid copolymer; an ethylene-acrylic acid ester copolymer; a polyester resin; a polyamide resin (including a copolymerized polyamide); polyvinyl chloride; polyvinylidene chloride; an acrylic resin; a polystyrene resin; a vinyl ester resin; a polyester elastomer; a polyurethane elastomer; halogenated polyolefins, such as chlorinated polyethylene and chlorinated polypropylene; and aromatic or aliphatic polyketones. Those resins may be used alone or in combination thereof.

Of those, in consideration of hydrophobicity, a polyamide resin, a polyolefin resin, a polyester resin, and a polystyrene resin each serving as a hydrophobic resin are preferred, polyolefin resins, such as a polyethylene resin, a polypropylene resin, and a polycyclic olefin resin, and unsaturated carboxylic acid-modified polyolefin resins thereof are more preferred, and a polyolefin resin is particularly preferred.

The α-olefin of the polyolefin resin may be a plant-derived α-olefin derived from bioethanol, or may be a non-plant-derived, that is, petroleum-derived α-olefin, or these α-olefins may be used in combination thereof. A wide variety of α-olefins are each available as the petroleum-derived α-olefin, and hence the production of the polyolefin resin through use of any such α-olefin enables easy adjustment of the physical properties and the like of the resin. The use of the plant-derived α-olefin can further improve the biomass content of the final product, and hence can reduce an environmental load.

With regard to methods of producing plant-derived ethylene and the plant-derived α-olefin, the plant-derived ethylene and the plant-derived α-olefin (e.g., 1-butene or 1-hexene) may each be obtained as follows: a sugar solution or starch obtained from a plant such as sugarcane, corn, or a sweet potato is fermented with a microorganism such as yeast in accordance with a conventionally used method to produce bioethanol, and the bioethanol is heated in the presence of a catalyst to cause an intramolecular dehydration reaction or the like, thereby providing the ethylene or the α-olefin. Next, a plant-derived polyethylene resin may be produced by using the plant-derived ethylene and the plant-derived α-olefin thus obtained in the same manner as in the production of a petroleum-derived polyethylene resin.

Methods of producing the plant-derived ethylene, the plant-derived α-olefin, and the plant-derived polyethylene resin are described in detail in, for example, JP-A-2011-

506628. The plant-derived polyethylene resin to be suitably used in the present disclosure is, for example, GREEN PE manufactured by Braskem S.A.

When the EVOH resin composition layer of the present disclosure is represented by "a" (a1, a2, . . . ), and the other substrate resin layer is represented by "b" (b1, b2, . . . ), for example, the following arbitrary combinations may each be adopted as the layered configuration of the multilayer structure of the present disclosure: a/b; b/a/b; a1/a2; a/b/a; a1/a2/b; a/b1/b2; a1/a2/a3; b2/b1/a/b1/b2; b1/b2/a1/a2/a3/b3/b4; and b2/b1/a/b1/a/b1/b2. In addition, the configuration of a layer to be laminated in one lamination direction with respect to the arbitrary EVOH resin composition layer (a) and the configuration of a layer to be laminated in the other direction with respect thereto may be identical (symmetrical) to each other, or may be different from (asymmetrical to) each other. Further, the thickness of the layer to be laminated in one lamination direction with respect to the arbitrary EVOH resin composition layer (a) and the thickness of the layer to be laminated in the other direction with respect thereto may be identical (symmetrical) to each other, or may be different from (asymmetrical to) each other.

In the layered configuration, an adhesive resin layer may be interposed between the respective layers as required. In the case of a multilayer structure including, on at least one surface of the resin composition layer of the present disclosure, the other substrate resin layer (i.e., the thermoplastic resin layer other than the EVOH) through intermediation of the adhesive resin layer, the effects of the present disclosure tend to be more effectively obtained.

In addition, when a recycled layer containing a mixture of the EVOH resin composition of the present disclosure and the other substrate resin, or of the other substrate resin and the adhesive resin, the layer being obtained by melting and forming an end portion, a defective product, and the like produced in a process for the production of the multilayer structure again, is represented by R, for example, the following combinations may each be adopted: b/R/a; a1/R/a2; b1/R/a/b2; b1/R1/a/R2/b2; b1/R1/b2/a1/a2/a3/b3/R2/b4; b1/a1/R/a2/b2; and b1/R1/a1/R2/a2/R3/b2. The layer number of the multilayer structure of the present disclosure is typically from 2 to 15, preferably from 3 to 10 in terms of total number.

With regard to the layered configuration of a multilayer structure in the multilayer structure of the present disclosure, a multilayer structure including at least a basic unit defined as follows as a constituent unit is preferred: the unit (b/a/b or b/adhesive resin layer/a/adhesive resin layer/b) of the multilayer structure, which includes the EVOH resin composition layer of the present disclosure as an intermediate layer and has the other substrate resin layers arranged as both outside layers of the intermediate layer, is defined as the basic unit.

A known resin may be used as the adhesive resin serving as a forming material for the adhesive resin layer, and only needs to be appropriately selected in accordance with the kind of the thermoplastic resin to be used for the other substrate resin layer.

A typical example thereof may be a modified polyolefin polymer containing a carboxy group obtained by chemically bonding an unsaturated carboxylic acid or an anhydride thereof to a polyolefin resin through an addition reaction, a graft reaction, or the like. Examples thereof include maleic anhydride-graft-modified polyethylene, maleic anhydride-graft-modified polypropylene, maleic anhydride-graft-modified ethylene-propylene (block and random) copolymers, a maleic anhydride-graft-modified ethylene-ethyl acrylate copolymer, a maleic anhydride-graft-modified ethylene-vinyl acetate copolymer, a maleic anhydride-modified polycyclic olefin resin, and a maleic anhydride-graft-modified polyolefin resin. Those polymers may be used alone or in combination thereof.

At this time, the content of the unsaturated carboxylic acid or the anhydride thereof is typically from 0.001 wt. % to 3 wt. %, preferably from 0.01 wt. % to 1 wt. %, particularly preferably from 0.03 wt. % to 0.5 wt. % with respect to the total amount of the adhesive resin. When a modification amount in a modified product is small, the adhesion property of the resin tends to be insufficient. In contrast, when the modification amount is large, a crosslinking reaction tends to occur to deteriorate the formability thereof.

Any such adhesive resin may be blended with, for example, the EVOHs (A), any other EVOH, a rubber-elastomer component, such as polyisobutylene or an ethylene-propylene rubber, and the resin of a polyolefin resin layer. In particular, the adhesive resin may be blended with a polyolefin resin different from the polyolefin resin serving as a base for the adhesive resin.

The other substrate resin and the adhesive resin layer may each contain, in addition to the acetic acid and/or the salt thereof (B), the aliphatic carboxylic acid (C), and the aliphatic carboxylic acid metal salt (D) to be used in the present disclosure, a conventionally known additive, such as a plasticizer (e.g., ethylene glycol, glycerin, or hexanediol), a filler, a clay (e.g., montmorillonite), a colorant, an antioxidant, an antistatic agent, a lubricant (e.g., an alkali metal salt or alkaline earth metal salt of a higher fatty acid having 10 to 30 carbon atoms, a higher fatty acid ester (e.g., a methyl ester, isopropyl ester, butyl ester, or octyl ester of a higher fatty acid), a higher fatty acid amide (e.g., a saturated aliphatic amide, such as stearamide or behenamide, an unsaturated fatty acid amide, such as oleamide or erucamide, or a bisfatty acid amide, such as ethylenebisstearamide, ethylenebisoleamide, ethylenebiserucamide, or ethylenebislauramide), a low-molecular-weight polyolefin (e.g., a low-molecular-weight polyethylene or low-molecular-weight polypropylene having a molecular weight of from about 500 to about 10,000)), a fluoroethylene resin, a nucleating agent, a blocking inhibitor, a UV absorber, or a wax, to the extent that the gist of the present disclosure is not inhibited (e.g., 30 wt. % or less, preferably 10 wt. % or less). Those additives may be used alone or in combination thereof.

In addition, the resin to be used in the adhesive resin layer is preferably blended with at least one kind selected from the group consisting of the acetic acid and/or the salt thereof (B), the aliphatic carboxylic acid (C), and the aliphatic carboxylic acid metal salt (D) in the present disclosure. In particular, when the adhesive resin layer adjacent to the resin composition layer of the present disclosure contains at least one kind selected from the group consisting of the acetic acid and/or the salt thereof (B), the aliphatic carboxylic acid (C), and the aliphatic carboxylic acid metal salt (D), a multilayer structure more excellent in impact resistance is obtained.

In cases where the multilayer structure is produced by laminating the EVOH resin composition of the present disclosure together with the other substrate resin (including the case where the adhesive resin layer is interposed), the lamination may be performed by a known method. Examples thereof include: a method involving melting and extruding the other substrate resin, and laminating the resultant on a film, sheet, or the like formed of the EVOH resin composition of the present disclosure; a method involving, in contrast to the foregoing, melting and extruding the EVOH resin composition of the present disclosure, and laminating the resultant on the other substrate resin; a method involving subjecting the EVOH resin composition of the present disclosure and the other substrate resin to coextrusion; a method involving producing each of a film (layer) formed of the EVOH resin composition of the present disclosure and the other substrate resin (layer), and subjecting the products to dry lamination with a known adhesive, such as an organotitanium compound, an isocyanate compound, a polyester compound, or a polyurethane compound; and a method involving applying a solution of the EVOH resin composition of the present disclosure onto the other substrate resin, and then removing a solvent. Of those, the method involving the coextrusion is preferred in consideration of cost and environmental viewpoints.

The multilayer structure, which may be used as it is in products of various shapes, is subjected to (heat) stretching treatment as required. The stretching treatment may be any one of uniaxial stretching and biaxial stretching. In the case of the biaxial stretching, any one of simultaneous stretching and sequential stretching is permitted. In addition, a method providing a high stretching ratio out of, for example, a roll stretching method, a tenter stretching method, a tubular stretching method, a stretching blow method, and a vacuum-pressure forming method may be adopted as a stretching method. A stretching temperature is selected from the range of typically from 40° C.; to 170° C., preferably from about 60° C.; to about 160° C. When the stretching temperature is excessively low, the stretchability of the multilayer structure tends to become unsatisfactory, and when the stretching temperature is excessively high, it tends to become difficult for the multilayer structure to maintain a stable stretched state.

Thermal fixing may be performed for the purpose of imparting dimensional stability to the multilayer structure after the stretching. The thermal fixing may be performed by well-known means and for example, the stretched multilayer structure (stretched film) is subjected to a heat treatment at typically from 80° C.; to 180° C., preferably from 100° C.; to 165° C.; for typically from about 2 seconds to about 600 seconds while its tense state is kept.

In addition, when a multilayer stretched film obtained by using the EVOH resin composition of the present disclosure is used as a shrinking film, in order that heat shrinkability may be imparted thereto, a treatment involving, for example, applying cold air to the film after the stretching to cool and fix the film is desirably performed without the performance of the thermal fixing.

Further, a multilayer container of a cup or tray shape of the present disclosure may be obtained from the multilayer structure of the present disclosure. A drawing method is typically adopted as a method of producing the multilayer container, and specific examples thereof include a vacuum forming method, a pressure forming method, a vacuum-pressure forming method, and a plug-assisted vacuum-pressure forming method. Further, when a multilayer container of a tube or bottle shape is obtained from a multilayer parison (preliminarily molded product of a hollow tube shape before blowing), a blow molding method is adopted, and specific examples thereof include an extrusion blow molding method (of, for example, a twin-head type, a mold-transfer type, a parison shift type, a rotary type, an accumulator type, or a horizontal parison type), a cold parison-type blow molding method, an injection blow molding method, and a biaxial stretching blow molding method (e.g., an extrusion-type cold parison biaxial stretching blow molding method, an injection-type cold parison biaxial stretching blow molding method, or an injection molding in-line-type biaxial stretching blow molding method). The multilayer structure of the present disclosure may be subjected to, for example, a heat treatment, a cooling treatment, a rolling treatment, a printing treatment, a dry lamination treatment, a solution or melt coating treatment, bag-making processing, deep drawing processing, box processing, tube processing, or split processing as required.

The thickness of the multilayer structure (including a stretched multilayer structure) of the present disclosure, and the thicknesses of the resin composition layer, the other substrate resin layer, and the adhesive resin layer for forming the multilayer structure are appropriately set in accordance with, for example, the layered configuration of the structure, the kind of the substrate resin, the kind of the adhesive resin, the applications and packaging form of the structure, and physical properties that the structure is required to have.

The thickness of the multilayer structure (including the stretched multilayer structure) of the present disclosure is typically from 10 μm to 5,000 μm, preferably from 30 μm to 3,000 μm, particularly preferably from 50 μm to 2,000 μm. When the total thickness of the multilayer structure is excessively small, its gas barrier property tends to reduce. In addition, when the total thickness of the multilayer structure is excessively large, economical efficiency is unfavorable because the gas barrier property becomes excess performance and hence an unnecessary raw material is used. In addition, the thickness of the resin composition layer of the present disclosure in the multilayer structure is typically from 1 μm to 500 μm, preferably from 3 μm to 300 μm, particularly preferably from 5 μm to 200 μm, the thickness of the other substrate resin layer is typically from 5 μm to 3,000 μm, preferably from 10 μm to 2,000 μm, particularly preferably from 20 μm to 1,000 μm, and the thickness of the adhesive resin layer is typically from 0.5 μm to 250 μm, preferably from 1 μm to 150 μm, particularly preferably from 3 μm to 100 μm. When two or more layers of at least one kind selected from the group consisting of the EVOH resin composition layer, the adhesive resin layer, and the other substrate resin layer are present, the above-mentioned numerical values are each a value obtained by totaling the thicknesses of the layers of the same kind.

Further, a ratio (resin composition layer/other substrate resin layer) between their thicknesses is typically from 1/99 to 50/50, preferably from 5/95 to 45/55, particularly preferably from 10/90 to 40/60, in terms of ratio between the thicknesses of the layers having the largest thicknesses in a case where two or more layers of the same kind are present. In addition, a ratio (resin composition layer/adhesive resin layer) between their thicknesses is typically from 10/90 to 99/1, preferably from 20/80 to 95/5, particularly preferably from 50/50 to 90/10, in terms of ratio between the thicknesses of the layers having the largest thicknesses in a case where two or more layers of the same kind are present.

<<Fourth Mode in which EVOH Resin Composition Further Includes Cinnamic Acid and/or Salt Thereof (G), and Satisfies the Formula (5)>>

In addition, a multilayer structure using the EVOH has excellent transparency, and hence transmits not only visible light but also UV light. Accordingly, a problem in that contents packaged therein are deteriorated by UV light may occur. In particular, when the multilayer structure is used as a food packaging material, it has been known that food serving as contents therein is exposed to UV light having a wavelength in the region of less than 320 nm, that is, UV-B or UV-C, and as a result, the food itself largely degenerates.

Accordingly, the following technology has been proposed (see, for example, PTL 7): a water-soluble UV absorber is incorporated into a film made of a resin such as a polyvinyl alcohol, the film being one kind of film having a gas barrier property, to prevent the photodeterioration of contents in the film due to UV light transmission while achieving excellent transparency.

[PTL 7] JP-A-SHO51 (1976)-132259

In each of PTLs 1 to 4 described above, however, part of the EVOH is replaced with a resin other than the EVOH before its blending into the resin composition. Accordingly, there is a tendency that the ratio of the EVOH in the resin composition reduces, and hence a gas barrier property derived from the EVOH reduces.

In addition, while each of the technologies described in PTLs 1 to 4 described above is excellent in impact resistance (the EVOH layer hardly cracks), the technology has excellent transparency, and hence has sometimes caused the UV deterioration of contents (e.g., food) when used as a packaging material for a long time period.

In addition, when the technology described in PTL 7 is used as a packaging material for a long time period, the bleedout of the UV absorber resulting from contents occurs to cause a problem such as a reduction in appearance, a reduction in UV-absorbing effect, or the occurrence of an odor in some cases. Accordingly, a further improvement of the technology has been desired.

In addition, the technology described in PTL 7 has insufficient impact resistance against falling or collision at the time of long-term transportation or during handling, and has sometimes caused a problem such as the oxidative deterioration of contents (e.g., food).

In recent years, along with, for example, widespread use of Internet shopping and economic development of developing countries, physical distribution has been rapidly becoming borderless, and hence the time period for which food, drugs, and the like are transported tends to lengthen. Accordingly, a multilayer structure (packaging material) formed of an EVOH resin composition having all of high impact resistance against falling or collision at the time of long-term transportation or during handling, excellent light fastness, a more excellent adhesive strength, and a more excellent gas barrier property has been required.

In view of the foregoing, in the present disclosure, under such background, there is provided an EVOH resin composition, which is excellent in impact resistance and light fastness, and is also excellent in adhesive strength even without being blended with any resin other than an EVOH.

Thus, the inventors have made extensive investigations in view of such circumstances, and as a result, have found that an EVOH resin composition, which is excellent in impact resistance and adhesive strength when formed into a film, and is also excellent in color tone stability and light fastness, is obtained by using an EVOH in combination with acetic acid and/or a salt thereof, an aliphatic carboxylic acid other than acetic acid, a metal salt of the aliphatic carboxylic acid including at least one kind of metal species selected from long Periodic Table 4th-period d-block elements, and cinnamic acid and/or a salt thereof.

That is, it has been generally known that a fatty acid metal salt accelerates the thermal decomposition of the EVOH to reduce the impact resistance and color tone of an EVOH resin composition to be obtained. Accordingly, when a person skilled in the art aims to improve the mechanical property (impact resistance) and color tone of the EVOH, the person avoids the blending of the EVOH with the fatty acid metal salt. However, the inventors have used the EVOH in combination with the acetic acid and/or the salt thereof, the aliphatic carboxylic acid other than acetic acid and a specific metal salt thereof, and the cinnamic acid and/or the salt thereof so that a specific relationship may be satisfied, and as a result, have found that the mechanical property (impact resistance) and color tone of the EVOH are improved contrary to customary expectations.

As described above, the present disclosure provides the following items <IV-1> to <IV-10>.

<IV-1> An ethylene-vinyl alcohol copolymer resin composition, including: an ethylene-vinyl alcohol copolymer (A); acetic acid and/or a salt thereof (B); an aliphatic carboxylic acid (C) other than acetic acid; an aliphatic carboxylic acid metal salt (D) that is a metal salt of the aliphatic carboxylic acid (C); and cinnamic acid and/or a salt thereof (G), wherein a metal species of the aliphatic carboxylic acid metal salt (D) is at least one kind selected from long Periodic Table 4th-period d-block elements, and wherein respective contents of the acetic acid and/or the salt thereof (B), the aliphatic carboxylic acid (C), the aliphatic carboxylic acid metal salt (D), and the cinnamic acid and/or the salt thereof (G) satisfy the following formulae (5), (1), and (2) on a weight basis.

$$0.015 \leq \text{(content of } (D) \text{ in terms of metal ion/content of } (G) \text{ in terms of cinnamic acid ion)} \leq 50 \quad (5)$$

$$0.001 \leq \text{(content of } (D) \text{ in terms of metal ion/content of } (B) \text{ in terms of acetic acid ion)} \leq 1.30 \quad (1)$$

$$0.11 \leq \text{(content of } (D) \text{ in terms of metal ion/content of } (C) \text{ in terms of carboxylic acid ion)} \leq 100 \quad (2)$$

<IV-2> The ethylene-vinyl alcohol copolymer resin composition according to the item <IV-1>, wherein the content of the cinnamic acid and/or the salt thereof (G) in terms of cinnamic acid ion is from 1 ppm to 1,000 ppm with respect to a total sum of contents of the ethylene-vinyl alcohol copolymer (A), the acetic acid and/or the salt thereof (B), the aliphatic carboxylic acid (C), the aliphatic carboxylic acid metal salt (D), and the cinnamic acid and/or the salt thereof (G).

<IV-3> The ethylene-vinyl alcohol copolymer resin composition according to the item <IV-1> or <IV-2>, wherein the content of the aliphatic carboxylic acid metal salt (D) in terms of metal ion is from 1 ppm to 500 ppm with respect to a total sum of contents of the ethylene-vinyl alcohol copolymer (A), the acetic acid and/or the salt thereof (B), the aliphatic carboxylic acid (C), the aliphatic carboxylic acid metal salt (D), and the cinnamic acid and/or the salt thereof (G).

<IV-4> The ethylene-vinyl alcohol copolymer resin composition according to any one of the items <IV-1> to <IV-3>, wherein the content of the aliphatic carboxylic acid (C) in terms of carboxylic acid ion is from 0.001 ppm to 450 ppm with respect to a total sum of contents of the ethylene-vinyl alcohol copolymer (A), the acetic acid and/or the salt thereof (B), the aliphatic carboxylic acid (C), the aliphatic carboxylic acid metal salt (D), and the cinnamic acid and/or the salt thereof (G).

<IV-5> The ethylene-vinyl alcohol copolymer resin composition according to any one of the items <IV-1> to <IV-4>, wherein the content of the acetic acid and/or the salt thereof (B) in terms of acetic acid ion is from 10 ppm to 2,000 ppm with respect to a total sum of contents of the ethylene-vinyl alcohol copolymer (A), the acetic acid and/or the salt thereof (B), the aliphatic carboxylic acid (C), the aliphatic carboxylic acid metal salt (D), and the cinnamic acid and/or the salt thereof (G).

<IV-6> The ethylene-vinyl alcohol copolymer resin composition according to any one of the items <IV-1> to <IV-5>, wherein a ratio (content of (G) in terms of cinnamic acid ion/content of (B) in terms of acetic acid ion) of the content of the cinnamic acid and/or the salt thereof (G) in terms of cinnamic acid ion to the content of the acetic acid and/or the salt thereof (B) in terms of acetic acid ion is from 0.0001 to 10,000 on a weight basis. <IV-7> The ethylene-vinyl alcohol copolymer resin composition according to any one of the items <IV-1> to <IV-6>, wherein an elongation viscosity of the ethylene-vinyl alcohol copolymer resin composition at 210° C.; and 100 s$^{-1}$ satisfies the following formula (3).

$$500 \leq \text{elongation viscosity [Pa·s]} \leq 48,000 \quad (3)$$

<IV-8> The ethylene-vinyl alcohol copolymer resin composition according to any one of the items <IV-1> to <IV-7>, further including boric acid and/or a salt thereof (F), wherein a content of the boric acid and/or the salt thereof (F) in terms of boron is from 0.001 ppm to 500 ppm with respect to a total sum of contents of the ethylene-vinyl alcohol copolymer (A), the acetic acid and/or the salt thereof (B), the aliphatic carboxylic acid (C), the aliphatic carboxylic acid metal salt (D), the cinnamic acid and/or the salt thereof (G), and the boric acid and/or the salt thereof (F).
<IV-9> A multilayer structure, including a layer formed of the ethylene-vinyl alcohol copolymer resin composition of any one of the items <IV-1> to <IV-8>.
<IV-10> A package, including the multilayer structure of the item <IV-9>.

The EVOH resin composition of the present disclosure is a resin composition, including: the ethylene-vinyl alcohol copolymer, that is, EVOH (A); the acetic acid and/or the salt thereof (B); the aliphatic carboxylic acid (C); the aliphatic carboxylic acid metal salt (D); and the cinnamic acid and/or the salt thereof (G), wherein the metal species of the aliphatic carboxylic acid metal salt (D) is at least one kind selected from the long Periodic Table 4th-period d-block elements, and wherein the respective contents of the acetic acid and/or the salt thereof (B), the aliphatic carboxylic acid (C), the aliphatic carboxylic acid metal salt (D), and the cinnamic acid and/or the salt thereof (G) satisfy the following formulae (5), (1), and (2) on a weight basis. Accordingly, even when the composition is not blended with any resin other than the EVOH, the composition is excellent in impact resistance and adhesive strength when formed into a film, and is also excellent in color tone stability and light fastness.

$$0.015 \leq (\text{content of } (D) \text{ in terms of metal ion/content of } (G) \text{ in terms of cinnamic acid ion}) \leq 50 \quad (5)$$

$$0.001 \leq (\text{content of } (D) \text{ in terms of metal ion/content of } (B) \text{ in terms of acetic acid ion}) \leq 1.30 \quad (1)$$

$$0.11 \leq (\text{content of } (D) \text{ in terms of metal ion/content of } (C) \text{ in terms of carboxylic acid ion}) \leq 100 \quad (2)$$

In addition, when the content of the cinnamic acid and/or the salt thereof (G) in terms of cinnamic acid ion is from 1 ppm to 1,000 ppm with respect to the total sum of the contents of the ethylene-vinyl alcohol copolymer (A), the acetic acid and/or the salt thereof (B), the aliphatic carboxylic acid (C), the aliphatic carboxylic acid metal salt (D), and the cinnamic acid and/or the salt thereof (G), the EVOH resin composition is more excellent in color tone stability.

In addition, when the content of the aliphatic carboxylic acid metal salt (D) in terms of metal ion is from 1 ppm to 500 ppm with respect to the total sum of the contents of the ethylene-vinyl alcohol copolymer (A), the acetic acid and/or the salt thereof (B), the aliphatic carboxylic acid (C), the aliphatic carboxylic acid metal salt (D), and the cinnamic acid and/or the salt thereof (G), the EVOH resin composition is more excellent in impact resistance and adhesive strength.

In addition, when the content of the aliphatic carboxylic acid (C) in terms of carboxylic acid ion is from 0.001 ppm to 450 ppm with respect to the total sum of the contents of the ethylene-vinyl alcohol copolymer (A), the acetic acid and/or the salt thereof (B), the aliphatic carboxylic acid (C), the aliphatic carboxylic acid metal salt (D), and the cinnamic acid and/or the salt thereof (G), the EVOH resin composition is more excellent in impact resistance, and is excellent in color tone stability.

In addition, when the content of the acetic acid and/or the salt thereof (B) in terms of acetic acid ion is from 10 ppm to 2,000 ppm with respect to the total sum of the contents of the ethylene-vinyl alcohol copolymer (A), the acetic acid and/or the salt thereof (B), the aliphatic carboxylic acid (C), the aliphatic carboxylic acid metal salt (D), and the cinnamic acid and/or the salt thereof (G), the EVOH resin composition is more excellent in impact resistance and adhesive strength when formed into a film, and is also excellent in color tone stability.

In addition, when the ratio (content of (G) in terms of cinnamic acid ion/content of (B) in terms of acetic acid ion) of the content of the cinnamic acid and/or the salt thereof (G) in terms of cinnamic acid ion to the content of the acetic acid and/or the salt thereof (B) in terms of acetic acid ion is from 0.0001 to 10,000 on a weight basis, the EVOH resin composition is more excellent in impact resistance when formed into a film, and is also excellent in color tone stability and light fastness.

In addition, when the elongation viscosity of the ethylene-vinyl alcohol copolymer resin composition at 210° C.; and 100 s$^{-1}$ satisfies the following formula (3), the composition is more excellent in impact resistance when formed into a film.

$$500 \leq \text{elongation viscosity [Pa·s]} \leq 48,000 \quad (3)$$

In addition, in the ethylene-vinyl alcohol copolymer resin composition further including the boric acid and/or the salt thereof (F), when the content of the boric acid and/or the salt thereof (F) in terms of boron is from 0.001 ppm to 500 ppm with respect to the total sum of the contents of the ethylene-vinyl alcohol copolymer (A), the acetic acid and/or the salt thereof (B), the aliphatic carboxylic acid (C), the aliphatic carboxylic acid metal salt (D), the cinnamic acid and/or the salt thereof (G), and the boric acid and/or the salt thereof (F), the composition is more excellent in impact resistance when formed into a film, and is also excellent in color tone stability.

In addition, the multilayer structure, which is obtained by using the EVOH resin composition, is an excellent multilayer structure, which is excellent in mechanical property (impact resistance), and in which a reduction in color tone at the time of melt forming and a reduction in adhesive strength are alleviated.

Further, the package of the present disclosure includes the multilayer structure, and hence, similarly, the package to be obtained is excellent in impact resistance and adhesive strength, and is also excellent in color tone stability.

The present disclosure is described in detail below. However, the following description describes an example of a desired embodiment of the present disclosure.

An EVOH resin composition of the present disclosure includes an EVOH (A) as a main component, and includes acetic acid and/or a salt thereof (B), an aliphatic carboxylic acid (C) other than acetic acid, an aliphatic carboxylic acid metal salt (D) that is a metal salt of the aliphatic carboxylic acid (C), and cinnamic acid and/or a salt thereof (G). The base resin of the EVOH resin composition of the present disclosure is the EVOH (A), and the content of the EVOH (A) in the EVOH resin composition is typically 60 wt. % or more, preferably 70 wt. % or more, more preferably 80 wt. % or more, particularly preferably 90 wt. % or more. The respective constituent components are described below.

The term "and/or" as used herein means at least one of those described on the left and right sides of the term, and in the case of the term "X and/or Y", the term has the following three meanings: X alone, Y alone, and X and Y.

<EVOH (A)>

In ordinary cases, the EVOH (A) to be used in the present disclosure is a resin obtained by copolymerizing ethylene and a vinyl ester monomer, and then saponifying the copolymer, and the same component as the component (A) described in the first mode may be used.

<Acetic Acid and/or Salt Thereof (B)>

The EVOH resin composition of the present disclosure includes the acetic acid and/or the salt thereof (B). That is, the EVOH resin composition of the present disclosure includes at least one kind selected from the group consisting of acetic acid and acetic acid salts.

The same component as the component (B) described in the first mode may be used as the acetic acid and/or the salt thereof (B).

The content of the acetic acid and/or the salt thereof (B) in terms of acetic acid ion is typically from 10 ppm to 2,000 ppm, preferably from 15 ppm to 1,500 ppm, particularly preferably from 20 ppm to 1,000 ppm, further particularly preferably from 25 ppm to 650 ppm with respect to the total sum of the contents of the EVOH (A), the acetic acid and/or the salt thereof (B), the aliphatic carboxylic acid (C), the aliphatic carboxylic acid metal salt (D), and the cinnamic acid and/or the salt thereof (G).

When such content is excessively small, there is a tendency that the adhesive strength of the EVOH resin composition is reduced by the thermally decomposed product of the aliphatic carboxylic acid metal salt (D), or the effects of the present disclosure are not sufficiently obtained. When the content is excessively large, there is a tendency that the color tone stability thereof at the time of its melt forming is liable to reduce, or the effects of the present disclosure are not sufficiently obtained.

The content of the acetic acid and/or the salt thereof (B) in terms of acetic acid ion may be measured by a known analysis method. For example, the content may be measured by using liquid chromatography-mass spectrometry (LC/MS) or gas chromatography-mass spectrometry (GC/MS).

<Aliphatic Carboxylic Acid (C) other than Acetic Acid>

The EVOH resin composition of the present disclosure includes the aliphatic carboxylic acid (C) other than acetic acid and the same component as the component (C) described in the first mode may be used as the aliphatic carboxylic acid (C).

The content of the aliphatic carboxylic acid (C) in terms of carboxylic acid ion is typically from 0.001 ppm to 950 ppm, preferably from 0.001 ppm to 450 ppm, more preferably from 0.01 ppm to 360 ppm, particularly preferably from 0.1 ppm to 250 ppm, further particularly preferably from 0.5 ppm to 200 ppm with respect to the total sum of the contents of the EVOH (A), the acetic acid and/or the salt thereof (B), the aliphatic carboxylic acid (C), the aliphatic carboxylic acid metal salt (D), and the cinnamic acid and/or the salt thereof (G).

When such content is excessively small, there is a tendency that the thermal stability of the aliphatic carboxylic acid metal salt (D) becomes insufficient, and as a result, the effects of the present disclosure are not sufficiently obtained. When the content is excessively large, there is a tendency that the color tone stability of the EVOH resin composition at the time of its melt forming is liable to reduce, or the aliphatic carboxylic acid (C) itself acts as a plasticizer to make it impossible to sufficiently obtain the effects of the present disclosure.

The ratio (content of acetic acid and/or salt thereof (B) in terms of acetic acid ion/content of aliphatic carboxylic acid (C) in terms of carboxylic acid ion) of the content of the acetic acid and/or the salt thereof (B) in terms of acetic acid ion to the content of the aliphatic carboxylic acid (C) in terms of carboxylic acid ion is typically from 0.0001 to 10,000, preferably from 0.001 to 5,000, more preferably from 0.1 to 1,000, particularly preferably from 1 to 800, further particularly preferably from 1 to 600 on a weight basis.

When such content ratio falls within the above-mentioned ranges, the effects of the present disclosure tend to be more significantly obtained. When the ratio falls short of the ranges, there is a tendency that the color tone stability of the EVOH resin composition at the time of its melt forming is insufficient, or the adhesive strength thereof becomes insufficient. When the ratio exceeds the ranges, there is a tendency that the effects of the present disclosure are not sufficiently obtained.

<Aliphatic Carboxylic Acid Metal Salt (D)>

The EVOH resin composition of the present disclosure includes the aliphatic carboxylic acid metal salt (D) that is the metal salt of the aliphatic carboxylic acid (C) other than acetic acid. The same component as the component (D) described in the first mode may be used as the aliphatic carboxylic acid metal salt (D).

Although the reason why an excellent effect is obtained when the aliphatic carboxylic acid (C) and the anion species of the aliphatic carboxylic acid metal salt (D) are of the same species is unclear, it is assumed that when specific amounts of the aliphatic carboxylic acid (C) and the aliphatic carboxylic acid metal salt (D) are used in combination, the dispersibility of the aliphatic carboxylic acid metal salt (D) is significantly improved, and hence more excellent effects of the present disclosure are obtained. In addition, the following assumption is made. The aliphatic carboxylic acid (C) may interact with the metal species of the aliphatic carboxylic acid metal salt (D) to exist under a state like a metal complex. When the anion species of such aliphatic carboxylic acid metal salt (D) is of the same species as the aliphatic carboxylic acid (C), the metal complex can exist under a state that is more stable in terms of energy, and hence the metal complex is excellent in thermal stability even at the time of its melt forming. As a result, the mechanical property (impact resistance) of the EVOH resin composition is improved.

In addition, when the number of carbon atoms of each of the aliphatic carboxylic acid (C) and the aliphatic carboxylic acid metal salt (D) is typically from 3 to 30, preferably from 4 to 22, particularly preferably from 5 to 14, the mechanical property (impact resistance) tends to be more significantly improved. Although the reason for the foregoing is unclear, the following assumption is made. When the number of carbon atoms of each of the aliphatic carboxylic acid (C) and the aliphatic carboxylic acid metal salt (D) falls within the ranges, the aliphatic carboxylic acid (C) and the aliphatic carboxylic acid metal salt (D) are easily dispersed in the EVOH resin composition in a more uniform manner. Accordingly, as a result, the mechanical property (impact resistance) of the EVOH resin composition is more significantly improved.

In addition, when the aliphatic carboxylic acid metal salt (D) is used alone, the adhesive strength of the EVOH resin composition tends to reduce, though the impact resistance thereof is improved. Although the reason for the foregoing is unclear, it is assumed that when the aliphatic carboxylic acid metal salt (D) is used alone, the thermal stability of the salt itself is insufficient, and hence the adhesive strength is reduced by the thermally decomposed product of the aliphatic carboxylic acid metal salt (D) produced at the time of its melt forming. In contrast, in the present disclosure, the aliphatic carboxylic acid metal salt (D) and the acetic acid and/or the salt thereof (B) are used in combination. Accordingly, it is assumed that the thermally decomposed product of the aliphatic carboxylic acid metal salt (D) is dispersed in the composition while being captured by the acetic acid and/or the salt thereof (B), and hence a reduction in adhesive strength is suppressed.

The content of the aliphatic carboxylic acid metal salt (D) in terms of metal ion is typically from 1 ppm to 500 ppm, preferably from 5 ppm to 300 ppm, particularly preferably from 10 ppm to 250 ppm, further particularly preferably from 30 ppm to 200 ppm with respect to the total sum of the contents of the EVOH (A), the acetic acid and/or the salt thereof (B), the aliphatic carboxylic acid (C), the aliphatic carboxylic acid metal salt (D), and the cinnamic acid and/or the salt thereof (G). When the content of the aliphatic carboxylic acid metal salt (D) is excessively small, there is a tendency that the effects of the present disclosure are not sufficiently obtained. When the content is excessively large, there is a tendency that the adhesive strength of the EVOH resin composition reduces, or the color tone stability thereof at the time of its melt forming is liable to reduce.

The content of the aliphatic carboxylic acid (C) in terms of carboxylic acid ion and the content of the aliphatic carboxylic acid metal salt (D) in terms of metal ion may each be measured by a known analysis method. For example, the contents may be determined by using such methods as described below alone or in combination thereof.

(i) Content of aliphatic carboxylic acid metal salt (D) in terms of metal ion: A dry sample is precisely weighed, and is loaded into a platinum evaporating dish whose weight has been made constant, followed by carbonization with an electric heater. Next, the carbonized product is heated with a gas burner, and is baked until no smoke occurs. Further, the platinum evaporating dish is loaded into an electric furnace, and temperature in the furnace is increased to completely ash the baked product. The ashed product is cooled, and then hydrochloric acid and pure water are added thereto, followed by heating with an electric heater to dissolve the ashed product in the mixture. The solution is poured into a measuring flask, and its volume is made constant with pure water. Thus, a sample for atomic absorption analysis is obtained. The amount of a metal in the sample for atomic absorption analysis is subjected to quantitative analysis by atomic absorption spectrophotometry. Thus, the content of the aliphatic carboxylic acid metal salt (D) in terms of metal ion can be determined.

(ii) Content of aliphatic carboxylic acid (C) in terms of carboxylic acid ion: First, the total sum (Cx) of the contents of the aliphatic carboxylic acid (C) and the metal salt (D) thereof in the EVOH resin composition in terms of carboxylic acid ion is determined by using, for example, liquid chromatography-mass spectrometry (LC/MS) or gas chromatography-mass spectrometry (GC/MS). After that, the content (Cy) of the aliphatic carboxylic acid metal salt (D) in terms of carboxylic acid ion is calculated from the content of the aliphatic carboxylic acid metal salt (D) in terms of metal ion described in the foregoing. Then, the content of the aliphatic carboxylic acid (C) in terms of carboxylic acid ion can be determined from a difference ((Cx)−(Cy)) between the total sum (Cx) of the contents of the aliphatic carboxylic acid (C) and the metal salt (D) thereof in terms of carboxylic acid ion, and the content (Cy) of the aliphatic carboxylic acid metal salt (D) in terms of carboxylic acid ion.

<Cinnamic Acid and/or Salt Thereof (G)>

In the present disclosure, the EVOH resin composition includes the cinnamic acid and/or the salt thereof (G). That is, the EVOH resin composition of the present disclosure includes at least one kind selected from the group consisting of cinnamic acid and cinnamic acid salts.

Examples of the cinnamic acid to be used in the present disclosure may include cis-cinnamic acid and trans-cinnamic acid, and trans-cinnamic acid is suitably used from the viewpoints of its stability and price. In addition, examples of the cinnamic acid salt include: cinnamic acid alkali metal salts, such as lithium cinnamate, sodium cinnamate, and potassium cinnamate; and cinnamic acid alkaline earth metal salts, such as magnesium cinnamate, calcium cinnamate, and barium cinnamate. Those cinnamic acids and/or salts thereof may be used alone or in combination thereof. Of those, trans-cinnamic acid is preferably used alone.

The content of the cinnamic acid and/or the salt thereof (G) in terms of cinnamic acid ion is typically from 1 ppm to 1,200 ppm, preferably from 1 ppm to 1,000 ppm, more preferably from 10 ppm to 800 ppm, still more preferably from 15 ppm to 500 ppm, particularly preferably from 50 ppm to 300 ppm, further particularly preferably from 100 ppm to 200 ppm with respect to the total sum of the contents of the EVOH (A), the acetic acid and/or the salt thereof (B), the aliphatic carboxylic acid (C), the aliphatic carboxylic acid metal salt (D), and the cinnamic acid and/or the salt thereof (G). When such content is excessively small, the light fastness of the EVOH resin composition tends to reduce. When the content is excessively large, the occurrence of an odor at the time of the melt forming thereof tends to be a problem.

In the EVOH resin composition of the present disclosure, the ratio ((D)/(G)) of the content of the aliphatic carboxylic acid metal salt (D) in terms of metal ion to the content of the cinnamic acid and/or the salt thereof (G) in terms of cinnamic acid ion satisfies the following formula (5) on a weight basis.

$$0.015 \leq (\text{content of }(D)\text{ in terms of metal ion/content of }(G)\text{ in terms of cinnamic acid ion}) \leq 50 \quad (5)$$

The ratio satisfies a relationship of preferably $0.075 \leq ((D)/(G)) \leq 40$, particularly preferably $0.15 \leq ((D)/(G)) \leq 30$, further particularly preferably $0.2 \leq ((D)/(G)) \leq 20$. When such value falls within the ranges, the effects of the present disclosure tend to be more significantly obtained. When the value deviates from the ranges, there is a tendency that the effects of the present disclosure are not sufficiently obtained.

In the EVOH resin composition of the present disclosure, the ratio ((D)/(B)) of the content of the aliphatic carboxylic acid metal salt (D) in terms of metal ion to the content of the acetic acid and/or the salt thereof (B) in terms of acetic acid ion satisfies the following formula (1) on a weight basis.

$$0.001 \leq (\text{content of }(D)\text{ in terms of metal ion/content of }(B)\text{ in terms of acetic acid ion}) \leq 1.30 \quad (1)$$

The ratio satisfies a relationship of preferably $0.005 \leq ((D)/(B)) \leq 1.1$, more preferably $0.005 \leq ((D)/(B)) \leq 1.0$, still more preferably $0.01 \leq ((D)/(B)) \leq 0.8$, particularly preferably $0.04 \leq ((D)/(B)) \leq 0.48$, further particularly preferably $0.05 \leq ((D)/(B)) \leq 0.45$. When such value falls within the ranges, the effects of the present disclosure tend to be more significantly obtained. When the value falls short of the ranges, there is a tendency that the effects of the present disclosure are not sufficiently obtained. When the value exceeds the ranges, there is a tendency that the color tone stability of the composition at the time of its melt forming is insufficient, or the adhesive strength thereof becomes insufficient.

In the EVOH resin composition of the present disclosure, the ratio ((D)/(C)) of the content of the aliphatic carboxylic acid metal salt (D) in terms of metal ion to the content of the aliphatic carboxylic acid (C) in terms of carboxylic acid ion satisfies the following formula (2) on a weight basis.

$$0.11 \leq (\text{content of } (D) \text{ in terms of metal ion/content of } (C) \text{ in terms of carboxylic acid ion}) \leq 100 \quad (2)$$

The ratio satisfies a relationship of preferably $0.13 \leq ((D)/(C)) \leq 90$, particularly preferably $0.15 \leq ((D)/(C)) \leq 80$, further particularly preferably $0.2 \leq ((D)/(C)) \leq 70$. When such value falls within the ranges, the effects of the present disclosure tend to be more significantly obtained. When the value falls short of the ranges, there is a tendency that the color tone stability of the composition at the time of its melt forming is insufficient, or the effects of the present disclosure are not sufficiently obtained. When the value exceeds the ranges, there is a tendency that the color tone stability of the composition at the time of its melt forming is insufficient, or the formability thereof becomes insufficient.

Although the reason why an excellent effect is obtained when the contents of the acetic acid and/or the salt thereof (B), the aliphatic carboxylic acid (C), the aliphatic carboxylic acid metal salt (D), and the cinnamic acid and/or the salt thereof (G) satisfy the formulae (5), (1), and (2) on a weight basis is unclear, the following assumption is made. While a specific amount of the aliphatic carboxylic acid (C) whose anion species is of the same species as the aliphatic carboxylic acid metal salt (D) has improving effects on the dispersibility and thermal stability of the aliphatic carboxylic acid metal salt (D), when the content of the aliphatic carboxylic acid (C) is excessively large, the aliphatic carboxylic acid (C) itself acts as a plasticizer, and hence the effect (impact resistance-improving effect) of the present disclosure is not sufficiently obtained. In addition, the following assumption is made. While a specific amount of the acetic acid and/or the salt thereof (B) captures the thermally decomposed product of the aliphatic carboxylic acid metal salt (D) to exhibit a suppressing effect on a reduction in adhesive strength of the EVOH resin composition, when the content of the acetic acid and/or the salt thereof (B) is excessively large, the thermal stability of the EVOH (A) is significantly reduced, and hence the color tone stability of the composition is liable to reduce, or the effect (impact resistance-improving effect) of the present disclosure is not sufficiently obtained. In addition, the following assumption is made. A specific amount of the cinnamic acid and/or the salt thereof (G) has an excellent UV-absorbing effect, and the cinnamic acid and/or the salt thereof (G) captures the thermally decomposed product of the aliphatic carboxylic acid metal salt (D) and the thermally decomposed product of the EVOH (A), which have not been completely captured by the acetic acid and/or the salt thereof (B), to exhibit a suppressing effect on a reduction in color tone of the EVOH resin composition. Meanwhile, when the content of the cinnamic acid and/or the salt thereof (G) is excessively large, it is assumed that the effect (impact resistance-improving effect) of the present disclosure is not sufficiently obtained, or the color tone stability of the composition is liable to reduce owing to the thermal decomposition of the cinnamic acid and/or the salt thereof (G) itself.

In addition, the elongation viscosity of the EVOH resin composition of the present disclosure at 210° C.; and 100 s$^{-1}$ preferably satisfies the following formula (3) from the viewpoint of its impact resistance.

$$850 \leq \text{elongation viscosity [Pa·s]} \leq 48,000 \quad (3)$$

The elongation viscosity satisfies a relationship of more preferably $900 \leq \text{elongation viscosity [Pa·s]} \leq 30,000$, particularly preferably $950 \leq \text{elongation viscosity [Pa·s]} \leq 20,000$. When such value falls within the ranges, the effects of the present disclosure tend to be more significantly obtained. When the value falls short of the ranges, there is a tendency that the effects of the present disclosure are not sufficiently obtained. When the value exceeds the ranges, the formability of the composition at the time of its melt forming tends to be insufficient.

Although the reason why an excellent effect is obtained when the elongation viscosity of the EVOH resin composition of the present disclosure at 210° C.; and 100 s$^{-1}$ satisfies the formula (3) is unclear, it is assumed that when the elongation viscosity of the EVOH resin composition of the present disclosure at 210° C.; and 100 s$^{-1}$ satisfies the formula (3), the entangled structure of EVOH molecular chains moderately formed in the EVOH resin composition more significantly accelerates the formation of the higher-order structure of the EVOH resin composition, such as molecular orientation or a crystal structure, at the time of the multilayer coextrusion of the EVOH resin composition, and hence, as a result, the mechanical property (impact resistance) of the composition is significantly improved.

<Method of Evaluating Elongation Viscosity (Pa·s) of EVOH Resin Composition>

The same method as the elongation viscosity evaluation method described in the first mode may be used as a method of evaluating the elongation viscosity (Pa·s) of the EVOH resin composition of the present disclosure at 210° C.; and 100 s$^{-1}$.

<Boric Acid and/or Salt Thereof (F)>

The EVOH resin composition of the present disclosure preferably includes the boric acid and/or the salt thereof (F). That is, the EVOH resin composition of the present disclosure preferably includes at least one selected from the group consisting of boric acid and boric acid salts.

Typical examples of the boric acid and/or the salt thereof (F) include boric acid, metal salts of boric acid, such as calcium borate, cobalt borate, zinc borate (e.g., zinc tetraborate or zinc metaborate), aluminum potassium borate, ammonium borate (e.g., ammonium metaborate, ammonium tetraborate, ammonium pentaborate, or ammonium octaborate), cadmium borate (e.g., cadmium orthoborate or cadmium tetraborate), potassium borate (e.g., potassium metaborate, potassium tetraborate, potassium pentaborate, potassium hexaborate, or potassium octaborate), silver borate (e.g., silver metaborate or silver tetraborate), copper borate (e.g., cupric borate, copper metaborate, or copper tetraborate), sodium borate (e.g., sodium metaborate, sodium diborate, sodium tetraborate, sodium pentaborate, sodium hexaborate, or sodium octaborate), lead borate (e.g., lead metaborate or lead hexaborate), nickel borate (e.g., nickel orthoborate, nickel diborate, nickel tetraborate, or nickel octaborate), barium borate (e.g., barium orthoborate, barium metaborate, barium diborate, or barium tetraborate), bismuth borate, magnesium borate (e.g., magnesium orthoborate, magnesium diborate, magnesium metaborate, trimagnesium tetraborate, or pentamagnesium tetraborate), manganese borate (e.g., manganous borate, manganese metaborate, or manganese tetraborate), lithium borate (e.g., lithium metaborate, lithium tetraborate, or lithium pentaborate), and borate minerals, such as borax, kernite, inyoite, ketoite, suanite, and szaibelyite. Of those, borax, boric acid, sodium borate, potassium borate, zinc borate, calcium borate, and magnesium borate are preferred, boric acid, sodium borate, and zinc borate are particularly preferred, and boric acid is further particularly preferred.

The content of the boric acid and/or the salt thereof (F) in terms of boron is typically from 0.001 ppm to 1,000 ppm, preferably from 0.001 ppm to 600 ppm, more preferably from 0.001 ppm to 500 ppm, still more preferably from 0.01 ppm to 400 ppm, particularly preferably from 0.05 ppm to 330 ppm, more particularly preferably from 0.1 ppm to 250 ppm, further particularly preferably from 1 ppm to 120 ppm with respect to the total sum of the contents of the EVOH (A), the acetic acid and/or the salt thereof (B), the aliphatic carboxylic acid (C) other than acetic acid, the aliphatic carboxylic acid metal salt (D), the cinnamic acid and/or the salt thereof (G), and the boric acid and/or the salt thereof (F).

When such content is excessively small, there is a tendency that the effect (impact resistance-improving effect) of the present disclosure is not sufficiently obtained. When the content is excessively large, there is a tendency that the color tone of the EVOH resin composition reduces, or a fish eye frequently occurs in the composition at the time of its multilayer film formation to make it impossible to sufficiently obtain the effect (impact resistance-improving effect) of the present disclosure.

In addition, although the reason why the use of a specific amount of the boric acid and/or the salt thereof (F) provides an excellent effect is unclear, the following assumption is made. The boric acid and/or the salt thereof (F) dispersed in the EVOH resin composition interacts with EVOH molecular chains to form a crosslinked structure between the EVOH molecular chains. Accordingly, at the time of the multilayer coextrusion of the EVOH resin composition, the formation of the higher-order structure of the EVOH resin composition, such as molecular orientation or a crystal structure, is more significantly accelerated, and hence, as a result, the mechanical property (impact resistance) of the structure is significantly improved.

In addition, it is assumed that the boric acid and/or the salt thereof (F) captures the thermally decomposed product of the aliphatic carboxylic acid metal salt (D) and the thermally decomposed product of the EVOH (A), which have not been completely captured by the acetic acid and/or the salt thereof (B), to suppress a reduction in color tone of the EVOH resin composition.

The content of the boric acid and/or the salt thereof (F) in terms of boron may be measured by a known analysis method. For example, the following may be performed: after the EVOH resin composition has been subjected to wet decomposition, the volume of the decomposed product is made constant, and the boron amount of a test liquid thus obtained is determined by inductively coupled plasma-atomic emission spectroscopy (ICP-AES).

<Other Thermoplastic Resin>

The EVOH resin composition of the present disclosure may contain any other thermoplastic resin as resin component in addition to the EVOH (A) at a content typically in the range of 30 wt. % or less with respect to the EVOH (A).

The same resin as that described in the section <Other Thermoplastic Resin> described in the first mode may be used as the other thermoplastic resin.

<Other Additive>

The EVOH resin composition of the present disclosure may include an additive to be generally blended into an EVOH resin composition, for example, a known additive, such as heat stabilizer, an antioxidant, an antistatic agent, a colorant, a UV absorber, a lubricant (e.g., a saturated aliphatic amide (e.g., stearamide), an unsaturated fatty acid amide (e.g., oleamide), a bisfatty acid amide (e.g., ethylenebisstearamide), or a low-molecular weight polyolefin (e.g., low-molecular weight polyethylene or low-molecular weight polypropylene having a molecular weight of from about 500 to about 10,000)), a plasticizer (e.g., an aliphatic polyhydric alcohol, such as ethylene glycol, glycerin, or hexanediol), a light stabilizer, a surfactant, an antimicrobial, a desiccant, an insoluble inorganic salt (e.g., hydrotalcite), a filler (e.g., an inorganic filler), an antiblocking agent, a flame retardant, a crosslinking agent, a foaming agent, a crystal nucleating agent, an antifogging agent, an additive for biodegradation, a silane coupling agent, an oxygen absorber, phosphoric acid and/or a salt thereof, a conjugated polyene compound, an enediol group-containing substance (e.g., a phenol, such as propyl gallate), or an aldehyde compound (e.g., an unsaturated aldehyde, such as crotonaldehyde), to the extent that the effects of the present disclosure are not inhibited (e.g., at a content of typically 10 wt. % or less, preferably 5 wt. % or less of the EVOH resin composition). Those additives may be used alone or in combination thereof.

Specific examples of the phosphoric acid and/or the salt thereof may include phosphoric acid, sodium dihydrogen phosphate, disodium hydrogen phosphate, potassium dihydrogen phosphate, dipotassium hydrogen phosphate, tripotassium phosphate, calcium monohydrogen phosphate, calcium dihydrogen phosphate, tricalcium phosphate, magnesium phosphate, magnesium hydrogen phosphate, magnesium dihydrogen phosphate, zinc hydrogen phosphate, barium hydrogen phosphate, and manganese hydrogen phosphate. Those compounds may be used alone or in combination thereof. Of those, phosphoric acid, sodium dihydrogen phosphate, potassium dihydrogen phosphate, calcium dihydrogen phosphate, magnesium dihydrogen phosphate, and zinc hydrogen phosphate are preferred, phosphoric acid, sodium dihydrogen phosphate, calcium dihydrogen phosphate, and magnesium dihydrogen phosphate are particularly preferred, and phosphoric acid is further particularly preferred.

In ordinary cases, the content of the phosphoric acid and/or the salt thereof in terms of phosphorus is preferably 900 ppm or less, more preferably from 0.01 ppm to 700 ppm, still more preferably from 0.1 ppm to 500 ppm, particularly preferably from 1 ppm to 300 ppm with respect to the total sum of the contents of the EVOH (A), the acetic acid and/or the salt thereof (B), the aliphatic carboxylic acid (C), the aliphatic carboxylic acid metal salt (D), the cinnamic acid and/or the salt thereof (G), and the phosphoric acid and/or the salt thereof.

The conjugated polyene compound is a compound having a so-called conjugated double bond, which is of a structure obtained by alternately connecting a carbon-carbon double bond and a carbon-carbon single bond, and has two or more carbon-carbon double bonds. The conjugated polyene compound may be a conjugated diene, which is of a structure obtained by alternately connecting two carbon-carbon double bonds and one carbon-carbon single bond, may be a conjugated triene, which is of a structure obtained by alternately connecting three carbon-carbon double bonds and two carbon-carbon single bonds, or may be a conjugated polyene compound, which is of a structure obtained by alternately connecting four or more carbon-carbon double bonds and three or more carbon-carbon single bonds. However, when the number of carbon-carbon double bonds to be conjugated is eight or more, concern is raised about the coloring of a formed product of the EVOH resin composition by the color of the conjugated polyene compound itself. Accordingly, a polyene having seven or less carbon-carbon double bonds to be conjugated is preferred. In addition, the plurality of conjugated double bonds each formed of two or more carbon-carbon double bonds may be present in a molecule of the compound without being conjugated with each other. For example, a compound having three conjugated trienes in one and the same molecule thereof, such as tung oil, is also included in the category of the conjugated polyene compound.

Specific examples of the conjugated polyene compound include: conjugated diene compounds each having two carbon-carbon double bonds, such as isoprene, myrcene, farnesene, cembrene, sorbic acid, a sorbic acid ester, a sorbic acid salt, and abietic acid; conjugated triene compounds each having three carbon-carbon double bonds, such as 1,3,5-hexatriene, 2,4,6-octatriene-1-carboxylic acid, eleostearic acid, tung oil, and cholecalciferol; and conjugated polyene compounds each having four or more carbon-carbon double bonds, such as cyclooctatetraene, 2,4,6,8-decatetraene-1-carboxylic acid, retinol, and retinoic acid. Those conjugated polyene compounds may be used alone or in combination thereof.

The content of the conjugated polyene compound is typically from 0.01 ppm to 10,000 ppm, preferably from 0.1 ppm to 1,000 ppm, particularly preferably from 0.5 ppm to 500 ppm with respect to the total sum of the contents of the EVOH (A), the acetic acid and/or the salt thereof (B), the aliphatic carboxylic acid (C), the aliphatic carboxylic acid metal salt (D), the cinnamic acid and/or the salt thereof (G), and the conjugated polyene compound.

The heat stabilizer is, for example, an organic acid, such as propionic acid, butyric acid, lauric acid, stearic acid, oleic acid, or behenic acid (provided that when the organic acid is used as the aliphatic carboxylic acid (C), the acid is not included in the category of the heat stabilizer), or an alkali metal salt (e.g., sodium salt or potassium salt) or an alkaline earth metal salt (e.g., calcium salt or magnesium salt) of the organic acid for the purpose of improving various physical properties of the EVOH resin composition at the time of its melt forming, such as thermal stability. Those stabilizers may be used alone or in combination thereof.

<Method of Producing EVOH Resin Composition>

Although a method of producing the EVOH resin composition of the present disclosure is not particularly limited, examples thereof include the following methods (I) to (IV):
(I) a method including blending a pellet of the EVOH (A) with at least one kind selected from the group consisting of the acetic acid and/or the salt thereof (B), the aliphatic carboxylic acid (C), the aliphatic carboxylic acid metal salt (D), and the cinnamic acid and/or the salt thereof (G) at a predetermined ratio, and dry-blending the materials (dry blending method);
(II) a method including immersing the pellet of the EVOH (A) in a solution containing at least one kind selected from the group consisting of the acetic acid and/or the salt thereof (B), the aliphatic carboxylic acid (C), the aliphatic carboxylic acid metal salt (D), and the cinnamic acid and/or the salt thereof (G), and then drying the pellet (immersion method);
(III) a method including blending the EVOH (A) with at least one kind selected from the group consisting of the acetic acid and/or the salt thereof (B), the aliphatic carboxylic acid (C), the aliphatic carboxylic acid metal salt (D), and the cinnamic acid and/or the salt thereof (G) at the time of the melt kneading of the EVOH, and then producing a pellet (melt kneading method); and
(IV) a method including adding, to a solution containing the EVOH (A), at least one kind selected from the group consisting of the acetic acid and/or the salt thereof (B), the aliphatic carboxylic acid (C), the aliphatic carboxylic acid metal salt (D), and the cinnamic acid and/or the salt thereof (G), mixing the materials, and then removing a solvent in the solution (solution mixing method).

Of those, the method (I) including blending the pellet of the EVOH (A) with at least one kind selected from the group consisting of the acetic acid and/or the salt thereof (B), the aliphatic carboxylic acid (C), the aliphatic carboxylic acid metal salt (D), and the cinnamic acid and/or the salt thereof (G) at a predetermined ratio, and dry-blending the materials (dry blending method) is industrially preferred because the method is practical in terms of productivity and economical efficiency. The above-mentioned methods may be used in combination thereof. In addition, even when the above-mentioned other additive is blended, an EVOH resin composition including the other additive is obtained in conformity with any one of the methods (I) to (IV).

A known mixing apparatus, such as a rocking mixer, a ribbon blender, or a line mixer, may be used as means for the dry blending in the method (I).

At the time of the dry blending in the method (I), in order to improve the adhesive property of at least one kind of component selected from the group consisting of the acetic acid and/or the salt thereof (B), the aliphatic carboxylic acid (C), the aliphatic carboxylic acid metal salt (D), and the cinnamic acid and/or the salt thereof (G), the water content of such pellet of the EVOH (A) is preferably adjusted to from 0.1 wt. % to 5 wt. % (more preferably from 0.5 wt. % to 4 wt. %, particularly preferably from 1 wt. % to 3 wt. %). When such water content is excessively small, there is a tendency that at least one kind selected from the group consisting of the acetic acid and/or the salt thereof (B), the aliphatic carboxylic acid (C), the aliphatic carboxylic acid metal salt (D), and the cinnamic acid and/or the salt thereof (G) is liable to fall, and hence its adhesion distribution is liable to be nonuniform.

In contrast, when the water content is excessively large, at least one kind selected from the group consisting of the acetic acid and/or the salt thereof (B), the aliphatic carboxylic acid (C), the aliphatic carboxylic acid metal salt (D), and the cinnamic acid and/or the salt thereof (G) tends to agglomerate to make its adhesion distribution nonuniform.

The water content of the pellet of the EVOH (A) as used herein is measured and calculated by the following method.

[Method of Measuring Water Content]

The pellet of the EVOH (A) is weighed (W1: unit: g) in an electronic balance. After that, the pellet is loaded into a hot-air oven-type dryer maintained at 150° C.; and dried for 5 hours. Then, the pellet is further left to cool in a desiccator for 30 minutes. Its weight after the cooling is similarly weighed (W2: unit: g), and the water content is calculated from the following equation.

Water content (%)=(W1−W2)/W1×100  [Equation]

In addition, the methods (I) and (II) each provide such a pellet that at least one kind of component selected from the group consisting of the acetic acid and/or the salt thereof (B), the aliphatic carboxylic acid (C), the aliphatic carboxylic acid metal salt (D), and the cinnamic acid and/or the salt thereof (G) adheres to the outside of the pellet of the EVOH (A).

With regard to means for the melt kneading in the method (III), the melt kneading may be performed by using a known melt kneading apparatus, such as a kneader, a ruder, an extruder, a mixing roll, a Banbury mixer, or a plastomill. In ordinary cases, the melt kneading is preferably performed at from 150° C.; to 300° C. (more preferably from 180° C.; to 280° C.) for from about 1 minute to about 20 minutes. In particular, the use of a single-screw or twin-screw extruder is industrially advantageous because a pellet is easily obtained. In addition, a vent suction apparatus, a gear pump apparatus, a screen apparatus, or the like is preferably arranged as required. In particular, an EVOH resin composition alleviated in thermal coloration and thermal deterioration, and excellent in quality can be obtained by arranging one or more vent holes in an extruder to perform suction under reduced pressure for removing moisture and a by-product (e.g., a thermally decomposed low-molecular weight product) or by continuously supplying an inert gas, such as nitrogen, into a hopper for preventing the inclusion of oxygen into the extruder.

In addition, a method of supplying the materials including the EVOH (A) to the melt kneading apparatus, such as an extruder, is not particularly limited, and examples thereof may include: (1) a method including dry-blending the EVOH (A), and at least one kind selected from the group consisting of the acetic acid and/or the salt thereof (B), the aliphatic carboxylic acid (C), the aliphatic carboxylic acid metal salt (D), the cinnamic acid and/or the salt thereof (G), and the boric acid and/or the salt thereof (F), and collectively supplying the blend to the extruder; (2) a method including supplying the EVOH (A) to the extruder, melting the EVOH, and supplying at least one kind selected from the group consisting of the acetic acid and/or the salt thereof (B), the aliphatic carboxylic acid (C), the aliphatic carboxylic acid metal salt (D), the cinnamic acid and/or the salt thereof (G), and the boric acid and/or the salt thereof (F), which is in a solid state, to the molten EVOH (solid side-feed method); and (3) a method including supplying the EVOH (A) to the extruder, melting the EVOH, and supplying at least one kind selected from the group consisting of the acetic acid and/or the salt thereof (B), the aliphatic carboxylic acid (C), the aliphatic carboxylic acid metal salt (D), the cinnamic acid and/or the salt thereof (G), and the boric acid and/or the salt thereof (F), which is in a molten state, to the molten EVOH (melt side-feed method). Of those, the method (1) is practical in terms of, for example, simplicity of the apparatus and cost for the blend.

In addition, a known approach may be used as the method of producing the pellet after the melt kneading, and examples thereof include a strand cutting method and a hot cutting method (e.g., an in-air cutting method or an underwater cutting method). The strand cutting method is preferred in terms of industrial productivity.

A known good solvent for the EVOH only needs to be used as the solvent to be used in the solution mixing method serving as the method (IV). A mixed solvent of water and an aliphatic alcohol having 1 to 4 carbon atoms is typically used, and a mixed solvent of water and methanol is preferred. At the time of the dissolution of the EVOH (A) in the solvent, heating or pressurization may be arbitrarily performed, and the concentration of the solution is also arbitrary. The solution or paste having dissolved therein the EVOH (A) only needs to be blended with at least one kind selected from the group consisting of the acetic acid and/or the salt thereof (B), the aliphatic carboxylic acid (C), the aliphatic carboxylic acid metal salt (D), the cinnamic acid and/or the salt thereof (G), and the boric acid and/or the salt thereof (F). At this time, at least one kind selected from the group consisting of the acetic acid and/or the salt thereof (B), the aliphatic carboxylic acid (C), the aliphatic carboxylic acid metal salt (D), the cinnamic acid and/or the salt thereof (G), and the boric acid and/or the salt thereof (F) may be blended under the state of, for example, a solid, a solution, or a dispersion liquid.

After the blending, an EVOH resin composition solution or paste that has been uniformly stirred is pelletized by the above-mentioned known approach. The underwater cutting method is preferred in terms of industrial productivity. The resultant pellet is dried by a known approach.

As the shape of the pellet, for example, an arbitrary shape, such as a spherical shape, an oval shape, a columnar shape, a cubic shape, or a rectangular parallelepiped shape, may be adopted. The pellet is typically of an oval shape or a columnar shape, and its size is as follows from the viewpoint of convenience when the pellet is used later as a forming material: when the pellet is of an oval shape, its shorter diameter is typically from 1 mm to 6 mm, preferably from 2 mm to 5 mm, and its longer diameter is typically from 1 mm to 6 mm, preferably from 2 mm to 5 mm. When the pellet is of a columnar shape, the diameter of its bottom surface is typically from 1 mm to 6 mm, preferably from 2 mm to 5 mm, and its length is typically from 1 mm to 6 mm, preferably from 2 mm to 5 mm.

Thus, the EVOH resin composition of the present disclosure can be obtained.

<Multilayer Structure>

A multilayer structure of the present disclosure includes at least one layer formed of the above-mentioned EVOH resin composition of the present disclosure. When the layer formed of the EVOH resin composition of the present disclosure (hereinafter simply referred to as "EVOH resin composition layer") is laminated on any other substrate, the layer can further improve the strength of the substrate or impart any other function to the substrate.

A thermoplastic resin other than the EVOH (hereinafter referred to as "other substrate resin") is preferably used as the other substrate.

Examples of the other substrate resin include: (unmodified) polyolefin resins, such as polyethylene resins, for example, linear low-density polyethylene, low-density polyethylene, ultralow-density polyethylene, medium-density polyethylene, high-density polyethylene, ethylene-propylene (block and random) copolymers, and an ethylene-α-olefin (α-olefin having 4 to 20 carbon atoms) copolymer, polypropylene resins, for example, polypropylene and a propylene-α-olefin (α-olefin having 4 to 20 carbon atoms) copolymer, polybutene, polypentene, and a polycyclic olefin resin (a polymer having a cyclic olefin structure in at least one of a main chain and side chain thereof); polyolefin resins in a broad sense including modified olefin resins, such as unsaturated carboxylic acid-modified polyolefin resins obtained by graft-modifying those polyolefins with an unsaturated carboxylic acid or an ester thereof; an ionomer; an ethylene-vinyl acetate copolymer; an ethylene-acrylic acid copolymer; an ethylene-acrylic acid ester copolymer; a polyester resin; a polyamide resin (including a copolymerized polyamide); polyvinyl chloride; polyvinylidene chloride; an acrylic resin; a polystyrene resin; a vinyl ester resin; a polyester elastomer; a polyurethane elastomer; halogenated polyolefins, such as chlorinated polyethylene and chlorinated polypropylene; and aromatic or aliphatic polyketones.

Of those, in consideration of hydrophobicity, a polyamide resin, a polyolefin resin, a polyester resin, and a polystyrene resin each serving as a hydrophobic resin are preferred, polyolefin resins, such as a polyethylene resin, a polypropylene resin, and a polycyclic olefin resin, and unsaturated carboxylic acid-modified polyolefin resins thereof are more preferred, and a polyolefin resin is particularly preferred.

The α-olefin of the polyolefin resin may be a plant-derived α-olefin derived from bioethanol, or may be a non-plant-derived, that is, petroleum-derived α-olefin, or these α-olefins may be used in combination thereof. A wide variety of α-olefins are each available as the petroleum-derived α-olefin, and hence the production of the polyolefin resin through use of any such α-olefin enables easy adjustment of the physical properties and the like of the resin. The use of the plant-derived α-olefin can further improve the biomass content of the final product, and hence can reduce an environmental load.

With regard to methods of producing plant-derived ethylene and the plant-derived α-olefin, the plant-derived ethylene and the plant-derived α-olefin (e.g., 1-butene or 1-hexene) may each be obtained as follows: a sugar solution or starch obtained from a plant such as sugarcane, corn, or a sweet potato is fermented with a microorganism such as yeast in accordance with a conventionally used method to produce bioethanol, and the bioethanol is heated in the presence of a catalyst to cause an intramolecular dehydration reaction or the like, thereby providing the ethylene or the α-olefin. Next, a plant-derived polyethylene resin may be produced by using the plant-derived ethylene and the plant-derived α-olefin thus obtained in the same manner as in the production of a petroleum-derived polyethylene resin.

Methods of producing the plant-derived ethylene, the plant-derived α-olefin, and the plant-derived polyethylene resin are described in detail in, for example, JP-A-2011-506628. The plant-derived polyethylene resin to be suitably used in the present disclosure is, for example, GREEN PE manufactured by Braskem S.A.

When the EVOH resin composition layer of the present disclosure is represented by "a" (a1, a2, ... ), and the other substrate resin layer is represented by "b" (b1, b2, ... ), for example, the following arbitrary combinations may each be adopted as the layered configuration of the multilayer structure of the present disclosure: a/b; b/a/b; a1/a2; a/b/a; a1/a2/b; a/b1/b2; a1/a2/a3; b2/b1/a/b1/b2; b1/b2/a1/a2/a3/b3/b4; and b2/b1/a1/b1/a1/b1/b2. In addition, the configuration of a layer to be laminated in one lamination direction with respect to the arbitrary EVOH resin composition layer (α) and the configuration of a layer to be laminated in the other direction with respect thereto may be identical (symmetrical) to each other, or may be different from (asymmetrical to) each other. Further, the thickness of the layer to be laminated in one lamination direction with respect to the arbitrary EVOH resin composition layer (α) and the thickness of the layer to be laminated in the other direction with respect thereto may be identical (symmetrical) to each other, or may be different from (asymmetrical to) each other.

In the layered configuration, an adhesive resin layer may be interposed between the respective layers as required. In the case of a multilayer structure including, on at least one surface of the EVOH resin composition layer of the present disclosure, the other substrate resin layer (i.e., the thermoplastic resin layer other than the EVOH) through intermediation of the adhesive resin layer, the effects of the present disclosure tend to be more effectively obtained.

In addition, when a recycled layer containing a mixture of the EVOH resin composition of the present disclosure and the other substrate resin, or of the other substrate resin and the adhesive resin, the layer being obtained by melting and forming an end portion, a defective product, and the like produced in a process for the production of the multilayer structure again, is represented by R, for example, the following combinations may each be adopted: b/R/a; a1/R/a2; b1/R/a/b2; b1/R1/a/R2/b2; b1/R1/b2/a1/a2/a3/b3/R2/b4; b1/a1/R/a2/b2; and b1/R1/a1/R2/a2/R3/b2. The layer number of the multilayer structure of the present disclosure is typically from 2 to 15, preferably from 3 to 10 in terms of total number.

With regard to the layered configuration of a multilayer structure in the multilayer structure of the present disclosure, a multilayer structure including at least a basic unit defined as follows as a constituent unit is preferred: the unit (b/a/b or b/adhesive resin layer/a/adhesive resin layer/b) of the multilayer structure, which includes the EVOH resin composition layer of the present disclosure as an intermediate layer and has the other substrate resin layers arranged as both outside layers of the intermediate layer, is defined as the basic unit.

A known resin may be used as the adhesive resin serving as a forming material for the adhesive resin layer, and only needs to be appropriately selected in accordance with the kind of the thermoplastic resin to be used for the other substrate resin layer. A typical example thereof may be a modified polyolefin polymer containing a carboxy group obtained by chemically bonding an unsaturated carboxylic acid or an anhydride thereof to a polyolefin resin through an addition reaction, a graft reaction, or the like. Examples thereof include maleic anhydride-graft-modified polyethylene, maleic anhydride-graft-modified polypropylene, maleic anhydride-graft-modified ethylene-propylene (block and random) copolymers, a maleic anhydride-graft-modified ethylene-ethyl acrylate copolymer, a maleic anhydride-graft-modified ethylene-vinyl acetate copolymer, a maleic anhydride-modified polycyclic olefin resin, and a maleic anhydride-graft-modified polyolefin resin. Those polymers may be used alone or in combination thereof.

At this time, the content of the unsaturated carboxylic acid or the anhydride thereof is typically from 0.001 wt. % to 3 wt. %, preferably from 0.01 wt. % to 1 wt. %, particularly preferably from 0.03 wt. % to 0.5 wt. % with respect to the total amount of the adhesive resin. When a modification amount in a modified product is small, the adhesion property of the resin tends to be insufficient. In contrast, when the modification amount is large, a crosslinking reaction tends to occur to deteriorate the formability thereof.

Any such adhesive resin may be blended with, for example, the EVOH (A), any other EVOH, a rubber-elastomer component, such as polyisobutylene or an ethylene-propylene rubber, and the resin of a polyolefin resin layer. In particular, the adhesive resin may be blended with a polyolefin resin different from the polyolefin resin serving as a base for the adhesive resin.

The other substrate resin and the adhesive resin layer may each contain, in addition to the acetic acid and/or the salt thereof (B), the aliphatic carboxylic acid (C), the aliphatic carboxylic acid metal salt (D), the cinnamic acid and/or the salt thereof (G), and the boric acid and/or the salt thereof (F) to be used in the present disclosure, a conventionally known additive, such as a plasticizer (e.g., ethylene glycol, glycerin, or hexanediol), a filler, a clay (e.g., montmorillonite), a colorant, an antioxidant, an antistatic agent, a lubricant (e.g., an alkali metal salt or alkaline earth metal salt of a higher fatty acid having 10 to 30 carbon atoms, a higher fatty acid ester (e.g., a methyl ester, isopropyl ester, butyl ester, or octyl ester of a higher fatty acid), a higher fatty acid amide (e.g., a saturated aliphatic amide, such as stearamide or behenamide, an unsaturated fatty acid amide, such as oleamide or erucamide, or a bisfatty acid amide, such as ethylenebisstearamide, ethylenebisoleamide, ethylenebiserucamide, or ethylenebislauramide), a low-molecular-weight polyolefin (e.g., a low-molecular-weight polyethylene or low-molecular-weight polypropylene having a molecular weight of from about 500 to about 10,000)), a fluoroethylene resin, a nucleating agent, a blocking inhibitor, a UV absorber, or a wax, to the extent that the gist of the present disclosure is not inhibited (e.g., 30 wt. % or less, preferably 10 wt. % or less). Those additives may be used alone or in combination thereof.

In addition, the resin to be used in the adhesive resin layer is preferably blended with at least one kind selected from the group consisting of the aliphatic carboxylic acid (C) and the aliphatic carboxylic acid metal salt (D) in the present disclosure. In particular, when the adhesive resin layer adjacent to the EVOH resin composition layer of the present disclosure contains at least one kind selected from the group consisting of the aliphatic carboxylic acid (C) and the aliphatic carboxylic acid metal salt (D), a multilayer structure more excellent in impact resistance is obtained.

In cases where the multilayer structure is produced by laminating the EVOH resin composition of the present disclosure together with the other substrate resin (including the case where the adhesive resin layer is interposed), the lamination may be performed by a known method. Examples thereof include: a method involving melting and extruding the other substrate resin, and laminating the resultant on a film, sheet, or the like formed of the EVOH resin composition of the present disclosure; a method involving, in contrast to the foregoing, melting and extruding the EVOH resin composition of the present disclosure, and laminating the resultant on the other substrate resin; a method involving subjecting the EVOH resin composition of the present disclosure and the other substrate resin to coextrusion; a method involving producing each of a film (layer) formed of the EVOH resin composition of the present disclosure and the other substrate resin (layer), and subjecting the products to dry lamination with a known adhesive, such as an organotitanium compound, an isocyanate compound, a polyester compound, or a polyurethane compound; and a method involving applying a solution of the EVOH resin composition of the present disclosure onto the other substrate resin, and then removing a solvent. Of those, the method involving the coextrusion is preferred in consideration of cost and environmental viewpoints.

The multilayer structure, which may be used as it is in products of various shapes, is subjected to (heat) stretching treatment as required. The stretching treatment may be any one of uniaxial stretching and biaxial stretching. In the case of the biaxial stretching, any one of simultaneous stretching and sequential stretching is permitted. In addition, a method providing a high stretching ratio out of, for example, a roll stretching method, a tenter stretching method, a tubular stretching method, a stretching blow method, and a vacuum-pressure forming method may be adopted as a stretching method. A stretching temperature is selected from the range of typically from 40° C.; to 170° C., preferably from about 60° C.; to about 160° C. When the stretching temperature is excessively low, the stretchability of the multilayer structure tends to become unsatisfactory, and when the stretching temperature is excessively high, it tends to become difficult for the multilayer structure to maintain a stable stretched state.

Thermal fixing may be performed for the purpose of imparting dimensional stability to the multilayer structure after the stretching. The thermal fixing may be performed by well-known means and for example, the stretched multilayer structure (stretched film) is subjected to a heat treatment at typically from 80° C.; to 180° C., preferably from 100° C.; to 165° C.; for typically from about 2 seconds to about 600 seconds while its tense state is kept.

In addition, when a multilayer stretched film obtained by using the EVOH resin composition of the present disclosure is used as a shrinking film, in order that heat shrinkability may be imparted thereto, a treatment involving, for example, applying cold air to the film after the stretching to cool and fix the film is desirably performed without the performance of the thermal fixing.

Further, in some cases, a multilayer container of a cup or tray shape may be obtained from the multilayer structure of the present disclosure. A drawing method is typically adopted as method of producing the multilayer container, and specific examples thereof include a vacuum forming method, a pressure forming method, a vacuum-pressure forming method, and a plug-assisted vacuum-pressure forming method. Further, when a multilayer container of a tube or bottle shape is obtained from a multilayer parison (preliminarily molded product of a hollow tube shape before blowing), a blow molding method is adopted, and specific examples thereof include an extrusion blow molding method (of, for example, a twin-head type, a mold-transfer type, a parison shift type, a rotary type, an accumulator type, or a horizontal parison type), a cold parison-type blow molding method, an injection blow molding method, and a biaxial stretching blow molding method (e.g., an extrusion-type cold parison biaxial stretching blow molding method, an injection-type cold parison biaxial stretching blow molding method, or an injection molding in-line-type biaxial stretching blow molding method). The multilayer structure of the present disclosure may be subjected to, for example, a heat treatment, a cooling treatment, a rolling treatment, a printing treatment, a dry lamination treatment, a solution or melt coating treatment, bag-making processing, deep drawing processing, box processing, tube processing, or split processing as required.

The thickness of the multilayer structure (including a stretched multilayer structure) of the present disclosure, and the thicknesses of the resin composition layer, the other substrate resin layer, and the adhesive resin layer for forming the multilayer structure are appropriately set in accordance with, for example, the layered configuration of the structure, the kind of the substrate resin, the kind of the adhesive resin, the applications and packaging form of the structure, and physical properties that the structure is required to have.

The thickness of the multilayer structure (including the stretched multilayer structure) of the present disclosure is typically from 10 μm to 5,000 μm, preferably from 30 μm to 3,000 μm, particularly preferably from 50 μm to 2,000 μm. When the total thickness of the multilayer structure is excessively small, its gas barrier property tends to reduce. In addition, when the total thickness of the multilayer structure is excessively large, economical efficiency is unfavorable because the gas barrier property becomes excess performance and hence an unnecessary raw material is used. In addition, the thickness of the EVOH resin composition layer of the present disclosure in the multilayer structure is typically from 1 μm to 500 μm, preferably from 3 μm to 300 μm, particularly preferably from 5 μm to 200 μm, the thickness of the other substrate resin layer is typically from 5 μm to 3,000 μm, preferably from 10 μm to 2,000 μm, particularly preferably from 20 μm to 1,000 μm, and the thickness of the adhesive resin layer is typically from 0.5 μm to 250 μm, preferably from 1 μm to 150 μm, particularly preferably from 3 μm to 100 μm. When two or more layers of at least one kind selected from the group consisting of the EVOH resin composition layer, the adhesive resin layer, and the other substrate resin layer are present, the above-mentioned numerical values are each a value obtained by totaling the thicknesses of the layers of the same kind.

Further, a ratio (resin composition layer/other substrate resin layer) between their thicknesses is typically from 1/99 to 50/50, preferably from 5/95 to 45/55, particularly preferably from 10/90 to 40/60, in terms of ratio between the thicknesses of the layers having the largest thicknesses in a case where two or more layers of the same kind are present. In addition, a ratio (resin composition layer/adhesive resin layer) between their thicknesses is typically from 10/90 to 99/1, preferably from 20/80 to 95/5, particularly preferably from 50/50 to 90/10, in terms of ratio between the thicknesses of the layers having the largest thicknesses in a case where two or more layers of the same kind are present.

<<Fifth Mode in which EVOH Resin Composition Further Includes Styrene Thermoplastic Elastomer (H) Free of any Polar Group and Styrene Thermoplastic Elastomer (I) Containing Polar Group, and Satisfies the Formula (6)>>

In addition, for the purpose of improving the flexibility (bending resistance) of the EVOH, in, for example, PTL 8, there is a proposal of a resin composition blended with a block copolymer of a polymer block formed of an aromatic vinyl monomer unit and a polymer block formed of an isobutylene unit, the copolymer being typified by a styrene-isobutylene-styrene triblock copolymer (SIBS) or the like. Herein, the EVOH resin and the block copolymer are mixed so that an EVOH resin phase and a block copolymer phase may each independently form a continuous phase, specifically, at a ratio "EVOH resin:block copolymer" of from about 85:15 to about 15:85, preferably from about 80:20 to about 20:80, more preferably from about 65:35 to about 35:65 (paragraph number 0043). In PTL 8, there is a description that the phase formed of the EVOH resin and the phase formed of the block copolymer are distributed while forming an interpenetrating network structure, and hence the resin composition can exhibit an excellent blocking property, such as a gas barrier property, on the basis of the EVOH phase forming the network structure, and can exhibit flexibility (bending resistance) on the basis of the block copolymer phase penetrating into the network (paragraph number 0042).

Meanwhile, there is also a disclosure that even when a blending ratio between the EVOH resin and the triblock copolymer falls within the above-mentioned ranges, the resin composition may show a poor gas barrier property or a high JIS D hardness depending on, for example, an ethylene content in the EVOH resin and the melt viscosity thereof, and the molecular weight and block component configuration of the triblock copolymer (Reference Example 1 and Reference Example 2 of Table 2).

In addition, in PTL 9, there is a proposal that a modified block copolymer modified with an unsaturated carboxylic acid should be used instead of a block copolymer, such as a styrene-butadiene block copolymer or a styrene-isoprene block copolymer, because compatibility between a polyvinyl alcohol resin, such as an EVOH resin, and the block copolymer is poor, and hence it is difficult to achieve a desired property improvement owing to nonuniformity resulting from poor mixability therebetween. There is a disclosure that the modified block copolymer is more excellent in compatibility with a polar thermoplastic resin, such as the polyvinyl alcohol resin, than an unmodified block copolymer is, and hence a resin composition obtained by blending the modified block copolymer and the resin is improved in transparency.

Herein, there is a description that the resin composition containing the modified block copolymer and the polar thermoplastic resin at a ratio of from 98:2 to 50:50 is useful as a composition in which the modified block copolymer is reformed, and in the resin composition containing the modified block copolymer and the polar thermoplastic resin at a ratio of from 2:98 to 50:50, the impact resistance and the like of the polar thermoplastic resin are improved. Specifically, there is a description that the resin composition obtained by mixing the EVOH resin and the modified block copolymer at a ratio of from 90:10 to 75:25 is significantly improved in Izod impact strength as compared to the EVOH resin (Table 5).

Further, in PTL 10, as an EVOH resin composition improved in heat-sealing property at low temperature while maintaining a gas barrier property and non-adsorptivity to contents, there is a disclosure of a resin composition containing: 99.5 wt. % to 90 wt. % of an EVOH resin; and 0.5 wt. % to 10 wt. % of one or two or more kinds of resins selected from the group consisting of a terpene resin, a rosin resin, and a C5 to C10 petroleum hydrocarbon resin.

In addition, there is a description that such resin composition is blended with a styrene thermoplastic elastomer, which is a block polymer using polystyrene as a hard segment and using polybutadiene or polyisoprene as a soft segment, for the purpose of improving the heat-sealing property and bending resistance of a film formed from the composition (paragraph numbers 0016 and 0017).

[PTL 8] JP-A-HEI10 (1998)-87923
[PTL 9] JP-A-SHO63(1988)-304043
[PTL 10] JP-A-HEI7(1995)-173348

In each of PTLs 1 to 4 and 8 to 10 described above, however, the impact resistance of the resin composition tends to be insufficient, though some degree of improvement in bending resistance thereof is observed.

In addition, in recent years, along with, for example, widespread use of Internet shopping and economic development of developing countries, physical distribution has been rapidly becoming borderless, and hence the time period for which food, drugs, and the like are transported tends to lengthen. Accordingly, a multilayer structure (packaging material) formed of an EVOH resin composition having all of high impact resistance against falling or collision at the time of long-term transportation or during handling, a more excellent gas barrier property, and excellent bending resistance has been required.

In view of the foregoing, in the present disclosure, under such background, there is provided an EVOH resin composition, which is excellent in impact resistance and is also excellent in bending resistance.

Thus, the inventors have made extensive investigations in view of such circumstances, and as a result, have found that an EVOH resin composition, which is excellent in impact resistance, and is also excellent in bending resistance and color tone stability, is obtained by using an EVOH in combination with acetic acid and/or a salt thereof, an aliphatic carboxylic acid other than acetic acid, a metal salt of the aliphatic carboxylic acid including at least one kind of metal species selected from long Periodic Table 4th-period d-block elements, a styrene thermoplastic elastomer free of any polar group, and a styrene thermoplastic elastomer containing a polar group.

That is, it has been generally known that a fatty acid metal salt accelerates the thermal decomposition of the EVOH to reduce the impact resistance and color tone of an EVOH resin composition to be obtained. Accordingly, when a person skilled in the art aims to improve the mechanical property (impact resistance) and color tone of the EVOH, the person avoids the blending of the EVOH with the fatty acid metal salt. However, the inventors have used the EVOH in combination with the acetic acid and/or the salt thereof, the aliphatic carboxylic acid and a specific metal salt thereof, and the styrene thermoplastic elastomer containing the polar group so that a specific relationship may be satisfied, and as a result, have found that the mechanical properties (impact resistance and bending resistance) and color tone of the EVOH are improved contrary to customary expectations.

As described above, the present disclosure provides the following items <V-1> to <V-18>.

<V-1> An ethylene-vinyl alcohol copolymer resin composition, including: an ethylene-vinyl alcohol copolymer (A); acetic acid and/or a salt thereof (B); an aliphatic carboxylic acid (C) other than acetic acid; an aliphatic carboxylic acid metal salt (D) that is a metal salt of the aliphatic carboxylic acid (C); a styrene thermoplastic elastomer (H) free of any polar group; and a styrene thermoplastic elastomer (I) containing a polar group, wherein a metal species of the aliphatic carboxylic acid metal salt (D) is at least one kind selected from long Periodic Table 4th-period d-block elements, and wherein respective contents of the acetic acid and/or the salt thereof (B), the aliphatic carboxylic acid (C) other than acetic acid, the aliphatic carboxylic acid metal salt (D) that is the metal salt of the aliphatic carboxylic acid (C), and the styrene thermoplastic elastomer (I) containing the polar group satisfy the following formulae (1), (2), and (6) on a weight basis.

$$0.001 \leq (\text{content of }(D)\text{ in terms of metal ion/content of }(B)\text{ in terms of acetic acid ion}) \leq 1.30 \quad (1)$$

$$0.11 \leq (\text{content of }(D)\text{ in terms of metal ion/content of }(C)\text{ in terms of carboxylic acid ion}) \leq 100 \quad (2)$$

$$30 \leq (\text{content of }(I)/\text{content of }(D)\text{ in terms of metal ion}) \leq 2,900 \quad (6)$$

<V-2> The ethylene-vinyl alcohol copolymer resin composition according to the item <V-1>, wherein the styrene thermoplastic elastomer (H) free of any polar group is a block copolymer having a polymer block (h1) formed of an aromatic vinyl monomer unit, and a polymer block obtained by polymerizing an unsaturated hydrocarbon compound and/or a hydrogenated block thereof (h2), and the styrene thermoplastic elastomer (I) containing the polar group is a modified block copolymer, which has a polymer block (i1) formed of an aromatic vinyl monomer unit, and a polymer block obtained by polymerizing an unsaturated hydrocarbon compound and/or a hydrogenated block thereof (i2), and contains the polar group.

<V-3> The ethylene-vinyl alcohol copolymer resin composition according to the item <V-1> or <V-2>, wherein respective contents of the ethylene-vinyl alcohol copolymer (A), the styrene thermoplastic elastomer (H) free of any polar group, and the styrene thermoplastic elastomer (I) containing the polar group satisfy the following formula (V4) on a weight basis.

$$0.001 \leq (\text{content of }(I)/\text{contents of }(A+H+I)) \leq 0.2 \quad (V4)$$

<V-4> The ethylene-vinyl alcohol copolymer resin composition according to any one of the items <V-1> to <V-3>, wherein respective contents of the ethylene-vinyl alcohol copolymer (A), the styrene thermoplastic elastomer (H) free of any polar group, and the styrene thermoplastic elastomer (I) containing the polar group satisfy the following formula (V5) on a weight basis.

$$1 \leq (\text{content of }(A)/\text{contents of }(H+I)) \leq 99 \quad (V5)$$

<V-5> The ethylene-vinyl alcohol copolymer resin composition according to any one of the items <V-1> to <V-4>, wherein respective contents of the styrene thermoplastic elastomer (H) free of any polar group and the styrene thermoplastic elastomer (I) containing the polar group satisfy the following formula (V6) on a weight basis.

$$0.01 \leq (\text{content of }(I)/\text{content of }(H)) \leq 10 \quad (V6)$$

<V-6> The ethylene-vinyl alcohol copolymer resin composition according to any one of the items <V-1> to <V-5>, wherein an aromatic vinyl content in the component (H) is from 5 wt. % to 50 wt. %.

<V-7> The ethylene-vinyl alcohol copolymer resin composition according to any one of the items <V-1> to <V-6>, wherein a content of the polar group of the component (I) is from $1.0 \times 10^{-3}$ mmol/g to 1 mmol/g.

<V-8> The ethylene-vinyl alcohol copolymer resin composition according to any one of the items <V-1> to <V-7>, wherein the polar group of the component (I) is a carboxy group.

<V-9> The ethylene-vinyl alcohol copolymer resin composition according to any one of the items <V-1> to <V-8>, wherein a content of a carboxy group of the component (I) is 20 mg $CH_3ONa$/g or less.

<V-10> The ethylene-vinyl alcohol copolymer resin composition according to any one of the items <V-1> to <V-9>, wherein the content of the aliphatic carboxylic acid metal salt (D) in terms of metal ion is from 0.0001 wt. % to 0.05 wt. % with respect to a total sum of contents of the ethylene-vinyl alcohol copolymer (A), the acetic acid and/or the salt thereof (B), the aliphatic carboxylic acid (C), the aliphatic carboxylic acid metal salt (D), the styrene thermoplastic elastomer (H) free of any polar group, and the styrene thermoplastic elastomer (I) containing the polar group.

<V-11> The ethylene-vinyl alcohol copolymer resin composition according to any one of the items <V-1> to <V-10>, wherein the content of the aliphatic carboxylic acid (C) in terms of carboxylic acid ion is from 0.0000001 wt. % to 0.095 wt. % with respect to a total sum of contents of the ethylene-vinyl alcohol copolymer (A), the acetic acid and/or the salt thereof (B), the aliphatic carboxylic acid (C), the aliphatic carboxylic acid metal salt (D), the styrene thermoplastic elastomer (H) free of any polar group, and the styrene thermoplastic elastomer (I) containing the polar group.

<V-12> The ethylene-vinyl alcohol copolymer resin composition according to any one of the items <V-1> to <V-11>, wherein the content of the acetic acid and/or the salt thereof (B) in terms of acetic acid ion is from 0.001 wt. % to 0.2 wt. % with respect to a total sum of contents of the ethylene-vinyl alcohol copolymer (A), the acetic acid and/or the salt thereof (B), the aliphatic carboxylic acid (C), the aliphatic carboxylic acid metal salt (D), the styrene thermoplastic elastomer (H) free of any polar group, and the styrene thermoplastic elastomer (I) containing the polar group.

<V-13> The ethylene-vinyl alcohol copolymer resin composition according to any one of the items <V-1> to <V-12>, wherein a ratio (content of acetic acid and/or salt thereof (B)

in terms of acetic acid ion/content of aliphatic carboxylic acid (C) in terms of carboxylic acid ion) of the content of the acetic acid and/or the salt thereof (B) in terms of acetic acid ion to the content of the aliphatic carboxylic acid (C) in terms of carboxylic acid ion is from 0.0001 to 10,000 on a weight basis.

<V-14> The ethylene-vinyl alcohol copolymer resin composition according to any one of the items <V-1> to <V-13>, wherein an elongation viscosity of the ethylene-vinyl alcohol copolymer resin composition at 210° C.; and 100 s$^{-1}$ satisfies the following formula (V7).

$$500 \leq \text{elongation viscosity [Pa·s]} \leq 47{,}000 \quad (V7)$$

<V-15> The ethylene-vinyl alcohol copolymer resin composition according to any one of the items <V-1> to <V-14>, further including a hydrocarbon resin (J) having a number-average molecular weight of from 100 to 3,000, and a softening point of 60° C.; or more and less than 170° C., wherein a content of the hydrocarbon resin (J) is from 0.5 wt. % to 30 wt. % with respect to a total sum of contents of the ethylene-vinyl alcohol copolymer (A), the acetic acid and/or the salt thereof (B), the aliphatic carboxylic acid (C), the aliphatic carboxylic acid metal salt (D), the styrene thermoplastic elastomer (H) free of any polar group, the styrene thermoplastic elastomer (I) containing the polar group, and the hydrocarbon resin (J).

<V-16> The ethylene-vinyl alcohol copolymer resin composition according to any one of the items <V-1> to <V-15>, further including boric acid and/or a salt thereof (F), wherein a content of the boric acid and/or the salt thereof (F) in terms of boron is from 0.0000001 wt. % to 0.05 wt. % with respect to a total sum of contents of the ethylene-vinyl alcohol copolymer (A), the acetic acid and/or the salt thereof (B), the aliphatic carboxylic acid (C), the aliphatic carboxylic acid metal salt (D), the styrene thermoplastic elastomer (H) free of any polar group, the styrene thermoplastic elastomer (I) containing the polar group, and the boric acid and/or the salt thereof (F).

<V-17> A multilayer structure, including a layer formed of the ethylene-vinyl alcohol copolymer resin composition of any one of the items <V-1> to <V-16>.

<V-18> A package, including the multilayer structure of the item <V-17>.

The EVOH resin composition of the present disclosure is a resin composition, including: the ethylene-vinyl alcohol copolymer, that is, EVOH (A); the acetic acid and/or the salt thereof (B); the aliphatic carboxylic acid (C) other than acetic acid; the aliphatic carboxylic acid metal salt (D) that is the metal salt of the aliphatic carboxylic acid (C); the styrene thermoplastic elastomer (H) free of any polar group; and the styrene thermoplastic elastomer (I) containing the polar group, wherein the metal species of the aliphatic carboxylic acid metal salt (D) is at least one kind selected from the long Periodic Table 4th-period d-block elements, and wherein the respective contents of the acetic acid and/or the salt thereof (B), the aliphatic carboxylic acid (C) other than acetic acid, the aliphatic carboxylic acid metal salt (D) that is the metal salt of the aliphatic carboxylic acid (C), and the styrene thermoplastic elastomer (I) containing the polar group satisfy the following formulae (1), (2), and (6) on a weight basis. Accordingly, the composition is excellent in impact resistance and bending resistance when formed into a film, and is also excellent in color tone stability.

$$0.001 \leq (\text{content of } (D) \text{ in terms of metal ion/content of } (B) \text{ in terms of acetic acid ion}) \leq 1.30 \quad (1)$$

$$0.11 \leq (\text{content of } (D) \text{ in terms of metal ion/content of } (C) \text{ in terms of carboxylic acid ion}) \leq 100 \quad (2)$$

$$30 \leq (\text{content of } (I)/\text{content of } (D) \text{ in terms of metal ion}) \leq 2{,}900 \quad (6)$$

In addition, when the styrene thermoplastic elastomer (H) free of any polar group is a block copolymer having a polymer block (h1) formed of an aromatic vinyl monomer unit, and a polymer block obtained by polymerizing an unsaturated hydrocarbon compound and/or a hydrogenated block thereof (h2), and the styrene thermoplastic elastomer (I) containing the polar group is a modified block copolymer, which has a polymer block (i1) formed of an aromatic vinyl monomer unit, and a polymer block obtained by polymerizing an unsaturated hydrocarbon compound and/or a hydrogenated block thereof (i2), and contains the polar group, the EVOH resin composition is more excellent in bending resistance.

In addition, when the respective contents of the ethylene-vinyl alcohol copolymer (A), the styrene thermoplastic elastomer (H) free of any polar group, and the styrene thermoplastic elastomer (I) containing the polar group satisfy the following formula (V4) on a weight basis, the EVOH resin composition is more excellent in impact resistance and bending resistance when formed into a film, and is also excellent in color tone stability.

$$0.001 \leq (\text{content of } (I)/\text{contents of } (A+H+I)) \leq 0.2 \quad (V4)$$

In addition, when the respective contents of the ethylene-vinyl alcohol copolymer (A), the styrene thermoplastic elastomer (H) free of any polar group, and the styrene thermoplastic elastomer (I) containing the polar group satisfy the following formula (V5) on a weight basis, the EVOH resin composition is more excellent in bending resistance and color tone stability.

$$1 \leq (\text{content of } (A)/\text{contents of } (H+I)) \leq 99 \quad (V5)$$

In addition, when the respective contents of the styrene thermoplastic elastomer (H) free of any polar group and the styrene thermoplastic elastomer (I) containing the polar group satisfy the following formula (V6) on a weight basis, the EVOH resin composition is more excellent in bending resistance and color tone stability.

$$0.01 \leq (\text{content of } (I)/\text{content of } (H)) \leq 10 \quad (V6)$$

In addition, when the aromatic vinyl content in the component (H) is from 5 wt. % to 50 wt. %, the EVOH resin composition is more excellent in bending resistance and color tone stability.

In addition, when the content of the polar group of the component (I) is from $1.0 \times 10^{-3}$ mmol/g to 1 mmol/g, the EVOH resin composition is more excellent in bending resistance and color tone stability.

In addition, when the polar group of the component (I) is a carboxy group, the EVOH resin composition is more excellent in bending resistance.

In addition, when the content of the carboxy group of the component (I) is 20 mg $CH_3ONa$/g or less, the EVOH resin composition is more excellent in bending resistance and color tone stability.

In addition, when the content of the aliphatic carboxylic acid metal salt (D) in terms of metal ion is from 0.0001 wt. % to 0.05 wt. % with respect to the total sum of the contents of the ethylene-vinyl alcohol copolymer (A), the acetic acid and/or the salt thereof (B), the aliphatic carboxylic acid (C), the aliphatic carboxylic acid metal salt (D), the styrene thermoplastic elastomer (H) free of any polar group, and the styrene thermoplastic elastomer (I) containing the polar group, the EVOH resin composition is more excellent in impact resistance and color tone stability.

In addition, when the content of the aliphatic carboxylic acid (C) in terms of carboxylic acid ion is from 0.0000001 wt. % to 0.095 wt. % with respect to the total sum of the contents of the ethylene-vinyl alcohol copolymer (A), the acetic acid and/or the salt thereof (B), the aliphatic carboxylic acid (C), the aliphatic carboxylic acid metal salt (D), the styrene thermoplastic elastomer (H) free of any polar group, and the styrene thermoplastic elastomer (I) containing the polar group, the EVOH resin composition is more excellent in impact resistance and color tone stability.

In addition, when the content of the acetic acid and/or the salt thereof (B) in terms of acetic acid ion is from 0.001 wt. % to 0.2 wt. % with respect to the total sum of the contents of the ethylene-vinyl alcohol copolymer (A), the acetic acid and/or the salt thereof (B), the aliphatic carboxylic acid (C), the aliphatic carboxylic acid metal salt (D), the styrene thermoplastic elastomer (H) free of any polar group, and the styrene thermoplastic elastomer (I) containing the polar group, the EVOH resin composition is more excellent in impact resistance and bending resistance when formed into a film, and is also excellent in color tone stability.

In addition, when the ratio (content of acetic acid and/or salt thereof (B) in terms of acetic acid ion/content of aliphatic carboxylic acid (C) in terms of carboxylic acid ion) of the content of the acetic acid and/or the salt thereof (B) in terms of acetic acid ion to the content of the aliphatic carboxylic acid (C) in terms of carboxylic acid ion is from 0.0001 to 10,000 on a weight basis, the EVOH resin composition is more excellent in impact resistance and bending resistance when formed into a film, and is also excellent in color tone stability.

In addition, when the elongation viscosity of the EVOH resin composition at 210° C.; and 100 s$^{-1}$ satisfies the following formula (V7), the composition is more excellent in impact resistance and bending resistance when formed into a film.

$$500 \leq \text{elongation viscosity [Pa·s]} \leq 47{,}000 \quad \text{(V7)}$$

In addition, when the EVOH resin composition further includes the hydrocarbon resin (J) having a number-average molecular weight of from 100 to 3,000, and a softening point of 60° C.; or more and less than 170° C., and the content of the hydrocarbon resin (J) is from 0.5 wt. % to 30 wt. % with respect to the total sum of the contents of the ethylene-vinyl alcohol copolymer (A), the acetic acid and/or the salt thereof (B), the aliphatic carboxylic acid (C), the aliphatic carboxylic acid metal salt (D), the styrene thermoplastic elastomer (H) free of any polar group, the styrene thermoplastic elastomer (I) containing the polar group, and the hydrocarbon resin (J), the composition is more excellent in bending resistance.

In addition, when the EVOH resin composition further includes the boric acid and/or the salt thereof (F), and the content of the boric acid and/or the salt thereof (F) in terms of boron is from 0.0000001 wt. % to 0.05 wt. % with respect to the total sum of the contents of the ethylene-vinyl alcohol copolymer (A), the acetic acid and/or the salt thereof (B), the aliphatic carboxylic acid (C), the aliphatic carboxylic acid metal salt (D), the styrene thermoplastic elastomer (H) free of any polar group, the styrene thermoplastic elastomer (I) containing the polar group, and the boric acid and/or the salt thereof (F), the composition is more excellent in impact resistance when formed into a film.

In addition, the multilayer structure, which is obtained by using the EVOH resin composition, is an excellent multilayer structure, which is excellent in mechanical properties (impact resistance and bending resistance), and in which a reduction in color tone at the time of melt forming is alleviated.

Further, the package of the present disclosure includes the multilayer structure, and hence, similarly, the package to be obtained is excellent in impact resistance and bending resistance, and is also excellent in color tone stability.

The present disclosure is described in detail below. However, the following description describes an example of a desired embodiment of the present disclosure.

An EVOH resin composition of the present disclosure includes an EVOH (A) as a main component, and includes acetic acid and/or a salt thereof (B), an aliphatic carboxylic acid (C) other than acetic acid, an aliphatic carboxylic acid metal salt (D) that is a metal salt of the aliphatic carboxylic acid (C), a styrene thermoplastic elastomer (H) free of any polar group, and a styrene thermoplastic elastomer (I) containing a polar group. The base resin of the EVOH resin composition of the present disclosure is the EVOH (A), and the content of the EVOH (A) in the EVOH resin composition is typically 60 wt. % or more, preferably 70 wt. % or more, more preferably 80 wt. % or more, particularly preferably 90 wt. % or more. The respective constituent components are described below.

The term "and/or" as used herein means at least one of those described on the left and right sides of the term, and in, for example, the case of the term "X and/or Y", the term has the following three meanings: X alone, Y alone, and X and Y.

<EVOH (A)>

In ordinary cases, the EVOH (A) to be used in the present disclosure is a resin obtained by copolymerizing ethylene and a vinyl ester monomer, and then saponifying the copolymer, and the same component as the component (A) described in the first mode may be used.

<Acetic Acid and/or Salt Thereof (B)>

The EVOH resin composition of the present disclosure includes the acetic acid and/or the salt thereof (B). That is, the EVOH resin composition of the present disclosure includes at least one kind selected from the group consisting of acetic acid and acetic acid salts.

The same component as the component (B) described in the first mode may be used as the acetic acid and/or the salt thereof (B).

The content of the acetic acid and/or the salt thereof (B) in terms of acetic acid ion is typically from 0.001 wt. % to 0.2 wt. %, preferably from 0.0015 wt. % to 0.15 wt. %, more preferably from 0.002 wt. % to 0.1 wt. %, particularly preferably from 0.0025 wt. % to 0.07 wt. %, further particularly preferably from 0.0025 wt. % to 0.065 wt. % with respect to the total sum of the contents of the EVOH (A), the acetic acid and/or the salt thereof (B), the aliphatic carboxylic acid (C), the aliphatic carboxylic acid metal salt (D), the styrene thermoplastic elastomer (H) free of any polar group, and the styrene thermoplastic elastomer (I) containing the polar group.

When such content is excessively small, there is a tendency that the adhesive strength of the EVOH resin composition is reduced by the thermally decomposed product of the aliphatic carboxylic acid metal salt (D), or the effects of the present disclosure are not sufficiently obtained. When the content is excessively large, there is a tendency that the color tone stability thereof at the time of its melt forming is liable to reduce, or the effects of the present disclosure are not sufficiently obtained.

The content of the acetic acid and/or the salt thereof (B) in terms of acetic acid ion may be measured by a known analysis method. For example, the content may be measured by using liquid chromatography-mass spectrometry (LC/MS) or gas chromatography-mass spectrometry (GC/MS).

<Aliphatic Carboxylic Acid (C) Other than Acetic Acid>

The EVOH resin composition of the present disclosure includes the aliphatic carboxylic acid (C) other than acetic acid and the same component as the component (C) described in the first mode may be used as the aliphatic carboxylic acid (C).

The content of the aliphatic carboxylic acid (C) in terms of carboxylic acid ion is typically from 0.0000001 wt. % to 0.095 wt. %, preferably from 0.000001 wt. % to 0.045 wt. %, particularly preferably from 0.00001 wt. % to 0.025 wt. %, further particularly preferably from 0.00005 wt. % to 0.02 wt. % with respect to the total sum of the contents of the EVOH (A), the acetic acid and/or the salt thereof (B), the aliphatic carboxylic acid (C), the aliphatic carboxylic acid metal salt (D), the styrene thermoplastic elastomer (H) free of any polar group, and the styrene thermoplastic elastomer (I) containing the polar group.

When such content is excessively small, there is a tendency that the thermal stability of the aliphatic carboxylic acid metal salt (D) becomes insufficient, and as a result, the effects of the present disclosure are not sufficiently obtained. When the content is excessively large, there is a tendency that the color tone stability of the EVOH resin composition at the time of its melt forming is liable to reduce, or the aliphatic carboxylic acid (C) itself acts as a plasticizer to make it impossible to sufficiently obtain the effects of the present disclosure.

The ratio (content of acetic acid and/or salt thereof (B) in terms of acetic acid ion/content of aliphatic carboxylic acid (C) in terms of carboxylic acid ion) of the content of the acetic acid and/or the salt thereof (B) in terms of acetic acid ion to the content of the aliphatic carboxylic acid (C) in terms of carboxylic acid ion is typically from 0.0001 to 10,000, preferably from 0.001 to 5,000, particularly preferably from 0.1 to 1,000, further particularly preferably from 1 to 600 on a weight basis.

When such content ratio falls within the above-mentioned ranges, the effects of the present disclosure tend to be more significantly obtained. When the ratio falls short of the ranges, there is a tendency that the color tone stability of the EVOH resin composition at the time of its melt forming is insufficient, or the adhesive strength thereof becomes insufficient. When the ratio exceeds the ranges, there is a tendency that the effects of the present disclosure are not sufficiently obtained.

<Aliphatic Carboxylic Acid Metal Salt (D)>

The EVOH resin composition of the present disclosure includes the aliphatic carboxylic acid metal salt (D) that is the metal salt of the aliphatic carboxylic acid (C). The same component as the component (D) described in the first mode may be used as the aliphatic carboxylic acid metal salt (D).

Although the reason why an excellent effect is obtained when the aliphatic carboxylic acid (C) and the anion species of the aliphatic carboxylic acid metal salt (D) are of the same species is unclear, it is assumed that when specific amounts of the aliphatic carboxylic acid (C) and the aliphatic carboxylic acid metal salt (D) are used in combination, the dispersibility of the aliphatic carboxylic acid metal salt (D) is significantly improved, and hence more excellent effects of the present disclosure are obtained. In addition, the following assumption is made. The aliphatic carboxylic acid (C) may interact with the metal species of the aliphatic carboxylic acid metal salt (D) to exist under a state like a metal complex. When the anion species of such aliphatic carboxylic acid metal salt (D) is of the same species as the aliphatic carboxylic acid (C), the metal complex can exist under a state that is more stable in terms of energy, and hence the metal complex is excellent in thermal stability even at the time of its melt forming. As a result, the impact resistance of the EVOH resin composition is improved.

In addition, when the number of carbon atoms of each of the aliphatic carboxylic acid (C) and the aliphatic carboxylic acid metal salt (D) is typically from 3 to 30, preferably from 4 to 22, particularly preferably from 5 to 14, the impact resistance tends to be more significantly improved. Although the reason for the foregoing is unclear, the following assumption is made. When the number of carbon atoms of each of the aliphatic carboxylic acid (C) and the aliphatic carboxylic acid metal salt (D) falls within the ranges, the aliphatic carboxylic acid (C) and the aliphatic carboxylic acid metal salt (D) are easily dispersed in the EVOH resin composition in amore uniform manner. Accordingly, as a result, the impact resistance of the EVOH resin composition is more significantly improved.

The content of the aliphatic carboxylic acid metal salt (D) in terms of metal ion is typically from 0.0001 wt. % to 0.05 wt. %, preferably from 0.0005 wt. % to 0.04 wt. %, particularly preferably from 0.001 wt. % to 0.03 wt. %, further particularly preferably from 0.003 wt. % to 0.025 wt. % with respect to the total sum of the contents of the EVOH (A), the acetic acid and/or the salt thereof (B), the aliphatic carboxylic acid (C), the aliphatic carboxylic acid metal salt (D), the styrene thermoplastic elastomer (H) free of any polar group, and the styrene thermoplastic elastomer (I) containing the polar group. When the content of the aliphatic carboxylic acid metal salt (D) is excessively small, there is a tendency that the effects of the present disclosure are not sufficiently obtained. When the content is excessively large, there is a tendency that the color tone stability of the EVOH resin composition at the time of its melt forming is liable to reduce.

The content of the aliphatic carboxylic acid (C) in terms of carboxylic acid ion and the content of the aliphatic carboxylic acid metal salt (D) in terms of metal ion may each be measured by a known analysis method. For example, the contents may be determined by using such methods as described below alone or in combination thereof.

(i) Content of aliphatic carboxylic acid metal salt (D) in terms of metal ion: A dry sample is precisely weighed, and is loaded into a platinum evaporating dish whose weight has been made constant, followed by carbonization with an electric heater. Next, the carbonized product is heated with a gas burner, and is baked until no smoke occurs. Further, the platinum evaporating dish is loaded into an electric furnace, and temperature in the furnace is increased to completely ash the baked product. The ashed product is cooled, and then hydrochloric acid and pure water are added thereto, followed by heating with an electric heater to dissolve the ashed product in the mixture. The solution is poured into a measuring flask, and its volume is made constant with pure water. Thus, a sample for atomic absorption analysis is obtained. The amount of a metal in the sample for atomic absorption analysis is subjected to quantitative analysis by atomic absorption spectrophotometry. Thus, the content of the aliphatic carboxylic acid metal salt (D) in terms of metal ion can be determined.

(ii) Content of aliphatic carboxylic acid (C) in terms of carboxylic acid ion: First, the total sum (Cx) of the contents of the aliphatic carboxylic acid (C) and the metal salt (D) thereof in the EVOH resin composition in terms of carboxylic acid ion is determined by using, for example, liquid chromatography-mass spectrometry (LC/MS) or gas chromatography-mass spectrometry (GC/MS). After that, the content (Cy) of the aliphatic carboxylic acid metal salt (D) in terms of carboxylic acid ion is calculated from the content of the aliphatic carboxylic acid metal salt (D) in terms of metal ion described in the foregoing. Then, the content of the aliphatic carboxylic acid (C) in terms of carboxylic acid ion can be determined from a difference ((Cx)–(Cy)) between the total sum (Cx) of the contents of the aliphatic carboxylic acid (C) and the metal salt (D) thereof in terms of carboxylic acid ion, and the content (Cy) of the aliphatic carboxylic acid metal salt (D) in terms of carboxylic acid ion.

<Styrene Thermoplastic Elastomer (H) Free of any Polar Group>

The styrene thermoplastic elastomer (H) free of any polar group to be used in the present disclosure has a polymer block (h1) of an aromatic vinyl monomer, the block typically serving as a hard segment, and a polymer block of an unsaturated hydrocarbon compound and/or a hydrogenated block thereof (h2), the block being typically a rubber component serving as a soft segment, and an elastomer generally known as a styrene thermoplastic elastomer may be used as the elastomer (in the present disclosure, such styrene thermoplastic elastomer (H) free of any polar group is sometimes referred to as "block copolymer (H)").

The styrene thermoplastic elastomer (H) free of any polar group to be used in the present disclosure only needs to contain the polymer block (h1) of the aromatic vinyl monomer, and the polymer block of the unsaturated hydrocarbon compound and/or the hydrogenated block thereof (h2), and may be of a diblock structure represented by h1-h2, a triblock structure represented by h1-h2-h1 or h2-h1-h2, a tetrablock structure represented by h1-h2-h1-h2, or a polyblock structure in which five or more blocks including the one or more blocks (h1) and the one or more blocks (h2) are linearly bonded to each other. Of those, the diblock structure represented by h1-h2, the triblock structure represented by h1-h2-h1, or the tetrablock structure represented by h1-h2-h1-h2 is preferred in terms of bending resistance and dynamical properties.

Specific examples of the monomer for forming the polymer block (h1) of the aromatic vinyl monomer include: styrene; styrene derivatives, such as α-methylstyrene, β-methylstyrene, o-methylstyrene, m-methylstyrene, p-methylstyrene, t-butylstyrene, 2,4-dimethylstyrene, 2,4,6-trimethylstyrene, monofluorostyrene, difluorostyrene, monochlorostyrene, dichlorostyrene, and methoxystyrene; and aromatic vinyl compounds, such as vinylnaphthalene, vinylanthracene, indene, and acetonaphthylene. Further, in addition to those aromatic vinyl monomers, another copolymerizable monomer, such as 1-butene, pentene, hexene, butadiene, isoprene, or methyl vinyl ether, may be used as required.

Of such monomers for forming the polymer block (h1), styrene and a styrene derivative are preferred, and styrene is particularly preferred.

The polymer block (h1) of the aromatic vinyl monomer may be a homopolymer block of the aromatic vinyl monomer, or may be a copolymer block of two or more kinds of the aromatic vinyl monomers.

The unsaturated hydrocarbon compound for forming the polymer block of the unsaturated hydrocarbon compound and/or the hydrogenated block thereof (h2) is typically an unsaturated aliphatic hydrocarbon compound having 2 to 10 carbon atoms, and specific examples thereof include an alkene having 2 to 6 carbon atoms, and a diene or conjugated diene having 4 to 6 carbon atoms. Of those, a conjugated diene having 4 to 6 carbon atoms is preferably used.

Examples of the conjugated diene compound include isoprene, butadiene, hexadiene, 2,3-dimethyl-1,3-butadiene, and 1,3-pentadiene. The diene is, for example, hexadiene. The aliphatic hydrocarbon polymer block (h2) formed of the diene compound may be a block obtained as a result of the hydrogenation of a polymer block formed of the conjugated diene compound. Examples of the alkene include ethylene, propylene, n-butylene, and isobutylene. The polymer block of the unsaturated hydrocarbon compound formed of any such alkene and/or the hydrogenated block thereof (h2) may be a block obtained as a result of the hydrogenation of a polymer block formed of the conjugated diene or the diene.

The polymer block of the unsaturated hydrocarbon compound and/or the hydrogenated block thereof (h2) may be a homopolymer block formed of one kind of the unsaturated aliphatic hydrocarbon compound, or may be a random copolymer block formed of two or more kinds of the unsaturated aliphatic hydrocarbon compound. A polymer block of the conjugated diene or a hydrogenated block thereof is preferred as the soft segment.

The hydrogenated block in the polymer block of the unsaturated hydrocarbon compound and/or the hydrogenated block thereof (h2) is formed by the hydrogenation of part or the entirety of unsaturated bonds in a polymer block of the diene and/or the conjugated diene. For example, a polybutadiene block is turned into an ethylene-butylene polymer block, a butadiene-butylene polymer block, or the like by its hydrogenation. In addition, a polyisoprene block is turned into an ethylene-propylene polymer block or the like by its hydrogenation. The hydrogenation may be performed by a known method, and a specific vinyl bond moiety in the polymer block may be selectively hydrogenated.

The block copolymer (H) to be used in the present disclosure is obtained by bonding the polymer block (h1) of the aromatic vinyl monomer and the polymer block (h2) of the unsaturated hydrocarbon compound, and its block structure is not particularly limited. Examples thereof include a radial teleblock copolymer, a multiblock copolymer, a bimodal copolymer, and a tapered block copolymer.

The content of the aromatic vinyl constituent unit (polymer block h1) in the block copolymer (H) is typically from 5 wt. % to 50 wt. %, preferably from 10 wt. % to 40 wt. %, more preferably from 10 wt. % to 35 wt. %. When the content of the aromatic vinyl constituent unit is moderately large, a difference in refractive index between the EVOH (A) and the copolymer tends to reduce to improve the transparency of the EVOH resin composition. However, when the content of the aromatic vinyl constituent unit is excessively large, there is a tendency that the flexibility of the block copolymer (H) itself reduces, and hence an improving effect on the bending resistance of the resin composition is hardly obtained. As the content of the aromatic vinyl constituent unit becomes smaller, the composition tends to be more excellent in bending resistance. In contrast, however, when the content becomes excessively small, the transparency of a film formed from the composition reduces. In addition, compatibility between the EVOH (A) and the copolymer reduces, and by extension, an improving effect on the bending resistance is hardly obtained.

In addition, the content of the polymer block of the unsaturated hydrocarbon compound and/or the hydrogenated block thereof (polymer block h2) in the block copolymer (H) is typically from 50 wt. % to 95 wt. %, preferably from 60 wt. % to 90 wt. %, more preferably from 65 wt. % to 90 wt. %.

In addition, the polymer blocks (h1) and (h2) may each be a random copolymer block obtained by copolymerizing the essential monomer with any other copolymerizable monomer as required. The other copolymerizable monomer is, for example, an unsaturated hydrocarbon having 2 or 3 carbon atoms, such as ethylene or propylene. However, when each of the polymer blocks contains the other copolymerizable monomer, the content of the other copolymerizable monomer in the polymer block is set to preferably 10 wt. % or less, more preferably 5 wt. % or less of the weight of the polymer block.

Specific examples of the block copolymer (H) having the above-mentioned configuration include a styrene-butadiene-styrene block copolymer (SBS), a styrene-isoprene-styrene block copolymer (SIS), a hydrogenated block copolymer of SBS (SEBS), a hydrogenated block copolymer of SIS (SEPS), a block copolymer obtained by hydrogenating a vinyl bond moiety of a butadiene block of SBS (SBBS), a styrene-isobutylene-styrene triblock copolymer (SIBS), and a styrene-ethylene-butylene-crystalline polyolefin block copolymer (SEBC). Of those, the SEBS excellent in thermal stability and weatherability is preferably used. In the SEBS, a polybutadiene block is turned into an ethylene-butylene copolymer block by its hydrogenation.

In addition, the melt flow rate (MFR) of the block copolymer (H) is typically from 0.01 g/10 min to 200 g/10 min, preferably from 0.1 g/10 min to 100 g/10 min, more preferably from 1 g/10 min to 50 g/10 min, particularly preferably from 3 g/10 min to 15 g/10 min under the conditions of 230° C.; and a load of 2,160 g.

As the melt viscosity of the EVOH (A) and the melt viscosity of the block copolymer (H) are closer to each other, their melt kneading becomes easier. Accordingly, such a resin composition that the block copolymer (H) is uniformly dispersed in the EVOH resin is easily obtained, and by extension, a resin composition excellent in bending resistance and transparency is easily obtained. Specifically, a MFR ratio (EVOH (A)/block copolymer (H)) measured under the conditions of 230° C.; and a load of 2,160 g is typically from 0.1 to 10, preferably from 0.5 to 4, more preferably from 0.7 to 3.

A commercial product may be used as such block copolymer (H). Examples of the commercial product include: "DYNARON", "JSR-TR", and "JSR-SIS" manufactured by JSR Corporation; "SEPTON" and "HYBRAR" manufactured by Kuraray Co., Ltd.; "QUINTAC" manufactured by Zeon Corporation; "TUFTEC" and "TUFPRENE" manufactured by Asahi Kasei Corporation; "KRATON G", "KRATON D", and "CARIFLEX TR" manufactured by Kraton Polymers; "DENKA STR" manufactured by Denki Kagaku Kogyo K.K.; and "ASAPRENE T" manufactured by Japan Elastomer Co., Ltd.

<Styrene Thermoplastic Elastomer (I) Containing Polar Group>

The styrene thermoplastic elastomer (I) containing the polar group to be used in the present disclosure is a block copolymer, which has a polymer block (i1) formed of an aromatic vinyl monomer unit and a polymer block obtained by polymerizing an unsaturated hydrocarbon compound and/or a hydrogenated block thereof (i2), and further has the polar group.

Specific examples of such polar group include a carboxy group, an amino group, an alkoxyl group, a hydroxy group, an amide group, and an epoxy group. An acid anhydride group that is a derivative of the carboxy group is also included in the category of the carboxy group (in the present disclosure, such styrene thermoplastic elastomer (I) containing the polar group is sometimes referred to as "modified block copolymer (I)").

The modified block copolymer (I) preferably has moderate reactivity with the EVOH (A). In this respect, the modified block copolymer (I) preferably has at least one kind of polar group selected from the group consisting of a carboxy group and an amino group, and a modified block copolymer having a carboxy group is more preferred.

Those used in the block copolymer (H) may be used as the aromatic vinyl monomer unit to be used in the polymer block of the aromatic vinyl monomer unit for forming the block copolymer moiety of the modified block copolymer (I) and the unsaturated hydrocarbon compound to be used in the polymer block of the unsaturated hydrocarbon compound for forming the moiety.

The monomer configurations (i.e., h1 and i1, and h2 and i2) and block structures of the respective polymer blocks of the block copolymer moiety of the modified block copolymer (I) and the block copolymer (H) may be identical to or different from each other.

The modified block copolymer (I) having the polar group has an affinity for the EVOH (A) having a hydroxy group that is a polar group. Meanwhile, the block copolymer moiety of the modified block copolymer (I) has an affinity for the block copolymer (H). Accordingly, the modified block copolymer (I) can play a role as a compatibilizer for the EVOH (A) and the block copolymer (H).

In the case of the carboxy group modification, an example of the compound to be used in the modification is an unsaturated carboxylic acid or a derivative thereof. Specifically, for example, an α,β-unsaturated carboxylic acid or an α,β-unsaturated carboxylic acid anhydride is preferred. Specific examples thereof may include: α,β-unsaturated monocarboxylic acids, such as acrylic acid and methacrylic acid; α,β-unsaturated dicarboxylic acids, such as maleic acid, succinic acid, itaconic acid, and phthalic acid; α,β-unsaturated monocarboxylic acid esters, such as glycidyl acrylate, glycidyl methacrylate, hydroxyethyl acrylate, and hydroxymethyl methacrylate; and α,β-unsaturated dicarboxylic acid anhydrides, such as maleic anhydride, succinic anhydride, itaconic anhydride, and phthalic anhydride.

In the case of the amino group modification, examples of the compound to be used in the modification include 3-lithio-1-[N,N-bis (trimethylsilyl)]aminopropane, 2-lithio-1-[N,N-bis(trimethylsilyl)]aminoethane, and 3-lithio-2,2-dimethyl-1-[N,N-bis(trimethylsilyl)]aminopropane, and an unsaturated amine or a derivative thereof. An example of the unsaturated amine or the derivative thereof is vinylamine.

In the case of the alkoxyl group modification, examples of the compound to be used in the modification include alkoxysilanes, such as tetraethoxysilane, tetramethoxysilane, methyltriethoxysilane, methyltrimethoxysilane, and dimethyldiphenoxysilane, and an unsaturated alkoxide or a derivative thereof. Specific examples of the unsaturated alkoxide or the derivative thereof include alkyl vinyl ethers, such as methyl vinyl ether, ethyl vinyl ether, propyl vinyl ether, butyl vinyl ether, isobutyl vinyl ether, pentyl vinyl ether, and hexyl vinyl ether.

In the case of the hydroxy group modification, an example of the compound to be used in the modification is an unsaturated alcohol or a derivative thereof. Specific examples thereof include 3-buten-1-ol, 4-penten-1-ol, and 5-hexen-1-ol.

In the case of the amide group modification, an example of the compound to be used in the modification is an unsaturated amide or a derivative thereof. Specific examples thereof include N-vinylformamide, N-vinylacetamide, N-methyl-N-vinylformamide, N-methyl-N-vinylacetamide, diacetone acrylamide, acrylamide, methacrylamide, and polyoxyalkylene (meth)acrylamides, such as polyoxyethylene (meth)acrylamide and polyoxypropylene (meth)acrylamide.

In the case of the epoxy group modification, an example of the compound to be used in the modification is an unsaturated epoxide or a derivative thereof. An example thereof is vinyl epoxide.

The modification with any such polar group-containing compound as described above is performed by, for example, a method including replacing part of the monomers for forming the block copolymer with the polar group-containing compound and copolymerizing the resultant, a method including introducing the polar group-containing compound into part of the side chains of the copolymer through radical addition or the like, or a method including subjecting the block copolymer to post-modification.

The content of the polar group in the modified block copolymer (I) is typically from $1.0 \times 10^{-3}$ mmol/g to 1 mmol/g, preferably from $5.0 \times 10^{-3}$ mmol/g to 0.5 mmol/g, more preferably from $1.0 \times 10^{-2}$ mmol/g to 0.2 mmol/g, still more preferably from $1.0 \times 10^{-2}$ mmol/g to 0.1 mmol/g. When the polar group content becomes excessively large, the following tendency is observed. The affinity of the copolymer for the EVOH resin becomes excessively high, and hence a high-polymerization degree product is liable to be produced. Accordingly, the MFR of the resin composition reduces, and hence the forming processability thereof is liable to be insufficient. In addition, the following tendency is observed. Viscosity bias occurs in the resin composition. Accordingly, a stripe is liable to occur when the resin composition is turned into a film, and hence the bending resistance of the film reduces.

In particular, when the modified block copolymer (I) has a carboxy group, the content of the carboxy group is typically 20 mg $CH_3ONa/g$ or less, preferably from 1 mg $CH_3ONa/g$ to 15 mg $CH_3ONa/g$, more preferably from 1 mg $CH_3ONa/g$ to 5 mg $CH_3ONa/g$ in terms of acid value measured by a titration method.

When such acid value is excessively high, the following tendency is observed. The number of reactive sites of the copolymer with the EVOH (A) increases, and hence a high-polymerization degree product is liable to be produced. Accordingly, the MFR of the resin composition reduces, and hence the forming processability thereof is liable to be insufficient. In addition, when the high-polymerization degree product is produced, the following tendency is observed. Viscosity bias occurs in the resin composition. Accordingly, a stripe is liable to occur when the resin composition is turned into a film, and hence the bending resistance of the film reduces.

In addition, the melt flow rate (MFR) of the modified block copolymer (I) is typically from 0.01 g/10 min to 200 g/10 min, preferably from 0.1 g/10 min to 100 g/10 min, more preferably from 1 g/10 min to 50 g/10 min, still more preferably from 2 g/10 min to 15 g/10 min under the conditions of 230° C.; and a load of 2,160 g.

As the melt viscosity of the EVOH (A) and the melt viscosity of the modified block copolymer (I) are closer to each other, their melt kneading becomes easier. Accordingly, a resin composition excellent in bending resistance and transparency is easily obtained. Specifically, a MFR ratio (EVOH (A)/modified block copolymer (I)) measured under the conditions of 230° C.; and a load of 2,160 g is typically from 0.1 to 10, preferably from 0.5 to 4.0, more preferably from 0.7 to 3.0.

In addition, with regard to a ratio between the melt viscosity of the block copolymer (H) and the melt viscosity of the modified block copolymer (I), specifically, for example, a MFR ratio (block copolymer (H)/modified block copolymer (I)) measured under the conditions of 230° C.; and a load of 2,160 g is typically from 0.1 to 10, preferably from 0.5 to 4.0, more preferably from 0.7 to 3.0.

A commercial product may be used as such modified block copolymer (I). Examples of the commercial product include: "TUFTEC" M series manufactured by Asahi Kasei Corporation; "KRATON" FG series manufactured by Kraton Polymers; and "f-DYNARON" series manufactured by JSR Corporation.

Although the reason why the use of the styrene thermoplastic elastomer (H) free of any polar group and the styrene thermoplastic elastomer (I) containing the polar group provides an excellent effect is unclear, the following assumption is made.

When specific amounts of the styrene thermoplastic elastomer (H) free of any polar group and the styrene thermoplastic elastomer (I) containing the polar group are used in combination, the dispersion size of the styrene thermoplastic elastomer (H) free of any polar group, which is present in the EVOH (A), is miniaturized. Accordingly, energy when the EVOH resin composition undergoes external deformation (bending deformation) is easily absorbed by the elastomer, and as a result, the bending resistance of the composition is improved.

In the EVOH resin composition of the present disclosure, the ratio ((D)/(B)) of the content of the aliphatic carboxylic acid metal salt (D) in terms of metal ion to the content of the acetic acid and/or the salt thereof (B) in terms of acetic acid ion satisfies the following formula (1) on a weight basis.

$$0.001 \leq \text{(content of } (D) \text{ in terms of metal ion/content of } (B) \text{ in terms of acetic acid ion)} \leq 1.30 \quad (1)$$

The ratio satisfies a relationship of preferably $0.005 \leq ((D)/(B)) \leq 1.1$, more preferably $0.005 \leq ((D)/(B)) \leq 1.0$, still more preferably $0.01 \leq ((D)/(B)) \leq 0.8$, particularly preferably $0.04 \leq ((D)/(B)) \leq 0.7$, further particularly preferably $0.05 \leq ((D)/(B)) \leq 0.65$. When such value falls within the ranges, the effects of the present disclosure tend to be more significantly obtained. When the value falls short of the ranges, there is a tendency that the effects of the present disclosure are not sufficiently obtained. When the value exceeds the ranges, there is a tendency that the color tone stability of the composition at the time of its melt forming is insufficient, or the adhesive strength thereof becomes insufficient.

In the EVOH resin composition of the present disclosure, the ratio ((D)/(C)) of the content of the aliphatic carboxylic acid metal salt (D) in terms of metal ion to the content of the aliphatic carboxylic acid (C) in terms of carboxylic acid ion satisfies the following formula (2) on a weight basis.

$$0.11 \leq \text{(content of } (D) \text{ in terms of metal ion/content of } (C) \text{ in terms of carboxylic acid ion)} \leq 100 \quad (2)$$

The ratio satisfies a relationship of preferably $0.13 \leq ((D)/(C)) \leq 90$, more preferably $0.15 \leq ((D)/(C)) \leq 80$, particularly preferably $0.2 \leq ((D)/(C)) \leq 70$. When such value falls within the ranges, the effects of the present disclosure tend to be more significantly obtained. When the value falls short of the ranges, there is a tendency that the color tone stability of the composition at the time of its melt forming is insufficient, or the effects of the present disclosure are not sufficiently obtained. When the value exceeds the ranges, there is a tendency that the color tone stability of the composition at the time of its melt forming is insufficient, or the formability thereof becomes insufficient.

In the EVOH resin composition of the present disclosure, the ratio ((I)/(D)) of the content of the styrene thermoplastic elastomer (I) containing the polar group to the content of the aliphatic carboxylic acid metal salt (D) in terms of metal ion satisfies the following formula (6) on a weight basis.

$$30 \leq \text{(content of (I)/content of (D) in terms of metal ion)} \leq 2{,}900 \tag{6}$$

The ratio satisfies a relationship of preferably $70 \leq ((I)/(D)) \leq 2{,}500$, particularly preferably $80 \leq ((I)/(D)) \leq 2{,}000$, further particularly preferably $90 \leq ((I)/(D)) \leq 1{,}500$. When such value falls within the ranges, the effects of the present disclosure tend to be more significantly obtained. When the value falls short of the ranges, the impact resistance, bending resistance, or color tone stability of the composition tends to be insufficient. When the value exceeds the ranges, the impact resistance or color tone stability thereof tends to be insufficient.

In the EVOH resin composition of the present disclosure, the respective contents of the EVOH (A), the styrene thermoplastic elastomer (H) free of any polar group, and the styrene thermoplastic elastomer (I) containing the polar group preferably satisfy the following formula (V4) on a weight basis.

$$0.001 \leq \text{(content of (I)/contents of (A+H+I))} \leq 0.2 \tag{V4}$$

The contents satisfy a relationship of more preferably $0.005 \leq \text{(content of (I)/contents of (A+H+I))} \leq 0.18$, particularly preferably $0.01 \leq \text{(content of (I)/contents of (A+H+I))} \leq 0.15$, further particularly preferably $0.015 \leq \text{(content of (I)/contents of (A+H+I))} \leq 0.1$. When such value falls within the ranges, the effects of the present disclosure tend to be more significantly obtained. When the value falls short of the ranges, the bending resistance of the composition tends to be insufficient. When the value exceeds the ranges, the impact resistance and color tone stability thereof tend to be insufficient.

In addition, in the EVOH resin composition of the present disclosure, the ratio ((A)/(H+I)) of the content of the EVOH (A) to the total sum of the contents of the styrene thermoplastic elastomer (H) free of any polar group and the styrene thermoplastic elastomer (I) containing the polar group preferably satisfies the following formula (V5) on a weight basis.

$$1 \leq \text{(content of (A)/contents of (H+I))} \leq 99 \tag{V5}$$

The ratio satisfies a relationship of more preferably $1.5 \leq \text{(content of (A)/contents of (H+I))} \leq 20$, particularly preferably $2 \leq \text{(content of (A)/contents of (H+I))} \leq 15$. When such value falls within the ranges, the effects of the present disclosure tend to be more significantly obtained. When the value falls short of the ranges, the gas barrier property of the composition tends to be insufficient. When the value exceeds the ranges, the bending resistance thereof tends to be insufficient.

In the EVOH resin composition of the present disclosure, the ratio ((I)/(H)) of the content of the styrene thermoplastic elastomer (I) containing the polar group to the content of the styrene thermoplastic elastomer (H) free of any polar group preferably satisfies the following formula (V6) on a weight basis.

$$0.01 \leq \text{(content of (I)/content of (H))} \leq 10 \tag{V6}$$

The ratio satisfies a relationship of more preferably $0.03 \leq \text{(content of (I)/content of (H))} \leq 3$, still more preferably $0.05 \leq \text{(content of (I)/content of (H))} \leq 2$, particularly preferably $0.08 \leq \text{(content of (I)/content of (H))} \leq 1$, further particularly preferably $0.1 \leq \text{(content of (I)/content of (H))} \leq 0.5$. When such value falls within the ranges, the effects of the present disclosure tend to be more significantly obtained. When the value falls short of the ranges, the bending resistance or color tone stability of the composition tends to be insufficient. When the value exceeds the ranges, the bending resistance or color tone stability thereof tends to be insufficient.

In addition, the elongation viscosity of the EVOH resin composition of the present disclosure at 210° C.; and 100 s$^{-1}$ preferably satisfies the following formula (V7).

$$500 \leq \text{elongation viscosity [Pa·s]} \leq 47{,}000 \tag{V7}$$

The elongation viscosity satisfies a relationship of more preferably $700 \leq \text{elongation viscosity [Pa·s]} \leq 30{,}000$, particularly preferably $800 \leq \text{elongation viscosity [Pa·s]} \leq 20{,}000$. When such value falls within the ranges, the effects of the present disclosure tend to be more significantly obtained. When the value falls short of the ranges, there is a tendency that the effects of the present disclosure are not sufficiently obtained. When the value exceeds the ranges, the formability of the composition at the time of its melt forming tends to be insufficient.

Although the reason why an excellent effect is obtained when the elongation viscosity of the EVOH resin composition of the present disclosure at 210° C.; and 100 s$^{-1}$ satisfies the formula (V7) is unclear, it is assumed that when the elongation viscosity of the EVOH resin composition of the present disclosure at 210° C.; and 100 s$^{-1}$ satisfies the formula (V7), the entangled structure of EVOH molecular chains moderately formed in the EVOH resin composition more significantly accelerates the formation of the higher-order structure of the EVOH resin composition, such as molecular orientation or a crystal structure, at the time of the multilayer coextrusion of the EVOH resin composition, and hence, as a result, the mechanical property (impact resistance) of the composition is significantly improved.

<Method of Evaluating Elongation Viscosity (Pa·s) of EVOH Resin Composition>

The same method as the elongation viscosity evaluation method described in the first mode may be used as a method of evaluating the elongation viscosity (Pa·s) of the EVOH resin composition of the present disclosure at 210° C.; and 100 s$^{-1}$.

<Hydrocarbon Resin (J)>

The EVOH resin composition of the present disclosure preferably includes the hydrocarbon resin (J).

The hydrocarbon resin (J) is added as a dispersion aid, and is a hydrocarbon resin having a number-average molecular weight of from 100 to 3,000, and a softening point of 60° C.; or more and less than 170° C. Such hydrocarbon resin typically belongs to a thermoplastic resin that is liquid or solid at normal temperature (25° C.).

Specific examples of the hydrocarbon resin (J) include: natural hydrocarbon resins, such as a rosin resin (e.g., a rosin, a modified rosin, such as a hydrogenated rosin, a disproportionated rosin, or a polymerized rosin, a rosin ester, such as a glycerin ester or pentaerythritol ester of a modified rosin) and a terpene resin (a terpene resin, an aromatic-modified terpene resin, a hydrogenated terpene resin, or a terpene phenol resin); and synthetic hydrocarbon resins, such as a petroleum resin, a coumarone indene resin, a phenol resin (e.g., an alkyl phenol resin or a rosin-modified phenol resin), a styrene resin, and a xylene resin.

The petroleum resin means a resin obtained by polymerizing a fraction containing an unsaturated hydrocarbon monomer produced as a by-product by the thermal decomposition of petroleum naphtha or the like, and is specifically classified into an aliphatic petroleum resin (C5 petroleum resin), an aromatic petroleum resin (C9 petroleum resin), an aliphatic/aromatic petroleum resin (C5/C9 petroleum resin), and an alicyclic petroleum resin (hydrogenated petroleum resin).

The aliphatic petroleum resin (C5 petroleum resin) is a synthetic resin obtained by polymerizing the refined component of the C5 fraction of a petroleum naphtha-cracked oil, and specific examples thereof include QUINTONE 100 series (manufactured by Zeon Corporation) and ESCOREZ 1000 series (manufactured by Exxon Mobil Corporation).

The aromatic petroleum resin (C9 petroleum resin) is a synthetic resin obtained by polymerizing the refined component of the C9 fraction of the petroleum naphtha-cracked oil, and specific examples thereof include PETCOAL (manufactured by Tosoh Corporation) and NISSEKI NEOPOLYMER (manufactured by Nippon Oil Corporation).

The aliphatic/aromatic petroleum resin (C5/C9 petroleum resin) is a synthetic resin obtained by copolymerizing a raw material obtained by blending the C5 fraction and the C9 fraction, and specific examples thereof include PETROTACK (manufactured by Tosoh Corporation), TOHO HIGH RESIN (manufactured by Toho Chemical Industry Co., Ltd.), QUINTONE 100 series (manufactured by Zeon Corporation), and ESCOREZ 2000 series (manufactured by Exxon Mobil Corporation).

The alicyclic petroleum resin comes in a hydrogenated petroleum resin obtained by hydrogenating the aromatic petroleum resin or the aliphatic/aromatic petroleum resin, and a synthetic resin obtained through synthesis including using dicyclopentadiene extracted from the C5 fraction as a main raw material.

Of those, the hydrogenated petroleum resin obtained by hydrogenating the aromatic petroleum resin or the aliphatic/aromatic petroleum resin is typical, and specific examples thereof include ARKON (manufactured by Arakawa Chemical Industries, Ltd.), I-MARV (manufactured by Idemitsu Kosan Co., Ltd.), and ESCOREZ 5000 series (manufactured by Exxon Mobil Corporation).

In the case of such hydrogenated petroleum resin, the polarity of the resin varies depending on its hydrogenation ratio, and the resin is mainly classified into the following two kinds: a completely hydrogenated type having a hydrogenation ratio of 90% or more, and a partially hydrogenated type having a hydrogenation ratio of less than 90%. Specific examples of the former type include ARKON P GRADE (manufactured by Arakawa Chemical Industries, Ltd.) and I-MARV P TYPE (manufactured by Idemitsu Kosan Co., Ltd.), and specific examples of the latter type include ARKON M GRADE (manufactured by Arakawa Chemical Industries, Ltd.) and I-MARV S TYPE (manufactured by Idemitsu Kosan Co., Ltd.).

In addition, specific examples of the synthetic resin obtained through synthesis including using dicyclopentadiene extracted from the C5 fraction as a main raw material, the synthetic resin serving as the alicyclic petroleum resin obtained by a method other than hydrogenation, include QUINTONE 1000 series (manufactured by Zeon Corporation) and MARUKAREZ M series (manufactured by Maruzen Petrochemical Co., Ltd.).

In the present disclosure, the petroleum resin is preferably used because the resin improves the appearance of the resin composition, such as transparency or a color tone, and the odorlessness thereof, and the alicyclic petroleum resin is more preferably used, and the hydrogenated petroleum resin is particularly preferably used.

In addition, although the hydrogenation ratio of the hydrogenated petroleum resin is not particularly limited, a completely hydrogenated-type hydrogenated petroleum resin is preferably used in consideration of its affinity for the styrene thermoplastic elastomer (H) free of any polar group that has been hydrogenated, such as a low-polarity SEBS or SEPS.

The number-average molecular weight of the hydrocarbon resin (J) is typically from 100 to 3,000, preferably 300 or more and less than 1,500, particularly preferably 400 or more and less than 1,000. When the number-average molecular weight is excessively small, the resin is liable to become a liquid in a raw material-loading portion at the time of the melt mixing of the materials for the EVOH resin composition. In particular, when the resin becomes a liquid having a low viscosity, a mixing failure is liable to occur, and hence, owing to a dispersion failure of the component (H), the transparency of a film formed from the composition may reduce, or the hydrocarbon resin (J) may be liable to be eluted from a formed article of the composition. In addition, when the number-average molecular weight is excessively large, the resin tends to hardly penetrate as a fluid into the agglomerated body of the component (B) at the time of the melt kneading of the materials. In addition, the hydrocarbon resin (J) is liable to be separated from the EVOH (A) owing to its property, that is, lipophilicity, and by extension, may be responsible for an appearance failure, such as die drool or a stripe, in the formed article.

The number-average molecular weight may be calculated as a value in terms of polystyrene obtained by gel permeation chromatography (GPC) measurement.

The softening point of the hydrocarbon resin (J) is typically 60° C.; or more and less than 170° C., preferably 95° C.; or more and less than 160° C., particularly preferably 120° C.; or more and less than 150° C. When the softening point is excessively low, the hydrocarbon resin (J) is liable to become a liquid having a low viscosity in the raw material-loading portion at the time of the melt mixing, and hence cannot sufficiently play a role as a dispersion aid. By extension, a dispersion failure of the component (H) makes it difficult to sufficiently obtain improving effects on the bending resistance and transparency of the EVOH resin composition. In addition, such a problem as described below is liable to occur: the hydrocarbon resin (J) is liable to be eluted from the formed article. When the softening point is excessively high, an unmolten portion of the hydrocarbon resin (J) remains at the time of the melt mixing to reduce its function as a dispersion aid, and hence sufficient bending resistance or sufficient transparency may not be obtained. Further, the remaining unmolten portion may cause foreign matter, such as a fish eye, in a film formed product of the composition.

A method in conformity with JIS K2207 (ring and ball method) may be used as a method of measuring the softening point.

With regard to the hue of the hydrocarbon resin (J), its Gardner number is typically 3 or less, preferably 2 or less, particularly preferably 1 or less. When the Gardner number is more than 3, the yellowness of the resin composition may strengthen to reduce its appearance property.

In addition, in the case of the hydrogenated petroleum resin, its Hazen number is typically 200 or less, preferably 150 or less, particularly preferably 100 or less. The use of a resin having a Hazen number of 200 or less can provide a colorless and transparent resin composition excellent in appearance property.

A method in conformity with JIS K0071-1 (Hazen number) or JIS K0071-2 (Gardner number) may be used as a method of measuring the hue.

Examples of the form of the hydrocarbon resin (J) at normal temperature include, but not particularly limited to, a powder shape, a bulk shape, a flake shape, a pellet shape (grain shape), and a liquid. From the viewpoints of workability and a weighing property at the time of the mixing of the materials for the EVOH resin composition, the flake shape or the pellet shape is preferred, and the pellet shape is particularly preferred.

Such hydrocarbon resin (J) as described above has the following effect: the resin acts so as to enable fine dispersion of the styrene thermoplastic elastomer (H) free of any polar group in the sea of the EVOH (A). In addition, the resin is liquefied at the time of the melt forming of the EVOH resin composition, and hence can reduce the viscosity (increase the MFR value) of the composition at the time of its melting. The foregoing may exhibit such an effect as described below. That is, the polar group-containing compound used in the styrene thermoplastic elastomer (I) containing the polar group, in particular, a carboxy group and a hydroxy group in the EVOH (A) can react with each other, and hence both the functional groups may react with each other to produce a high-polymerization degree product in a process for the melt kneading of the materials for the composition. The production of the high-polymerization degree product increases the melt viscosity of the EVOH, and hence shear heating in an extruder is liable to occur. As the amount of the high-polymerization degree product further increases, for example, an appearance failure, such as a stripe or a fish eye, may occur in the film formed product. However, it is assumed that when the viscosity of the composition at the time of its melting can be reduced by blending the hydrocarbon resin (J), the shear heating is suppressed and the production of the high-polymerization degree product is suppressed, and the suppressions can, by extension, make an effective contribution from the viewpoint of an improvement in quality of the formed product.

The content of the hydrocarbon resin (J) is typically from 0.5 wt. % to 30 wt. %, preferably from 1 wt. % to 10 wt. %, particularly preferably from 1.5 wt. % to 7.5 wt. %, further particularly preferably from 2 wt. % to 5 wt. % with respect to the total sum of the contents of the EVOH (A), the acetic acid and/or the salt thereof (B), the aliphatic carboxylic acid (C), the aliphatic carboxylic acid metal salt (D), the styrene thermoplastic elastomer (H) free of any polar group, the styrene thermoplastic elastomer (I) containing the polar group, and the hydrocarbon resin (J). When the content of the hydrocarbon resin (J) serving as a dispersion aid is excessively small, an effect of the blending of the hydrocarbon resin (J) is hardly obtained. Meanwhile, when the content is excessively large, the hydrocarbon resin (J) present in an excessive amount may be excluded to cause an appearance failure, such as a film stripe or die drool.

<Boric Acid and/or Salt Thereof (F)>

The EVOH resin composition of the present disclosure preferably includes the boric acid and/or the salt thereof (F). That is, the EVOH resin composition of the present disclosure preferably includes at least one kind selected from the group consisting of boric acid and boric acid salts.

Typical examples of the boric acid and/or the salt thereof (F) include boric acid, metal salts of boric acid, such as calcium borate, cobalt borate, zinc borate (e.g., zinc tetraborate or zinc metaborate), aluminum potassium borate, ammonium borate (e.g., ammonium metaborate, ammonium tetraborate, ammonium pentaborate, or ammonium octaborate), cadmium borate (e.g., cadmium orthoborate or cadmium tetraborate), potassium borate (e.g., potassium metaborate, potassium tetraborate, potassium pentaborate, potassium hexaborate, or potassium octaborate), silver borate (e.g., silver metaborate or silver tetraborate), copper borate (e.g., cupric borate, copper metaborate, or copper tetraborate), sodium borate (e.g., sodium metaborate, sodium diborate, sodium tetraborate, sodium pentaborate, sodium hexaborate, or sodium octaborate), lead borate (e.g., lead metaborate or lead hexaborate), nickel borate (e.g., nickel orthoborate, nickel diborate, nickel tetraborate, or nickel octaborate), barium borate (e.g., barium orthoborate, barium metaborate, barium diborate, or barium tetraborate), bismuth borate, magnesium borate (e.g., magnesium orthoborate, magnesium diborate, magnesium metaborate, trimagnesium tetraborate, or pentamagnesium tetraborate), manganese borate (e.g., manganous borate, manganese metaborate, or manganese tetraborate), lithium borate (e.g., lithium metaborate, lithium tetraborate, or lithium pentaborate), and borate minerals, such as borax, kernite, inyoite, ketoite, suanite, and szaibelyite. Of those, borax, boric acid, sodium borate, potassium borate, zinc borate, calcium borate, and magnesium borate are preferred, boric acid, sodium borate, and zinc borate are particularly preferred, and boric acid is further particularly preferred.

The content of the boric acid and/or the salt thereof (F) in terms of boron is typically from 0.0000001 wt. % to 1 wt. %, preferably from 0.0000001 wt. % to 0.6 wt. %, more preferably from 0.000001 wt. % to 0.05 wt. %, particularly preferably from 0.00001 wt. % to 0.025 wt. %, further particularly preferably from 0.0001 wt. % to 0.012 wt. % with respect to the total sum of the contents of the EVOH (A), the acetic acid and/or the salt thereof (B), the aliphatic carboxylic acid (C), the aliphatic carboxylic acid metal salt (D), the styrene thermoplastic elastomer (H) free of any polar group, the styrene thermoplastic elastomer (I) containing the polar group, and the boric acid and/or the salt thereof (F).

When such content is excessively small, an effect of the blending of the boric acid and/or the salt thereof (F) is hardly obtained. Meanwhile, when the content is excessively large, there is a tendency that the color tone of the EVOH resin composition reduces, or a fish eye frequently occurs in the composition at the time of its multilayer film formation.

In addition, although the reason why the use of a specific amount of the boric acid and/or the salt thereof (F) provides an excellent effect is unclear, the following assumption is made. The boric acid and/or the salt thereof (F) dispersed in the EVOH resin composition interacts with EVOH molecular chains to form a crosslinked structure between the EVOH molecular chains.

Accordingly, at the time of the multilayer coextrusion of the EVOH resin composition, the formation of the higher-order structure of the EVOH resin composition, such as molecular orientation or a crystal structure, is more significantly accelerated, and hence, as a result, the mechanical property (impact resistance) of the structure is improved.

The content of the boric acid and/or the salt thereof (F) in terms of boron may be measured by a known analysis method. For example, the following may be performed: after the EVOH resin composition has been subjected to wet decomposition, the volume of the decomposed product is made constant, and the boron amount of a test liquid thus obtained is determined by inductively coupled plasma-atomic emission spectroscopy (ICP-AES).

<Other Thermoplastic Resin>

The EVOH resin composition of the present disclosure may contain any other thermoplastic resin as a resin component in addition to the EVOH (A) at a content typically in the range of 30 wt. % or less with respect to the EVOH (A).

The same resin as that described in the section <Other Thermoplastic Resin> described in the first mode may be used as the other thermoplastic resin.

<Other Additive>

The EVOH resin composition of the present disclosure may include an additive to be generally blended into an EVOH resin composition, for example, a known additive, such as a heat stabilizer, an antioxidant, an antistatic agent, a colorant, a UV absorber, a lubricant (e.g., a saturated aliphatic amide (e.g., stearamide), an unsaturated fatty acid amide (e.g., oleamide), a bisfatty acid amide (e.g., ethylenebisstearamide), or a low-molecular weight polyolefin (e.g., low-molecular weight polyethylene or low-molecular weight polypropylene having a molecular weight of from about 500 to about 10,000)), a plasticizer (e.g., an aliphatic polyhydric alcohol, such as ethylene glycol, glycerin, or hexanediol), a light stabilizer, a surfactant, an antimicrobial, a desiccant, an antiblocking agent, a flame retardant, a crosslinking agent, a foaming agent, a crystal nucleating agent, an antifogging agent, an additive for biodegradation, a silane coupling agent, an oxygen absorber, phosphoric acid and/or a salt thereof, cinnamic acid and/or a salt thereof, a conjugated polyene compound, an enediol group-containing substance (e.g., a phenol, such as propyl gallate), or an aldehyde compound (e.g., an unsaturated aldehyde, such as crotonaldehyde) to the extent that the effects of the present disclosure are not inhibited (e.g., at a content of typically 10 wt. % or less, preferably 5 wt. % or less of the EVOH resin composition). Those additives may be used alone or in combination thereof.

Specific examples of the phosphoric acid and/or the salt thereof may include phosphoric acid, sodium dihydrogen phosphate, disodium hydrogen phosphate, potassium dihydrogen phosphate, dipotassium hydrogen phosphate, tripotassium phosphate, calcium monohydrogen phosphate, calcium dihydrogen phosphate, tricalcium phosphate, magnesium phosphate, magnesium hydrogen phosphate, magnesium dihydrogen phosphate, zinc hydrogen phosphate, barium hydrogen phosphate, and manganese hydrogen phosphate. Those compounds may be used alone or in combination thereof. Of those, phosphoric acid, sodium dihydrogen phosphate, potassium dihydrogen phosphate, calcium dihydrogen phosphate, magnesium dihydrogen phosphate, and zinc hydrogen phosphate are preferred, phosphoric acid, sodium dihydrogen phosphate, calcium dihydrogen phosphate, and magnesium dihydrogen phosphate are particularly preferred, and phosphoric acid is further particularly preferred.

In ordinary cases, the content of the phosphoric acid and/or the salt thereof in terms of phosphorus is preferably 900 ppm or less, more preferably from 0.01 ppm to 700 ppm, still more preferably from 0.1 ppm to 500 ppm, particularly preferably from 1 ppm to 300 ppm with respect to the total sum of the contents of the EVOH (A), the acetic acid and/or the salt thereof (B), the aliphatic carboxylic acid (C), the aliphatic carboxylic acid metal salt (D), the styrene thermoplastic elastomer (H) free of any polar group, the styrene thermoplastic elastomer (I) containing the polar group, and the phosphoric acid and/or the salt thereof.

Specific examples of the cinnamic acid and/or the salt thereof may include cis-cinnamic acid and trans-cinnamic acid, and trans-cinnamic acid is suitably used from the viewpoints of its stability and price. In addition, examples of the cinnamic acid salt include: cinnamic acid alkali metal salts, such as lithium cinnamate, sodium cinnamate, and potassium cinnamate; and cinnamic acid alkaline earth metal salts, such as magnesium cinnamate, calcium cinnamate, and barium cinnamate. Those cinnamic acids and/or salts thereof may be used alone or in combination thereof. Of those, trans-cinnamic acid is preferably used alone.

The content of the cinnamic acid and/or the salt thereof in terms of cinnamic acid ion is typically from 1 ppm to 1,200 ppm, preferably from 1 ppm to 1,000 ppm, more preferably from 10 ppm to 800 ppm, still more preferably from 15 ppm to 500 ppm with respect to the total sum of the contents of the EVOH (A), the acetic acid and/or the salt thereof (B), the aliphatic carboxylic acid (C), the aliphatic carboxylic acid metal salt (D), the styrene thermoplastic elastomer (H) free of any polar group, the styrene thermoplastic elastomer (I) containing the polar group, and the cinnamic acid and/or the salt thereof.

The conjugated polyene compound is a compound having a so-called conjugated double bond, which is of a structure obtained by alternately connecting a carbon-carbon double bond and a carbon-carbon single bond, and has two or more carbon-carbon double bonds. The conjugated polyene compound may be a conjugated diene, which is of a structure obtained by alternately connecting two carbon-carbon double bonds and one carbon-carbon single bond, may be a conjugated triene, which is of a structure obtained by alternately connecting three carbon-carbon double bonds and two carbon-carbon single bonds, or may be a conjugated polyene compound, which is of a structure obtained by alternately connecting four or more carbon-carbon double bonds and three or more carbon-carbon single bonds. However, when the number of carbon-carbon double bonds to be conjugated is eight or more, concern is raised about the coloring of a formed product of the EVOH resin composition by the color of the conjugated polyene compound itself. Accordingly, a polyene having seven or less carbon-carbon double bonds to be conjugated is preferred. In addition, the plurality of conjugated double bonds each formed of two or more carbon-carbon double bonds may be present in a molecule of the compound without being conjugated with each other. For example, a compound having three conjugated trienes in one and the same molecule thereof, such as tung oil, is also included in the category of the conjugated polyene compound.

Specific examples of the conjugated polyene compound include: conjugated diene compounds each having two carbon-carbon double bonds, such as isoprene, myrcene, farnesene, cembrene, sorbic acid, a sorbic acid ester, a sorbic acid salt, and abietic acid; conjugated triene compounds each having three carbon-carbon double bonds, such as 1,3,5-hexatriene, 2,4,6-octatriene-1-carboxylic acid, eleostearic acid, tung oil, and cholecalciferol; and conjugated polyene compounds each having four or more carbon-carbon double bonds, such as cyclooctatetraene, 2,4,6,8-decatetraene-1-carboxylic acid, retinol, and retinoic acid. Those conjugated polyene compounds may be used alone or in combination thereof.

The content of the conjugated polyene compound is typically from 0.01 ppm to 10,000 ppm, preferably from 0.1 ppm to 1,000 ppm, particularly preferably from 0.5 ppm to 500 ppm with respect to the total sum of the contents of the EVOH (A), the acetic acid and/or the salt thereof (B), the aliphatic carboxylic acid (C), the aliphatic carboxylic acid metal salt (D), the styrene thermoplastic elastomer (H) free of any polar group, the styrene thermoplastic elastomer (I) containing the polar group, and the conjugated polyene compound.

The heat stabilizer is, for example, an organic acid, such as acetic acid, propionic acid, butyric acid, lauric acid, stearic acid, oleic acid, or behenic acid (provided that when the organic acid is used as the aliphatic carboxylic acid (C), the acid is not included in the category of the heat stabilizer), or an alkali metal salt (e.g., sodium salt or potassium salt) or an alkaline earth metal salt (e.g., calcium salt or magnesium salt) of the organic acid for the purpose of improving various physical properties of the EVOH resin composition at the time of its melt forming, such as thermal stability. Those stabilizers may be used alone or in combination thereof.

<Method of Producing EVOH Resin Composition>

Although a method of producing the EVOH resin composition of the present disclosure is not particularly limited, examples thereof include the following methods (I) to (IV):
(I) a method including blending a pellet of the EVOH (A) with at least one kind selected from the group consisting of the acetic acid and/or the salt thereof (B), the aliphatic carboxylic acid (C), the aliphatic carboxylic acid metal salt (D), the styrene thermoplastic elastomer (H) free of any polar group, and the styrene thermoplastic elastomer (I) containing the polar group at a predetermined ratio, and dry-blending the materials (dry blending method);
(II) a method including immersing at least one kind selected from the group consisting of the pellets of the EVOH (A), the styrene thermoplastic elastomer (H) free of any polar group, and the styrene thermoplastic elastomer (I) containing the polar group in a solution containing at least one kind selected from the group consisting of the acetic acid and/or the salt thereof (B), the aliphatic carboxylic acid (C), and the aliphatic carboxylic acid metal salt (D), and then drying the pellet (immersion method);
(III) a method including blending the EVOH (A) with at least one kind selected from the group consisting of the acetic acid and/or the salt thereof (B), the aliphatic carboxylic acid (C), the aliphatic carboxylic acid metal salt (D), the styrene thermoplastic elastomer (H) free of any polar group, and the styrene thermoplastic elastomer (I) containing the polar group at the time of the melt kneading of the EVOH, and then producing a pellet (melt kneading method); and
(IV) a method including adding, to a solution containing at least one kind selected from the group consisting of the pellets of the EVOH (A), the styrene thermoplastic elastomer (H) free of any polar group, and the styrene thermoplastic elastomer (I) containing the polar group, at least one kind selected from the group consisting of the acetic acid and/or the salt thereof (B), the aliphatic carboxylic acid (C), and the aliphatic carboxylic acid metal salt (D), mixing the materials, and then removing a solvent in the solution (solution mixing method).

Of those, the method (III) including blending the EVOH (A) with at least one kind selected from the group consisting of the acetic acid and/or the salt thereof (B), the aliphatic carboxylic acid (C), the aliphatic carboxylic acid metal salt (D), the styrene thermoplastic elastomer (H) free of any polar group, and the styrene thermoplastic elastomer (I) containing the polar group at the time of the melt kneading of the EVOH, and then producing the pellet (melt kneading method) is industrially preferred because the method is practical in terms of productivity and economical efficiency.

The above-mentioned methods may be used in combination thereof. In addition, even when the above-mentioned other additive is blended, an EVOH resin composition including the other additive is obtained in conformity with any one of the methods (I) to (IV).

A known mixing apparatus, such as a rocking mixer, a ribbon blender, or a line mixer, may be used as means for the dry blending in the method (I).

At the time of the dry blending in the method (I), in order to improve the adhesive property of at least one kind of component selected from the group consisting of the acetic acid and/or the salt thereof (B), the aliphatic carboxylic acid (C), and the aliphatic carboxylic acid metal salt (D), the water content of at least one kind selected from the group consisting of such pellets of the EVOH (A), the styrene thermoplastic elastomer (H) free of any polar group, and the styrene thermoplastic elastomer (I) containing the polar group is preferably adjusted to from 0.1 wt. % to 5 wt. % (more preferably from 0.5 wt. % to 4 wt. %, particularly preferably from 1 wt. % to 3 wt. %). When such water content is excessively small, there is a tendency that at least one kind selected from the group consisting of the acetic acid and/or the salt thereof (B), the aliphatic carboxylic acid (C), and the aliphatic carboxylic acid metal salt (D) is liable to fall, and hence its adhesion distribution is liable to be nonuniform. In contrast, when the water content is excessively large, at least one kind selected from the group consisting of the acetic acid and/or the salt thereof (B), the aliphatic carboxylic acid (C), and the aliphatic carboxylic acid metal salt (D) tends to agglomerate to make its adhesion distribution nonuniform.

The water content of at least one kind of pellet selected from the group consisting of the pellets of the EVOH (A), the styrene thermoplastic elastomer (H) free of any polar group, and the styrene thermoplastic elastomer (I) containing the polar group as used herein is measured and calculated by the following method.

[Method of Measuring Water Content]

A pellet of at least one kind selected from the group consisting of the EVOH (A), the styrene thermoplastic elastomer (H) free of any polar group, and the styrene thermoplastic elastomer (I) containing the polar group is weighed (W1: unit: g) in an electronic balance. After that, the pellet is loaded into a hot-air oven-type dryer maintained at 150° C.; and dried for 5 hours. Then, the pellet is further left to cool in a desiccator for 30 minutes. Its weight after the cooling is similarly weighed (W2: unit: g), and the water content is calculated from the following equation.

$$\text{Water content }(\%)=\{W1-W2/W1\}\times 100 \qquad \text{[Equation]}$$

In addition, the methods (I) and (II) each provide such a pellet that at least one kind of component selected from the group consisting of the acetic acid and/or the salt thereof (B), the aliphatic carboxylic acid (C), and the aliphatic carboxylic acid metal salt (D) adheres to the outside of the pellet of at least one kind selected from the group consisting of the EVOH (A), the styrene thermoplastic elastomer (H) free of any polar group, and the styrene thermoplastic elastomer (I) containing the polar group.

With regard to means for the melt kneading in the method (III), the melt kneading may be performed by using a known melt kneading apparatus, such as a kneader, a ruder, an extruder, a mixing roll, a Banbury mixer, or a plastomill. In ordinary cases, the melt kneading is preferably performed at from 150° C.; to 300° C. (more preferably from 180° C.; to 280° C.) for from about 1 minute to about 20 minutes. In particular, the use of a single-screw or twin-screw extruder is industrially advantageous because a pellet is easily obtained. In addition, a vent suction apparatus, a gear pump apparatus, a screen apparatus, or the like is preferably arranged as required. In particular, an EVOH resin composition alleviated in thermal coloration and thermal deterioration, and excellent in quality can be obtained by arranging one or more vent holes in an extruder to perform suction under reduced pressure for removing moisture and a by-product (e.g., a thermally decomposed low-molecular weight product) or by continuously supplying an inert gas, such as nitrogen, into a hopper for preventing the inclusion of oxygen into the extruder.

In addition, a method of supplying the materials including the EVOH (A) to the melt kneading apparatus, such as an extruder, is not particularly limited, and examples thereof may include: (1) a method including dry-blending the EVOH (A), and at least one kind selected from the group consisting of the acetic acid and/or the salt thereof (B), the aliphatic carboxylic acid (C), the aliphatic carboxylic acid metal salt (D), the styrene thermoplastic elastomer (H) free of any polar group, and the styrene thermoplastic elastomer (I) containing the polar group, and collectively supplying the blend to the extruder; (2) a method including supplying at least one kind selected from the group consisting of the pellets of the EVOH (A), the styrene thermoplastic elastomer (H) free of any polar group, and the styrene thermoplastic elastomer (I) containing the polar group to the extruder, melting the pellet, and supplying at least one kind selected from the group consisting of the acetic acid and/or the salt thereof (B), the aliphatic carboxylic acid (C), and the aliphatic carboxylic acid metal salt (D), which is in a solid state, to the molten pellet (solid side-feed method); and (3) a method including supplying at least one kind selected from the group consisting of the pellets of the EVOH (A), the styrene thermoplastic elastomer (H) free of any polar group, and the styrene thermoplastic elastomer (I) containing the polar group to the extruder, melting the pellet, and supplying at least one kind selected from the group consisting of the acetic acid and/or the salt thereof (B), the aliphatic carboxylic acid (C), and the aliphatic carboxylic acid metal salt (D), which is in a molten state, to the molten pellet (melt side-feed method). Of those, the method (1) is practical in terms of, for example, simplicity of the apparatus and cost for the blend.

In addition, a known approach may be used as the method of producing the pellet after the melt kneading, and examples thereof include a strand cutting method and a hot cutting method (e.g., an in-air cutting method or an underwater cutting method). The strand cutting method is preferred in terms of industrial productivity.

A known good solvent only needs to be used as the solvent to be used in the solution mixing method serving as the method (IV). In particular, a mixed solvent of water and an aliphatic alcohol having 1 to 4 carbon atoms is used as a typical good solvent for the EVOH (A), and a mixed solvent of water and methanol is preferred. At the time of the dissolution of the pellet in the solvent, heating or pressurization may be arbitrarily performed, and the concentration of the solution is also arbitrary. The solution or paste having dissolved therein at least one kind selected from the group consisting of the pellets of the EVOH (A), the styrene thermoplastic elastomer (H) free of any polar group, and the styrene thermoplastic elastomer (I) containing the polar group only needs to be blended with at least one kind selected from the group consisting of the acetic acid and/or the salt thereof (B), the aliphatic carboxylic acid (C), and the aliphatic carboxylic acid metal salt (D). At this time, at least one kind selected from the group consisting of the acetic acid and/or the salt thereof (B), the aliphatic carboxylic acid (C), and the aliphatic carboxylic acid metal salt (D) may be blended under the state of, for example, a solid, a solution, or a dispersion liquid.

After the blending, an EVOH resin composition solution or paste that has been uniformly stirred is pelletized by the above-mentioned known approach. The underwater cutting method is preferred in terms of industrial productivity. The resultant pellet is dried by a known approach.

As the shape of the pellet, for example, an arbitrary shape, such as a spherical shape, an oval shape, a columnar shape, a cubic shape, or a rectangular parallelepiped shape, may be adopted. The pellet is typically of an oval shape or a columnar shape, and its size is as follows from the viewpoint of convenience when the pellet is used later as a forming material: when the pellet is of an oval shape, its shorter diameter is typically from 1 mm to 6 mm, preferably from 2 mm to 5 mm, and its longer diameter is typically from 1 mm to 6 mm, preferably from 2 mm to 5 mm. When the pellet is of a columnar shape, the diameter of its bottom surface is typically from 1 mm to 6 mm, preferably from 2 mm to 5 mm, and its length is typically from 1 mm to 6 mm, preferably from 2 mm to 5 mm.

Thus, the EVOH resin composition of the present disclosure can be obtained.

<Multilayer Structure>

A multilayer structure of the present disclosure includes at least one layer formed of the above-mentioned EVOH resin composition of the present disclosure. When the layer formed of the EVOH resin composition of the present disclosure (hereinafter simply referred to as "EVOH resin composition layer") is laminated on any other substrate, the layer can further improve the strength of the substrate or impart any other function to the substrate.

A thermoplastic resin other than the EVOH (hereinafter referred to as "other substrate resin") is preferably used as the other substrate.

Examples of the other substrate resin include: (unmodified) polyolefin resins, such as polyethylene resins, for example, linear low-density polyethylene, low-density polyethylene, ultralow-density polyethylene, medium-density polyethylene, high-density polyethylene, ethylene-propylene (block and random) copolymers, and an ethylene-α-olefin (α-olefin having 4 to 20 carbon atoms) copolymer, polypropylene resins, for example, polypropylene and a propylene-α-olefin (α-olefin having 4 to 20 carbon atoms) copolymer, polybutene, polypentene, and a polycyclic olefin resin (a polymer having a cyclic olefin structure in at least one of a main chain and side chain thereof); polyolefin resins in a broad sense including modified olefin resins, such as unsaturated carboxylic acid-modified polyolefin resins obtained by graft-modifying those polyolefins with an unsaturated carboxylic acid or an ester thereof; an ionomer; an ethylene-vinyl acetate copolymer; an ethylene-acrylic acid copolymer; an ethylene-acrylic acid ester copolymer; a polyester resin; a polyamide resin (including a copolymerized polyamide); polyvinyl chloride; polyvinylidene chloride; an acrylic resin; a polystyrene resin; a vinyl ester resin; a polyester elastomer; a polyurethane elastomer; halogenated polyolefins, such as chlorinated polyethylene and chlorinated polypropylene; and aromatic or aliphatic polyketones. Those other substrate resins may be used alone or in combination thereof.

Of those, in consideration of hydrophobicity, a polyamide resin, a polyolefin resin, a polyester resin, and a polystyrene resin each serving as a hydrophobic resin are preferred, polyolefin resins, such as a polyethylene resin, a polypropylene resin, and a polycyclic olefin resin, and unsaturated carboxylic acid-modified polyolefin resins thereof are more preferred, and a polyolefin resin is particularly preferred.

The α-olefin of the polyolefin resin may be a plant-derived α-olefin derived from bioethanol, or may be a non-plant-derived, that is, petroleum-derived α-olefin, or these α-olefins may be used in combination thereof. A wide variety of α-olefins are each available as the petroleum-derived α-olefin, and hence the production of the polyolefin resin through use of any such α-olefin enables easy adjustment of the physical properties and the like of the resin. The use of the plant-derived α-olefin can further improve the biomass content of the final product, and hence can reduce an environmental load.

With regard to methods of producing plant-derived ethylene and the plant-derived α-olefin, the plant-derived ethylene and the plant-derived α-olefin (e.g., 1-butene or 1-hexene) may each be obtained as follows: a sugar solution or starch obtained from a plant such as sugarcane, corn, or a sweet potato is fermented with a microorganism such as yeast in accordance with a conventionally used method to produce bioethanol, and the bioethanol is heated in the presence of a catalyst to cause an intramolecular dehydration reaction or the like, thereby providing the ethylene or the α-olefin. Next, a plant-derived polyethylene resin may be produced by using the plant-derived ethylene and the plant-derived α-olefin thus obtained in the same manner as in the production of a petroleum-derived polyethylene resin.

Methods of producing the plant-derived ethylene, the plant-derived α-olefin, and the plant-derived polyethylene resin are described in detail in, for example, JP-A-2011-506628. The plant-derived polyethylene resin to be suitably used in the present disclosure is, for example, GREEN PE manufactured by Braskem S.A.

When the EVOH resin composition layer of the present disclosure is represented by "a" (a1, a2, . . . ), and the other substrate resin layer is represented by "b" (b1, b2, . . . ), for example, the following arbitrary combinations may each be adopted as the layered configuration of the multilayer structure of the present disclosure: a/b; a1/a2; b/a/b; a/b/a; a1/a2/b; a/b1/b2; a1/a2/a3; b2/b1/a/b1/b2; b1/b2/a1/a2/a3/b3/b4; and b2/b1/a1/b1/b1/b2. In addition, the configuration of a layer to be laminated in one lamination direction with respect to the arbitrary EVOH resin composition layer (a) and the configuration of a layer to be laminated in the other direction with respect thereto may be identical (symmetrical) to each other, or may be different from (asymmetrical to) each other. Further, the thickness of the layer to be laminated in one lamination direction with respect to the arbitrary EVOH resin composition layer (a) and the thickness of the layer to be laminated in the other direction with respect thereto may be identical (symmetrical) to each other, or may be different from (asymmetrical to) each other.

In the layered configuration, an adhesive resin layer may be interposed between the respective layers as required. In the case of a multilayer structure including, on at least one surface of the EVOH resin composition layer of the present disclosure, the other substrate resin layer (i.e., the thermoplastic resin layer other than the EVOH) through intermediation of the adhesive resin layer, the effects of the present disclosure tend to be more effectively obtained.

In addition, when a recycled layer containing a mixture of the EVOH resin composition of the present disclosure and the other substrate resin, or of the other substrate resin and the adhesive resin, the layer being obtained by melting and forming an end portion, a defective product, and the like produced in a process for the production of the multilayer structure again, is represented by R, for example, the following combinations may each be adopted: b/R/a; a1/R/a2; b1/R/a/b2; b1/R1/a/R2/b2; b1/R1/b2/a1/a2/a3/b3/R2/b4; b1/a1/R/a2/b2; and b1/R1/a1/R2/a2/R3/b2. The layer number of the multilayer structure of the present disclosure is typically from 2 to 15, preferably from 3 to 10 in terms of total number.

With regard to the layered configuration of a multilayer structure in the multilayer structure of the present disclosure, a multilayer structure including at least a basic unit defined as follows as a constituent unit is preferred: the unit (b/a/b or b/adhesive resin layer/a/adhesive resin layer/b) of the multilayer structure, which includes the EVOH resin composition layer of the present disclosure as an intermediate layer and has the other substrate resin layers arranged as both outside layers of the intermediate layer, is defined as the basic unit.

A known resin may be used as the adhesive resin serving as a forming material for the adhesive resin layer, and only needs to be appropriately selected in accordance with the kind of the thermoplastic resin to be used for the other substrate resin layer.

A typical example thereof may be a modified polyolefin polymer containing a carboxy group obtained by chemically bonding an unsaturated carboxylic acid or an anhydride thereof to a polyolefin resin through an addition reaction, a graft reaction, or the like. Examples thereof include maleic anhydride-graft-modified polyethylene, maleic anhydride-graft-modified polypropylene, maleic anhydride-graft-modified ethylene-propylene (block and random) copolymers, a maleic anhydride-graft-modified ethylene-ethyl acrylate copolymer, a maleic anhydride-graft-modified ethylene-vinyl acetate copolymer, a maleic anhydride-modified polycyclic olefin resin, and a maleic anhydride-graft-modified polyolefin resin. Those polymers may be used alone or in combination thereof.

At this time, the content of the unsaturated carboxylic acid or the anhydride thereof is typically from 0.001 wt. % to 3 wt. %, preferably from 0.01 wt. % to 1 wt. %, particularly preferably from 0.03 wt. % to 0.5 wt. % with respect to the total amount of the adhesive resin. When a modification amount in a modified product is small, the adhesion property of the resin tends to be insufficient. In contrast, when the modification amount is large, a crosslinking reaction tends to occur to deteriorate the formability thereof.

Any such adhesive resin may be blended with, for example, the EVOH (A), any other EVOH, a rubber-elastomer component, such as polyisobutylene or an ethylene-propylene rubber, and the resin of a polyolefin resin layer. In particular, the adhesive resin may be blended with a polyolefin resin different from the polyolefin resin serving as a base for the adhesive resin.

The other substrate resin and the adhesive resin layer may each contain, in addition to the acetic acid and/or the salt thereof (B), the aliphatic carboxylic acid (C), and the aliphatic carboxylic acid metal salt (D) to be used in the present disclosure, a conventionally known additive, such as a plasticizer (e.g., ethylene glycol, glycerin, or hexanediol), a filler, a clay (e.g., montmorillonite), a colorant, an antioxidant, an antistatic agent, a lubricant (e.g., an alkali metal salt or alkaline earth metal salt of a higher fatty acid having 10 to 30 carbon atoms, a higher fatty acid ester (e.g., a methyl ester, isopropyl ester, butyl ester, or octyl ester of a higher fatty acid), a higher fatty acid amide (e.g., a saturated aliphatic amide, such as stearamide or behenamide, an unsaturated fatty acid amide, such as oleamide or erucamide, or a bisfatty acid amide, such as ethylenebisstearamide, ethylenebisoleamide, ethylenebiserucamide, or ethylenebislauramide), a low-molecular-weight polyolefin (e.g., a low-molecular-weight polyethylene or low-molecular-weight polypropylene having a molecular weight of from about 500 to about 10,000)), a fluoroethylene resin, a nucleating agent, a blocking inhibitor, a UV absorber, or a wax, to the extent that the gist of the present disclosure is not inhibited (e.g., 30 wt. % or less, preferably 10 wt. % or less). Those additives may be used alone or in combination thereof.

In addition, the resin to be used in the adhesive resin layer is preferably blended with at least one kind selected from the group consisting of the acetic acid and/or the salt thereof (B), the aliphatic carboxylic acid (C), and the aliphatic carboxylic acid metal salt (D) in the present disclosure. In particular, when the adhesive resin layer adjacent to the resin composition layer of the present disclosure contains at least one kind selected from the group consisting of the aliphatic carboxylic acid (C) and the aliphatic carboxylic acid metal salt (D), a multilayer structure more excellent in impact resistance is obtained.

In cases where the multilayer structure is produced by laminating the EVOH resin composition of the present disclosure together with the other substrate resin (including the case where the adhesive resin layer is interposed), the lamination may be performed by a known method. Examples thereof include: a method involving melting and extruding the other substrate resin, and laminating the resultant on a film, sheet, or the like formed of the EVOH resin composition of the present disclosure; a method involving, in contrast to the foregoing, melting and extruding the EVOH resin composition of the present disclosure, and laminating the resultant on the other substrate resin; a method involving subjecting the EVOH resin composition of the present disclosure and the other substrate resin to coextrusion; a method involving producing each of a film (layer) formed of the EVOH resin composition of the present disclosure and the other substrate resin (layer), and subjecting the products to dry lamination with a known adhesive, such as an organotitanium compound, an isocyanate compound, a polyester compound, or a polyurethane compound; and a method involving applying a solution of the EVOH resin composition of the present disclosure onto the other substrate resin, and then removing a solvent. Of those, the method involving the coextrusion is preferred in consideration of cost and environmental viewpoints.

The multilayer structure, which may be used as it is in products of various shapes, is subjected to (heat) stretching treatment as required. The stretching treatment may be any one of uniaxial stretching and biaxial stretching. In the case of the biaxial stretching, any one of simultaneous stretching and sequential stretching is permitted. In addition, a method providing a high stretching ratio out of, for example, a roll stretching method, a tenter stretching method, a tubular stretching method, a stretching blow method, and a vacuum-pressure forming method may be adopted as a stretching method. A stretching temperature is selected from the range of typically from 40° C.; to 170° C., preferably from about 60° C.; to about 160° C. When the stretching temperature is excessively low, the stretchability of the multilayer structure tends to become unsatisfactory, and when the stretching temperature is excessively high, it tends to become difficult for the multilayer structure to maintain a stable stretched state.

Thermal fixing may be performed for the purpose of imparting dimensional stability to the multilayer structure after the stretching. The thermal fixing may be performed by well-known means and for example, the stretched multilayer structure (stretched film) is subjected to a heat treatment at typically from 80° C.; to 180° C., preferably from 100° C.; to 165° C.; for typically from about 2 seconds to about 600 seconds while its tense state is kept.

In addition, when a multilayer stretched film obtained by using the EVOH resin composition of the present disclosure is used as a shrinking film, in order that heat shrinkability may be imparted thereto, a treatment involving, for example, applying cold air to the film after the stretching to cool and fix the film is desirably performed without the performance of the thermal fixing.

Further, a multilayer container of a cup or tray shape may be obtained from the multilayer structure of the present disclosure. A drawing method is typically adopted as a method of producing the multilayer container, and specific examples thereof include a vacuum forming method, a pressure forming method, a vacuum-pressure forming method, and a plug-assisted vacuum-pressure forming method. Further, when a multilayer container of a tube or bottle shape is obtained from a multilayer parison (preliminarily molded product of a hollow tube shape before blowing), a blow molding method is adopted, and specific examples thereof include an extrusion blow molding method (of, for example, a twin-head type, a mold-transfer type, a parison shift type, a rotary type, an accumulator type, or a horizontal parison type), a cold parison-type blow molding method, an injection blow molding method, and a biaxial stretching blow molding method (e.g., an extrusion-type cold parison biaxial stretching blow molding method, an injection-type cold parison biaxial stretching blow molding method, or an injection molding in-line-type biaxial stretching blow molding method). The multilayer structure of the present disclosure may be subjected to, for example, a heat treatment, a cooling treatment, a rolling treatment, a printing treatment, a dry lamination treatment, a solution or melt coating treatment, bag-making processing, deep drawing processing, box processing, tube processing, or split processing as required.

The thickness of the multilayer structure (including a stretched multilayer structure) of the present disclosure, and the thicknesses of the resin composition layer, the other substrate resin layer, and the adhesive resin layer for forming the multilayer structure are appropriately set in accordance with, for example, the layered configuration of the structure, the kind of the substrate resin, the kind of the adhesive resin, the applications and packaging form of the structure, and physical properties that the structure is required to have.

The thickness of the multilayer structure (including the stretched multilayer structure) of the present disclosure is typically from 10 μm to 5,000 μm, preferably from 30 μm to 3,000 μm, particularly preferably from 50 μm to 2,000 μm. When the total thickness of the multilayer structure is excessively small, its gas barrier property tends to reduce. In addition, when the total thickness of the multilayer structure is excessively large, economical efficiency is unfavorable because the gas barrier property becomes excess performance and hence an unnecessary raw material is used. In addition, the thickness of the resin composition layer of the present disclosure in the multilayer structure is typically from 1 μm to 500 μm, preferably from 3 μm to 300 μm, particularly preferably from 5 μm to 200 μm, the thickness of the other substrate resin layer is typically from 5 μm to 3,000 μm, preferably from 10 μm to 2,000 μm, particularly preferably from 20 μm to 1,000 μm, and the thickness of the adhesive resin layer is typically from 0.5 μm to 250 μm, preferably from 1 μm to 150 μm, particularly preferably from 3 μm to 100 μm. When two or more layers of at least one kind selected from the group consisting of the EVOH resin composition layer, the adhesive resin layer, and the other substrate resin layer are present, the above-mentioned numerical values are each a value obtained by totaling the thicknesses of the layers of the same kind.

Further, a ratio (resin composition layer/other substrate resin layer) between their thicknesses is typically from 1/99 to 50/50, preferably from 5/95 to 45/55, particularly preferably from 10/90 to 40/60, in terms of ratio between the thicknesses of the layers having the largest thicknesses in a case where two or more layers of the same kind are present. In addition, a ratio (resin composition layer/adhesive resin layer) between their thicknesses is typically from 10/90 to 99/1, preferably from 20/80 to 95/5, particularly preferably from 50/50 to 90/10, in terms of ratio between the thicknesses of the layers having the largest thicknesses in a case where two or more layers of the same kind are present.

<<Sixth Mode in which the Component (A) is EVOH Containing Structural Unit (i) Having Primary Hydroxy Group in Side Chain Thereof>>

A multilayer structure, such as a sheet, is preferably stretched for improving its strength. In addition, when molecular chains in the EVOH resin layer of the structure are aligned under a high-density state by the stretching, the gas barrier property thereof is improved. Accordingly, the multilayer structure is typically used after having been subjected to stretching treatment.

However, when the multilayer structure including the EVOH resin layer is subjected to the stretching treatment, the EVOH resin layer is not elongated well as compared to the thermoplastic resin layer of the structure. Accordingly, at the time of the stretching treatment, such as uniaxial stretching or biaxial stretching, the EVOH resin layer is hardly stretched in a uniform manner, and hence cannot follow the elongation of the outer surface layer of the structure. Accordingly, there is a problem in that a stripe occurs in the multilayer structure subjected to the stretching treatment, and in worse cases, the structure ruptures.

To improve the stretchability of the multilayer structure including the EVOH resin layer, in, for example, PTL 11, there is a proposal of the use of a resin composition obtained by mixing two kinds of EVOH resins having different ethylene contents.

[PTL 11] JP-A-HEI8(1996)-311276

In each of PTLs 1 to 4 described above, however, part of the EVOH is replaced with a resin other than the EVOH before its blending into the resin composition. Accordingly, there is a tendency that the ratio of the EVOH in the resin composition reduces, and hence a gas barrier property derived from the EVOH reduces. In PTL 11 described above, the impact resistance of the multilayer structure has tended to be insufficient, though some degree of improvement in stretchability thereof is observed.

In addition, in recent years, along with, for example, widespread use of Internet shopping and economic development of developing countries, physical distribution has been rapidly becoming borderless, and hence the time period for which food, drugs, and the like are transported tends to lengthen. Accordingly, a multilayer structure (packaging material) formed of an EVOH resin composition having all of high impact resistance against falling or collision at the time of long-term transportation or during handling, a more excellent gas barrier property, and excellent stretchability has been required.

In view of the foregoing, in the present disclosure, under such background, there is provided an EVOH resin composition, which is excellent in impact resistance and is also excellent in adhesive strength and stretchability even without being blended with any resin other than an EVOH.

Thus, the inventors have made extensive investigations in view of such circumstances, and as a result, have found that an EVOH resin composition, which is excellent in impact resistance and adhesive strength when formed into a film, and is also excellent in color tone stability and stretchability, is obtained by using an EVOH containing a structural unit (i) having a primary hydroxy group in a side chain thereof in combination with acetic acid and/or a salt thereof, an aliphatic carboxylic acid other than acetic acid, and a metal salt of the aliphatic carboxylic acid including at least one kind of metal species selected from long Periodic Table 4th-period d-block elements.

That is, it has been generally known that a fatty acid metal salt accelerates the thermal decomposition of the EVOH to reduce the impact resistance and color tone of an EVOH resin composition to be obtained. Accordingly, when a person skilled in the art aims to improve the mechanical property (impact resistance) and color tone of the EVOH, the person avoids the blending of the EVOH with the fatty acid metal salt. However, the inventors have used the EVOH in combination with the acetic acid and/or the salt thereof, and the aliphatic carboxylic acid other than acetic acid and a specific metal salt thereof so that a specific relationship may be satisfied, and as a result, have found that the mechanical property (impact resistance) and color tone of the EVOH are improved contrary to customary expectations.

As described above, the present disclosure provides the following items <VI-1> to <VI-12>.

<VI-1> An ethylene-vinyl alcohol copolymer resin composition, including: an ethylene-vinyl alcohol copolymer (A) containing a structural unit (i) having a primary hydroxy group in a side chain thereof; acetic acid and/or a salt thereof (B); an aliphatic carboxylic acid (C) other than acetic acid; and an aliphatic carboxylic acid metal salt (D) that is a metal salt of the aliphatic carboxylic acid (C) wherein a metal species of the aliphatic carboxylic acid metal salt (D) is at least one kind selected from long Periodic Table 4th-period d-block elements, and wherein respective contents of the acetic acid and/or the salt thereof (B), the aliphatic carboxylic acid (C), and the aliphatic carboxylic acid metal salt (D) satisfy the following formulae (1) and (2) on a weight basis.

$$0.001 \leq \text{(content of (D) in terms of metal ion/content of (B) in terms of acetic acid ion)} \leq 1.30 \quad (1)$$

$$0.11 \leq \text{(content of (D) in terms of metal ion/content of (C) in terms of carboxylic acid ion)} \leq 100 \quad (2)$$

<VI-2> The ethylene-vinyl alcohol copolymer resin composition according to the item <VI-1>, wherein the structural unit (i) is a structural unit represented by the following general formula (i-1):

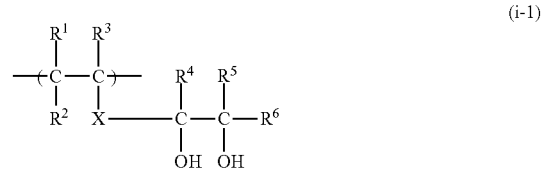

where $R^1$, $R^2$, and $R^3$ each independently represent a hydrogen atom or an organic group, X represents a single bond or a bonding chain, and $R^4$, $R^5$, and $R^6$ each independently represent a hydrogen atom or an organic group.

<VI-3> The ethylene-vinyl alcohol copolymer resin composition according to the item <VI-1> or <VI-2>, wherein the content of the aliphatic carboxylic acid metal salt (D) in terms of metal ion is from 1 ppm to 500 ppm with respect to a total sum of contents of the ethylene-vinyl alcohol copolymer (A), the acetic acid and/or the salt thereof (B), the aliphatic carboxylic acid (C), and the aliphatic carboxylic acid metal salt (D).

<VI-4> The ethylene-vinyl alcohol copolymer resin composition according to any one of the items <VI-1> to <VI-3>, wherein the content of the aliphatic carboxylic acid (C) in terms of carboxylic acid ion is from 0.001 ppm to 950 ppm with respect to a total sum of contents of the ethylene-vinyl alcohol copolymer (A), the acetic acid and/or the salt thereof (B), the aliphatic carboxylic acid (C), and the aliphatic carboxylic acid metal salt (D).

<VI-5> The ethylene-vinyl alcohol copolymer resin composition according to any one of the items <VI-1> to <VI-4>, wherein the content of the acetic acid and/or the salt thereof (B) in terms of acetic acid ion is from 10 ppm to 2,000 ppm with respect to a total sum of contents of the ethylene-vinyl alcohol copolymer (A), the acetic acid and/or the salt thereof (B), the aliphatic carboxylic acid (C), and the aliphatic carboxylic acid metal salt (D).

<VI-6> The ethylene-vinyl alcohol copolymer resin composition according to any one of the items <VI-1> to <VI-5>, wherein a ratio (content of acetic acid and/or salt thereof (B) in terms of acetic acid ion/content of aliphatic carboxylic acid (C) in terms of carboxylic acid ion) of the content of the acetic acid and/or the salt thereof (B) in terms of acetic acid ion to the content of the aliphatic carboxylic acid (C) in terms of carboxylic acid ion is from 0.0001 to 10,000 on a weight basis.

<VI-7> The ethylene-vinyl alcohol copolymer resin composition according to any one of the items <VI-1> to <VI-6>, wherein an elongation viscosity of the ethylene-vinyl alcohol copolymer resin composition at 210° C.; and 100 s$^{-1}$ satisfies the following formula (VI3).

500≤elongation viscosity [Pa·s]≤47,000    (VI3)

<VI-8> The ethylene-vinyl alcohol copolymer resin composition according to any one of the items <VI-1> to <VI-7>, further including boric acid and/or a salt thereof (F), wherein a content of the boric acid and/or the salt thereof (F) in terms of boron is from 0.001 ppm to 1,000 ppm with respect to a total sum of contents of the ethylene-vinyl alcohol copolymer (A), the acetic acid and/or the salt thereof (B), the aliphatic carboxylic acid (C), the aliphatic carboxylic acid metal salt (D), and the boric acid and/or the salt thereof (F).

<VI-9> The ethylene-vinyl alcohol copolymer resin composition according to any one of the items <VI-1> to <VI-8>, wherein a ratio (content of aliphatic carboxylic acid metal salt (D) in terms of metal ion/content of boric acid and/or salt thereof (F) in terms of boron) of the content of the aliphatic carboxylic acid metal salt (D) in terms of metal ion to a content of the boric acid and/or the salt thereof (F) in terms of boron is from 0.0001 to 10,000 on a weight basis.

<VI-10> The ethylene-vinyl alcohol copolymer resin composition according to anyone of the items <VI-1> to <VI-9>, further including phosphoric acid and/or a salt thereof (E), wherein a content of the phosphoric acid and/or the salt thereof (E) in terms of phosphorus is 900 ppm or less with respect to a total sum of contents of the ethylene-vinyl alcohol copolymer (A), the acetic acid and/or the salt thereof (B), the aliphatic carboxylic acid (C), the aliphatic carboxylic acid metal salt (D), and the phosphoric acid and/or the salt thereof (E).

<VI-11> A multilayer structure, including a layer formed of the ethylene-vinyl alcohol copolymer resin composition of any one of the items <VI-1> to <VI-10>.

<VI-12> A package, including the multilayer structure of the item <VI-11>.

The EVOH resin composition of the present disclosure is an ethylene-vinyl alcohol copolymer resin composition, including: the ethylene-vinyl alcohol copolymer, that is, EVOH (A) containing the structural unit (i) having a primary hydroxy group in a side chain thereof; the acetic acid and/or the salt thereof (B); the aliphatic carboxylic acid (C) other than acetic acid; and the aliphatic carboxylic acid metal salt (D) that is the metal salt of the aliphatic carboxylic acid (C), wherein the metal species of the aliphatic carboxylic acid metal salt (D) is at least one kind selected from the long Periodic Table 4th-period d-block elements, and wherein the respective contents of the acetic acid and/or the salt thereof (B), the aliphatic carboxylic acid (C), and the aliphatic carboxylic acid metal salt (D) satisfy the following formulae (1) and (2) on a weight basis. Accordingly, even when the composition is not blended with any resin other than the EVOH, the composition is excellent in impact resistance and adhesive strength when formed into a film, and is also excellent in color tone stability and stretchability.

0.001≤(content of (D) in terms of metal ion/content of (B) in terms of acetic acid ion)≤1.30    (1)

0.11≤(content of (D) in terms of metal ion/content of (C) in terms of carboxylic acid ion)≤100    (2)

In addition, when the structural unit (i) is the structural unit represented by the following general formula (i-1), the EVOH resin composition is more excellent in stretchability and gas barrier property:

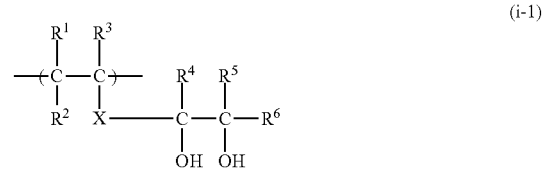

(i-1)

where R$^1$, R$^2$, and R$^3$ each independently represent a hydrogen atom or an organic group, X represents a single bond or a bonding chain, and R$^4$, R$^5$, and R$^6$ each independently represent a hydrogen atom or an organic group.

In addition, when the content of the aliphatic carboxylic acid metal salt (D) in terms of metal ion is from 1 ppm to 500 ppm with respect to the total sum of the contents of the ethylene-vinyl alcohol copolymer (A), the acetic acid and/or the salt thereof (B), the aliphatic carboxylic acid (C), and the aliphatic carboxylic acid metal salt (D), the EVOH resin composition is more excellent in impact resistance and adhesive strength when formed into a film.

In addition, when the content of the aliphatic carboxylic acid (C) in terms of carboxylic acid ion is from 0.001 ppm to 950 ppm with respect to the total sum of the contents of the ethylene-vinyl alcohol copolymer (A), the acetic acid and/or the salt thereof (B), the aliphatic carboxylic acid (C), and the aliphatic carboxylic acid metal salt (D), the EVOH resin composition is more excellent in impact resistance when formed into a film, and is also excellent in color tone stability.

In addition, when the content of the acetic acid and/or the salt thereof (B) in terms of acetic acid ion is from 10 ppm to 2,000 ppm with respect to the total sum of the contents of the ethylene-vinyl alcohol copolymer (A), the acetic acid and/or the salt thereof (B), the aliphatic carboxylic acid (C), and the aliphatic carboxylic acid metal salt (D), the EVOH resin composition is more excellent in impact resistance and adhesive strength when formed into a film, and is also excellent in color tone stability.

In addition, when the elongation viscosity of the ethylene-vinyl alcohol copolymer resin composition at 210° C.; and 100 s$^{-1}$ satisfies the following formula (VI3), the composition is more excellent in impact resistance when formed into a film.

$$500 \leq \text{elongation viscosity [Pa·s]} \leq 47{,}000 \quad \text{(VI3)}$$

In addition, when the ratio (content of acetic acid and/or salt thereof (B) in terms of acetic acid ion/content of aliphatic carboxylic acid (C) in terms of carboxylic acid ion) of the content of the acetic acid and/or the salt thereof (B) in terms of acetic acid ion to the content of the aliphatic carboxylic acid (C) in terms of carboxylic acid ion is from 0.0001 to 10,000 on a weight basis, the EVOH resin composition is more excellent in impact resistance when formed into a film, and is also excellent in color tone stability.

In addition, when the ethylene-vinyl alcohol copolymer resin composition further includes boric acid and/or a salt thereof (F), and the content of the boric acid and/or the salt thereof (F) in terms of boron is from 0.001 ppm to 1,000 ppm with respect to the total sum of the contents of the ethylene-vinyl alcohol copolymer (A), the acetic acid and/or the salt thereof (B), the aliphatic carboxylic acid (C), the aliphatic carboxylic acid metal salt (D), and the boric acid and/or the salt thereof (F), the composition is more excellent in impact resistance when formed into a film, and is also excellent in color tone stability and stretchability.

In addition, when the ratio (content of aliphatic carboxylic acid metal salt (D) in terms of metal ion/content of boric acid and/or salt thereof (F) in terms of boron) of the content of the aliphatic carboxylic acid metal salt (D) in terms of metal ion to the content of the boric acid and/or the salt thereof (F) in terms of boron is from 0.0001 to 10,000 on a weight basis, the EVOH resin composition is more excellent in impact resistance when formed into a film, and is also excellent in color tone stability and stretchability.

In addition, when the ethylene-vinyl alcohol copolymer resin composition further includes phosphoric acid and/or a salt thereof (E), and the content of the phosphoric acid and/or the salt thereof (E) in terms of phosphorus is 900 ppm or less with respect to the total sum of the contents of the ethylene-vinyl alcohol copolymer (A), the acetic acid and/or the salt thereof (B), the aliphatic carboxylic acid (C), the aliphatic carboxylic acid metal salt (D), and the phosphoric acid and/or the salt thereof (E), the composition is more excellent in impact resistance when formed into a film, and is also excellent in color tone stability.

In addition, the multilayer structure, which is obtained by using the EVOH resin composition, is an excellent multilayer structure, which is excellent in mechanical property (impact resistance) and stretchability, and in which a reduction in color tone at the time of melt forming and a reduction in adhesive strength are alleviated.

Further, the package of the present disclosure includes the multilayer structure, and hence, similarly, the package to be obtained is excellent in impact resistance and adhesive strength when formed into a film, and is also excellent in color tone stability and stretchability.

The present disclosure is described in detail below. However, the following description describes an example of a desired embodiment of the present disclosure.

An EVOH resin composition of the present disclosure includes as a main component an EVOH (A) containing a structural unit (i) having a primary hydroxy group in a side chain thereof, and includes acetic acid and/or a salt thereof (B), an aliphatic carboxylic acid (C) other than acetic acid, and an aliphatic carboxylic acid metal salt (D) that is a metal salt of the aliphatic carboxylic acid (C). The base resin of the EVOH resin composition of the present disclosure is the EVOH (A), and the content of the EVOH (A) in the EVOH resin composition is typically 60 wt. % or more, preferably 70 wt. % or more, more preferably 80 wt. % or more, particularly preferably 90 wt. % or more. The respective constituent components are described below.

The term "and/or" as used herein means at least one of those described on the left and right sides of the term, and in, for example, the case of the term "X and/or Y", the term has the following three meanings: X alone, Y alone, and X and Y.

<EVOH (A)>

The ethylene-vinyl alcohol copolymer (EVOH) of the present disclosure preferably contains an ethylene structural unit, a vinyl alcohol structural unit (including an unsaponified vinyl ester structural unit), and the structural unit (i) having a primary hydroxy group in a side chain thereof.

As described below, examples of the structural unit (i) having a primary hydroxy group in a side chain thereof include structural units each derived from a monomer having a primary hydroxy group in a side chain thereof.

Examples thereof include: monohydroxyalkyl group-containing monomers, such as allyl alcohol, 3-buten-1-ol, 4-penten-1-ol, 5-hexen-1-ol, and 6-hepten-1-ol; disubstituted diol monomers, such as 2-methylene-1,3-propanediol and 2-methylene-1,3-propanediol; 1,2-diol group-containing monomers, such as 3,4-diol-1-butene, 4,5-diol-1-pentene, 4,5-diol-3-methyl-1-pentene, 4,5-diol-3-methyl-1-pentene, and 5,6-diol-1-hexene; glycerin monoallyl ether; and hydroxymethylvinylidene diacetate, and one kind or two or more kinds thereof may be contained. Of those monomers, a 1,2-diol group-containing monomer that provides a 1,2-diol structure in side chains of the structural unit is particularly preferred.

In addition, the structural unit (i) having a primary hydroxy group in a side chain thereof may contain any one of various bonding chains, such as an ether bond (—O—). Such bonding chain is not particularly limited, and examples thereof include: hydrocarbon chains, such as an alkylene, an alkenylene, an alkynylene, phenylene, and naphthylene (those hydrocarbons may each be substituted with, for example, a halogen, such as fluorine, chlorine, or bromine); structures each containing a heteroatom, for example, a structure containing an ether bond moiety, such as —O—, —(CH$_2$O)$_m$—, —(OCH$_2$)$_m$—, or —(CH$_2$O)$_m$CH$_2$—, a structure containing a carbonyl group, such as —CO—, —COCO—, —CO(CH$_2$)$_m$CO—, or —CO (C$_6$H$_4$) CO—, a structure containing a sulfur atom, such as —S—, —CS—, —SO—, or —SO$_2$—, a structure containing a nitrogen atom, such as —NR—, —CONR—, —NRCO—, —CSNR—, —NRCS—, or —NRNR—, and a structure containing a phosphorus atom, such as —HPO$_4$—; and structures each containing a metal atom, for example, a structure containing a silicon atom, such as —Si(OR)$_2$—, —OSi(OR)$_2$—, or —OSi(OR)$_2$O—, a structure containing a titanium atom, such as —Ti(OR)$_2$—, —OTi(OR)$_2$—, or —OTi(OR)$_2$O—, and a structure containing an aluminum atom, such as —Al(OR)—, —OAl(OR)—, or —OAl(OR)O— (Rs each independently represent any substituent, preferably a hydrogen atom or an alkyl group, and "m" represents a natural number, typically from 1 to 30, preferably from 1 to 15, more preferably from 1 to 10). Of those, an ether bond (—O—) and a hydrocarbon chain having 1 to 10 carbon atoms are preferred in terms of stability of the EVOH at the time of its production or at the time of its use, and an ether bond (—O—) and a hydrocarbon chain having 1 to 6 carbon atoms are more preferred.

The content of the structural unit (i) in the EVOH (A) is typically from 0.1 mol % to 30 mol %, preferably from 0.2 mol % to 10 mol %, particularly preferably from 0.5 mol % to 5 mol %. When such content is excessively small, there is a tendency that a reduction in crystallinity of the EVOH becomes insufficient, and hence the effects of the present disclosure are not sufficiently expressed. When the content is excessively large, the gas barrier performance of the EVOH resin composition under a high-humidity condition tends to reduce.

In addition, to adjust the content of such structural unit (i), the at least two kinds of EVOHs (A) different from each other in content of the structural unit (i) may be blended to adjust the content, and at least one kind thereof may be an EVOH free of the structural unit (i).

With regard to the EVOH (A) in which the bonding amount of the structural unit (i) has been adjusted as described above, the bonding amount of the structural unit (i) may be calculated in terms of weight average, and more accurately, the bonding amount of the structural unit (i) may be calculated by using, for example, nuclear magnetic resonance spectroscopy ($^1$H-NMR or $^{13}$C-NMR).

The ethylene structural unit content of the EVOH (A) is typically from 20 mol % to 60 mol %, preferably from 21 mol % to 55 mol %, more preferably from 22 mol % to 50 mol %, particularly preferably from 23 mol % to 48 mol %. When the ethylene structural unit content is excessively low, the formability of the EVOH resin composition tends to reduce, and when the content is excessively high, the gas barrier property thereof tends to reduce.

Further, the saponification degree of the EVOH (A) is typically from 85 mol % to 100 mol %, preferably from 90 mol % to 100 mol %, particularly preferably from 98 mol % to 100 mol % in terms of value measured by a titration method (JIS K6726). When the saponification degree is excessively low, the gas barrier property of a container formed from the EVOH resin composition tends to reduce.

The melt flow rate of the EVOH (A) is typically from 0.1 g/10 min to 100 g/10 min, preferably from 1 g/10 min to 50 g/10 min, particularly preferably from 2 g/10 min to 40 g/10 min in terms of value measured at 210° C.; and a load of 2,160 g. When such value is excessively low, the melt viscosity of the EVOH is high, and hence the melt forming of the EVOH resin composition becomes difficult. When the value is excessively high, the gas barrier property and mechanical strength of the composition tend to reduce.

The structural unit (i) having a primary hydroxy group in a side chain thereof is preferably, for example, a structural unit represented by the following general formula (i-1), that is, a structural unit having a 1,2-glycol bond in side chains thereof:

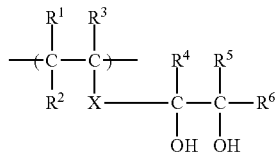

(i-1)

where $R^1$, $R^2$, and $R^3$ each independently represent a hydrogen atom or an organic group, X represents a single bond or a bonding chain, and $R^4$, $R^5$, and $R^6$ each independently represent a hydrogen atom or an organic group.

The organic group in the 1,2-diol structural unit represented by the structural unit (i) is not particularly limited, and examples thereof include: saturated hydrocarbon groups, such as a methyl group, an ethyl group, a n-propyl group, an isopropyl group, a n-butyl group, an isobutyl group, and a tert-butyl group; aromatic hydrocarbon groups, such as a phenyl group and a benzyl group; and a halogen atom, a hydroxy group, an acyloxy group, an alkoxycarbonyl group, a carboxy group, and a sulfonic acid group.

In ordinary cases, $R^1$ to $R^3$ each preferably represent a saturated hydrocarbon group having 1 to 30 carbon atoms (particularly preferably 1 to 15 carbon atoms, more preferably 1 to 4 carbon atoms), or a hydrogen atom. $R^4$ to $R^6$ each represent preferably an aliphatic hydrocarbon group having 1 to 30 carbon atoms (particularly preferably 1 to 15 carbon atoms, more preferably 1 to 4 carbon atoms), or a hydrogen atom, most preferably a hydrogen atom. All of $R^1$ to $R^6$ further particularly preferably represent hydrogen atoms, and X preferably represents a single bond because the gas barrier property of the EVOH resin to be obtained is excellent.

In addition, X in the structural unit represented by the general formula (i-1) preferably represents a single bond as described above, but may represent a bonding chain to the extent that the effects of the present disclosure are not inhibited. Such bonding chain is not particularly limited, and examples thereof include: hydrocarbon chains, such as an alkylene, an alkenylene, an alkynylene, phenylene, and naphthylene (those hydrocarbons may each be substituted with a halogen, such as fluorine, chlorine, or bromine); structures each containing a heteroatom, for example, a structure containing an ether bond moiety, such as —O—, —(CH$_2$O)$_m$—, —(OCH$_2$)$_m$—, or —(CH$_2$O)$_m$CH$_2$—, a structure containing a carbonyl group, such as —CO—, —COCO—, —CO(CH$_2$)$_m$CO—, or —CO(C$_6$H$_4$)CO—, a structure containing a sulfur atom, such as —S—, —CS—, —SO—, or —SO$_2$—, a structure containing a nitrogen atom, such as —NR—, —CONR—, —NRCO—, —CSNR—, —NRCS—, and —NRNR—, and a structure containing a phosphorus atom, such as —HPO$_4$—; and structures each containing a metal atom, for example, a structure containing a silicon atom, such as —Si(OR)$_2$—, —OSi(OR)$_2$—, or —OSi(OR)$_2$O—, a structure containing a titanium atom, such as —Ti(OR)$_2$—, —OTi(OR)$_2$—, or —OTi(OR)$_2$O—, and a structure containing an aluminum atom, such as —Al(OR)—, —OAl(OR)—, or —OAl(OR)O— (Rs each independently represent any substituent, preferably a hydrogen atom or an alkyl group, and "m" represents a natural number, typically from 1 to 30, preferably from 1 to 15, more preferably from 1 to 10). Of those, —CH$_2$OCH$_2$— and a hydrocarbon chain having 1 to 10 carbon atoms are preferred in terms of stability of the EVOH at the time of its production or at the time of its use, and a hydrocarbon chain having 1 to 6 carbon atoms is more preferred, and a hydrocarbon chain having 1 carbon atom is particularly preferred.

The most preferred structure of the EVOH (A) in the present disclosure is as follows: in the structural unit (i), all of $R^1$ and $R^2$ to $R^6$ represent hydrogen atoms, and X represents a single bond. That is, the EVOH preferably contains a structural unit represented by the following structural formula (ia).

(ia)

In addition, the most preferred configuration of the EVOH (A) is as follows: the EVOH contains 0.5 mol % to 5 mol % of the structural unit (ia), 25 mol % to 48 mol % of ethylene, and a structural unit derived from a vinyl alcohol, and the balance thereof is formed of a vinyl acetoxy structural unit derived from vinyl acetate; and the EVOH has a saponification degree of from 98 mol % to 100 mol %, and a MFR of from 2 g/10 min to 40 g/10 min (210° C., 2,160 g).

Although a method of producing the EVOH (A) to be used in the present disclosure is not particularly limited, when the EVOH (A) containing the structural unit (i) having a primary hydroxy group, the EVOH being of the most preferred structure, is taken as an example, the method is, for example, [1] a method in which 3,4-diol-1-butene, a 3,4-diacyloxy-1-butene, a 3-acyloxy-4-ol-1-butene, a 4-acyloxy-3-ol-1-butene, a 3,4-diacyloxy-2-methyl-1-butene, or the like is used as a comonomer, and the comonomer and a vinyl ester monomer are copolymerized to provide a copolymer, followed by the saponification of the copolymer, [2] a method in which vinyl ethylene carbonate or the like is used as a comonomer, and the comonomer and the vinyl ester monomer are copolymerized to provide a copolymer, followed by the saponification and decarboxylation of the copolymer, or [3] a method in which a 2,2-dialkyl-4-vinyl-1,3-dioxolane or the like is used as a comonomer, and the comonomer and the vinyl ester monomer are copolymerized to provide a copolymer, followed by the saponification and deacetalization of the copolymer.

Of those, the production method[1] is preferably adopted because of the following reasons and in terms of properties of the final film: there is an advantage at the time of the production in that the polymerization satisfactorily proceeds, and hence the 1,2-diol structural unit is uniformly introduced into the EVOH with ease; and few problems occur at the time of the melt forming of the resultant EVOH. A method including saponifying a copolymer obtained by copolymerizing the 3,4-diacyloxy-1-butene and the vinyl ester monomer is particularly preferred because of excellent copolymerization reactivity. Further, 3,4-diacetoxy-1-butene is preferably used as the 3,4-diacyloxy-1-butene. In addition, a mixture of those monomers described above may be used.

When vinyl acetate is used as the vinyl ester monomer, and vinyl acetate and 3,4-diacetoxy-1-butene are copolymerized, the reactivity ratios of the respective monomers are as follows: r(vinyl acetate)=0.710 and r(3,4-diacetoxy-1-butene)=0.701. The foregoing means that 3,4-diacetoxy-1-butene is excellent in copolymerization reactivity with vinyl acetate as compared to the case of vinyl ethylene carbonate to be described later in which r(vinyl acetate)=0.85 and r(vinyl ethylene carbonate)=5.4.

In addition, the chain transfer constant Cx(3,4-diacetoxy-1-butene) of 3,4-diacetoxy-1-butene is 0.003 (65° C.). The foregoing means that as compared to the case of vinyl ethylene carbonate having a Cx(vinyl ethylene carbonate) of 0.005 (65° C.) and the case of 2,2-dimethyl-4-vinyl-1,3-dioxolane having a Cx(2,2-dimethyl-4-vinyl-1,3-dioxolane) of 0.023 (65° C.), 3,4-diacetoxy-1-butene is suppressed from serving as an inhibiting factor on the polymerization of the materials for the EVOH to make it difficult to increase the polymerization degree of the EVOH or from being responsible for a reduction in rate of the polymerization.

In addition, such 3,4-diacetoxy-1-butene has the following industrially large advantage: a by-product to be produced at the time of the saponification of a copolymer thereof is identical to that derived from a vinyl acetate structural unit that is a main structural unit, and hence there is no need to arrange a special apparatus or step for its post-treatment. In addition, 3,4-diacetoxy-1-butene may contain 3,4-diacetoxy-1-butane, 1,4-diacetoxy-1-butene, 1,4-diacetoxy-1-butane, or the like as a small amount of an impurity.

3,4-Diol-1-butene is available from Eastman Chemical Company. A product manufactured by Eastman Chemical Company is available from the market as 3,4-diacetoxy-1-butene for industrial production, and a product manufactured by Acros Organics is available therefrom as 3,4-diacetoxy-1-butene at a reagent level. In addition, 3,4-diacetoxy-1-butene obtained as a by-product in a production process for 1,4-butanediol may be utilized.

The EVOH (A) having the 1,2-diol structural unit, which is produced by any one of the production methods [2] and [3], needs to be used while attention is paid to the fact that its saponification degree may be low, or when the decarboxylation is insufficient, a carbonate ring and a dioxolane ring may remain in side chains thereof to cause the structure of the EVOH to be obtained to lack in denseness, thereby leading to a poor gas barrier property.

Examples of the vinyl ester monomer include: aliphatic vinyl esters, such as vinyl formate, vinyl acetate, vinyl propionate, vinyl valerate, vinyl butyrate, vinyl isobutyrate, vinyl pivalate, vinyl caprate, vinyl laurate, vinyl stearate, and vinyl versatate; and aromatic vinyl esters, such as vinyl benzoate, and the vinyl ester monomer is an aliphatic vinyl ester having typically 3 to 20 carbon atoms, preferably 4 to 10 carbon atoms, particularly preferably 4 to 7 carbon atoms. Vinyl acetate is particularly preferably used from an economic viewpoint. Although those monomers are typically used alone, two or more kinds thereof may be simultaneously used as required.

The weight ratio of the 1,2-diol structural unit monomer represented by the general formula (i-1) at the time of its copolymerization with the other structural units only needs to be determined in accordance with the desired introduction amount described above. In addition, in some cases, an ethylenically unsaturated monomer copolymerizable with the monomer may be copolymerized therewith to the extent that the effects of the present disclosure are not inhibited at the time of the copolymerization (e.g., at a ratio of 50 mol % or less).

In addition, a known polymerization inhibitor to be used in radical polymerization is preferably added to a reaction system at the time of the completion of the polymerization, and examples of such polymerization inhibitor include m-dinitrobenzene, ascorbic acid, sorbic acid, cinnamic acid, benzoquinone, a dimer of α-methylstyrene, and p-methoxyphenol.

The copolymer thus obtained is then saponified, and a resin obtained by subjecting the saponified product to solid-liquid separation is dried. Thus, the EVOH resin containing the structural unit (i) having a primary hydroxy group in a side chain thereof is obtained.

Accordingly, the EVOH resin in the present disclosure may have a structure derived from a partially unsaponified comonomer.

The other moieties are the vinyl alcohol structural unit and an acyloxy group-containing structural unit derived from the remaining vinyl ester (and a small amount of the copolymerizable ethylenically unsaturated monomer structural unit).

Examples of such ethylenically unsaturated monomer include: olefins, such as propylene, 1-butene, and isobutene; unsaturated acids, such as acrylic acid, methacrylic acid, crotonic acid, phthalic acid (anhydride), maleic acid (anhydride), and itaconic acid (anhydride), or salts or C1-C18 monoalkyl or dialkyl esters thereof; acrylamides, such as acrylamide, a C1-C18 N-alkylacrylamide, N,N-dimethylacrylamide, 2-acrylamidopropanesulfonic acid or a salt thereof, and acrylamidopropyldimethylamine or an acid salt thereof or a quaternary salt thereof; methacrylamides, such as methacrylamide, a C1-C18 N-alkylmethacrylamide, N,N-dimethylmethacrylamide, 2-methacrylamidopropanesulfonic acid or a salt thereof, and methacrylamidopropyldimethylamine or an acid salt thereof or a quaternary salt thereof; N-vinylamides, such as N-vinylpyrrolidone, N-vinylformamide, and N-vinylacetamide; vinyl cyanides, such as acrylonitrile and methacrylonitrile; vinyl ethers, such as a C1-C18 alkyl vinyl ether, a hydroxyalkyl vinyl ether, and an alkoxyalkyl vinyl ether; vinyl halides, such as vinyl chloride, vinylidene chloride, vinyl fluoride, vinylidene fluoride, and vinyl bromide; vinylsilanes; and allyl acetate, allyl chloride, allyl alcohol, dimethylallyl alcohol, trimethyl-(3-acrylamido-3-dimethylpropyl)-ammonium chloride, acrylamido-2-methylpropanesulfonic acid, and vinylethylene carbonate.

In addition, another example of the ethylenically unsaturated monomer is hydroxymethylvinylidene diacetate.

Specific examples thereof include 1,3-diacetoxy-2-methylenepropane, 1,3-dipropionyloxy-2-methylenepropane, and 1,3-dibutyronyloxy-2-methylenepropane. Of those, 1,3-diacetoxy-2-methylenepropane is preferably used from the viewpoint of ease of production.

The saponification degree in the present disclosure is a value measured by a titration method (JIS K6726), and means the ratio (mol %) at which the total amount of the ester moiety of the vinyl ester monomer and the acyloxy moiety, carbonate moiety, or acetal moiety of the comonomer corresponding to the 1,2-diol structural unit is changed into hydroxy groups.

In addition, the EVOH (A) to be used in the present disclosure may be a blend of an EVOH containing the structural unit (i) having a primary hydroxy group in a side chain thereof and any other EVOH different therefrom, and examples of the other EVOH may include: an EVOH different therefrom in structural unit; an EVOH different therefrom in ethylene content; an EVOH different therefrom in saponification degree; and an EVOH different therefrom in melt flow rate.

Although the reason why the incorporation of the structural unit (i) having a primary hydroxy group in a side chain thereof into the EVOH (A) provides an excellent effect is unclear, it is assumed that the incorporation of the structural unit (i) having a primary hydroxy group in a side chain thereof into the EVOH (A) moderately suppresses the crystallization of the EVOH to reduce the melting point thereof, and hence the stretchability thereof is improved in a (heat) stretching treatment step (e.g., a roll stretching method, a tenter stretching method, a tubular stretching method, a stretching blow method, or vacuum-pressure forming).

<Acetic Acid and/or Salt Thereof (B)>

The EVOH resin composition of the present disclosure includes the acetic acid and/or the salt thereof (B). That is, the EVOH resin composition of the present disclosure includes at least one kind selected from the group consisting of acetic acid and acetic acid salts.

The same component as the component (B) described in the first mode may be used as the acetic acid and/or the salt thereof (B).

The content of the acetic acid and/or the salt thereof (B) in terms of acetic acid ion is typically from 10 ppm to 2,000 ppm, preferably from 15 ppm to 1,500 ppm, particularly preferably from 20 ppm to 1,000 ppm, further particularly preferably from 25 ppm to 650 ppm with respect to the total sum of the contents of the EVOH (A), the acetic acid and/or the salt thereof (B), the aliphatic carboxylic acid (C), and the aliphatic carboxylic acid metal salt (D).

When such content is excessively small, there is a tendency that the adhesive strength of the EVOH resin composition is reduced by the thermally decomposed product of the aliphatic carboxylic acid metal salt (D), or the effects of the present disclosure are not sufficiently obtained. When the content is excessively large, there is a tendency that the color tone stability thereof at the time of its melt forming is liable to reduce, or the effects of the present disclosure are not sufficiently obtained.

The content of the acetic acid and/or the salt thereof (B) in terms of acetic acid ion may be measured by a known analysis method. For example, the content may be measured by using liquid chromatography-mass spectrometry (LC/MS) or gas chromatography-mass spectrometry (GC/MS).

<Aliphatic Carboxylic Acid (C) other than Acetic Acid>

The EVOH resin composition of the present disclosure includes the aliphatic carboxylic acid (C) other than acetic acid and the same component as the component (C) described in the first mode may be used as the aliphatic carboxylic acid (C).

The content of the aliphatic carboxylic acid (C) in terms of carboxylic acid ion is typically from 0.001 ppm to 950 ppm, preferably from 0.01 ppm to 450 ppm, more preferably from 0.01 ppm to 350 ppm, particularly preferably from 0.1 ppm to 250 ppm, further particularly preferably from 0.5 ppm to 200 ppm with respect to the total sum of the contents of the EVOH (A), the acetic acid and/or the salt thereof (B), the aliphatic carboxylic acid (C), and the aliphatic carboxylic acid metal salt (D).

When such content is excessively small, there is a tendency that the thermal stability of the aliphatic carboxylic acid metal salt (D) becomes insufficient, and as a result, the effects of the present disclosure are not sufficiently obtained. When the content is excessively large, there is a tendency that the color tone stability of the EVOH resin composition at the time of its melt forming is liable to reduce, or the aliphatic carboxylic acid (C) itself acts as a plasticizer to make it impossible to sufficiently obtain the effects of the present disclosure.

The ratio (content of acetic acid and/or salt thereof (B) in terms of acetic acid ion/content of aliphatic carboxylic acid (C) in terms of carboxylic acid ion) of the content of the acetic acid and/or the salt thereof (B) in terms of acetic acid ion to the content of the aliphatic carboxylic acid (C) in terms of carboxylic acid ion is typically from 0.0001 to 10,000, preferably from 0.001 to 5,000, particularly preferably from 0.1 to 1,000, further particularly preferably from 1 to 600 on a weight basis.

When such content ratio falls within the above-mentioned ranges, the effects of the present disclosure tend to be more significantly obtained. When the ratio falls short of the ranges, there is a tendency that the color tone stability of the EVOH resin composition at the time of its melt forming is insufficient, or the adhesive strength thereof becomes insufficient. When the ratio exceeds the ranges, there is a tendency that the effects of the present disclosure are not sufficiently obtained.

<Aliphatic Carboxylic Acid Metal Salt (D)>

The EVOH resin composition of the present disclosure includes the aliphatic carboxylic acid metal salt (D) that is the metal salt of the aliphatic carboxylic acid (C) other than acetic acid. The same component as the component (D) described in the first mode may be used as the aliphatic carboxylic acid metal salt (D).

Although the reason why an excellent effect is obtained when the aliphatic carboxylic acid (C) and the anion species of the aliphatic carboxylic acid metal salt (D) are of the same species is unclear, it is assumed that when specific amounts of the aliphatic carboxylic acid (C) and the aliphatic carboxylic acid metal salt (D) are used in combination, the dispersibility of the aliphatic carboxylic acid metal salt (D) is significantly improved, and hence more excellent effects of the present disclosure are obtained. In addition, the following assumption is made. The aliphatic carboxylic acid (C) may interact with the metal species of the aliphatic carboxylic acid metal salt (D) to exist under a state like a metal complex. When the anion species of such aliphatic carboxylic acid metal salt (D) is of the same species as the aliphatic carboxylic acid (C), the metal complex can exist under a state that is more stable in terms of energy, and hence the metal complex is excellent in thermal stability even at the time of its melt forming. As a result, the mechanical property (impact resistance) of the EVOH resin composition is improved, and excellent stretchability is expressed even in a (heat) stretching treatment step (e.g., a roll stretching method, a tenter stretching method, a tubular stretching method, a stretching blow method, or vacuum-pressure forming).

In addition, when the number of carbon atoms of each of the aliphatic carboxylic acid (C) and the aliphatic carboxylic acid metal salt (D) is typically from 3 to 30, preferably from 4 to 22, more preferably from 4 to 20, particularly preferably from 5 to 14, the mechanical property (impact resistance) tends to be more significantly improved. Although the reason for the foregoing is unclear, the following assumption is made. When the number of carbon atoms of each of the aliphatic carboxylic acid (C) and the aliphatic carboxylic acid metal salt (D) falls within the ranges, the aliphatic carboxylic acid (C) and the aliphatic carboxylic acid metal salt (D) are easily dispersed in the EVOH resin composition in a more uniform manner. Accordingly, as a result, the mechanical property (impact resistance) of the EVOH resin composition is more significantly improved.

In addition, when the aliphatic carboxylic acid metal salt (D) is used alone, the adhesive strength of the EVOH resin composition tends to reduce, though the impact resistance thereof is improved. Although the reason for the foregoing is unclear, it is assumed that when the aliphatic carboxylic acid metal salt (D) is used alone, the thermal stability of the salt itself is insufficient, and hence the adhesive strength is reduced by the thermally decomposed product of the aliphatic carboxylic acid metal salt (D) produced at the time of its melt forming. In contrast, in the present disclosure, the aliphatic carboxylic acid metal salt (D) and the acetic acid and/or the salt thereof (B) are used in combination. Accordingly, it is assumed that the thermally decomposed product of the aliphatic carboxylic acid metal salt (D) is dispersed in the composition while being captured by the acetic acid and/or the salt thereof (B), and hence a reduction in adhesive strength is suppressed.

The content of the aliphatic carboxylic acid metal salt (D) in terms of metal ion is typically from 1 ppm to 500 ppm, preferably from 5 ppm to 300 ppm, more preferably from 10 ppm to 250 ppm, particularly preferably from 10 ppm to 200 ppm, further particularly preferably from 30 ppm to 150 ppm with respect to the total sum of the contents of the EVOH (A), the acetic acid and/or the salt thereof (B), the aliphatic carboxylic acid (C), and the aliphatic carboxylic acid metal salt (D). When the content of the aliphatic carboxylic acid metal salt (D) is excessively small, there is a tendency that the effects of the present disclosure are not sufficiently obtained. When the content is excessively large, there is a tendency that the adhesive strength of the EVOH resin composition reduces, or the color tone stability thereof at the time of its melt forming is liable to reduce.

The content of the aliphatic carboxylic acid (C) in terms of carboxylic acid ion and the content of the aliphatic carboxylic acid metal salt (D) in terms of metal ion may each be measured by a known analysis method. For example, the contents may be determined by using such methods as described below alone or in combination thereof.

(i) Content of aliphatic carboxylic acid metal salt (D) in terms of metal ion: A dry sample is precisely weighed, and is loaded into a platinum evaporating dish whose weight has been made constant, followed by carbonization with an electric heater. Next, the carbonized product is heated with a gas burner, and is baked until no smoke occurs. Further, the platinum evaporating dish is loaded into an electric furnace, and a temperature in the furnace is increased to completely ash the baked product. The ashed product is cooled, and then hydrochloric acid and pure water are added thereto, followed by heating with an electric heater to dissolve the ashed product in the mixture. The solution is poured into a measuring flask, and its volume is made constant with pure water. Thus, a sample for atomic absorption analysis is obtained. The amount of a metal in the sample for atomic absorption analysis is subjected to quantitative analysis by atomic absorption spectrophotometry. Thus, the content of the aliphatic carboxylic acid metal salt (D) in terms of metal ion can be determined.

(ii) Content of aliphatic carboxylic acid (C) in terms of carboxylic acid ion: First, the total sum (Cx) of the contents of the aliphatic carboxylic acid (C) and the metal salt (D) thereof in the EVOH resin composition in terms of carboxylic acid ion is determined by using, for example, liquid chromatography-mass spectrometry (LC/MS) or gas chromatography-mass spectrometry (GC/MS). After that, the content (Cy) of the aliphatic carboxylic acid metal salt (D) in terms of carboxylic acid ion is calculated from the content of the aliphatic carboxylic acid metal salt (D) in terms of metal ion described above. Then, the content of the aliphatic carboxylic acid (C) in terms of carboxylic acid ion can be determined from a difference ((Cx)−(Cy)) between the total sum (Cx) of the contents of the aliphatic carboxylic acid (C) and the metal salt (D) thereof in terms of carboxylic acid ion, and the content (Cy) of the aliphatic carboxylic acid metal salt (D) in terms of carboxylic acid ion.

In the EVOH resin composition of the present disclosure, the ratio ((D)/(B)) of the content of the aliphatic carboxylic acid metal salt (D) in terms of metal ion to the content of the acetic acid and/or the salt thereof (B) in terms of acetic acid ion satisfies the following formula (1) on a weight basis.

$$0.001 \leq (\text{content of }(D)\text{ in terms of metal ion/content of }(B)\text{ in terms of acetic acid ion}) \leq 1.30 \quad (1)$$

The ratio satisfies a relationship of preferably $0.005 \leq ((D)/(B)) \leq 1.1$, more preferably $0.005 \leq ((D)/(B)) \leq 1.0$, particularly preferably $0.01 \leq ((D)/(B)) \leq 0.8$, particularly preferably $0.04 \leq ((D)/(B)) \leq 0.48$, further particularly preferably $0.05 \leq ((D)/(B)) \leq 0.45$. When such value falls within the ranges, the effects of the present disclosure tend to be more significantly obtained. When the value falls short of the ranges, there is a tendency that the effects of the present disclosure are not sufficiently obtained. When the value exceeds the ranges, there is a tendency that the color tone stability of the composition at the time of its melt forming is insufficient, or the adhesive strength thereof becomes insufficient.

In the EVOH resin composition of the present disclosure, the ratio ((D)/(C)) of the content of the aliphatic carboxylic acid metal salt (D) in terms of metal ion to the content of the aliphatic carboxylic acid (C) in terms of carboxylic acid ion satisfies the following formula (2) on a weight basis.

$$0.11 \leq (\text{content of }(D)\text{ in terms of metal ion/content of }(C)\text{ in terms of carboxylic acid ion}) \leq 100 \quad (2)$$

The ratio satisfies a relationship of preferably $0.13 \leq ((D)/(C)) \leq 90$, particularly preferably $0.15 \leq ((D)/(C)) \leq 80$, further particularly preferably $0.2 \leq ((D)/(C)) \leq 70$. When such value falls within the ranges, the effects of the present disclosure tend to be more significantly obtained. When the value falls short of the ranges, there is a tendency that the color tone stability of the composition at the time of its melt forming is insufficient, or the effects of the present disclosure are not sufficiently obtained. When the value exceeds the ranges, there is a tendency that the color tone stability of the composition at the time of its melt forming is insufficient, or the formability thereof becomes insufficient.

Although the reason why an excellent effect is obtained when the contents of the acetic acid and/or the salt thereof (B), the aliphatic carboxylic acid (C), and the aliphatic carboxylic acid metal salt (D) satisfy the formulae (1) and (2) on a weight basis is unclear, the following assumption is made While a specific amount of the aliphatic carboxylic acid (C) whose anion species is of the same species as the aliphatic carboxylic acid metal salt (D) has improving effects on the dispersibility and thermal stability of the aliphatic carboxylic acid metal salt (D), when the content of the aliphatic carboxylic acid (C) is excessively large, the aliphatic carboxylic acid (C) itself acts as a plasticizer, and hence the effect (impact resistance-improving effect) of the present disclosure is not sufficiently obtained. In addition, the following assumption is made. While a specific amount of the acetic acid and/or the salt thereof (B) captures the thermally decomposed product of the aliphatic carboxylic acid metal salt (D) to exhibit a suppressing effect on a reduction in adhesive strength of the EVOH resin composition, when the content of the acetic acid and/or the salt thereof (B) is excessively large, the thermal stability of the EVOH (A) is significantly reduced, and hence the color tone stability of the composition is liable to reduce, or the effect (impact resistance-improving effect) of the present disclosure is not sufficiently obtained.

In addition, the elongation viscosity of the EVOH resin composition of the present disclosure at 210° C.; and 100 s$^{-1}$ preferably satisfies the formula (VI3).

$$500 \leq \text{elongation viscosity [Pa·s]} \leq 47{,}000 \quad (VI3)$$

The elongation viscosity satisfies a relationship of preferably $700 \leq \text{elongation viscosity [Pa·s]} \leq 30{,}000$, particularly preferably $800 \leq \text{elongation viscosity [Pa·s]} \leq 20{,}000$. When such value falls within the ranges, the effects of the present disclosure tend to be more significantly obtained. When the value falls short of the ranges, there is a tendency that the effects of the present disclosure are not sufficiently obtained. When the value exceeds the ranges, the formability of the composition at the time of its melt forming tends to be insufficient.

Although the reason why an excellent effect is obtained when the elongation viscosity of the EVOH resin composition of the present disclosure at 210° C.; and 100 s$^{-1}$ satisfies the formula (VI3) is unclear, it is assumed that when the elongation viscosity of the EVOH resin composition of the present disclosure at 210° C.; and 100 s$^{-1}$ satisfies the formula (VI3), the entangled structure of EVOH molecular chains moderately formed in the EVOH resin composition more significantly accelerates the formation of the higher-order structure of the EVOH resin composition, such as molecular orientation or a crystal structure, at the time of the multilayer coextrusion of the EVOH resin composition, and hence, as a result, the mechanical property (impact resistance) of the composition is significantly improved.

<Method of Evaluating Elongation Viscosity (Pa·s) of EVOH Resin Composition>

The same method as the elongation viscosity evaluation method described in the first mode may be used as a method of evaluating the elongation viscosity (Pa·s) of the EVOH resin composition of the present disclosure at 210° C.; and 100 s$^{-1}$.

<Boric Acid and/or Salt Thereof (F)>

The EVOH resin composition of the present disclosure preferably includes the boric acid and/or the salt thereof (F). That is, the EVOH resin composition of the present disclosure preferably includes at least one kind selected from the group consisting of boric acid and boric acid salts.

Typical examples of the boric acid and/or the salt thereof (F) include boric acid, metal salts of boric acid, such as calcium borate, cobalt borate, zinc borate (e.g., zinc tetraborate or zinc metaborate), aluminum potassium borate, ammonium borate (e.g., ammonium metaborate, ammonium tetraborate, ammonium pentaborate, or ammonium octaborate), cadmium borate (e.g., cadmium orthoborate or cadmium tetraborate), potassium borate (e.g., potassium metaborate, potassium tetraborate, potassium pentaborate, potassium hexaborate, or potassium octaborate), silver borate (e.g., silver metaborate or silver tetraborate), copper borate (e.g., cupric borate, copper metaborate, or copper tetraborate), sodium borate (e.g., sodium metaborate, sodium diborate, sodium tetraborate, sodium pentaborate, sodium hexaborate, or sodium octaborate), lead borate (e.g., lead metaborate or lead hexaborate), nickel borate (e.g., nickel orthoborate, nickel diborate, nickel tetraborate, or nickel octaborate), barium borate (e.g., barium orthoborate, barium metaborate, barium diborate, or barium tetraborate), bismuth borate, magnesium borate (e.g., magnesium orthoborate, magnesium diborate, magnesium metaborate, trimagnesium tetraborate, or pentamagnesium tetraborate), manganese borate (e.g., manganous borate, manganese metaborate, or manganese tetraborate), lithium borate (e.g., lithium metaborate, lithium tetraborate, or lithium pentaborate), and borate minerals, such as borax, kernite, inyoite, ketoite, suanite, and szaibelyite. Of those, borax, boric acid, sodium borate, potassium borate, zinc borate, calcium borate, and magnesium borate are preferred, boric acid, sodium borate, and zinc borate are particularly preferred, and boric acid is further particularly preferred.

The content of the boric acid and/or the salt thereof (F) in terms of boron is typically from 0.001 ppm to 1,000 ppm, preferably from 0.001 ppm to 800 ppm, more preferably from 0.01 ppm to 700 ppm, still more preferably from 0.05 ppm to 600 ppm, particularly preferably from 0.1 ppm to 500 ppm, further particularly preferably from 1 ppm to 400 ppm with respect to the total sum of the contents of the EVOH (A), the acetic acid and/or the salt thereof (B), the aliphatic carboxylic acid (C), the aliphatic carboxylic acid metal salt (D), and the boric acid and/or the salt thereof (F).

When such content is excessively small, there is a tendency that the effect (impact resistance-improving effect) of the present disclosure is not sufficiently obtained. When the content is excessively large, there is a tendency that the color tone of the EVOH resin composition reduces, or a fish eye frequently occurs in the composition at the time of its multilayer film formation.

In the EVOH resin composition of the present disclosure, the ratio ((D)/(F)) of the content of the aliphatic carboxylic acid metal salt (D) in terms of metal ion to the content of the boric acid and/or the salt thereof (F) in terms of boron preferably satisfies the following formula (7) on a weight basis.

$$0.11 \leq (\text{content of } (D) \text{ in terms of metal ion/content of } (F) \text{ in terms of boron}) \leq 100 \quad (7)$$

The ratio satisfies a relationship of preferably $0.13 \leq ((D)/(F)) \leq 90$, particularly preferably $0.15 \leq ((D)/(F)) \leq 80$, further particularly preferably $0.2 \leq ((D)/(F)) \leq 70$. When such value falls within the ranges, the effects of the present disclosure tend to be more significantly obtained. When the value falls short of the ranges, there is a tendency that the color tone of the composition reduces, or a fish eye frequently occurs in the composition at the time of its multilayer film formation to make it impossible to sufficiently obtain the effect (impact resistance-improving effect) of the present disclosure. When the value exceeds the ranges, there is a tendency that the effect (impact resistance-improving effect) of the present disclosure is not sufficiently obtained.

In addition, although the reason why the use of a specific amount of the boric acid and/or the salt thereof (F) and a specific content ratio (D/F) provides an excellent effect is unclear, the following assumption is made. The boric acid and/or the salt thereof (F) dispersed in the EVOH resin composition interacts with EVOH molecular chains to form a crosslinked structure between the EVOH molecular chains. Accordingly, at the time of the multilayer coextrusion of the EVOH resin composition, the formation of the higher-order structure of the EVOH resin composition, such as molecular orientation or a crystal structure, is more significantly accelerated, and hence, as result, the mechanical property (impact resistance) of the structure is significantly improved.

In addition, it is assumed that the boric acid and/or the salt thereof (F) captures the thermally decomposed product of the aliphatic carboxylic acid metal salt (D) and the thermally decomposed product of the EVOH (A), which have not been completely captured by the acetic acid and/or the salt thereof (B), to suppress a reduction in color tone of the EVOH resin composition.

The content of the boric acid and/or the salt thereof (F) in terms of boron may be measured by a known analysis method. For example, the following may be performed: after the EVOH resin composition has been subjected to wet decomposition, the volume of the decomposed product is made constant, and the boron amount of a test liquid thus obtained is determined by inductively coupled plasma-atomic emission spectroscopy (ICP-AES).

<Phosphoric Acid and/or Salt Thereof (E)>

The EVOH resin composition of the present disclosure preferably further includes phosphoric acid and/or a salt thereof (E) from the viewpoints of its impact resistance and color tone stability. That is, the EVOH resin composition of the present disclosure includes at least one kind selected from the group consisting of phosphoric acid and phosphoric acid salts.

Specific examples of the phosphoric acid and/or the salt thereof (E) may include phosphoric acid, sodium dihydrogen phosphate, disodium hydrogen phosphate, potassium dihydrogen phosphate, dipotassium hydrogen phosphate, tripotassium phosphate, calcium monohydrogen phosphate, calcium dihydrogen phosphate, tricalcium phosphate, magnesium phosphate, magnesium hydrogen phosphate, magnesium dihydrogen phosphate, zinc hydrogen phosphate, barium hydrogen phosphate, and manganese hydrogen phosphate. Those compounds may be used alone or in combination thereof. Of those, phosphoric acid, sodium dihydrogen phosphate, potassium dihydrogen phosphate, calcium dihydrogen phosphate, magnesium dihydrogen phosphate, and zinc hydrogen phosphate are preferred, phosphoric acid, sodium dihydrogen phosphate, calcium dihydrogen phosphate, and magnesium dihydrogen phosphate are particularly preferred, and phosphoric acid is further particularly preferred.

The content of the phosphoric acid and/or the salt thereof (E) in terms of phosphorus is preferably 900 ppm or less, more preferably from 0.01 ppm to 700 ppm, particularly preferably from 0.1 ppm to 500 ppm, further particularly preferably from 1 ppm to 300 ppm with respect to the total sum of the contents of the EVOH (A), the acetic acid and/or the salt thereof (B), the aliphatic carboxylic acid (C), the aliphatic carboxylic acid metal salt (D), and the phosphoric acid and/or the salt thereof (E). When such content is excessively large, there is a tendency that a fish eye frequently occurs in the EVOH resin composition at the time of its multilayer film formation to make it impossible to sufficiently obtain the effect (impact resistance-improving effect) of the present disclosure.

In addition, although the reason why the use of a specific amount of the phosphoric acid and/or the salt thereof (E) provides an excellent effect is unclear, it is assumed that the phosphoric acid and/or the salt thereof (E) captures the thermally decomposed product of the aliphatic carboxylic acid metal salt (D) and the thermally decomposed product of the EVOH (A), which have not been completely captured by the acetic acid and/or the salt thereof (B), to significantly suppress reductions in impact resistance, adhesive strength, and color tone of the EVOH resin composition.

The content of the phosphoric acid and/or the salt thereof (E) is not particularly limited, and may be measured by a known analysis method. For example, the content may be determined by using such methods as described below alone or in combination thereof.

(i) Phosphoric acid; The EVOH resin composition is extracted with hot dilute sulfuric acid, and then the amount of its phosphoric acid radical is determined by absorption spectrophotometry (molybdenum blue).

(ii) Phosphoric acid salt; A dry sample is precisely weighed, and is loaded into a platinum evaporating dish whose weight has been made constant, followed by carbonization with an electric heater. Next, the carbonized product is heated with a gas burner, and is baked until no smoke occurs. Further, the platinum evaporating dish is loaded into an electric furnace, and a temperature in the furnace is increased to completely ash the baked product. The ashed product is cooled, and then hydrochloric acid and pure water are added thereto, followed by heating with an electric heater to dissolve the ashed product in the mixture. The solution is poured into a measuring flask, and its volume is made constant with pure water. Thus, a sample for atomic absorption analysis is obtained. The amount of a metal in the sample for atomic absorption analysis is subjected to quantitative analysis by atomic absorption spectrophotometry. Thus, the amount of a phosphoric acid salt is determined.

<Other Thermoplastic Resin>

The EVOH resin composition of the present disclosure may contain any other thermoplastic resin as a resin component in addition to the EVOH (A) at a content typically in the range of 30 wt. % or less with respect to the EVOH (A).

The same resin as that described in the section <Other Thermoplastic Resin> described in the first mode may be used as the other thermoplastic resin.

<Other Additive>

The EVOH resin composition of the present disclosure may include an additive to be generally blended into an EVOH resin composition, for example, a known additive, such as heat stabilizer, an antioxidant, an antistatic agent, a colorant, a UV absorber, a lubricant (e.g., a saturated aliphatic amide (e.g., stearamide), an unsaturated fatty acid amide (e.g., oleamide), a bisfatty acid amide (e.g., ethylenebisstearamide), or a low-molecular weight polyolefin (e.g., a low-molecular weight polyethylene or low-molecular weight polypropylene having a molecular weight of from about 500 to about 10,000)), a plasticizer (e.g., an aliphatic polyhydric alcohol, such as ethylene glycol, glycerin, or hexanediol), a light stabilizer, a surfactant, an antimicrobial, a desiccant, an insoluble inorganic salt (e.g., hydrotalcite), a filler (e.g., an inorganic filler), an antiblocking agent, a flame retardant, a crosslinking agent, a foaming agent, a crystal nucleating agent, an antifogging agent, an additive for biodegradation, a silane coupling agent, an oxygen absorber, cinnamic acid and/or a salt thereof, a conjugated polyene compound, an enediol group-containing substance (e.g., a phenol, such as propyl gallate), or an aldehyde compound (e.g., an unsaturated aldehyde, such as crotonaldehyde) to the extent that the effects of the present disclosure are not inhibited (e.g., at a content of typically 10 wt. % or less, preferably 5 wt. % or less of the EVOH resin composition). Those additives may be used alone or in combination thereof.

Specific examples of the cinnamic acid and/or the salt thereof may include cis-cinnamic acid and trans-cinnamic acid, and trans-cinnamic acid is suitably used from the viewpoints of its stability and price. In addition, examples of the cinnamic acid salt include: cinnamic acid alkali metal salts, such as lithium cinnamate, sodium cinnamate, and potassium cinnamate; and cinnamic acid alkaline earth metal salts, such as magnesium cinnamate, calcium cinnamate, and barium cinnamate. Those cinnamic acids and/or salts thereof may be used alone or in combination thereof. Of those, trans-cinnamic acid is preferably used alone.

The content of the cinnamic acid and/or the salt thereof in terms of cinnamic acid ion is typically from 1 ppm to 1,200 ppm, preferably from 1 ppm to 1,000 ppm, more preferably from 10 ppm to 800 ppm, still more preferably from 15 ppm to 500 ppm with respect to the total sum of the contents of the EVOH (A), the acetic acid and/or the salt thereof (B), the aliphatic carboxylic acid (C), the aliphatic carboxylic acid metal salt (D), and the cinnamic acid and/or the salt thereof.

The conjugated polyene compound is a compound having a so-called conjugated double bond, which is of a structure obtained by alternately connecting a carbon-carbon double bond and a carbon-carbon single bond, and has two or more carbon-carbon double bonds. The conjugated polyene compound may be a conjugated diene, which is of a structure obtained by alternately connecting two carbon-carbon double bonds and one carbon-carbon single bond, may be a conjugated triene, which is of a structure obtained by alternately connecting three carbon-carbon double bonds and two carbon-carbon single bonds, or may be a conjugated polyene compound, which is of a structure obtained by alternately connecting four or more carbon-carbon double bonds and three or more carbon-carbon single bonds. However, when the number of carbon-carbon double bonds to be conjugated is eight or more, concern is raised about the coloring of a formed product of the EVOH resin composition by the color of the conjugated polyene compound itself. Accordingly, a polyene having seven or less carbon-carbon double bonds to be conjugated is preferred. In addition, the plurality of conjugated double bonds each formed of two or more carbon-carbon double bonds may be present in a molecule of the compound without being conjugated with each other. For example, a compound having three conjugated trienes in one and the same molecule thereof, such as tung oil, is also included in the category of the conjugated polyene compound.

Specific examples of the conjugated polyene compound include: conjugated diene compounds each having two carbon-carbon double bonds, such as isoprene, myrcene, farnesene, cembrene, sorbic acid, a sorbic acid ester, a sorbic acid salt, and abietic acid; conjugated triene compounds each having three carbon-carbon double bonds, such as 1,3,5-hexatriene, 2,4,6-octatriene-1-carboxylic acid, eleostearic acid, tung oil, and cholecalciferol; and conjugated polyene compounds each having four or more carbon-carbon double bonds, such as cyclooctatetraene, 2,4,6,8-decatetraene-1-carboxylic acid, retinol, and retinoic acid. Those conjugated polyene compounds may be used alone or in combination thereof.

The content of the conjugated polyene compound is typically from 0.01 ppm to 10,000 ppm, preferably from 0.1 ppm to 1,000 ppm, particularly preferably from 0.5 ppm to 500 ppm with respect to the total sum of the contents of the EVOH (A), the acetic acid and/or the salt thereof (B), the aliphatic carboxylic acid (C), the aliphatic carboxylic acid metal salt (D), and the conjugated polyene compound.

The heat stabilizer is, for example, an organic acid, such as propionic acid, butyric acid, lauric acid, stearic acid, oleic acid, or behenic acid (provided that when the organic acid is used as the aliphatic carboxylic acid (C), the acid is not included in the category of the heat stabilizer), or an alkali metal salt (e.g., sodium salt or potassium salt) or an alkaline earth metal salt (e.g., calcium salt or magnesium salt) of the organic acid for the purpose of improving various physical properties of the EVOH resin composition at the time of its melt forming, such as thermal stability. Those stabilizers may be used alone or in combination thereof.

<Method of Producing EVOH Resin Composition>

Although a method of producing the EVOH resin composition of the present disclosure is not particularly limited, examples thereof include the following methods (I) to (IV):

(I) a method including blending a pellet of the EVOH (A) with at least one kind selected from the group consisting of the acetic acid and/or the salt thereof (B), the aliphatic carboxylic acid (C), and the aliphatic carboxylic acid metal salt (D) at a predetermined ratio, and dry-blending the materials (dry blending method);

(II) a method including immersing the pellet of the EVOH (A) in a solution containing at least one kind selected from the group consisting of the acetic acid and/or the salt thereof (B), the aliphatic carboxylic acid (C), and the aliphatic carboxylic acid metal salt (D), and then drying the pellet (immersion method);

(III) a method including blending the EVOH (A) with at least one kind selected from the group consisting of the acetic acid and/or the salt thereof (B), the aliphatic carboxylic acid (C), and the aliphatic carboxylic acid metal salt (D) at the time of the melt kneading of the EVOH, and then producing a pellet (melt kneading method); and (IV) a method including adding, to a solution containing the EVOH (A), at least one kind selected from the group consisting of the acetic acid and/or the salt thereof (B), the aliphatic carboxylic acid (C), and the aliphatic carboxylic acid metal salt (D), mixing the materials, and then removing a solvent in the solution (solution mixing method).

Of those, (I) the method including blending the pellet of the EVOH (A) with at least one kind selected from the group consisting of the acetic acid and/or the salt thereof (B), the aliphatic carboxylic acid (C), and the aliphatic carboxylic acid metal salt (D) at a predetermined ratio, and dry-blending the materials (dry blending method) is industrially preferred because the method is practical in terms of productivity and economical efficiency. The above-mentioned methods may be used in combination thereof. In addition, even when the above-mentioned other additive is blended, an EVOH resin composition including the other additive is obtained in conformity with any one of the methods (I) to (IV).

A known mixing apparatus, such as a rocking mixer, a ribbon blender, or a line mixer, may be used as means for the dry blending in the method (I).

At the time of the dry blending in the method (I), in order to improve the adhesive property of at least one kind of component selected from the group consisting of the acetic acid and/or the salt thereof (B), the aliphatic carboxylic acid (C), and the aliphatic carboxylic acid metal salt (D), the water content of such pellet of the EVOH (A) is preferably adjusted to from 0.1 wt. % to 5 wt. % (more preferably from 0.5 wt. % to 4 wt. %, particularly preferably from 1 wt. % to 3 wt. %). When such water content is excessively small, there is a tendency that at least one kind selected from the group consisting of the acetic acid and/or the salt thereof (B), the aliphatic carboxylic acid (C), and the aliphatic carboxylic acid metal salt (D) is liable to fall, and hence its adhesion distribution is liable to be nonuniform. In contrast, when the water content is excessively large, at least one kind selected from the group consisting of the acetic acid and/or the salt thereof (B), the aliphatic carboxylic acid (C), and the aliphatic carboxylic acid metal salt (D) tends to agglomerate to make its adhesion distribution nonuniform.

The water content of the pellet of the EVOH (A) as used herein is measured and calculated by the following method.

[Method of Measuring Water Content]

The pellet of the EVOH (A) is weighed (W1: unit: g) in an electronic balance. After that, the pellet is loaded into a hot-air oven-type dryer maintained at 150° C.; and dried for 5 hours. Then, the pellet is further left to cool in a desiccator for 30 minutes. Its weight after the cooling is similarly weighed (W2: unit: g), and the water content is calculated from the following equation.

$$\text{Water content (\%)} = (W1 - W2)/W1 \times 100 \quad \text{[Equation]}$$

In addition, the methods (I) and (II) each provide such a pellet that at least one kind of component selected from the group consisting of the acetic acid and/or the salt thereof (B), the aliphatic carboxylic acid (C), and the aliphatic carboxylic acid metal salt (D) adheres to the outside of the pellet of the EVOH (A).

With regard to means for the melt kneading in the method (III), the melt kneading may be performed by using a known melt kneading apparatus, such as a kneader, a ruder, an extruder, a mixing roll, a Banbury mixer, or a plastomill. In ordinary cases, the melt kneading is preferably performed at from 150° C.; to 300° C. (more preferably from 180° C.; to 280° C.) for from about 1 minute to about 20 minutes. In particular, the use of a single-screw or twin-screw extruder is industrially advantageous because a pellet is easily obtained. In addition, a vent suction apparatus, a gear pump apparatus, a screen apparatus, or the like is preferably arranged as required. In particular, an EVOH resin composition alleviated in thermal coloration and thermal deterioration, and excellent in quality can be obtained by arranging one or more vent holes in an extruder to perform suction under reduced pressure for removing moisture and a by-product (e.g., a thermally decomposed low-molecular weight product) or by continuously supplying an inert gas, such as nitrogen, into a hopper for preventing the inclusion of oxygen into the extruder.

In addition, a method of supplying the materials including the EVOH (A) to the melt kneading apparatus, such as an extruder, is not particularly limited, and examples thereof may include: (1) a method including dry-blending the EVOH (A), and at least one kind selected from the group consisting of the acetic acid and/or the salt thereof (B), the aliphatic carboxylic acid (C), and the aliphatic carboxylic acid metal salt (D), and collectively supplying the blend to the extruder; (2) a method including supplying the EVOH (A) to the extruder, melting the EVOH, and supplying at least one kind selected from the group consisting of the acetic acid and/or the salt thereof (B), the aliphatic carboxylic acid (C), and the aliphatic carboxylic acid metal salt (D), which is in a solid state, to the molten EVOH (solid side-feed method); and (3) a method including supplying the EVOH (A) to the extruder, melting the EVOH, and supplying at least one kind selected from the group consisting of the acetic acid and/or the salt thereof (B), the aliphatic carboxylic acid (C), and the aliphatic carboxylic acid metal salt (D), which is in a molten state, to the molten EVOH (melt side-feed method). Of those, the method (1) is practical in terms of, for example, simplicity of the apparatus and cost for the blend.

In addition, a known approach may be used as the method of producing the pellet after the melt kneading, and examples thereof include a strand cutting method and a hot cutting method (e.g., an in-air cutting method or an underwater cutting method). The strand cutting method is preferred in terms of industrial productivity.

A known good solvent for the EVOH only needs to be used as the solvent to be used in the solution mixing method serving as the method (IV). A mixed solvent of water and an aliphatic alcohol having 1 to 4 carbon atoms is typically used, and a mixed solvent of water and methanol is preferred. At the time of the dissolution of the EVOH (A) in the solvent, heating or pressurization may be arbitrarily performed, and the concentration of the solution is also arbitrary. The solution or paste having dissolved therein the EVOH (A) only needs to be blended with at least one kind selected from the group consisting of the acetic acid and/or the salt thereof (B), the aliphatic carboxylic acid (C), and the aliphatic carboxylic acid metal salt (D). At this time, at least one kind selected from the group consisting of the acetic acid and/or the salt thereof (B), the aliphatic carboxylic acid (C), and the aliphatic carboxylic acid metal salt (D) may be blended under the state of, for example, a solid, a solution, or a dispersion liquid.

After the blending, an EVOH resin composition solution or paste that has been uniformly stirred is pelletized by the above-mentioned known approach. The underwater cutting method is preferred in terms of industrial productivity. The resultant pellet is dried by a known approach.

As the shape of the pellet, an arbitrary shape, such as a spherical shape, an oval shape, a columnar shape, a cubic shape, or a rectangular parallelepiped shape, may be adopted. The pellet is typically of an oval shape or a columnar shape, and its size is as follows from the viewpoint of convenience when the pellet is used later as a forming material: when the pellet is of an oval shape, its shorter diameter is typically from 1 mm to 6 mm, preferably from 2 mm to 5 mm, and its longer diameter is typically from 1 mm to 6 mm, preferably from 2 mm to 5 mm. When the pellet is of a columnar shape, the diameter of its bottom surface is typically from 1 mm to 6 mm, preferably from 2 mm to 5 mm, and its length is typically from 1 mm to 6 mm, preferably from 2 mm to 5 mm.

Thus, the EVOH resin composition of the present disclosure can be obtained.

<Multilayer Structure>

A multilayer structure of the present disclosure includes at least one layer formed of the above-mentioned EVOH resin composition of the present disclosure. When the layer formed of the EVOH resin composition of the present disclosure (hereinafter simply referred to as "EVOH resin composition layer") is laminated on any other substrate, the layer can further improve the strength of the substrate or impart any other function to the substrate.

A thermoplastic resin other than the EVOH (hereinafter referred to as "other substrate resin") is preferably used as the other substrate.

Examples of the other substrate resin include: (unmodified) polyolefin resins, such as polyethylene resins, for example, linear low-density polyethylene, low-density polyethylene, ultralow-density polyethylene, medium-density polyethylene, high-density polyethylene, ethylene-propylene (block and random) copolymers, and an ethylene-α-olefin (α-olefin having 4 to 20 carbon atoms) copolymer, polypropylene resins, for example, polypropylene and a propylene-α-olefin (α-olefin having 4 to 20 carbon atoms) copolymer, polybutene, polypentene, and a polycyclic olefin resin (a polymer having a cyclic olefin structure in at least one of a main chain and side chain thereof); polyolefin resins in a broad sense including modified olefin resins, such as unsaturated carboxylic acid-modified polyolefin resins obtained by graft-modifying those polyolefins with an unsaturated carboxylic acid or an ester thereof; an ionomer; an ethylene-vinyl acetate copolymer; an ethylene-acrylic acid copolymer; an ethylene-acrylic acid ester copolymer; a polyester resin; a polyamide resin (including a copolymerized polyamide); polyvinyl chloride; polyvinylidene chloride; an acrylic resin; a polystyrene resin; a vinyl ester resin; a polyester elastomer; a polyurethane elastomer; halogenated polyolefins, such as chlorinated polyethylene and chlorinated polypropylene; and aromatic or aliphatic polyketones.

Of those, in consideration of hydrophobicity, a polyamide resin, a polyolefin resin, a polyester resin, and a polystyrene resin each serving as a hydrophobic resin are preferred, polyolefin resins, such as a polyethylene resin, a polypropylene resin, and a polycyclic olefin resin, and unsaturated carboxylic acid-modified polyolefin resins thereof are more preferred, and a polyolefin resin is particularly preferred.

The α-olefin of the polyolefin resin may be a plant-derived α-olefin derived from bioethanol, or may be a non-plant-derived, that is, petroleum-derived α-olefin, or these α-olefins may be used in combination thereof. A wide variety of α-olefins are each available as the petroleum-derived α-olefin, and hence the production of the polyolefin resin through use of any such α-olefin enables easy adjustment of the physical properties and the like of the resin. The use of the plant-derived α-olefin can further improve the biomass content of the final product, and hence can reduce an environmental load.

With regard to methods of producing plant-derived ethylene and the plant-derived α-olefin, the plant-derived ethylene and the plant-derived α-olefin (e.g., 1-butene or 1-hexene) may each be obtained as follows: a sugar solution or starch obtained from a plant such as sugarcane, corn, or a sweet potato is fermented with a microorganism such as yeast in accordance with a conventionally used method to produce bioethanol, and the bioethanol is heated in the presence of a catalyst to cause an intramolecular dehydration reaction or the like, thereby providing the ethylene or the α-olefin. Next, a plant-derived polyethylene resin may be produced by using the plant-derived ethylene and the plant-derived α-olefin thus obtained in the same manner as in the production of a petroleum-derived polyethylene resin.

Methods of producing the plant-derived ethylene, the plant-derived α-olefin, and the plant-derived polyethylene resin are described in detail in, for example, JP-A-2011-506628. The plant-derived polyethylene resin to be suitably used in the present disclosure is, for example, GREEN PE manufactured by Braskem S.A.

When the EVOH resin composition layer of the present disclosure is represented by "a" (a1, a2, . . . ), and the other substrate resin layer is represented by "b" (b1, b2, . . . ), for example, the following arbitrary combinations may each be adopted as the layered configuration of the multilayer structure of the present disclosure: a/b; a1/a2; b/a/b; a/b/a; a1/a2/b; a1/a2/a3; a/b1/b2; b2/b1/a/b1/b2; b1/b2/a1/a2/a3/b3/b4; and b2/b1/a1/b1/a1/b1/b2. In addition, the configuration of a layer to be laminated in one lamination direction with respect to the arbitrary EVOH resin composition layer (a) and the configuration of a layer to be laminated in the other direction with respect thereto may be identical (symmetrical) to each other, or may be different from (asymmetrical to) each other. Further, the thickness of the layer to be laminated in one lamination direction with respect to the arbitrary EVOH resin composition layer (a) and the thickness of the layer to be laminated in the other direction with respect thereto may be identical (symmetrical) to each other, or may be different from (asymmetrical) to each other.

In the layered configuration, an adhesive resin layer may be interposed between the respective layers as required. In the case of a multilayer structure including, on at least one surface of the EVOH resin composition layer of the present disclosure, the other substrate resin layer (i.e., the thermoplastic resin layer other than the EVOH) through intermediation of the adhesive resin layer, the effects of the present disclosure tend to be more effectively obtained.

In addition, when a recycled layer containing a mixture of the EVOH resin composition of the present disclosure and the other substrate resin, or of the other substrate resin and the adhesive resin, the layer being obtained by melting and forming an end portion, a defective product, and the like produced in a process for the production of the multilayer structure again, is represented by R, for example, the following combinations may each be adopted: b/R/a; a1/R/a2; b1/R/a/b2; b1/R1/a/R2/b2; b1/R1/b2/a1/a2/a3/b3/R2/b4; b1/a1/R/a2/b2; and b1/R1/a1/R2/a2/R3/b2. The layer number of the multilayer structure of the present disclosure is typically from 2 to 15, preferably from 3 to 10 in terms of total number.

With regard to the layered configuration of a multilayer structure in the multilayer structure of the present disclosure, a multilayer structure including at least a basic unit defined as follows as a constituent unit is preferred: the unit (b/a/b or b/adhesive resin layer/a/adhesive resin layer/b) of the multilayer structure, which includes the EVOH resin composition layer of the present disclosure as an intermediate layer and has the other substrate resin layers arranged as both outside layers of the intermediate layer, is defined as the basic unit.

A known resin may be used as the adhesive resin serving as a forming material for the adhesive resin layer, and only needs to be appropriately selected in accordance with the kind of the thermoplastic resin to be used for the other substrate resin layer. A typical example thereof may be a modified polyolefin polymer containing a carboxy group obtained by chemically bonding an unsaturated carboxylic acid or an anhydride thereof to a polyolefin resin through an addition reaction, a graft reaction, or the like. Examples thereof include maleic anhydride-graft-modified polyethylene, maleic anhydride-graft-modified polypropylene, maleic anhydride-graft-modified ethylene-propylene (block and random) copolymers, a maleic anhydride-graft-modified ethylene-ethyl acrylate copolymer, a maleic anhydride-graft-modified ethylene-vinyl acetate copolymer, a maleic anhydride-modified polycyclic olefin resin, and a maleic anhydride-graft-modified polyolefin resin. Those polymers may be used alone or in combination thereof.

At this time, the content of the unsaturated carboxylic acid or the anhydride thereof is typically from 0.001 wt. % to 3 wt. %, preferably from 0.01 wt. % to 1 wt. %, particularly preferably from 0.03 wt. % to 0.5 wt. % with respect to the total amount of the adhesive resin. When a modification amount in a modified product is small, the adhesion property of the resin tends to be insufficient. In contrast, when the modification amount is large, a crosslinking reaction tends to occur to deteriorate the formability thereof. Any such adhesive resin may be blended with, for example, the EVOH (A), any other EVOH, a rubber-elastomer component, such as polyisobutylene or an ethylene-propylene rubber, and the resin of a polyolefin resin layer. In particular, the adhesive resin may be blended with a polyolefin resin different from the polyolefin resin serving as a base for the adhesive resin.

The other substrate resin and the adhesive resin layer may each contain, in addition to the acetic acid and/or the salt thereof (B), the aliphatic carboxylic acid (C), and the aliphatic carboxylic acid metal salt (D) to be used in the present disclosure, a conventionally known additive, such as a plasticizer (e.g., ethylene glycol, glycerin, or hexanediol), a filler, a clay (e.g., montmorillonite), a colorant, an antioxidant, an antistatic agent, a lubricant (e.g., an alkali metal salt or alkaline earth metal salt of a higher fatty acid having 10 to 30 carbon atoms, a higher fatty acid ester (e.g., a methyl ester, isopropyl ester, butyl ester, or octyl ester of a higher fatty acid), a higher fatty acid amide (e.g., a saturated aliphatic amide, such as stearamide or behenamide, an unsaturated fatty acid amide, such as oleamide or erucamide, or a bisfatty acid amide, such as ethylenebisstearamide, ethylenebisoleamide, ethylenebiserucamide, or ethylenebislauramide), a low-molecular-weight polyolefin (e.g., a low-molecular-weight polyethylene or low-molecular-weight polypropylene having a molecular weight of from about 500 to about 10,000)), a fluoroethylene resin or the like, a nucleating agent, a blocking inhibitor, a UV absorber, or a wax, to the extent that the gist of the present disclosure is not inhibited (e.g., 30 wt. % or less, preferably 10 wt. % or less). Those additives may be used alone or in combination thereof.

In addition, the resin to be used in the adhesive resin layer is preferably blended with at least one kind selected from the group consisting of the acetic acid and/or the salt thereof (B), the aliphatic carboxylic acid (C), and the aliphatic carboxylic acid metal salt (D) in the present disclosure. In particular, when the adhesive resin layer adjacent to the resin composition layer of the present disclosure contains at least one kind selected from the group consisting of the acetic acid and/or the salt thereof (B), the aliphatic carboxylic acid (C), and the aliphatic carboxylic acid metal salt (D), a multilayer structure more excellent in impact resistance is obtained.

In cases where the multilayer structure is produced by laminating the EVOH resin composition of the present disclosure together with the other substrate resin (including the case where the adhesive resin layer is interposed), the lamination may be performed by a known method. Examples thereof include: a method involving melting and extruding the other substrate resin, and laminating the resultant on a film, sheet, or the like of the EVOH resin composition of the present disclosure; a method involving, in contrast to the foregoing, melting and extruding the EVOH resin composition of the present disclosure, and laminating the resultant on the other substrate resin; a method involving subjecting the EVOH resin composition of the present disclosure and the other substrate resin to coextrusion; a method involving producing each of a film (layer) formed of the EVOH resin composition of the present disclosure and the other substrate resin (layer), and subjecting the products to dry lamination with a known adhesive, such as an organotitanium compound, an isocyanate compound, a polyester compound, or a polyurethane compound; and a method involving applying a solution of the EVOH resin composition of the present disclosure onto the other substrate resin, and then removing a solvent. Of those, the method involving the coextrusion is preferred in consideration of cost and environmental viewpoints.

The multilayer structure, which may be used as it is in products of various shapes, is subjected to (heat) stretching treatment as required. The stretching treatment may be any one of uniaxial stretching and biaxial stretching. In the case of the biaxial stretching, any one of simultaneous stretching and sequential stretching is permitted. In addition, a method providing a high stretching ratio out of, for example, a roll stretching method, a tenter stretching method, a tubular stretching method, a stretching blow method, and a vacuum-pressure forming method may be adopted as a stretching method. A stretching temperature is selected from the range of typically from 40° C.; to 170° C., preferably from about 60° C.; to about 160° C. When the stretching temperature is excessively low, the stretchability of the multilayer structure tends to become unsatisfactory, and when the stretching temperature is excessively high, it tends to become difficult for the multilayer structure to maintain a stable stretched state.

Thermal fixing may be performed for the purpose of imparting dimensional stability to the multilayer structure after the stretching. The thermal fixing may be performed by well-known means and for example, the stretched multilayer structure (stretched film) is subjected to a heat treatment at typically from 80° C.; to 180° C., preferably from 100° C.; to 165° C.; for typically from about 2 seconds to about 600 seconds while its tense state is kept.

In addition, when a multilayer stretched film obtained by using the EVOH resin composition of the present disclosure is used as a shrinking film, in order that heat shrinkability may be imparted thereto, a treatment involving, for example, applying cold air to the film after the stretching to cool and fix the film is desirably performed without the performance of the thermal fixing.

Further, a multilayer container of a cup or tray shape may be obtained from the multilayer structure of the present disclosure. A drawing method is typically adopted as a method of producing the multilayer container, and specific examples thereof include a vacuum forming method, a pressure forming method, a vacuum-pressure forming method, and a plug-assisted vacuum-pressure forming method. Further, when a multilayer container of a tube or bottle shape is obtained from a multilayer parison (preliminarily molded product of a hollow tube shape before blowing), a blow molding method is adopted, and specific examples thereof include an extrusion blow molding method (of, for example, a twin-head type, a mold-transfer type, a parison shift type, a rotary type, an accumulator type, or a horizontal parison type), a cold parison-type blow molding method, an injection blow molding method, and a biaxial stretching blow molding method (e.g., an extrusion-type cold parison biaxial stretching blow molding method, an injection-type cold parison biaxial stretching blow molding method, or an injection molding in-line-type biaxial stretching blow molding method). The multilayer structure of the present disclosure may be subjected to, for example, a heat treatment, a cooling treatment, a rolling treatment, a printing treatment, a dry lamination treatment, a solution or melt coating treatment, bag-making processing, deep drawing processing, box processing, tube processing, or split processing as required.

The thickness of the multilayer structure (including a stretched multilayer structure) of the present disclosure, and the thicknesses of the resin composition layer, the other substrate resin layer, and the adhesive resin layer for forming the multilayer structure are appropriately set in accordance with, for example, the layered configuration of the structure, the kind of the substrate resin, the kind of the adhesive resin, the applications and packaging form of the structure, and physical properties that the structure is required to have.

The thickness of the multilayer structure (including the stretched multilayer structure) of the present disclosure is typically from 10 µm to 5,000 µm, preferably from 30 µm to 3,000 µm, particularly preferably from 50 µm to 2,000 µm. When the total thickness of the multilayer structure is excessively small, its gas barrier property tends to reduce. In addition, when the total thickness of the multilayer structure is excessively large, economical efficiency is unfavorable because the gas barrier property becomes excess performance and hence an unnecessary raw material is used. In addition, the thickness of the EVOH resin composition layer of the present disclosure in the multilayer structure is typically from 1 µm to 500 µm, preferably from 3 µm to 300 µm, particularly preferably from 5 µm to 200 µm, the thickness of the other substrate resin layer is typically from 5 µm to 3,000 µm, preferably from 10 µm to 2,000 µm, particularly preferably from 20 µm to 1,000 µm, and the thickness of the adhesive resin layer is typically from 0.5 µm to 250 µm, preferably from 1 µm to 150 µm, particularly preferably from 3 µm to 100 µm. When two or more layers of at least one kind selected from the group consisting of the EVOH resin composition layer, the adhesive resin layer, and the other substrate resin layer are present, the above-mentioned numerical values are each a value obtained by totaling the thicknesses of the layers of the same kind.

Further, a ratio (EVOH resin composition layer/other substrate resin layer) between their thicknesses is typically from 1/99 to 50/50, preferably from 5/95 to 45/55, particularly preferably from 10/90 to 40/60, in terms of ratio between the thicknesses of the layers having the largest thicknesses in a case where two or more layers of the same kind are present. In addition, a ratio (EVOH resin composition layer/adhesive resin layer) between their thicknesses is typically from 10/90 to 99/1, preferably from 20/80 to 95/5, particularly preferably from 50/50 to 90/10, in terms of ratio between the thicknesses of the layers having the largest thicknesses in a case where two or more layers of the same kind are present.

A container or a lid material including a bag, a cup, a tray, a tube, a bottle, or the like formed of the film or the stretched film obtained as described above is useful as a container not only for general food but also for various materials to be packaged, such as seasonings including mayonnaise and a dressing, fermented food including a soybean paste, oil and fat food including a salad oil, beverages, cosmetics, and drugs.

EXAMPLES

Now, the present disclosure is more specifically described by way of Examples and Comparative Examples shown in the following tables. The present disclosure is not limited to Examples below without departing from the gist of the present disclosure. The term "part(s)" in the examples means part(s) by weight.

<<First Mode>>

Example I-1

[Production of EVOH Resin Composition]

A pellet of an EVOH (a1) [ethylene-vinyl alcohol copolymer having an ethylene structural unit content of 29 mol %, a saponification degree of 99.7 mol %, and a MFR of 3.8 g/10 min (210° C., load: 2,160 g)], which contained the EVOH (a1) as the EVOH (A), and contained sodium acetate (b1) as the acetic acid and/or the salt thereof (B), was used. In addition, stearic acid (c1) was used as the aliphatic carboxylic acid (C), and zinc stearate (d1) was used as the aliphatic carboxylic acid metal salt (D).

In addition, with regard to the contents of the respective components, the sodium acetate (b1) was used at a content of 432 ppm in terms of acetic acid ion with respect to the total sum of the contents of the EVOH ($\alpha$1), the sodium acetate (b1), the stearic acid (c1), and the zinc stearate (d1), the stearic acid (c1) was used at a content of 1.0 ppm in terms of carboxylic acid ion with respect to the total sum of the contents of the EVOH ($\alpha$1), the sodium acetate (b1), the stearic acid (c1), and the zinc stearate (d1), and the zinc stearate (d1) was used at a content of 20 ppm in terms of metal ion with respect to the total sum of the contents of the EVOH (α1), the sodium acetate (b1), the stearic acid (c1), and the zinc stearate (d1). The pellet of the EVOH (α1), the stearic acid (c1), and the zinc stearate (d1) were collectively dry-blended to produce an EVOH resin composition of the present disclosure.

[Multilayer Structure Production 1]

The EVOH resin composition prepared in the foregoing, linear low-density polyethylene (LLDPE) ["UF240" manufactured by Japan Polyethylene Corporation, MFR: 2.1 g/10 min (190° C., load: 2,160 g)], and an adhesive resin ("PLEXAR PX3236" manufactured by LyondellBasell Industries N.V., MFR: 2.0 g/10 min [190° C., load: 2,160 g]) were supplied to a three-kind and five-layer multilayer coextrusion cast film-forming apparatus, and were subjected to multilayer coextrusion under the following conditions to provide a multilayer structure (film) of a three-kind and five-layer structure "LLDPE layer (δ1)/adhesive resin layer (β1)/EVOH resin composition layer (α)/adhesive resin layer (β2)/LLDPE layer (δ2)." The thicknesses (μm) of the respective layers of the multilayer structure were 37.5/5/15/5/37.5. All the die temperatures of forming apparatus were set to 210° C.

(Multilayer Coextrusion Conditions 1)

Intermediate layer extruder (EVOH resin composition): 40 mmφ single-screw extruder (barrel temperature: 210° C.)

Upper and lower layer extruder (LLDPE): 40 mmφ single-screw extruder (barrel temperature: 210° C.)

Medium upper and lower layer extruder (adhesive resin): 32 mmφ single-screw extruder (barrel temperature: 210° C.)

Die: three-kind and five-layer feed block-type T-die (die temperature: 210° C.)

Drawing speed: 9.0 m/min

Roll temperature: 80° C.

The EVOH resin composition obtained in the foregoing was subjected to the following color tone stability evaluation test and elongation viscosity evaluation test, and the multilayer structure obtained in the foregoing was subjected to the following impact strength evaluation test and adhesive strength evaluation test.

<Color Tone Stability Evaluation of EVOH Resin Composition>

5 Grams of the EVOH resin composition produced in the foregoing was loaded into a 30 mmφ aluminum cup (manufactured by AS ONE Corporation, DISPODISH PP-724), and was left at rest under an air atmosphere at 210° C.; for 2 hours to provide a sample. The sample was subjected to a color tone evaluation. The color tone evaluation was performed on the basis of the following apparatus and evaluation method.

Used instrument: VISUAL ANALYZER IRISVA400 (manufactured by Alpha M.O.S. Japan K.K.)

Data analysis software: Alpha Soft V14.3

Objective lens: 25 mm (manufactured by Basler AG)

Lighting mode: Upper and lower lighting

Measurement method: The sample for a color tone evaluation was set in a tray in the chamber of the VISUAL ANALYZER, and a plane image of the entirety of the sample for a color tone evaluation was taken with a CCD camera. After that, the color pattern of the sample was evaluated by processing the image with the data analysis software. The color tone stability of the EVOH resin composition was evaluated from the lightness (L*) of a color having the highest abundance ratio among the resultant color pattern (main color). A higher numerical value of the color tone stability means that the composition is more excellent in color tone stability. In contrast, a lower numerical value thereof means that the composition is poorer in color tone stability. The result is shown in Table I-1-2.

<Evaluation of Elongation Viscosity (Pa·s) of EVOH Resin Composition>

The elongation viscosity (Pa·s) of the EVOH resin composition produced in the foregoing at 210° C.; and 100 s$^{-1}$ was evaluated by performing measurement with a capillary-type rheometer on the basis of Cogswell's equations [Polymer Engineering Science, vol. 12, pp. 64 to 73 (1972)], that is, the following equations (I4) to (16) under the following conditions. The result is shown in Table I-1-2.

(Cogswell's Equations)

$$\eta e = [9(n+1)^2 P_0^2]/[32\eta_s(d\gamma/dt)^2] \qquad \text{Equation (I4)}$$

$$d\varepsilon/dt = 4\sigma_s(d\gamma/dt)/[3(n+1)P_0] \qquad \text{Equation (I5)}$$

$$\sigma_s = k(d\gamma/dt)^n \qquad \text{Equation (I6)}$$

$\eta_e$: elongation viscosity (Pa·s)

$\eta_s$: shear viscosity (Pa·s)

$d\gamma/dt$: shear strain rate (s$^{-1}$)

$d\varepsilon/dt$: elongation strain rate (s$^{-1}$)

$\sigma_s$: shear stress (Pa)

"k" and "n": constants $P_0$: pressure loss (Pa)

(Conditions for Measurement of Elongation Viscosity)

Measuring apparatus: RHEOGRAPH 20 manufactured by Gottfert Werkstoff-Prufmaschinen GmbH Measurement temperature: 210° C.

Preheating time: 10 minutes

Long die: die having a length of 10 mm, a diameter of 1 mm, and an inlet angle of 180°

Short die: die having a length of 0.2 mm, a diameter of 1 mm, and an inlet angle of 180°

<Impact Strength of Multilayer Structure>

The impact strength (kgf·cm) of the multilayer structure produced in the foregoing was evaluated with a YSS-type film impact tester (manufactured by Yasuda Seiki Seisakusho, Ltd., MODEL 181) under an atmosphere at 23° C.; and 50% RH. The measurement was performed a total of ten times, and the average of the measured values was evaluated as the impact strength of the multilayer structure. A clamp having an inner diameter of 60 mm and an impact ball having a radius of 12.7 mm were used, and the angle of fall of a pendulum was set to 90°. A higher numerical value of the impact strength of the multilayer structure means that the structure is more excellent in impact strength. In contrast, a lower numerical value thereof means that the structure is poorer in impact strength. The result is shown in Table I-1-2.

<Adhesive Strength of Multilayer Structure>

An adhesive strength (N/15 mm) between the EVOH resin composition layer and each adhesive resin layer in the multilayer structure produced in the foregoing was evaluated by the following T-peel peel test. The measurement was performed a total of ten times, and the average of the measured values was evaluated as the adhesive strength of the multilayer structure. A higher numerical value of the adhesive strength of the multilayer structure means that the structure is more excellent in adhesive strength. In contrast, a lower numerical value thereof means that the structure is poorer in adhesive strength. The result is shown in Table I-1-2.

(Conditions for T-Peel Peel Test)
Apparatus: Autograph AGS-H (manufactured by Shimadzu Corporation)
Load cell: 500 N
Test method: T-peel method (peeled in a T-shape)
Test piece size: 15 mm in width
Test speed: 300 mm/min Example I-2

An EVOH resin composition and a multilayer structure were produced in the same manner as in Example I-1 other than that: the stearic acid (c1) was used at a content of 2.4 ppm in terms of carboxylic acid ion with respect to the total sum of the contents of the EVOH (a1), the sodium acetate (b1), the stearic acid (c1), and the zinc stearate (d1); and the zinc stearate (d1) was used at a content of 50 ppm in terms of metal ion with respect to the total sum of the contents of the EVOH (a1), the sodium acetate (b1), the stearic acid (c1), and the zinc stearate (d1). The resultant EVOH resin composition and multilayer structure were evaluated in the same manner as in Example I-1.

Example I-3

An EVOH resin composition and a multilayer structure were produced in the same manner as in Example I-1 other than that: the stearic acid (c1) was used at a content of 0.7 ppm in terms of carboxylic acid ion with respect to the total sum of the contents of the EVOH (a1), the sodium acetate (b1), the stearic acid (c1), and the zinc stearate (d1); and the zinc stearate (d1) was used at a content of 50 ppm in terms of metal ion with respect to the total sum of the contents of the EVOH (a1), the sodium acetate (b1), the stearic acid (c1), and the zinc stearate (d1). The resultant EVOH resin composition and multilayer structure were evaluated in the same manner as in Example I-1.

Example I-4

An EVOH resin composition and a multilayer structure were produced in the same manner as in Example I-1 other than that: the stearic acid (c1) was used at a content of 4.9 ppm in terms of carboxylic acid ion with respect to the total sum of the contents of the EVOH (a1), the sodium acetate (b1), the stearic acid (c1), and the zinc stearate (d1); and the zinc stearate (d1) was used at a content of 100 ppm in terms of metal ion with respect to the total sum of the contents of the EVOH (a1), the sodium acetate (b1), the stearic acid (c1), and the zinc stearate (d1). The resultant EVOH resin composition and multilayer structure were evaluated in the same manner as in Example I-1.

Example I-5

An EVOH resin composition and a multilayer structure were produced in the same manner as in Example I-4 other than that: the sodium acetate (b1) was used at a content of 324 ppm in terms of acetic acid ion with respect to the total sum of the contents of the EVOH (a1), the sodium acetate (b1), the stearic acid (c1), and the zinc stearate (d1); and phosphoric acid (e1) was used at a content of 54 ppm in terms of phosphorus with respect to the total sum of the contents of the EVOH (a1), the sodium acetate (b1), the stearic acid (c1), the zinc stearate (d1), and the phosphoric acid (e1). The resultant EVOH resin composition and multilayer structure were evaluated in the same manner as in Example I-1.

Example I-6

An EVOH resin composition and a multilayer structure were produced in the same manner as in Example I-1 other than that: the stearic acid (c1) was used at a content of 9 0.7 ppm in terms of carboxylic acid ion with respect to the total sum of the contents of the EVOH (a1), the sodium acetate (b1), the stearic acid (c1), and the zinc stearate (d1); and the zinc stearate (d1) was used at a content of 200 ppm in terms of metal ion with respect to the total sum of the contents of the EVOH (a1), the sodium acetate (b1), the stearic acid (c1), and the zinc stearate (d1). The resultant EVOH resin composition and multilayer structure were evaluated in the same manner as in Example I-1.

Example I-7

An EVOH resin composition and a multilayer structure were produced in the same manner as in Example I-1 other than that: caprylic acid (c2) was used instead of the stearic acid (c1) at a content of 2.8 ppm in terms of carboxylic acid ion with respect to the total sum of the contents of the EVOH (a1), the sodium acetate (b1), the caprylic acid (c2), and zinc caprylate (d2); and the zinc caprylate (d2) was used instead of the zinc stearate (d1) at a content of 20 ppm in terms of metal ion with respect to the total sum of the contents of the EVOH (a1), the sodium acetate (b1), the caprylic acid (c2), and the zinc caprylate (d2). The resultant EVOH resin composition and multilayer structure were evaluated in the same manner as in Example I-1.

Example I-8

An EVOH resin composition and a multilayer structure were produced in the same manner as in Example I-7 other than that: the caprylic acid (c2) was used at a content of 6.9 ppm in terms of carboxylic acid ion with respect to the total sum of the contents of the EVOH (a1), the sodium acetate (b1), the caprylic acid (c2), and the zinc caprylate (d2); and the zinc caprylate (d2) was used at a content of 50 ppm in terms of metal ion with respect to the total sum of the contents of the EVOH (a1), the sodium acetate (b1), the caprylic acid (c2), and the zinc caprylate (d2). The resultant EVOH resin composition and multilayer structure were evaluated in the same manner as in Example I-1.

Example I-9

An EVOH resin composition and a multilayer structure were produced in the same manner as in Example I-8 other than that an EVOH (a2) [ethylene-vinyl alcohol copolymer having an ethylene structural unit content of 29 mol %, a saponification degree of 99.7 mol %, and a MFR of 0.7 g/10 min (210° C., load: 2,160 g)] was used instead of the EVOH (a1). The resultant EVOH resin composition and multilayer structure were evaluated in the same manner as in Example I-1.

Example I-10

An EVOH resin composition and a multilayer structure were produced in the same manner as in Example I-7 other than that: the caprylic acid (c2) was used at a content of 13.8 ppm in terms of carboxylic acid ion with respect to the total sum of the contents of the EVOH (a1), the sodium acetate (b1), the caprylic acid (c2), and the zinc caprylate (d2); and the zinc caprylate (d2) was used at a content of 100 ppm in terms of metal ion with respect to the total sum of the contents of the EVOH (a1), the sodium acetate (b1), the caprylic acid (c2), and the zinc caprylate (d2). The resultant EVOH resin composition and multilayer structure were evaluated in the same manner as in Example I-1.

Example I-11

An EVOH resin composition and a multilayer structure were produced in the same manner as in Example I-10 other than that: the sodium acetate (b1) was used at a content of 324 ppm in terms of acetic acid ion with respect to the total sum of the contents of the EVOH (a1), the sodium acetate (b1), the caprylic acid (c2), and the zinc caprylate (d2); and the phosphoric acid (e1) was used at a content of 54 ppm in terms of phosphorus with respect to the total sum of the contents of the EVOH (a1), the sodium acetate (b1), the caprylic acid (c2), the zinc caprylate (d2), and the phosphoric acid (e1). The resultant EVOH resin composition and multilayer structure were evaluated in the same manner as in Example I-1.

Example I-12

An EVOH resin composition and a multilayer structure were produced in the same manner as in Example I-10 other than that: the sodium acetate (b1) was used at a content of 100 ppm in terms of acetic acid ion with respect to the total sum of the contents of the EVOH (a1), the sodium acetate (b1), the caprylic acid (c2), and the zinc caprylate (d2); and the phosphoric acid (e1) was used at a content of 12.4 ppm in terms of phosphorus with respect to the total sum of the contents of the EVOH (a1), the sodium acetate (b1), the caprylic acid (c2), the zinc caprylate (d2), and the phosphoric acid (e1). The resultant EVOH resin composition and multilayer structure were evaluated in the same manner as in Example I-1.

Example I-13

An EVOH resin composition and a multilayer structure were produced in the same manner as in Example I-7 other than that: the caprylic acid (c2) was used at a content of 27.6 ppm in terms of carboxylic acid ion with respect to the total sum of the contents of the EVOH (a1), the sodium acetate (b1), the caprylic acid (c2), and the zinc caprylate (d2); and the zinc caprylate (d2) was used at a content of 200 ppm in terms of metal ion with respect to the total sum of the contents of the EVOH (a1), the sodium acetate (b1), the caprylic acid (c2), and the zinc caprylate (d2). The resultant EVOH resin composition and multilayer structure were evaluated in the same manner as in Example I-1.

Example I-14

An EVOH resin composition and a multilayer structure were produced in the same manner as in Example I-1 except that: lauric acid (c3) was used instead of the stearic acid (c1) at a content of 0.7 ppm in terms of carboxylic acid ion with respect to the total sum of the contents of the EVOH (a1), the sodium acetate (b1), the lauric acid (c3), and zinc laurate (d3); and the zinc laurate (d3) was used instead of the zinc stearate (d1) at a content of 20 ppm in terms of metal ion with respect to the total sum of the contents of the EVOH (a1), the sodium acetate (b1), the lauric acid (c3), and the zinc laurate (d3). The resultant EVOH resin composition and multilayer structure were evaluated in the same manner as in Example I-1.

Example I-15

An EVOH resin composition and a multilayer structure were produced in the same manner as in Example I-14 except that: the lauric acid (c3) was used at a content of 1.8 ppm in terms of carboxylic acid ion with respect to the total sum of the contents of the EVOH (a1), the sodium acetate (b1), the lauric acid (c3), and the zinc laurate (d3); and the zinc laurate (d3) was used at a content of 50 ppm in terms of metal ion with respect to the total sum of the contents of the EVOH (a1), the sodium acetate (b1), the lauric acid (c3), and the zinc laurate (d3). The resultant EVOH resin composition and multilayer structure were evaluated in the same manner as in Example I-1.

Example I-16

An EVOH resin composition and a multilayer structure were produced in the same manner as in Example I-14 except that: the lauric acid (c3) was used at a content of 3.6 ppm in terms of carboxylic acid ion with respect to the total sum of the contents of the EVOH (a1), the sodium acetate (b1), the lauric acid (c3), and the zinc laurate (d3); and the zinc laurate (d3) was used at a content of 100 ppm in terms of metal ion with respect to the total sum of the contents of the EVOH (a1), the sodium acetate (b1), the lauric acid (c3), and the zinc laurate (d3). The resultant EVOH resin composition and multilayer structure were evaluated in the same manner as in Example I-1.

Example I-17

An EVOH resin composition and a multilayer structure were produced in the same manner as in Example I-16 except that: the sodium acetate (b1) was used at a content of 324 ppm in terms of acetic acid ion with respect to the total sum of the contents of the EVOH (a1), the sodium acetate (b1), the lauric acid (c3), and the zinc laurate (d3); and the phosphoric acid (e1) was used at a content of 54 ppm in terms of phosphorus with respect to the total sum of the contents of the EVOH (a1), the sodium acetate (b1), the lauric acid (c3), the zinc laurate (d3), and the phosphoric acid (e1). The resultant EVOH resin composition and multilayer structure were evaluated in the same manner as in Example I-1.

Example I-18

An EVOH resin composition and a multilayer structure were produced in the same manner as in Example I-14 except that: the lauric acid (c3) was used at a content of 7.1 ppm in terms of carboxylic acid ion with respect to the total sum of the contents of the EVOH (a1), the sodium acetate (b1), the lauric acid (c3), and the zinc laurate (d3); and the zinc laurate (d3) was used at a content of 200 ppm in terms of metal ion with respect to the total sum of the contents of the EVOH (a1), the sodium acetate (b1), the lauric acid (c3), and the zinc laurate (d3). The resultant EVOH resin composition and multilayer structure were evaluated in the same manner as in Example I-1.

Example I-19

An EVOH resin composition and a multilayer structure were produced in the same manner as in Example I-1 except that: caproic acid (c4) was used instead of the stearic acid (c1) at a content of 9.4 ppm in terms of carboxylic acid ion with respect to the total sum of the contents of the EVOH (a1), the sodium acetate (b1), the caproic acid (c4), and zinc caproate (d4); and the zinc caproate (d4) was used instead of the zinc stearate (d1) at a content of 50 ppm in terms of metal ion with respect to the total sum of the contents of the EVOH (a1), the sodium acetate (b1), the caproic acid (c4), and the zinc caproate (d4). The resultant EVOH resin composition and multilayer structure were evaluated in the same manner as in Example I-1.

Example I-20

An EVOH resin composition and a multilayer structure were produced in the same manner as in Example I-19 except that: the sodium acetate (b1) was used at a content of 324 ppm in terms of acetic acid ion with respect to the total sum of the contents of the EVOH (a1), the sodium acetate (b1), the caproic acid (c4), and the zinc caproate (d4); the caproic acid (c4) was used at a content of 18.8 ppm in terms of carboxylic acid ion with respect to the total sum of the contents of the EVOH (a1), the sodium acetate (b1), the caproic acid (c4), and the zinc caproate (d4); the zinc caproate (d4) was used at a content of 100 ppm in terms of metal ion with respect to the total sum of the contents of the EVOH (a1), the sodium acetate (b1), the caproic acid (c4), and the zinc caproate (d4); and the phosphoric acid (e1) was used at a content of 54 ppm in terms of phosphorus with respect to the total sum of the contents of the EVOH (a1), the sodium acetate (b1), the caproic acid (c4), the zinc caproate (d4), and the phosphoric acid (e1). The resultant EVOH resin composition and multilayer structure were evaluated in the same manner as in Example I-1.

Example I-21

An EVOH resin composition and a multilayer structure were produced in the same manner as in Example I-1 except that: behenic acid (c5) was used instead of the stearic acid (c1) at a content of 2.9 ppm in terms of carboxylic acid ion with respect to the total sum of the contents of the EVOH (a1), the sodium acetate (b1), the behenic acid (c5), and zinc behenate (d5); and the zinc behenate (d5) was used instead of the zinc stearate (d1) at a content of 50 ppm in terms of metal ion with respect to the total sum of the contents of the EVOH (a1), the sodium acetate (b1), the behenic acid (c5), and the zinc behenate (d5). The resultant EVOH resin composition and multilayer structure were evaluated in the same manner as in Example I-1.

Example I-22

An EVOH resin composition and a multilayer structure were produced in the same manner as in Example I-21 except that: the sodium acetate (b1) was used at a content of 324 ppm in terms of acetic acid ion with respect to the total sum of the contents of the EVOH (a1), the sodium acetate (b1), the behenic acid (c5), and the zinc behenate (d5); the behenic acid (c5) was used at a content of 5.7 ppm in terms of carboxylic acid ion with respect to the total sum of the contents of the EVOH (a1), the sodium acetate (b1), the behenic acid (c5), and the zinc behenate (d5) was used at a content of 100 ppm in terms of metal ion with respect to the total sum of the contents of the EVOH (a1), the sodium acetate (b1), the behenic acid (c5), and the zinc behenate (d5); and the phosphoric acid (e1) was used at a content of 54 ppm in terms of phosphorus with respect to the total sum of the contents of the EVOH (a1), the sodium acetate (b1), the behenic acid (c5), the zinc behenate (d5), and the phosphoric acid (e1). The resultant EVOH resin composition and multilayer structure were evaluated in the same manner as in Example I-1.

Example I-23

An EVOH resin composition and a multilayer structure were produced in the same manner as in Example I-8 except that: an EVOH (a3) [ethylene-vinyl alcohol copolymer having an ethylene structural unit content of 25 mol %, a saponification degree of 99.7 mol %, and a MFR of 4.0 g/10 min (210° C., load: 2,160 g)] was used instead of the EVOH (a1); and the sodium acetate (b1) was used at a content of 648 ppm in terms of acetic acid ion with respect to the total sum of the contents of the EVOH (a3), the sodium acetate (b1), the caprylic acid (c2), and the zinc caprylate (d2). The resultant EVOH resin composition and multilayer structure were evaluated in the same manner as in Example I-1.

Example I-24

An EVOH resin composition and a multilayer structure were produced in the same manner as in Example I-8 except that an EVOH (a4) [ethylene-vinyl alcohol copolymer having an ethylene structural unit content of 44 mol %, a saponification degree of 99.7 mol %, and a MFR of 3.5 g/10 min (210° C., load: 2,160 g)] was used instead of the EVOH (a1). The resultant EVOH resin composition and multilayer structure were evaluated in the same manner as in Example I-1.

Example I-25

An EVOH resin composition and a multilayer structure were produced in the same manner as in Example I-8 except that the caprylic acid (c2) was used at a content of 269 ppm in terms of carboxylic acid ion with respect to the total sum of the contents of the EVOH (a1), the sodium acetate (b1), the caprylic acid (c2), and the zinc caprylate (d2). The resultant EVOH resin composition and multilayer structure were evaluated in the same manner as in Example I-1.

Example I-26

An EVOH resin composition and a multilayer structure were produced in the same manner as in Example I-15 except that the lauric acid (c3) was used at a content of 355 ppm in terms of carboxylic acid ion with respect to the total sum of the contents of the EVOH (a1), the sodium acetate (b1), the lauric acid (c3), and the zinc laurate (d3). The resultant EVOH resin composition and multilayer structure were evaluated in the same manner as in Example I-1.

Comparative Example I-1

An EVOH resin composition and a multilayer structure were produced in the same manner as in Example I-1 except that the stearic acid (c1) and the zinc stearate (d1) were not used. The resultant EVOH resin composition and multilayer structure were evaluated in the same manner as in Example I-1.

Comparative Example I-2

An EVOH resin composition and a multilayer structure were produced in the same manner as in Example I-8 except that: an EVOH (a5) [ethylene-vinyl alcohol copolymer having an ethylene structural unit content of 29 mol %, a saponification degree of 99.7 mol %, and a MFR of 8.0 g/10 min (210° C., load: 2,160 g)] was used instead of the EVOH (a1); and the acetic acid and/or the salt thereof (B) was not incorporated. The resultant EVOH resin composition and multilayer structure were evaluated in the same manner as in Example I-1.

Comparative Example I-3

An EVOH resin composition and a multilayer structure were produced in the same manner as in Example I-1 except that: the stearic acid (c1) was used at a content of 29.2 ppm in terms of carboxylic acid ion with respect to the total sum of the contents of the EVOH (a1), the sodium acetate (b1), the stearic acid (c1), and the zinc stearate (d1); and the zinc stearate (d1) was used at a content of 600 ppm in terms of metal ion with respect to the total sum of the contents of the EVOH (a1), the sodium acetate (b1), the stearic acid (c1), and the zinc stearate (d1). The resultant EVOH resin composition and multilayer structure were evaluated in the same manner as in Example I-1.

Comparative Example I-4

An EVOH resin composition and a multilayer structure were produced in the same manner as in Example I-7 except that: the caprylic acid (c2) was used at a content of 82.8 ppm in terms of carboxylic acid ion with respect to the total sum of the contents of the EVOH (a1), the sodium acetate (b1), the caprylic acid (c2), and the zinc caprylate (d2); and the zinc caprylate (d2) was used at a content of 600 ppm in terms of metal ion with respect to the total sum of the contents of the EVOH (a1), the sodium acetate (b1), the caprylic acid (c2), and the zinc caprylate (d2). The resultant EVOH resin composition and multilayer structure were evaluated in the same manner as in Example I-1.

Comparative Example I-5

An EVOH resin composition and a multilayer structure were produced in the same manner as in Example I-14 except that: the lauric acid (c3) was used at a content of 21.4 ppm in terms of carboxylic acid ion with respect to the total sum of the contents of the EVOH (a1), the sodium acetate (b1), the lauric acid (c3), and the zinc laurate (d3); and the zinc laurate (d3) was used at a content of 600 ppm in terms of metal ion with respect to the total sum of the contents of the EVOH (a1), the sodium acetate (b1), the lauric acid (c3), and the zinc laurate (d3). The resultant EVOH resin composition and multilayer structure were evaluated in the same manner as in Example I-1.

Comparative Example I-6

An EVOH resin composition and a multilayer structure were produced in the same manner as in Example I-1 except that: the stearic acid (c1) was used at a content of 1.9 ppm in terms of carboxylic acid ion with respect to the total sum of the contents of the EVOH (a1), the sodium acetate (b1), the stearic acid (c1), and calcium stearate; and calcium stearate was used instead of the zinc stearate (d1) at a content of 50 ppm in terms of metal ion with respect to the total sum of the contents of the EVOH (a1), the sodium acetate (b1), the stearic acid (c1), and calcium stearate. The resultant EVOH resin composition and multilayer structure were evaluated in the same manner as in Example I-1.

Comparative Example I-7

An EVOH resin composition and a multilayer structure were produced in the same manner as in Example I-1 except that: the stearic acid (c1) was used at a content of 15.4 ppm in terms of carboxylic acid ion with respect to the total sum of the contents of the EVOH (a1), the sodium acetate (b1), the stearic acid (c1), and magnesium stearate; and magnesium stearate was used instead of the zinc stearate (d1) at a content of 50 ppm in terms of metal ion with respect to the total sum of the contents of the EVOH (a1), the sodium acetate (b1), the stearic acid (c1), and magnesium stearate. The resultant EVOH resin composition and multilayer structure were evaluated in the same manner as in Example I-1.

Comparative Example I-8

An EVOH resin composition and a multilayer structure were produced in the same manner as in Example I-1 except that: the stearic acid (c1) was used at a content of 3.3 ppm in terms of carboxylic acid ion with respect to the total sum of the contents of the EVOH (a1), the sodium acetate (b1), the stearic acid (c1), and sodium stearate; and sodium stearate was used instead of the zinc stearate (d1) at a content of 50 ppm in terms of metal ion with respect to the total sum of the contents of the EVOH (a1), the sodium acetate (b1), the stearic acid (c1), and sodium stearate. The resultant EVOH resin composition and multilayer structure were evaluated in the same manner as in Example I-1.

Comparative Example I-9

An EVOH resin composition and a multilayer structure were produced in the same manner as in Example I-1 except that: the stearic acid (c1) was used at a content of 484 ppm in terms of carboxylic acid ion with respect to the total sum of the contents of the EVOH (a1), the sodium acetate (b1), and the stearic acid (c1); and the zinc stearate (d1) was not used. The resultant EVOH resin composition and multilayer structure were evaluated in the same manner as in Example I-1.

Comparative Example I-10

An EVOH resin composition and a multilayer structure were produced in the same manner as in Example I-2 except that the stearic acid (c1) was used at a content of 484 ppm in terms of carboxylic acid ion with respect to the total sum of the contents of the EVOH (a1), the sodium acetate (b1), the stearic acid (c1), and the zinc stearate (d1). The resultant EVOH resin composition and multilayer structure were evaluated in the same manner as in Example I-1.

Comparative Example I-11

An EVOH resin composition and a multilayer structure were produced in the same manner as in Example I-2 except that the stearic acid (c1) was used at a content of 0.4 ppm in terms of carboxylic acid ion with respect to the total sum of the contents of the EVOH (a1), the sodium acetate (b1), the stearic acid (c1), and the zinc stearate (d1). The resultant EVOH resin composition and multilayer structure were evaluated in the same manner as in Example I-1.

Comparative Example I-12

An EVOH resin composition and a multilayer structure were produced in the same manner as in Example I-2 except that zinc gluconate trihydrate was used instead of the zinc stearate (d1) at a content of 50 ppm in terms of metal ion with respect to the total sum of the contents of the EVOH (a1), the sodium acetate (b1), the stearic acid (c1), and zinc gluconate trihydrate. The resultant EVOH resin composition and multilayer structure were evaluated in the same manner as in Example I-1.

Comparative Example I-13

An EVOH resin composition and a multilayer structure were produced in the same manner as in Example I-2 except that zinc citrate dihydrate was used instead of the zinc stearate (d1) at a content of 50 ppm in terms of metal ion with respect to the total sum of the contents of the EVOH (a1), the sodium acetate (b1), the stearic acid (c1), and zinc citrate dihydrate. The resultant EVOH resin composition and multilayer structure were evaluated in the same manner as in Example I-1.

Comparative Example I-14

An EVOH resin composition and a multilayer structure were produced in the same manner as in Example I-2 except that calcium gluconate monohydrate was used instead of the zinc stearate (d1) at a content of 50 ppm in terms of metal ion with respect to the total sum of the contents of the EVOH (a1), the sodium acetate (b1), the stearic acid (c1), and calcium gluconate monohydrate. The resultant EVOH resin composition and multilayer structure were evaluated in the same manner as in Example I-1.

Comparative Example I-15

An EVOH resin composition and a multilayer structure were produced in the same manner as in Example I-2 except that calcium citrate tetrahydrate was used instead of the zinc stearate (d1) at a content of 50 ppm in terms of metal ion with respect to the total sum of the contents of the EVOH (a1), the sodium acetate (b1), the stearic acid (c1), and calcium citrate tetrahydrate. The resultant EVOH resin composition and multilayer structure were evaluated in the same manner as in Example I-1.

TABLE I-1-1

| | Composition | Ethylene content of EVOH (A) (mol %) | Content of acetic acid and/or acetic acid salt (B) (in terms of acetic acid ion) [ppm] | Aliphatic carboxylic acid (C) | Content of (C) (in terms of carboxylic acid ion) [ppm] | Aliphatic carboxylic acid metal salt (D) | Content of (D) (in terms of metal ion) [ppm] | Content of phosphoric acid and/or phosphoric acid salt (E) (in terms of phosphorus) [ppm] |
|---|---|---|---|---|---|---|---|---|
| Example I-1 | Composition 1 | 29 | 432 | Stearic acid | 1.0 | Zinc stearate | 20 | 0 |
| Example I-2 | Composition 2 | 29 | 432 | Stearic acid | 2.4 | Zinc stearate | 50 | 0 |
| Example I-3 | Composition 3 | 29 | 432 | Stearic acid | 0.7 | Zinc stearate | 50 | 0 |
| Example I-4 | Composition 4 | 29 | 432 | Stearic acid | 4.9 | Zinc stearate | 100 | 0 |
| Example I-5 | Composition 5 | 29 | 324 | Stearic acid | 4.9 | Zinc stearate | 100 | 54 |
| Example I-6 | Composition 6 | 29 | 432 | Stearic acid | 9.7 | Zinc stearate | 200 | 0 |
| Example I-7 | Composition 7 | 29 | 432 | Caprylic acid | 2.8 | Zinc caprylate | 20 | 0 |
| Example I-8 | Composition 8 | 29 | 432 | Caprylic acid | 6.9 | Zinc caprylate | 50 | 0 |
| Example I-9 | Composition 9 | 29 | 432 | Caprylic acid | 6.9 | Zinc caprylate | 50 | 0 |
| Example I-10 | Composition 10 | 29 | 432 | Caprylic acid | 13.8 | Zinc caprylate | 100 | 0 |
| Example I-11 | Composition 11 | 29 | 324 | Caprylic acid | 13.8 | Zinc caprylate | 100 | 54 |
| Example I-12 | Composition 12 | 29 | 100 | Caprylic acid | 13.8 | Zinc caprylate | 100 | 12.4 |
| Example I-13 | Composition 13 | 29 | 432 | Caprylic acid | 27.6 | Zinc caprylate | 200 | 0 |
| Example I-14 | Composition 14 | 29 | 432 | Lauric acid | 0.7 | Zinc laurate | 20 | 0 |
| Example I-15 | Composition 15 | 29 | 432 | Lauric acid | 1.8 | Zinc laurate | 50 | 0 |
| Example I-16 | Composition 16 | 29 | 432 | Lauric acid | 3.6 | Zinc laurate | 100 | 0 |
| Example I-17 | Composition 17 | 29 | 324 | Lauric acid | 3.6 | Zinc laurate | 100 | 54 |
| Example I-18 | Composition 18 | 29 | 432 | Lauric acid | 7.1 | Zinc laurate | 200 | 0 |
| Example I-19 | Composition 19 | 29 | 432 | Caproic acid | 9.4 | Zinc caproate | 50 | 0 |
| Example I-20 | Composition 20 | 29 | 324 | Caproic acid | 18.8 | Zinc caproate | 100 | 54 |
| Example I-21 | Composition 21 | 29 | 432 | Behenic acid | 2.9 | Zinc behenate | 50 | 0 |
| Example I-22 | Composition 22 | 29 | 324 | Behenic acid | 5.7 | Zinc behenate | 100 | 54 |
| Example I-23 | Composition 23 | 25 | 648 | Caprylic acid | 6.9 | Zinc caprylate | 50 | 0 |
| Example I-24 | Composition 24 | 44 | 432 | Caprylic acid | 6.9 | Zinc caprylate | 50 | 0 |
| Example I-25 | Composition 25 | 29 | 432 | Caprylic acid | 269 | Zinc caprylate | 50 | 0 |
| Example I-26 | Composition 26 | 29 | 432 | Lauric acid | 355 | Zinc laurate | 50 | 0 |
| Comparative Example I-1 | Composition 27 | 29 | 432 | — | 0 | — | 0 | 0 |
| Comparative Example I-2 | Composition 28 | 29 | 0 | Caprylic acid | 6.9 | Zinc caprylate | 50 | 0 |
| Comparative Example I-3 | Composition 29 | 29 | 432 | Stearic acid | 29.2 | Zinc stearate | 600 | 0 |
| Comparative Example I-4 | Composition 30 | 29 | 432 | Caprylic acid | 82.8 | Zinc caprylate | 600 | 0 |
| Comparative Example I-5 | Composition 31 | 29 | 432 | Lauric acid | 21.4 | Zinc laurate | 600 | 0 |

TABLE I-1-1-continued

| | Composition | Ethylene content of EVOH (A) (mol %) | Content of acetic acid and/or acetic acid salt (B) (in terms of acetic acid ion) [ppm] | Aliphatic carboxylic acid (C) | Content of (C) (in terms of carboxylic acid ion) [ppm] | Aliphatic carboxylic acid metal salt (D) | Content of (D) (in terms of metal ion) [ppm] | Content of phosphoric acid and/or phosphoric acid salt (E) (in terms of phosphorus) [ppm] |
|---|---|---|---|---|---|---|---|---|
| Comparative Example I-6 | Composition 32 | 29 | 432 | Stearic acid | 1.9 | Calcium stearate | 50 | 0 |
| Comparative Example I-7 | Composition 33 | 29 | 432 | Stearic acid | 15.4 | Magnesium stearate | 50 | 0 |
| Comparative Example I-8 | Composition 34 | 29 | 432 | Stearic acid | 3.3 | Sodium stearate | 50 | 0 |
| Comparative Example I-9 | Composition 35 | 29 | 432 | Stearic acid | 484 | — | 0 | 0 |
| Comparative Example I-10 | Composition 36 | 29 | 432 | Stearic acid | 484 | Zinc stearate | 50 | 0 |
| Comparative Example I-11 | Composition 37 | 29 | 432 | Stearic acid | 0.4 | Zinc stearate | 50 | 0 |
| Comparative Example I-12 | Composition 38 | 29 | 432 | Stearic acid | 2.4 | Zinc gluconate trihydrate | 50 | 0 |
| Comparative Example I-13 | Composition 39 | 29 | 432 | Stearic acid | 2.4 | Zinc citrate dihydrate | 50 | 0 |
| Comparative Example I-14 | Composition 40 | 29 | 432 | Stearic acid | 2.4 | Calcium gluconate monohydrate | 50 | 0 |
| Comparative Example I-15 | Composition 41 | 29 | 432 | Stearic acid | 2.4 | Calcium citrate tetrahydrate | 50 | 0 |

TABLE I-1-2

| | Composition | (D)/(B) | (D)/(C) | (B)/(C) | Elongation viscosity [Pa · s] (210° C., 100 s$^{-1}$) | Impact strength [kgf · cm] | Color tone stability (air atmosphere, 210° C., 2 hours) | Adhesive strength [N/15 mm] |
|---|---|---|---|---|---|---|---|---|
| Example I-1 | Composition 1 | 0.05 | 20 | 432 | 4,640 | 17.13 | 57.32 | 7.20 |
| Example I-2 | Composition 2 | 0.12 | 20.83 | 180 | 4,640 | 17.39 | 53.44 | 7.15 |
| Example I-3 | Composition 3 | 0.12 | 71.43 | 617.14 | 4,640 | 16.23 | 51.06 | 6.97 |
| Example I-4 | Composition 4 | 0.23 | 20.41 | 88.16 | 4,640 | 17.59 | 48.16 | 6.98 |
| Example I-5 | Composition 5 | 0.31 | 20.41 | 66.12 | 5,327 | 17.78 | 64.6 | 6.91 |
| Example I-6 | Composition 6 | 0.46 | 20.62 | 44.54 | 4,640 | 17.79 | 45 | 6.37 |
| Example I-7 | Composition 7 | 0.05 | 7.14 | 154.29 | 4,640 | 17.7 | 59.34 | 7.21 |
| Example I-8 | Composition 8 | 0.12 | 7.25 | 62.61 | 4,640 | 18.01 | 57.81 | 7.19 |
| Example I-9 | Composition 9 | 0.12 | 7.25 | 62.61 | 25,852 | 16.28 | 54.31 | 7.16 |
| Example I-10 | Composition 10 | 0.23 | 7.25 | 31.3 | 4,640 | 18.25 | 55.37 | 7.13 |
| Example I-11 | Composition 11 | 0.31 | 7.25 | 23.48 | 5,327 | 18.4 | 64.75 | 7.07 |
| Example I-12 | Composition 12 | 1 | 7.25 | 7.25 | 3,008 | 18.29 | 57.53 | 7.12 |
| Example I-13 | Composition 13 | 0.46 | 7.25 | 15.65 | 4,640 | 18.49 | 50.95 | 6.93 |
| Example I-14 | Composition 14 | 0.05 | 28.57 | 617.14 | 4,640 | 17.41 | 58.53 | 7.21 |
| Example I-15 | Composition 15 | 0.12 | 27.78 | 240 | 4,640 | 17.70 | 56.06 | 7.17 |
| Example I-16 | Composition 16 | 0.23 | 27.78 | 120 | 4,640 | 17.92 | 52.49 | 7.08 |
| Example I-17 | Composition 17 | 0.31 | 27.78 | 90 | 5,327 | 18.10 | 67.77 | 7.01 |
| Example I-18 | Composition 18 | 0.46 | 28.17 | 60.85 | 4,640 | 18.14 | 47.42 | 6.74 |
| Example I-19 | Composition 19 | 0.12 | 5.32 | 45.96 | 4,640 | 18.23 | 57.69 | 7.20 |
| Example I-20 | Composition 20 | 0.31 | 5.32 | 17.23 | 5,327 | 18.64 | 69.74 | 7.09 |
| Example I-21 | Composition 21 | 0.12 | 17.24 | 148.97 | 4,640 | 17.13 | 54.39 | 7.20 |
| Example I-22 | Composition 22 | 0.31 | 17.54 | 56.84 | 5,327 | 17.52 | 65.75 | 6.83 |
| Example I-23 | Composition 23 | 0.08 | 7.25 | 93.91 | 3,801 | 17.98 | 56.07 | 7.30 |
| Example I-24 | Composition 24 | 0.12 | 7.25 | 62.61 | 4,900 | 18.18 | 61.69 | 7.20 |
| Example I-25 | Composition 25 | 0.12 | 0.19 | 1.61 | 4,640 | 15.45 | 52.37 | 7.20 |
| Example I-26 | Composition 26 | 0.12 | 0.14 | 1.22 | 4,640 | 15.15 | 50.77 | 7.20 |
| Comparative Example I-1 | Composition 27 | 0 | — | ∞ | 4,640 | 14.30 | 60.40 | 7.22 |
| Comparative Example I-2 | Composition 28 | ∞ | 7.25 | 0 | 2,278 | 17.33 | 57.69 | 2.70 |
| Comparative Example I-3 | Composition 29 | 1.39 | 20.55 | 14.79 | 4,640 | 18.10 | 42.40 | 3.11 |
| Comparative Example I-4 | Composition 30 | 1.39 | 7.25 | 5.22 | 4,640 | 18.87 | 49.10 | 4.97 |
| Comparative Example I-5 | Composition 31 | 1.39 | 28.04 | 20.19 | 4,640 | 18.48 | 45.11 | 3.38 |
| Comparative Example I-6 | Composition 32 | 0.12 | 26.32 | 227.37 | 4,640 | 14.24 | 52.19 | 7.20 |

TABLE I-1-2-continued

|  | Composition | (D)/(B) | (D)/(C) | (B)/(C) | Elongation viscosity [Pa · s] (210° C., 100 s⁻¹) | Impact strength [kgf · cm] | Color tone stability (air atmosphere, 210° C., 2 hours) | Adhesive strength [N/15 mm] |
|---|---|---|---|---|---|---|---|---|
| Comparative Example I-7 | Composition 33 | 0.12 | 3.25 | 28.05 | 4,640 | 13.91 | 47.69 | 7.20 |
| Comparative Example I-8 | Composition 34 | 0.12 | 15.15 | 130.91 | 4,640 | 14.44 | 57.69 | 7.40 |
| Comparative Example I-9 | Composition 35 | 0 | 0 | 0.89 | 4,640 | 13.93 | 53.15 | 7.20 |
| Comparative Example I-10 | Composition 36 | 0.12 | 0.1 | 0.89 | 4,640 | 14.75 | 48.47 | 7.20 |
| Comparative Example I-11 | Composition 37 | 0.12 | 125 | 1,080 | 4,640 | 15.04 | 48.63 | 6.79 |
| Comparative Example I-12 | Composition 38 | 0.12 | 20.83 | 180 | 4,640 | 12.26 | 15.14 | 5.30 |
| Comparative Example I-13 | Composition 39 | 0.12 | 20.83 | 180 | 4,640 | 10.96 | 42.74 | 5.50 |
| Comparative Example I-14 | Composition 40 | 0.12 | 20.83 | 180 | 4,640 | 12.16 | 20.94 | 5.00 |
| Comparative Example I-15 | Composition 41 | 0.12 | 20.83 | 180 | 4,640 | 10.66 | 44.74 | 4.90 |

Example I-27

An EVOH resin composition and a multilayer structure were produced in the same manner as in Example I-2 except that the layers 5 outside and inside the EVOH resin composition layer were asymmetrically arranged so that the thicknesses (μm) of the respective layers of the multilayer structure were 17/5/15/5/58. The impact strength of the resultant multilayer structure was evaluated in the same manner as in Example I-2. The result is shown in Table I-2. In addition, the gas barrier property thereof was evaluated under the following conditions.

<Gas Barrier Property (OTR) of Multilayer Structure>

The gas barrier property of the multilayer structure obtained in the foregoing at a temperature of 23° C.; and relative humidities "(outside)/(inside)" of 50% RH/90% RH was evaluated with an oxygen gas permeation amount-measuring apparatus (manufactured by MOCON Inc., OX-TRAN 2/21). The result is shown in Table I-2.

Example I-28

A multilayer structure was produced by using the EVOH resin composition (composition 2) produced in Example I-2 under the following conditions. The impact strength of the resultant multilayer structure was evaluated in the same manner as in Example I-2, and the gas barrier property thereof was evaluated in the same manner as in Example I-27.

[Multilayer Structure Production 2]

The EVOH resin composition prepared in the foregoing, linear low-density polyethylene (LLDPE) ["UF240" manufactured by Japan Polyethylene Corporation, MFR: 2.1 g/10 min (190° C., load: 2,160 g)], and an adhesive resin ("PL-EXAR PX3236" manufactured by LyondellBasell Industries N.V., MFR: 2.0 g/10 min [190° C., load: 2,160 g]) were supplied to a three-kind and five-layer multilayer coextrusion cast film-forming apparatus, and were subjected to multilayer coextrusion under the following conditions to provide a multilayer structure (film) of a three-kind and three-layer structure "EVOH resin composition layer (α)/adhesive resin layer (82)/LLDPE layer (52)." The thicknesses (μm) of the respective layers of the multilayer structure were 15/5/80. All the die temperatures of forming apparatus were set to 210° C.

(Multilayer Coextrusion Conditions 2)

Upper layer extruder (EVOH resin composition): 40 mmφ single-screw extruder (barrel temperature: 210° C.)

Intermediate layer extruder (adhesive resin): 32 mmφ single-screw extruder (barrel temperature: 210° C.)

Lower layer extruder (LLDPE): 40 mmφ single-screw extruder (barrel temperature: 210° C.)

Die: three-kind and five-layer feed block-type T-die (die temperature: 210° C.)

Drawing speed: 9.0 m/min

Roll temperature: 80° C.

Example I-29

An EVOH resin composition and a multilayer structure were produced in the same manner as in Example I-27 except that the EVOH resin composition (composition 8) produced in Example I-8 was used instead of the EVOH resin composition (composition 2) produced in Example I-2. The resultant multilayer structure was evaluated in the same manner as in Example I-27.

Example I-30

An EVOH resin composition and a multilayer structure were produced in the same manner as in Example I-28 except that the EVOH resin composition (composition 8) produced in Example I-8 was used instead of the EVOH resin composition (composition 2) produced in Example I-2. The resultant multilayer structure was evaluated in the same manner as in Example I-28.

Example I-31

An EVOH resin composition and a multilayer structure were produced in the same manner as in Example I-27 except that the EVOH resin composition (composition 15) produced in Example I-15 was used instead of the EVOH resin composition (composition 2) produced in Example I-2. The resultant multilayer structure was evaluated in the same manner as in Example I-27.

Example I-32

An EVOH resin composition and a multilayer structure were produced in the same manner as in Example I-28 other than that the EVOH resin composition (composition 15) produced in Example I-15 was used instead of the EVOH resin composition (composition 2) produced in Example I-2. The resultant multilayer structure was evaluated in the same manner as in Example I-28.

Example I-33

An EVOH resin composition and a multilayer structure were produced in the same manner as in Example I-27 except that the EVOH resin composition (composition 21) produced in Example I-21 was used instead of the EVOH resin composition (composition 2) produced in Example I-2. The resultant multilayer structure was evaluated in the same manner as in Example I-27.

Example I-34

An EVOH resin composition and a multilayer structure were produced in the same manner as in Example I-28 except that the EVOH resin composition (composition 21) produced in Example I-21 was used instead of the EVOH resin composition (composition 2) produced in Example I-2. The resultant multilayer structure was evaluated in the same manner as in Example I-28.

Comparative Example I-16

An EVOH resin composition and a multilayer structure were produced in the same manner as in Example I-27 except that the EVOH resin composition (composition 27) produced in Comparative Example I-1 was used instead of the EVOH resin composition (composition 2) produced in Example I-2. The resultant multilayer structure was evaluated in the same manner as in Example I-27.

Comparative Example I-17

An EVOH resin composition and a multilayer structure were produced in the same manner as in Example I-28 except that the EVOH resin composition (composition 27) produced in Comparative Example I-1 was used instead of the EVOH resin composition (composition 2) produced in Example I-2. The resultant multilayer structure was evaluated in the same manner as in Example I-28.

Comparative Example I-18

An EVOH resin composition and a multilayer structure were produced in the same manner as in Example I-27 except that the EVOH resin composition (composition 32) produced in Comparative Example I-6 was used instead of the EVOH resin composition (composition 2) produced in Example I-2. The resultant multilayer structure was evaluated in the same manner as in Example I-27.

Comparative Example I-19

An EVOH resin composition and a multilayer structure were produced in the same manner as in Example I-27 except that the EVOH resin composition (composition 33) produced in Comparative Example I-7 was used instead of the EVOH resin composition (composition 2) produced in Example I-2. The resultant multilayer structure was evaluated in the same manner as in Example I-27.

Comparative Example I-20

An EVOH resin composition and a multilayer structure were produced in the same manner as in Example I-27 except that the EVOH resin composition (composition 34) produced in Comparative Example I-8 was used instead of the EVOH resin composition (composition 2) produced in Example I-2. The resultant multilayer structure was evaluated in the same manner as in Example I-27.

Comparative Example I-21

An EVOH resin composition and a multilayer structure were produced in the same manner as in Example I-27 except that the EVOH resin composition (composition 36) produced in Comparative Example I-10 was used instead of the EVOH resin composition (composition 2) produced in Example I-2. The resultant multilayer structure was evaluated in the same manner as in Example I-27.

Comparative Example I-22

An EVOH resin composition and a multilayer structure were produced in the same manner as in Example I-27 except that the EVOH resin composition (composition 38) produced in Comparative Example I-12 was used instead of the EVOH resin composition (composition 2) produced in Example I-2. The resultant multilayer structure was evaluated in the same manner as in Example I-27.

Comparative Example I-23

An EVOH resin composition and a multilayer structure were produced in the same manner as in Example I-28 except that the EVOH resin composition (composition 38) produced in Comparative Example I-12 was used instead of the EVOH resin composition (composition 2) produced in Example I-2. The resultant multilayer structure was evaluated in the same manner as in Example I-28.

Comparative Example I-24

An EVOH resin composition and a multilayer structure were produced in the same manner as in Example I-27 except that the EVOH resin composition (composition 39) produced in Comparative Example I-13 was used instead of the EVOH resin composition (composition 2) produced in Example I-2. The resultant multilayer structure was evaluated in the same manner as in Example I-27.

Comparative Example I-25

An EVOH resin composition and a multilayer structure were produced in the same manner as in Example I-28 except that the EVOH resin composition (composition 39) produced in Comparative Example I-13 was used instead of the EVOH resin composition (composition 2) produced in Example I-2. The resultant multilayer structure was evaluated in the same manner as in Example I-28.

TABLE I-2

|  | Composition | (Outside) δ1 layer [μm] | β1 layer [μm] | α1 layer [μm] | β2 layer [μm] | (Inside) δ2 layer [μm] | α/β | α/δ | Impact strength [kgf · cm] | OTR [cc. 20 μm/m², day · atm] 23° C., (outside)/ (inside) = 50% RH/90% RH |
|---|---|---|---|---|---|---|---|---|---|---|
| Example I-2 | Composition 2 | 37.5 | 5 | 15 | 5 | 37.5 | 3 | 0.4 | 17.39 | 0.37 |
| Example I-27 | Composition 2 | 17 | 5 | 15 | 5 | 58 | 3 | 0.27 | 16.08 | 0.14 |
| Example I-28 | Composition 2 | — | — | 15 | 5 | 80 | 3 | 0.19 | 15.09 | 0.1 |
| Example I-8 | Composition 8 | 37.5 | 5 | 15 | 5 | 37.5 | 3 | 0.4 | 18.01 | 0.37 |
| Example I-29 | Composition 8 | 17 | 5 | 15 | 5 | 58 | 3 | 0.27 | 16.7 | 0.14 |
| Example I-30 | Composition 8 | — | — | 15 | 5 | 80 | 3 | 0.19 | 15.71 | 0.1 |
| Example I-15 | Composition 15 | 37.5 | 5 | 15 | 5 | 37.5 | 3 | 0.4 | 17.7 | 0.37 |
| Example I-31 | Composition 15 | 17 | 5 | 15 | 5 | 58 | 3 | 0.27 | 16.39 | 0.14 |
| Example I-32 | Composition 15 | — | — | 15 | 5 | 80 | 3 | 0.19 | 15.4 | 0.1 |
| Example I-21 | Composition 21 | 37.5 | 5 | 15 | 5 | 37.5 | 3 | 0.4 | 17.13 | 0.37 |
| Example I-33 | Composition 21 | 17 | 5 | 15 | 5 | 58 | 3 | 0.27 | 15.82 | 0.14 |
| Example I-34 | Composition 21 | — | — | 15 | 5 | 80 | 3 | 0.19 | 14.83 | 0.1 |
| Comparative Example I-1 | Composition 27 | 37.5 | 5 | 15 | 5 | 37.5 | 3 | 0.4 | 14.3 | 0.37 |
| Comparative Example I-16 | Composition 27 | 17 | 5 | 15 | 5 | 58 | 3 | 0.27 | 12.99 | 0.14 |
| Comparative Example I-17 | Composition 27 | — | — | 15 | 5 | 80 | 3 | 0.19 | 11.31 | 0.1 |
| Comparative Example I-18 | Composition 32 | 17 | 5 | 15 | 5 | 58 | 3 | 0.27 | 13.2 | 0.14 |
| Comparative Example I-19 | Composition 33 | 17 | 5 | 15 | 5 | 58 | 3 | 0.27 | 12.9 | 0.14 |
| Comparative Example I-20 | Composition 34 | 17 | 5 | 15 | 5 | 58 | 3 | 0.27 | 13.39 | 0.14 |
| Comparative Example I-21 | Composition 36 | 17 | 5 | 15 | 5 | 58 | 3 | 0.27 | 13.44 | 0.14 |
| Comparative Example I-22 | Composition 38 | 17 | 5 | 15 | 5 | 58 | 3 | 0.27 | 10.95 | 0.14 |
| Comparative Example I-23 | Composition 38 | — | — | 15 | 5 | 80 | 3 | 0.19 | 8.65 | 0.1 |
| Comparative Example I-24 | Composition 39 | 17 | 5 | 15 | 5 | 58 | 3 | 0.27 | 9.65 | 0.14 |
| Comparative Example I-25 | Composition 39 | — | — | 15 | 5 | 80 | 3 | 0.19 | 7.35 | 0.1 |

Example I-35

A multilayer structure was produced by using the EVOH resin composition (composition 2) produced in Example I-2 under the following conditions. The resultant EVOH resin composition and multilayer structure were evaluated in the same manner as in Example I-1. The results are shown in Table I-3.

[Multilayer Structure Production 3]

The EVOH resin composition prepared in the foregoing, linear low-density polyethylene (LLDPE) ["UF240" manufactured by Japan Polyethylene Corporation, MFR: 2.1 g/10 min (190° C., load: 2,160 g)], and polyamide (nylon 6 "1022B" manufactured by Ube Industries, Ltd.) were supplied to a three-kind and five-layer multilayer coextrusion cast film-forming apparatus, and were subjected to multilayer coextrusion under the following conditions to provide a multilayer structure (film) of a three-kind and five-layer structure "LLDPE layer (δ1)/polyamide layer (γ1)/EVOH resin composition layer (α)/polyamide layer (γ2)/LLDPE layer (δ2)." The thicknesses (μm) of the respective layers of the multilayer structure were 37.5/5/15/5/37.5. After that, the respective LLDPE layers of the resultant multilayer structure were peeled. Thus, a multilayer structure (film) of a two-kind and three-layer structure "polyamide layer (γ1)/EVOH resin composition layer (α)/polyamide layer (γ2)" was obtained. The thicknesses (μm) of the respective layers of the multilayer structure were 5/15/5. All the die temperatures of forming apparatus were set to 240° C.

(Multilayer Coextrusion Conditions 3)
Intermediate layer extruder (EVOH resin composition): 40 mmφ single-screw extruder (barrel temperature: 240° C.)
Upper and lower layer extruder (LLDPE): 40 mmφ single-screw extruder (barrel temperature: 240° C.)
Medium upper and lower layer extruder (polyamide): 32 mmφ single-screw extruder (barrel temperature: 240° C.)
Die: three-kind and five-layer feed block-type T-die (die temperature: 240° C.)
Drawing speed: 9.0 m/min
Roll temperature: 80° C.

Example I-36

A multilayer structure was produced in the same manner as in Example I-35 except that the EVOH resin composition (composition 8) produced in Example I-8 was used instead of the EVOH resin composition (composition 2) produced in Example I-2. The resultant EVOH resin composition and multilayer structure were evaluated in the same manner as in Example I-1.

Comparative Example I-26

A multilayer structure was produced in the same manner as in Example I-35 except that the EVOH resin composition (composition 27) produced in Comparative Example I-1 was used instead of the EVOH resin composition (composition 2) produced in Example I-2. The resultant EVOH resin composition and multilayer structure were evaluated in the same manner as in Example I-1.

TABLE I-3

|  | Composition | γ1 layer [μm] | α layer [μm] | γ2 layer [μm] | α/γ | Impact strength [kgf·cm] | Color tone stability (air atmosphere, 210° C., 2 hours) | Adhesive strength [N/15 mm] |
|---|---|---|---|---|---|---|---|---|
| Example I-35 | Composition 2 | 5 | 15 | 5 | 3 | 19.32 | 53.44 | —*1) |
| Example I-36 | Composition 8 | 5 | 15 | 5 | 3 | 19.55 | 57.81 | —*1) |
| Comparative Example I-26 | Composition 27 | 5 | 15 | 5 | 3 | 15.27 | 60.40 | —*1) |

*1)The polyamide layer and the EVOH resin composition layer were not peeled from each other.

In Comparative Examples I-1 and I-9 each of which was free of the aliphatic carboxylic acid metal salt (D), the impact strengths were 14.30 (kgf·cm) and 13.93 (kgf·cm), respectively. In contrast, in Comparative Example I-2 that contained the aliphatic carboxylic acid metal salt (D), and was free of the acetic acid and/or the salt thereof (B), the impact strength increased to 17.33 (kgf·cm). However, the adhesive strength reduced to 2.70 (N/15 mm).

In addition, in Comparative Examples I-3 to I-5 each of which did not satisfy the formula (1) specified in the present disclosure, the adhesive strengths were low. In Comparative Examples I-9 to I-11 each of which did not satisfy the formula (2) specified in the present disclosure, the impact strengths were low.

Further, also in Comparative Examples I-6 to I-8 in each of which the metal species of the aliphatic carboxylic acid metal salt (D) was not one kind selected from the long Periodic Table 4th-period d-block elements, the impact strengths were low.

In addition, in Comparative Examples I-12 to I-15 in each of which the aliphatic carboxylic acid (C) and the anion species of the aliphatic carboxylic acid metal salt (D) were not of the same species, the impact strengths and the adhesive strengths were low. In contrast, each of the EVOH resin compositions (compositions 1 to 26) each having the characteristic configuration of the present disclosure was not reduced in adhesive strength and showed an excellent value therefor while being excellent in impact strength (Examples I-1 to I-26). Further, each of the compositions was not reduced in color tone stability.

Further, even when the layers adjacent to the resin composition layer formed of any one of the EVOH resin compositions (compositions 1 to 26) each having the characteristic configuration of the present disclosure were the adhesive resin layers (Examples I-1 to I-26) or the polyamide layers (Examples I-35 and I-36), the EVOH resin composition was not reduced in adhesive strength and showed an excellent value therefor while being excellent in impact strength. Further, each of the compositions was not reduced in color tone stability.

In addition, each of the EVOH resin compositions (compositions 1 to 26) each having the characteristic configuration of the present disclosure showed excellent values for the impact strength and the gas barrier property even in the case of a configuration (Examples I-27 to I-34) in which the layers other than the EVOH resin composition layer were arranged so as to be asymmetrical to each other with respect thereto.

Packages were produced by using the multilayer structures of the respective Examples I obtained in the foregoing. Each of the resultant packages was excellent in impact resistance and adhesive strength, and was also excellent in color tone stability.

<<Second Mode in which EVOH Resin Composition Further Includes Boric Acid and/or Salt Thereof (F), and Satisfies the Formula (4)>>

Example II-1

[Production of EVOH Resin Composition]

A pellet of the EVOH (a1) [ethylene-vinyl alcohol copolymer having an ethylene structural unit content of 29 mol %, a saponification degree of 99.7 mol %, and a MFR of 3.8 g/10 min (210° C., load: 2,160 g)], which contained the EVOH (a1) as the EVOH (A), and contained the sodium acetate (b1) as the acetic acid and/or the salt thereof (B), was used. In addition, the stearic acid (c1) was used as the aliphatic carboxylic acid (C), the zinc stearate (d1) was used as the aliphatic carboxylic acid metal salt (D), and boric acid (f1) was used as the boric acid and/or the salt thereof (F).

In addition, with regard to the contents of the respective components, the sodium acetate (b1) was used at a content of 432 ppm in terms of acetic acid ion with respect to the total sum of the contents of the EVOH (a1), the sodium acetate (b1), the stearic acid (c1), the zinc stearate (d1), and the boric acid (f1), the stearic acid (c1) was used at a content of 1.0 ppm in terms of carboxylic acid ion with respect to the total sum of the contents of the EVOH (a1), the sodium acetate (b1), the stearic acid (c1), the zinc stearate (d1), and the boric acid (f1), the zinc stearate (d1) was used at a content of 20 ppm in terms of metal ion with respect to the total sum of the contents of the EVOH (a1), the sodium acetate (b1), the stearic acid (c1), the zinc stearate (d1), and the boric acid (f1), and the boric acid (f1) was used at a content of 59.4 ppm in terms of boron with respect to the total sum of the contents of the EVOH (a1), the sodium acetate (b1), the stearic acid (c1), the zinc stearate (d1), and the boric acid (f1). The pellet of the EVOH (a1), the stearic acid (c1), the zinc stearate (d1), and the boric acid (f1) were collectively dry-blended to produce an EVOH resin composition of the present disclosure.

[Multilayer Structure Production]

The EVOH resin composition prepared in the foregoing, linear low-density polyethylene (LLDPE) ["UF240" manufactured by Japan Polyethylene Corporation, MFR: 2.1 g/10 min (190° C., load: 2,160 g)], and an adhesive resin ("PLEXAR PX3236" manufactured by LyondellBasell Industries N.V., MFR: 2.0 g/10 min [190° C., load: 2,160 g]) were supplied to a three-kind and five-layer multilayer coextrusion cast film-forming apparatus, and were subjected to multilayer coextrusion under the following conditions to provide a multilayer structure (film) of a three-kind and five-layer structure "LLDPE layer/adhesive resin layer/EVOH resin composition layer/adhesive resin layer/LLDPE layer." The thicknesses (μm) of the respective layers of the multilayer structure were 37.5/5/15/5/37.5. All the die temperatures of forming apparatus were set to 210° C.

(Multilayer Coextrusion Conditions)
  Intermediate layer extruder (EVOH resin composition): 40 mmφ single-screw extruder (barrel temperature: 210° C.)
  Upper and lower layer extruder (LLDPE): 40 mmφ single-screw extruder (barrel temperature: 210° C.)
  Medium upper and lower layer extruder (adhesive resin): 32 mmφ single-screw extruder (barrel temperature: 210° C.)
  Die: three-kind and five-layer feed block-type T-die (die temperature: 210° C.)
  Drawing speed: 9.0 m/min
  Roll temperature: 80° C.

The EVOH resin composition obtained in the foregoing was subjected to the following color tone stability evaluation test and elongation viscosity evaluation test, and the multilayer structure obtained in the foregoing was subjected to the following impact strength evaluation test, adhesive strength evaluation test, and flow stability evaluation test.

<Color Tone Stability Evaluation of EVOH Resin Composition>

5 Grams of the EVOH resin composition produced in the foregoing was loaded into a 30 mmφ aluminum cup (manufactured by AS ONE Corporation, DISPODISH PP-724), and was left at rest under an air atmosphere at 210° C. for 2 hours to provide a sample. The sample was subjected to a color tone evaluation. The color tone evaluation was performed on the basis of the following apparatus and evaluation method.
  Used instrument: VISUAL ANALYZER IRISVA400 (manufactured by Alpha M.O.S. Japan K.K.)
  Data analysis software: Alpha Soft V14.3
  Objective lens: 25 mm (manufactured by Basler AG)
  Lighting mode: Upper and lower lighting
  Measurement method: The sample for a color tone evaluation was set in a tray in the chamber of the VISUAL ANALYZER, and a plane image of the entirety of the sample for a color tone evaluation was taken with a CCD camera. After that, the color pattern of the sample was evaluated by processing the image with the data analysis software. The color tone stability of the EVOH resin composition was evaluated from the lightness (L*) of a color having the highest abundance ratio among the resultant color pattern (main color). A higher numerical value of the color tone stability means that the composition is more excellent in color tone stability. In contrast, a lower numerical value thereof means that the composition is poorer in color tone stability. The result is shown in Table II-1-2.

<Evaluation of Elongation Viscosity (Pa·s) of EVOH Resin Composition>

The elongation viscosity (Pa·s) of the EVOH resin composition produced in the foregoing at 210° C.; and 100 s$^{-1}$ was evaluated by performing measurement with a capillary-type rheometer on the basis of Cogswell's equations [Polymer Engineering Science, vol. 12, pp. 64 to 73 (1972)], that is, the following equations (II5) to (II7) under the following conditions. The result is shown in Table II-1-2.

(Cogswell's Equations)

$$\eta_e = [9(n+1)^2 P_0^2]/[32\eta_s (d\gamma/dt)^2] \qquad \text{Equation (II5)}$$

$$d\varepsilon/dt = 4\sigma_s (d\gamma/dt)/[3(n+1)P_0] \qquad \text{Equation (II6)}$$

$$\sigma_s = k(d\gamma/dt)^n \qquad \text{Equation (II7)}$$

$\eta_e$: elongation viscosity (Pa·s)
$\eta_s$: shear viscosity (Pa·s)
$d\gamma/dt$: shear strain rate (s$^{-1}$)
$d\varepsilon/dt$: elongation strain rate (s$^{-1}$)
$\sigma_s$: shear stress (Pa)
"k" and "n": constants
$P_0$: pressure loss (Pa)

(Conditions for Measurement of Elongation Viscosity)
  Measuring apparatus: RHEOGRAPH 20 manufactured by Gottfert Werkstoff-Prufmaschinen GmbH
  Measurement temperature: 210° C.
  Preheating time: 10 minutes
  Long die: die having a length of 10 mm, a diameter of 1 mm, and an inlet angle of 180°
  Short die: die having a length of 0.2 mm, a diameter of 1 mm, and an inlet angle of 180°

<Impact Strength of Multilayer Structure>

The impact strength (kgf·cm) of the multilayer structure produced in the foregoing was evaluated with a YSS-type film impact tester (manufactured by Yasuda Seiki Seisakusho, Ltd., MODEL 181) under an atmosphere at 23° C.; and 50% RH. The measurement was performed a total of ten times, and the average of the measured values was evaluated as the impact strength of the multilayer structure. A clamp having an inner diameter of 60 mm and an impact ball having a radius of 12.7 mm were used, and the angle of fall of a pendulum was set to 90°. A higher numerical value of the impact strength of the multilayer structure means that the structure is more excellent in impact strength. In contrast, a lower numerical value thereof means that the structure is poorer in impact strength. The result is shown in Table II-1-2.

<Adhesive Strength of Multilayer Structure>

An adhesive strength (N/15 mm) between the EVOH resin composition layer and each adhesive resin layer in the multilayer structure produced in the foregoing was evaluated by the following T-peel peel test. The measurement was performed a total of ten times, and the average of the measured values was evaluated as the adhesive strength of the multilayer structure. A higher numerical value of the adhesive strength of the multilayer structure means that the structure is more excellent in adhesive strength. In contrast, a lower numerical value thereof means that the structure is poorer in adhesive strength. The result is shown in Table II-1-2.

(Conditions for T-peel Peel Test)
  Apparatus: Autograph AGS-H (manufactured by Shimadzu Corporation)
  Load cell: 500 N
  Test method: T-peel method (peeled in a T-shape)
  Test piece size: 15 mm in width
  Test speed: 300 mm/min <Flow Stability Evaluation of EVOH Resin Composition>

The flow stability of the EVOH resin composition was evaluated by visually observing the appearance of the multilayer structure produced in the foregoing on the basis of the following evaluation criteria. Higher flow stability of the EVOH resin composition means that the thickness of the EVOH layer in the multilayer structure becomes more uniform, and hence the appearance of the multilayer structure becomes more excellent. In contrast, lower flow stability of the EVOH resin composition means that the thickness of the EVOH layer in the multilayer structure becomes more nonuniform, and hence the appearance of the multilayer structure becomes poorer. The result is shown in Table II-1-2.

A: Substantially no stripe, haze, and fish eye are present in the entirety of the structure, and hence its appearance is significantly satisfactory.

B: A fine stripe, haze, and a fish eye are present in part of the structure.

C: A large stripe, haze, and a fish eye are present in the entirety of the structure.

D: An extremely large stripe, haze, and a fish eye are present in the entirety of the structure.

Example II-2

An EVOH resin composition and a multilayer structure were produced in the same manner as in Example II-1 other than that: the stearic acid (c1) was used at a content of 2.4 ppm in terms of carboxylic acid ion with respect to the total sum of the contents of the EVOH (a1), the sodium acetate (b1), the stearic acid (c1), the zinc stearate (d1), and the boric acid (f1); and the zinc stearate (d1) was used at a content of 50 ppm in terms of metal ion with respect to the total sum of the contents of the EVOH (a1), the sodium acetate (b1), the stearic acid (c1), the zinc stearate (d1), and the boric acid (f1). The resultant EVOH resin composition and multilayer structure were evaluated in the same manner as in Example II-1.

Example II-3

An EVOH resin composition and a multilayer structure were produced in the same manner as in Example II-1 other than that: the stearic acid (c1) was used at a content of 0.7 ppm in terms of carboxylic acid ion with respect to the total sum of the contents of the EVOH (a1), the sodium acetate (b1), the stearic acid (c1), the zinc stearate (d1), and the boric acid (f1); and the zinc stearate (d1) was used at a content of 50 ppm in terms of metal ion with respect to the total sum of the contents of the EVOH (a1), the sodium acetate (b1), the stearic acid (c1), the zinc stearate (d1), and the boric acid (f1). The resultant EVOH resin composition and multilayer structure were evaluated in the same manner as in Example II-1.

Example II-4

An EVOH resin composition and a multilayer structure were produced in the same manner as in Example II-1 other than that: the stearic acid (c1) was used at a content of 4.9 ppm in terms of carboxylic acid ion with respect to the total sum of the contents of the EVOH (a1), the sodium acetate (b1), the stearic acid (c1), the zinc stearate (d1), and the boric acid (f1); and the zinc stearate (d1) was used at a content of 100 ppm in terms of metal ion with respect to the total sum of the contents of the EVOH (a1), the sodium acetate (b1), the stearic acid (c1), the zinc stearate (d1), and the boric acid (f1). The resultant EVOH resin composition and multilayer structure were evaluated in the same manner as in Example II-1.

Example II-5

An EVOH resin composition and a multilayer structure were produced in the same manner as in Example II-4 other than that: the sodium acetate (b1) was used at a content of 324 ppm in terms of acetic acid ion with respect to the total sum of the contents of the EVOH (a1), the sodium acetate (b1), the stearic acid (c1), the zinc stearate (d1), and the boric acid (f1); and the boric acid (f1) was used at a content of 115.4 ppm in terms of boron with respect to the total sum of the contents of the EVOH (a1), the sodium acetate (b1), the stearic acid (c1), the zinc stearate (d1), and the boric acid (f1). The resultant EVOH resin composition and multilayer structure were evaluated in the same manner as in Example II-1.

Example II-6

An EVOH resin composition and a multilayer structure were produced in the same manner as in Example II-1 other than that: the stearic acid (c1) was used at a content of 9.7 ppm in terms of carboxylic acid ion with respect to the total sum of the contents of the EVOH (a1), the sodium acetate (b1), the stearic acid (c1), the zinc stearate (d1), and the boric acid (f1); and the zinc stearate (d1) was used at a content of 200 ppm in terms of metal ion with respect to the total sum of the contents of the EVOH (a1), the sodium acetate (b1), the stearic acid (c1), the zinc stearate (d1), and the boric acid (f1). The resultant EVOH resin composition and multilayer structure were evaluated in the same manner as in Example II-1.

Example II-7

An EVOH resin composition and a multilayer structure were produced in the same manner as in Example II-1 other than that: the caprylic acid (c2) was used instead of the stearic acid (c1) at a content of 2.8 ppm in terms of carboxylic acid ion with respect to the total sum of the contents of the EVOH (a1), the sodium acetate (b1), the caprylic acid (c2), the zinc caprylate (d2), and the boric acid (f1); and the zinc caprylate (d2) was used instead of the zinc stearate (d1) at a content of 20 ppm in terms of metal ion with respect to the total sum of the contents of the EVOH (a1), the sodium acetate (b1), the caprylic acid (c2), the zinc caprylate (d2), and the boric acid (f1). The resultant EVOH resin composition and multilayer structure were evaluated in the same manner as in Example II-1.

Example II-8

An EVOH resin composition and a multilayer structure were produced in the same manner as in Example II-7 other than that: the caprylic acid (c2) was used at a content of 6.9 ppm in terms of carboxylic acid ion with respect to the total sum of the contents of the EVOH (a1), the sodium acetate (b1), the caprylic acid (c2), the zinc caprylate (d2), and the boric acid (f1); and the zinc caprylate (d2) was used at a content of 50 ppm in terms of metal ion with respect to the total sum of the contents of the EVOH (a1), the sodium acetate (b1), the caprylic acid (c2), the zinc caprylate (d2), and the boric acid (f1). The resultant EVOH resin composition and multilayer structure were evaluated in the same manner as in Example II-1.

Example II-9

An EVOH resin composition and a multilayer structure were produced in the same manner as in Example II-7 other than that: the caprylic acid (c2) was used at a content of 6.9 ppm in terms of carboxylic acid ion with respect to the total sum of the contents of the EVOH (a1), the sodium acetate (b1), the caprylic acid (c2), the zinc caprylate (d2), and the boric acid (f1); the zinc caprylate (d2) was used at a content of 50 ppm in terms of metal ion with respect to the total sum of the contents of the EVOH (a1), the sodium acetate (b1), the caprylic acid (c2), the zinc caprylate (d2), and the boric acid (f1); and the boric acid (f1) was used at a content of 300 ppm in terms of boron with respect to the total sum of the contents of the EVOH (a1), the sodium acetate (b1), the caprylic acid (c2), the zinc caprylate (d2), and the boric acid (f1). The resultant EVOH resin composition and multilayer structure were evaluated in the same manner as in Example II-1.

Example II-10

An EVOH resin composition and a multilayer structure were produced in the same manner as in Example II-7 other than that: the sodium acetate (b1) was used at a content of 326 ppm in terms of acetic acid ion with respect to the total sum of the contents of the EVOH (a1), the sodium acetate (b1), the caprylic acid (c2), the zinc caprylate (d2), and the boric acid (f1); the caprylic acid (c2) was used at a content of 6.9 ppm in terms of carboxylic acid ion with respect to the total sum of the contents of the EVOH (a1), the sodium acetate (b1), the caprylic acid (c2), the zinc caprylate (d2), and the boric acid (f1); the zinc caprylate (d2) was used at a content of 50 ppm in terms of metal ion with respect to the total sum of the contents of the EVOH (a1), the sodium acetate (b1), the caprylic acid (c2), the zinc caprylate (d2), and the boric acid (f1); and the boric acid (f1) was used at a content of 1.0 ppm in terms of boron with respect to the total sum of the contents of the EVOH (a1), the sodium acetate (b1), the caprylic acid (c2), the zinc caprylate (d2), and the boric acid (f1). The resultant EVOH resin composition and multilayer structure were evaluated in the same manner as in Example II-1.

Example II-11

An EVOH resin composition and a multilayer structure were produced in the same manner as in Example II-7 other than that: the caprylic acid (c2) was used at a content of 13.8 ppm in terms of carboxylic acid ion with respect to the total sum of the contents of the EVOH (a1), the sodium acetate (b1), the caprylic acid (c2), the zinc caprylate (d2), and the boric acid (f1); and the zinc caprylate (d2) was used at a content of 100 ppm in terms of metal ion with respect to the total sum of the contents of the EVOH (a1), the sodium acetate (b1), the caprylic acid (c2), the zinc caprylate (d2), and the boric acid (f1). The resultant EVOH resin composition and multilayer structure were evaluated in the same manner as in Example II-1.

Example II-12

An EVOH resin composition and a multilayer structure were produced in the same manner as in Example II-11 other than that: the sodium acetate (b1) was used at a content of 324 ppm in terms of acetic acid ion with respect to the total sum of the contents of the EVOH (a1), the sodium acetate (b1), the caprylic acid (c2), the zinc caprylate (d2), and the boric acid (f1); and the boric acid (f1) was used at a content of 115.4 ppm in terms of boron with respect to the total sum of the contents of the EVOH (a1), the sodium acetate (b1), the caprylic acid (c2), the zinc caprylate (d2), and the boric acid (f1). The resultant EVOH resin composition and multilayer structure were evaluated in the same manner as in Example II-1.

Example 11-13

An EVOH resin composition and a multilayer structure were produced in the same manner as in Example II-11 other than that: the sodium acetate (b1) was used at a content of 100 ppm in terms of acetic acid ion with respect to the total sum of the contents of the EVOH (a1), the sodium acetate (b1), the caprylic acid (c2), the zinc caprylate (d2), and the boric acid (f1); and the boric acid (f1) was used at a content of 13.7 ppm in terms of boron with respect to the total sum of the contents of the EVOH (a1), the sodium acetate (b1), the caprylic acid (c2), the zinc caprylate (d2), and the boric acid (f1). The resultant EVOH resin composition and multilayer structure were evaluated in the same manner as in Example II-1.

Example II-14

An EVOH resin composition and a multilayer structure were produced in the same manner as in Example II-7 other than that: the caprylic acid (c2) was used at a content of 27.6 ppm in terms of carboxylic acid ion with respect to the total sum of the contents of the EVOH (a1), the sodium acetate (b1), the caprylic acid (c2), the zinc caprylate (d2), and the boric acid (f1); and the zinc caprylate (d2) was used at a content of 200 ppm in terms of metal ion with respect to the total sum of the contents of the EVOH (a1), the sodium acetate (b1), the caprylic acid (c2), the zinc caprylate (d2), and the boric acid (f1). The resultant EVOH resin composition and multilayer structure were evaluated in the same manner as in Example II-1.

Example II-15

An EVOH resin composition and a multilayer structure were produced in the same manner as in Example II-1 other than that: the lauric acid (c3) was used instead of the stearic acid (c1) at a content of 0.7 ppm in terms of carboxylic acid ion with respect to the total sum of the contents of the EVOH (a1), the sodium acetate (b1), the lauric acid (c3), the zinc laurate (d3), and the boric acid (f1); and the zinc laurate (d3) was used instead of the zinc stearate (d1) at a content of 20 ppm in terms of metal ion with respect to the total sum of the contents of the EVOH (a1), the sodium acetate (b1), the lauric acid (c3), the zinc laurate (d3), and the boric acid (f1). The resultant EVOH resin composition and multilayer structure were evaluated in the same manner as in Example II-1.

Example II-16

An EVOH resin composition and a multilayer structure were produced in the same manner as in Example II-15 other than that: the lauric acid (c3) was used at a content of 1.8 ppm in terms of carboxylic acid ion with respect to the total sum of the contents of the EVOH (a1), the sodium acetate (b1), the lauric acid (c3), the zinc laurate (d3), and the boric acid (f1); and the zinc laurate (d3) was used at a content of 50 ppm in terms of metal ion with respect to the total sum of the contents of the EVOH (a1), the sodium acetate (b1), the lauric acid (c3), the zinc laurate (d3), and the boric acid (f1). The resultant EVOH resin composition and multilayer structure were evaluated in the same manner as in Example II-1.

Example 11-17

An EVOH resin composition and a multilayer structure were produced in the same manner as in Example II-15 other than that: the lauric acid (c3) was used at a content of 3.6 ppm in terms of carboxylic acid ion with respect to the total sum of the contents of the EVOH (a1), the sodium acetate (b1), the lauric acid (c3), the zinc laurate (d3), and the boric acid (f1); and the zinc laurate (d3) was used at a content of 100 ppm in terms of metal ion with respect to the total sum of the contents of the EVOH (a1), the sodium acetate (b1), the lauric acid (c3), the zinc laurate (d3), and the boric acid (f1). The resultant EVOH resin composition and multilayer structure were evaluated in the same manner as in Example II-1.

Example II-18

An EVOH resin composition and a multilayer structure were produced in the same manner as in Example II-17 other than that: the sodium acetate (b1) was used at a content of 324 ppm in terms of acetic acid ion with respect to the total sum of the contents of the EVOH (a1), the sodium acetate (b1), the lauric acid (c3), the zinc laurate (d3), and the boric acid (f1); and the boric acid (f1) was used at a content of 115.4 ppm in terms of boron with respect to the total sum of the contents of the EVOH (a1), the sodium acetate (b1), the lauric acid (c3), the zinc laurate (d3), and the boric acid (f1). The resultant EVOH resin composition and multilayer structure were evaluated in the same manner as in Example II-1.

Example II-19

An EVOH resin composition and a multilayer structure were produced in the same manner as in Example II-15 other than that: the lauric acid (c3) was used at a content of 7.1 ppm in terms of carboxylic acid ion with respect to the total sum of the contents of the EVOH (a1), the sodium acetate (b1), the lauric acid (c3), the zinc laurate (d3), and the boric acid (f1); and the zinc laurate (d3) was used at a content of 200 ppm in terms of metal ion with respect to the total sum of the contents of the EVOH (a1), the sodium acetate (b1), the lauric acid (c3), the zinc laurate (d3), and the boric acid (f1). The resultant EVOH resin composition and multilayer structure were evaluated in the same manner as in Example II-1.

Example II-20

An EVOH resin composition and a multilayer structure were produced in the same manner as in Example II-1 other than that: the caproic acid (c4) was used instead of the stearic acid (c1) at a content of 9.4 ppm in terms of carboxylic acid ion with respect to the total sum of the contents of the EVOH (a1), the sodium acetate (b1), the caproic acid (c4), the zinc caproate (d4), and the boric acid (f1); and the zinc caproate (d4) was used instead of the zinc stearate (d1) at a content of 50 ppm in terms of metal ion with respect to the total sum of the contents of the EVOH (a1), the sodium acetate (b1), the caproic acid (c4), the zinc caproate (d4), and the boric acid (f1). The resultant EVOH resin composition and multilayer structure were evaluated in the same manner as in Example II-1.

Example II-21

An EVOH resin composition and a multilayer structure were produced in the same manner as in Example II-20 other than that: the sodium acetate (b1) was used at a content of 324 ppm in terms of acetic acid ion with respect to the total sum of the contents of the EVOH (a1), the sodium acetate (b1), the caproic acid (c4), the zinc caproate (d4), and the boric acid (f1); the caproic acid (c4) was used at a content of 18.8 ppm in terms of carboxylic acid ion with respect to the total sum of the contents of the EVOH (a1), the sodium acetate (b1), the caproic acid (c4), the zinc caproate (d4), and the boric acid (f1); the zinc caproate (d4) was used at a content of 100 ppm in terms of metal ion with respect to the total sum of the contents of the EVOH (a1), the sodium acetate (b1), the caproic acid (c4), the zinc caproate (d4), and the boric acid (f1); and the boric acid (f1) was used at a content of 115.4 ppm in terms of boron with respect to the total sum of the contents of the EVOH (a1), the sodium acetate (b1), the caproic acid (c4), the zinc caproate (d4), and the boric acid (f1). The resultant EVOH resin composition and multilayer structure were evaluated in the same manner as in Example II-1.

Example II-22

An EVOH resin composition and a multilayer structure were produced in the same manner as in Example II-1 other than that: the behenic acid (c5) was used instead of the stearic acid (c1) at a content of 2.9 ppm in terms of carboxylic acid ion with respect to the total sum of the contents of the EVOH (a1), the sodium acetate (b1), the behenic acid (c5), the zinc behenate (d5), and the boric acid (f1); and the zinc behenate (d5) was used instead of the zinc stearate (d1) at a content of 50 ppm in terms of metal ion with respect to the total sum of the contents of the EVOH (a1), the sodium acetate (b1), the behenic acid (c5), the zinc behenate (d5), and the boric acid (f1). The resultant EVOH resin composition and multilayer structure were evaluated in the same manner as in Example II-1.

Example 11-23

An EVOH resin composition and a multilayer structure were produced in the same manner as in Example II-22 other than that: the sodium acetate (b1) was used at a content of 324 ppm in terms of acetic acid ion with respect to the total sum of the contents of the EVOH (a1), the sodium acetate (b1), the behenic acid (c5), the zinc behenate(d5), and the boric acid (f1); the behenic acid (c5) was used at a content of 5.7 ppm in terms of carboxylic acid ion with respect to the total sum of the contents of the EVOH (a1), the sodium acetate (b1), the behenic acid (c5), the zinc behenate (d5), and the boric acid (f1); the zinc behenate (d5) was used at a content of 100 ppm in terms of metal ion with respect to the total sum of the contents of the EVOH (a1), the sodium acetate (b1), the behenic acid (c5), the zinc behenate (d5), and the boric acid (f1); and the boric acid (f1) was used at a content of 115.4 ppm in terms of boron with respect to the total sum of the contents of the EVOH (a1), the sodium acetate (b1), the behenic acid (c5), the zinc behenate (d5), and the boric acid (f1). The resultant EVOH resin composition and multilayer structure were evaluated in the same manner as in Example II-1.

Example II-24

An EVOH resin composition and a multilayer structure were produced in the same manner as in Example II-8 other than that: the EVOH (a2) [ethylene-vinyl alcohol copolymer having an ethylene structural unit content of 25 mol %, a saponification degree of 99.7 mol %, and a MFR of 4.0 g/10 min (210° C., load: 2,160 g)] was used instead of the EVOH (a1); the sodium acetate (b1) was used at a content of 648 ppm in terms of acetic acid ion with respect to the total sum of the contents of the EVOH (a2), the sodium acetate (b1), the caprylic acid (c2), the zinc caprylate (d2), and the boric acid (f1); and the boric acid (f1) was used at a content of 76.9 ppm in terms of boron with respect to the total sum of the contents of the EVOH (a2), the sodium acetate (b1), the caprylic acid (c2), the zinc caprylate (d2), and the boric acid (f1). The resultant EVOH resin composition and multilayer structure were evaluated in the same manner as in Example II-1.

Example II-25

An EVOH resin composition and a multilayer structure were produced in the same manner as in Example II-8 other than that: the EVOH (a3) [ethylene-vinyl alcohol copolymer having an ethylene structural unit content of 44 mol %, a saponification degree of 99.7 mol %, and a MFR of 3.5 g/10 min (210° C., load: 2,160 g)] was used instead of the EVOH (a1); the sodium acetate (b1) was used at a content of 432 ppm in terms of acetic acid ion with respect to the total sum of the contents of the EVOH (a3), the sodium acetate (b1), the caprylic acid (c2), the zinc caprylate (d2), and the boric acid (f1); and the boric acid (f1) was used at a content of 124.1 ppm in terms of boron with respect to the total sum of the contents of the EVOH (a3), the sodium acetate (b1), the caprylic acid (c2), the zinc caprylate (d2), and the boric acid (f1). The resultant EVOH resin composition and multilayer structure were evaluated in the same manner as in Example II-1.

Example II-26

An EVOH resin composition and a multilayer structure were produced in the same manner as in Example II-8 other than that the caprylic acid (c2) was used at a content of 269 ppm in terms of carboxylic acid ion with respect to the total sum of the contents of the EVOH (a1), the sodium acetate (b1), the caprylic acid (c2), the zinc caprylate (d2), and the boric acid (f1). The resultant EVOH resin composition and multilayer structure were evaluated in the same manner as in Example II-1.

Example 11-27

An EVOH resin composition and a multilayer structure were produced in the same manner as in Example II-16 other than that the lauric acid (c3) was used at a content of 335 ppm in terms of carboxylic acid ion with respect to the total sum of the contents of the EVOH (a1), the sodium acetate (b1), the lauric acid (c3), the zinc laurate (d3), and the boric acid (f1). The resultant EVOH resin composition and multilayer structure were evaluated in the same manner as in Example II-1.

Comparative Example II-1

An EVOH resin composition and a multilayer structure were produced in the same manner as in Example II-1 other than that the stearic acid (c1) and the zinc stearate (d1) were not used. The resultant EVOH resin composition and multilayer structure were evaluated in the same manner as in Example II-1.

Comparative Example II-2

An EVOH resin composition and a multilayer structure were produced in the same manner as in Example II-8 other than that: the EVOH (a4) [ethylene-vinyl alcohol copolymer having an ethylene structural unit content of 29 mol %, a saponification degree of 99.7 mol %, and a MFR of 8.0 g/10 min (210° C., load: 2,160 g)] was used instead of the EVOH (a1); and the acetic acid and/or the salt thereof (B) and the boric acid and/or the salt thereof (F) were not incorporated. The resultant EVOH resin composition and multilayer structure were evaluated in the same manner as in Example II-1.

Comparative Example II-3

An EVOH resin composition and a multilayer structure were produced in the same manner as in Example II-8 other than that the boric acid (f1) was used at a content of 524.6 ppm in terms of boron with respect to the total sum of the contents of the EVOH (a1), the sodium acetate (b1), the caprylic acid (c2), the zinc caprylate (d2), and the boric acid (f1). The resultant EVOH resin composition and multilayer structure were evaluated in the same manner as in Example II-1.

Comparative Example II-4

An EVOH resin composition and a multilayer structure were produced in the same manner as in Example II-8 other than that the boric acid (f1) was used at a content of 0.26 ppm in terms of boron with respect to the total sum of the contents of the EVOH (a1), the sodium acetate (b1), the caprylic acid (c2), the zinc caprylate (d2), and the boric acid (f1). The resultant EVOH resin composition and multilayer structure were evaluated in the same manner as in Example II-1.

Comparative Example II-5

An EVOH resin composition and a multilayer structure were produced in the same manner as in Example II-1 other than that: the stearic acid (c1) was used at a content of 29.2 ppm in terms of carboxylic acid ion with respect to the total sum of the contents of the EVOH (a1), the sodium acetate (b1), the stearic acid (c1), the zinc stearate (d1), and the boric acid (f1); and the zinc stearate (d1) was used at a content of 600 ppm in terms of metal ion with respect to the total sum of the contents of the EVOH (a1), the sodium acetate (b1), the stearic acid (c1), the zinc stearate (d1), and the boric acid (f1). The resultant EVOH resin composition and multilayer structure were evaluated in the same manner as in Example II-1.

Comparative Example II-6

An EVOH resin composition and a multilayer structure were produced in the same manner as in Example II-7 other than that: the caprylic acid (c2) was used at a content of 82.8 ppm in terms of carboxylic acid ion with respect to the total sum of the contents of the EVOH (a1), the sodium acetate (b1), the caprylic acid (c2), the zinc caprylate (d2), and the boric acid (f1); and the zinc caprylate (d2) was used at a content of 600 ppm in terms of metal ion with respect to the total sum of the contents of the EVOH (a1), the sodium acetate (b1), the caprylic acid (c2), the zinc caprylate (d2), and the boric acid (f1). The resultant EVOH resin composition and multilayer structure were evaluated in the same manner as in Example II-1.

Comparative Example II-7

An EVOH resin composition and a multilayer structure were produced in the same manner as in Example II-15 other than that: the lauric acid (c3) was used at a content of 21.4 ppm in terms of carboxylic acid ion with respect to the total sum of the contents of the EVOH (a1), the sodium acetate (b1), the lauric acid (c3), the zinc laurate (d3), and the boric acid (f1); and the zinc laurate (d3) was used at a content of 600 ppm in terms of metal ion with respect to the total sum of the contents of the EVOH (a1), the sodium acetate (b1), the lauric acid (c3), the zinc laurate (d3), and the boric acid (f1). The resultant EVOH resin composition and multilayer structure were evaluated in the same manner as in Example II-1.

Comparative Example II-8

An EVOH resin composition and a multilayer structure were produced in the same manner as in Example II-1 other than that: the stearic acid (c1) was used at a content of 1.9 ppm in terms of carboxylic acid ion with respect to the total sum of the contents of the EVOH (a1), the sodium acetate (b1), the stearic acid (c1), calcium stearate, and the boric acid (f1); and calcium stearate was used instead of the zinc stearate (d1) at a content of 50 ppm in terms of metal ion with respect to the total sum of the contents of the EVOH (a1), the sodium acetate (b1), the stearic acid (c1), calcium stearate, and the boric acid (f1). The resultant EVOH resin composition and multilayer structure were evaluated in the same manner as in Example II-1.

Comparative Example II-9

An EVOH resin composition and a multilayer structure were produced in the same manner as in Example II-1 other than that: the stearic acid (c1) was used at a content of 15.4 ppm in terms of carboxylic acid ion with respect to the total sum of the contents of the EVOH (a1), the sodium acetate (b1), the stearic acid (c1), magnesium stearate, and the boric acid (f1); and magnesium stearate was used instead of the zinc stearate (d1) at a content of 50 ppm in terms of metal ion with respect to the total sum of the contents of the EVOH (a1), the sodium acetate (b1), the stearic acid (c1), magnesium stearate, and the boric acid (f1). The resultant EVOH resin composition and multilayer structure were evaluated in the same manner as in Example II-1.

Comparative Example II-10

An EVOH resin composition and a multilayer structure were produced in the same manner as in Example II-1 other than that: the stearic acid (c1) was used at a content of 3.3 ppm in terms of carboxylic acid ion with respect to the total sum of the contents of the EVOH (a1), the sodium acetate (b1), the stearic acid (c1), sodium stearate, and the boric acid (f1); and sodium stearate was used instead of the zinc stearate (d1) at a content of 50 ppm in terms of metal ion with respect to the total sum of the contents of the EVOH (a1), the sodium acetate (b1), the stearic acid (c1), sodium stearate, and the boric acid (f1). The resultant EVOH resin composition and multilayer structure were evaluated in the same manner as in Example II-1.

Comparative Example II-11

An EVOH resin composition and a multilayer structure were produced in the same manner as in Example II-1 other than that: the stearic acid (c1) was used at a content of 484 ppm in terms of carboxylic acid ion with respect to the total sum of the contents of the EVOH (a1), the sodium acetate (b1), the stearic acid (c1), and the boric acid (f1); and the zinc stearate (d1) was not used. The resultant EVOH resin composition and multilayer structure were evaluated in the same manner as in Example II-1.

Comparative Example II-12

An EVOH resin composition and a multilayer structure were produced in the same manner as in Example II-2 other than that the stearic acid (c1) was used at a content of 4 84 ppm in terms of carboxylic acid ion with respect to the total sum of the contents of the EVOH (α1), the sodium acetate (b1), the stearic acid (c1), the zinc stearate (d1), and the boric acid (f1). The resultant EVOH resin composition and multilayer structure were evaluated in the same manner as in Example II-1.

Comparative Example II-13

An EVOH resin composition and a multilayer structure were produced in the same manner as in Example II-2 other than that the stearic acid (c1) was used at a content of 0.4 ppm in terms of carboxylic acid ion with respect to the total sum of the contents of the EVOH (a1), the sodium acetate (b1), the stearic acid (c1), the zinc stearate (d1), and the boric acid (f1). The resultant EVOH resin composition and multilayer structure were evaluated in the same manner as in Example II-1.

Comparative Example II-14

An EVOH resin composition and a multilayer structure were produced in the same manner as in Example II-2 other than that zinc gluconate trihydrate was used instead of the zinc stearate (d1) at a content of 50 ppm in terms of metal ion with respect to the total sum of the contents of the EVOH (a1), the sodium acetate (b1), the stearic acid (c1), zinc gluconate trihydrate, and the boric acid (f1). The resultant EVOH resin composition and multilayer structure were evaluated in the same manner as in Example II-1.

Comparative Example II-15

An EVOH resin composition and a multilayer structure were produced in the same manner as in Example II-2 other than that zinc citrate dihydrate was used instead of the zinc stearate (d1) at a content of 50 ppm in terms of metal ion with respect to the total sum of the contents of the EVOH (a1), the sodium acetate (b1), the stearic acid (c1), zinc citrate dihydrate, and the boric acid (f1). The resultant EVOH resin composition and multilayer structure were evaluated in the same manner as in Example II-1.

Comparative Example II-16

An EVOH resin composition and a multilayer structure were produced in the same manner as in Example II-2 other than that calcium gluconate monohydrate was used instead of the zinc stearate (d1) at a content of 50 ppm in terms of metal ion with respect to the total sum of the contents of the EVOH (a1), the sodium acetate (b1), the stearic acid (c1), calcium gluconate monohydrate, and the boric acid (f1). The resultant EVOH resin composition and multilayer structure were evaluated in the same manner as in Example II-1.

Comparative Example II-17

An EVOH resin composition and a multilayer structure were produced in the same manner as in Example II-2 other than that calcium citrate tetrahydrate was used instead of the zinc stearate (d1) at a content of 50 ppm in terms of metal ion with respect to the total sum of the contents of the EVOH (a1), the sodium acetate (b1), the stearic acid (c1), calcium citrate tetrahydrate, and the boric acid (f1). The resultant EVOH resin composition and multilayer structure were evaluated in the same manner as in Example II-1.

Comparative Example II-18

An EVOH resin composition and a multilayer structure were produced in the same manner as in Example II-11 other than that: the EVOH (a5) [ethylene-vinyl alcohol copolymer having an ethylene structural unit content of 38 mol %, a saponification degree of 99.7 mol %, and a MFR of 50 g/10 min (210° C., load: 2,160 g)] was used instead of the EVOH (a1); the sodium acetate (b1) was used at a content of 576 ppm in terms of acetic acid ion with respect to the total sum of the contents of the EVOH (a5), the sodium acetate (b1), the caprylic acid (c2), and the zinc caprylate (d2); and the boric acid (f1) was not used. The resultant EVOH resin composition and multilayer structure were evaluated in the same manner as in Example II-1.

TABLE II-1-1

| | Ethylene content of EVOH (A) (mol %) | Content of acetic acid and/or acetic acid salt (B) (in terms of acetic acid ion) [ppm] | Aliphatic carboxylic acid (C) | Content of (C) (in terms of carboxylic acid ion) [ppm] | Aliphatic carboxylic acid metal salt (D) | Content of (D) (in terms of metal ion) [ppm] | Content of boric acid and/or boric acid salt (F) (content in terms of boron) [ppm] |
|---|---|---|---|---|---|---|---|
| Example II-1 | 29 | 432 | Stearic acid | 1.0 | Zinc stearate | 20 | 59.4 |
| Example II-2 | 29 | 432 | Stearic acid | 2.4 | Zinc stearate | 50 | 59.4 |
| Example II-3 | 29 | 432 | Stearic acid | 0.7 | Zinc stearate | 50 | 59.4 |
| Example II-4 | 29 | 432 | Stearic acid | 4.9 | Zinc stearate | 100 | 59.4 |
| Example II-5 | 29 | 324 | Stearic acid | 4.9 | Zinc stearate | 100 | 115.4 |
| Example II-6 | 29 | 432 | Stearic acid | 9.7 | Zinc stearate | 200 | 59.4 |
| Example II-7 | 29 | 432 | Caprylic acid | 2.8 | Zinc caprylate | 20 | 59.4 |
| Example II-8 | 29 | 432 | Caprylic acid | 6.9 | Zinc caprylate | 50 | 59.4 |
| Example II-9 | 29 | 432 | Caprylic acid | 6.9 | Zinc caprylate | 50 | 300 |
| Example II-10 | 29 | 326 | Caprylic acid | 6.9 | Zinc caprylate | 50 | 1.0 |
| Example II-11 | 29 | 432 | Caprylic acid | 13.8 | Zinc caprylate | 100 | 59.4 |
| Example II-12 | 29 | 324 | Caprylic acid | 13.8 | Zinc caprylate | 100 | 115.4 |
| Example II-13 | 29 | 100 | Caprylic acid | 13.8 | Zinc caprylate | 100 | 13.7 |
| Example II-14 | 29 | 432 | Caprylic acid | 27.6 | Zinc caprylate | 200 | 59.4 |
| Example II-15 | 29 | 432 | Lauric acid | 0.7 | Zinc laurate | 20 | 59.4 |
| Example II-16 | 29 | 432 | Lauric acid | 1.8 | Zinc laurate | 50 | 59.4 |
| Example II-17 | 29 | 432 | Lauric acid | 3.6 | Zinc laurate | 100 | 59.4 |
| Example II-18 | 29 | 324 | Lauric acid | 3.6 | Zinc laurate | 100 | 115.4 |
| Example II-19 | 29 | 432 | Lauric acid | 7.1 | Zinc laurate | 200 | 59.4 |
| Example II-20 | 29 | 432 | Caproic acid | 9.4 | Zinc caproate | 50 | 59.4 |
| Example II-21 | 29 | 324 | Caproic acid | 18.8 | Zinc caproate | 100 | 115.4 |
| Example II-22 | 29 | 432 | Behenic acid | 2.9 | Zinc behenate | 50 | 59.4 |
| Example II-23 | 29 | 324 | Behenic acid | 5.7 | Zinc behenate | 100 | 115.4 |
| Example II-24 | 25 | 648 | Caprylic acid | 6.9 | Zinc caprylate | 50 | 76.9 |
| Example II-25 | 44 | 432 | Caprylic acid | 6.9 | Zinc caprylate | 50 | 124.1 |
| Example II-26 | 29 | 432 | Caprylic acid | 269 | Zinc caprylate | 50 | 59.4 |
| Example II-27 | 29 | 432 | Lauric acid | 355 | Zinc laurate | 50 | 59.4 |
| Comparative Example II-1 | 29 | 432 | — | 0 | — | 0 | 59.4 |
| Comparative Example II-2 | 29 | 0 | Caprylic acid | 6.9 | Zinc caprylate | 50 | 0 |
| Comparative Example II-3 | 29 | 432 | Caprylic acid | 6.9 | Zinc caprylate | 50 | 524.6 |
| Comparative Example II-4 | 29 | 432 | Caprylic acid | 6.9 | Zinc caprylate | 50 | 0.26 |
| Comparative Example II-5 | 29 | 432 | Stearic acid | 29.2 | Zinc stearate | 600 | 59.4 |
| Comparative Example II-6 | 29 | 432 | Caprylic acid | 82.8 | Zinc caprylate | 600 | 59.4 |
| Comparative Example II-7 | 29 | 432 | Lauric acid | 21.4 | Zinc laurate | 600 | 59.4 |
| Comparative Example II-8 | 29 | 432 | Stearic acid | 1.9 | Calcium stearate | 50 | 59.4 |
| Comparative Example II-9 | 29 | 432 | Stearic acid | 15.4 | Magnesium stearate | 50 | 59.4 |
| Comparative Example II-10 | 29 | 432 | Stearic acid | 3.3 | Sodium stearate | 50 | 59.4 |
| Comparative Example II-11 | 29 | 432 | Stearic acid | 484 | — | 0 | 59.4 |
| Comparative Example II-12 | 29 | 432 | Stearic acid | 484 | Zinc stearate | 50 | 59.4 |
| Comparative Example II-13 | 29 | 432 | Stearic acid | 0.4 | Zinc stearate | 50 | 59.4 |
| Comparative Example II-14 | 29 | 432 | Stearic acid | 2.4 | Zinc gluconate trihydrate | 50 | 59.4 |

TABLE II-1-1-continued

| | Ethylene content of EVOH (A) (mol %) | Content of acetic acid and/or acetic acid salt (B) (in terms of acetic acid ion) [ppm] | Aliphatic carboxylic acid (C) | Content of (C) (in terms of carboxylic acid ion) [ppm] | Aliphatic carboxylic acid metal salt (D) | Content of (D) (in terms of metal ion) [ppm] | Content of boric acid and/or boric acid salt (F) (content in terms of boron) [ppm] |
|---|---|---|---|---|---|---|---|
| Comparative Example II-15 | 29 | 432 | Stearic acid | 2.4 | Zinc citrate dihydrate | 50 | 59.4 |
| Comparative Example II-16 | 29 | 432 | Stearic acid | 2.4 | Calcium gluconate monohydrate | 50 | 59.4 |
| Comparative Example II-17 | 29 | 432 | Stearic acid | 2.4 | Calcium citrate tetrahydrate | 50 | 59.4 |
| Comparative Example II-18 | 38 | 576 | Caprylic acid | 13.8 | Zinc caprylate | 100 | 0 |

TABLE II-1-2

| | (D)/(B) | (D)/(C) | (D)/(F) | (B)/(C) | (F)/(C) | Elongation viscosity [Pa·s] (210° C., 100 s$^{-1}$) | Impact strength [kgf·cm] | Color tone stability (air atmosphere, 210° C., 2 hours) | Adhesive strength [N/15 mm] | Flow stability |
|---|---|---|---|---|---|---|---|---|---|---|
| Example II-1 | 0.05 | 20 | 0.34 | 432 | 59.4 | 4,640 | 17.13 | 57.32 | 7.20 | A |
| Example II-2 | 0.12 | 20.83 | 0.84 | 180 | 24.75 | 4,640 | 17.39 | 53.44 | 7.15 | A |
| Example II-3 | 0.12 | 71.43 | 0.84 | 617.14 | 84.86 | 4,640 | 16.23 | 51.06 | 6.97 | A |
| Example II-4 | 0.23 | 20.41 | 1.68 | 88.16 | 12.12 | 4,640 | 17.59 | 48.16 | 6.98 | A |
| Example II-5 | 0.31 | 20.41 | 0.87 | 66.12 | 23.55 | 5,327 | 17.78 | 64.60 | 6.91 | A |
| Example II-6 | 0.46 | 20.62 | 3.37 | 44.54 | 6.12 | 4,640 | 17.79 | 45.00 | 6.37 | A |
| Example II-7 | 0.05 | 7.14 | 0.34 | 154.29 | 21.21 | 4,640 | 17.70 | 59.34 | 7.21 | A |
| Example II-8 | 0.12 | 7.25 | 0.84 | 62.61 | 8.61 | 4,640 | 18.01 | 57.81 | 7.19 | A |
| Example II-9 | 0.12 | 7.25 | 0.17 | 62.61 | 43.48 | 25,852 | 16.28 | 54.31 | 7.16 | B |
| Example II-10 | 0.15 | 7.25 | 50 | 47.25 | 0.14 | 2,557 | 16.12 | 52.05 | 7.22 | A |
| Example II-11 | 0.23 | 7.25 | 1.68 | 31.3 | 4.3 | 4,640 | 18.25 | 55.37 | 7.13 | A |
| Example II-12 | 0.31 | 7.25 | 0.87 | 23.48 | 8.36 | 5,327 | 18.40 | 64.75 | 7.07 | A |
| Example II-13 | 1 | 7.25 | 7.3 | 7.25 | 0.99 | 3,008 | 17.53 | 57.12 | 7.13 | A |
| Example II-14 | 0.46 | 7.25 | 3.37 | 15.65 | 2.15 | 4,640 | 18.49 | 50.95 | 6.93 | A |
| Example II-15 | 0.05 | 28.57 | 0.34 | 617.14 | 84.86 | 4,640 | 17.41 | 58.53 | 7.21 | A |
| Example II-16 | 0.12 | 27.78 | 0.84 | 240 | 33 | 4,640 | 17.70 | 56.06 | 7.17 | A |
| Example II-17 | 0.23 | 27.78 | 1.68 | 120 | 16.5 | 4,640 | 17.92 | 52.49 | 7.08 | A |
| Example II-18 | 0.31 | 27.78 | 0.87 | 90 | 32.06 | 5,327 | 18.10 | 67.77 | 7.01 | A |
| Example II-19 | 0.46 | 28.17 | 3.37 | 60.85 | 8.37 | 4,640 | 18.14 | 47.42 | 6.74 | A |
| Example II-20 | 0.12 | 5.32 | 0.84 | 45.96 | 6.32 | 4,640 | 18.23 | 57.69 | 7.20 | A |
| Example II-21 | 0.31 | 5.32 | 0.87 | 17.23 | 6.14 | 5,327 | 18.64 | 69.74 | 7.09 | A |
| Example II-22 | 0.12 | 17.24 | 0.84 | 148.97 | 20.48 | 4,640 | 17.13 | 54.39 | 7.20 | A |
| Example II-23 | 0.31 | 17.54 | 0.87 | 56.84 | 20.25 | 5,327 | 17.52 | 65.75 | 6.83 | A |
| Example II-24 | 0.08 | 7.25 | 0.65 | 93.91 | 11.14 | 3,801 | 17.98 | 56.07 | 7.30 | A |
| Example II-25 | 0.12 | 7.25 | 0.4 | 62.61 | 17.99 | 4,900 | 18.18 | 61.69 | 7.20 | A |
| Example II-26 | 0.12 | 0.19 | 0.84 | 1.61 | 0.22 | 4,640 | 15.45 | 52.37 | 7.20 | A |
| Example II-27 | 0.12 | 0.14 | 0.84 | 1.22 | 0.17 | 4,640 | 15.15 | 50.77 | 7.20 | A |
| Comparative Example II-1 | 0 | — | 0 | ∞ | — | 4,640 | 14.30 | 60.40 | 7.22 | A |
| Comparative Example II-2 | ∞ | 7.25 | ∞ | 0 | 0 | 2,278 | 17.33 | 57.69 | 2.70 | A |
| Comparative Example II-3 | 0.12 | 7.25 | 0.1 | 62.61 | 76.03 | 48,040 | 5.50 | 46.69 | 7.20 | D |
| Comparative Example II-4 | 0.12 | 7.25 | 192.31 | 62.61 | 0.04 | 2,521 | 14.73 | 52.25 | 7.20 | A |
| Comparative Example II-5 | 1.39 | 20.55 | 10.1 | 14.79 | 2.03 | 4,640 | 18.10 | 42.40 | 3.11 | C |
| Comparative Example II-6 | 1.39 | 7.25 | 10.1 | 5.22 | 0.72 | 4,640 | 18.87 | 49.10 | 4.97 | C |
| Comparative Example II-7 | 1.39 | 28.04 | 10.1 | 20.19 | 2.78 | 4,640 | 18.48 | 45.11 | 3.38 | C |
| Comparative Example II-8 | 0.12 | 26.32 | 0.84 | 227.37 | 31.26 | 4,640 | 14.24 | 52.19 | 7.20 | A |
| Comparative Example II-9 | 0.12 | 3.25 | 0.84 | 28.05 | 3.86 | 4,640 | 13.91 | 47.69 | 7.20 | C |
| Comparative Example II-10 | 0.12 | 15.15 | 0.84 | 130.91 | 18 | 4,640 | 14.44 | 57.69 | 7.40 | A |
| Comparative Example II-11 | 0 | 0 | 0 | 0.89 | 0.12 | 4,640 | 13.93 | 53.15 | 7.20 | A |
| Comparative Example II-12 | 0.12 | 0.1 | 0.84 | 0.89 | 0.12 | 4,640 | 14.75 | 48.47 | 7.20 | A |

TABLE II-1-2-continued

|  | (D)/(B) | (D)/(C) | (D)/(F) | (B)/(C) | (F)/(C) | Elongation viscosity [Pa · s] (210° C., 100 s$^{-1}$) | Impact strength [kgf · cm] | Color tone stability (air atmosphere, 210° C., 2 hours) | Adhesive strength [N/15 mm] | Flow stability |
|---|---|---|---|---|---|---|---|---|---|---|
| Comparative Example II-13 | 0.12 | 125 | 0.84 | 1,080 | 148.5 | 4,640 | 15.04 | 48.63 | 6.79 | A |
| Comparative Example II-14 | 0.12 | 20.83 | 0.84 | 180 | 24.75 | 4,640 | 12.26 | 15.14 | 5.30 | D |
| Comparative Example II-15 | 0.12 | 20.83 | 0.84 | 180 | 24.75 | 4,640 | 10.96 | 42.74 | 5.50 | D |
| Comparative Example II-16 | 0.12 | 20.83 | 0.84 | 180 | 24.75 | 4,640 | 12.16 | 20.94 | 5.00 | D |
| Comparative Example II-17 | 0.12 | 20.83 | 0.84 | 180 | 24.75 | 4,640 | 10.66 | 44.74 | 4.90 | D |
| Comparative Example II-18 | 0.17 | 7.25 | ∞ | 41.14 | 0 | 320 | 13.12 | 74.96 | 7.20 | D |

In Comparative Examples II-1 and II-11 each of which was free of the aliphatic carboxylic acid metal salt (D), the impact strengths were 14.30 (kgf·cm) and 13.93 (kgf·cm), respectively. In contrast, in Comparative Example II-2 that contained the aliphatic carboxylic acid metal salt (D), and was free of the acetic acid and/or the salt thereof (B), the impact strength increased to 17.33 (kgf·cm). However, the adhesive strength reduced to 2.70 (N/15 mm). In addition, in each of Comparative Examples II-5 to II-7 each of which did not satisfy the formula (1) specified in the present disclosure, the adhesive strength was low, and the flow stability was poor. In Comparative Examples II-11 to II-13 each of which did not satisfy the formula (2) specified in the present disclosure, the impact strengths were low. In Comparative Example II-3 that did not satisfy the formula (4) specified in the present disclosure, the impact strength was low, and the flow stability was poor. In Comparative Example II-4 that did not satisfy the formula (4) specified in the present disclosure, the impact strength was low.

Further, also in Comparative Examples II-8 to II-10 in each of which the metal species of the aliphatic carboxylic acid metal salt (D) was not one kind selected from the long Periodic Table 4th-period d-block elements, the impact strengths were low. Further, in Comparative Example II-9, the flow stability was poor.

In addition, in each of Comparative Examples II-14 to II-17 in each of which the aliphatic carboxylic acid (C) and the anion species of the aliphatic carboxylic acid metal salt (D) were not of the same species, the impact strength and the adhesive strength were low, and moreover, the flow stability was poor.

Further, in Comparative Example II-18 that was free of the boric acid and/or the salt thereof (F), and did not satisfy the formula (4) specified in the present disclosure, the impact strength was low, and the flow stability was poor.

In contrast, each of the EVOH resin compositions (Examples II-1 to II-27) each having the characteristic configuration of the present disclosure was not reduced in adhesive strength and showed an excellent value therefor while being excellent in impact strength. Further, each of the compositions was excellent in flow stability, and was not reduced in color tone stability.

Packages were produced by using the multilayer structures of the respective Examples obtained in the foregoing. Each of the resultant packages was excellent in impact resistance and adhesive strength. In addition, each of the packages was excellent in gas barrier property.

<<Third Mode in which the Component (A) is Two or More Kinds of EVOHs Having Different Ethylene Structural Unit Contents>>

Example III-1

[Production of EVOH Resin Composition]

A pellet of an EVOH (A1) [ethylene-vinyl alcohol copolymer obtained by dry-blending 75 parts of the EVOH (a1), which had an ethylene structural unit content of 29 mol %, a saponification degree of 99.7 mol %, and a MFR of 3.8 g/10 min (210° C., load: 2,160 g), with 25 parts of an EVOH (a8), which had an ethylene structural unit content of 44 mol %, a saponification degree of 98.5 mol %, and a MFR of 4.0 g/10 min (210° C., load: 2,160 g)], which contained the EVOH (A1), and contained the sodium acetate (b1) as the acetic acid and/or the salt thereof (B), was used. In addition, the stearic acid (c1) was used as the aliphatic carboxylic acid (C), the zinc stearate (d1) was used as the aliphatic carboxylic acid metal salt (D), and the boric acid (f1) was used as the boric acid and/or the salt thereof (F).

In addition, with regard to the contents of the respective components, the sodium acetate (b1) was used at a content of 360 ppm in terms of acetic acid ion with respect to the total sum of the contents of the EVOH (A1), the sodium acetate (b1), the stearic acid (c1), and the zinc stearate (d1), the stearic acid (c1) was used at a content of 1.0 ppm in terms of carboxylic acid ion with respect to the total sum of the contents of the EVOH (A1), the sodium acetate (b1), the stearic acid (c1), and the zinc stearate (d1), the zinc stearate (d1) was used at a content of 20 ppm in terms of metal ion with respect to the total sum of the contents of the EVOH (A1), the sodium acetate (b1), the stearic acid (c1), and the zinc stearate (d1), and the boric acid (f1) was used at a content of 74.75 ppm in terms of boron with respect to the total sum of the contents of the EVOH (A1), the sodium acetate (b1), the stearic acid (c1), the zinc stearate (d1), and the boric acid (f1). The pellet of the EVOH (A1), the stearic acid (c1), the zinc stearate (d1), and the boric acid (f1) were collectively dry-blended to produce an EVOH resin composition of the present disclosure.

[Multilayer Structure Production 1]

The EVOH resin composition prepared in the foregoing, linear low-density polyethylene (LLDPE) ["UF240" manufactured by Japan Polyethylene Corporation, MFR: 2.1 g/10 min (190° C., load: 2,160 g)], and an adhesive resin ("PLEXAR PX3236" manufactured by LyondellBasell Industries N.V., MFR: 2.0 g/10 min [190° C., load: 2,160 g]) were supplied to a three-kind and five-layer multilayer coextrusion cast film-forming apparatus, and were subjected to multilayer coextrusion under the following conditions to provide a multilayer structure (film) of a three-kind and five-layer structure "LLDPE layer/adhesive resin layer/EVOH resin composition layer/adhesive resin layer/LLDPE layer." The thicknesses (μm) of the respective layers of the multilayer structure were 37.5/5/15/5/37.5. All the die temperatures of forming apparatus were set to 210° C.

(Multilayer Coextrusion Conditions 1)
  Intermediate layer extruder (EVOH resin composition):
    40 mmφ single-screw extruder (barrel temperature: 210° C.)
  Upper and lower layer extruder (LLDPE): 40 mmφ single-screw extruder (barrel temperature: 210° C.)
  Medium upper and lower layer extruder (adhesive resin): 32 mmφ single-screw extruder (barrel temperature: 210° C.)
  Die: three-kind and five-layer feed block-type T-die (die temperature: 210° C.)
  Drawing speed: 9.0 m/min
  Roll temperature: 80° C.

The EVOH resin composition obtained in the foregoing was subjected to the following color tone stability evaluation test and elongation viscosity evaluation test, and the multilayer structure obtained in the foregoing was subjected to the following impact strength evaluation test, adhesive strength evaluation test, and secondary formability evaluation test.

<Color Tone Stability Evaluation of EVOH Resin Composition>

5 Grams of the EVOH resin composition produced in the foregoing was loaded into a 30 mmφ aluminum cup (manufactured by AS ONE Corporation, DISPODISH PP-724), and was left at rest under an air atmosphere at 210° C.; for 2 hours to provide a sample. The sample was subjected to a color tone evaluation. The color tone evaluation was performed on the basis of the following apparatus and evaluation method.
  Used instrument: VISUAL ANALYZER IRISVA400 (manufactured by Alpha M.O.S. Japan K.K.)
  Data analysis software: Alpha Soft V14.3
  Objective lens: 25 mm (manufactured by Basler AG)
  Lighting mode: Upper and lower lighting
  Measurement method: The sample for a color tone evaluation was set in a tray in the chamber of the VISUAL ANALYZER, and a plane image of the entirety of the sample for a color tone evaluation was taken with a CCD camera. After that, the color pattern of the sample was evaluated by processing the image with the data analysis software. The color tone stability of the EVOH resin composition was evaluated from the lightness (L*) of a color having the highest abundance ratio among the resultant color pattern (main color). A higher numerical value of the color tone stability means that the composition is more excellent in color tone stability. In contrast, a lower numerical value thereof means that the composition is poorer in color tone stability. The result is shown in Table III-1-2.

<Evaluation of Elongation Viscosity (Pa·s) of EVOH Resin Composition>

The elongation viscosity (Pa·s) of the EVOH resin composition produced in the foregoing at 210° C.; and 100 s$^{-1}$ was evaluated by performing measurement with a capillary-type rheometer on the basis of Cogswell's equations [Polymer Engineering Science, vol. 12, pp. 64 to 73 (1972)], that is, the following equations (III4) to (III6) under the following conditions. The result is shown in Table III-1-2.

(Cogswell's Equations)

$$\eta_e = [9(n+1)^2 P_0^2]/[32\eta_s(d\gamma/dt)^2] \qquad \text{Equation (III4)}$$

$$d\varepsilon/dt = 4\sigma_s(d\gamma/dt)/[3(n+1)P_0] \qquad \text{Equation (III5)}$$

$$\sigma_s = k(d\gamma/dt)^n \qquad \text{Equation (III6)}$$

$\eta_e$: elongation viscosity (Pa·s)
$\eta_s$: shear viscosity (Pa·s)
$d\gamma/dt$: shear strain rate (s$^{-1}$)
$d\varepsilon/dt$: elongation strain rate (s$^{-1}$)
$\sigma_s$: shear stress (Pa)
"k" and "n": constants
$P_0$: pressure loss (Pa)

(Conditions for Measurement of Elongation Viscosity)
  Measuring apparatus: RHEOGRAPH 20 manufactured by Gottfert Werkstoff-Prufmaschinen GmbH
  Measurement temperature: 210° C.
  Preheating time: 10 minutes
  Long die: die having a length of 10 mm, a diameter of 1 mm, and an inlet angle of 180°
  Short die: die having a length of 0.2 mm, a diameter of 1 mm, and an inlet angle of 180°

<Impact Strength of Multilayer Structure>

The impact strength (kgf·cm) of the multilayer structure produced in the foregoing was evaluated with a YSS-type film impact tester (manufactured by Yasuda Seiki Seisakusho, Ltd., MODEL 181) under an atmosphere at 23° C.; and 50% RH. The measurement was performed a total of ten times, and the average of the measured values was evaluated as the impact strength of the multilayer structure. A clamp having an inner diameter of 60 mm and an impact ball having a radius of 12.7 mm were used, and the angle of fall of a pendulum was set to 90°. A higher numerical value of the impact strength of the multilayer structure means that the structure is more excellent in impact strength. In contrast, a lower numerical value thereof means that the structure is poorer in impact strength. The result is shown in Table III-1-2.

<Adhesive Strength of Multilayer Structure>

An adhesive strength (N/15 mm) between the EVOH resin composition layer and each adhesive resin layer in the multilayer structure produced in the foregoing was evaluated by the following T-peel peel test. The measurement was performed a total of ten times, and the average of the measured values was evaluated as the adhesive strength of the multilayer structure. A higher numerical value of the adhesive strength of the multilayer structure means that the structure is more excellent in adhesive strength. In contrast, a lower numerical value thereof means that the structure is poorer in adhesive strength. The result is shown in Table III-1-2.

(Conditions for T-Peel Peel Test)
  Apparatus: Autograph AGS-H (manufactured by Shimadzu Corporation)
  Load cell: 500 N
  Test method: T-peel method (peeled in a T-shape)
  Test piece size: 15 mm in width
  Test speed: 300 mm/min <Secondary Formability Evaluation of Multilayer Structure>

[Multilayer Structure Production 2]

The EVOH resin composition prepared in the foregoing, polypropylene ("EG7FTB" manufactured by Japan Polypropylene Corporation, MFR: 10.3 g/10 min [230° C., load: 2, 160 g]), and an adhesive resin ("PLEXAR PX6002" manufactured by LyondellBasell Industries N.V., MFR: 2.3 g/10 min [230° C., load: 2,160 g]) were supplied to a three-kind and five-layer coextrusion T-die sheet-forming apparatus, and were coextruded to provide a multilayer structure (sheet) of a three-kind and five-layer structure "polypropylene layer/adhesive resin layer/EVOH resin composition layer/adhesive resin layer/polypropylene layer." The thicknesses (μm) of the respective layers of the multilayer structure are 540/30/60/30/540. All the die temperatures of forming apparatus were set to 210° C.

[Forming of Multilayer Container]

The mold temperature and heater temperature of a vacuum-pressure forming machine (plug-assisted vacuum-pressure forming machine manufactured by Asano Laboratories Co., Ltd.) were set to 50° C.; and 500° C., respectively, and a multilayer container (upper surface diameter: 63 mm, bottom surface diameter: 56 mm, depth: 79 mm, drawing ratio (depth (mm) of formed article/maximum diameter (mm) of formed article): 1.5) was produced by using the multilayer structure of a three-kind and five-layer structure obtained in the foregoing (length×width=40 mm×40 mm, thickness: 1,200 μm, thickness of the EVOH resin composition layer: 60 μm).

A multilayer container article was obtained by setting a heating time for the heat softening of the laminated sheet (heater temperature: 500° C.) to 35 seconds.

[Secondary Formability Evaluation of Multilayer Container]

The secondary formability of the multilayer container produced in the foregoing was evaluated by visually observing the appearance of the multilayer container on the basis of the following evaluation criteria. The result is shown in Table III-1-2.

A: No stripe is present in the container, or a stripe (having a thickness of less than 100 μm) is slightly observed therein.

B: A fine stripe (having a thickness of 100 μm or more and less than 300 μm) is present in part of the container.

C: A large stripe (having a thickness of 300 μm or more) was present in the entirety of the container.

Example III-2

An EVOH resin composition and a multilayer structure were produced in the same manner as in Example III-1 other than that: the stearic acid (c1) was used at a content of 2.4 ppm in terms of carboxylic acid ion with respect to the total sum of the contents of the EVOH (A1), the sodium acetate (b1), the stearic acid (c1), and the zinc stearate (d1); and the zinc stearate (d1) was used at a content of 50 ppm in terms of metal ion with respect to the total sum of the contents of the EVOH (A1), the sodium acetate (b1), the stearic acid (c1), and the zinc stearate (d1). The resultant EVOH resin composition and multilayer structure were evaluated in the same manner as in Example III-1.

Example III-3

An EVOH resin composition and a multilayer structure were produced in the same manner as in Example III-1 other than that: the stearic acid (c1) was used at a content of 0.7 ppm in terms of carboxylic acid ion with respect to the total sum of the contents of the EVOH (A1), the sodium acetate (b1), the stearic acid (c1), and the zinc stearate (d1); and the zinc stearate (d1) was used at a content of 50 ppm in terms of metal ion with respect to the total sum of the contents of the EVOH (A1), the sodium acetate (b1), the stearic acid (c1), and the zinc stearate (d1). The resultant EVOH resin composition and multilayer structure were evaluated in the same manner as in Example III-1.

Example III-4

An EVOH resin composition and a multilayer structure were produced in the same manner as in Example III-1 other than that: the stearic acid (c1) was used at a content of 4.9 ppm in terms of carboxylic acid ion with respect to the total sum of the contents of the EVOH (A1), the sodium acetate (b1), the stearic acid (c1), and the zinc stearate (d1); and the zinc stearate (d1) was used at a content of 100 ppm in terms of metal ion with respect to the total sum of the contents of the EVOH (A1), the sodium acetate (b1), the stearic acid (c1), and the zinc stearate (d1). The resultant EVOH resin composition and multilayer structure were evaluated in the same manner as in Example III-1.

Example III-5

An EVOH resin composition and a multilayer structure were produced in the same manner as in Example III-1 other than that: the caprylic acid (c2) was used instead of the stearic acid (c1) at a content of 2.8 ppm in terms of carboxylic acid ion with respect to the total sum of the contents of the EVOH (A1), the sodium acetate (b1), the caprylic acid (c2), and the zinc caprylate (d2); and the zinc caprylate (d2) was used instead of the zinc stearate (d1) at a content of 20 ppm in terms of metal ion with respect to the total sum of the contents of the EVOH (A1), the sodium acetate (b1), the caprylic acid (c2), and the zinc caprylate (d2). The resultant EVOH resin composition and multilayer structure were evaluated in the same manner as in Example III-1.

Example III-6

An EVOH resin composition and a multilayer structure were produced in the same manner as in Example III-5 other than that: an EVOH (A2) [ethylene-vinyl alcohol copolymer obtained by dry-blending 75 parts of the EVOH (a2), which had an ethylene structural unit content of 29 mol %, a saponification degree of 99.7 mol %, and a MFR of 4.6 g/10 min (210° C., load: 2,160 g), with 25 parts of the EVOH (a8), which had an ethylene structural unit content of 44 mol %, a saponification degree of 98.5 mol %, and a MFR of 4.0 g/10 min (210° C., load: 2,160 g)] was used instead of the EVOH (A1); the sodium acetate (b1) was used at a content of 344 ppm in terms of acetic acid ion with respect to the total sum of the contents of the EVOH (A2), the sodium acetate (b1), the caprylic acid (c2), and the zinc caprylate (d2); and the boric acid (f1) was used at a content of 65.83 ppm in terms of boron with respect to the total sum of the contents of the EVOH (A2), the sodium acetate (b1), the caprylic acid (c2), the zinc caprylate (d2), and the boric acid (f1). The resultant EVOH resin composition and multilayer structure were evaluated in the same manner as in Example III-1.

Example III-7

An EVOH resin composition and a multilayer structure were produced in the same manner as in Example III-5 other than that: the caprylic acid (c2) was used at a content of 6.9 ppm in terms of carboxylic acid ion with respect to the total sum of the contents of the EVOH (A1), the sodium acetate (b1), the caprylic acid (c2), and the zinc caprylate (d2); and the zinc caprylate (d2) was used at a content of 50 ppm in terms of metal ion with respect to the total sum of the contents of the EVOH (A1), the sodium acetate (b1), the caprylic acid (c2), and the zinc caprylate (d2). The resultant EVOH resin composition and multilayer structure were evaluated in the same manner as in Example III-1.

Example III-8

An EVOH resin composition and a multilayer structure were produced in the same manner as in Example III-6 other than that: the caprylic acid (c2) was used at a content of 6.9 ppm in terms of carboxylic acid ion with respect to the total sum of the contents of the EVOH (A2), the sodium acetate (b1), the caprylic acid (c2), and the zinc caprylate (d2); and the zinc caprylate (d2) was used at a content of 50 ppm in terms of metal ion with respect to the total sum of the contents of the EVOH (A2), the sodium acetate (b1), the caprylic acid (c2), and the zinc caprylate (d2). The resultant EVOH resin composition and multilayer structure were evaluated in the same manner as in Example III-1.

Example III-9

An EVOH resin composition and a multilayer structure were produced in the same manner as in Example III-5 other than that: the caprylic acid (c2) was used at a content of 6.9 ppm in terms of carboxylic acid ion with respect to the total sum of the contents of the EVOH (A1), the sodium acetate (b1), the caprylic acid (c2), and the zinc caprylate (d2); the zinc caprylate (d2) was used at a content of 50 ppm in terms of metal ion with respect to the total sum of the contents of the EVOH (A1), the sodium acetate (b1), the caprylic acid (c2), and the zinc caprylate (d2); and the boric acid (f1) was used at a content of 320 ppm in terms of boron with respect to the total sum of the contents of the EVOH (A1), the sodium acetate (b1), the caprylic acid (c2), the zinc caprylate (d2), and the boric acid (f1). The resultant EVOH resin composition and multilayer structure were evaluated in the same manner as in Example III-1.

Example III-10

An EVOH resin composition and a multilayer structure were produced in the same manner as in Example III-5 other than that: the caprylic acid (c2) was used at a content of 13.8 ppm in terms of carboxylic acid ion with respect to the total sum of the contents of the EVOH (A1), the sodium acetate (b1), the caprylic acid (c2), and the zinc caprylate (d2); and the zinc caprylate (d2) was used at a content of 100 ppm in terms of metal ion with respect to the total sum of the contents of the EVOH (A1), the sodium acetate (b1), the caprylic acid (c2), and the zinc caprylate (d2). The resultant EVOH resin composition and multilayer structure were evaluated in the same manner as in Example III-1.

Example III-11

An EVOH resin composition and a multilayer structure were produced in the same manner as in Example III-6 other than that: the caprylic acid (c2) was used at a content of 13.8 ppm in terms of carboxylic acid ion with respect to the total sum of the contents of the EVOH (A2), the sodium acetate (b1), the caprylic acid (c2), and the zinc caprylate (d2); and the zinc caprylate (d2) was used at a content of 100 ppm in terms of metal ion with respect to the total sum of the contents of the EVOH (A2), the sodium acetate (b1), the caprylic acid (c2), and the zinc caprylate (d2). The resultant EVOH resin composition and multilayer structure were evaluated in the same manner as in Example III-1.

Example III-12

An EVOH resin composition and a multilayer structure were produced in the same manner as in Example III-5 other than that: an EVOH (A3) [ethylene-vinyl alcohol copolymer obtained by dry-blending 75 parts of the EVOH (a3), which had an ethylene structural unit content of 29 mol %, a saponification degree of 99.7 mol %, and a MFR of 6.8 g/10 min (210° C., load: 2,160 g), with 25 parts of the EVOH (a8), which had an ethylene structural unit content of 44 mol %, a saponification degree of 98.5 mol %, and a MFR of 4.0 g/10 min (210° C., load: 2,160 g)] was used instead of the EVOH (A1); the sodium acetate (b1) was used at a content of 100 ppm in terms of acetic acid ion with respect to the total sum of the contents of the EVOH (A3), the sodium acetate (b1), the caprylic acid (c2), and the zinc caprylate (d2); the caprylic acid (c2) was used at a content of 6.9 ppm in terms of carboxylic acid ion with respect to the total sum of the contents of the EVOH (A3), the sodium acetate (b1), the caprylic acid (c2), and the zinc caprylate (d2); and the zinc caprylate (d2) was used at a content of 100 ppm in terms of metal ion with respect to the total sum of the contents of the EVOH (A3), the sodium acetate (b1), the caprylic acid (c2), and the zinc caprylate (d2). The resultant EVOH resin composition and multilayer structure were evaluated in the same manner as in Example III-1.

Example III-13

An EVOH resin composition and a multilayer structure were produced in the same manner as in Example III-1 other than that: the lauric acid (c3) was used instead of the stearic acid (c1) at a content of 0.7 ppm in terms of carboxylic acid ion with respect to the total sum of the contents of the EVOH (A1), the sodium acetate (b1), the lauric acid (c3), and the zinc laurate (d3); and the zinc laurate (d3) was used instead of the zinc stearate (d1) at a content of 20 ppm in terms of metal ion with respect to the total sum of the contents of the EVOH (A1), the sodium acetate (b1), the lauric acid (c3), and the zinc laurate (d3). The resultant EVOH resin composition and multilayer structure were evaluated in the same manner as in Example III-1.

Example III-14

An EVOH resin composition and a multilayer structure were produced in the same manner as in Example III-13 other than that: the lauric acid (c3) was used at a content of 1.8 ppm in terms of carboxylic acid ion with respect to the total sum of the contents of the EVOH (A1), the sodium acetate (b1), the lauric acid (c3), and the zinc laurate (d3); and the zinc laurate (d3) was used at a content of 50 ppm in terms of metal ion with respect to the total sum of the contents of the EVOH (A1), the sodium acetate (b1), the lauric acid (c3), and the zinc laurate (d3). The resultant EVOH resin composition and multilayer structure were evaluated in the same manner as in Example III-1.

Example III-15

An EVOH resin composition and a multilayer structure were produced in the same manner as in Example III-13 other than that: the lauric acid (c3) was used at a content of 3.6 ppm in terms of carboxylic acid ion with respect to the total sum of the contents of the EVOH (A1), the sodium acetate (b1), the lauric acid (c3), and the zinc laurate (d3); and the zinc laurate (d3) was used at a content of 100 ppm in terms of metal ion with respect to the total sum of the contents of the EVOH (A1), the sodium acetate (b1), the lauric acid (c3), and the zinc laurate (d3). The resultant EVOH resin composition and multilayer structure were evaluated in the same manner as in Example III-1.

Example III-16

An EVOH resin composition and a multilayer structure were produced in the same manner as in Example III-1 other than that: the behenic acid (c5) was used instead of the stearic acid (c1) at a content of 2.9 ppm in terms of carboxylic acid ion with respect to the total sum of the contents of the EVOH (A1), the sodium acetate (b1), the behenic acid (c5), and the zinc behenate (d5); and the zinc behenate (d5) was used instead of the zinc stearate (d1) at a content of 50 ppm in terms of metal ion with respect to the total sum of the contents of the EVOH (A1), the sodium acetate (b1), the behenic acid (c5), and the zinc behenate (d5). The resultant EVOH resin composition and multilayer structure were evaluated in the same manner as in Example III-1.

Example III-17

An EVOH resin composition and a multilayer structure were produced in the same manner as in Example III-7 other than that: an EVOH (A4) [ethylene-vinyl alcohol copolymer obtained by dry-blending 85 parts of the EVOH (a1), which had an ethylene structural unit content of 29 mol %, a saponification degree of 99.7 mol %, and a MFR of 3.8 g/10 min (210° C., load: 2,160 g), with 15 parts of an EVOH (a9), which had an ethylene structural unit content of 44 mol %, a saponification degree of 99.6 mol %, and a MFR of 3.2 g/10 min (210° C., load: 2,160 g)] was used instead of the EVOH (A1); the sodium acetate (b1) was used at a content of 432 ppm in terms of acetic acid ion with respect to the total sum of the contents of the EVOH (A4), the sodium acetate (b1), the caprylic acid (c2), and the zinc caprylate (d2); and the boric acid (f1) was used at a content of 50.53 ppm in terms of boron with respect to the total sum of the contents of the EVOH (A4), the sodium acetate (b1), the caprylic acid (c2), the zinc caprylate (d2), and the boric acid (f1). The resultant EVOH resin composition and multilayer structure were evaluated in the same manner as in Example III-1.

Example III-18

An EVOH resin composition and a multilayer structure were produced in the same manner as in Example III-5 other than that: an EVOH (A5) [ethylene-vinyl alcohol copolymer obtained by dry-blending 65 parts of the EVOH (a5), which had an ethylene structural unit content of 32 mol %, a saponification degree of 99.6 mol %, and a MFR of 3.8 g/10 min (210° C., load: 2,160 g), 10 parts of an EVOH (a6), which had an ethylene structural unit content of 38 mol %, a saponification degree of 99.6 mol %, and a MFR of 3.8 g/10 min (210° C., load: 2,160 g), and 25 parts of the EVOH (a9), which had an ethylene structural unit content of 44 mol %, a saponification degree of 99.6 mol %, and a MFR of 3.2 g/10 min (210° C., load: 2,160 g)] was used instead of the EVOH (A1); the sodium acetate (b1) was used at a content of 453 ppm in terms of acetic acid ion with respect to the total sum of the contents of the EVOH (A5), the sodium acetate (b1), the caprylic acid (c2), and the zinc caprylate (d2); and the boric acid (f1) was used at a content of 154.66 ppm in terms of boron with respect to the total sum of the contents of the EVOH (A5), the sodium acetate (b1), the caprylic acid (c2), the zinc caprylate (d2), and the boric acid (f1). The resultant EVOH resin composition and multilayer structure were evaluated in the same manner as in Example III-1.

Example III-19

An EVOH resin composition and a multilayer structure were produced in the same manner as in Example III-18 other than that: the caprylic acid (c2) was used at a content of 6.9 ppm in terms of carboxylic acid ion with respect to the total sum of the contents of the EVOH (A5), the sodium acetate (b1), the caprylic acid (c2), and the zinc caprylate (d2); and the zinc caprylate (d2) was used at a content of 50 ppm in terms of metal ion with respect to the total sum of the contents of the EVOH (A5), the sodium acetate (b1), the caprylic acid (c2), and the zinc caprylate (d2). The resultant EVOH resin composition and multilayer structure were evaluated in the same manner as in Example III-1.

Example III-20

An EVOH resin composition and a multilayer structure were produced in the same manner as in Example III-18 other than that: the caprylic acid (c2) was used at a content of 13.8 ppm in terms of carboxylic acid ion with respect to the total sum of the contents of the EVOH (A5), the sodium acetate (b1), the caprylic acid (c2), and the zinc caprylate (d2); and the zinc caprylate (d2) was used at a content of 100 ppm in terms of metal ion with respect to the total sum of the contents of the EVOH (A5), the sodium acetate (b1), the caprylic acid (c2), and the zinc caprylate (d2). The resultant EVOH resin composition and multilayer structure were evaluated in the same manner as in Example III-1.

Example III-21

An EVOH resin composition and a multilayer structure were produced in the same manner as in Example III-7 other than that: an EVOH (A6) [ethylene-vinyl alcohol copolymer obtained by dry-blending 80 parts of an EVOH (a7), which had an ethylene structural unit content of 25 mol %, a saponification degree of 99.6 mol %, and a MFR of 4.0 g/10 min (210° C., load: 2,160 g), with 20 parts of the EVOH (a8), which had an ethylene structural unit content of 44 mol %, a saponification degree of 98.5 mol %, and a MFR of 4.0 g/10 min (210° C., load: 2,160 g)] was used instead of the EVOH (A1); the sodium acetate (b1) was used at a content of 547 ppm in terms of acetic acid ion with respect to the total sum of the contents of the EVOH (A6), the sodium acetate (b1), the caprylic acid (c2), and the zinc caprylate (d2); and the boric acid (f1) was used at a content of 85.68 ppm in terms of boron with respect to the total sum of the contents of the EVOH (A6), the sodium acetate (b1), the caprylic acid (c2), the zinc caprylate (d2), and the boric acid (f1). The resultant EVOH resin composition and multilayer structure were evaluated in the same manner as in Example III-1.

Example III-22

An EVOH resin composition and a multilayer structure were produced in the same manner as in Example III-7 other than that the caprylic acid (c2) was used at a content of 269 ppm in terms of carboxylic acid ion with respect to the total sum of the contents of the EVOH (A1), the sodium acetate (b1), the caprylic acid (c2), and the zinc caprylate (d2). The resultant EVOH resin composition and multilayer structure were evaluated in the same manner as in Example III-1.

Example I-23

An EVOH resin composition and a multilayer structure were produced in the same manner as in Example III-14 other than that the lauric acid (c3) was used at a content of 354.8 ppm in terms of carboxylic acid ion with respect to the total sum of the contents of the EVOH (A1), the sodium acetate (b1), the lauric acid (c3), and the zinc laurate (d3). The resultant EVOH resin composition and multilayer structure were evaluated in the same manner as in Example III-1.

Comparative Example III-1

An EVOH resin composition and a multilayer structure were produced in the same manner as in Example III-7 other than that: an EVOH (A7) [100 parts of the EVOH (a4) having an ethylene structural unit content of 29 mol %, a saponification degree of 99.7 mol %, and a MFR of 3.8 g/10 min (210° C., load: 2,160 g)] was used instead of the EVOH (A1); the sodium acetate (b1) was used at a content of 432 ppm in terms of acetic acid ion with respect to the total sum of the contents of the EVOH (A7), the sodium acetate (b1), the caprylic acid (c2), and the zinc caprylate (d2); and the boric acid (f1) was used at a content of 59.45 ppm in terms of boron with respect to the total sum of the contents of the EVOH (A7), the sodium acetate (b1), the caprylic acid (c2), the zinc caprylate (d2), and the boric acid (f1). The resultant EVOH resin composition and multilayer structure were evaluated in the same manner as in Example III-1.

Comparative Example III-2

An EVOH resin composition and a multilayer structure were produced in the same manner as in Example III-1 other than that the stearic acid (c1) and the zinc stearate (d1) were not used. The resultant EVOH resin composition and multilayer structure were evaluated in the same manner as in Example III-1.

Comparative Example III-3

An EVOH resin composition and a multilayer structure were produced in the same manner as in Example III-7 other than that: an EVOH (A8) [ethylene-vinyl alcohol copolymer obtained by dry-blending 75 parts of the EVOH (a4), which had an ethylene structural unit content of 29 mol %, a saponification degree of 99.7 mol %, and a MFR of 8.0 g/10 min (210° C., load: 2,160 g), with 25 parts of the EVOH (a8), which had an ethylene structural unit content of 44 mol %, a saponification degree of 98.5 mol %, and a MFR of 4.0 g/10 min (210° C., load: 2,160 g)] was used instead of the EVOH (A1); the sodium acetate (b1) was used at a content of 36 ppm in terms of acetic acid ion with respect to the total sum of the contents of the EVOH (A8), the sodium acetate (b1), the caprylic acid (c2), and the zinc caprylate (d2); and the boric acid (f1) was used at a content of 30.16 ppm in terms of boron with respect to the total sum of the contents of the EVOH (A8), the sodium acetate (b1), the caprylic acid (c2), the zinc caprylate (d2), and the boric acid (f1). The resultant EVOH resin composition and multilayer structure were evaluated in the same manner as in Example III-1.

Comparative Example III-4

An EVOH resin composition and a multilayer structure were produced in the same manner as in Example III-1 other than that: the stearic acid (c1) was used at a content of 0.4 ppm in terms of carboxylic acid ion with respect to the total sum of the contents of the EVOH (A1), the sodium acetate (b1), the stearic acid (c1), and the zinc stearate (d1); and the zinc stearate (d1) was used at a content of 50 ppm in terms of metal ion with respect to the total sum of the contents of the EVOH (A1), the sodium acetate (b1), the stearic acid (c1), and the zinc stearate (d1). The resultant EVOH resin composition and multilayer structure were evaluated in the same manner as in Example III-1.

Comparative Example III-5

An EVOH resin composition and a multilayer structure were produced in the same manner as in Example III-1 other than that: the stearic acid (c1) was used at a content of 29.2 ppm in terms of carboxylic acid ion with respect to the total sum of the contents of the EVOH (A1), the sodium acetate (b1), the stearic acid (c1), and the zinc stearate (d1); and the zinc stearate (d1) was used at a content of 600 ppm in terms of metal ion with respect to the total sum of the contents of the EVOH (A1), the sodium acetate (b1), the stearic acid (c1), and the zinc stearate (d1). The resultant EVOH resin composition and multilayer structure were evaluated in the same manner as in Example III-1.

Comparative Example III-6

An EVOH resin composition and a multilayer structure were produced in the same manner as in Example III-5 other than that: the caprylic acid (c2) was used at a content of 82.8 ppm in terms of carboxylic acid ion with respect to the total sum of the contents of the EVOH (A1), the sodium acetate (b1), the caprylic acid (c2), and the zinc caprylate (d2); and the zinc caprylate (d2) was used at a content of 600 ppm in terms of metal ion with respect to the total sum of the contents of the EVOH (A1), the sodium acetate (b1), the caprylic acid (c2), and the zinc caprylate (d2). The resultant EVOH resin composition and multilayer structure were evaluated in the same manner as in Example III-1.

Comparative Example III-7

An EVOH resin composition and a multilayer structure were produced in the same manner as in Example III-13 other than that: the lauric acid (c3) was used at a content of 21.4 ppm in terms of carboxylic acid ion with respect to the total sum of the contents of the EVOH (A1), the sodium acetate (b1), the lauric acid (c3), and the zinc laurate (d3); and the zinc laurate (d3) was used at a content of 600 ppm in terms of metal ion with respect to the total sum of the contents of the EVOH (A1), the sodium acetate (b1), the lauric acid (c3), and the zinc laurate (d3). The resultant EVOH resin composition and multilayer structure were evaluated in the same manner as in Example III-1.

Comparative Example III-8

An EVOH resin composition and a multilayer structure were produced in the same manner as in Example III-8 other than that: the caprylic acid (c2) was used at a content of 82.8 ppm in terms of carboxylic acid ion with respect to the total sum of the contents of the EVOH (A2), the sodium acetate (b1), the caprylic acid (c2), and the zinc caprylate (d2); and the zinc caprylate (d2) was used at a content of 600 ppm in terms of metal ion with respect to the total sum of the contents of the EVOH (A2), the sodium acetate (b1), the caprylic acid (c2), and the zinc caprylate (d2). The resultant EVOH resin composition and multilayer structure were evaluated in the same manner as in Example III-1.

Comparative Example III-9

An EVOH resin composition and a multilayer structure were produced in the same manner as in Example III-18 other than that: the caprylic acid (c2) was used at a content of 82.8 ppm in terms of carboxylic acid ion with respect to the total sum of the contents of the EVOH (A5), the sodium acetate (b1), the caprylic acid (c2), and the zinc caprylate (d2); and the zinc caprylate (d2) was used at a content of 600 ppm in terms of metal ion with respect to the total sum of the contents of the EVOH (A5), the sodium acetate (b1), the caprylic acid (c2), and the zinc caprylate (d2). The resultant EVOH resin composition and multilayer structure were evaluated in the same manner as in Example III-1.

Comparative Example III-10

An EVOH resin composition and a multilayer structure were produced in the same manner as in Example III-1 other than that: the stearic acid (c1) was used at a content of 1.9 ppm in terms of carboxylic acid ion with respect to the total sum of the contents of the EVOH (A1), the sodium acetate (b1), the stearic acid (c1), and calcium stearate; and calcium stearate was used instead of the zinc stearate (d1) at a content of 50 ppm in terms of metal ion with respect to the total sum of the contents of the EVOH (A1), the sodium acetate (b1), the stearic acid (c1), and calcium stearate. The resultant EVOH resin composition and multilayer structure were evaluated in the same manner as in Example III-1.

Comparative Example III-11

An EVOH resin composition and a multilayer structure were produced in the same manner as in Example III-1 other than that: the stearic acid (c1) was used at a content of 15.4 ppm in terms of carboxylic acid ion with respect to the total sum of the contents of the EVOH (A1), the sodium acetate (b1), the stearic acid (c1), and magnesium stearate; and magnesium stearate was used instead of the zinc stearate (d1) at a content of 50 ppm in terms of metal ion with respect to the total sum of the contents of the EVOH (A1), the sodium acetate (bi), the stearic acid (c1), and magnesium stearate. The resultant EVOH resin composition and multilayer structure were evaluated in the same manner as in Example III-1.

Comparative Example III-12

An EVOH resin composition and a multilayer structure were produced in the same manner as in Example III-1 other than that: the stearic acid (c1) was used at a content of 3.3 ppm in terms of carboxylic acid ion with respect to the total sum of the contents of the EVOH (A1), the sodium acetate (b1), the stearic acid (c1), and sodium stearate; and sodium stearate was used instead of the zinc stearate (d1) at a content of 50 ppm in terms of metal ion with respect to the total sum of the contents of the EVOH (A1), the sodium acetate (b1), the stearic acid (c1), and sodium stearate. The resultant EVOH resin composition and multilayer structure were evaluated in the same manner as in Example III-1.

Comparative Example III-13

An EVOH resin composition and a multilayer structure were produced in the same manner as in Example III-2 other than that the stearic acid (c1) was used at a content of 484 ppm in terms of carboxylic acid ion with respect to the total sum of the contents of the EVOH (A1), the sodium acetate (b1), the stearic acid (c1), and the zinc stearate (d1). The resultant EVOH resin composition and multilayer structure were evaluated in the same manner as in Example III-1.

Comparative Example III-14

An EVOH resin composition and a multilayer structure were produced in the same manner as in Example III-2 other than that zinc gluconate trihydrate was used instead of the zinc stearate (d1) at a content of 50 ppm in terms of metal ion with respect to the total sum of the contents of the EVOH (A1), the sodium acetate (b1), the stearic acid (c1), and zinc gluconate trihydrate. The resultant EVOH resin composition and multilayer structure were evaluated in the same manner as in Example III-1.

Comparative Example III-15

An EVOH resin composition and a multilayer structure were produced in the same manner as in Example III-2 other than that zinc citrate dihydrate was used instead of the zinc stearate (d1) at a content of 50 ppm in terms of metal ion with respect to the total sum of the contents of the EVOH (A1), the sodium acetate (b1), the stearic acid (c1), and zinc citrate dihydrate. The resultant EVOH resin composition and multilayer structure were evaluated in the same manner as in Example III-1.

TABLE III-1-1

| | Ethylene content of EVOH (A) (mol %)/upper stage Content of EVOH (A) (wt. %)/lower stage | | | | | | | | | Content of acetic acid and/or acetic acid salt B (in terms of acetic acid ion) [ppm] | Aliphatic carboxylic acid (C) | Content of (C) (in terms of carboxylic acid ion) [ppm] | Aliphatic carboxylic acid metal salt (D) | Content of (D) (in terms of metal ion) [ppm] | Content of boric acid and/or boric acid salt (F) (content in terms of boron) [ppm] |
|---|---|---|---|---|---|---|---|---|---|---|---|---|---|---|---|
| | (a1) | (a2) | (a3) | (a4) | (a5) | (a6) | (a7) | (a8) | (a9) | | | | | | |
| Example III-1 | 29 (75) | — | — | — | — | — | — | 44 (25) | — | 360 | Stearic acid | 1.0 | Zinc stearate | 20 | 74.75 |
| Example III-2 | 29 (75) | — | — | — | — | — | — | 44 (25) | — | 360 | Stearic acid | 2.4 | Zinc stearate | 50 | 74.75 |

TABLE III-1-1-continued

| | Ethylene content of EVOH (A) (mol %)/upper stage Content of EVOH (A) (wt. %)/lower stage | | | | | | | | | Content of acetic acid and/or acetic acid salt B) (in terms of acetic acid ion) [ppm] | Aliphatic carboxylic acid (C) | Content of (C) (in terms of carboxylic acid ion) [ppm] | Aliphatic carboxylic acid metal salt (D) | Content of (D) (in terms of metal ion) [ppm] | Content of boric acid and/or boric acid salt (F) (content in terms of boron) [ppm] |
|---|---|---|---|---|---|---|---|---|---|---|---|---|---|---|---|
| | (a1) | (a2) | (a3) | (a4) | (a5) | (a6) | (a7) | (a8) | (a9) | | | | | | |
| Example III-3 | 29 (75) | — | — | — | — | — | — | 44 (25) | — | 360 | Stearic acid | 0.7 | Zinc stearate | 50 | 74.75 |
| Example III-4 | 29 (75) | — | — | — | — | — | — | 44 (25) | — | 360 | Stearic acid | 4.9 | Zinc stearate | 100 | 74.75 |
| Example III-5 | 29 (75) | — | — | — | — | — | — | 44 (25) | — | 360 | Caprylic acid | 2.8 | Zinc caprylate | 20 | 74.75 |
| Example III-6 | — | 29 (75) | — | — | — | — | — | 44 (25) | — | 344 | Caprylic acid | 2.8 | Zinc caprylate | 20 | 65.83 |
| Example III-7 | 29 (75) | — | — | — | — | — | — | 44 (25) | — | 360 | Caprylic acid | 6.9 | Zinc caprylate | 50 | 74.75 |
| Example III-8 | — | 29 (75) | — | — | — | — | — | 44 (25) | — | 344 | Caprylic acid | 6.9 | Zinc caprylate | 50 | 65.83 |
| Example III-9 | 29 (75) | — | — | — | — | — | — | 44 (25) | — | 360 | Caprylic acid | 6.9 | Zinc caprylate | 50 | 320 |
| Example III-10 | 29 (75) | — | — | — | — | — | — | 44 (25) | — | 360 | Caprylic acid | 13.8 | Zinc caprylate | 100 | 74.75 |
| Example III-11 | — | 29 (75) | — | — | — | — | — | 44 (25) | — | 344 | Caprylic acid | 13.8 | Zinc caprylate | 100 | 65.83 |
| Example III-12 | — | — | 29 (75) | — | — | — | — | 44 (25) | — | 100 | Caprylic acid | 6.9 | Zinc caprylate | 100 | 74.75 |
| Example III-13 | 29 (75) | — | — | — | — | — | — | 44 (25) | — | 360 | Lauric acid | 0.7 | Zinc laurate | 20 | 74.75 |
| Example III-14 | 29 (75) | — | — | — | — | — | — | 44 (25) | — | 360 | Lauric acid | 1.8 | Zinc laurate | 50 | 74.75 |
| Example III-15 | 29 (75) | — | — | — | — | — | — | 44 (25) | — | 360 | Lauric acid | 3.6 | Zinc laurate | 100 | 74.75 |
| Example III-16 | 29 (75) | — | — | — | — | — | — | 44 (25) | — | 360 | Behenic acid | 2.9 | Zinc behenate | 50 | 74.75 |
| Example III-17 | 29 (85) | — | — | — | — | — | — | — | 44 (15) | 432 | Caprylic acid | 6.9 | Zinc caprylate | 50 | 50.53 |
| Example III-18 | — | — | — | — | 32 (65) | 38 (10) | — | — | 44 (25) | 453 | Caprylic acid | 2.8 | Zinc caprylate | 20 | 154.66 |
| Example III-19 | — | — | — | — | 32 (65) | 38 (10) | — | — | 44 (25) | 453 | Caprylic acid | 6.9 | Zinc caprylate | 50 | 154.66 |
| Example III-20 | — | — | — | — | 32 (65) | 38 (10) | — | — | 44 (25) | 453 | Caprylic acid | 13.8 | Zinc caprylate | 100 | 154.66 |
| Example III-21 | — | — | — | — | — | — | 25 (80) | 44 (20) | — | 547 | Caprylic acid | 6.9 | Zinc caprylate | 50 | 85.68 |
| Example III-22 | 29 (75) | — | — | — | — | — | — | 44 (25) | — | 360 | Caprylic acid | 269 | Zinc caprylate | 50 | 74.75 |
| Example III-23 | 29 (75) | — | — | — | — | — | — | 44 (25) | — | 360 | Lauric acid | 354.8 | Zinc laurate | 50 | 74.75 |
| Comparative Example III-1 | — | — | — | 29 (100) | — | — | — | — | — | 432 | Caprylic acid | 6.9 | Zinc caprylate | 50 | 59.45 |
| Comparative Example III-2 | 29 (75) | — | — | — | — | — | — | 44 (25) | — | 360 | — | 0 | — | 0 | 74.75 |
| Comparative Example III-3 | — | — | — | 29 (75) | — | — | — | 44 (25) | — | 36 | Caprylic acid | 6.9 | Zinc caprylate | 50 | 30.16 |
| Comparative Example III-4 | 29 (75) | — | — | — | — | — | — | 44 (25) | — | 360 | Stearic acid | 0.4 | Zinc stearate | 50 | 74.75 |
| Comparative Example III-5 | 29 (75) | — | — | — | — | — | — | 44 (25) | — | 360 | Stearic acid | 29.2 | Zinc stearate | 600 | 74.75 |
| Comparative Example III-6 | 29 (75) | — | — | — | — | — | — | 44 (25) | — | 360 | Caprylic acid | 82.8 | Zinc caprylate | 600 | 74.75 |

TABLE III-1-1-continued

| | Ethylene content of EVOH (A) (mol %)/upper stage Content of EVOH (A) (wt. %)/lower stage | | | | | | | | | Content of acetic acid and/or acetic acid salt B) (in terms of acetic acid ion) [ppm] | Aliphatic carboxylic acid (C) | Content of (C) (in terms of carboxylic acid ion) [ppm] | Aliphatic carboxylic acid metal salt (D) | Content of (D) (in terms of metal ion) [ppm] | Content of boric acid and/or boric acid salt (F) (content in terms of boron) [ppm] |
|---|---|---|---|---|---|---|---|---|---|---|---|---|---|---|---|
| | (a1) | (a2) | (a3) | (a4) | (a5) | (a6) | (a7) | (a8) | (a9) | | | | | | |
| Comparative Example III-7 | 29 (75) | — | — | — | — | — | — | 44 (25) | — | 360 | Lauric acid | 21.4 | Zinc laurate | 600 | 74.75 |
| Comparative Example III-8 | — | 29 (75) | — | — | — | — | — | 44 (25) | — | 344 | Caprylic acid | 82.8 | Zinc caprylate | 600 | 65.83 |
| Comparative Example III-9 | — | — | — | — | 32 (65) | 38 (10) | — | — | 44 (25) | 453 | Caprylic acid | 82.8 | Zinc caprylate | 600 | 154.66 |
| Comparative Example III-10 | 29 (75) | — | — | — | — | — | — | 44 (25) | — | 360 | Stearic acid | 1.9 | Calcium stearate | 50 | 74.75 |
| Comparative Example III-11 | 29 (75) | — | — | — | — | — | — | 44 (25) | — | 360 | Stearic acid | 15.4 | Magnesium stearate | 50 | 74.75 |
| Comparative Example III-12 | 29 (75) | — | — | — | — | — | — | 44 (25) | — | 360 | Stearic acid | 3.3 | Sodium stearate | 50 | 74.75 |
| Comparative Example III-13 | 29 (75) | — | — | — | — | — | — | 44 (25) | — | 360 | Stearic acid | 484 | Zinc stearate | 50 | 74.75 |
| Comparative Example III-14 | 29 (75) | — | — | — | — | — | — | 44 (25) | — | 360 | Stearic acid | 2.4 | Zinc gluconate trihydrate | 50 | 74.75 |
| Comparative Example III-15 | 29 (75) | — | — | — | — | — | — | 44 (25) | — | 360 | Stearic acid | 2.4 | Zinc citrate dihydrate | 50 | 74.75 |

TABLE III-1-2

| | (D)/(B) | (D)/(C) | (B)/(C) | (D)/(F) | Elongation viscosity [Pa · s] (210° C., 100 S$^{-1}$) | Impact strength [kgf · cm] | Color tone stability (air atmosphere, 210° C., 2 hours) | Adhesive strength [N/15 mm] | Secondary formability |
|---|---|---|---|---|---|---|---|---|---|
| Example III-1 | 0.06 | 20 | 360 | 0.27 | 5,044 | 17.03 | 63.36 | 7.15 | A |
| Example III-2 | 0.14 | 20.83 | 150 | 0.67 | 5,044 | 17.83 | 59.48 | 7.10 | A |
| Example III-3 | 0.14 | 71.43 | 514.29 | 0.67 | 5,044 | 16.64 | 56.83 | 6.92 | A |
| Example III-4 | 0.28 | 20.41 | 73.47 | 1.34 | 5,044 | 17.97 | 54.20 | 6.93 | A |
| Example III-5 | 0.06 | 7.14 | 128.57 | 0.27 | 5,044 | 17.70 | 65.38 | 7.16 | A |
| Example III-6 | 0.06 | 7.14 | 122.86 | 0.3 | 4,402 | 17.23 | 73.03 | 7.15 | A |
| Example III-7 | 0.14 | 7.25 | 52.17 | 0.67 | 5,044 | 18.24 | 63.85 | 7.14 | A |
| Example III-8 | 0.15 | 7.25 | 49.86 | 0.76 | 4,402 | 17.97 | 71.50 | 7.13 | A |
| Example III-9 | 0.14 | 7.25 | 52.17 | 0.16 | 28,108 | 16.49 | 59.99 | 7.11 | B |
| Example III-10 | 0.28 | 7.25 | 26.09 | 1.34 | 5,044 | 18.38 | 61.41 | 7.09 | A |
| Example III-11 | 0.29 | 7.25 | 24.93 | 1.52 | 4,402 | 18.11 | 69.06 | 7.08 | A |
| Example III-12 | 1 | 14.49 | 14.49 | 1.34 | 3,228 | 18.05 | 61.22 | 6.05 | A |
| Example III-13 | 0.06 | 28.57 | 514.29 | 0.27 | 5,044 | 17.34 | 64.57 | 7.16 | A |
| Example III-14 | 0.14 | 27.78 | 200 | 0.67 | 5,044 | 18.15 | 62.10 | 7.13 | A |
| Example III-15 | 0.28 | 27.78 | 100 | 1.34 | 5,044 | 18.29 | 58.53 | 7.03 | A |
| Example III-16 | 0.14 | 17.24 | 124.14 | 0.67 | 5,044 | 17.56 | 60.43 | 7.08 | A |
| Example III-17 | 0.12 | 7.25 | 62.61 | 0.99 | 3,710 | 18.01 | 62.35 | 7.19 | A |
| Example III-18 | 0.04 | 7.14 | 161.79 | 0.13 | 5,327 | 17.11 | 70.64 | 7.29 | A |
| Example III-19 | 0.11 | 7.25 | 65.65 | 0.32 | 5,327 | 17.95 | 69.11 | 7.27 | A |
| Example III-20 | 0.22 | 7.25 | 32.83 | 0.65 | 5,327 | 18.09 | 66.68 | 7.22 | A |

TABLE III-1-2-continued

|  | (D)/(B) | (D)/(C) | (B)/(C) | (D)/(F) | Elongation viscosity [Pa · s] (210° C., 100 S$^{-1}$) | Impact strength [kgf · cm] | Color tone stability (air atmosphere, 210° C., 2 hours) | Adhesive strength [N/15 mm] | Secondary formability |
|---|---|---|---|---|---|---|---|---|---|
| Example III-21 | 0.09 | 7.25 | 79.28 | 0.58 | 3,814 | 18.31 | 60.85 | 7.32 | A |
| Example III-22 | 0.14 | 0.19 | 1.34 | 0.67 | 5,044 | 15.95 | 54.99 | 7.15 | A |
| Example III-23 | 0.14 | 0.14 | 1.01 | 0.67 | 5,044 | 15.65 | 53.31 | 7.15 | A |
| Comparative Example III-1 | 0.12 | 7.25 | 62.61 | 0.84 | 4,640 | 18.01 | 57.81 | 7.19 | C |
| Comparative Example III-2 | 0 | — | — | 0 | 5,044 | 14.62 | 66.44 | 7.17 | A |
| Comparative Example III-3 | 1.39 | 7.25 | 5.22 | 1.66 | 1,944 | 17.83 | 60.57 | 3.24 | A |
| Comparative Example III-4 | 0.14 | 125 | 900 | 0.67 | 5,044 | 15.30 | 54.67 | 6.77 | A |
| Comparative Example III-5 | 1.67 | 20.55 | 12.33 | 8.03 | 5,044 | 18.07 | 48.44 | 3.02 | A |
| Comparative Example III-6 | 1.67 | 7.25 | 4.35 | 8.03 | 5,044 | 18.48 | 55.14 | 4.78 | A |
| Comparative Example III-7 | 1.67 | 28.04 | 16.82 | 8.03 | 5,044 | 18.39 | 51.15 | 3.20 | A |
| Comparative Example III-8 | 1.74 | 7.25 | 4.15 | 9.11 | 4,402 | 18.21 | 62.79 | 3.84 | A |
| Comparative Example III-9 | 1.32 | 7.25 | 5.47 | 3.88 | 5,327 | 18.19 | 60.40 | 4.85 | A |
| Comparative Example III-10 | 0.14 | 26.32 | 189.47 | 0.67 | 5,044 | 14.74 | 54.80 | 7.15 | A |
| Comparative Example III-11 | 0.14 | 3.25 | 23.38 | 0.67 | 5,044 | 14.41 | 50.07 | 7.15 | A |
| Comparative Example III-12 | 0.14 | 15.15 | 109.09 | 0.67 | 5,044 | 14.94 | 60.57 | 7.35 | A |
| Comparative Example III-13 | 0.14 | 0.1 | 0.74 | 0.67 | 5,044 | 15.25 | 50.89 | 7.15 | A |
| Comparative Example III-14 | 0.14 | 20.83 | 150 | 0.67 | 5,044 | 12.76 | 15.90 | 5.25 | C |
| Comparative Example III-15 | 0.14 | 20.83 | 150 | 0.67 | 5,044 | 11.46 | 44.88 | 5.45 | C |

Example III-24

A multilayer container produced by using the EVOH resin composition and the multilayer structure produced in Example III-2 was evaluated for its impact strength as described below.

[Impact Resistance Evaluation of Multilayer Container]

Water is filled into the multilayer container produced in the foregoing, and the container is subjected to heat sealing with a lid material made of an aluminum sealant. After that, a dart (φ38 mm, 600 g) is dropped from a height of 100 cm toward the multilayer container by using a dart impact tester (manufactured by Toyo Seiki Seisaku-sho, Ltd.). The impact resistance of the multilayer container was evaluated by visually observing the appearance of the multilayer container after the dropping of the dart on the basis of the following evaluation criteria. The result is shown in Table III-2.

A: The multilayer container did not break.
B: The multilayer container did not break, but a slight crack occurred therein.
C: The multilayer container broke.

Example III-25

An EVOH resin composition and a multilayer container were produced in the same manner as in Example III-24 other than that the EVOH resin composition produced in Example III-7 was used. The resultant multilayer container was evaluated in the same manner as in Example III-24.

Example III-26

An EVOH resin composition and a multilayer container were produced in the same manner as in Example III-24 other than that the EVOH resin composition produced in Example III-14 was used. The resultant multilayer container was evaluated in the same manner as in Example III-24.

Example III-27

An EVOH resin composition and a multilayer container were produced in the same manner as in Example III-24 other than that the EVOH resin composition produced in Example III-16 was used. The resultant multilayer container was evaluated in the same manner as in Example III-24.

Comparative Example III-16

An EVOH resin composition and a multilayer container were produced in the same manner as in Example III-24 other than that the EVOH resin composition produced in Comparative Example III-1 was used. The resultant multilayer container was evaluated in the same manner as in Example III-24.

Comparative Example III-17

An EVOH resin composition and a multilayer container were produced in the same manner as in Example III-24 other than that the EVOH resin composition produced in Comparative Example III-2 was used. The resultant multilayer container was evaluated in the same manner as in Example III-24.

TABLE III-2

| | Impact resistance of multilayer container |
|---|---|
| Example III-24 | A |
| Example III-25 | A |
| Example III-26 | A |
| Example III-27 | B |
| Comparative Example III-16 | C |
| Comparative Example III-17 | C |

In Comparative Example III-1 free of two or more kinds of ethylene-vinyl alcohol copolymers having different ethylene structural unit contents, the secondary formability was poor. In Comparative Example III-2 free of the aliphatic carboxylic acid metal salt (D), the impact strength was 14.62 (kgf·cm). In contrast, in Comparative Example III-3 containing the aliphatic carboxylic acid metal salt (D), and containing only an extremely small amount of the acetic acid and/or the salt thereof (B), the impact strength increased to 17.83 (kgf·cm). However, the adhesive strength (N/15 mm) reduced to 3.24.

In addition, in Comparative Examples III-3 and III-5 to III-9 each of which did not satisfy the formula (1) specified in the present disclosure, the adhesive strengths were low. In Comparative Examples III-4 and III-13 each of which did not satisfy the formula (2) specified in the present disclosure, the impact strengths were low.

Further, also in Comparative Examples III-10 to III-12 in each of which the metal species of the aliphatic carboxylic acid metal salt (D) was not one kind selected from the long Periodic Table 4th-period d-block elements, the impact strengths were low.

In addition, in each of Comparative Examples III-14 and III-15 in each of which the aliphatic carboxylic acid (C) and the anion species of the aliphatic carboxylic acid metal salt (D) were not of the same species, the impact strength and the adhesive strength were low, and moreover, the color tone stability was low.

In contrast, each of the EVOH resin compositions (Examples III-1 to III-23) each having the characteristic configuration of the present disclosure was not reduced in adhesive strength and showed an excellent value therefor while being excellent in impact strength. Further, each of the compositions was not reduced in color tone stability. In addition, each of the compositions was excellent in secondary formability.

Further, each of the multilayer containers (Examples III-24 to III-27) of the present disclosure was excellent in impact strength against a falling object.

Multilayer containers were produced by using the multilayer structures of the respective Examples obtained in the foregoing. Each of the resultant multilayer containers was excellent in impact resistance and adhesive strength.

<<Fourth Mode in which EVOH Resin Composition Further Includes Cinnamic Acid and/or Salt Thereof (G), and Satisfies the Formula (5)>>

Example IV-1

[Production of EVOH Resin Composition]

A pellet of the EVOH (a1) [ethylene-vinyl alcohol copolymer having an ethylene structural unit content of 29 mol %, a saponification degree of 99.7 mol %, and a MFR of 3.8 g/10 min (210° C., load: 2,160 g)], which contained the EVOH (a1) as the EVOH (A), and contained the sodium acetate (b1) as the acetic acid and/or the salt thereof (B), was used. In addition, the stearic acid (c1) was used as the aliphatic carboxylic acid (C), the zinc stearate (d1) was used as the aliphatic carboxylic acid metal salt (D), trans-cinnamic acid (g1) was used as the cinnamic acid and/or the salt thereof (G), and the boric acid (f1) was used as the boric acid and/or the salt thereof (F).

In addition, with regard to the contents of the respective components, the sodium acetate (b1) was used at a content of 432 ppm in terms of acetic acid ion with respect to the total sum of the contents of the EVOH (a1), the sodium acetate (b1), the stearic acid (c1), the zinc stearate (d1), and the trans-cinnamic acid (g1), the stearic acid (c1) was used at a content of 2.4 ppm in terms of carboxylic acid ion with respect to the total sum of the contents of the EVOH (a1), the sodium acetate (b1), the stearic acid (c1), the zinc stearate (d1), and the trans-cinnamic acid (g1), the zinc stearate (d1) was used at a content of 50 ppm in terms of metal ion with respect to the total sum of the contents of the EVOH (a1), the sodium acetate (b1), the stearic acid (c1), the zinc stearate (d1), and the trans-cinnamic acid (g1), the trans-cinnamic acid (g1) was used at a content of 150 ppm in terms of cinnamic acid ion with respect to the total sum of the contents of the EVOH (a1), the sodium acetate (b1), the stearic acid (c1), the zinc stearate (d1), and the trans-cinnamic acid (g1), and the boric acid (f1) was used at a content of 59.45 ppm in terms of boron with respect to the total sum of the contents of the EVOH (a1), the sodium acetate (b1), the stearic acid (c1), the zinc stearate (d1), the trans-cinnamic acid (g1), and the boric acid (f1). The pellet of the EVOH (a1), the stearic acid (c1), the zinc stearate (d1), the trans-cinnamic acid (g1), and the boric acid (f1) were collectively dry-blended to produce an EVOH resin composition of the present disclosure.

[Multilayer Structure Production 1]

The EVOH resin composition prepared in the foregoing, linear low-density polyethylene (LLDPE) ["UF240" manufactured by Japan Polyethylene Corporation, MFR: 2.1 g/10 min (190° C., load: 2,160 g)], and an adhesive resin ("PLEXAR PX3236" manufactured by LyondellBasell Industries N.V., MFR: 2.0 g/10 min [190° C., load: 2,160 g]) were supplied to a three-kind and five-layer multilayer coextrusion cast film-forming apparatus, and were subjected to multilayer coextrusion under the following conditions to provide a multilayer structure (film) of a three-kind and five-layer structure "LLDPE layer/adhesive resin layer/EVOH resin composition layer/adhesive resin layer/LLDPE layer." The thicknesses (μm) of the respective layers of the multilayer structure were 37.5/5/15/5/37.5. All the die temperatures of forming apparatus were set to 210° C.

(Multilayer Coextrusion Conditions)
  Intermediate layer extruder (EVOH resin composition):
    40 mmφ single-screw extruder (barrel temperature: 210° C.)
  Upper and lower layer extruder (LLDPE): 40 mmφ single-screw extruder (barrel temperature: 210° C.)
  Medium upper and lower layer extruder (adhesive resin):
    32 mmφ single-screw extruder (barrel temperature: 210° C.)
  Die: three-kind and five-layer feed block-type T-die (die temperature: 210° C.)
  Drawing speed: 9.0 m/min
  Roll temperature: 80° C.

The EVOH resin composition obtained in the foregoing was subjected to the following color tone stability evaluation test and elongation viscosity evaluation test, and the multilayer structure obtained in the foregoing was subjected to the following impact strength evaluation test, adhesive strength evaluation test, and light fastness evaluation test.

<Color Tone Stability Evaluation of EVOH Resin Composition>

5 Grams of the EVOH resin composition produced in the foregoing was loaded into a 30 mmφ aluminum cup (manufactured by AS ONE Corporation, DISPODISH PP-724), and was left at rest under an air atmosphere at 210° C.; for 2 hours to provide a sample. The sample was subjected to a color tone evaluation. The color tone evaluation was performed on the basis of the following apparatus and evaluation method.

Used instrument: VISUAL ANALYZER IRISVA400 (manufactured by Alpha M.O.S. Japan K.K.)
Data analysis software: Alpha Soft V14.3
Objective lens: 25 mm (manufactured by Basler AG)
Lighting mode: Upper and lower lighting
Measurement method: The sample for a color tone evaluation was set in a tray in the chamber of the VISUAL ANALYZER, and a plane image of the entirety of the sample for a color tone evaluation was taken with a CCD camera. After that, the color pattern of the sample was evaluated by processing the image with the data analysis software. The color tone stability of the EVOH resin composition was evaluated from the lightness (L*) of a color having the highest abundance ratio among the resultant color pattern (main color).

A higher numerical value of the color tone stability means that the composition is more excellent in color tone stability. In contrast, a lower numerical value thereof means that the composition is poorer in color tone stability. The result is shown in Table IV-1-2.

<Evaluation of Elongation Viscosity (Pa·s) of EVOH Resin Composition>

The elongation viscosity (Pa·s) of the EVOH resin composition produced in the foregoing at 210° C.; and 100 s$^{-1}$ was evaluated by performing measurement with a capillary-type rheometer on the basis of Cogswell's equations [Polymer Engineering Science, vol. 12, pp. 64 to 73 (1972)], that is, the following equations (IV5) to (IV7) under the following conditions. The result is shown in Table IV-1-2.

(Cogswell's Equations)

$$\eta_e = [9(n+1)^2 P_0^2]/[32\eta_s(d\gamma/dt)^2] \quad \text{Equation (IV5)}$$

$$d\varepsilon/dt = 4\sigma_s(d\gamma/dt)/[3(n+1)P_0] \quad \text{Equation (IV6)}$$

$$\sigma_s = k(d\gamma/dt)^n \quad \text{Equation (IV7)}$$

$\eta_e$: elongation viscosity (Pa·s)
$\eta_s$: shear viscosity (Pa·s)
$d\gamma/dt$: shear strain rate (s$^{-1}$)
$d\varepsilon/dt$: elongation strain rate (s$^{-1}$)
$\sigma_s$: shear stress (Pa)
"k" and "n": constants
$P_0$: pressure loss (Pa)

(Conditions for Measurement of Elongation Viscosity)
Measuring apparatus: RHEOGRAPH 20 manufactured by Gottfert Werkstoff-Prufmaschinen GmbH
Measurement temperature: 210° C.
Preheating time: 10 minutes
Long die: die having a length of 10 mm, a diameter of 1 mm, and an inlet angle of 180°
Short die: die having a length of 0.2 mm, a diameter of 1 mm, and an inlet angle of 180°

<Impact Strength of Multilayer Structure>

The impact strength (kgf·cm) of the multilayer structure produced in the foregoing was evaluated with a YSS-type film impact tester (manufactured by Yasuda Seiki Seisakusho, Ltd., MODEL 181) under an atmosphere at 23° C.; and 50% RH. The measurement was performed a total of ten times, and the average of the measured values was evaluated as the impact strength of the multilayer structure. A clamp having an inner diameter of 60 mm and an impact ball having a radius of 12.7 mm were used, and the angle of fall of a pendulum was set to 90°. A higher numerical value of the impact strength of the multilayer structure means that the structure is more excellent in impact strength. In contrast, a lower numerical value thereof means that the structure is poorer in impact strength. The result is shown in Table IV-1-2.

<Adhesive Strength of Multilayer Structure>

An adhesive strength (N/15 mm) between the EVOH resin composition layer and each adhesive resin layer in the multilayer structure produced in the foregoing was evaluated by the following T-peel peel test. The measurement was performed a total of ten times, and the average of the measured values was evaluated as the adhesive strength of the multilayer structure. A higher numerical value of the adhesive strength of the multilayer structure means that the structure is more excellent in adhesive strength. In contrast, a lower numerical value thereof means that the structure is poorer in adhesive strength. The result is shown in Table IV-1-2.

(Conditions for T-Peel Peel Test)
Apparatus: Autograph AGS-H (manufactured by Shimadzu Corporation)
Load cell: 500 N
Test method: T-peel method (peeled in a T-shape)
Test piece size: 15 mm in width
Test speed: 300 mm/min <Light Fastness of Multilayer Structure>

With regard to the light fastness of the multilayer structure produced in the foregoing, the transmittance (%) thereof at a wavelength of 280 nm (UV region) was measured with a spectrophotometer "UV2600" manufactured by Shimadzu Corporation. In addition, a multilayer structure serving as a reference was produced by the same procedure, and its transmittance (%) was similarly measured.

After that, a UV absorption increase ratio (Z) was calculated by using the following equation (8), and the light fastness of the multilayer structure was evaluated on the basis of the following evaluation criteria. A higher numerical value of the UV absorption increase ratio (Z) means that the multilayer structure is more excellent in light fastness. In contrast, a lower numerical value thereof means that the structure is poorer in light fastness. The result is shown in Table IV-1-2.

A: UV absorption increase ratio (Z)≥2
B: 1.5≤UV absorption increase ratio (Z)<2
C: UV absorption increase ratio (Z)<1.5

$$\text{UV absorption increase ratio } (Z) = [(\text{UV transmittance of reference film})/(\text{UV transmittance of multilayer structure of Example IV-1})] \quad \text{Equation (8)}$$

Example IV-2

An EVOH resin composition and a multilayer structure were produced in the same manner as in Example IV-1 except that the stearic acid (c1) was used at a content of 0.7 ppm in terms of carboxylic acid ion with respect to the total sum of the contents of the EVOH (a1), the sodium acetate (b1), the stearic acid (c1), the zinc stearate (d1), and the trans-cinnamic acid (g1). The resultant EVOH resin composition and multilayer structure were evaluated in the same manner as in Example IV-1.

Example IV-3

An EVOH resin composition and a multilayer structure were produced in the same manner as in Example IV-1 except that: the stearic acid (c1) was used at a content of 4.9 ppm in terms of carboxylic acid ion with respect to the total sum of the contents of the EVOH (a1), the sodium acetate (b1), the stearic acid (c1), the zinc stearate (d1), and the trans-cinnamic acid (g1); and the zinc stearate (d1) was used at a content of 100 ppm in terms of metal ion with respect to the total sum of the contents of the EVOH (a1), the sodium acetate (b1), the stearic acid (c1), the zinc stearate (d1), and the trans-cinnamic acid (g1). The resultant EVOH resin composition and multilayer structure were evaluated in the same manner as in Example IV-1.

Example IV-4

An EVOH resin composition and a multilayer structure were produced in the same manner as in Example IV-1 except that: the stearic acid (c1) was used at a content of 9.7 ppm in terms of carboxylic acid ion with respect to the total sum of the contents of the EVOH (a1), the sodium acetate (b1), the stearic acid (c1), the zinc stearate (d1), and the trans-cinnamic acid (g1); and the zinc stearate (d1) was used at a content of 200 ppm in terms of metal ion with respect to the total sum of the contents of the EVOH (a1), the sodium acetate (b1), the stearic acid (c1), the zinc stearate (d1), and the trans-cinnamic acid (g1). The resultant EVOH resin composition and multilayer structure were evaluated in the same manner as in Example IV-1.

Example IV-5

An EVOH resin composition and a multilayer structure were produced in the same manner as in Example IV-1 except that: the caprylic acid (c2) was used instead of the stearic acid (c1) at a content of 6.9 ppm in terms of carboxylic acid ion with respect to the total sum of the contents of the EVOH (a1), the sodium acetate (b1), the caprylic acid (c2), the zinc caprylate (d2), and the trans-cinnamic acid (g1); the zinc caprylate (d2) was used instead of the zinc stearate (d1) at a content of 50 ppm in terms of metal ion with respect to the total sum of the contents of the EVOH (a1), the sodium acetate (b1), the caprylic acid (c2), the zinc caprylate (d2), and the trans-cinnamic acid (g1); and the trans-cinnamic acid (g1) was used at a content of 5 ppm in terms of cinnamic acid ion with respect to the total sum of the contents of the EVOH (a1), the sodium acetate (b1), the caprylic acid (c2), the zinc caprylate (d2), and the trans-cinnamic acid (g1). The resultant EVOH resin composition and multilayer structure were evaluated in the same manner as in Example IV-1.

Example IV-6

An EVOH resin composition and a multilayer structure were produced in the same manner as in Example IV-5 except that the trans-cinnamic acid (g1) was used at a content of 20 ppm in terms of cinnamic acid ion with respect to the total sum of the contents of the EVOH (a1), the sodium acetate (b1), the caprylic acid (c2), the zinc caprylate (d2), and the trans-cinnamic acid (g1). The resultant EVOH resin composition and multilayer structure were evaluated in the same manner as in Example IV-1.

Example IV-7

An EVOH resin composition and a multilayer structure were produced in the same manner as in Example IV-5 except that the trans-cinnamic acid (g1) was used at a content of 150 ppm in terms of cinnamic acid ion with respect to the total sum of the contents of the EVOH (a1), the sodium acetate (b1), the caprylic acid (c2), the zinc caprylate (d2), and the trans-cinnamic acid (g1). The resultant EVOH resin composition and multilayer structure were evaluated in the same manner as in Example IV-1.

Example IV-8

An EVOH resin composition and a multilayer structure were produced in the same manner as in Example IV-5 except that the trans-cinnamic acid (g1) was used at a content of 1,000 ppm in terms of cinnamic acid ion with respect to the total sum of the contents of the EVOH (a1), the sodium acetate (b1), the caprylic acid (c2), the zinc caprylate (d2), and the trans-cinnamic acid (g1). The resultant EVOH resin composition and multilayer structure were evaluated in the same manner as in Example IV-1.

Example IV-9

An EVOH resin composition and a multilayer structure were produced in the same manner as in Example IV-5 except that: the trans-cinnamic acid (g1) was used at a content of 150 ppm in terms of cinnamic acid ion with respect to the total sum of the contents of the EVOH (a1), the sodium acetate (b1), the caprylic acid (c2), the zinc caprylate (d2), and the trans-cinnamic acid (g1); and the boric acid (f1) was used at a content of 300 ppm in terms of boron with respect to the total sum of the contents of the EVOH (a1), the sodium acetate (b1), the caprylic acid (c2), the zinc caprylate (d2), the trans-cinnamic acid (g1), and the boric acid (f1). The resultant EVOH resin composition and multilayer structure were evaluated in the same manner as in Example IV-1.

Example IV-10

An EVOH resin composition and a multilayer structure were produced in the same manner as in Example IV-5 except that: the trans-cinnamic acid (g1) was used at a content of 150 ppm in terms of cinnamic acid ion with respect to the total sum of the contents of the EVOH (a1), the sodium acetate (b1), the caprylic acid (c2), the zinc caprylate (d2), and the trans-cinnamic acid (g1); the caprylic acid (c2) was used at a content of 13.8 ppm in terms of carboxylic acid ion with respect to the total sum of the contents of the EVOH (a1), the sodium acetate (b1), the caprylic acid (c2), the zinc caprylate (d2), and the trans-cinnamic acid (g1); and the zinc caprylate (d2) was used at a content of 100 ppm in terms of metal ion with respect to the total sum of the contents of the EVOH (a1), the sodium acetate (b1), the caprylic acid (c2), the zinc caprylate (d2), and the trans-cinnamic acid (g1). The resultant EVOH resin composition and multilayer structure were evaluated in the same manner as in Example IV-1.

Example IV-11

An EVOH resin composition and a multilayer structure were produced in the same manner as in Example IV-10 except that: the sodium acetate (b1) was used at a content of 100 ppm in terms of acetic acid ion with respect to the total sum of the contents of the EVOH (a1), the sodium acetate (b1), the caprylic acid (c2), the zinc caprylate (d2), and the trans-cinnamic acid (g1); and the boric acid (f1) was used at a content of 13.7 ppm in terms of boron with respect to the total sum of the contents of the EVOH (a1), the sodium acetate (b1), the caprylic acid (c2), the zinc caprylate (d2), the trans-cinnamic acid (g1), and the boric acid (f1). The resultant EVOH resin composition and multilayer structure were evaluated in the same manner as in Example IV-1.

Example IV-12

An EVOH resin composition and a multilayer structure were produced in the same manner as in Example IV-10 except that: the caprylic acid (c2) was used at a content of 27.6 ppm in terms of carboxylic acid ion with respect to the total sum of the contents of the EVOH (a1), the sodium acetate (b1), the caprylic acid (c2), the zinc caprylate (d2), and the trans-cinnamic acid (g1); and the zinc caprylate (d2) was used at a content of 200 ppm in terms of metal ion with respect to the total sum of the contents of the EVOH (a1), the sodium acetate (b1), the caprylic acid (c2), the zinc caprylate (d2), and the trans-cinnamic acid (g1). The resultant EVOH resin composition and multilayer structure were evaluated in the same manner as in Example IV-1.

Example IV-13

An EVOH resin composition and a multilayer structure were produced in the same manner as in Example IV-1 except that: the lauric acid (c3) was used instead of the stearic acid (c1) at a content of 1.8 ppm in terms of carboxylic acid ion with respect to the total sum of the contents of the EVOH (a1), the sodium acetate (b1), the lauric acid (c3), the zinc laurate (d3), and the trans-cinnamic acid (g1); and the zinc laurate (d3) was used instead of the zinc stearate (d1) at a content of 50 ppm in terms of metal ion with respect to the total sum of the contents of the EVOH (a1), the sodium acetate (b1), the lauric acid (c3), the zinc laurate (d3), and the trans-cinnamic acid (g1). The resultant EVOH resin composition and multilayer structure were evaluated in the same manner as in Example IV-1.

Example I-14

An EVOH resin composition and a multilayer structure were produced in the same manner as in Example IV-13 except that: the lauric acid (c3) was used at a content of 3.6 ppm in terms of carboxylic acid ion with respect to the total sum of the contents of the EVOH (a1), the sodium acetate (b1), the lauric acid (c3), the zinc laurate (d3), and the trans-cinnamic acid (g1); and the zinc laurate (d3) was used at a content of 100 ppm in terms of metal ion with respect to the total sum of the contents of the EVOH (a1), the sodium acetate (b1), the lauric acid (c3), the zinc laurate (d3), and the trans-cinnamic acid (g1). The resultant EVOH resin composition and multilayer structure were evaluated in the same manner as in Example IV-1.

Example IV-15

An EVOH resin composition and a multilayer structure were produced in the same manner as in Example IV-13 except that: the lauric acid (c3) was used at a content of 7.1 ppm in terms of carboxylic acid ion with respect to the total sum of the contents of the EVOH (a1), the sodium acetate (b1), the lauric acid (c3), the zinc laurate (d3), and the trans-cinnamic acid (g1); and the zinc laurate (d3) was used at a content of 200 ppm in terms of metal ion with respect to the total sum of the contents of the EVOH (a1), the sodium acetate (b1), the lauric acid (c3), the zinc laurate (d3), and the trans-cinnamic acid (g1). The resultant EVOH resin composition and multilayer structure were evaluated in the same manner as in Example IV-1.

Example IV-16

An EVOH resin composition and a multilayer structure were produced in the same manner as in Example IV-1 except that: the behenic acid (c5) was used instead of the stearic acid (c1) at a content of 2.9 ppm in terms of carboxylic acid ion with respect to the total sum of the contents of the EVOH (a1), the sodium acetate (b1), the behenic acid (c5), the zinc behenate (d5), and the trans-cinnamic acid (g1); and the zinc behenate (d5) was used instead of the zinc stearate (d1) at a content of 50 ppm in terms of metal ion with respect to the total sum of the contents of the EVOH (a1), the sodium acetate (b1), the behenic acid (c5), the zinc behenate (d5), and the trans-cinnamic acid (g1). The resultant EVOH resin composition and multilayer structure were evaluated in the same manner as in Example IV-1.

Example IV-17

An EVOH resin composition and a multilayer structure were produced in the same manner as in Example IV-7 except that the caprylic acid (c2) was used at a content of 269 ppm in terms of carboxylic acid ion with respect to the total sum of the contents of the EVOH (a1), the sodium acetate (b1), the caprylic acid (c2), the zinc caprylate (d2), and the trans-cinnamic acid (g1). The resultant EVOH resin composition and multilayer structure were evaluated in the same manner as in Example IV-1.

Example IV-18

An EVOH resin composition and a multilayer structure were produced in the same manner as in Example IV-13 except that the lauric acid (c3) was used at a content of 355 ppm in terms of carboxylic acid ion with respect to the total sum of the contents of the EVOH (a1), the sodium acetate (b1), the lauric acid (c3), the zinc laurate (d3), and the trans-cinnamic acid (g1). The resultant EVOH resin composition and multilayer structure were evaluated in the same manner as in Example IV-1.

Comparative Example IV-1

An EVOH resin composition and a multilayer structure were produced in the same manner as in Example IV-7 except that the trans-cinnamic acid (g1) was not used. The resultant EVOH resin composition and multilayer structure were evaluated in the same manner as in Example IV-1.

Comparative Example IV-2

An EVOH resin composition and a multilayer structure were produced in the same manner as in Example IV-7 except that the trans-cinnamic acid (g1) was used at a content of 5,000 ppm in terms of cinnamic acid ion with respect to the total sum of the contents of the EVOH (a1), the sodium acetate (b1), the caprylic acid (c2), the zinc caprylate (d2), and the trans-cinnamic acid (g1). The resultant EVOH resin composition and multilayer structure were evaluated in the same manner as in Example IV-1.

Comparative Example IV-3

An EVOH resin composition and a multilayer structure were produced in the same manner as in Example IV-7 except that the caprylic acid (c2) and the zinc caprylate (d2) were not used. The resultant EVOH resin composition and multilayer structure were evaluated in the same manner as in Example IV-1.

Comparative Example IV-4

An EVOH resin composition and a multilayer structure were produced in the same manner as in Example IV-7 except that the sodium acetate (b1) and the boric acid (f1) were not used. The resultant EVOH resin composition and multilayer structure were evaluated in the same manner as in Example IV-1.

Comparative Example IV-5

An EVOH resin composition and a multilayer structure were produced in the same manner as in Example IV-7 except that: the caprylic acid (c2) was used at a content of 82.8 ppm in terms of carboxylic acid ion with respect to the total sum of the contents of the EVOH (a1), the sodium acetate (b1), the caprylic acid (c2), the zinc caprylate (d2), and the trans-cinnamic acid (g1); and the zinc caprylate (d2) was used at a content of 600 ppm in terms of metal ion with respect to the total sum of the contents of the EVOH (a1), the sodium acetate (b1), the caprylic acid (c2), the zinc caprylate (d2), and the trans-cinnamic acid (g1). The resultant EVOH resin composition and multilayer structure were evaluated in the same manner as in Example IV-1.

Comparative Example IV-6

An EVOH resin composition and a multilayer structure were produced in the same manner as in Example IV-13 except that: the lauric acid (c3) was used at a content of 21.4 ppm in terms of carboxylic acid ion with respect to the total sum of the contents of the EVOH (a1), the sodium acetate (b1), the lauric acid (c3), the zinc laurate (d3), and the trans-cinnamic acid (g1); and the zinc laurate (d3) was used at a content of 600 ppm in terms of metal ion with respect to the total sum of the contents of the EVOH (a1), the sodium acetate (b1), the lauric acid (c3), the zinc laurate (d3), and the trans-cinnamic acid (g1). The resultant EVOH resin composition and multilayer structure were evaluated in the same manner as in Example IV-1.

Comparative Example IV-7

An EVOH resin composition and a multilayer structure were produced in the same manner as in Example IV-1 except that: the stearic acid (c1) was used at a content of 29.2 ppm in terms of carboxylic acid ion with respect to the total sum of the contents of the EVOH (a1), the sodium acetate (b1), the stearic acid (c1), the zinc stearate (d1), and the trans-cinnamic acid (g1); and the zinc stearate (d1) was used at a content of 600 ppm in terms of metal ion with respect to the total sum of the contents of the EVOH (a1), the sodium acetate (b1), the stearic acid (c1), the zinc stearate (d1), and the trans-cinnamic acid (g1). The resultant EVOH resin composition and multilayer structure were evaluated in the same manner as in Example IV-1.

Comparative Example IV-8

An EVOH resin composition and a multilayer structure were produced in the same manner as in Example IV-1 except that: the stearic acid (c1) was used at a content of 1.9 ppm in terms of carboxylic acid ion with respect to the total sum of the contents of the EVOH (a1), the sodium acetate (b1), the stearic acid (c1), calcium stearate, and the trans-cinnamic acid (g1); and calcium stearate was used at a content of 50 ppm in terms of metal ion with respect to the total sum of the contents of the EVOH (a1), the sodium acetate (b1), the stearic acid (c1), calcium stearate, and the trans-cinnamic acid (g1). The resultant EVOH resin composition and multilayer structure were evaluated in the same manner as in Example IV-1.

Comparative Example IV-9

An EVOH resin composition and a multilayer structure were produced in the same manner as in Example IV-1 except that: the stearic acid (c1) was used at a content of 15.4 ppm in terms of carboxylic acid ion with respect to the total sum of the contents of the EVOH (a1), the sodium acetate (b1), the stearic acid (c1), magnesium stearate, and the trans-cinnamic acid (g1); and magnesium stearate was used instead of the zinc stearate (d1) at a content of 50 ppm in terms of metal ion with respect to the total sum of the contents of the EVOH (a1), the sodium acetate (b1), the stearic acid (c1), magnesium stearate, and the trans-cinnamic acid (g1). The resultant EVOH resin composition and multilayer structure were evaluated in the same manner as in Example IV-1.

Comparative Example IV-10

An EVOH resin composition and a multilayer structure were produced in the same manner as in Example IV-1 except that: the stearic acid (c1) was used at a content of 30.3 ppm in terms of carboxylic acid ion with respect to the total sum of the contents of the EVOH (a1), the sodium acetate (b1), the stearic acid (c1), sodium stearate, and the trans-cinnamic acid (g1); and sodium stearate was used instead of the zinc stearate (d1) at a content of 50 ppm in terms of metal ion with respect to the total sum of the contents of the EVOH (a1), the sodium acetate (b1), the stearic acid (c1), sodium stearate, and the trans-cinnamic acid (g1). The resultant EVOH resin composition and multilayer structure were evaluated in the same manner as in Example IV-1.

Comparative Example IV-11

An EVOH resin composition and a multilayer structure were produced in the same manner as in Example IV-1 except that the stearic acid (c1) was used at a content of 483.6 ppm in terms of carboxylic acid ion with respect to the total sum of the contents of the EVOH (a1), the sodium acetate (b1), the stearic acid (c1), the zinc stearate (d1), and the trans-cinnamic acid (g1). The resultant EVOH resin composition and multilayer structure were evaluated in the same manner as in Example IV-1.

Comparative Example IV-12

An EVOH resin composition and a multilayer structure were produced in the same manner as in Example IV-1 except that the stearic acid (c1) was used at a content of 0.4 ppm in terms of carboxylic acid ion with respect to the total sum of the contents of the EVOH (a1), the sodium acetate (b1), the stearic acid (c1), the zinc stearate (d1), and the trans-cinnamic acid (g1). The resultant EVOH resin composition and multilayer structure were evaluated in the same manner as in Example IV-1.

Comparative Example IV-13

An EVOH resin composition and a multilayer structure were produced in the same manner as in Example IV-1 except that zinc gluconate trihydrate was used instead of the zinc stearate (d1) at a content of 50 ppm in terms of metal ion with respect to the total sum of the contents of the EVOH (a1), the sodium acetate (b1), the stearic acid (c1), zinc gluconate trihydrate, and the trans-cinnamic acid (g1). The resultant EVOH resin composition and multilayer structure were evaluated in the same manner as in Example IV-1.

Comparative Example IV-14

An EVOH resin composition and a multilayer structure were produced in the same manner as in Example IV-1 except that zinc citrate dihydrate was used instead of the zinc stearate (d1) at a content of 50 ppm in terms of metal ion with respect to the total sum of the contents of the EVOH (a1), the sodium acetate (b1), the stearic acid (c1), zinc citrate dihydrate, and the trans-cinnamic acid (g1). The resultant EVOH resin composition and multilayer structure were evaluated in the same manner as in Example IV-1.

TABLE IV-1-1

| | Ethylene content of EVOH (A) (mol %) | Content of cinnamic acid and/or cinnamic acid salt (G) (in terms of cinnamic acid ion) [ppm] | Content of acetic acid and/or acetic acid salt (B) (in terms of acetic acid ion) [ppm] | Aliphatic carboxylic acid (C) | Content of (C) (in terms of carboxylic acid ion) [ppm] | Aliphatic carboxylic acid metal salt (D) | Content of (D) (in terms of metal ion) [ppm] | Content of boric acid and/or boric acid salt (F) (in terms of boron) [ppm] |
|---|---|---|---|---|---|---|---|---|
| Example IV-1 | 29 | 150 | 432 | Stearic acid | 2.4 | Zinc stearate | 50 | 59.45 |
| Example IV-2 | 29 | 150 | 432 | Stearic acid | 0.7 | Zinc stearate | 50 | 59.45 |
| Example IV-3 | 29 | 150 | 432 | Stearic acid | 4.9 | Zinc stearate | 100 | 59.45 |
| Example IV-4 | 29 | 150 | 432 | Stearic acid | 9.7 | Zinc stearate | 200 | 59.45 |
| Example IV-5 | 29 | 5 | 432 | Caprylic acid | 6.9 | Zinc caprylate | 50 | 59.45 |
| Example IV-6 | 29 | 20 | 432 | Caprylic acid | 6.9 | Zinc caprylate | 50 | 59.45 |
| Example IV-7 | 29 | 150 | 432 | Caprylic acid | 6.9 | Zinc caprylate | 50 | 59.45 |
| Example IV-8 | 29 | 1,000 | 432 | Caprylic acid | 6.9 | Zinc caprylate | 50 | 59.45 |
| Example IV-9 | 29 | 150 | 432 | Caprylic acid | 6.9 | Zinc caprylate | 50 | 300 |
| Example IV-10 | 29 | 150 | 432 | Caprylic acid | 13.8 | Zinc caprylate | 100 | 59.45 |
| Example IV-11 | 29 | 150 | 100 | Caprylic acid | 13.8 | Zinc caprylate | 100 | 13.7 |
| Example IV-12 | 29 | 150 | 432 | Caprylic acid | 27.6 | Zinc caprylate | 200 | 59.45 |
| Example IV-13 | 29 | 150 | 432 | Lauric acid | 1.8 | Zinc laurate | 50 | 59.45 |
| Example IV-14 | 29 | 150 | 432 | Lauric acid | 3.6 | Zinc laurate | 100 | 59.45 |
| Example IV-15 | 29 | 150 | 432 | Lauric acid | 7.1 | Zinc laurate | 200 | 59.45 |
| Example IV-16 | 29 | 150 | 432 | Behenic acid | 2.9 | Zinc behenate | 50 | 59.45 |
| Example IV-17 | 29 | 150 | 432 | Caprylic acid | 269 | Zinc caprylate | 50 | 59.45 |
| Example IV-18 | 29 | 150 | 432 | Lauric acid | 355 | Zinc laurate | 50 | 59.45 |
| Comparative Example IV-1 | 29 | 0 | 432 | Caprylic acid | 6.9 | Zinc caprylate | 50 | 59.45 |
| Comparative Example IV-2 | 29 | 5,000 | 432 | Caprylic acid | 6.9 | Zinc caprylate | 50 | 59.45 |
| Comparative Example IV-3 | 29 | 150 | 432 | — | 0 | — | 0 | 59.45 |
| Comparative Example IV-4 | 29 | 150 | 0 | Caprylic acid | 6.9 | Zinc caprylate | 50 | 0 |
| Comparative Example IV-5 | 29 | 150 | 432 | Caprylic acid | 82.8 | Zinc caprylate | 600 | 59.45 |
| Comparative Example IV-6 | 29 | 150 | 432 | Lauric acid | 21.4 | Zinc laurate | 600 | 59.45 |
| Comparative Example IV-7 | 29 | 150 | 432 | Stearic acid | 29.2 | Zinc stearate | 600 | 59.45 |
| Comparative Example IV-8 | 29 | 150 | 432 | Stearic acid | 1.9 | Calcium stearate | 50 | 59.45 |
| Comparative Example IV-9 | 29 | 150 | 432 | Stearic acid | 15.4 | Magnesium stearate | 50 | 59.45 |
| Comparative Example IV-10 | 29 | 150 | 432 | Stearic acid | 3.3 | Sodium stearate | 50 | 59.45 |
| Comparative Example IV-11 | 29 | 150 | 432 | Stearic acid | 483.6 | Zinc stearate | 50 | 59.45 |
| Comparative Example IV-12 | 29 | 150 | 432 | Stearic acid | 0.4 | Zinc stearate | 50 | 59.45 |
| Comparative Example IV-13 | 29 | 150 | 432 | Stearic acid | 2.4 | Zinc gluconate trihydrate | 50 | 59.45 |
| Comparative Example IV-14 | 29 | 150 | 432 | Stearic acid | 2.4 | Zinc citrate dihydrate | 50 | 59.45 |

TABLE IV-1-2

| | (D)/(G) | (D)/(B) | (D)/(C) | (G)/(B) | Elongation viscosity [Pa · s] (230° C., 100 S$^{-1}$) | Impact strength [kgf · cm] | Color tone stability (air atmosphere, 210° C., 2 hours) | Adhesive strength [N/15 mm] | Light fastness |
|---|---|---|---|---|---|---|---|---|---|
| Example IV-1 | 0.33 | 0.12 | 20.83 | 0.35 | 4,640 | 16.89 | 60.19 | 7.22 | A |
| Example IV-2 | 0.33 | 0.12 | 71.43 | 0.35 | 4,640 | 15.77 | 57.52 | 7.05 | A |
| Example IV-3 | 0.67 | 0.23 | 20.41 | 0.35 | 4,640 | 17.68 | 56.50 | 7.17 | A |
| Example IV-4 | 1.33 | 0.46 | 20.62 | 0.35 | 4,640 | 17.82 | 51.49 | 7.00 | A |
| Example IV-5 | 10 | 0.12 | 7.25 | 0.01 | 4,640 | 17.72 | 62.98 | 7.37 | B |
| Example IV-6 | 2.5 | 0.12 | 7.25 | 0.05 | 4,640 | 17.78 | 62.73 | 7.38 | B |
| Example IV-7 | 0.33 | 0.12 | 7.25 | 0.35 | 4,640 | 17.28 | 62.11 | 7.23 | A |
| Example IV-8 | 0.05 | 0.12 | 7.25 | 2.31 | 4,640 | 16.68 | 57.41 | 6.40 | A |
| Example IV-9 | 0.33 | 0.12 | 7.25 | 0.35 | 25,852 | 16.07 | 58.94 | 7.35 | A |
| Example IV-10 | 0.67 | 0.23 | 7.25 | 0.35 | 4,640 | 18.09 | 60.66 | 7.21 | A |
| Example IV-11 | 0.67 | 1 | 7.25 | 1.5 | 3,008 | 18.12 | 63.02 | 7.20 | A |
| Example IV-12 | 1.33 | 0.46 | 7.25 | 0.35 | 4,640 | 18.23 | 58.34 | 7.16 | A |
| Example IV-13 | 0.33 | 0.12 | 27.78 | 0.35 | 4,640 | 17.19 | 61.35 | 7.23 | A |
| Example IV-14 | 0.67 | 0.23 | 27.78 | 0.35 | 4,640 | 18.00 | 59.00 | 7.20 | A |
| Example IV-15 | 1.33 | 0.46 | 28.17 | 0.35 | 4,640 | 18.14 | 55.60 | 7.10 | A |
| Example IV-16 | 0.33 | 0.12 | 17.24 | 0.35 | 4,640 | 16.84 | 57.41 | 7.15 | A |
| Example IV-17 | 0.33 | 0.12 | 0.19 | 0.35 | 4,640 | 15.86 | 52.24 | 7.22 | A |
| Example IV-18 | 0.33 | 0.12 | 0.14 | 0.35 | 4,640 | 15.56 | 50.64 | 7.22 | A |
| Comparative Example IV-1 | ∞ | 0.12 | 7.25 | 0 | 4,640 | 18.01 | 57.81 | 7.19 | C |
| Comparative Example IV-2 | 0.01 | 0.12 | 7.25 | 11.57 | 4,640 | 6.11 | 27.95 | 3.70 | A |
| Comparative Example IV-3 | 0 | 0 | — | 0.35 | 4,640 | 14.50 | 63.12 | 7.24 | A |
| Comparative Example IV-4 | 0.33 | ∞ | 7.25 | ∞ | 4,640 | 17.19 | 57.55 | 3.08 | A |
| Comparative Example IV-5 | 4 | 1.39 | 7.25 | 0.35 | 4,640 | 18.33 | 52.38 | 4.54 | A |
| Comparative Example IV-6 | 4 | 1.39 | 28.04 | 0.35 | 4,640 | 18.24 | 48.59 | 3.04 | A |
| Comparative Example IV-7 | 4 | 1.39 | 20.55 | 0.35 | 4,640 | 17.92 | 46.02 | 2.87 | A |
| Comparative Example IV-8 | 0.33 | 0.12 | 26.32 | 0.35 | 4,640 | 14.66 | 52.06 | 7.22 | A |
| Comparative Example IV-9 | 0.33 | 0.12 | 3.25 | 0.35 | 4,640 | 14.34 | 47.57 | 7.22 | A |
| Comparative Example IV-10 | 0.33 | 0.12 | 15.15 | 0.35 | 4,640 | 14.86 | 57.55 | 7.42 | A |
| Comparative Example IV-11 | 0.33 | 0.12 | 0.1 | 0.35 | 4,640 | 15.17 | 48.35 | 7.22 | A |
| Comparative Example IV-12 | 0.33 | 0.12 | 125 | 0.35 | 4,640 | 14.69 | 49.79 | 6.95 | A |
| Comparative Example IV-13 | 0.33 | 0.12 | 20.83 | 0.35 | 4,640 | 12.70 | 15.10 | 4.99 | A |
| Comparative Example IV-14 | 0.33 | 0.12 | 20.83 | 0.35 | 4,640 | 11.41 | 42.63 | 5.18 | A |

Comparative Example IV-1 free of the cinnamic acid and/or the salt thereof (G) was poor in light fastness.

In addition, in Comparative Example IV-2 that did not satisfy the formula (5) specified in the present disclosure, the impact strength, the adhesive strength, and the color tone stability were low.

In addition, in Comparative Example IV-3 free of the aliphatic carboxylic acid metal salt (D), the impact strength was 14.50 (kgf·cm). In contrast, in Comparative Example IV-4 that contained the aliphatic carboxylic acid metal salt (D), and was free of the acetic acid and/or the salt thereof (B), the impact strength increased to 17.19 (kgf·cm). However, the adhesive strength reduced to 3.08 (N/15 mm).

In addition, in Comparative Examples IV-4 to IV-7 each of which did not satisfy the formula (1) specified in the present disclosure, the adhesive strengths were low. In Comparative Examples IV-11 and IV-12 each of which did not satisfy the formula (2) specified in the present disclosure, the impact strengths were low.

Further, also in Comparative Examples IV-8 to IV-10 in each of which the metal species of the aliphatic carboxylic acid metal salt (D) was not one kind selected from the long Periodic Table 4th-period d-block elements, the impact strengths were low.

In addition, in Comparative Examples IV-13 and IV-14 in each of which the aliphatic carboxylic acid (C) and the anion species of the aliphatic carboxylic acid metal salt (D) were not of the same species, the impact strengths and the adhesive strengths were low.

Each of the EVOH resin compositions (Examples IV-1 to IV-18) each having the characteristic configuration of the present disclosure was not reduced in adhesive strength and showed an excellent value therefor while being excellent in impact strength and light fastness. Further, each of the compositions was not reduced in color tone stability.

Packages were produced by using the multilayer structures of the respective Examples obtained in the foregoing. Each of the resultant packages was excellent in impact resistance and adhesive strength.

<<Fifth Mode in which EVOH Resin Composition Further Includes Styrene Thermoplastic Elastomer (H) Free of any Polar Group and Styrene Thermoplastic Elastomer (I) Containing Polar Group, and Satisfies the Formula (6)>>

Example V-1

[Production of EVOH Resin Composition]

A pellet of the EVOH (a1) [ethylene structural unit content: 29 mol %, saponification degree: 99.7 mol %, MFR: 3.8 g/10 min (210° C., load: 2,160 g)] was used as the EVOH (A), the sodium acetate (b1) was used as the acetic acid and/or the salt thereof (B), the stearic acid (c1) was used as the aliphatic carboxylic acid (C), the zinc stearate (d1) was used as the aliphatic carboxylic acid metal salt (D), a pellet of a SEBS (h1) ["TUFTEC H1041" manufactured by Asahi Kasei Corporation, styrene content: 30 mol %, MFR: 5.0 g/10 min (230° C., load: 2,160 g)] was used as the styrene thermoplastic elastomer (H) free of any polar group, a pellet of a maleic anhydride-modified SEBS (i1) ["TUFTEC M1911" manufactured by Asahi Kasei Corporation, styrene content: 30 mol %, MFR: 4.5 g/10 min (230° C., load: 2,160 g), acid value: 2 mg $CH_3ONa$/g, polar group content: $1.9 \times 10^{-2}$ mmol/g] was used as the styrene thermoplastic elastomer (I) containing the polar group, an alicyclic hydrocarbon resin (j1) ["ARKON P-125" manufactured by Arakawa Chemical Industries, Ltd., completely hydrogenated type, softening point: 125° C., Hazen number: 30, number-average molecular weight: 750] was used as the hydrocarbon resin (J), and the boric acid (f1) was used as the boric acid and/or the salt thereof (F).

In addition, with regard to the contents of the respective components, the EVOH (a1) was used at a content of 75 wt. % with respect to the total sum of the contents of the EVOH (a1), the sodium acetate (b1), the stearic acid (c1), the zinc stearate (d1), the SEBS (h1), and the maleic anhydride-modified SEBS (i1), the sodium acetate (b1) was used at a content of 0.0324 wt. % in terms of acetic acid ion with respect to the total sum of the contents of the EVOH (a1), the sodium acetate (b1), the stearic acid (c1), the zinc stearate (d1), the SEBS (h1), and the maleic anhydride-modified SEBS (i1), the stearic acid (c1) was used at a content of 0.00049 wt. % in terms of carboxylic acid ion with respect to the total sum of the contents of the EVOH (a1), the sodium acetate (b1), the stearic acid (c1), the zinc stearate (d1), the SEBS (h1), and the maleic anhydride-modified SEBS (i1), the zinc stearate (d1) was used at a content of 0.01 wt. % in terms of metal ion with respect to the total sum of the contents of the EVOH (a1), the sodium acetate (b1), the stearic acid (c1), the zinc stearate (d1), the SEBS (h1), and the maleic anhydride-modified SEBS (i1), the SEBS (h1) was used at a content of 19 wt. % with respect to the total sum of the contents of the EVOH (a1), the sodium acetate (b1), the stearic acid (c1), the zinc stearate (d1), the SEBS (h1), and the maleic anhydride-modified SEBS (i1), the maleic anhydride-modified SEBS (i1) was used at a content of 3 wt. % with respect to the total sum of the contents of the EVOH (a1), the sodium acetate (b1), the stearic acid (c1), the zinc stearate (d1), the SEBS (h1), and the maleic anhydride-modified SEBS (i1), the alicyclic hydrocarbon resin (j1) was used at a content of 3 wt. % with respect to the total sum of the contents of the EVOH (a1), the sodium acetate (b1), the stearic acid (c1), the zinc stearate (d1), the SEBS (h1), the maleic anhydride-modified SEBS (i1), and the alicyclic hydrocarbon resin (j1), and the boric acid (f1) was used at a content of 0.0045 wt. % in terms of boron with respect to the total sum of the contents of the EVOH (a1), the sodium acetate (b1), the stearic acid (c1), the zinc stearate (d1), the SEBS (h1), the maleic anhydride-modified SEBS (i1), and the boric acid (f1).

The pellet of the EVOH (a1), the sodium acetate (b1), the stearic acid (c1), the zinc stearate (d1), the pellet of the SEBS (h1), the pellet of the maleic anhydride-modified SEBS (i1), the alicyclic hydrocarbon resin (j1), and the boric acid (f1) were collectively dry-blended, and then the blend was melted and kneaded with a φ32 mm twin-screw extrusion apparatus (L/D=56, forming temperature=210° C.) to be pelletized again. Thus, an EVOH resin composition of the present disclosure was prepared.

[Multilayer Structure Production]

The EVOH resin composition prepared in the foregoing, linear low-density polyethylene (LLDPE) ["NOVATEC UF240" manufactured by Japan Polyethylene Corporation, MFR: 2.1 g/10 min (190° C., load: 2,160 g)], and an adhesive resin ("PLEXAR PX3236" manufactured by LyondellBasell Industries N.V., MFR: 2.0 g/10 min [190° C., load: 2,160 g]) were supplied to a three-kind and five-layer multilayer coextrusion cast film-forming apparatus, and were subjected to multilayer coextrusion under the following conditions to provide a multilayer structure (film) of a three-kind and five-layer structure "LLDPE layer/adhesive resin layer/EVOH resin composition layer/adhesive resin layer/LLDPE layer." The thicknesses (μm) of the respective layers of the multilayer structure were 37.5/5/15/5/37.5. All the die temperatures of forming apparatus were set to 210° C.

(Multilayer Coextrusion Conditions)
  Intermediate layer extruder (EVOH resin composition):
    40 mmφ single-screw extruder (barrel temperature: 210° C.)
  Upper and lower layer extruder (LLDPE): 40 mmφ single-screw extruder (barrel temperature: 210° C.)
  Medium upper and lower layer extruder (adhesive resin): 32 mmφ single-screw extruder (barrel temperature: 210° C.)
  Die: three-kind and five-layer feed block-type T-die (die temperature: 210° C.)
  Drawing speed: 9.0 m/min
  Roll temperature: 80° C.

The EVOH resin composition obtained in the foregoing was subjected to the following color tone stability evaluation test, elongation viscosity evaluation test, and bending resistance evaluation test, and the multilayer structure obtained in the foregoing was subjected to the following impact strength evaluation test.

<Color Tone Stability Evaluation of EVOH Resin Composition>

Grams of the EVOH resin composition produced in the foregoing was loaded into a 30 mmφ aluminum cup (manufactured by AS ONE Corporation, DISPODISH PP-724), and was left at rest under an air atmosphere at 210° C.; for 2 hours to provide a sample. The sample was subjected to a color tone evaluation. The color tone evaluation was performed on the basis of the following apparatus and evaluation method.

Used instrument: VISUAL ANALYZER IRISVA400 (manufactured by Alpha M.O.S. Japan K.K.)
  Data analysis software: Alpha Soft V14.3
  Objective lens: 25 mm (manufactured by Basler AG)
  Lighting mode: Upper and lower lighting
  Measurement method: The sample for a color tone evaluation was set in a tray in the chamber of the VISUAL ANALYZER, and a plane image of the entirety of the sample for a color tone evaluation was taken with a CCD camera. After that, the color pattern of the sample was evaluated by processing the image with the data analysis software. The color tone stability of the EVOH resin composition was evaluated from the lightness (L*) of a color having the highest abundance ratio among the resultant color pattern (main color). A higher numerical value of the color tone stability means that the composition is more excellent in color tone stability. In contrast, a lower numerical value thereof means that the composition is poorer in color tone stability. The result is shown in Table V-1-2.

<Evaluation of Elongation Viscosity (Pa·s) of EVOH Resin Composition>

The elongation viscosity (Pa·s) of the EVOH resin composition produced in the foregoing at 210° C.; and 100 s$^{-1}$ was evaluated by performing measurement with a capillary-type rheometer on the basis of Cogswell's equations [Polymer Engineering Science, vol. 12, pp. 64 to 73 (1972)], that is, the following equations (V8) to (V10) under the following conditions. The result is shown in Table V-1-2.

(Cogswell's Equations)

$$\eta_e = [9(n+1)^2 P_0^2]/[32\eta_s (d\gamma/dt)^2] \quad \text{Equation (V8)}$$

$$d\varepsilon/dt = 4\sigma_s(d\gamma/dt)/[3(n+1)P_0] \quad \text{Equation (V9)}$$

$$\sigma_s = k(d\gamma/dt)^n \quad \text{Equation (V10)}$$

$\eta_e$: elongation viscosity (Pa·s)
$\eta_s$: shear viscosity (Pa·s)
$d\gamma/dt$: shear strain rate (s$^{-1}$)
$d\varepsilon/dt$: elongation strain rate (s$^{-1}$)
$\sigma_s$: shear stress (Pa)
"k" and "n": constants
$P_0$: pressure loss (Pa)

(Conditions for Measurement of Elongation Viscosity)

Measuring apparatus: RHEOGRAPH 20 manufactured by Gottfert Werkstoff-Prufmaschinen GmbH
Measurement temperature: 210° C.
Preheating time: 10 minutes
Long die: die having a length of 10 mm, a diameter of 1 mm, and an inlet angle of 180°
Short die: die having a length of 0.2 mm, a diameter of 1 mm, and an inlet angle of 180°

<Impact Strength of Multilayer Structure>

The impact strength (kgf·cm) of the multilayer structure produced in the foregoing was evaluated with a YSS-type film impact tester (manufactured by Yasuda Seiki Seisakusho, Ltd., MODEL 181) under an atmosphere at 23° C.; and 50% RH. The measurement was performed a total of ten times, and the average of the measured values was evaluated as the impact strength of the multilayer structure. A clamp having an inner diameter of 60 mm and an impact ball having a radius of 12.7 mm were used, and the angle of fall of a pendulum was set to 90°. A higher numerical value of the impact strength of the multilayer structure means that the structure is more excellent in impact strength. In contrast, a lower numerical value thereof means that the structure is poorer in impact strength. The result is shown in Table V-1-2.

<Bending Resistance of EVOH Resin Composition>

The EVOH resin composition produced in the foregoing was formed into a single-layer film of the EVOH resin composition having a thickness of 30 μm with a φ40 mm single-layer extrusion apparatus (using a T-die having a width of 400 mm, forming temperature=210° C.). The single-layer film of the EVOH resin composition formed in the foregoing was cut out into an A4 size under a dry state, and the cut-out single-layer film was subjected to a twist test under the conditions of 23° C.; and 50% RH with a Gelbo Flex tester (manufactured by Rigaku Kogyo Co., Ltd.). Conditions for such Gelbo Flex tester are as follows: twist: 440°, 3.5 inches, horizontal direction: 2.5 inches. After the twist test had been performed 500 times (40 cycles/min), the number of pinholes occurring per 28 cm×17 cm of the central portion of the single-layer film was counted. Such test was attempted five times, and the average of the results was determined. The result is shown in Table V-1-2. The symbol "-*" in the table means that the film tore during the test.

Example V-2

An EVOH resin composition and a multilayer structure were produced in the same manner as in Example V-1 except that: the stearic acid (c1) was used at a content of 0.00014 wt. % in terms of carboxylic acid ion with respect to the total sum of the contents of the EVOH (a1), the sodium acetate (b1), the stearic acid (c1), the zinc stearate (d1), the SEBS (h1), and the maleic anhydride-modified SEBS (i1). The resultant EVOH resin composition and multilayer structure were evaluated in the same manner as in Example V-1.

Example V-3

An EVOH resin composition and a multilayer structure were produced in the same manner as in Example V-1 except that: the EVOH (a1) was used at a content of 90 wt. % with respect to the total sum of the contents of the EVOH (a1), the sodium acetate (b1), the stearic acid (c1), the zinc stearate (d1), the SEBS (h1), and the maleic anhydride-modified SEBS (i1); the sodium acetate (b1) was used at a content of 0.0389 wt. % in terms of acetic acid ion with respect to the total sum of the contents of the EVOH (a1), the sodium acetate (b1), the stearic acid (c1), the zinc stearate (d1), the SEBS (h1), and the maleic anhydride-modified SEBS (i1); the SEBS (h1) was used at a content of 7.6 wt. % with respect to the total sum of the contents of the EVOH (a1), the sodium acetate (b1), the stearic acid (c1), the zinc stearate (d1), the SEBS (h1), and the maleic anhydride-modified SEBS (i1); the maleic anhydride-modified SEBS (i1) was used at a content of 1.2 wt. % with respect to the total sum of the contents of the EVOH (a1), the sodium acetate (b1), the stearic acid (c1), the zinc stearate (d1), the SEBS (h1), and the maleic anhydride-modified SEBS (i1); the alicyclic hydrocarbon resin (j1) was used at a content of 1.2 wt. % with respect to the total sum of the contents of the EVOH (a1), the sodium acetate (b1), the stearic acid (c1), the zinc stearate (d1), the SEBS (h1), the maleic anhydride-modified SEBS (i1), and the alicyclic hydrocarbon resin (j1); and the boric acid (f1) was used at a content of 0.0054 wt. % in terms of boron with respect to the total sum of the contents of the EVOH (a1), the sodium acetate (b1), the stearic acid (c1), the zinc stearate (d1), the SEBS (h1), the maleic anhydride-modified SEBS (i1), and the boric acid (f1). The resultant EVOH resin composition and multilayer structure were evaluated in the same manner as in Example V-1.

Example V-4

An EVOH resin composition and a multilayer structure were produced in the same manner as in Example V-1 except that: the stearic acid (c1) was used at a content of 0.00097 wt. % in terms of carboxylic acid ion with respect to the total sum of the contents of the EVOH (a1), the sodium acetate (b1), the stearic acid (c1), the zinc stearate (d1), the SEBS (h1), and the maleic anhydride-modified SEBS (i1); and the zinc stearate (d1) was used at a content of 0.02 wt. % in terms of metal ion with respect to the total sum of the contents of the EVOH (a1), the sodium acetate (b1), the stearic acid (c1), the zinc stearate (d1), the SEBS (h1), and the maleic anhydride-modified SEBS (i1). The resultant EVOH resin composition and multilayer structure were evaluated in the same manner as in Example V-1.

Example V-5

An EVOH resin composition and a multilayer structure were produced in the same manner as in Example V-1 except that: the caprylic acid (c2) was used instead of the stearic acid (c1) at a content of 0.00138 wt. % in terms of carboxylic acid ion with respect to the total sum of the contents of the EVOH (a1), the sodium acetate (b1), the caprylic acid (c2), the zinc caprylate (d2), the SEBS (h1), and the maleic anhydride-modified SEBS (i1); and the zinc caprylate (d2) was used instead of the zinc stearate (d1) at a content of 0.01 wt. % in terms of metal ion with respect to the total sum of the contents of the EVOH (a1), the sodium acetate (b1), the caprylic acid (c2), the zinc caprylate (d2), the SEBS (h1), and the maleic anhydride-modified SEBS (i1). The resultant EVOH resin composition and multilayer structure were evaluated in the same manner as in Example V-1.

Example V-6

An EVOH resin composition and a multilayer structure were produced in the same manner as in Example V-5 except that the boric acid (f1) was used at a content of 0.03 wt. % in terms of boron with respect to the total sum of the contents of the EVOH (a1), the sodium acetate (b1), the caprylic acid (c2), the zinc caprylate (d2), the SEBS (h1), the maleic anhydride-modified SEBS (i1), and the boric acid (f1). The resultant EVOH resin composition and multilayer structure were evaluated in the same manner as in Example V-1.

Example V-7

An EVOH resin composition and a multilayer structure were produced in the same manner as in Example V-3 except that: the caprylic acid (c2) was used instead of the stearic acid (c1) at a content of 0.00138 wt. % in terms of carboxylic acid ion with respect to the total sum of the contents of the EVOH (a1), the sodium acetate (b1), the caprylic acid (c2), the zinc caprylate (d2), the SEBS (h1), and the maleic anhydride-modified SEBS (i1); and the zinc caprylate (d2) was used instead of the zinc stearate (d1) at a content of 0.01 wt. % in terms of metal ion with respect to the total sum of the contents of the EVOH (a1), the sodium acetate (b1), the caprylic acid (c2), the zinc caprylate (d2), the SEBS (h1), and the maleic anhydride-modified SEBS (i1). The resultant EVOH resin composition and multilayer structure were evaluated in the same manner as in Example V-1.

Example V-8

An EVOH resin composition and a multilayer structure were produced in the same manner as in Example V-5 except that: the SEBS (h1) was used at a content of 21 wt. % with respect to the total sum of the contents of the EVOH (a1), the sodium acetate (b1), the caprylic acid (c2), the zinc caprylate (d2), the SEBS (h1), and the maleic anhydride-modified SEBS (i1); the maleic anhydride-modified SEBS (i1) was used at a content of 4 wt. % with respect to the total sum of the contents of the EVOH (a1), the sodium acetate (b1), the caprylic acid (c2), the zinc caprylate (d2), the SEBS (h1), and the maleic anhydride-modified SEBS (i1); and the alicyclic hydrocarbon resin (j1) was not used. The resultant EVOH resin composition and multilayer structure were evaluated in the same manner as in Example V-1.

Example V-9

An EVOH resin composition and a multilayer structure were produced in the same manner as in Example V-8 except that the sodium acetate (b1) was used at a content of 0.01 wt. % in terms of acetic acid ion with respect to the total sum of the contents of the EVOH (a1), the sodium acetate (b1), the caprylic acid (c2), the zinc caprylate (d2), the SEBS (h1), and the maleic anhydride-modified SEBS (i1). The resultant EVOH resin composition and multilayer structure were evaluated in the same manner as in Example V-1.

Example V-10

An EVOH resin composition and a multilayer structure were produced in the same manner as in Example V-8 except that: the SEBS (h1) was used at a content of 15 wt. % with respect to the total sum of the contents of the EVOH (a1), the sodium acetate (b1), the caprylic acid (c2), the zinc caprylate (d2), the SEBS (h1), and the maleic anhydride-modified SEBS (i1); and the maleic anhydride-modified SEBS (i1) was used at a content of 10 wt. % with respect to the total sum of the contents of the EVOH (a1), the sodium acetate (b1), the caprylic acid (c2), the zinc caprylate (d2), the SEBS (h1), and the maleic anhydride-modified SEBS (i1). The resultant EVOH resin composition and multilayer structure were evaluated in the same manner as in Example V-1.

Example V-11

An EVOH resin composition and a multilayer structure were produced in the same manner as in Example V-8 except that: the SEBS (h1) was used at a content of 5 wt. % with respect to the total sum of the contents of the EVOH (a1), the sodium acetate (b1), the caprylic acid (c2), the zinc caprylate (d2), the SEBS (h1), and the maleic anhydride-modified SEBS (i1); and the maleic anhydride-modified SEBS (i1) was used at a content of 20 wt. % with respect to the total sum of the contents of the EVOH (a1), the sodium acetate (b1), the caprylic acid (c2), the zinc caprylate (d2), the SEBS (h1), and the maleic anhydride-modified SEBS (i1). The resultant EVOH resin composition and multilayer structure were evaluated in the same manner as in Example V-1.

Example V-12

An EVOH resin composition and a multilayer structure were produced in the same manner as in Example V-5 except that: the caprylic acid (c2) was used at a content of 0.00276 wt. % in terms of carboxylic acid ion with respect to the total sum of the contents of the EVOH (a1), the sodium acetate (b1), the caprylic acid (c2), the zinc caprylate (d2), the SEBS (h1), and the maleic anhydride-modified SEBS (i1); and the zinc caprylate (d2) was used at a content of 0.02 wt. % ppm in terms of metal ion with respect to the total sum of the contents of the EVOH (a1), the sodium acetate (b1), the caprylic acid (c2), the zinc caprylate (d2), the SEBS (h1), and the maleic anhydride-modified SEBS (i1). The resultant EVOH resin composition and multilayer structure were evaluated in the same manner as in Example V-1.

Example V-13

An EVOH resin composition and a multilayer structure were produced in the same manner as in Example V-1 except that: the lauric acid (c3) was used instead of the stearic acid (c1) at a content of 0.00036 wt. % in terms of carboxylic acid ion with respect to the total sum of the contents of the EVOH (a1), the sodium acetate (b1), the lauric acid (c3), the zinc laurate (d3), the SEBS (h1), and the maleic anhydride-modified SEBS (i1); and the zinc laurate (d3) was used instead of the zinc stearate (d1) at a content of 0.01 wt. % in terms of metal ion with respect to the total sum of the contents of the EVOH (a1), the sodium acetate (b1), the lauric acid (c3), the zinc laurate (d3), the SEBS (h1), and the maleic anhydride-modified SEBS (i1). The resultant EVOH resin composition and multilayer structure were evaluated in the same manner as in Example V-1.

Example I-14

An EVOH resin composition and a multilayer structure were produced in the same manner as in Example V-3 except that: the lauric acid (c3) was used instead of the stearic acid (c1) at a content of 0.00036 wt. % in terms of carboxylic acid ion with respect to the total sum of the contents of the EVOH (a1), the sodium acetate (b1), the lauric acid (c3), the zinc laurate (d3), the SEBS (h1), and the maleic anhydride-modified SEBS (i1); and the zinc laurate (d3) was used instead of the zinc stearate (d1) at a content of 0.01 wt. % in terms of metal ion with respect to the total sum of the contents of the EVOH (a1), the sodium acetate (b1), the lauric acid (c3), the zinc laurate (d3), the SEBS (h1), and the maleic anhydride-modified SEBS (i1). The resultant EVOH resin composition and multilayer structure were evaluated in the same manner as in Example V-1.

Example V-15

An EVOH resin composition and a multilayer structure were produced in the same manner as in Example V-13 except that: the lauric acid (c3) was used at a content of 0.00071 wt. % in terms of carboxylic acid ion with respect to the total sum of the contents of the EVOH (a1), the sodium acetate (b1), the lauric acid (c3), the zinc laurate (d3), the SEBS (h1), and the maleic anhydride-modified SEBS (i1); and the zinc laurate (d3) was used at a content of 0.02 wt. % in terms of metal ion with respect to the total sum of the contents of the EVOH (a1), the sodium acetate (b1), the lauric acid (c3), the zinc laurate (d3), the SEBS (h1), and the maleic anhydride-modified SEBS (i1). The resultant EVOH resin composition and multilayer structure were evaluated in the same manner as in Example V-1.

Example V-16

An EVOH resin composition and a multilayer structure were produced in the same manner as in Example V-1 except that: the behenic acid (c5) was used instead of the stearic acid (c1) at a content of 0.00057 wt. % in terms of carboxylic acid ion with respect to the total sum of the contents of the EVOH (a1), the sodium acetate (b1), the behenic acid (c5), the zinc behenate (d5), the SEBS (h1), and the maleic anhydride-modified SEBS (i1); and the zinc behenate (d5) was used instead of the zinc stearate (d1) at a content of 0.01 wt. % in terms of metal ion with respect to the total sum of the contents of the EVOH (a1), the sodium acetate (b1), the behenic acid (c5), the zinc behenate (d5), the SEBS (h1), and the maleic anhydride-modified SEBS (i1). The resultant EVOH resin composition and multilayer structure were evaluated in the same manner as in Example V-1.

Example V-17

An EVOH resin composition and a multilayer structure were produced in the same manner as in Example V-3 except that: the behenic acid (c5) was used instead of the stearic acid (c1) at a content of 0.00057 wt. % in terms of carboxylic acid ion with respect to the total sum of the contents of the EVOH (a1), the sodium acetate (b1), the behenic acid (c5), the zinc behenate (d5), the SEBS (h1), and the maleic anhydride-modified SEBS (i1); and the zinc behenate (d5) was used instead of the zinc stearate (d1) at a content of 0.01 wt. % in terms of metal ion with respect to the total sum of the contents of the EVOH (a1), the sodium acetate (b1), the behenic acid (c5), the zinc behenate (d5), the SEBS (h1), and the maleic anhydride-modified SEBS (i1). The resultant EVOH resin composition and multilayer structure were evaluated in the same manner as in Example V-1.

Example V-18

An EVOH resin composition and a multilayer structure were produced in the same manner as in Example V-5 except that the caprylic acid (c2) was used at a content of 0.05381 wt. % in terms of carboxylic acid ion with respect to the total sum of the contents of the EVOH (a1), the sodium acetate (b1), the caprylic acid (c2), the zinc caprylate (d2), the SEBS (h1), and the maleic anhydride-modified SEBS (i1). The resultant EVOH resin composition and multilayer structure were evaluated in the same manner as in Example V-1.

Example V-19

An EVOH resin composition and a multilayer structure were produced in the same manner as in Example V-13 except that the lauric acid (c3) was used at a content of 0.07097 wt. % in terms of carboxylic acid ion with respect to the total sum of the contents of the EVOH (a1), the sodium acetate (b1), the lauric acid (c3), the zinc laurate (d3), the SEBS (h1), and the maleic anhydride-modified SEBS (i1).

The resultant EVOH resin composition and multilayer structure were evaluated in the same manner as in Example V-1.

Comparative Example V-1

An EVOH resin composition and a multilayer structure were produced in the same manner as in Example V-1 except that the stearic acid (c1) and the zinc stearate (d1) were not used. The resultant EVOH resin composition and multilayer structure were evaluated in the same manner as in Example V-1.

Comparative Example V-2

An EVOH resin composition and a multilayer structure were produced in the same manner as in Example V-8 except that the caprylic acid (c2) and the zinc caprylate (d2) were

Comparative Example V-3

An EVOH resin composition and a multilayer structure were produced in the same manner as in Example V-5 except that: the caprylic acid (c2) was used at a content of 0.00014 wt. % in terms of carboxylic acid ion with respect to the total sum of the contents of the EVOH (a1), the sodium acetate (b1), the caprylic acid (c2), the zinc caprylate (d2), the SEBS (h1), and the maleic anhydride-modified SEBS (i1); and the zinc caprylate (d2) was used at a content of 0.001 wt. % in terms of metal ion with respect to the total sum of the contents of the EVOH (a1), the sodium acetate (b1), the caprylic acid (c2), the zinc caprylate (d2), the SEBS (h1), and the maleic anhydride-modified SEBS (i1). The resultant EVOH resin composition and multilayer structure were evaluated in the same manner as in Example V-1.

Comparative Example V-4

An EVOH resin composition and a multilayer structure were produced in the same manner as in Example V-5 except that: the caprylic acid (c2) was used at a content of 0.00828 wt. % in terms of carboxylic acid ion with respect to the total sum of the contents of the EVOH (a1), the sodium acetate (b1), the caprylic acid (c2), the zinc caprylate (d2), the SEBS (h1), and the maleic anhydride-modified SEBS (i1); and the zinc caprylate (d2) was used at a content of 0.06 wt. % in terms of metal ion with respect to the total sum of the contents of the EVOH (a1), the sodium acetate (b1), the caprylic acid (c2), the zinc caprylate (d2), the SEBS (h1), and the maleic anhydride-modified SEBS (i1). The resultant EVOH resin composition and multilayer structure were evaluated in the same manner as in Example V-1.

Comparative Example V-5

An EVOH resin composition and a multilayer structure were produced in the same manner as in Example V-7 except that: the caprylic acid (c2) was used at a content of 0.00828 wt. % in terms of carboxylic acid ion with respect to the total sum of the contents of the EVOH (a1), the sodium acetate (b1), the caprylic acid (c2), the zinc caprylate (d2), the SEBS (h1), and the maleic anhydride-modified SEBS (i1); the zinc caprylate (d2) was used at a content of 0.06 wt. % in terms of metal ion with respect to the total sum of the contents of the EVOH (a1), the sodium acetate (b1), the caprylic acid (c2), the zinc caprylate (d2), the SEBS (h1), and the maleic anhydride-modified SEBS (i1); and the boric acid (f1) was used at a content of 0.0045 wt. % in terms of boron with respect to the total sum of the contents of the EVOH (a1), the sodium acetate (b1), the caprylic acid (c2), the zinc caprylate (d2), the SEBS (h1), the maleic anhydride-modified SEBS (i1), and the boric acid (f1). The resultant EVOH resin composition and multilayer structure were evaluated in the same manner as in Example V-1.

Comparative Example V-6

An EVOH resin composition and a multilayer structure were produced in the same manner as in Example V-13 except that: the lauric acid (c3) was used at a content of 0.00004 wt. % in terms of carboxylic acid ion with respect to the total sum of the contents of the EVOH (a1), the sodium acetate (b1), the lauric acid (c3), the zinc laurate (d3), the SEBS (h1), and the maleic anhydride-modified SEBS (i1); and the zinc laurate (d3) was used at a content of 0.001 wt. % in terms of metal ion with respect to the total sum of the contents of the EVOH (a1), the sodium acetate (b1), the lauric acid (c3), the zinc laurate (d3), the SEBS (h1), and the maleic anhydride-modified SEBS (i1). The resultant EVOH resin composition and multilayer structure were evaluated in the same manner as in Example V-1.

Comparative Example V-7

An EVOH resin composition and a multilayer structure were produced in the same manner as in Example V-13 except that: the lauric acid (c3) was used at a content of 0.00214 wt. % in terms of carboxylic acid ion with respect to the total sum of the contents of the EVOH (a1), the sodium acetate (b1), the lauric acid (c3), the zinc laurate (d3), the SEBS (h1), and the maleic anhydride-modified SEBS (i1); and the zinc laurate (d3) was used at a content of 0.06 wt. % in terms of metal ion with respect to the total sum of the contents of the EVOH (a1), the sodium acetate (b1), the lauric acid (c3), the zinc laurate (d3), the SEBS (h1), and the maleic anhydride-modified SEBS (i1). The resultant EVOH resin composition and multilayer structure were evaluated in the same manner as in Example V-1.

Comparative Example V-8

An EVOH resin composition and a multilayer structure were produced in the same manner as in Example V-14 except that: the lauric acid (c3) was used at a content of 0.00828 wt. % in terms of carboxylic acid ion with respect to the total sum of the contents of the EVOH (a1), the sodium acetate (b1), the lauric acid (c3), the zinc laurate (d3), the SEBS (h1), and the maleic anhydride-modified SEBS (i1); the zinc laurate (d3) was used at a content of 0.06 wt. % in terms of metal ion with respect to the total sum of the contents of the EVOH (a1), the sodium acetate (b1), the lauric acid (c3), the zinc laurate (d3), the SEBS (h1), and the maleic anhydride-modified SEBS (i1); and the boric acid (f1) was used at a content of 0.0045 wt. % in terms of boron with respect to the total sum of the contents of the EVOH (a1), the sodium acetate (b1), the lauric acid (c3), the zinc laurate (d3), the SEBS (h1), the maleic anhydride-modified SEBS (i1), and the boric acid (f1). The resultant EVOH resin composition and multilayer structure were evaluated in the same manner as in Example V-1.

Comparative Example V-9

An EVOH resin composition and a multilayer structure were produced in the same manner as in Example V-1 except that: the stearic acid (c1) was used at a content of 0.00005 wt. % in terms of carboxylic acid ion with respect to the total sum of the contents of the EVOH (a1), the sodium acetate (b1), the stearic acid (c1), the zinc stearate (d1), the SEBS (h1), and the maleic anhydride-modified SEBS (i1); and the zinc stearate (d1) was used at a content of 0.001 wt. % in terms of metal ion with respect to the total sum of the contents of the EVOH (a1), the sodium acetate (b1), the stearic acid (c1), the zinc stearate (d1), the SEBS (h1), and the maleic anhydride-modified SEBS (i1). The resultant EVOH resin composition and multilayer structure were evaluated in the same manner as in Example V-1.

Comparative Example V-10

An EVOH resin composition and a multilayer structure were produced in the same manner as in Example V-1 except that: the stearic acid (c1) was used at a content of 0.00292 wt. % in terms of carboxylic acid ion with respect to the total sum of the contents of the EVOH (a1), the sodium acetate (b1), the stearic acid (c1), the zinc stearate (d1), the SEBS (h1), and the maleic anhydride-modified SEBS (i1); and the zinc stearate (d1) was used at a content of 0.06 wt. % in terms of metal ion with respect to the total sum of the contents of the EVOH (a1), the sodium acetate (b1), the stearic acid (c1), the zinc stearate (d1), the SEBS (h1), and the maleic anhydride-modified SEBS (i1). The resultant EVOH resin composition and multilayer structure were evaluated in the same manner as in Example V-1.

Comparative Example V-11

An EVOH resin composition and a multilayer structure were produced in the same manner as in Example V-3 except that: the stearic acid (c1) was used at a content of 0.00828 wt. % in terms of carboxylic acid ion with respect to the total sum of the contents of the EVOH (α1), the sodium acetate (b1), the stearic acid (c1), the zinc stearate (d1), the SEBS (h1), and the maleic anhydride-modified SEBS (i1); the zinc stearate (d1) was used at a content of 0.06 wt. % in terms of metal ion with respect to the total sum of the contents of the EVOH (a1), the sodium acetate (b1), the stearic acid (c1), the zinc stearate (d1), the SEBS (h1), and the maleic anhydride-modified SEBS (i1); and the boric acid (f1) was used at a content of 0.0045 wt. % in terms of boron with respect to the total sum of the contents of the EVOH (a1), the sodium acetate (b1), the stearic acid (c1), the zinc stearate (d1), the SEBS (h1), the maleic anhydride-modified SEBS (i1), and the boric acid (f1). The resultant EVOH resin composition and multilayer structure were evaluated in the same manner as in Example V-1.

Comparative Example V-12

An EVOH resin composition and a multilayer structure were produced in the same manner as in Example V-5 except that: the EVOH (a1) was used at a content of 77 wt. % with respect to the total sum of the contents of the EVOH (a1), the sodium acetate (b1), the caprylic acid (c2), the zinc caprylate (d2), and the SEBS (h1); the sodium acetate (b1) was used at a content of 0.0333 wt. % in terms of acetic acid ion with respect to the total sum of the contents of the EVOH (a1), the sodium acetate (b1), the caprylic acid (c2), the zinc caprylate (d2), and the SEBS (h1); the SEBS (h1) was used at a content of 20 wt. % with respect to the total sum of the contents of the EVOH (a1), the sodium acetate (b1), the caprylic acid (c2), the zinc caprylate (d2), and the SEBS (h1); the boric acid (f1) was used at a content of 0.0046 wt. % in terms of boron with respect to the total sum of the contents of the EVOH (a1), the sodium acetate (b1), the caprylic acid (c2), the zinc caprylate (d2), the SEBS (h1), and the boric acid (f1); and the maleic anhydride-modified SEBS (i1) was not used. The resultant EVOH resin composition and multilayer structure were evaluated in the same manner as in Example V-1.

Comparative Example V-13

An EVOH resin composition and a multilayer structure were produced in the same manner as in Example V-5 except that: the maleic anhydride-modified SEBS (i1) was used at a content of 25 wt. % with respect to the total sum of the contents of the EVOH (a1), the sodium acetate (b1), the caprylic acid (c2), the zinc caprylate (d2), and the maleic anhydride-modified SEBS (i1); and the SEBS (h1) and the alicyclic hydrocarbon resin (j1) were not used. The resultant EVOH resin composition and multilayer structure were evaluated in the same manner as in Example V-1.

Comparative Example V-14

An EVOH resin composition and a multilayer structure were produced in the same manner as in Example V-5 except that: the EVOH (a1) was used at a content of 100 wt. % with respect to the total sum of the contents of the EVOH (a1), the sodium acetate (b1), the caprylic acid (c2), and the zinc caprylate (d2); the sodium acetate (b1) was used at a content of 0.0432 wt. % in terms of acetic acid ion with respect to the total sum of the contents of the EVOH (a1), the sodium acetate (b1), the caprylic acid (c2), and the zinc caprylate (d2); the boric acid (f1) was used at a content of 0.0059 wt. % in terms of boron with respect to the total sum of the contents of the EVOH (a1), the sodium acetate (b1), the caprylic acid (c2), the zinc caprylate (d2), and the boric acid (f1); and the SEBS (h1), the maleic anhydride-modified SEBS (i1), and the alicyclic hydrocarbon resin (j1) were not used. The resultant EVOH resin composition and multilayer structure were evaluated in the same manner as in Example V-1.

Comparative Example V-15

An EVOH resin composition and a multilayer structure were produced in the same manner as in Example V-5 except that: the EVOH (a1) was used at a content of 52.5 wt. % with respect to the total sum of the contents of the EVOH (a1), the sodium acetate (b1), the caprylic acid (c2), the zinc caprylate (d2), the SEBS (h1), and the maleic anhydride-modified SEBS (i1); the sodium acetate (b1) was used at a content of 0.0227 wt. % in terms of acetic acid ion with respect to the total sum of the contents of the EVOH (a1), the sodium acetate (b1), the caprylic acid (c2), the zinc caprylate (d2), the SEBS (h1), and the maleic anhydride-modified SEBS (i1); the SEBS (h1) was used at a content of 13.3 wt. % with respect to the total sum of the contents of the EVOH (a1), the sodium acetate (b1), the caprylic acid (c2), the zinc caprylate (d2), the SEBS (h1), and the maleic anhydride-modified SEBS (i1); the maleic anhydride-modified SEBS (i1) was used at a content of 32.1 wt. % with respect to the total sum of the contents of the EVOH (a1), the sodium acetate (b1), the caprylic acid (c2), the zinc caprylate (d2), the SEBS (h1), and the maleic anhydride-modified SEBS (i1); the alicyclic hydrocarbon resin (j1) was used at a content of 2.1 wt. % with respect to the total sum of the contents of the EVOH (a1), the sodium acetate (b1), the caprylic acid (c2), the zinc caprylate (d2), the SEBS (h1), the maleic anhydride-modified SEBS (i1), and the alicyclic hydrocarbon resin (j1); and the boric acid (f1) was used at a content of 0.0031 wt. % in terms of boron with respect to the total sum of the contents of the EVOH (a1), the sodium acetate (b1), the caprylic acid (c2), the zinc caprylate (d2), the SEBS (h1), the maleic anhydride-modified SEBS (i1), and the boric acid (f1). The resultant EVOH resin composition and multilayer structure were evaluated in the same manner as in Example V-1.

Comparative Example V-16

An EVOH resin composition and a multilayer structure were produced in the same manner as in Example V-1 except that: the stearic acid (c1) was used at a content of 0.00038 wt. % in terms of carboxylic acid ion with respect to the total sum of the contents of the EVOH (a1), the sodium acetate (b1), the stearic acid (c1), calcium stearate, the SEBS (h1), and the maleic anhydride-modified SEBS (i1); and calcium stearate was used instead of the zinc stearate (d1) at a content of 0.01 wt. % in terms of metal ion with respect to the total sum of the contents of the EVOH (a1), the sodium acetate (b1), the stearic acid (c1), calcium stearate, the SEBS (h1), and the maleic anhydride-modified SEBS (i1). The resultant EVOH resin composition and multilayer structure were evaluated in the same manner as in Example V-1.

Comparative Example V-17

An EVOH resin composition and a multilayer structure were produced in the same manner as in Example V-1 except that: the stearic acid (c1) was used at a content of 0.00308 wt. % in terms of carboxylic acid ion with respect to the total sum of the contents of the EVOH (a1), the sodium acetate (b1), the stearic acid (c1), magnesium stearate, the SEBS (h1), and the maleic anhydride-modified SEBS (i1); and magnesium stearate was used instead of the zinc stearate (d1) at a content of 0.01 wt. % in terms of metal ion with respect to the total sum of the contents of the EVOH (a1), the sodium acetate (b1), the stearic acid (c1), magnesium stearate, the SEBS (h1), and the maleic anhydride-modified SEBS (i1). The resultant EVOH resin composition and multilayer structure were evaluated in the same manner as in Example V-1.

Comparative Example V-18

An EVOH resin composition and a multilayer structure were produced in the same manner as in Example V-1 except that: the stearic acid (c1) was used at a content of 0.00067 wt. % in terms of carboxylic acid ion with respect to the total sum of the contents of the EVOH (a1), the sodium acetate (b1), the stearic acid (c1), sodium stearate, the SEBS (h1), and the maleic anhydride-modified SEBS (i1); and sodium stearate was used instead of the zinc stearate (d1) at a content of 0.01 wt. % in terms of metal ion with respect to the total sum of the contents of the EVOH (a1), the sodium acetate (b1), the stearic acid (c1), sodium stearate, the SEBS (h1), and the maleic anhydride-modified SEBS (i1). The resultant EVOH resin composition and multilayer structure were evaluated in the same manner as in Example V-1.

Comparative Example V-19

An EVOH resin composition and a multilayer structure were produced in the same manner as in Example V-1 except that the stearic acid (c1) was used at a content of 0.09671 wt. % in terms of carboxylic acid ion with respect to the total sum of the contents of the EVOH (a1), the sodium acetate (b1), the stearic acid (c1), the zinc stearate (d1), the SEBS (h1), and the maleic anhydride-modified SEBS (i1). The resultant EVOH resin composition and multilayer structure were evaluated in the same manner as in Example V-1.

Comparative Example V-20

An EVOH resin composition and a multilayer structure were produced in the same manner as in Example V-1 except that the stearic acid (c1) was used at a content of 0.00008 wt. % in terms of carboxylic acid ion with respect to the total sum of the contents of the EVOH (a1), the sodium acetate (b1), the stearic acid (c1), the zinc stearate (d1), the SEBS (h1), and the maleic anhydride-modified SEBS (i1). The resultant EVOH resin composition and multilayer structure were evaluated in the same manner as in Example V-1.

Comparative Example V-21

An EVOH resin composition and a multilayer structure were produced in the same manner as in Example V-1 except that zinc gluconate trihydrate was used instead of the zinc stearate (d1) at a content of 0.01 wt. % in terms of metal ion with respect to the total sum of the contents of the EVOH (a1), the sodium acetate (b1), the stearic acid (c1), zinc gluconate trihydrate, the SEBS (h1), and the maleic anhydride-modified SEBS (i1). The resultant EVOH resin composition and multilayer structure were evaluated in the same manner as in Example V-1.

Comparative Example V-22

An EVOH resin composition and a multilayer structure were produced in the same manner as in Example V-1 except that zinc citrate dihydrate was used instead of the zinc stearate (d1) at a content of 0.01 wt. % in terms of metal ion with respect to the total sum of the contents of the EVOH (a1), the sodium acetate (b1), the stearic acid (c1), zinc citrate dihydrate, the SEBS (h1), and the maleic anhydride-modified SEBS (i1). The resultant EVOH resin composition and multilayer structure were evaluated in the same manner as in Example V-1.

TABLE V-1-1

| | EVOH (A) [wt. %] | Content of styrene thermoplastic elastomer (H) free of any polar group [wt. %] | Content of styrene thermoplastic elastomer (I) containing polar group [wt. %] | Content of hydrocarbon resin (J) [wt. %] | Content of acetic acid and/or acetic acid salt (B) (in terms of acetic acid ion) [wt. %] | Aliphatic carboxylic acid (C) | Content of (C) (in terms of carboxylic acid ion) [wt. %] | Aliphatic carboxylic acid metal salt (D) | Content of (D) (in terms of metal ion) [wt. %] | Content of boric acid and/or boric acid salt (F) (in terms of boron) [wt. %] |
|---|---|---|---|---|---|---|---|---|---|---|
| Example V-1 | 75 | 19 | 3 | 3 | 0.0324 | Stearic acid | 0.00049 | Zinc stearate | 0.01 | 0.0045 |
| Example V-2 | 75 | 19 | 3 | 3 | 0.0324 | Stearic acid | 0.00014 | Zinc stearate | 0.01 | 0.0045 |
| Example V-3 | 90 | 7.6 | 1.2 | 1.2 | 0.0389 | Stearic acid | 0.00049 | Zinc stearate | 0.01 | 0.0054 |
| Example V-4 | 75 | 19 | 3 | 3 | 0.0324 | Stearic acid | 0.00097 | Zinc stearate | 0.02 | 0.0045 |

TABLE V-1-1-continued

| | EVOH (A) [wt. %] | Content of styrene thermoplastic elastomer (H) free of any polar group [wt. %] | Content of styrene thermoplastic elastomer (I) containing polar group [wt. %] | Content of hydrocarbon resin (J) [wt. %] | Content of acetic acid and/or acetic acid salt (B) (in terms of acetic acid ion) [wt. %] | Aliphatic carboxylic acid (C) | Content of (C) (in terms of carboxylic acid ion) [wt. %] | Aliphatic carboxylic acid metal salt (D) | Content of (D) (in terms of metal ion) [wt. %] | Content of boric acid and/or boric acid salt (F) (in terms of boron) [wt. %] |
|---|---|---|---|---|---|---|---|---|---|---|
| Example V-5 | 75 | 19 | 3 | 3 | 0.0324 | Caprylic acid | 0.00138 | Zinc caprylate | 0.01 | 0.0045 |
| Example V-6 | 75 | 19 | 3 | 3 | 0.0324 | Caprylic acid | 0.00138 | Zinc caprylate | 0.01 | 0.03 |
| Example V-7 | 90 | 7.6 | 1.2 | 1.2 | 0.0389 | Caprylic acid | 0.00138 | Zinc caprylate | 0.01 | 0.0054 |
| Example V-8 | 75 | 21 | 4 | 0 | 0.0324 | Caprylic acid | 0.00138 | Zinc caprylate | 0.01 | 0.0045 |
| Example V-9 | 75 | 21 | 4 | 0 | 0.01 | Caprylic acid | 0.00138 | Zinc caprylate | 0.01 | 0.0045 |
| Example V-10 | 75 | 15 | 10 | 0 | 0.0324 | Caprylic acid | 0.00138 | Zinc caprylate | 0.01 | 0.0045 |
| Example V-11 | 75 | 5 | 20 | 0 | 0.0324 | Caprylic acid | 0.00138 | Zinc caprylate | 0.01 | 0.0045 |
| Example V-12 | 75 | 19 | 3 | 3 | 0.0324 | Caprylic acid | 0.00276 | Zinc caprylate | 0.02 | 0.0045 |
| Example V-13 | 75 | 19 | 3 | 3 | 0.0324 | Lauric acid | 0.00036 | Zinc laurate | 0.01 | 0.0045 |
| Example V-14 | 90 | 7.6 | 1.2 | 1.2 | 0.0389 | Lauric acid | 0.00036 | Zinc laurate | 0.01 | 0.0054 |
| Example V-15 | 75 | 19 | 3 | 3 | 0.0324 | Lauric acid | 0.00071 | Zinc laurate | 0.02 | 0.0045 |
| Example V-16 | 75 | 19 | 3 | 3 | 0.0324 | Behenic acid | 0.00057 | Zinc behenate | 0.01 | 0.0045 |
| Example V-17 | 90 | 7.6 | 1.2 | 1.2 | 0.0389 | Behenic acid | 0.00057 | Zinc behenate | 0.01 | 0.0054 |
| Example V-18 | 75 | 19 | 3 | 3 | 0.0324 | Caprylic acid | 0.05381 | Zinc caprylate | 0.01 | 0.0045 |
| Example V-19 | 75 | 19 | 3 | 3 | 0.0324 | Lauric acid | 0.07097 | Zinc laurate | 0.01 | 0.0045 |
| Comparative Example V-1 | 75 | 19 | 3 | 3 | 0.0324 | — | 0 | — | 0 | 0.0045 |
| Comparative Example V-2 | 75 | 21 | 4 | 0 | 0.0324 | — | 0 | — | 0 | 0.0045 |
| Comparative Example V-3 | 75 | 19 | 3 | 3 | 0.0324 | Caprylic acid | 0.00014 | Zinc caprylate | 0.001 | 0.0045 |
| Comparative Example V-4 | 75 | 19 | 3 | 3 | 0.0324 | Caprylic acid | 0.00828 | Zinc caprylate | 0.06 | 0.0045 |
| Comparative Example V-5 | 90 | 7.6 | 1.2 | 1.2 | 0.0389 | Caprylic acid | 0.00828 | Zinc caprylate | 0.06 | 0.0045 |
| Comparative Example V-6 | 75 | 19 | 3 | 3 | 0.0324 | Lauric acid | 0.00004 | Zinc laurate | 0.001 | 0.0045 |
| Comparative Example V-7 | 75 | 19 | 3 | 3 | 0.0324 | Lauric acid | 0.00214 | Zinc laurate | 0.06 | 0.0045 |
| Comparative Example V-8 | 90 | 7.6 | 1.2 | 1.2 | 0.0389 | Lauric acid | 0.00828 | Zinc laurate | 0.06 | 0.0045 |
| Comparative Example V-9 | 75 | 19 | 3 | 3 | 0.0324 | Stearic acid | 0.00005 | Zinc stearate | 0.001 | 0.0045 |
| Comparative Example V-10 | 75 | 19 | 3 | 3 | 0.0324 | Stearic acid | 0.00292 | Zinc stearate | 0.06 | 0.0045 |
| Comparative Example V-11 | 90 | 7.6 | 1.2 | 1.2 | 0.0389 | Stearic acid | 0.00828 | Zinc stearate | 0.06 | 0.0045 |
| Comparative Example V-12 | 77 | 20 | 0 | 3 | 0.0333 | Caprylic acid | 0.00138 | Zinc caprylate | 0.01 | 0.0046 |
| Comparative Example V-13 | 75 | 0 | 25 | 0 | 0.0324 | Caprylic acid | 0.00138 | Zinc caprylate | 0.01 | 0.0045 |
| Comparative Example V-14 | 100 | 0 | 0 | 0 | 0.0432 | Caprylic acid | 0.00138 | Zinc caprylate | 0.01 | 0.0059 |
| Comparative Example V-15 | 52.5 | 13.3 | 32.1 | 2.1 | 0.0227 | Caprylic acid | 0.00138 | Zinc caprylate | 0.01 | 0.0031 |
| Comparative Example V-16 | 75 | 19 | 3 | 3 | 0.0324 | Stearic acid | 0.00038 | Calcium stearate | 0.01 | 0.0045 |
| Comparative Example V-17 | 75 | 19 | 3 | 3 | 0.0324 | Stearic acid | 0.00308 | Magnesium stearate | 0.01 | 0.0045 |
| Comparative Example V-18 | 75 | 19 | 3 | 3 | 0.0324 | Stearic acid | 0.00067 | Sodium sterate | 0.01 | 0.0045 |
| Comparative Example V-19 | 75 | 19 | 3 | 3 | 0.0324 | Stearic acid | 0.09671 | Zinc stearate | 0.01 | 0.0045 |
| Comparative Example V-20 | 75 | 19 | 3 | 3 | 0.0324 | Stearic acid | 0.00008 | Zinc stearate | 0.01 | 0.0045 |

TABLE V-1-1-continued

|  | EVOH (A) [wt. %] | Content of styrene thermoplastic elastomer (H) free of any polar group [wt. %] | Content of styrene thermoplastic elastomer (I) containing polar group [wt. %] | Content of hydrocarbon resin (J) [wt. %] | Content of acetic acid and/or acetic acid salt (B) (in terms of acetic acid ion) [wt. %] | Aliphatic carboxylic acid (C) | Content of (C) (in terms of carboxylic acid ion) [wt. %] | Aliphatic carboxylic acid metal salt (D) | Content of (D) (in terms of metal ion) [wt. %] | Content of boric acid and/or boric acid salt (F) (in terms of boron) [wt. %] |
|---|---|---|---|---|---|---|---|---|---|---|
| Comparative Example V-21 | 75 | 19 | 3 | 3 | 0.0324 | Stearic acid | 0.00049 | Zinc gluconate trihydrate | 0.01 | 0.0045 |
| Comparative Example V-22 | 75 | 19 | 3 | 3 | 0.0324 | Stearic acid | 0.00049 | Zinc citrate dihydrate | 0.01 | 0.0045 |

TABLE V-1-2

|  | (D)/(B) | (D)/(C) | (I)/(D) | (I)/(A + H + I) | (B)/(C) | Elongation viscosity [Pa·s] (210° C., 100 S$^{-1}$) | Impact strength [kgf·cm] | Color tone stability (air atmosphere, 210° C., 2 hours) | Bending resistance |
|---|---|---|---|---|---|---|---|---|---|
| Example V-1 | 0.31 | 20.41 | 300 | 0.03 | 66.12 | 5,567 | 17.90 | 65.43 | 2.60 |
| Example V-2 | 0.31 | 71.43 | 300 | 0.03 | 231.43 | 5,567 | 16.71 | 62.52 | 2.60 |
| Example V-3 | 0.26 | 20.41 | 120 | 0.01 | 79.39 | 5,104 | 18.08 | 63.46 | 22.00 |
| Example V-4 | 0.62 | 20.62 | 150 | 0.03 | 33.4 | 5,567 | 18.04 | 59.62 | 2.60 |
| Example V-5 | 0.31 | 7.25 | 300 | 0.03 | 23.48 | 5,567 | 18.31 | 70.23 | 2.60 |
| Example V-6 | 0.31 | 7.25 | 300 | 0.03 | 23.48 | 31,023 | 16.55 | 65.99 | 2.60 |
| Example V-7 | 0.26 | 7.25 | 120 | 0.01 | 28.19 | 5,104 | 18.49 | 68.13 | 22.00 |
| Example V-8 | 0.31 | 7.25 | 400 | 0.04 | 23.48 | 5,799 | 17.75 | 68.83 | 3.80 |
| Example V-9 | 1 | 7.25 | 400 | 0.04 | 7.25 | 3,760 | 17.78 | 71.51 | 3.80 |
| Example V-10 | 0.31 | 7.25 | 1,000 | 0.1 | 23.48 | 7,304 | 17.60 | 62.08 | 3.60 |
| Example V-11 | 0.31 | 7.25 | 2,000 | 0.2 | 23.48 | 9,801 | 16.58 | 58.35 | 3.30 |
| Example V-12 | 0.62 | 7.25 | 150 | 0.03 | 11.74 | 5,567 | 18.45 | 67.56 | 2.60 |
| Example V-13 | 0.31 | 27.78 | 300 | 0.03 | 90 | 5,567 | 18.22 | 68.31 | 2.60 |
| Example V-14 | 0.26 | 27.78 | 120 | 0.01 | 108.06 | 5,104 | 18.40 | 66.26 | 22.00 |
| Example V-15 | 0.62 | 28.17 | 150 | 0.03 | 45.63 | 5,567 | 18.36 | 64.38 | 2.60 |
| Example V-16 | 0.31 | 17.54 | 300 | 0.03 | 56.84 | 5,567 | 17.63 | 66.47 | 2.60 |
| Example V-17 | 0.26 | 17.54 | 120 | 0.01 | 68.25 | 5,104 | 17.81 | 64.48 | 22.00 |
| Example V-18 | 0.31 | 0.19 | 300 | 0.03 | 0.6 | 5,567 | 16.02 | 60.49 | 2.60 |
| Example V-19 | 0.31 | 0.14 | 300 | 0.03 | 0.46 | 5,567 | 15.72 | 58.64 | 2.60 |
| Comparative Example V-1 | 0 | — | ∞ | 0.03 | ∞ | 5,567 | 14.69 | 73.08 | 2.60 |
| Comparative Example V-2 | 0 | — | ∞ | 0.04 | ∞ | 5,567 | 14.13 | 71.68 | 3.80 |
| Comparative Example V-3 | 0.03 | 7.14 | 3,000 | 0.03 | 231.43 | 5,567 | 14.72 | 71.92 | 2.60 |
| Comparative Example V-4 | 1.85 | 7.25 | 50 | 0.03 | 3.91 | 5,567 | 18.55 | 55.03 | 2.60 |
| Comparative Example V-5 | 1.54 | 7.25 | 20 | 0.01 | 4.7 | 5,104 | 18.74 | 54.45 | 22.00 |
| Comparative Example V-6 | 0.03 | 25 | 3,000 | 0.03 | 810 | 5,567 | 14.71 | 71.03 | 2.60 |
| Comparative Example V-7 | 1.85 | 28.04 | 50 | 0.03 | 15.14 | 5,567 | 18.46 | 53.47 | 2.60 |
| Comparative Example V-8 | 1.54 | 7.25 | 20 | 0.01 | 4.7 | 5,104 | 18.64 | 52.91 | 22.00 |
| Comparative Example V-9 | 0.03 | 20 | 3,000 | 0.03 | 648 | 5,567 | 14.70 | 69.70 | 2.60 |
| Comparative Example V-10 | 1.85 | 20.55 | 50 | 0.03 | 11.1 | 5,567 | 18.14 | 48.34 | 2.60 |
| Comparative Example V-11 | 1.54 | 7.25 | 20 | 0.01 | 4.7 | 5,104 | 18.32 | 47.84 | 22.00 |
| Comparative Example V-12 | 0.3 | 7.25 | 0 | 0 | 24.13 | 5,475 | 18.11 | 70.94 | —* |
| Comparative Example V-13 | 0.31 | 7.25 | 2,500 | 0.25 | 23.48 | 6,031 | 7.12 | 45.21 | 3.20 |
| Comparative Example V-14 | 0.23 | 7.25 | 0 | 0 | 31.3 | 4,640 | 18.25 | 55.37 | —* |
| Comparative Example V-15 | 0.44 | 7.25 | 3,210 | 0.33 | 16.45 | 6,495 | 7.12 | 46.35 | 1.00 |
| Comparative Example V-16 | 0.31 | 26.32 | 300 | 0.03 | 85.26 | 5,567 | 14.81 | 60.28 | 2.60 |

TABLE V-1-2-continued

|  | (D)/(B) | (D)/(C) | (I)/(D) | (I)/(A + H + I) | (B)/(C) | Elongation viscosity [Pa · s] (210° C., 100 S$^{-1}$) | Impact strength [kgf · cm] | Color tone stability (air atmosphere, 210° C., 2 hours) | Bending resistance |
|---|---|---|---|---|---|---|---|---|---|
| Comparative Example V-17 | 0.31 | 3.25 | 300 | 0.03 | 10.52 | 5,567 | 14.48 | 55.08 | 2.60 |
| Comparative Example V-18 | 0.31 | 14.93 | 300 | 0.03 | 48.36 | 5,567 | 15.01 | 66.63 | 2.60 |
| Comparative Example V-19 | 0.31 | 0.1 | 300 | 0.03 | 0.34 | 5,567 | 15.32 | 55.98 | 2.60 |
| Comparative Example V-20 | 0.31 | 125 | 300 | 0.03 | 405 | 5,567 | 15.48 | 59.54 | 2.60 |
| Comparative Example V-21 | 0.31 | 20.41 | 300 | 0.03 | 66.12 | 5,567 | 12.83 | 17.49 | —* |
| Comparative Example V-22 | 0.31 | 20.41 | 300 | 0.03 | 6.12 | 5,567 | 11.53 | 49.36 | —* |

—*: The film tore during the test.

In Comparative Examples V-1 and V-2 each of which was free of the aliphatic carboxylic acid (C) and the aliphatic carboxylic acid metal salt (D), the impact strengths were low.

In each of Comparative Examples V-12 to V-14 each of which was free of the styrene thermoplastic elastomer (H) free of any polar group or/and the styrene thermoplastic elastomer (I) containing the polar group, the bending resistance or the color tone stability was low.

In each of Comparative Examples V-4, V-7, and V-10 each of which did not satisfy the formula (1) specified in the present disclosure, the color tone stability was low.

In each of Comparative Examples V-3, V-5, V-6, V-8, V-9, V-11, and V-15 each of which did not satisfy the formula (6) specified in the present disclosure, the impact strength or the color tone stability was low. In Comparative Examples V-19 and V-20 each of which did not satisfy the formula (2) specified in the present disclosure, the impact strengths were low.

Further, also in Comparative Examples V-16 to V-18 in each of which the metal species of the aliphatic carboxylic acid metal salt (D) was not one kind selected from the long Periodic Table 4th-period d-block elements, the impact strengths were low.

In addition, in each of Comparative Examples V-21 and V-22 in each of which the aliphatic carboxylic acid (C) and the anion species of the aliphatic carboxylic acid metal salt (D) were not of the same species, the impact strength, the color tone stability, and the bending resistance were low.

In contrast, each of the EVOH resin compositions (Examples V-1 to V-19) each having the characteristic configuration of the present disclosure was not reduced in bending resistance and showed an excellent value therefor while being excellent in impact strength. Further, each of the compositions was not reduced in color tone stability.

Packages were produced by using the multilayer structures of the respective Examples obtained in the foregoing. Each of the resultant packages was excellent in impact resistance and bending resistance.

<<Sixth Mode in which the Component (A) is EVOH Containing Structural Unit (i) Having Primary Hydroxy Group in Side Chain Thereof>>

Example VI-1

[Production of EVOH Resin Composition]

A pellet, which contained the EVOH (a1) containing the structural unit (i) having a primary hydroxy group in a side chain thereof [ethylene-vinyl alcohol copolymer having an ethylene content of 38 mol %, a saponification degree of 99.6 mol %, a content of the side-chain 1,2-diol structural unit (ia) of 1.5 mol %, and a MFR of 4.0 g/10 min (210° C., 2,160 g)] as the EVOH (A), and contained the sodium acetate (b1) as the acetic acid and/or the salt thereof (B), was used. In addition, the stearic acid (c1) was used as the aliphatic carboxylic acid (C), the zinc stearate (d1) was used as the aliphatic carboxylic acid metal salt (D), the boric acid (f1) was used as the boric acid and/or the salt thereof (F), and the phosphoric acid (e1) was used as the phosphoric acid and/or the salt thereof (E).

In addition, with regard to the contents of the respective components, the sodium acetate (b1) was used at a content of 432 ppm in terms of acetic acid ion with respect to the total sum of the contents of the EVOH (a1), the sodium acetate (b1), the stearic acid (c1), and the zinc stearate (d1), the stearic acid (c1) was used at a content of 4.9 ppm in terms of carboxylic acid ion with respect to the total sum of the contents of the EVOH (a1), the sodium acetate (b1), the stearic acid (c1), and the zinc stearate (d1), the zinc stearate (d1) was used at a content of 100 ppm in terms of metal ion with respect to the total sum of the contents of the EVOH (a1), the sodium acetate (b1), the stearic acid (c1), and the zinc stearate (d1), the boric acid (f1) was used at a content of 304 ppm in terms of boron with respect to the total sum of the contents of the EVOH (a1), the sodium acetate (b1), the stearic acid (c1), the zinc stearate (d1), and the boric acid (f1), and the phosphoric acid (e1) was used at a content of 51 ppm in terms of phosphorous with respect to the total sum of the contents of the EVOH (a1), the sodium acetate (b1), the stearic acid (c1), the zinc stearate (d1), and the phosphoric acid (e1). The pellet of the EVOH (a1), the stearic acid (c1), the zinc stearate (d1), the boric acid (f1), and the phosphoric acid (e1) were collectively dry-blended to produce an EVOH resin composition of the present disclosure.

[Multilayer Structure Production 1]

The EVOH resin composition prepared in the foregoing, linear low-density polyethylene (LLDPE) ["UF240" manufactured by Japan Polyethylene Corporation, MFR: 2.1 g/10 min (190° C., load: 2,160 g)], and an adhesive resin ("PLEXAR PX3236" manufactured by LyondellBasell Industries N.V., MFR: 2.0 g/10 min [190° C., load: 2,160 g]) were supplied to a three-kind and five-layer multilayer coextrusion cast film-forming apparatus, and were subjected to multilayer coextrusion under the following conditions to provide a multilayer structure (film) of a three-kind and five-layer structure "LLDPE layer/adhesive resin layer/EVOH resin composition layer/adhesive resin layer/LLDPE layer." The thicknesses (μm) of the respective layers of the multilayer structure were 37.5/5/15/5/37.5. All the die temperatures of forming apparatus were set to 210° C.

(Multilayer Coextrusion Conditions)

Intermediate layer extruder (EVOH resin composition): 40 mmφ single-screw extruder (barrel temperature: 210° C.)

Upper and lower layer extruder (LLDPE): 40 mmφ single-screw extruder (barrel temperature: 210° C.)

Medium upper and lower layer extruder (adhesive resin): 32 mmφ single-screw extruder (barrel temperature: 210° C.)

Die: three-kind and five-layer feed block-type T-die (die temperature: 210° C.)

Drawing speed: 9.0 m/min

Roll temperature: 80° C.

The EVOH resin composition obtained in the foregoing was subjected to the following color tone stability evaluation test and elongation viscosity evaluation test, and the multilayer structure obtained in the foregoing was subjected to the following impact strength evaluation test, adhesive strength evaluation test, and stretchability evaluation test.

<Color Tone Stability Evaluation of EVOH Resin Composition>

5 Grams of the EVOH resin composition produced in the foregoing was loaded into a 30 mmφ aluminum cup (manufactured by AS ONE Corporation, DISPODISH PP-724), and was left at rest under an air atmosphere at 210° C.; for 2 hours to provide a sample. The sample was subjected to a color tone evaluation. The color tone evaluation was performed on the basis of the following apparatus and evaluation method.

Used instrument: VISUAL ANALYZER IRISVA400 (manufactured by Alpha M.O.S. Japan K.K.)

Data analysis software: Alpha Soft V14.3

Objective lens: 25 mm (manufactured by Basler AG)

Lighting mode: Upper and lower lighting

Measurement method: The sample for a color tone evaluation was set in a tray in the chamber of the VISUAL ANALYZER, and a plane image of the entirety of the sample for a color tone evaluation was taken with a CCD camera. After that, the color pattern of the sample was evaluated by processing the image with the data analysis software. The color tone stability of the EVOH resin composition was evaluated from the lightness (L*) of a color having the highest abundance ratio among the resultant color pattern (main color). A higher numerical value of the color tone stability means that the composition is more excellent in color tone stability. In contrast, a lower numerical value thereof means that the composition is poorer in color tone stability. The result is shown in Table VI-1-2.

<Evaluation of Elongation Viscosity (Pa·s) of EVOH Resin Composition>

The elongation viscosity (Pa·s) of the EVOH resin composition produced in the foregoing at 210° C.; and 100 s$^{-1}$ was evaluated by performing measurement with a capillary-type rheometer on the basis of Cogswell's equations [Polymer Engineering Science, vol. 12, pp. 64 to 73 (1972)], that is, the following equations (VI4) to (V16) under the following conditions. The result is shown in Table VI-1-2.

(Cogswell's Equations)

$$\eta_e = [9(n+1)^2 P_0^2]/[32\eta_s(d\gamma/dt)^2] \qquad \text{Equation (V14)}$$

$$d\varepsilon/dt = 4\sigma_s(d\gamma/dt)/[3(n+1)P_0] \qquad \text{Equation (V15)}$$

$$\sigma_s = k(d\gamma/dt)^n \qquad \text{Equation (V16)}$$

$\eta_e$: elongation viscosity (Pa·s)

$\eta_s$: shear viscosity (Pa·s)

$d\gamma/dt$: shear strain rate (s$^{-1}$)

$d\varepsilon/dt$: elongation strain rate (s$^{-1}$)

$\sigma_s$: shear stress (Pa)

"k" and "n": constants $P_0$: pressure loss (Pa)

(Conditions for Measurement of Elongation Viscosity)

Measuring apparatus: RHEOGRAPH 20 manufactured by Gottfert Werkstoff-Prufmaschinen GmbH Measurement temperature: 210° C.

Preheating time: 10 minutes

Long die: die having a length of 10 mm, a diameter of 1 mm, and an inlet angle of 180°

Short die: die having a length of 0.2 mm, a diameter of 1 mm, and an inlet angle of 180°

<Impact Strength of Multilayer Structure>

The impact strength (kgf·cm) of the multilayer structure produced in the foregoing was evaluated with a YSS-type film impact tester (manufactured by Yasuda Seiki Seisakusho, Ltd., MODEL 181) under an atmosphere at 23° C.; and 50% RH. The measurement was performed a total of ten times, and the average of the measured values was evaluated as the impact strength of the multilayer structure. A clamp having an inner diameter of 60 mm and an impact ball having a radius of 12.7 mm were used, and the angle of fall of a pendulum was set to 90°. A higher numerical value of the impact strength of the multilayer structure means that the structure is more excellent in impact strength. In contrast, a lower numerical value thereof means that the structure is poorer in impact strength. The result is shown in Table VI-1-2.

<Adhesive Strength of Multilayer Structure>

An adhesive strength (N/15 mm) between the EVOH resin composition layer and each adhesive resin layer in the multilayer structure produced in the foregoing was evaluated by the following T-peel peel test. The measurement was performed a total of ten times, and the average of the measured values was evaluated as the adhesive strength of the multilayer structure. A higher numerical value of the adhesive strength of the multilayer structure means that the structure is more excellent in adhesive strength. In contrast, a lower numerical value thereof means that the structure is poorer in adhesive strength. The result is shown in Table VI-1-2.

(Conditions for T-peel Peel Test)

Apparatus: Autograph AGS-H (manufactured by Shimadzu Corporation)

Load cell: 500 N

Test method: T-peel method (peeled in a T-shape)

Test piece size: 15 mm in width

Test speed: 300 mm/min
<Stretchability Evaluation of Multilayer Structure>
[Multilayer Structure Production 2]

The EVOH resin composition prepared in the foregoing, polypropylene ("EG7FTB" manufactured by Japan Polypropylene Corporation, MFR: 1.3 g/10 min [230° C., load: 2,160 g]), and an adhesive resin ("PLEXAR PX6002" manufactured by LyondellBasell Industries N.V., MFR: 2.3 g/10 min [230° C., load: 2,160 g]) were supplied to a three-kind and five-layer coextrusion T-die sheet-forming apparatus, and were coextruded to provide a multilayer structure (sheet) of a three-kind and five-layer structure "polypropylene layer/adhesive resin layer/EVOH resin composition layer/adhesive resin layer/polypropylene layer." The thicknesses (μm) of the respective layers of the multilayer structure are 540/30/60/30/540. All the die temperatures of forming apparatus were set to 210° C.

[Stretchability Evaluation of Multilayer Structure (Sheet)]

The multilayer structure of a three-kind and five-layer structure obtained in the foregoing (length x width=90 mm×90 mm, total thickness: 1,200 μm) was biaxially stretched in its longitudinal and lateral directions simultaneously at ratios of 7×7 times with a stretching apparatus ("LABORATORY STRETCHER KARO 4" manufactured by Bruckner Maschinenbau GmbH & Co. KG) at a stretching temperature of 145° C., a preheating time of 90 seconds, and a stretching speed of 100 mm/sec, followed by the evaluation of the stretchability of the multilayer structure (sheet) based on the following evaluation criteria.

A: The biaxial stretching can be performed, and no appearance failure, such as a stripe or a crack, can be observed.

B: The biaxial stretching can be performed, and substantially no appearance failure, such as a stripe or a crack, can be observed.

C: The biaxial stretching can be performed, but an appearance failure, such as a stripe or a crack, can be clearly observed.

D: The multilayer structure tore during the biaxial stretching.

Example VI-2

An EVOH resin composition and a multilayer structure were produced in the same manner as in Example VI-1 except that the stearic acid (c1) was used at a content of 1.4 ppm in terms of carboxylic acid ion with respect to the total sum of the contents of the EVOH (a1), the sodium acetate (b1), the stearic acid (c1), and the zinc stearate (d1). The resultant EVOH resin composition and multilayer structure were evaluated in the same manner as in Example VI-1.

Example VI-3

An EVOH resin composition and a multilayer structure were produced in the same manner as in Example VI-1 except that: the EVOH (a2) [ethylene-vinyl alcohol copolymer having an ethylene content of 33 mol %, a saponification degree of 99.6 mol %, a content of the side-chain 1,2-diol structural unit (ia) of 1.0 mol %, and a MFR of 4.0 g/10 min (210° C., 2,160 g)] was used instead of the EVOH (a1); the sodium acetate (b1) was used at a content of 504 ppm in terms of acetic acid ion with respect to the total sum of the contents of the EVOH (a2), the sodium acetate (b1), the stearic acid (c1), and the zinc stearate (d1); the boric acid (f1) was used at a content of 161 ppm in terms of boron with respect to the total sum of the contents of the EVOH (a2), the sodium acetate (b1), the stearic acid (c1), the zinc stearate (d1), and the boric acid (f1); and the phosphoric acid (e1) was used at a content of 2 ppm in terms of phosphorous with respect to the total sum of the contents of the EVOH (a2), the sodium acetate (b1), the stearic acid (c1), the zinc stearate (d1), and the phosphoric acid (e1). The resultant EVOH resin composition and multilayer structure were evaluated in the same manner as in Example VI-1.

Example VI-4

An EVOH resin composition and a multilayer structure were produced in the same manner as in Example VI-1 except that: the stearic acid (c1) was used at a content of 90.7 ppm in terms of carboxylic acid ion with respect to the total sum of the contents of the EVOH (a1), the sodium acetate (b1), the stearic acid (c1), and the zinc stearate (d1); and the zinc stearate (d1) was used at a content of 200 ppm in terms of metal ion with respect to the total sum of the contents of the EVOH (a1), the sodium acetate (b1), the stearic acid (c1), and the zinc stearate (d1). The resultant EVOH resin composition and multilayer structure were evaluated in the same manner as in Example VI-1.

Example VI-5

An EVOH resin composition and a multilayer structure were produced in the same manner as in Example VI-1 except that: the caprylic acid (c2) was used instead of the stearic acid (c1) at a content of 13.8 ppm in terms of carboxylic acid ion with respect to the total sum of the contents of the EVOH (a1), the sodium acetate (b1), the caprylic acid (c2), and the zinc caprylate (d2); and the zinc caprylate (d2) was used instead of the zinc stearate (d1) at a content of 100 ppm in terms of metal ion with respect to the total sum of the contents of the EVOH (a1), the sodium acetate (b1), the caprylic acid (c2), and the zinc caprylate (d2). The resultant EVOH resin composition and multilayer structure were evaluated in the same manner as in Example VI-1.

Example VI-6

An EVOH resin composition and a multilayer structure were produced in the same manner as in Example VI-3 except that: the caprylic acid (c2) was used instead of the stearic acid (c1) at a content of 13.8 ppm in terms of carboxylic acid ion with respect to the total sum of the contents of the EVOH (a2), the sodium acetate (b1), the caprylic acid (c2), and the zinc caprylate (d2); and the zinc caprylate (d2) was used instead of the zinc stearate (d1) at a content of 100 ppm in terms of metal ion with respect to the total sum of the contents of the EVOH (a2), the sodium acetate (b1), the caprylic acid (c2), and the zinc caprylate (d2). The resultant EVOH resin composition and multilayer structure were evaluated in the same manner as in Example VI-1.

Example VI-7

An EVOH resin composition and a multilayer structure were produced in the same manner as in Example VI-5 except that the boric acid (f1) was used at a content of 550 ppm in terms of boron with respect to the total sum of the contents of the EVOH (a1), the sodium acetate (b1), the caprylic acid (c2), the zinc caprylate (d2), and the boric acid (f1). The resultant EVOH resin composition and multilayer structure were evaluated in the same manner as in Example VI-1.

Example VI-8

An EVOH resin composition and a multilayer structure were produced in the same manner as in Example VI-5 except that: the caprylic acid (c2) was used at a content of 27.6 ppm in terms of carboxylic acid ion with respect to the total sum of the contents of the EVOH (a1), the sodium acetate (b1), the caprylic acid (c2), and the zinc caprylate (d2); and the zinc caprylate (d2) was used at a content of 200 ppm in terms of metal ion with respect to the total sum of the contents of the EVOH (a1), the sodium acetate (b1), the caprylic acid (c2), and the zinc caprylate (d2). The resultant EVOH resin composition and multilayer structure were evaluated in the same manner as in Example VI-1.

Example VI-9

An EVOH resin composition and a multilayer structure were produced in the same manner as in Example VI-1 except that: the lauric acid (c3) was used instead of the stearic acid (c1) at a content of 3.6 ppm in terms of carboxylic acid ion with respect to the total sum of the contents of the EVOH (a1), the sodium acetate (b1), the lauric acid (c3), and the zinc laurate (d3); and the zinc laurate (d3) was used instead of the zinc stearate (d1) at a content of 100 ppm in terms of metal ion with respect to the total sum of the contents of the EVOH (a1), the sodium acetate (b1), the lauric acid (c3), and the zinc laurate (d3). The resultant EVOH resin composition and multilayer structure were evaluated in the same manner as in Example VI-1.

Example VI-10

An EVOH resin composition and a multilayer structure were produced in the same manner as in Example VI-9 except that: the EVOH (a2) was used instead of the EVOH (a1); the sodium acetate (b1) was used at a content of 504 ppm in terms of acetic acid ion with respect to the total sum of the contents of the EVOH (a2), the sodium acetate (b1), the lauric acid (c3), and the zinc laurate (d3); the boric acid (f1) was used at a content of 161 ppm in terms of boron with respect to the total sum of the contents of the EVOH (a2), the sodium acetate (b1), the lauric acid (c3), the zinc laurate (d3), and the boric acid (f1); and the phosphoric acid (e1) was used at a content of 2 ppm in terms of phosphorous with respect to the total sum of the contents of the EVOH (a2), the sodium acetate (b1), the lauric acid (c3), the zinc laurate (d3), and the phosphoric acid (e1). The resultant EVOH resin composition and multilayer structure were evaluated in the same manner as in Example VI-1.

Example VI-11

An EVOH resin composition and a multilayer structure were produced in the same manner as in Example VI-9 except that: the lauric acid (c3) was used at a content of 7.1 ppm in terms of carboxylic acid ion with respect to the total sum of the contents of the EVOH (a1), the sodium acetate (b1), the lauric acid (c3), and the zinc laurate (d3); and the zinc laurate (d3) was used at a content of 200 ppm in terms of metal ion with respect to the total sum of the contents of the EVOH (a1), the sodium acetate (b1), the lauric acid (c3), and the zinc laurate (d3). The resultant EVOH resin composition and multilayer structure were evaluated in the same manner as in Example VI-1.

Example VI-12

An EVOH resin composition and a multilayer structure were produced in the same manner as in Example VI-1 except that: the behenic acid (c5) was used instead of the stearic acid (c1) at a content of 5.7 ppm in terms of carboxylic acid ion with respect to the total sum of the contents of the EVOH (a1), the sodium acetate (b1), the behenic acid (c5), and the zinc behenate (d5); and the zinc behenate (d5) was used instead of the zinc stearate (d1) at a content of 100 ppm in terms of metal ion with respect to the total sum of the contents of the EVOH (a1), the sodium acetate (b1), the behenic acid (c5), and the zinc behenate (d5). The resultant EVOH resin composition and multilayer structure were evaluated in the same manner as in Example VI-1.

Example VI-13

An EVOH resin composition and a multilayer structure were produced in the same manner as in Example VI-12 except that: the EVOH (a2) was used instead of the EVOH (a1); the sodium acetate (b1) was used at a content of 504 ppm in terms of acetic acid ion with respect to the total sum of the contents of the EVOH (a2), the sodium acetate (b1), the behenic acid (c5), and the zinc behenate (d5); the boric acid (f1) was used at a content of 161 ppm in terms of boron with respect to the total sum of the contents of the EVOH (a2), the sodium acetate (b1), the behenic acid (c5), the zinc behenate (d5), and the boric acid (f1); and the phosphoric acid (e1) was used at a content of 2 ppm in terms of phosphorous with respect to the total sum of the contents of the EVOH (a2), the sodium acetate (b1), the behenic acid (c5), the zinc behenate (d5), and the phosphoric acid (e1). The resultant EVOH resin composition and multilayer structure were evaluated in the same manner as in Example VI-1.

Example VI-14

An EVOH resin composition and a multilayer structure were produced in the same manner as in Example VI-12 except that: the behenic acid (c5) was used at a content of 11.4 ppm in terms of carboxylic acid ion with respect to the total sum of the contents of the EVOH (a1), the sodium acetate (b1), the behenic acid (c5), and the zinc behenate (d5); and the zinc behenate (d5) was used at a content of 200 ppm in terms of metal ion with respect to the total sum of the contents of the EVOH (a1), the sodium acetate (b1), the behenic acid (c5), and the zinc behenate (d5). The resultant EVOH resin composition and multilayer structure were evaluated in the same manner as in Example VI-1.

Example VI-15

An EVOH resin composition and a multilayer structure were produced in the same manner as in Example VI-5 except that the caprylic acid (c2) was used at a content of 538.1 ppm in terms of carboxylic acid ion with respect to the total sum of the contents of the EVOH (a1), the sodium acetate (b1), the caprylic acid (c2), and the zinc caprylate (d2). The resultant EVOH resin composition and multilayer structure were evaluated in the same manner as in Example VI-1.

Example VI-16

An EVOH resin composition and a multilayer structure were produced in the same manner as in Example VI-9 except that the lauric acid (c3) was used at a content of 709.7 ppm in terms of carboxylic acid ion with respect to the total sum of the contents of the EVOH (a1), the sodium acetate (b1), the lauric acid (c3), and the zinc laurate (d3). The resultant EVOH resin composition and multilayer structure were evaluated in the same manner as in Example VI-1.

Comparative Example VI-1

An EVOH resin composition and a multilayer structure were produced in the same manner as in Example VI-5 except that: the EVOH (a3) free of the structural unit (i) having a primary hydroxy group in a side chain thereof [ethylene-vinyl alcohol copolymer having an ethylene content of 38 mol %, a saponification degree of 99.6 mol %, and a MFR of 4.0 g/10 min (210° C., 2,160 g)] was used instead of the EVOH (a1); the sodium acetate (b1) was used at a content of 648 ppm in terms of acetic acid ion with respect to the total sum of the contents of the EVOH (a3), the sodium acetate (b1), the caprylic acid (c2), and the zinc caprylate (d2); the boric acid (f1) was used at a content of 259 ppm in terms of boron with respect to the total sum of the contents of the EVOH (a3), the sodium acetate (b1), the caprylic acid (c2), the zinc caprylate (d2), and the boric acid (f1); and the phosphoric acid (e1) was used at a content of 41 ppm in terms of phosphorous with respect to the total sum of the contents of the EVOH (a3), the sodium acetate (b1), the caprylic acid (c2), the zinc caprylate (d2), and the phosphoric acid (e1). The resultant EVOH resin composition and multilayer structure were evaluated in the same manner as in Example VI-1.

Comparative Example VI-2

An EVOH resin composition and a multilayer structure were produced in the same manner as in Example VI-1 except that the stearic acid (c1) and the zinc stearate (d1) were not used. The resultant EVOH resin composition and multilayer structure were evaluated in the same manner as in Example VI-1.

Comparative Example VI-3

An EVOH resin composition and a multilayer structure were produced in the same manner as in Example VI-1 except that: the stearic acid (c1) was used at a content of 29.2 ppm in terms of carboxylic acid ion with respect to the total sum of the contents of the EVOH (a1), the sodium acetate (b1), the stearic acid (c1), and the zinc stearate (d1); and the zinc stearate (d1) was used at a content of 600 ppm in terms of metal ion with respect to the total sum of the contents of the EVOH (a1), the sodium acetate (b1), the stearic acid (c1), and the zinc stearate (d1). The resultant EVOH resin composition and multilayer structure were evaluated in the same manner as in Example VI-1.

Comparative Example VI-4

An EVOH resin composition and a multilayer structure were produced in the same manner as in Example VI-5 except that: the caprylic acid (c2) was used at a content of 82.8 ppm in terms of carboxylic acid ion with respect to the total sum of the contents of the EVOH (a1), the sodium acetate (b1), the caprylic acid (c2), and the zinc caprylate (d2); and the zinc caprylate (d2) was used at a content of 600 ppm in terms of metal ion with respect to the total sum of the contents of the EVOH (a1), the sodium acetate (b1), the caprylic acid (c2), and the zinc caprylate (d2). The resultant EVOH resin composition and multilayer structure were evaluated in the same manner as in Example VI-1.

Comparative Example VI-5

An EVOH resin composition and a multilayer structure were produced in the same manner as in Example VI-9 except that: the lauric acid (c3) was used at a content of 21.4 ppm in terms of carboxylic acid ion with respect to the total sum of the contents of the EVOH (α1), the sodium acetate (b1), the lauric acid (c3), and the zinc laurate (d3); and the zinc laurate (d3) was used at a content of 600 ppm in terms of metal ion with respect to the total sum of the contents of the EVOH (a1), the sodium acetate (b1), the lauric acid (c3), and the zinc laurate (d3). The resultant EVOH resin composition and multilayer structure were evaluated in the same manner as in Example VI-1.

Comparative Example VI-6

An EVOH resin composition and a multilayer structure were produced in the same manner as in Example VI-12 except that: the behenic acid (c5) was used at a content of 34.3 ppm in terms of carboxylic acid ion with respect to the total sum of the contents of the EVOH (a1), the sodium acetate (b1), the behenic acid (c5), and the zinc behenate (d5); and the zinc behenate (d5) was used at a content of 600 ppm in terms of metal ion with respect to the total sum of the contents of the EVOH (a1), the sodium acetate (b1), the behenic acid (c5), and the zinc behenate (d5). The resultant EVOH resin composition and multilayer structure were evaluated in the same manner as in Example VI-1.

Comparative Example VI-7

An EVOH resin composition and a multilayer structure were produced in the same manner as in Example VI-1 except that: the stearic acid (c1) was used at a content of 30.8 ppm in terms of carboxylic acid ion with respect to the total sum of the contents of the EVOH (a1), the sodium acetate (b1), the stearic acid (c1), and magnesium stearate; and magnesium stearate was used instead of the zinc stearate (d1) at a content of 100 ppm in terms of metal ion with respect to the total sum of the contents of the EVOH (a1), the sodium acetate (bi), the stearic acid (c1), and magnesium stearate. The resultant EVOH resin composition and multilayer structure were evaluated in the same manner as in Example VI-1.

Comparative Example VI-8

An EVOH resin composition and a multilayer structure were produced in the same manner as in Example VI-1 except that: the stearic acid (c1) was used at a content of 6.7 ppm in terms of carboxylic acid ion with respect to the total sum of the contents of the EVOH (a1), the sodium acetate (b1), the stearic acid (c1), and sodium stearate; and sodium stearate was used instead of the zinc stearate (d1) at a content of 100 ppm in terms of metal ion with respect to the total sum of the contents of the EVOH (a1), the sodium acetate (b1), the stearic acid (c1), and sodium stearate. The resultant EVOH resin composition and multilayer structure were evaluated in the same manner as in Example VI-1.

Comparative Example VI-9

An EVOH resin composition and a multilayer structure were produced in the same manner as in Example VI-1 except that the stearic acid (c1) was used at a content of 967.1 ppm in terms of carboxylic acid ion with respect to the total sum of the contents of the EVOH (a1), the sodium acetate (b1), the stearic acid (c1), and the zinc stearate (d1). The resultant EVOH resin composition and multilayer structure were evaluated in the same manner as in Example VI-1.

Comparative Example VI-10

An EVOH resin composition and a multilayer structure were produced in the same manner as in Example VI-1 except that the stearic acid (c1) was used at a content of 0.81 ppm in terms of carboxylic acid ion with respect to the total sum of the contents of the EVOH (a1), the sodium acetate (b1), the stearic acid (c1), and the zinc stearate (d1). The resultant EVOH resin composition and multilayer structure were evaluated in the same manner as in Example VI-1.

Comparative Example VI-11

An EVOH resin composition and a multilayer structure were produced in the same manner as in Example VI-1 except that zinc gluconate trihydrate was used instead of the zinc stearate (d1) at a content of 100 ppm in terms of metal ion with respect to the total sum of the contents of the EVOH (a1), the sodium acetate (b1), the stearic acid (c1), and zinc gluconate trihydrate. The resultant EVOH resin composition and multilayer structure were evaluated in the same manner as in Example VI-1.

Comparative Example VI-12

An EVOH resin composition and a multilayer structure were produced in the same manner as in Example VI-1 except that zinc citrate dihydrate was used instead of the zinc stearate (d1) at a content of 100 ppm in terms of metal ion with respect to the total sum of the contents of the EVOH (a1), the sodium acetate (b1), the stearic acid (c1), and zinc citrate dihydrate. The resultant EVOH resin composition and multilayer structure were evaluated in the same manner as in Example VI-1.

TABLE VI-1-1

| | EVOH (A) | Content of acetic acid and/or acetic acid salt (B) (in terms of acetic acid ion) [ppm] | Aliphatic carboxylic acid (C) | Content of (C) (in terms of carboxylic acid ion) [ppm] | Aliphatic carboxylic acid metal salt (D) | Content of (D) (in terms of metal ion) [ppm] | Content of boric acid and/or boric acid salt (F) (content in terms of boron) [ppm] | Content of phosphoric acid and/or phosphoric acid salt (E) (content in terms of phosphorus) [ppm] |
|---|---|---|---|---|---|---|---|---|
| Example VI-1 | a1 | 432 | Stearic acid | 4.9 | Zinc stearate | 100 | 304 | 51 |
| Example VI-2 | a1 | 432 | Stearic acid | 1.4 | Zinc stearate | 100 | 304 | 51 |
| Example VI-3 | a2 | 504 | Stearic acid | 4.9 | Zinc stearate | 100 | 161 | 2 |
| Example VI-4 | a1 | 432 | Stearic acid | 9.7 | Zinc stearate | 200 | 304 | 51 |
| Example VI-5 | a1 | 432 | Caprylic acid | 13.8 | Zinc caprylate | 100 | 304 | 51 |
| Example VI-6 | a2 | 504 | Caprylic acid | 13.8 | Zinc caprylate | 100 | 161 | 2 |
| Example VI-7 | a1 | 432 | Caprylic acid | 13.8 | Zinc caprylate | 100 | 550 | 51 |
| Example VI-8 | a1 | 432 | Caprylic acid | 27.6 | Zinc caprylate | 200 | 304 | 51 |
| Example VI-9 | a1 | 432 | Lauric acid | 3.6 | Zinc laurate | 100 | 304 | 51 |
| Example VI-10 | a2 | 504 | Lauric acid | 3.6 | Zinc laurate | 100 | 161 | 2 |
| Example VI-11 | a1 | 432 | Lauric acid | 7.1 | Zinc laurate | 200 | 304 | 51 |
| Example VI-12 | a1 | 432 | Behenic acid | 5.7 | Zinc behenate | 100 | 304 | 51 |
| Example VI-13 | a2 | 504 | Behenic acid | 5.7 | Zinc behenate | 100 | 161 | 2 |
| Example VI-14 | a1 | 432 | Behenic acid | 11.4 | Zinc behenate | 200 | 304 | 51 |
| Example VI-15 | a1 | 432 | Caprylic acid | 538.1 | Zinc caprylate | 100 | 304 | 51 |
| Example VI-16 | a1 | 432 | Lauric acid | 709.7 | Zinc laurate | 100 | 304 | 51 |
| Comparative Example VI-1 | a3 | 648 | Caprylic acid | 13.8 | Zinc caprylate | 100 | 259 | 41 |
| Comparative Example VI-2 | a1 | 432 | — | 0 | — | 0 | 304 | 51 |
| Comparative Example VI-3 | a1 | 432 | Stearic acid | 29.2 | Zinc stearate | 600 | 304 | 51 |
| Comparative Example VI-4 | a1 | 432 | Caprylic acid | 82.8 | Zinc caprylate | 600 | 304 | 51 |
| Comparative Example VI-5 | a1 | 432 | Lauric acid | 21.4 | Zinc laurate | 600 | 304 | 51 |
| Comparative Example VI-6 | a1 | 432 | Behenic acid | 34.3 | Zinc behenate | 600 | 304 | 51 |
| Comparative Example VI-7 | a1 | 432 | Stearic acid | 30.8 | Magnesium stearate | 100 | 304 | 51 |
| Comparative Example VI-8 | a1 | 432 | Stearic acid | 6.7 | Sodium stearate | 100 | 304 | 51 |
| Comparative Example VI-9 | a1 | 432 | Stearic acid | 967.1 | Zinc stearate | 100 | 304 | 51 |
| Comparative Example VI-10 | a1 | 432 | Stearic acid | 0.81 | Zinc stearate | 100 | 304 | 51 |
| Comparative Example VI-11 | a1 | 432 | Stearic acid | 4.9 | Zinc gluconate trihydrate | 100 | 304 | 51 |
| Comparative Example VI-12 | a1 | 432 | Stearic acid | 4.9 | Zinc citrate dihydrate | 100 | 304 | 51 |

TABLE VI-1-2

| | (D)/(B) | (D)/(C) | (B)/(C) | Elongation viscosity [Pa · s] (210° C., 100 S⁻¹) | Impact strength [kgf · cm] | Color tone stability (air atmosphere, 210° C., 2 hours) | Adhesive strength [N/15 mm] | Stretchability |
|---|---|---|---|---|---|---|---|---|
| Example VI-1 | 0.23 | 20.41 | 88.16 | 3,757 | 17.78 | 64.60 | 6.91 | A |
| Example VI-2 | 0.23 | 71.43 | 308.57 | 3,757 | 16.60 | 61.73 | 6.74 | A |
| Example VI-3 | 0.2 | 20.41 | 102.86 | 4,275 | 17.82 | 52.66 | 6.98 | A |
| Example VI-4 | 0.46 | 20.62 | 44.54 | 3,757 | 17.88 | 54.86 | 6.30 | A |
| Example VI-5 | 0.23 | 7.25 | 31.3 | 3,757 | 18.40 | 64.75 | 7.07 | A |
| Example VI-6 | 0.2 | 7.25 | 36.52 | 4,275 | 18.48 | 59.87 | 7.13 | A |
| Example VI-7 | 0.23 | 7.25 | 31.3 | 20,933 | 16.63 | 60.84 | 7.04 | A |
| Example VI-8 | 0.46 | 7.25 | 15.65 | 3,757 | 18.51 | 54.99 | 6.86 | A |
| Example VI-9 | 0.23 | 27.78 | 120 | 3,757 | 18.10 | 67.77 | 7.01 | A |
| Example VI-10 | 0.2 | 27.78 | 140 | 4,275 | 18.15 | 56.99 | 7.08 | A |
| Example VI-11 | 0.46 | 28.17 | 60.85 | 3,757 | 18.20 | 57.55 | 6.68 | A |
| Example VI-12 | 0.23 | 17.54 | 75.79 | 3,757 | 17.52 | 65.75 | 6.83 | A |
| Example VI-13 | 0.2 | 17.54 | 88.42 | 4,275 | 17.36 | 58.89 | 6.83 | A |
| Example VI-14 | 0.46 | 17.54 | 37.89 | 3,757 | 17.61 | 55.84 | 6.00 | A |
| Example VI-15 | 0.23 | 0.19 | 0.8 | 3,757 | 15.12 | 63.76 | 7.20 | A |
| Example VI-16 | 0.23 | 0.14 | 0.61 | 3,757 | 15.02 | 61.81 | 7.20 | A |
| Comparative Example VI-1 | 0.15 | 7.25 | 46.96 | 3,946 | 18.06 | 62.45 | 7.07 | D |
| Comparative Example VI-2 | 0 | ∞ | ∞ | 3,757 | 14.54 | 76.51 | 7.15 | B |
| Comparative Example VI-3 | 1.39 | 20.55 | 14.79 | 3,757 | 17.99 | 35.87 | 3.05 | B |
| Comparative Example VI-4 | 1.39 | 7.25 | 5.22 | 3,757 | 18.62 | 35.95 | 3.56 | B |
| Comparative Example VI-5 | 1.39 | 28.04 | 20.19 | 3,757 | 18.31 | 37.63 | 3.31 | B |
| Comparative Example VI-6 | 1.39 | 17.49 | 12.59 | 3,757 | 17.72 | 36.51 | 2.95 | B |
| Comparative Example VI-7 | 0.23 | 3.25 | 14.03 | 3,757 | 14.17 | 58.06 | 7.20 | C |
| Comparative Example VI-8 | 0.23 | 14.93 | 64.48 | 3,757 | 14.11 | 70.24 | 7.40 | C |
| Comparative Example VI-9 | 0.23 | 0.1 | 0.45 | 3,757 | 14.96 | 59.01 | 7.20 | A |
| Comparative Example VI-10 | 0.23 | 123.46 | 533.33 | 3,757 | 14.94 | 58.79 | 6.57 | A |
| Comparative Example VI-11 | 0.23 | 20.41 | 88.16 | 3,757 | 12.20 | 18.43 | 5.30 | D |
| Comparative Example VI-12 | 0.23 | 20.41 | 88.16 | 3,757 | 10.90 | 52.04 | 5.50 | D |

In Comparative Example VI-2 free of the aliphatic carboxylic acid metal salt (D), the impact strength was 14.54 (kgf·cm). In contrast, in Comparative Example VI-1 that contained the aliphatic carboxylic acid metal salt (D), and was free of the structural unit (i) having a primary hydroxy group in a side chain thereof, the impact strength increased to 18.06 (kgf·cm). However, the stretchability reduced.

In addition, in each of Comparative Examples VI-3 to VI-6 each of which did not satisfy the formula (1) specified in the present disclosure, the adhesive strength and the color tone stability were low. In Comparative Examples VI-9 and VI-10 each of which did not satisfy the formula (2) specified in the present disclosure, the impact strengths were low.

Further, also in each of Comparative Examples VI-7 and VI-8 in each of which the metal species of the aliphatic carboxylic acid metal salt (D) was not one kind selected from the long Periodic Table 4th-period d-block elements, the impact strength was low, and the stretchability was also low.

In addition, in each of Comparative Examples VI-11 and VI-12 in each of which the aliphatic carboxylic acid (C) and the anion species of the aliphatic carboxylic acid metal salt (D) were not of the same species, the impact strength and the adhesive strength were low, and moreover, the stretchability was low.

In contrast, each of the EVOH resin compositions (Examples VI-1 to VI-16) each having the characteristic configuration of the present disclosure was not reduced in adhesive strength and showed an excellent value therefor while being excellent in impact strength and stretchability. Further, each of the compositions was not reduced in color tone stability.

Packages were produced by using the multilayer structures of the respective Examples obtained in the foregoing. Each of the resultant packages was excellent in impact resistance and adhesive strength.

Comparative Examples in the above-mentioned second to sixth modes are comparative examples in the respective modes, and are not necessarily comparative examples of the present disclosure.

Although specific embodiments in the present disclosure have been described in Examples described above, Examples described above are for illustrative purposes only and are not to be construed as limitative. It is intended that various modifications apparent to a person skilled in the art fall within the scope of the present disclosure.

The EVOH resin composition of the present disclosure is excellent in impact resistance and adhesive strength. Accordingly, the multilayer structure including the layer formed of the EVOH resin composition is useful as a raw material for containers not only for general food but also for various materials to be packaged, such as seasonings including mayonnaise and a dressing, fermented food including a soybean paste, oil and fat food including a salad oil, beverages, cosmetics, and drugs.

The invention claimed is:

1. An ethylene-vinyl alcohol copolymer resin composition, comprising:
   an ethylene-vinyl alcohol copolymer (A);
   acetic acid and/or a salt thereof (B);
   an aliphatic carboxylic acid (C) other than acetic acid; and
   an aliphatic carboxylic acid metal salt (D) that is a metal salt of the aliphatic carboxylic acid (C),
   wherein a metal species of the aliphatic carboxylic acid metal salt (D) is at least one selected from long Periodic Table 4th-period d-block elements, and
   wherein respective contents of the acetic acid and/or the salt thereof (B), the aliphatic carboxylic acid (C), and the aliphatic carboxylic acid metal salt (D) satisfy the following formulae (1) and (2) on a weight basis:

0.001≤(content of (D) in terms of metal ion/content of (B) in terms of acetic acid ion)≤1.30 . . . (1)

0.11≤(content of (D) in terms of metal ion/content of (C) in terms of carboxylic acid ion)≤100 . . . (2).

2. The ethylene-vinyl alcohol copolymer resin composition according to claim 1, wherein the content of the aliphatic carboxylic acid metal salt (D) in terms of metal ion is from 1 ppm to 500 ppm on a weight basis with respect to a total sum of contents of the ethylene-vinyl alcohol copolymer (A), the acetic acid and/or the salt thereof (B), the aliphatic carboxylic acid (C), and the aliphatic carboxylic acid metal salt (D).

3. The ethylene-vinyl alcohol copolymer resin composition according to claim 1, wherein the content of the aliphatic carboxylic acid (C) in terms of carboxylic acid ion is from 0.001 ppm to 450 ppm on a weight basis with respect to a total sum of contents of the ethylene-vinyl alcohol copolymer (A), the acetic acid and/or the salt thereof (B), the aliphatic carboxylic acid (C), and the aliphatic carboxylic acid metal salt (D).

4. The ethylene-vinyl alcohol copolymer resin composition according to claim 1, wherein the content of the acetic acid and/or the salt thereof (B) in terms of acetic acid ion is from 10 ppm to 2,000 ppm on a weight basis with respect to a total sum of contents of the ethylene-vinyl alcohol copolymer (A), the acetic acid and/or the salt thereof (B), the aliphatic carboxylic acid (C), and the aliphatic carboxylic acid metal salt (D).

5. The ethylene-vinyl alcohol copolymer resin composition according to claim 1, wherein a ratio (content of acetic acid and/or salt thereof (B) in terms of acetic acid ion/content of aliphatic carboxylic acid (C) in terms of carboxylic acid ion) of the content of the acetic acid and/or the salt thereof (B) in terms of acetic acid ion to the content of the aliphatic carboxylic acid (C) in terms of carboxylic acid ion is from 0.0001 to 10,000 on a weight basis.

6. The ethylene-vinyl alcohol copolymer resin composition according to claim 1, wherein an elongation viscosity of the ethylene-vinyl alcohol copolymer resin composition at 210° C.; and 100 s$^{-1}$ satisfies the following formula (3):

500≤elongation viscosity [Pa·s]≤48,000 . . . (3).

7. The ethylene-vinyl alcohol copolymer resin composition according to claim 1, further comprising phosphoric acid and/or a salt thereof (E), wherein a content of the phosphoric acid and/or the salt thereof (E) in terms of phosphorus is 900 ppm or less on a weight basis with respect to a total sum of contents of the ethylene-vinyl alcohol copolymer (A), the acetic acid and/or the salt thereof (B), the aliphatic carboxylic acid (C), the aliphatic carboxylic acid metal salt (D), and the phosphoric acid and/or the salt thereof (E).

8. The ethylene-vinyl alcohol copolymer resin composition according to claim 1, further comprising boric acid and/or a salt thereof (F), wherein the ethylene-vinyl alcohol copolymer resin composition satisfies the following formula (4) on a weight basis:

0.11≤(content of (D) in terms of metal ion/content of (F) in terms of boron)≤100 . . . (4).

9. The ethylene-vinyl alcohol copolymer resin composition according to claim 1, wherein the ethylene-vinyl alcohol copolymer (A) is two or more ethylene-vinyl alcohol copolymers having numerically different ethylene structural unit contents.

10. The ethylene-vinyl alcohol copolymer resin composition according to claim 9, wherein the ethylene-vinyl alcohol copolymer having a highest ethylene structural unit content and the ethylene-vinyl alcohol copolymer having a lowest ethylene structural unit content in the two or more ethylene-vinyl alcohol copolymers (A) having numerically different ethylene structural unit contents differ from each other in ethylene structural unit content by 3 mol % or more.

11. The ethylene-vinyl alcohol copolymer resin composition according to claim 1, wherein the ethylene-vinyl alcohol copolymer (A) is an ethylene-vinyl alcohol copolymer containing a structural unit (i) having a primary hydroxy group in a side chain thereof.

12. The ethylene-vinyl alcohol copolymer resin composition according to claim 11, wherein the structural unit (i) is a structural unit represented by the following general formula (i-1):

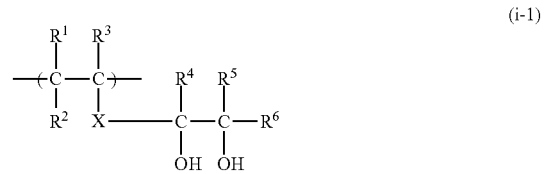

where $R^1$, $R^2$, and $R^3$ each independently represent a hydrogen atom or an organic group, X represents a single bond or a bonding chain, and $R^4$, $R^5$, and $R^6$ each independently represent a hydrogen atom or an organic group.

13. The ethylene-vinyl alcohol copolymer resin composition according to claim 1, further comprising cinnamic acid and/or a salt thereof (G), wherein the ethylene-vinyl alcohol copolymer resin composition satisfies the following formula (5) on a weight basis:

0.015≤(content of (D) in terms of metal ion/content of (G) in terms of cinnamic acid ion)≤50 . . . (5).

14. The ethylene-vinyl alcohol copolymer resin composition according to claim 1, further comprising a styrene thermoplastic elastomer (H) free of any polar group and a styrene thermoplastic elastomer (I) containing a polar group, wherein the ethylene-vinyl alcohol copolymer resin composition satisfies the following formula (6) on a weight basis:

30≤(content of (I)/content of (D) in terms of metal ion)≤2,900 . . . (6).

15. The ethylene-vinyl alcohol copolymer resin composition according to claim 14, wherein the styrene thermoplastic elastomer (H) free of any polar group is a block copolymer having a polymer block (h1) formed of an aromatic vinyl monomer unit, and a polymer block obtained by polymerizing an unsaturated hydrocarbon compound and/or a hydrogenated block thereof (h2), and the styrene thermoplastic elastomer (I) containing the polar group is a modified block copolymer, which has a polymer block (i1) formed of an aromatic vinyl monomer unit, and a polymer block obtained by polymerizing an unsaturated hydrocarbon compound and/or a hydrogenated block thereof (i2), and contains the polar group.

16. A multilayer structure, comprising:
at least one resin composition layer ($\alpha$) formed of the resin composition of claim 1;
at least one adhesive resin layer ($\beta$); and
at least one thermoplastic resin layer ($\delta$) formed of a thermoplastic resin other than the resin composition of claim 1, which is laminated on at least one surface of the resin composition layer ($\alpha$) with the adhesive resin layer ($\beta$) interposed between the resin composition layer ($\alpha$) and the thermoplastic resin layer ($\delta$).

17. The multilayer structure according to claim 16, wherein a ratio "$(\alpha_L)/(\beta_L)$" of from 10/90 to 99/1 and a ratio "$(\alpha_L)/(\delta_L)$" of from 1/99 to 50/50 are satisfied, where $\alpha_L$ represents the thickness of the resin composition layer ($\alpha$) or the thickness of a resin composition layer having the largest thickness among the resin composition layers ($\alpha$), $\beta_L$ represents the thickness of the adhesive resin layer ($\beta$) or the thickness of an adhesive resin layer having the largest thickness among the adhesive resin layers ($\beta$), and $\delta_L$ represents the thickness of the thermoplastic resin layer ($\delta$) or the thickness of a thermoplastic resin layer having the largest thickness among the thermoplastic resin layers ($\delta$).

18. A multilayer structure, comprising:
at least one resin composition layer ($\alpha$) formed of the resin composition of claim 1; and
at least one polyamide layer ($\gamma$) laminated on at least one surface of the resin composition layer ($\alpha$).

19. The multilayer structure according to claim 18, wherein a ratio "$(\alpha_L)/(\gamma_L)$" of from 10/90 to 99/1 is satisfied, where $\alpha_L$ represents the thickness of the resin composition layer ($\alpha$) or the thickness of a resin composition layer having the largest thickness among the resin composition layers (a), and $\gamma_L$ represents the thickness of the polyamide layer ($\gamma$) or the thickness of a polyamide layer having the largest thickness among the polyamide layers ($\gamma$).

20. A package, comprising the multilayer structure of claim 16.

* * * * *